United States Patent
Flament et al.

(10) Patent No.: US 12,412,413 B2
(45) Date of Patent: Sep. 9, 2025

(54) IMAGE BOX FILTERING FOR OPTICAL CHARACTER RECOGNITION

(71) Applicant: OPEN TEXT CORPORATION, Waterloo (CA)

(72) Inventors: Arnaud G. Flament, Sunnyvale, CA (US); Guillaume B. Koch, San Jose, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 359 days.

(21) Appl. No.: 17/899,308

(22) Filed: Aug. 30, 2022

(65) Prior Publication Data

US 2022/0415008 A1 Dec. 29, 2022

Related U.S. Application Data

(63) Continuation of application No. 16/857,993, filed on Apr. 24, 2020, now Pat. No. 11,443,504, which is a continuation of application No. 16/525,354, filed on Jul. 29, 2019, now Pat. No. 10,679,091, which is a
(Continued)

(51) Int. Cl.
*G06K 9/00* (2022.01)
*G06V 30/148* (2022.01)
*G06V 30/18* (2022.01)
*G06V 30/224* (2022.01)
*G06V 30/412* (2022.01)
*G06V 30/10* (2022.01)

(52) U.S. Cl.
CPC .......... *G06V 30/412* (2022.01); *G06V 30/148* (2022.01); *G06V 30/18105* (2022.01); *G06V 30/224* (2022.01); *G06V 30/10* (2022.01)

(58) Field of Classification Search
CPC .................................................. G06V 30/148
See application file for complete search history.

(56) References Cited

U.S. PATENT DOCUMENTS

| | | | |
|---|---|---|---|
| 5,121,345 A | 6/1992 | Lentz | |
| 5,182,656 A * | 1/1993 | Chevion | H04N 1/4115 382/209 |
| 5,359,659 A | 10/1994 | Rosenthal | |

(Continued)

FOREIGN PATENT DOCUMENTS

| | | |
|---|---|---|
| AU | 701007 B2 | 1/1999 |
| AU | 2001262958 A1 | 11/2001 |

(Continued)

OTHER PUBLICATIONS

Automatic Assessment of OCR Quality in Historical Documents, Anshul Gupta et al., AAAI, Feb. 18, 2015, pp. 1735-1741 (Year: 2015).*

(Continued)

*Primary Examiner* — Jayesh A Patel
(74) *Attorney, Agent, or Firm* — Sprinkle IP Law Group

(57) ABSTRACT

A method for box filtering includes obtaining, by a computing device, a form image, and identifying, by the computing device, a region of the form image that includes boxes. Vertical lines in the region of the form image are detected. The boxes in the region are detected according to the plurality of vertical lines, and image content is extracted from the boxes.

18 Claims, 9 Drawing Sheets

Related U.S. Application Data continuation of application No. 14/788,170, filed on Jun. 30, 2015, now Pat. No. 10,395,133.

(60) Provisional application No. 62/158,775, filed on May 8, 2015.

(56) References Cited

U.S. PATENT DOCUMENTS

| | | | |
|---|---|---|---|
| 5,410,611 A * | 4/1995 | Huttenlocher | G06V 30/146 |
| | | | 382/177 |
| 5,440,723 A | 8/1995 | Arnold | |
| 5,450,586 A | 9/1995 | Kuzara | |
| 5,473,769 A | 12/1995 | Cozza | |
| 5,511,184 A | 4/1996 | Lin | |
| 5,623,600 A | 4/1997 | Ji | |
| 5,680,547 A | 10/1997 | Chang | |
| 5,696,822 A | 12/1997 | Nachenberg | |
| 5,734,761 A * | 3/1998 | Bagley | G06T 11/60 |
| | | | 382/311 |
| 5,757,957 A * | 5/1998 | Tachikawa | G06V 30/155 |
| | | | 382/176 |
| 5,825,919 A * | 10/1998 | Bloomberg | G06V 30/414 |
| | | | 382/177 |
| 5,826,013 A | 10/1998 | Nachenberg | |
| 5,832,208 A | 11/1998 | Chen | |
| 5,848,184 A * | 12/1998 | Taylor | G06V 30/414 |
| | | | 715/204 |
| 5,886,699 A | 3/1999 | Belfiore | |
| 5,889,943 A | 3/1999 | Ji | |
| 5,892,843 A * | 4/1999 | Zhou | G06V 30/40 |
| | | | 382/176 |
| 5,951,698 A | 9/1999 | Chen | |
| 5,960,170 A | 9/1999 | Chen | |
| 5,983,348 A | 11/1999 | Ji | |
| 5,991,881 A | 11/1999 | Conklin | |
| 5,999,723 A | 12/1999 | Nachenberg | |
| 6,021,510 A | 2/2000 | Nachenberg | |
| 6,035,423 A | 3/2000 | Hodges | |
| 6,044,155 A | 3/2000 | Thomlinson | |
| 6,088,804 A | 7/2000 | Hill | |
| 6,092,194 A | 7/2000 | Touboul | |
| 6,094,731 A | 7/2000 | Waldin | |
| 6,149,522 A | 11/2000 | Alcorn | |
| 6,154,844 A | 11/2000 | Touboul | |
| 6,195,587 B1 | 2/2001 | Hruska | |
| 6,272,641 B1 | 8/2001 | Ji | |
| 6,321,338 B1 | 11/2001 | Porras | |
| 6,327,579 B1 | 12/2001 | Crawford | |
| 6,412,071 B1 | 6/2002 | Hollander | |
| 6,460,060 B1 | 10/2002 | Maddalazzo | |
| 6,507,671 B1 * | 1/2003 | Kagan | G06V 30/155 |
| | | | 382/172 |
| 6,578,094 B1 | 6/2003 | Moudgill | |
| 6,594,686 B1 | 7/2003 | Edwards | |
| 6,658,571 B1 | 12/2003 | O'Brien | |
| 6,663,000 B1 | 12/2003 | Muttik | |
| 6,704,874 B1 | 3/2004 | Porras | |
| 6,721,721 B1 | 4/2004 | Bates | |
| 6,728,886 B1 | 4/2004 | Ji | |
| 6,735,703 B1 | 5/2004 | Kilpatrick | |
| 6,742,123 B1 | 5/2004 | Foote | |
| 6,742,128 B1 | 5/2004 | Joiner | |
| 6,772,346 B1 | 8/2004 | Chess | |
| 6,772,363 B2 | 8/2004 | Pedone | |
| 6,775,780 B1 | 8/2004 | Muttik | |
| 6,785,732 B1 | 8/2004 | Bates | |
| 6,842,861 B1 | 1/2005 | Cox | |
| 6,873,988 B2 | 3/2005 | Herrmann | |
| 6,880,110 B2 | 4/2005 | Largman | |
| 6,886,099 B1 | 4/2005 | Smithson | |
| 6,889,167 B2 | 5/2005 | Curry | |
| 6,928,550 B1 | 8/2005 | Le Pennec | |
| 6,944,772 B2 | 9/2005 | Dozortsev | |
| 6,839,850 B1 | 10/2005 | Campbell | |
| 6,966,059 B1 | 11/2005 | Shetty | |
| 6,971,019 B1 | 11/2005 | Nachenberg | |
| 6,973,577 B1 | 12/2005 | Kouznetsov | |
| 6,983,377 B1 | 1/2006 | Beesley | |
| 7,024,694 B1 | 4/2006 | Ko | |
| 7,043,757 B2 | 5/2006 | Hoefelmeyer | |
| 7,055,008 B2 | 5/2006 | Niles | |
| 7,055,148 B2 | 5/2006 | Marsh | |
| 7,069,480 B1 | 5/2006 | Lovy | |
| 7,062,553 B2 | 6/2006 | Liang | |
| 7,080,000 B1 | 6/2006 | Cambridge | |
| 7,089,428 B2 | 8/2006 | Farley | |
| 7,093,239 B1 | 8/2006 | van der Made | |
| 7,093,292 B1 | 8/2006 | Pantuso | |
| 7,096,215 B2 | 8/2006 | Bates | |
| 7,096,500 B2 | 8/2006 | Roberts | |
| 7,099,853 B1 | 8/2006 | Liu | |
| 7,107,618 B1 | 9/2006 | Gordon | |
| 7,134,141 B2 | 11/2006 | Crosbie | |
| 7,152,164 B1 | 12/2006 | Loukas | |
| 7,152,242 B2 | 12/2006 | Douglas | |
| 7,174,566 B2 | 2/2007 | Yadav | |
| 7,178,165 B2 | 2/2007 | Abrams | |
| 7,188,369 B2 | 3/2007 | Ho | |
| 7,203,960 B1 | 4/2007 | Painter | |
| 7,203,962 B1 | 4/2007 | Moran | |
| 7,210,168 B2 | 4/2007 | Hursey | |
| 7,225,343 B1 | 5/2007 | Honig | |
| 7,228,562 B2 | 5/2007 | Szor | |
| 7,231,667 B2 | 6/2007 | Jordan | |
| 7,237,008 B1 | 6/2007 | Tarbotton | |
| 7,257,841 B2 | 8/2007 | Naitoh | |
| 7,263,616 B1 | 8/2007 | Brackett | |
| 7,269,851 B2 | 9/2007 | Ackroyd | |
| 7,287,278 B2 | 10/2007 | Liang | |
| 7,287,281 B1 | 10/2007 | Szor | |
| 7,290,266 B2 | 10/2007 | Gladstone | |
| 7,290,282 B1 | 10/2007 | Renert | |
| 7,302,706 B1 | 11/2007 | Hicks | |
| 7,308,714 B2 | 12/2007 | Bardsley | |
| 7,310,817 B2 | 12/2007 | Hinchliffe | |
| 7,334,264 B2 | 2/2008 | Takahashi | |
| 7,340,777 B1 | 3/2008 | Szor | |
| 7,345,843 B2 | 3/2008 | Seol | |
| 7,352,280 B1 | 4/2008 | Rockwood | |
| 7,356,736 B2 | 4/2008 | Natvig | |
| 7,356,843 B1 | 4/2008 | Kingsford | |
| 7,370,361 B2 | 5/2008 | de los Santos | |
| 7,373,664 B2 | 5/2008 | Kissel | |
| 7,373,667 B1 | 5/2008 | Millard | |
| 7,376,970 B2 | 5/2008 | Marinescu | |
| 7,386,886 B1 | 6/2008 | Abrams | |
| 7,392,543 B2 | 6/2008 | Szor | |
| 7,398,399 B2 | 7/2008 | Palliyil | |
| 7,398,553 B1 | 7/2008 | Li | |
| 7,401,359 B2 | 7/2008 | Gartside | |
| 7,406,454 B1 | 7/2008 | Liu | |
| 7,406,603 B1 | 7/2008 | MacKay | |
| 7,415,726 B2 | 8/2008 | Kelly | |
| 7,418,729 B2 | 8/2008 | Szor | |
| 7,424,609 B2 | 9/2008 | Kwan | |
| 7,426,574 B2 | 9/2008 | Liao | |
| 7,434,260 B2 | 10/2008 | Hong | |
| 7,434,261 B2 | 10/2008 | Costea | |
| 7,448,084 B1 | 11/2008 | Apap | |
| 7,448,085 B1 | 11/2008 | Reyes | |
| 7,450,005 B2 | 11/2008 | Anand | |
| 7,461,339 B2 | 12/2008 | Liao | |
| 7,472,288 B1 | 12/2008 | Chou | |
| 7,475,135 B2 | 1/2009 | Bantz | |
| 7,478,431 B1 | 1/2009 | Nachenberg | |
| 7,487,543 B2 | 2/2009 | Arnold | |
| 7,496,960 B1 | 2/2009 | Chen | |
| 7,509,676 B2 | 3/2009 | Trueba | |
| 7,509,677 B2 | 3/2009 | Saurabh | |
| 7,509,680 B1 | 3/2009 | Sallam | |
| 7,512,808 B2 | 3/2009 | Liang | |
| 7,516,317 B2 | 4/2009 | Diwan | |
| 7,516,476 B1 | 4/2009 | Kraemer | |

(56) References Cited

U.S. PATENT DOCUMENTS

| | | |
|---|---|---|
| 7,519,998 B2 | 4/2009 | Cai |
| 7,523,493 B2 | 4/2009 | Liang |
| 7,523,501 B2 | 4/2009 | Liang |
| 7,536,456 B2 | 5/2009 | Williams |
| 7,621,613 B2 | 5/2009 | McClintock |
| 7,549,055 B2 | 6/2009 | Zimmer |
| 7,555,777 B2 | 6/2009 | Swimmer |
| 7,558,796 B1 | 7/2009 | Bromwich |
| 7,565,550 B2 | 7/2009 | Liang |
| 7,568,233 B1 | 7/2009 | Szor |
| 7,571,482 B2 | 8/2009 | Polyakov |
| 7,574,741 B2 | 8/2009 | Aviani |
| 7,577,721 B1 | 8/2009 | Chen |
| 7,587,724 B2 | 9/2009 | Yeap |
| 7,590,813 B1 | 9/2009 | Szor |
| 7,591,018 B1 | 9/2009 | Lee |
| 7,594,111 B2 | 9/2009 | Kiriansky |
| 7,594,267 B2 | 9/2009 | Gladstone |
| 7,594,272 B1 | 9/2009 | Kennedy |
| 7,603,440 B1 | 10/2009 | Grabowski |
| 7,603,711 B2 | 10/2009 | Scheidell |
| 7,624,444 B2 | 11/2009 | Gupta |
| 7,624,448 B2 | 11/2009 | Coffman |
| 7,613,930 B2 | 12/2009 | Dotan |
| 7,627,758 B1 | 12/2009 | Tock |
| 7,627,898 B2 | 12/2009 | Beck |
| 7,634,521 B1 | 12/2009 | Spertus |
| 7,634,806 B2 | 12/2009 | Zinda |
| 7,636,716 B1 | 12/2009 | Cheng |
| 7,636,946 B2 | 12/2009 | Verma |
| 7,640,434 B2 | 12/2009 | Lee |
| 7,647,636 B2 | 1/2010 | Polyakov |
| 7,653,941 B2 | 1/2010 | Gleichauf |
| 7,657,838 B2 | 2/2010 | Daniell |
| 7,660,999 B2 | 2/2010 | Kudallur |
| 7,664,626 B1 | 2/2010 | Ferrie |
| 7,664,984 B2 | 2/2010 | Wang |
| 7,665,123 B1 | 2/2010 | Szor |
| 7,665,138 B2 | 2/2010 | Song |
| 7,673,341 B2 | 3/2010 | Kramer |
| 7,681,226 B2 | 3/2010 | Kraemer |
| 7,689,531 B1 | 3/2010 | Diao |
| 7,689,984 B2 | 3/2010 | Riley |
| 7,690,038 B1 | 3/2010 | Ko |
| 7,694,150 B1 | 4/2010 | Kirby |
| 7,702,907 B2 | 4/2010 | Vaha-Sipila |
| 7,707,635 B1 | 4/2010 | Kuo |
| 7,707,636 B2 | 4/2010 | Catanzano |
| 7,711,673 B1 | 5/2010 | Diao |
| 7,739,741 B2 | 5/2010 | Saffre |
| 7,730,481 B2 | 6/2010 | Chou |
| 7,734,790 B1 | 6/2010 | Chen |
| 7,735,138 B2 | 6/2010 | Zhao |
| 7,739,738 B1 | 6/2010 | Sobel |
| 7,739,739 B2 | 6/2010 | Dettinger |
| 7,743,419 B1 | 6/2010 | Mashevsky |
| 7,748,038 B2 | 6/2010 | Oliver |
| 7,756,535 B1 | 7/2010 | Diao |
| 7,756,834 B2 | 7/2010 | Masters |
| 7,765,589 B2 | 7/2010 | Keochane |
| 7,765,592 B2 | 7/2010 | Wang |
| 7,774,824 B2 | 8/2010 | Ross |
| 7,774,845 B2 | 8/2010 | Shipman |
| 7,778,999 B1 | 8/2010 | Boisjolie |
| 7,779,119 B2 | 8/2010 | Ginter |
| 7,779,470 B2 | 8/2010 | Keochane |
| 7,779,472 B1 | 8/2010 | Lou |
| 7,784,098 B1 | 8/2010 | Fan |
| 7,793,091 B2 | 9/2010 | Weikel |
| 7,802,301 B1 | 9/2010 | Dreyer |
| 7,809,796 B1 | 10/2010 | Bloch |
| 7,818,800 B1 | 10/2010 | Lemley |
| 7,822,818 B2 | 10/2010 | Desouza |
| 7,836,133 B2 | 11/2010 | Quinlan |
| 7,840,763 B2 | 11/2010 | Murotake |
| 7,840,958 B1 | 11/2010 | Wan |
| 7,841,006 B2 | 11/2010 | Gassoway |
| 7,845,009 B2 | 11/2010 | Grobman |
| 7,854,006 B1 | 12/2010 | Andruss |
| 7,856,538 B2 | 12/2010 | Speirs |
| 7,856,573 B2 | 12/2010 | Ingram |
| 7,861,303 B2 | 12/2010 | Kouznetsov |
| 7,865,956 B1 | 1/2011 | Cambridge |
| 7,874,001 B2 | 1/2011 | Beck |
| 7,877,801 B2 | 1/2011 | Repasi |
| 7,877,809 B1 | 1/2011 | Sutton |
| 7,890,619 B2 | 2/2011 | Morota |
| 7,899,849 B2 | 3/2011 | Chaudhry |
| 7,899,901 B1 | 3/2011 | Njemanze |
| 7,900,194 B1 | 3/2011 | Mankins |
| 7,913,303 B1 | 3/2011 | Rouland |
| 7,926,106 B1 | 4/2011 | Kennedy |
| 7,930,746 B1 | 4/2011 | Sheleheda |
| 7,934,103 B2 | 4/2011 | Kidron |
| 7,937,758 B2 | 5/2011 | Kronenberg |
| 7,941,659 B2 | 5/2011 | Lam |
| 7,945,957 B2 | 5/2011 | Dettinger |
| 7,949,771 B1 | 5/2011 | Chen |
| 7,966,650 B2 | 6/2011 | Manring |
| 7,971,255 B1 | 6/2011 | Kc |
| 7,996,905 B2 | 6/2011 | Arnold |
| 7,975,260 B1 | 7/2011 | Conover |
| 7,975,302 B2 | 7/2011 | Armingaud |
| 7,979,889 B2 | 7/2011 | Gladstone |
| 7,984,503 B2 | 7/2011 | Edwards |
| 7,992,156 B1 | 8/2011 | Wang |
| 7,996,374 B1 | 8/2011 | Jones |
| 7,996,637 B2 | 8/2011 | Inoue |
| 7,996,902 B1 | 8/2011 | Gordon |
| 8,009,928 B1 * | 8/2011 | Manmatha ......... G06V 30/153 382/173 |
| 8,015,174 B2 | 9/2011 | Hubbard |
| 8,023,974 B1 | 9/2011 | Diao |
| 8,024,807 B2 | 9/2011 | Hall |
| 8,028,326 B2 | 9/2011 | Palmer |
| 8,028,336 B2 | 9/2011 | Schuba |
| 8,037,290 B1 | 10/2011 | Stutton |
| 8,042,102 B2 | 10/2011 | DeWitt |
| 8,042,186 B2 | 10/2011 | Polyakov |
| 8,051,487 B2 | 11/2011 | Huang |
| 8,056,136 B1 | 11/2011 | Zaitsev |
| 8,069,213 B2 | 11/2011 | Bloch |
| 8,074,287 B2 | 12/2011 | Barde |
| 8,087,087 B1 | 12/2011 | van Oorschot |
| 8,090,816 B1 | 1/2012 | Deshmukh |
| 8,108,332 B2 | 1/2012 | Misra |
| 8,117,433 B2 | 2/2012 | McIntosh |
| 8,117,659 B2 | 2/2012 | Hartrell |
| 8,140,664 B2 | 3/2012 | Huang |
| 8,145,904 B2 | 3/2012 | Cavanaugh |
| 8,161,548 B1 | 4/2012 | Wan |
| 8,161,552 B1 | 4/2012 | Sun |
| 8,171,552 B1 | 5/2012 | Chang |
| 8,176,527 B1 | 5/2012 | Njemanze |
| 8,181,244 B2 | 5/2012 | Boney |
| 8,190,868 B2 | 5/2012 | Schneider |
| 8,191,139 B2 | 5/2012 | Heimerdinger |
| 8,201,243 B2 | 6/2012 | Boney |
| 8,205,261 B1 | 6/2012 | Andruss |
| 8,220,050 B2 | 7/2012 | Sarathy |
| 8,225,407 B1 | 7/2012 | Thrower |
| 8,230,506 B1 | 7/2012 | Forristal |
| 8,234,687 B2 | 7/2012 | Baumhof |
| 8,234,710 B2 | 7/2012 | Wenzinger |
| 8,230,499 B1 | 8/2012 | Pereira |
| 8,239,668 B1 | 8/2012 | Chen |
| 8,239,947 B1 | 8/2012 | Glick |
| 8,261,347 B2 | 9/2012 | Hrabik |
| 8,266,698 B1 | 9/2012 | Seshardi |
| 8,272,058 B2 | 9/2012 | Brennan |
| 8,286,239 B1 | 10/2012 | Sutton |
| 8,291,381 B2 | 10/2012 | Lai |
| 8,291,498 B1 | 10/2012 | Liang |
| 8,312,545 B2 | 11/2012 | Tuvell |

(56) References Cited

U.S. PATENT DOCUMENTS

| | | |
|---|---|---|
| 8,321,910 B1 | 11/2012 | English |
| 8,327,446 B2 | 12/2012 | Liang |
| 8,332,946 B1 | 12/2012 | Boisjolie |
| 8,341,649 B2 | 12/2012 | Freericks |
| 8,365,286 B2 | 1/2013 | Poston |
| 8,370,938 B1 | 2/2013 | Daswani |
| 8,375,450 B1 | 2/2013 | Oliver |
| 8,387,146 B2 | 2/2013 | Parish |
| 8,412,779 B1 | 4/2013 | Qian |
| 8,418,249 B1 | 4/2013 | Nucci |
| 8,418,250 B2 | 4/2013 | Morris |
| 8,429,180 B1 | 4/2013 | Sobel |
| 8,429,746 B2 | 4/2013 | Capalik |
| 8,438,386 B2 | 5/2013 | Hegli |
| 8,443,449 B1 | 5/2013 | Fan |
| 8,458,797 B1 | 6/2013 | Yu |
| 8,464,318 B1 | 6/2013 | Hallak |
| 8,468,602 B2 | 6/2013 | McDougal |
| 8,484,732 B1 | 7/2013 | Chen |
| 8,490,183 B2 | 7/2013 | Kondo |
| 8,495,144 B1 | 7/2013 | Cheng |
| 8,495,743 B2 | 7/2013 | Kraemer |
| 8,505,094 B1 | 8/2013 | Xuewen |
| 8,510,596 B1 | 8/2013 | Gupta |
| 8,516,583 B2 | 8/2013 | Thomas |
| 8,533,831 B2 | 9/2013 | Satish |
| 8,533,837 B2 | 9/2013 | Cavanaugh |
| 8,549,581 B1 | 10/2013 | Kailash |
| 8,554,907 B1 | 10/2013 | Chen |
| 8,560,466 B2 | 10/2013 | Diao |
| 8,561,182 B2 | 10/2013 | Lee |
| 8,561,190 B2 | 10/2013 | Marinescu |
| 8,572,729 B1 | 10/2013 | Lowe |
| 8,578,497 B2 | 11/2013 | Antonakakis |
| 8,584,240 B1 | 11/2013 | Yang |
| 8,584,241 B1 | 11/2013 | Jenks |
| 8,601,581 B2 | 12/2013 | Wenzinger |
| 8,607,066 B1 | 12/2013 | Kailash |
| 8,619,971 B2 | 12/2013 | Kurien |
| 8,627,458 B2 | 1/2014 | Muttik |
| 8,635,669 B2 | 1/2014 | Iftode |
| 8,645,340 B2 | 2/2014 | Kester |
| 8,646,038 B2 | 2/2014 | Blumfield |
| 8,650,648 B2 | 2/2014 | Howard |
| 8,656,488 B2 | 2/2014 | Liang |
| 8,656,493 B2 | 2/2014 | Capalik |
| 8,661,062 B1 | 2/2014 | Jamail |
| 8,661,541 B2 | 2/2014 | Beck |
| 8,667,590 B1 | 3/2014 | Lee |
| 8,683,031 B2 | 3/2014 | Green |
| 8,688,797 B2 | 4/2014 | Hesselink |
| 8,709,924 B2 | 4/2014 | Hanawa |
| 8,719,924 B1 | 5/2014 | Williamson |
| 8,719,932 B2 | 5/2014 | Boney |
| 8,719,939 B2 | 5/2014 | Krasser |
| 8,726,389 B2 | 5/2014 | Morris |
| 8,732,824 B2 | 5/2014 | Arbaugh |
| 8,763,123 B2 | 6/2014 | Morris |
| 8,781,229 B2 * | 7/2014 | Saund ................ G06V 10/243 382/173 |
| 8,789,189 B2 | 7/2014 | Capalik |
| 8,793,798 B2 | 7/2014 | Fossen |
| 8,799,190 B2 | 8/2014 | Stokes |
| 8,826,439 B1 | 9/2014 | Hu |
| 8,838,992 B1 | 9/2014 | Zhu |
| 8,839,417 B1 | 9/2014 | Jordan |
| 8,839,422 B2 | 9/2014 | Ghosh |
| 8,850,570 B1 | 9/2014 | Ramzan |
| 8,856,473 B2 | 10/2014 | van Riel |
| 8,856,505 B2 | 10/2014 | Schneider |
| 8,869,139 B2 | 10/2014 | Le |
| 8,875,289 B2 | 10/2014 | Mahaffey |
| 8,881,283 B2 | 11/2014 | Tuvell |
| 8,885,928 B2 | 11/2014 | Forman |
| 8,885,938 B2 | 11/2014 | Hong |
| 8,925,101 B2 | 12/2014 | Bhargava |
| 8,935,788 B1 | 1/2015 | Diao |
| 8,935,792 B1 | 1/2015 | Spurlock |
| 8,943,592 B1 | 1/2015 | Mirski |
| 8,955,104 B2 | 2/2015 | Arbaugh |
| 8,955,133 B2 | 2/2015 | Kumar |
| 8,955,134 B2 | 2/2015 | Hartrell |
| 9,021,589 B2 | 4/2015 | Anderson |
| 9,043,894 B1 | 5/2015 | Dennison |
| 9,043,903 B2 | 5/2015 | Diehl |
| 9,104,871 B2 | 8/2015 | Tuvell |
| 9,117,075 B1 | 8/2015 | Yeh |
| 9,129,110 B1 | 9/2015 | Mason |
| 9,129,111 B2 | 9/2015 | Rothwell |
| 9,152,789 B2 | 10/2015 | Natarajan |
| 9,171,157 B2 | 10/2015 | Flores |
| 9,177,153 B1 | 11/2015 | Perrig |
| 9,189,750 B1 | 11/2015 | Narsky |
| 9,208,323 B1 | 12/2015 | Karta |
| 9,213,836 B2 | 12/2015 | Mayer |
| 9,235,757 B1 * | 1/2016 | Liu ................ G06V 20/62 |
| 9,245,120 B2 | 1/2016 | Friedrichs |
| 9,251,373 B2 | 2/2016 | AlHarbi |
| 9,286,182 B2 | 3/2016 | Fries |
| 9,292,881 B2 | 3/2016 | Alperovitch |
| 9,306,966 B2 | 4/2016 | Eskin |
| 9,306,971 B2 | 4/2016 | Altman |
| 9,319,385 B2 | 4/2016 | Iwanski |
| 9,324,034 B2 | 4/2016 | Gupta |
| 9,330,257 B2 | 5/2016 | Valencia |
| 9,336,390 B2 | 5/2016 | Pavlyushchik |
| 9,349,103 B2 | 5/2016 | Eberhardt |
| 9,398,034 B2 | 7/2016 | Ronen |
| 9,400,886 B1 | 7/2016 | Beloussov |
| 9,411,953 B1 | 8/2016 | Kane |
| 9,413,721 B2 | 8/2016 | Morris |
| 9,424,430 B2 | 8/2016 | Rosenan |
| 9,465,936 B2 | 10/2016 | Tosa |
| 9,465,940 B1 | 10/2016 | Wojnowicz |
| 9,489,514 B2 | 11/2016 | Mankin |
| 9,497,204 B2 | 11/2016 | Symons |
| 9,516,039 B1 | 12/2016 | Yen |
| 9,516,057 B2 | 12/2016 | Aziz |
| 9,578,045 B2 | 2/2017 | Jaroch |
| 9,602,538 B1 | 3/2017 | Chou |
| 9,654,495 B2 | 5/2017 | Hubbard |
| 9,672,355 B2 | 6/2017 | Titonis |
| 9,710,647 B2 | 7/2017 | Zimmer |
| 9,721,212 B2 | 8/2017 | Gupta |
| 9,734,125 B2 | 8/2017 | Baldry |
| 9,781,151 B1 | 10/2017 | McCorkendale |
| 9,832,211 B2 | 11/2017 | Hsiao |
| 9,853,997 B2 | 12/2017 | Canzanese |
| 9,866,584 B2 | 1/2018 | Capalik |
| 9,904,784 B2 | 2/2018 | Diehl |
| 9,940,459 B1 | 4/2018 | Saxe |
| 9,954,872 B2 | 4/2018 | Capalik |
| 10,025,928 B2 | 7/2018 | Jaroch |
| 10,043,008 B2 | 8/2018 | Costea |
| 10,169,579 B1 | 1/2019 | Xu |
| 10,182,061 B2 | 1/2019 | Balasubramanian |
| 10,257,224 B2 | 4/2019 | Jaroch |
| 10,262,136 B1 | 4/2019 | Kailash |
| 10,268,820 B2 | 4/2019 | Okano |
| 10,277,617 B2 | 4/2019 | Yang |
| 10,284,591 B2 | 5/2019 | Giuliani |
| 10,395,032 B2 | 8/2019 | Keller |
| 10,395,133 B1 * | 8/2019 | Flament ................ G06V 30/148 |
| 10,599,844 B2 | 3/2020 | Schmidtler |
| 10,606,933 B2 * | 3/2020 | Breuel ................ G06F 40/131 |
| 10,649,970 B1 | 5/2020 | Saxe |
| 10,666,676 B1 | 5/2020 | Hsu |
| 10,679,091 B2 * | 6/2020 | Flament ................ G06V 30/224 |
| 10,783,254 B2 | 9/2020 | Sharma |
| 11,409,869 B2 | 8/2022 | Schmidtler |
| 11,443,504 B2 * | 9/2022 | Flament ................ G06V 30/148 |
| 2001/0005889 A1 | 6/2001 | Albrecht |
| 2001/0052014 A1 | 12/2001 | Sheymov |
| 2002/0078381 A1 | 6/2002 | Farley |

(56) References Cited

U.S. PATENT DOCUMENTS

| | | |
|---|---|---|
| 2002/0099952 A1 | 7/2002 | Lambert |
| 2002/0106128 A1* | 8/2002 | Zlotnick ............ G06V 30/1444 382/224 |
| 2002/0147923 A1 | 10/2002 | Dotan |
| 2002/0178374 A1 | 11/2002 | Swimmer |
| 2002/0194490 A1 | 12/2002 | Halperin |
| 2002/0199116 A1 | 12/2002 | Hoene |
| 2003/0046582 A1 | 3/2003 | Black |
| 2003/0065926 A1 | 4/2003 | Schultz |
| 2003/0084323 A1 | 5/2003 | Gales |
| 2003/0084349 A1 | 5/2003 | Friedrichs |
| 2003/0101381 A1 | 5/2003 | Mateev |
| 2003/0115479 A1 | 6/2003 | Edwards |
| 2003/0120935 A1 | 6/2003 | Teal |
| 2003/0135791 A1 | 6/2003 | Natvig |
| 2003/0131256 A1 | 7/2003 | Ackroyd |
| 2003/0172166 A1 | 9/2003 | Judge |
| 2003/0177394 A1 | 9/2003 | Dorzortsev |
| 2003/0188196 A1 | 10/2003 | Choi |
| 2004/0006704 A1 | 1/2004 | Dahlstrom |
| 2004/0030913 A1 | 2/2004 | Liang |
| 2004/0034800 A1 | 2/2004 | Singhal |
| 2004/0039968 A1 | 2/2004 | Hatonen |
| 2004/0064736 A1 | 4/2004 | Obrecht |
| 2004/0068652 A1 | 4/2004 | Carpentier |
| 2004/0073810 A1 | 4/2004 | Dettinger |
| 2004/0078580 A1 | 4/2004 | Hsu |
| 2004/0083384 A1 | 4/2004 | Hypponen |
| 2004/0083408 A1 | 4/2004 | Spiegel |
| 2004/0024864 A1 | 5/2004 | Porras |
| 2004/0111632 A1 | 6/2004 | Halperin |
| 2004/0123145 A1 | 6/2004 | Baffes |
| 2004/0128530 A1 | 7/2004 | Isenberg |
| 2004/0143749 A1 | 7/2004 | Tajalli |
| 2004/0143753 A1 | 7/2004 | Hernacki |
| 2004/0153644 A1 | 8/2004 | McCorkendale |
| 2004/0158729 A1 | 8/2004 | Szor |
| 2004/0172551 A1 | 9/2004 | Fielding |
| 2004/0172557 A1 | 9/2004 | Nakae |
| 2004/0199827 A1 | 10/2004 | Muttik |
| 2004/0205419 A1 | 10/2004 | Liang |
| 2004/0225877 A1 | 11/2004 | Huang |
| 2004/0236960 A1 | 11/2004 | Zimmer |
| 2004/0243829 A1 | 12/2004 | Jordan |
| 2004/0244160 A1 | 12/2004 | Nessel |
| 2004/0255160 A1 | 12/2004 | Stamos |
| 2005/0005160 A1 | 1/2005 | Bates |
| 2005/0021994 A1 | 1/2005 | Barton |
| 2005/0038818 A1 | 2/2005 | Hooks |
| 2005/0044406 A1 | 2/2005 | Stute |
| 2005/0050336 A1 | 3/2005 | Liang |
| 2005/0050337 A1 | 3/2005 | Liang |
| 2005/0050378 A1 | 3/2005 | Liang |
| 2005/0055559 A1 | 3/2005 | Bucher |
| 2005/0091494 A1 | 4/2005 | Hyser |
| 2005/0108562 A1 | 5/2005 | Khazan |
| 2005/0114687 A1 | 5/2005 | Zimmer |
| 2005/0125687 A1 | 6/2005 | Townsend |
| 2005/0132205 A1 | 6/2005 | Palliyil |
| 2005/0138427 A1 | 6/2005 | Crommer |
| 2005/0210035 A1 | 9/2005 | Kester |
| 2005/0216759 A1 | 9/2005 | Rothman |
| 2005/0223001 A1 | 10/2005 | Kester |
| 2005/0229250 A1 | 10/2005 | Ring |
| 2005/0246776 A1 | 11/2005 | Chawro |
| 2005/0251860 A1 | 11/2005 | Saurabh |
| 2005/0262560 A1 | 11/2005 | Gassoway |
| 2005/0268079 A1 | 12/2005 | Rothman |
| 2005/0268112 A1 | 12/2005 | Wang |
| 2005/0283640 A1 | 12/2005 | Cheston |
| 2006/0017557 A1 | 1/2006 | Chung |
| 2006/0026675 A1 | 2/2006 | Cai |
| 2006/0031673 A1 | 2/2006 | Beck |
| 2006/0037079 A1 | 2/2006 | Midgley |
| 2006/0037080 A1 | 2/2006 | Maloof |
| 2006/0070128 A1 | 3/2006 | Heimerdinger |
| 2006/0070130 A1 | 3/2006 | Costea |
| 2006/0075468 A1 | 4/2006 | Boney |
| 2006/0075490 A1 | 4/2006 | Boney |
| 2006/0075502 A1 | 4/2006 | Edwards |
| 2006/0075504 A1 | 4/2006 | Liu |
| 2006/0085857 A1 | 4/2006 | Omote |
| 2006/0095964 A1 | 5/2006 | Costea |
| 2006/0095970 A1 | 5/2006 | Rajagopal |
| 2006/0101520 A1 | 5/2006 | Schumaker |
| 2006/0130141 A1 | 6/2006 | Kramer |
| 2006/0130144 A1 | 6/2006 | Wernicke |
| 2006/0150256 A1 | 7/2006 | Fanton |
| 2006/0156397 A1 | 7/2006 | Dai |
| 2006/0174319 A1 | 8/2006 | Kraemer |
| 2006/0179484 A1 | 8/2006 | Scrimsher |
| 2006/0206937 A1 | 9/2006 | Repasi |
| 2006/0224930 A1 | 10/2006 | Bantz |
| 2006/0230289 A1 | 10/2006 | Fox |
| 2006/0230452 A1 | 10/2006 | Field |
| 2006/0236392 A1 | 10/2006 | Thomas |
| 2006/0253584 A1 | 11/2006 | Dixon |
| 2006/0259819 A1 | 11/2006 | Connor |
| 2006/0259967 A1 | 11/2006 | Thomas |
| 2006/0265746 A1 | 11/2006 | Farley |
| 2006/0288342 A1 | 12/2006 | Hatlelid |
| 2006/0293777 A1 | 12/2006 | Breitgand |
| 2007/0006304 A1 | 1/2007 | Kramer |
| 2007/0006310 A1 | 1/2007 | Piccard |
| 2007/0006311 A1 | 1/2007 | Barton |
| 2007/0016914 A1 | 1/2007 | Yeap |
| 2007/0016951 A1 | 1/2007 | Piccard |
| 2007/0016953 A1 | 1/2007 | Morris |
| 2007/0022315 A1 | 1/2007 | Comegys |
| 2007/0028292 A1 | 2/2007 | Kabzinski |
| 2007/0028304 A1 | 2/2007 | Brennan |
| 2007/0036433 A1* | 2/2007 | Teutsch ................ G06V 30/412 382/173 |
| 2007/0041643 A1* | 2/2007 | Akagi .................... G06V 30/15 715/205 |
| 2007/0050846 A1 | 3/2007 | Xie |
| 2007/0067844 A1 | 3/2007 | Williamson |
| 2007/0078915 A1 | 4/2007 | Gassoway |
| 2007/0094725 A1 | 4/2007 | Borders |
| 2007/0118646 A1 | 5/2007 | Gassoway |
| 2007/0130350 A1 | 6/2007 | Alperovitch |
| 2007/0150957 A1 | 6/2007 | Hartrell |
| 2007/0162975 A1 | 7/2007 | Overton |
| 2007/0168694 A1 | 7/2007 | Maddaloni |
| 2007/0174911 A1 | 7/2007 | Kronenberg |
| 2007/0180509 A1 | 8/2007 | Swartz |
| 2007/0239999 A1 | 10/2007 | Honig |
| 2007/0240212 A1 | 10/2007 | Matalytski |
| 2007/0240220 A1 | 10/2007 | Tuvell |
| 2007/0244877 A1 | 10/2007 | Kempka |
| 2007/0245420 A1 | 10/2007 | Yong |
| 2007/0250817 A1 | 10/2007 | Boney |
| 2007/0250927 A1 | 10/2007 | Naik |
| 2007/0271610 A1 | 11/2007 | Grobman |
| 2007/0289019 A1 | 12/2007 | Lowrey |
| 2007/0294768 A1 | 12/2007 | Moskovitch |
| 2008/0005797 A1 | 1/2008 | Field |
| 2008/0010368 A1 | 1/2008 | Hubbard |
| 2008/0016314 A1 | 1/2008 | Li |
| 2008/0016339 A1 | 1/2008 | Shukla |
| 2008/0016570 A1 | 1/2008 | Capalik |
| 2008/0028100 A1 | 1/2008 | Adelman |
| 2008/0052468 A1 | 2/2008 | Speirs |
| 2008/0082662 A1 | 4/2008 | Dandliker |
| 2008/0086773 A1 | 4/2008 | Tuvell |
| 2008/0133812 A1 | 6/2008 | Kaiser |
| 2008/0175266 A1 | 7/2008 | Alperovitch |
| 2008/0184058 A1 | 7/2008 | McDermott |
| 2008/0229419 A1 | 9/2008 | Holostov |
| 2008/0263197 A1 | 10/2008 | Stephens |
| 2008/0271163 A1 | 10/2008 | Stillerman |
| 2008/0319932 A1 | 12/2008 | Yih |
| 2009/0013405 A1 | 1/2009 | Schipka |
| 2009/0044024 A1 | 2/2009 | Oberheide |

(56) References Cited

U.S. PATENT DOCUMENTS

| | | |
|---|---|---|
| 2009/0049550 A1 | 2/2009 | Shevchenko |
| 2009/0070873 A1 | 3/2009 | McAfee |
| 2009/0144826 A2 | 6/2009 | Piccard |
| 2009/0248623 A1 | 10/2009 | Adelman |
| 2009/0254992 A1 | 10/2009 | Schultz |
| 2009/0288167 A1 | 11/2009 | Freericks |
| 2009/0328210 A1 | 12/2009 | Khachaturov |
| 2010/0011200 A1 | 1/2010 | Rosenan |
| 2010/0031361 A1 | 2/2010 | Shukla |
| 2010/0077481 A1 | 3/2010 | Polyakov |
| 2010/0082642 A1 | 4/2010 | Forman |
| 2010/0150448 A1 | 6/2010 | Lecerf |
| 2010/0162395 A1 | 6/2010 | Kennedy |
| 2010/0169972 A1 | 7/2010 | Kuo |
| 2010/0169973 A1 | 7/2010 | Kim |
| 2010/0191734 A1 | 7/2010 | Rajaram |
| 2010/0256977 A1 | 10/2010 | Yu |
| 2010/0293273 A1 | 11/2010 | Basarrate |
| 2011/0041179 A1 | 2/2011 | Stahlberg |
| 2011/0047618 A1 | 2/2011 | Evans |
| 2011/0067101 A1 | 3/2011 | Seshadri |
| 2011/0083180 A1 | 4/2011 | Mashevsky |
| 2011/0116715 A1* | 5/2011 | Wang ............... G06V 30/416 |
| | | 382/177 |
| 2011/0145920 A1 | 6/2011 | Mahaffey |
| 2011/0172504 A1 | 7/2011 | Wegerich |
| 2011/0173699 A1 | 7/2011 | Figlin |
| 2011/0191341 A1 | 8/2011 | Meyer |
| 2011/0225655 A1 | 9/2011 | Niemela |
| 2011/0289586 A1 | 11/2011 | Kc |
| 2011/0321160 A1 | 12/2011 | Mohandas |
| 2011/0321166 A1 | 12/2011 | Capalik |
| 2012/0047579 A1 | 2/2012 | Ishiyama |
| 2012/0047581 A1 | 2/2012 | Banerjee |
| 2012/0151586 A1 | 6/2012 | Hentunen |
| 2012/0155745 A1* | 6/2012 | Park ............... G06V 20/176 |
| | | 382/154 |
| 2012/0159620 A1 | 6/2012 | Seifert |
| 2012/0227105 A1 | 9/2012 | Friedrichs |
| 2012/0255018 A1 | 10/2012 | Sallam |
| 2012/0260340 A1 | 10/2012 | Morris |
| 2012/0304278 A1 | 11/2012 | Murotake |
| 2012/0317644 A1 | 12/2012 | Kumar |
| 2013/0007870 A1 | 1/2013 | Devarajan |
| 2013/0047255 A1 | 2/2013 | Dalcher |
| 2013/0055339 A1 | 2/2013 | Apostolescu |
| 2013/0055399 A1 | 2/2013 | Zaitsev |
| 2013/0067576 A1 | 3/2013 | Niemela |
| 2013/0074143 A1 | 3/2013 | Bu |
| 2013/0091570 A1 | 4/2013 | McCorkendale |
| 2013/0198841 A1 | 8/2013 | Poulson |
| 2013/0227680 A1 | 8/2013 | Pavlyushchik |
| 2013/0247179 A1 | 9/2013 | Chandran |
| 2013/0247190 A1 | 9/2013 | Spurlock |
| 2013/0275981 A1 | 10/2013 | Dalcher |
| 2013/0276110 A1 | 10/2013 | Dalcher |
| 2013/0294697 A1* | 11/2013 | Nepomniachtchi .... G06Q 20/10 |
| | | 382/192 |
| 2013/0298244 A1 | 11/2013 | Kumar |
| 2013/0326625 A1 | 12/2013 | Anderson |
| 2014/0003717 A1* | 1/2014 | Brito ............... G06V 30/412 |
| | | 382/218 |
| 2014/0003721 A1* | 1/2014 | Saund ............... G06V 30/412 |
| | | 715/222 |
| 2014/0029853 A1* | 1/2014 | Xue ............... G06V 30/412 |
| | | 382/182 |
| 2014/0090061 A1 | 3/2014 | Avasarala |
| 2014/0090064 A1 | 3/2014 | Pistoia |
| 2014/0181973 A1 | 6/2014 | Lee |
| 2014/0283037 A1 | 9/2014 | Sikorski |
| 2014/0325650 A1 | 10/2014 | Pavlyushchik |
| 2015/0033341 A1 | 1/2015 | Schmidtler |
| 2015/0036929 A1* | 2/2015 | Dai ............... G06V 30/412 |
| | | 382/187 |
| 2015/0089645 A1 | 3/2015 | Vandergeest |
| 2015/0096024 A1 | 4/2015 | Haq |
| 2015/0106931 A1 | 4/2015 | Mankin |
| 2015/0128263 A1 | 5/2015 | Raugus |
| 2015/0213365 A1 | 7/2015 | Ideses |
| 2015/0213376 A1 | 7/2015 | Ideses |
| 2016/0132738 A1* | 5/2016 | Biegert ............... G06V 30/412 |
| | | 382/182 |
| 2016/0154960 A1 | 6/2016 | Sharma |
| 2016/0277423 A1 | 9/2016 | Apostolescu |
| 2016/0300060 A1 | 10/2016 | Pike |
| 2017/0098074 A1 | 4/2017 | Okano |

FOREIGN PATENT DOCUMENTS

| | | | |
|---|---|---|---|
| CN | 102142068 A | | 8/2011 |
| CN | 102426649 A | * | 4/2012 |
| CN | 103106365 A | | 5/2013 |
| CN | 103473506 A | | 12/2013 |
| CN | 104573685 B | * | 11/2017 |
| EP | 0449242 A2 | | 10/1991 |
| EP | 0543593 A2 | * | 11/1992 |
| EP | 1280040 A2 | | 3/2004 |
| EP | 1280040 A3 | | 3/2004 |
| EP | 1549012 A1 | | 6/2005 |
| EP | 2182458 A1 | | 5/2010 |
| EP | 1335559 B1 | | 2/2012 |
| JP | H0628518 A | * | 2/1994 |
| JP | 2004086241 | | 3/2004 |
| JP | 2004334312 A | | 11/2004 |
| JP | 2005250760 A | | 9/2005 |
| JP | 2012027710 A | | 2/2012 |
| KR | 20100089245 A | | 8/2010 |
| KR | 20110036426 A | | 4/2011 |
| TW | 1252976 B | | 7/2006 |
| WO | WO 1999015966 A1 | | 4/1999 |
| WO | WO 2000073955 A2 | | 12/2000 |
| WO | WO 2001016709 A1 | | 3/2001 |
| WO | WO 2001033359 A1 | | 5/2001 |
| WO | WO 2003017099 A1 | | 8/2001 |
| WO | WO 2001084285 A2 | | 11/2001 |
| WO | WO 2001090892 A1 | | 11/2001 |
| WO | WO 2002033525 A2 | | 4/2002 |
| WO | WO 2003021402 A2 | | 3/2003 |
| WO | WO 2003088017 A2 | | 10/2003 |
| WO | WO 2004097602 A2 | | 11/2004 |
| WO | WO 2005114949 A1 | | 12/2005 |
| WO | WO 2006115533 A2 | | 11/2006 |
| WO | WO 2007015266 A2 | | 2/2007 |
| WO | WO 2007015266 A3 | | 2/2007 |
| WO | WO 2007104988 A1 | | 9/2007 |
| WO | WO 2007120954 A2 | | 10/2007 |
| WO | WO 2008008401 | | 1/2008 |
| WO | WO 2012027588 A1 | | 3/2012 |
| WO | WO 2012084507 A1 | | 6/2012 |
| WO | WO 2012110501 A1 | | 8/2012 |
| WO | WO 2014107439 A2 | | 7/2014 |
| WO | WO 2014122662 A1 | | 8/2014 |

OTHER PUBLICATIONS

Image Thresholding for Optical Character Recognition and Other Applications Requiring Character Image Extraction, J M White et al., IBM J. Res. Develop. vol. 27 No. 4 Jul. 1983, pp. 400-411 (Year: 1983).*

*Crowdstrike, Inc. v. Webroot Inc.*, PTAB Case No. IPR2023-01052, Petition for Inter Partes Review of U.S. Pat. No. 8,201,243, Jun. 23, 2023, 76 pgs.

*Crowdstrike, Inc. v. Webroot Inc.*, PTAB Case No. IPR2023-01052, Exhibit 1001: U.S. Pat. No. 8,201,243, 13 pgs.

*Crowdstrike, Inc. v. Webroot Inc.*, PTAB Case No. IPR2023-01052, Exhibit 1002: File History of U.S. Pat. No. 8,201,243, 423 pgs.

*Crowdstrike, Inc. v. Webroot Inc.*, PTAB Case No. IPR2023-01052, Exhibit 1003: Declaration of Markus Jakobsson, Ph.D., 102 pgs.

*Crowdstrike, Inc. v. Webroot Inc.*, PTAB Case No. IPR2023-01052, Exhibit 1004: U.S. Pat. No. 7,979,889 Gladstone, 23 pgs.

(56) References Cited

OTHER PUBLICATIONS

*Crowdstrike, Inc.* v. *Webroot Inc.*, PTAB Case No. IPR2023-01052, Exhibit 1005: U.S. Pat. No. 6,775,780 Muttik, 8 pgs.
*Crowdstrike, Inc.* v. *Webroot Inc.*, PTAB Case No. IPR2023-01052, Exhibit 1006: U.S. Pat. No. 7,093,292 Pantuso, 12 pgs.
*Crowdstrike, Inc.* v. *Webroot Inc.*, PTAB Case No. IPR2023-01052, Exhibit 1007: U.S. Pat. No. 8,321,910 English, 10 pgs.
*Crowdstrike, Inc.* v. *Webroot Inc.*, PTAB Case No. IPR2023-01052, Exhibit 1008: 22-cv-00241, Dkt. 304, Plaintiffs' Responsive Claim Construction Brief, 70 pgs.
*Crowdstrike, Inc.* v. *Webroot Inc.*, PTAB Case No. IPR2023-01052, Exhibit 1009: 22-cv-00241, Dkt. 263, Opening Claim Construction Brief, 69 pgs.
*Crowdstrike, Inc.* v. *Webroot Inc.*, PTAB Case No. IPR2023-01052, Exhibit 1010: Richard D. Schneeman, Device Driver Development for Microsoft Windows NT: Accessing Motion Control Hardware Using a Multimedia Framework, 1996, 54 pgs.
*Crowdstrike, Inc.* v. *Webroot Inc.*, PTAB Case No. IPR2023-01052, Exhibit 1011: U.S. Patent Appl. Publ. No. 20070174911 Kronenberg, 13 pgs.
*Crowdstrike, Inc.* v. *Webroot Inc.*, PTAB Case No. IPR2023-01052, Exhibit 1012: U.S. Patent Appl. Publ. No. 20060253584 Dixon, 74 pgs.
*Crowdstrike, Inc.* v. *Webroot Inc.*, PTAB Case No. IPR2023-01052, Exhibit 1013: U.S. Pat. No. 7,434,261 Costea, 12 pgs.
*Crowdstrike, Inc.* v. *Webroot Inc.*, PTAB Case No. IPR2023-01052, Exhibit 1014: U.S. Pat. No. 8,117,659 Hartrell, 16 pgs.
*Crowdstrike, Inc.* v. *Webroot Inc.*, PTAB Case No. IPR2023-01052, Exhibit 1015: Sophos Petition for Inter Partes Review of U.S. Pat. No. 8,201,243, 86 pgs.
*Crowdstrike, Inc.* v. *Webroot Inc.*, PTAB Case No. IPR2023-01052, Exhibit 1016: 22-cv-00241, Dkt. 252, Order Granting Fifth Amended Scheduling Order, 9 pgs.
*Crowdstrike, Inc.* v. *Webroot Inc.*, PTAB Case No. IPR2023-01052, Exhibit 1017: 22-cv-00243, Dkt. 350, Order Resetting Markman Hearing, 1 pg.
*Crowdstrike, Inc.* v. *Webroot Inc.*, PTAB Case No. IPR2023-01052, Patent Owner Open Text Inc.'s Mandatory Notices Pursuant to 37 CFR § 42.8(b), Jul. 14, 23, 9 pgs.
*Crowdstrike, Inc.* v. *Webroot Inc.*, PTAB Case No. IPR2023-01158, Petition for Inter Partes Review of U.S. Pat. No. 8,181,244, Jun. 30, 2023, 78 pgs.
*Crowdstrike, Inc.* v. *Webroot Inc.*, PTAB Case No. IPR2023-01158, Exhibit 1001: U.S. Pat. No. 8,181,244, 13 pgs.
*Crowdstrike, Inc.* v. *Webroot Inc.*, PTAB Case No. IPR2023-01158, Exhibit 1002: Excerpts from the Prosecution History of the '244 Patent, 389 pgs.
*Crowdstrike, Inc.* v. *Webroot Inc.*, PTAB Case No. IPR2023-01158, Exhibit 1003: Declaration of Dr. Markus Jakobsson, 107 pgs.
*Crowdstrike, Inc.* v. *Webroot Inc.*, PTAB Case No. IPR2023-01158, Exhibit 1004: U.S. Patent Pub. No. 20070150957 Hartrell, 16 pgs.
*Crowdstrike, Inc.* v. *Webroot Inc.*, PTAB Case No. IPR2023-01158, Exhibit 1005: U.S. Pat. No. 7,784,098 Fan, 28 pgs.
*Crowdstrike, Inc.* v. *Webroot Inc.*, PTAB Case No. IPR2023-01158, Exhibit 1006: U.S. Pat. No. 7,352,280 Rockwood, 24 pgs.
*Crowdstrike, Inc.* v. *Webroot Inc.*, PTAB Case No. IPR2023-01158, Exhibit 1007: U.S. Pat. No. 7,571,482 Polyakov, 14 pgs.
*Crowdstrike, Inc.* v. *Webroot Inc.*, PTAB Case No. IPR2023-01158, Exhibit 1008: U.S. Pat. No. 8,516,583 Thomas, 14 pgs.
*Crowdstrike, Inc.* v. *Webroot Inc.*, PTAB Case No. IPR2023-01158, Exhibit 1009: U.S. Pat. No. 7,549,055 Zimmer, 10 pgs.
*Crowdstrike, Inc.* v. *Webroot Inc.*, PTAB Case No. IPR2023-01158, Exhibit 1010: U.S. District Courts—Median Time Intervals From Filing to Disposition of Civil Cases Terminated, by District and Method of Disposition, During the 12-Month Period Ending Mar. 31, 2023, 95 pgs.
*Crowdstrike, Inc.* v. *Webroot Inc.*, PTAB Case No. IPR2023-01158, Exhibit 1011: Memorandum: Interim Procedure for Discretionary Denials in AIA Post-Grant Proceedings with Parallel District Court Litigation, Jun. 21, 2022, 9 pgs.
*Crowdstrike, Inc.* v. *Webroot Inc.*, PTAB Case No. IPR2023-01158, Exhibit 1012: *Webroot, Inc.* v. *CrowdStrike, Inc.*, Case No. 6:22-cv-00243-ADA1, Docket No. 252, "Order Granting Fifth Amended Scheduling Order" (WDTX Mar. 29, 2023), 9 pgs.
*Crowdstrike, Inc.* v. *Webroot Inc.*, PTAB Case No. IPR2023-01158, Exhibit 1013: *Webroot, Inc.* v. *CrowdStrike, Inc.*, Case No. 6:22-cv-00243- ADA, Docket No. 350, "Order Resetting Markman Hearing" (WDTX Jun. 8, 2023), 1 pg.
*Crowdstrike, Inc.* v. *Webroot Inc.*, PTAB Case No. IPR2023-01158, Exhibit 1014: *Webroot, Inc.* v. *CrowdStrike, Inc.*, Case No. 6:22-cv-00241- ADA, Docket No. 263, "Opening Claim Construction Brief Regarding Patents Plaintiffs Webroot And OpenText Added By Amendment" (WDTX Apr. 12, 2023), 69 pgs.
*Crowdstrike, Inc.* v. *Webroot Inc.*, PTAB Case No. IPR2023-01158, Exhibit 1015: *Webroot, Inc.* v. *CrowdStrike, Inc.*, Case No. 6:22-cv-00243- ADA, Docket No. 304, "Plaintiffs' Responsive Claim Construction Brief Regarding Patents Plaintiffs Added By Amendment" (WDTX May 5, 2023), 70 pgs.
*Crowdstrike, Inc.* v. *Webroot Inc.*, PTAB Case No. IPR2023-01158, Patent Owner Open Text Inc.'s Mandatory Notices Pursuant to 37 CFR § 42.8(b), Jul. 14, 2023, 9 pgs.
*AO Kaspersky Lab* v. *Webroot Inc.*, PTAB Case No. IPR2023-01199, Petition for Inter Partes Review of U.S. Pat. No. 9,578,045 pursuant, 35 U.S.C. §§ 311-319, 37 CFR § 42, Jul. 14, 2023, 88 pgs.
*AO Kaspersky Lab* v. *Webroot Inc.*, PTAB Case No. IPR2023-01199, Exhibit 1001: U.S. Pat. No. 9,578,045 to Jaroch, 30 pgs.
*AO Kaspersky Lab* v. *Webroot Inc.*, PTAB Case No. IPR2023-01199, Exhibit 1002: File History of U.S. Pat. No. 9,578,045, 210 pgs.
*AO Kaspersky Lab* v. *Webroot Inc.*, PTAB Case No. IPR2023-01199, Exhibit 1003: Declaration of Dr. Wenke Lee, 202 pgs.
*AO Kaspersky Lab* v. *Webroot Inc.*, PTAB Case No. IPR2023-01199, Exhibit 1004: U.S. Publication No. 20130298244 Kumar, 52 pgs.
*AO Kaspersky Lab* v. *Webroot Inc.*, PTAB Case No. IPR2023-01199, Exhibit 1005: U.S. Publication No. 20070016953 Morris, 18 pgs.
*AO Kaspersky Lab* v. *Webroot Inc.*, PTAB Case No. IPR2023-01199, Exhibit 1006: U.S. Pat. No. 8,087,087 Van Oorschot, 18 pgs.
*AO Kaspersky Lab* v. *Webroot Inc.*, PTAB Case No. IPR2023-01199, Exhibit 1007: U.S. Patent Pub. No. 20100077481 Polyakov, 19 pgs.
*AO Kaspersky Lab* v. *Webroot Inc.*, PTAB Case No. IPR2023-01199, Exhibit 1008: U.S. Publication No. 20110321166 to Capalik, 29 pgs.
*AO Kaspersky Lab* v. *Webroot Inc.*, PTAB Case No. IPR2023-01199, Exhibit 1009: U.S. Publication No. 20120260340, Morris, 30 pgs.
*AO Kaspersky Lab* v. *Webroot Inc.*, PTAB Case No. IPR2023-01199, Exhibit 1010: U.S. Pat. No. 10,257,224, Jaroch, 31 pgs.
*AO Kaspersky Lab* v. *Webroot Inc.*, PTAB Case No. IPR2023-01199, Exhibit 1011: Scheduling Order (Dkt. 50), No. 6:22-cv-00243-ADA-DTG, (USDC, WD, TX), 18 pgs.
*AO Kaspersky Lab* v. *Webroot Inc.*, PTAB Case No. IPR2023-01199, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1 (Apr. 2009), 12 pgs.
*AO Kaspersky Lab* v. *Webroot Inc.*, PTAB Case No. IPR2023-01199, Exhibit 1013: SANS Institute, Host- vs. Network-Based Intrusion Detection Systems (2000-2005), 11 pgs.
*AO Kaspersky Lab* v. *Webroot Inc.*, PTAB Case No. IPR2023-01199, Exhibit 1014: Securosis LLC, Evolving Endpoint Malware Detection: Dealing with Advanced and Targeted Attacks, Version 1.3 (Jul. 12, 2012), 23 pgs.
*AO Kaspersky Lab* v. *Webroot Inc.*, PTAB Case No. IPR2023-01199, Exhibit 1015: Yanfang Ye, Weiwei Zhuang, Tao Li, Egemen Tas, Umesh Gupta, Shenghuo Zhu, Melih Abdulhayoglu, Combining File Content and File Relations for Cloud Based Malware Detection (Aug. 2011), 9 pgs.
*AO Kaspersky Lab* v. *Webroot Inc.*, PTAB Case No. IPR2023-01199, Exhibit 1016: U.S. Pat. No. 6,944,772 Dozortsev, 10 pgs.

(56) References Cited

OTHER PUBLICATIONS

*AO Kaspersky Lab* v. *Webroot Inc.*, PTAB Case No. IPR2023-01199, Exhibit 1017: U.S. Pat. No. 6,772,346 Chess, 14 pgs.
*AO Kaspersky Lab* v. *Webroot Inc.*, PTAB Case No. IPR2023-01199, Exhibit 1018: WO 2002033525 Chuang, 18 pgs.
*AO Kaspersky Lab* v. *Webroot Inc.*, PTAB Case No. IPR2023-01199, Exhibit 1019: EP 1,549,012 De Spiegeleer, 19 pgs.
*AO Kaspersky Lab* v. *Webroot Inc.*, PTAB Case No. IPR2023-01199, Exhibit 1020: EP 1,280,040 Hinchliffe, 17 pgs.
*AO Kaspersky Lab* v. *Webroot Inc.*, PTAB Case No. IPR2023-01199, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.
*AO Kaspersky Lab* v. *Webroot Inc.*, PTAB Case No. IPR2023-01199, Exhibit 1022: U.S. Patent Publication No. 2004/0143753 to Hernacki, 20 pgs.
*AO Kaspersky Lab* v. *Webroot Inc.*, PTAB Case No. IPR2023-01199, Exhibit 1023: U.S. Patent Publication No. 2011/0083180 to Mashevsky, 16 pgs.
*AO Kaspersky Lab* v. *Webroot Inc.*, PTAB Case No. IPR2023-01199, Exhibit 1024: U.S. Pat. No. 8,429,746 to Capalik, 11 pgs.
*AO Kaspersky Lab* v. *Webroot Inc.*, PTAB Case No. IPR2023-01199, Exhibit 1025: Server Hardware, Software and Architecture by Abeer El Hadi El Zein El Nahas, University of Khartoum, Electrical and Electronics Engineering Dept. (Feb. 2008), 152 pgs.
*AO Kaspersky Lab* v. *Webroot Inc.*, PTAB Case No. IPR2023-01199, Exhibit 1026: Guofei Gu, Phillip Porras, Vinod Yegneswaran, Martin Fong, Wenke Lee, BotHunter: Detecting Malware Infection Through IDS-Driven Dialog Correlation, In Proceedings of The 16th USENIX Security Symposium (Aug. 2007), 16 pgs.
*AO Kaspersky Lab* v. *Webroot Inc.*, PTAB Case No. IPR2023-01199, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference (Dec. 2011), 10 pgs.
*AO Kaspersky Lab* v. *Webroot Inc.*, PTAB Case No. IPR2023-01199, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, (Aug. 2010), 17 pgs.
*AO Kaspersky Lab* v. *Webroot Inc.*, PTAB Case No. IPR2023-01199, Exhibit 1029: Long Lu, Vinod Yegneswaran, Phil Porras, and Wenke Lee, BLADE: An Attack-Agnostic Approach for Preventing Drive-By Malware Infections, In Proceedings of The 17th ACM Conference on Computer and Communications Security (CCS), Chicago, IL (Oct. 2010), 12 pgs.
*AO Kaspersky Lab* v. *Webroot Inc.*, PTAB Case No. IPR2023-01199, Exhibit 1030: Plaintiffs' Markman Opposition Brief (Dkt. 98), 86 pgs.
*AO Kaspersky Lab* v. *Webroot Inc.*, PTAB Case No. IPR2023-01199, Exhibit 1031: Defendants' Markman Opening Brief (Dkt. 86), 84 pgs.
*AO Kaspersky Lab* v. *Webroot Inc.*, PTAB Case No. IPR2023-01199, Exhibit 1032: Declaration of V.S. Subrahmanian, Ph.D., 88 pgs.
*AO Kaspersky Lab* v. *Webroot Inc.*, PTAB Case No. IPR2023-01199, Exhibit 1033: Order Granting Fifth Amended Scheduling Order, ECF No. 252, Mar. 29, 2023, 9 pgs.
*Crowdstrike, Inc.* v. *Webroot Inc.*, PTAB Case No. IPR2023-01050, Petition for Inter Partes Review of U.S. Pat. No. 8,763,123, Jul. 12, 2023, 67 pgs.
*Crowdstrike, Inc.* v. *Webroot Inc.*, PTAB Case No. IPR2023-01050, Exhibit 1001: U.S. Pat. No. 8,763,123, 16 pgs.
*Crowdstrike, Inc.* v. *Webroot Inc.*, PTAB Case No. IPR2023-01050, Exhibit 1002: File History of U.S. Pat. No. 8,763,123, 255 pgs.
*Crowdstrike, Inc.* v. *Webroot Inc.*, PTAB Case No. IPR2023-01050, Exhibit 1003: European File History, 286 pgs.
*Crowdstrike, Inc.* v. *Webroot Inc.*, PTAB Case No. IPR2023-01050, Exhibit 1004: Declaration of Markus Jakobsson, Ph.D., 89 pgs.
*Crowdstrike, Inc.* v. *Webroot Inc.*, PTAB Case No. IPR2023-01050, Exhibit 1005: U.S. Pat. No. 7,269,851 to Ackroyd, 13 pgs.
*Crowdstrike, Inc.* v. *Webroot Inc.*, PTAB Case No. IPR2023-01050, Exhibit 1006: U.S. Patent Publication No. 2004000670, Dahlstrom, 16 pgs.
*Crowdstrike, Inc.* v. *Webroot Inc.*, PTAB Case No. IPR2023-01050, Exhibit 1007: 22-cv-00241, Dkt. 252, Order Granting Fifth Amended Scheduling Order, 9 pgs.
*Crowdstrike, Inc.* v. *Webroot Inc.*, PTAB Case No. IPR2023-01050, Exhibit 1008: 22-cv-00241, Dkt. 304, Plaintiffs' Responsive Claim Construction Brief, 70 pgs.
*Crowdstrike, Inc.* v. *Webroot Inc.*, PTAB Case No. IPR2023-01050, Exhibit 1009: U.S. Pat. No. 6,944,772 to Dozortsev, 10 pgs.
*Crowdstrike, Inc.* v. *Webroot Inc.*, PTAB Case No. IPR2023-01050, Exhibit 1010: EP 1,549,012 to De Spiegeleer, 19 pgs.
*Crowdstrike, Inc.* v. *Webroot Inc.*, PTAB Case No. IPR2023-01050, Exhibit 1011: EP 1,280,040 to Hinchliffe, 17 pgs.
*Crowdstrike, Inc.* v. *Webroot Inc.*, PTAB Case No. IPR2023-01050, Exhibit 1012: WO 2002/033525 to Chuang, 18 pgs.
*Crowdstrike, Inc.* v. *Webroot Inc.*, PTAB Case No. IPR2023-01050, Exhibit 1013: U.S. Patent Publication No. 2004/0073810 to Dettinger, 15 pgs.
*Crowdstrike, Inc.* v. *Webroot Inc.*, PTAB Case No. IPR2023-01050, Exhibit 1014: WO 2003/021402 to Duke, 13 pgs.
*Crowdstrike, Inc.* v. *Webroot Inc.*, PTAB Case No. IPR2023-01050, Exhibit 1015: U.S. Patent Publication No. 20030115479 to Edwards, 10 pgs.
*Crowdstrike, Inc.* v. *Webroot Inc.*, PTAB Case No. IPR2023-01050, Exhibit 1017: U.S. Pat. No. 6,663,000 to Muttik, 12 pgs.
*Crowdstrike, Inc.* v. *Webroot Inc.*, PTAB Case No. IPR2023-01050, Exhibit 1018: PC Broadband Security by Darren Meyer, 3 pgs.
*Crowdstrike, Inc.* v. *Webroot Inc.*, PTAB Case No. IPR2023-01050, Exhibit 1019: Wired to the World Anti-virus Software by Ralph Lee Scott, 1 pg.
U.S. Appl. No. 60/793,475, filed Apr. 21, 2006, Lowrey.
U.S. Appl. No. 60/803,058, filed May 26, 2006, Gutterman.
U.S. Appl. No. 60/830,122, filed Jul. 12, 2006, Just.
Crowdstrike's First Supplemental Preliminary Invalidity Contentions (Patents Asserted by Amendment), *Webroot, Inc. and Open Text, Inc.* v. *Crowdstrike, Inc.*, No. 6:22 CV-00241-ADA-DTG (WD, Texas), Jun. 27, 2023, 90 pgs.
Crowdstrike's Second Supplemental Preliminary Invalidity Contentions, *Webroot, Inc. and Open Text, Inc.* v. *Crowdstrike, Inc.*, No. 6:22 CV-00241-ADA-DTG (WD, Texas), Jul. 14, 2023, 85 pgs.
Defendant Forcepoint LLC's Final Invalidity Contentions, *Webroot, Inc. and Open Text, Inc.* v. *Forcepoint LLC*, CA. No. 6:22-CV-00342-ADA-DTG, W.D. Tex., Nov. 1, 2023, 394 pgs.
Defendant's Final Invalidity Contentions, *Webroot, Inc. and Open Text, Inc.* v. *Trend Micro Inc.*, Case No. 6:22-cv-00239-ADA-DTG, W.D., Tex., Nov. 1, 2023, 168 pgs.
Defendant Sophos Ltd.'s Final Invalidity Contentions, *Webroot, Inc. and Open Text, Inc.* v. *Sophos Ltd.*, Case No. 6:22-cv-00240-ADA-DTG, W.D., Tex., Nov. 1, 2023, 281 pgs.
Defendant Crowdstrike Holdings, Inc.'s Second Supplemental Preliminary Invalidity Contentions, Exhibit 045-A-1, *Webroot, Inc. and Open Text, Inc.* v. *Crowdstrike Holdings, Inc.*, No. 6:22-CV-00241-ADA-DTG (WD, Texas), Jul. 14, 2023, 82 pgs.
Defendant Crowdstrike Holdings, Inc.'s Second Supplemental Preliminary Invalidity Contentions, Exhibit 224-A-1, *Webroot, Inc. and Open Text, Inc.* v. *Crowdstrike Holdings, Inc.*, No. 6:22-CV-00241-ADA-DTG (WD, Texas), Jul. 14, 2023, 118 pgs.
Defendant Forcepoint LLC's Final Invalidity Contentions, Exhibit 243-F-1, *Webroot, Inc. and Open Text, Inc.* v. *Forcepoint LLC*, CA. No. 6:22-CV-00342-ADA-DTG, W.D. Tex., Nov. 1, 2023, 25 pgs.
Defendant Forcepoint LLC's Final Invalidity Contentions, Exhibit 243-F-2, *Webroot, Inc. and Open Text, Inc.* v. *Forcepoint LLC*, CA. No. 6:22-CV-00342-ADA-DTG, W.D. Tex., Nov. 1, 2023, 49 pgs.
Defendant Forcepoint LLC's Final Invalidity Contentions, Exhibit 243-F-3, *Webroot, Inc. and Open Text, Inc.* v. *Forcepoint LLC*, CA. No. 6:22-CV-00342-ADA-DTG, W.D. Tex., Nov. 1, 2023, 36 pgs.

(56) References Cited

OTHER PUBLICATIONS

Defendant Forcepoint LLC's Final Invalidity Contentions, Exhibit 243-F-4, *Webroot, Inc. and Open Text, Inc. v. Forcepoint LLC*, CA. No. 6:22-CV-00342-ADA-DTG, W.D. Tex., Nov. 1, 2023, 31 pgs.
Defendant Forcepoint LLC's Final Invalidity Contentions, Exhibit 243-F-5, *Webroot, Inc. and Open Text, Inc. v. Forcepoint LLC*, CA. No. 6:22-CV-00342-ADA-DTG, W.D. Tex., Nov. 1, 2023, 90 pgs.
Defendant Forcepoint LLC's Final Invalidity Contentions, Exhibit 243-F-6, *Webroot, Inc. and Open Text, Inc. v. Forcepoint LLC*, CA. No. 6:22-CV-00342-ADA-DTG, W.D. Tex., Nov. 1, 2023, 35 pgs.
Defendant Forcepoint LLC's Final Invalidity Contentions, Exhibit 243-F-7, *Webroot, Inc. and Open Text, Inc. v. Forcepoint LLC*, CA. No. 6:22-CV-00342-ADA-DTG, W.D. Tex., Nov. 1, 2023, 73 pgs.
Defendant Forcepoint LLC's Final Invalidity Contentions, Exhibit 243-F-8, *Webroot, Inc. and Open Text, Inc. v. Forcepoint LLC*, CA. No. 6:22-CV-00342-ADA-DTG, W.D. Tex., Nov. 1, 2023, 58 pgs.
Defendant Forcepoint LLC's Final Invalidity Contentions, Exhibit 243-F-9 *Webroot, Inc. and Open Text, Inc. v. Forcepoint LLC*, CA. No. 6:22-CV-00342-ADA-DTG, W.D. Tex., Nov. 1, 2023, 92 pgs.
Defendant Forcepoint LLC's Final Invalidity Contentions, Exhibit 243-F-10, *Webroot, Inc. and Open Text, Inc. v. Forcepoint LLC*, CA. No. 6:22-CV-00342-ADA-DTG, W.D. Tex., Nov. 1, 2023, 52 pgs.
Defendant Forcepoint LLC's Final Invalidity Contentions, Exhibit 243-F-11, *Webroot, Inc. and Open Text, Inc. v. Forcepoint LLC*, CA. No. 6:22-CV-00342-ADA-DTG, W.D. Tex., Nov. 1, 2023, 88 pgs.
Defendant Forcepoint LLC's Final Invalidity Contentions, Exhibit 243-F-12, *Webroot, Inc. and Open Text, Inc. v. Forcepoint LLC*, CA. No. 6:22-CV-00342-ADA-DTG, W.D. Tex., Nov. 1, 2023, 64 pgs.
Defendant Forcepoint LLC's Final Invalidity Contentions, Exhibit 243-F-13, *Webroot, Inc. and Open Text, Inc. v. Forcepoint LLC*, CA. No. 6:22-CV-00342-ADA-DTG, W.D. Tex., Nov. 1, 2023, 53 pgs.
Defendant Forcepoint LLC's Final Invalidity Contentions, Exhibit 243-F-14, *Webroot, Inc. and Open Text, Inc. v. Forcepoint LLC*, CA. No. 6:22-CV-00342-ADA-DTG, W.D. Tex., Nov. 1, 2023, 60 pgs.
Defendant Forcepoint LLC's Final Invalidity Contentions, Exhibit 243-F-15, *Webroot, Inc. and Open Text, Inc. v. Forcepoint LLC*, CA. No. 6:22-CV-00342-ADA-DTG, W.D. Tex., Nov. 1, 2023, 34 pgs.
Defendant Forcepoint LLC's Final Invalidity Contentions, Exhibit 243-F-16, *Webroot, Inc. and Open Text, Inc. v. Forcepoint LLC*, CA. No. 6:22-CV-00342-ADA-DTG, W.D. Tex., Nov. 1, 2023, 53 pgs.
Defendant Forcepoint LLC's Final Invalidity Contentions, Exhibit 243-F-17, *Webroot, Inc. and Open Text, Inc. v. Forcepoint LLC*, CA. No. 6:22-CV-00342-ADA-DTG, W.D. Tex., Nov. 1, 2023, 37 pgs.
Defendant Forcepoint LLC's Final Invalidity Contentions, Exhibit 243-F-18, *Webroot, Inc. and Open Text, Inc. v. Forcepoint LLC*, CA. No. 6:22-CV-00342-ADA-DTG, W.D. Tex., Nov. 1, 2023, 46 pgs.
Defendant Forcepoint LLC's Final Invalidity Contentions, Exhibit 243-F-19, *Webroot, Inc. and Open Text, Inc. v. Forcepoint LLC*, CA. No. 6:22-CV-00342-ADA-DTG, W.D. Tex., Nov. 1, 2023, 46 pgs.
Defendant Forcepoint LLC's Final Invalidity Contentions, Exhibit 243-F-20, *Webroot, Inc. and Open Text, Inc. v. Forcepoint LLC*, CA. No. 6:22-CV-00342-ADA-DTG, W.D. Tex., Nov. 1, 2023, 45 pgs.
Defendant Forcepoint LLC's Final Invalidity Contentions, Exhibit 243-F-21, *Webroot, Inc. and Open Text, Inc. v. Forcepoint LLC*, CA. No. 6:22-CV-00342-ADA-DTG, W.D. Tex., Nov. 1, 2023, 41 pgs.
Defendant Forcepoint LLC's Final Invalidity Contentions, Exhibit 243-F-22, *Webroot, Inc. and Open Text, Inc. v. Forcepoint LLC*, CA. No. 6:22-CV-00342-ADA-DTG, W.D. Tex., Nov. 1, 2023, 52 pgs.
Defendant Forcepoint LLC's Final Invalidity Contentions, Exhibit 243-F-23, *Webroot, Inc. and Open Text, Inc. v. Forcepoint LLC*, CA. No. 6:22-CV-00342-ADA-DTG, W.D. Tex., Nov. 1, 2023, 50 pgs.
Defendant Forcepoint LLC's Final Invalidity Contentions, Exhibit 243-F-24, *Webroot, Inc. and Open Text, Inc. v. Forcepoint LLC*, CA. No. 6:22-CV-00342-ADA-DTG, W.D. Tex., Nov. 1, 2023, 54 pgs.
Defendant Forcepoint LLC's Final Invalidity Contentions, Exhibit 243-F-25, *Webroot, Inc. and Open Text, Inc. v. Forcepoint LLC*, CA. No. 6:22-CV-00342-ADA-DTG, W.D. Tex., Nov. 1, 2023, 107 pgs.
Defendant Forcepoint LLC's Final Invalidity Contentions, Exhibit 243-F-26, *Webroot, Inc. and Open Text, Inc. v. Forcepoint LLC*, CA. No. 6:22-CV-00342-ADA-DTG, W.D. Tex., Nov. 1, 2023, 220 pgs.
Defendant Forcepoint LLC's Final Invalidity Contentions, Exhibit 243-F-27, *Webroot, Inc. and Open Text, Inc. v. Forcepoint LLC*, CA. No. 6:22-CV-00342-ADA-DTG, W.D. Tex., Nov. 1, 2023, 32 pgs.
Defendant Forcepoint LLC's Final Invalidity Contentions, Exhibit 243-F-28, *Webroot, Inc. and Open Text, Inc. v. Forcepoint LLC*, CA. No. 6:22-CV-00342-ADA-DTG, W.D. Tex., Nov. 1, 2023, 29 pgs.
Defendant Forcepoint LLC's Final Invalidity Contentions, Exhibit 932-G-1 *Webroot, Inc. and Open Text, Inc. v. Forcepoint LLC*, CA. No. 6:22-CV-00342-ADA-DTG, W.D. Tex., Nov. 1, 2023, , 26 pgs.
Defendant Forcepoint LLC's Final Invalidity Contentions, Exhibit 932-G-2 *Webroot, Inc. and Open Text, Inc. v. Forcepoint LLC*, CA. No. 6:22-CV-00342-ADA-DTG, W.D. Tex., Nov. 1, 2023, 54 pgs.
Defendant Forcepoint LLC's Final Invalidity Contentions, Exhibit 932-G-3, *Webroot, Inc. and Open Text, Inc. v. Forcepoint LLC*, CA. No. 6:22-CV-00342-ADA-DTG, W.D. Tex., Nov. 1, 2023, 44 pgs.
Defendant Forcepoint LLC's Final Invalidity Contentions, Exhibit 932-G-4, *Webroot, Inc. and Open Text, Inc. v. Forcepoint LLC*, CA. No. 6:22-CV-00342-ADA-DTG, W.D. Tex., Nov. 1, 2023, 33 pgs.
Defendant Forcepoint LLC's Final Invalidity Contentions, Exhibit 932-G-5, *Webroot, Inc. and Open Text, Inc. v. Forcepoint LLC*, CA. No. 6:22-CV-00342-ADA-DTG, W.D. Tex., Nov. 1, 2023, 113 pgs.
Defendant Forcepoint LLC's Final Invalidity Contentions, Exhibit 932-G-6, *Webroot, Inc. and Open Text, Inc. v. Forcepoint LLC*, CA. No. 6:22-CV-00342-ADA-DTG, W.D. Tex., Nov. 1, 2023, 36 pgs.
Defendant Forcepoint LLC's Final Invalidity Contentions, Exhibit 932-G-7, *Webroot, Inc. and Open Text, Inc. v. Forcepoint LLC*, CA. No. 6:22-CV-00342-ADA-DTG, W.D. Tex., Nov. 1, 2023, 87 pgs.
Defendant Forcepoint LLC's Final Invalidity Contentions, Exhibit 932-G-8, *Webroot, Inc. and Open Text, Inc. v. Forcepoint LLC*, CA. No. 6:22-CV-00342-ADA-DTG, W.D. Tex., Nov. 1, 2023, 70 pgs.
Defendant Forcepoint LLC's Final Invalidity Contentions, Exhibit 932-G-9, *Webroot, Inc. and Open Text, Inc. v. Forcepoint LLC*, CA. No. 6:22-CV-00342-ADA-DTG, W.D. Tex., Nov. 1, 2023, 112 pgs.
Defendant Forcepoint LLC's Final Invalidity Contentions, Exhibit 932-G-10, *Webroot, Inc. and Open Text, Inc. v. Forcepoint LLC*, CA. No. 6:22-CV-00342-ADA-DTG, W.D. Tex., Nov. 1, 2023, 63 pgs.
Defendant Forcepoint LLC's Final Invalidity Contentions, Exhibit 932-G-11, *Webroot, Inc. and Open Text, Inc. v. Forcepoint LLC*, CA. No. 6:22-CV-00342-ADA-DTG, W.D. Tex., Nov. 1, 2023, 110 pgs.
Defendant Forcepoint LLC's Final Invalidity Contentions, Exhibit 932-G-12, *Webroot, Inc. and Open Text, Inc. v. Forcepoint LLC*, CA. No. 6:22-CV-00342-ADA-DTG, W.D. Tex., Nov. 1, 2023, 74 pgs.
Defendant Forcepoint LLC's Final Invalidity Contentions, Exhibit 932-G-13, *Webroot, Inc. and Open Text, Inc. v. Forcepoint LLC*, CA. No. 6:22-CV-00342-ADA-DTG, W.D. Tex., Nov. 1, 2023, 57 pgs.
Defendant Forcepoint LLC's Final Invalidity Contentions, Exhibit 932-G-14, *Webroot, Inc. and Open Text, Inc. v. Forcepoint LLC*, CA. No. 6:22-CV-00342-ADA-DTG, W.D. Tex., Nov. 1, 2023, 60 pgs.
Defendant Forcepoint LLC's Final Invalidity Contentions, Exhibit 932-G-15, *Webroot, Inc. and Open Text, Inc. v. Forcepoint LLC*, CA. No. 6:22-CV-00342-ADA-DTG, W.D. Tex., Nov. 1, 2023, 39 pgs.
Defendant Forcepoint LLC's Final Invalidity Contentions, Exhibit 932-G-16, *Webroot, Inc. and Open Text, Inc. v. Forcepoint LLC*, CA. No. 6:22-CV-00342-ADA-DTG, W.D. Tex., Nov. 1, 2023, 62 pgs.
Defendant Forcepoint LLC's Final Invalidity Contentions, Exhibit 932-G-17, *Webroot, Inc. and Open Text, Inc. v. Forcepoint LLC*, CA. No. 6:22-CV-00342-ADA-DTG, W.D. Tex., Nov. 1, 2023, 57 pgs.
Defendant Forcepoint LLC's Final Invalidity Contentions, Exhibit 932-G-18, *Webroot, Inc. and Open Text, Inc. v. Forcepoint LLC*, CA. No. 6:22-CV-00342-ADA-DTG, W.D. Tex., Nov. 1, 2023, 61 pgs.
Defendant Forcepoint LLC's Final Invalidity Contentions, Exhibit 932-G-19, *Webroot, Inc. and Open Text, Inc. v. Forcepoint LLC*, CA. No. 6:22-CV-00342-ADA-DTG, W.D. Tex., Nov. 1, 2023, 54 pgs.

(56) References Cited

OTHER PUBLICATIONS

Defendant Forcepoint LLC's Final Invalidity Contentions, Exhibit 932-G-20, *Webroot, Inc. and Open Text, Inc. v. Forcepoint LLC*, CA. No. 6:22-CV-00342-ADA-DTG, W.D. Tex., Nov. 1, 2023, 57 pgs.
Defendant Forcepoint LLC's Final Invalidity Contentions, Exhibit 932-G-21, *Webroot, Inc. and Open Text, Inc. v. Forcepoint LLC*, CA. No. 6:22-CV-00342-ADA-DTG, W.D. Tex., Nov. 1, 2023, 59 pgs.
Defendant Forcepoint LLC's Final Invalidity Contentions, Exhibit 932-G-22, *Webroot, Inc. and Open Text, Inc. v. Forcepoint LLC*, CA. No. 6:22-CV-00342-ADA-DTG, W.D. Tex., Nov. 1, 2023, 139 pgs.
Defendant Forcepoint LLC's Final Invalidity Contentions, Exhibit 932-G-23, *Webroot, Inc. and Open Text, Inc. v. Forcepoint LLC*, CA. No. 6:22-CV-00342-ADA-DTG, W.D. Tex., Nov. 1, 2023, 273 pgs.
Defendant Forcepoint LLC's Final Invalidity Contentions, Exhibit 932-G-24, *Webroot, Inc. and Open Text, Inc. v. Forcepoint LLC*, CA. No. 6:22-CV-00342-ADA-DTG, W.D. Tex., Nov. 1, 2023, 39 pgs.
Defendant Forcepoint LLC's Final Invalidity Contentions, Exhibit 932-G-25, *Webroot, Inc. and Open Text, Inc. v. Forcepoint LLC*, CA. No. 6:22-CV-00342-ADA-DTG, W.D. Tex., Nov. 1, 2023, 31 pgs.
Defendant Forcepoint LLC's Final Invalidity Contentions, Exhibit 932-G-26, *Webroot, Inc. and Open Text, Inc. v. Forcepoint LLC*, CA. No. 6:22-CV-00342-ADA-DTG, W.D. Tex., Nov. 1, 2023, 54 pgs.
Defendant Forcepoint LLC's Final Invalidity Contentions, Exhibit 932-G-27, *Webroot, Inc. and Open Text, Inc. v. Forcepoint LLC*, CA. No. 6:22-CV-00342-ADA-DTG, W.D. Tex., Nov. 1, 2023, 55 pgs.
Defendant Sophos Ltd.'s Final Invalidity Contentions, Exhibit 045-A-4, *Webroot, Inc. and Open Text, Inc. v. Sophos Ltd.*, Case No. 6:22-cv-00240-ADA-DTG, W.D. Tex., Nov. 1, 2023, 150 pgs.
Defendant Sophos Ltd.'s Final Invalidity Contentions, Exhibit 045-A-22, *Webroot, Inc. and Open Text, Inc. v. Sophos Ltd.*, Case No. 6:22-cv-00240-ADA-DTG, W.D. Tex., Nov. 1, 2023, 93 pgs.
Defendant Sophos Ltd.'s Final Invalidity Contentions, Exhibit 045-A-27, *Webroot, Inc. and Open Text, Inc. v. Sophos Ltd.*, Case No. 6:22-cv-00240-ADA-DTG, W.D. Tex., Nov. 1, 2023, 35 pgs.
Defendant Sophos Ltd.'s Final Invalidity Contentions, Exhibit 045-A-34, *Webroot, Inc. and Open Text, Inc. v. Sophos Ltd.*, Case No. 6:22-cv-00240-ADA-DTG, W.D. Tex., Nov. 1, 2023, 27 pgs.
Defendant Sophos Ltd.'s Final Invalidity Contentions, Exhibit 045-B, *Webroot, Inc. and Open Text, Inc. v. Sophos Ltd.*, Case No. 6:22-cv-00240-ADA-DTG, W.D. Tex., Nov. 1, 2023, 35 pgs.
Defendant Sophos Ltd.'s Final Invalidity Contentions, Exhibit 224-A-4, *Webroot, Inc. and Open Text, Inc. v. Sophos Ltd.*, CA. No. 6:22-CV-00240-ADA-DTG, W.D. Tex., Nov. 1, 2023, 207 pgs.
Defendant Sophos Ltd.'s Final Invalidity Contentions, Exhibit 224-A-22, *Webroot, Inc. and Open Text, Inc. v. Sophos Ltd.*, CA. No. 6:22-CV-00240-ADA-DTG, W.D. Tex., Nov. 1, 2023, 152 pgs.
Defendant Sophos Ltd.'s Final Invalidity Contentions, Exhibit 224-A-27, *Webroot, Inc. and Open Text, Inc. v. Sophos Ltd.*, CA. No. 6:22-CV-00240-ADA-DTG, W.D. Tex., Nov. 1, 2023, 69 pgs.
Defendant Sophos Ltd.'s Final Invalidity Contentions, Exhibit 224-A-34, *Webroot, Inc. and Open Text, Inc. v. Sophos Ltd.*, CA. No. 6:22-CV-00240-ADA-DTG, W.D. Tex., Nov. 1, 2023, 59 pgs.
Defendant Sophos Ltd.'s Final Invalidity Contentions, Exhibit 224-B, *Webroot, Inc. and Open Text, Inc. v. Sophos Ltd.*, CA. No. 6:22-CV-00240-ADA-DTG, W.D. Tex., Nov. 1, 2023, 53 pgs.
Defendant Sophos Ltd.'s Final Invalidity Contentions, Exhibit 243-A-3, *Webroot, Inc. and Open Text, Inc. v. Sophos Ltd.*, Case No. 6:22-cv-00240-ADA-DTG, W.D. Tex., Nov. 1, 2023, 30 pgs.
Defendant Sophos Ltd.'s Final Invalidity Contentions, Exhibit 243-A-7, *Webroot, Inc. and Open Text, Inc. v. Sophos Ltd.*, Case No. 6:22-cv-00240-ADA-DTG, W.D. Tex., Nov. 1, 2023, 110 pgs.
Defendant Sophos Ltd.'s Final Invalidity Contentions, Exhibit 243-A-8, *Webroot, Inc. and Open Text, Inc. v. Sophos Ltd.*, Case No. 6:22-cv-00240-ADA-DTG, W.D. Tex., Nov. 1, 2023, 60 pgs.
Defendant Sophos Ltd.'s Final Invalidity Contentions, Exhibit 243-A-13, *Webroot, Inc. and Open Text, Inc. v. Sophos Ltd.*, Case No. 6:22-cv-00240-ADA-DTG, W.D. Tex., Nov. 1, 2023, 37 pgs.
Defendant Sophos Ltd.'s Final Invalidity Contentions, Exhibit 243-A-14, *Webroot, Inc. and Open Text, Inc. v. Sophos Ltd.*, Case No. 6:22-cv-00240-ADA-DTG, W.D. Tex., Nov. 1, 2023, 49 pgs.
Defendant Sophos Ltd.'s Final Invalidity Contentions, Exhibit 243-A-18, *Webroot, Inc. and Open Text, Inc. v. Sophos Ltd.*, Case No. 6:22-cv-00240-ADA-DTG, W.D. Tex., Nov. 1, 2023, 37 pgs.
Defendant Sophos Ltd.'s Final Invalidity Contentions, Exhibit 243-A-29, *Webroot, Inc. and Open Text, Inc. v. Sophos Ltd.*, Case No. 6:22-cv-00240-ADA-DTG, W.D. Tex., Nov. 1, 2023, 113 pgs.
Defendant Sophos Ltd.'s Final Invalidity Contentions, Exhibit 243-A-30, *Webroot, Inc. and Open Text, Inc. v. Sophos Ltd.*, Case No. 6:22-cv-00240-ADA-DTG, W.D. Tex., Nov. 1, 2023, 93 pgs.
Defendant Sophos Ltd.'s Final Invalidity Contentions, Exhibit 243-A-31, *Webroot, Inc. and Open Text, Inc. v. Sophos Ltd.*, Case No. 6:22-cv-00240-ADA-DTG, W.D. Tex., Nov. 1, 2023, 33 pgs.
Defendant Sophos Ltd.'s Final Invalidity Contentions, Exhibit 243-A-32, *Webroot, Inc. and Open Text, Inc. v. Sophos Ltd.*, Case No. 6:22-cv-00240-ADA-DTG, W.D. Tex., Nov. 1, 2023, 32 pgs.
Defendant Sophos Ltd.'s Final Invalidity Contentions, Exhibit 243-A-33, *Webroot, Inc. and Open Text, Inc. v. Sophos Ltd.*, Case No. 6:22-cv-00240-ADA-DTG, W.D. Tex., Nov. 1, 2023, 27 pgs.
Defendant Sophos Ltd.'s Final Invalidity Contentions, Exhibit 243-A-34, *Webroot, Inc. and Open Text, Inc. v. Sophos Ltd.*, Case No. 6:22-cv-00240-ADA-DTG, W.D. Tex., Nov. 1, 2023, 24 pgs.
Defendant Sophos Ltd.'s Final Invalidity Contentions, Exhibit 243-B, *Webroot, Inc. and Open Text, Inc. v. Sophos Ltd.*, Case No. 6:22-cv-00240-ADA-DTG, W.D. Tex., Nov. 1, 2023, 131 pgs.
Defendant Sophos Ltd.'s Final Invalidity Contentions, Exhibit 932-A-3, *Webroot, Inc. and Open Text, Inc. v. Sophos Ltd.*, Case No. 6:22-cv-00240-ADA-DTG, W.D. Tex., Nov. 1, 2023, 29 pgs.
Defendant Sophos Ltd.'s Final Invalidity Contentions, Exhibit 932-A-6, *Webroot, Inc. and Open Text, Inc. v. Sophos Ltd.*, Case No. 6:22-cv-00240-ADA-DTG, W.D. Tex., Nov. 1, 2023, 130 pgs.
Defendant Sophos Ltd.'s Final Invalidity Contentions, Exhibit 932-A-7, *Webroot, Inc. and Open Text, Inc. v. Sophos Ltd.*, Case No. 6:22-cv-00240-ADA-DTG, W.D. Tex., Nov. 1, 2023, 75 pgs.
Defendant Sophos Ltd.'s Final Invalidity Contentions, Exhibit 932-A-13, *Webroot, Inc. and Open Text, Inc. v. Sophos Ltd.*, Case No. 6:22-cv-00240-ADA-DTG, W.D. Tex., Nov. 1, 2023, 62 pgs.
Defendant Sophos Ltd.'s Final Invalidity Contentions, Exhibit 932-A-14, *Webroot, Inc. and Open Text, Inc. v. Sophos Ltd.*, Case No. 6:22-cv-00240-ADA-DTG, W.D. Tex., Nov. 1, 2023, 63 pgs.
Defendant Sophos Ltd.'s Final Invalidity Contentions, Exhibit 932-A-18, *Webroot, Inc. and Open Text, Inc. v. Sophos Ltd.*, Case No. 6:22-cv-00240-ADA-DTG, W.D. Tex., Nov. 1, 2023, 39 pgs.
Defendant Sophos Ltd.'s Final Invalidity Contentions, Exhibit 932-A-28, *Webroot, Inc. and Open Text, Inc. v. Sophos Ltd.*, Case No. 6:22-cv-00240-ADA-DTG, W.D. Tex., Nov. 1, 2023, 159 pgs.
Defendant Sophos Ltd.'s Final Invalidity Contentions, Exhibit 932-A-29, *Webroot, Inc. and Open Text, Inc. v. Sophos Ltd.*, Case No. 6:22-cv-00240-ADA-DTG, W.D. Tex., Nov. 1, 2023, 120 pgs.
Defendant Sophos Ltd.'s Final Invalidity Contentions, Exhibit 932-A-30, *Webroot, Inc. and Open Text, Inc. v. Sophos Ltd.*, Case No. 6:22-cv-00240-ADA-DTG, W.D. Tex., Nov. 1, 2023, 34 pgs.
Defendant Sophos Ltd.'s Final Invalidity Contentions, Exhibit 932-A-31, *Webroot, Inc. and Open Text, Inc. v. Sophos Ltd.*, Case No. 6:22-cv-00240-ADA-DTG, W.D. Tex., Nov. 1, 2023, 33 pgs.
Defendant Sophos Ltd.'s Final Invalidity Contentions, Exhibit 932-A-32, *Webroot, Inc. and Open Text, Inc. v. Sophos Ltd.*, Case No. 6:22-cv-00240-ADA-DTG, W.D. Tex., Nov. 1, 2023, 26 pgs.
Defendant Sophos Ltd.'s Final Invalidity Contentions, Exhibit 932-A-33, *Webroot, Inc. and Open Text, Inc. v. Sophos Ltd.*, Case No. 6:22-cv-00240-ADA-DTG, W.D. Tex., Nov. 1, 2023, 24 pgs.
Defendant Sophos Ltd.'s Final Invalidity Contentions, Exhibit 932-B, *Webroot, Inc. and Open Text, Inc. v. Sophos Ltd.*, Case No. 6:22-cv-00240-ADA-DTG, W.D. Tex., Nov. 1, 2023, 164 pgs.

(56) References Cited

OTHER PUBLICATIONS

Defendant Sophos Ltd.'s Final Invalidity Contentions, Exhibit 244-A-6, *Webroot, Inc. and Open Text, Inc. v. Sophos Ltd.*, Case No. 6:22-cv-00240-ADA-DTG, W.D. Tex., Nov. 1, 2023, 45 pgs.
Defendant Sophos Ltd.'s Final Invalidity Contentions, Exhibit 244-A-9, *Webroot, Inc. and Open Text, Inc. v. Sophos Ltd.*, Case No. 6:22-cv-00240-ADA-DTG, W.D. Tex., Nov. 1, 2023, 100 pgs.
Defendant Sophos Ltd.'s Final Invalidity Contentions, Exhibit 244-A-23, *Webroot, Inc. and Open Text, Inc. v. Sophos Ltd.*, Case No. 6:22-cv-00240-ADA-DTG, W.D. Tex., Nov. 1, 2023, 28 pgs.
Defendant Sophos Ltd.'s Final Invalidity Contentions, Exhibit 244-A-24, *Webroot, Inc. and Open Text, Inc. v. Sophos Ltd.*, Case No. 6:22-cv-00240-ADA-DTG, W.D. Tex., Nov. 1, 2023, 107 pgs.
Defendant Sophos Ltd.'s Final Invalidity Contentions, Exhibit 244-A-25, *Webroot, Inc. and Open Text, Inc. v. Sophos Ltd.*, Case No. 6:22-cv-00240-ADA-DTG, W.D. Tex., Nov. 1, 2023, 108 pgs.
Defendant Sophos Ltd.'s Final Invalidity Contentions, Exhibit 244-A-26, *Webroot, Inc. and Open Text, Inc. v. Sophos Ltd.*, Case No. 6:22-cv-00240-ADA-DTG, W.D. Tex., Nov. 1, 2023, 43 pgs.
Defendant Sophos Ltd.'s Final Invalidity Contentions, Exhibit 244-A-27, *Webroot, Inc. and Open Text, Inc. v. Sophos Ltd.*, Case No. 6:22-cv-00240-ADA-DTG, W.D. Tex., Nov. 1, 2023, 32 pgs.
Defendant Sophos Ltd.'s Final Invalidity Contentions, Exhibit 244-B, *Webroot, Inc. and Open Text, Inc. v. Sophos Ltd.*, Case No. 6:22-cv-00240-ADA-DTG, W.D. Tex., Nov. 1, 2023, 53 pgs.
Defendant Sophos Ltd.'s Final Invalidity Contentions, Exhibit 505-A-6, *Webroot, Inc. and Open Text, Inc. v. Sophos Ltd.*, Case No. 6:22-cv-00240-ADA-DTG, W.D. Tex., Nov. 1, 2023, 162 pgs.
Defendant Sophos Ltd.'s Final Invalidity Contentions, Exhibit 505-A-8, *Webroot, Inc. and Open Text, Inc. v. Sophos Ltd.*, Case No. 6:22-cv-00240-ADA-DTG, W.D. Tex., Nov. 1, 2023, 35 pgs.
Defendant Sophos Ltd.'s Final Invalidity Contentions, Exhibit 505-A-15, *Webroot, Inc. and Open Text, Inc. v. Sophos Ltd.*, CA. No. 6:22-CV-00240-ADA-DTG, W.D. Tex., Feb. 21, 2023, 148 pgs.
Defendant Sophos Ltd.'s Final Invalidity Contentions, Exhibit 505-A-21, *Webroot, Inc. and Open Text, Inc. v. Sophos Ltd.*, Case No. 6:22-cv-00240-ADA-DTG, W.D. Tex., Nov. 1, 2023, 30 pgs.
Defendant Sophos Ltd.'s Final Invalidity Contentions, Exhibit 505-A-22, *Webroot, Inc. and Open Text, Inc. v. Sophos Ltd.*, Case No. 6:22-cv-00240-ADA-DTG, W.D. Tex., Nov. 1, 2023, 32 pgs.
Defendant Sophos Ltd.'s Final Invalidity Contentions, Exhibit 505-B, *Webroot, Inc. and Open Text, Inc. v. Sophos Ltd.*, Case No. 6:22-cv-00240-ADA-DTG, W.D. Tex., Nov. 1, 2023, 117 pgs.
Defendant Sophos Ltd.'s Final Invalidity Contentions, Exhibit 591-A-3, *Webroot, Inc. and Open Text, Inc. v. Sophos Ltd.*, Case No. 6:22-cv-00240-ADA-DTG, W.D. Tex., Nov. 1, 2023, 37 pgs.
Defendant Sophos Ltd.'s Final Invalidity Contentions, Exhibit 591-A-4, *Webroot, Inc. and Open Text, Inc. v. Sophos Ltd.*, Case No. 6:22-cv-00240-ADA-DTG, W.D. Tex., Nov. 1, 2023, 53 pgs.
Defendant Sophos Ltd.'s Final Invalidity Contentions, Exhibit 591-A-19, *Webroot, Inc. and Open Text, Inc. v. Sophos Ltd.*, Case No. 6:22-cv-00240-ADA-DTG, W.D. Tex., Nov. 1, 2023, 54 pgs.
Defendant Sophos Ltd.'s Final Invalidity Contentions, Exhibit 591-A-20, *Webroot, Inc. and Open Text, Inc. v. Sophos Ltd.*, Case No. 6:22-cv-00240-ADA-DTG, W.D. Tex., Nov. 1, 2023, 33 pgs.
Defendant Sophos Ltd.'s Final Invalidity Contentions, Exhibit 591-A-22, *Webroot, Inc. and Open Text, Inc. v. Sophos Ltd.*, Case No. 6:22-cv-00240-ADA-DTG, W.D. Tex., Nov. 1, 2023, 52 pgs.
Defendant Sophos Ltd.'s Final Invalidity Contentions, Exhibit 591-A-28, *Webroot, Inc. and Open Text, Inc. v. Sophos Ltd.*, Case No. 6:22-cv-00240-ADA-DTG, W.D. Tex., Nov. 1, 2023, 60 pgs.
Defendant Sophos Ltd.'s Final Invalidity Contentions, Exhibit 591-B, *Webroot, Inc. and Open Text, Inc. v. Sophos Ltd.*, Case No. 6:22-cv-00240-ADA-DTG, W.D. Tex., Nov. 1, 2023, 38 pgs.
Defendant's Final Invalidity Contentions, Exhibit 591-A-47, *Webroot, Inc. and Open Text, Inc. v. Trend Micro, Inc.*, Case No. 6:22-cv-00239-ADA-DTG, W.D. Tex., Nov. 1, 2023, 46 pgs.
Defendant Forcepoint LLC's Final Invalidity Contentions, Exhibit 386-D-1, *Webroot, Inc. and Open Text, Inc. v. Forcepoint LLC*, No. 6:22-CV-00342-ADA-DTG (WD, Texas), Nov. 1, 2023, 88 pgs.
Defendant Forcepoint LLC's Final Invalidity Contentions, Exhibit 386-D-2, *Webroot, Inc. and Open Text, Inc. v. Forcepoint LLC*, No. 6:22-CV-00342-ADA-DTG (WD, Texas), Nov. 1, 2023, 61 pgs.
Defendant Forcepoint LLC's Final Invalidity Contentions, Exhibit 386-D-3, *Webroot, Inc. and Open Text, Inc. v. Forcepoint LLC*, No. 6:22-CV-00342-ADA-DTG (WD, Texas), Nov. 1, 2023, 72 pgs.
Defendant Forcepoint LLC's Final Invalidity Contentions, Exhibit 386-D-4, *Webroot, Inc. and Open Text, Inc. v. Forcepoint LLC*, No. 6:22-CV-00342-ADA-DTG (WD, Texas), Nov. 1, 2023, 69 pgs.
Defendant Forcepoint LLC's Final Invalidity Contentions, Exhibit 386-D-5, *Webroot, Inc. and Open Text, Inc. v. Forcepoint LLC*, No. 6:22-CV-00342-ADA-DTG (WD, Texas), Nov. 1, 2023, 73 pgs.
Defendant Forcepoint LLC's Final Invalidity Contentions, Exhibit 386-D-6, *Webroot, Inc. and Open Text, Inc. v. Forcepoint LLC*, No. 6:22-CV-00342-ADA-DTG (WD, Texas), Nov. 1, 2023, 100 pgs.
Defendant Forcepoint LLC's Final Invalidity Contentions, Exhibit 386-D-7, *Webroot, Inc. and Open Text, Inc. v. Forcepoint LLC*, No. 6:22-CV-00342-ADA-DTG (WD, Texas), Nov. 1, 2023, 77 pgs.
Defendant Forcepoint LLC's Final Invalidity Contentions, Exhibit 928-E-1, *Webroot, Inc. and Open Text, Inc. v. Forcepoint LLC*, No. 6:22-CV-00342-ADA-DTG (WD, Texas), Nov. 1, 2023, 26 pgs.
Defendant Forcepoint LLC's Final Invalidity Contentions, Exhibit 928-E-2, *Webroot, Inc. and Open Text, Inc. v. Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 928-E-3, *Webroot, Inc. and Open Text, Inc. v. Forcepoint LLC*, No. 6:22-CV-00342-ADA-DTG (WD, Texas), Nov. 1, 2023, 27 pgs.
Defendant Forcepoint LLC's Final Invalidity Contentions, Exhibit 928-E-4, *Webroot, Inc. and Open Text, Inc. v. Forcepoint LLC*, No. 6:22-CV-00342-ADA-DTG (WD, Texas), Nov. 1, 2023, 29 pgs.
Defendant Forcepoint LLC's Final Invalidity Contentions, Exhibit 928-E-5, *Webroot, Inc. and Open Text, Inc. v. Forcepoint LLC*, No. 6:22-CV-00342-ADA-DTG (WD, Texas), Nov. 1, 2023, 30 pgs.
Defendant Forcepoint LLC's Final Invalidity Contentions, Exhibit 844-B-1, *Webroot, Inc. and Open Text, Inc. v. Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-2, *Webroot, Inc. and Open Text, Inc. v. Forcepoint LLC*, 1 No. 6:22-CV-00342-ADA-DTG (WD, Texas), Jan. 1, 2023, 21 pgs.
Defendant Forcepoint LLC's Final Invalidity Contentions, Exhibit 844-B-3, *Webroot, Inc. and Open Text, Inc. v. Forcepoint LLC*, No. 6:22-CV-00342-ADA-DTG (WD, Texas), Nov. 1, 2023, 27 pgs.
Defendant Forcepoint LLC's Final Invalidity Contentions, Exhibit 844-B-4, *Webroot, Inc. and Open Text, Inc. v. Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-5, *Webroot, Inc. and Open Text, Inc. v. Forcepoint LLC*, No. 6:22-CV-00342-ADA-DTG (WD, Texas), Nov. 1, 2023, 25 pgs.
Defendant Forcepoint LLC's Final Invalidity Contentions, Exhibit 844-B-6, *Webroot, Inc. and Open Text, Inc. v. Forcepoint LLC*, No. 6:22-CV-00342-ADA-DTG (WD, Texas), Nov. 1, 2023, 21 pgs.
Defendant Forcepoint LLC's Final Invalidity Contentions, Exhibit 844-B-7, *Webroot, Inc. and Open Text, Inc. v. Forcepoint LLC*, No. 6:22-CV-00342-ADA-DTG (WD, Texas), Nov. 1, 2023, 29 pgs.
Defendant Forcepoint LLC's Final Invalidity Contentions, Exhibit 844-B-8, *Webroot, Inc. and Open Text, Inc. v. Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 844-B-9, *Webroot, Inc. and Open Text, Inc. v. Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 844-B-10, *Webroot, Inc. and Open Text, Inc. v. Forcepoint LLC*, No. 6:22-CV-00342-ADA-DTG (WD, Texas), Nov. 1, 2023, 20 pgs.
Defendant Forcepoint LLC's Final Invalidity Contentions, Exhibit 844-B-11, *Webroot, Inc. and Open Text, Inc. v. Forcepoint LLC*, No. 6:22-CV-00342-ADA-DTG (WD, Texas), Nov. 1, 2023, 25 pgs.
Defendant Forcepoint LLC's Final Invalidity Contentions, Exhibit 844-B-12, *Webroot, Inc. and Open Text, Inc. v. Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 844-B-13, *Webroot, Inc. and Open Text, Inc. v. Forcepoint LLC*, No. 6:22-CV-00342-ADA-DTG (WD, Texas), Nov. 1, 2023, 24 pgs.

(56) References Cited

OTHER PUBLICATIONS

Defendant Forcepoint LLC's Final Invalidity Contentions, Exhibit 844-B-14, *Webroot, Inc. and Open Text, Inc.* v. *Forcepoint LLC,* No. 6:22-CV-00342-ADA-DTG (WD, Texas), Nov. 1, 2023, 21 pgs.
Defendant Forcepoint LLC's Final Invalidity Contentions, Exhibit 844-B-15, *Webroot, Inc. and Open Text, Inc.* v. *Forcepoint LLC,* No. 6:22-CV-00342-ADA-DTG (WD, Texas), Nov. 1, 2023, 17 pgs.
Defendant Forcepoint LLC's Final Invalidity Contentions, Exhibit 844-B-16, *Webroot, Inc. and Open Text, Inc.* v. *Forcepoint LLC,* No. 6:22-CV-00342-ADA-DTG (WD, Texas), Nov. 1, 2023, 20 pgs.
Defendant Forcepoint LLC's Final Invalidity Contentions, Exhibit 844-B-17, *Webroot, Inc. and Open Text, Inc.* v. *Forcepoint LLC,* No. 6:22-CV-00342-ADA-DTG (WD, Texas), Nov. 1, 2023, 18 pgs.
Defendant Forcepoint LLC's Final Invalidity Contentions, Exhibit 844-B-18, *Webroot, Inc. and Open Text, Inc.* v. *Forcepoint LLC,* No. 6:22-CV-00342-ADA-DTG (WD, Texas), Nov. 1, 2023, 18 pgs.
Defendant Forcepoint LLC's Final Invalidity Contentions, Exhibit 844-B-19, *Webroot, Inc. and Open Text, Inc.* v. *Forcepoint LLC,* No. 6:22-CV-00342-ADA-DTG (WD, Texas), Nov. 1, 2023, 20 pgs.
Defendant Forcepoint LLC's Final Invalidity Contentions, Exhibit 844-B-20, *Webroot, Inc. and Open Text, Inc.* v. *Forcepoint LLC,* No. 6:22-CV-00342-ADA-DTG (WD, Texas), Nov. 1, 2023, 17 pgs.
Defendant Forcepoint LLC's Final Invalidity Contentions, Exhibit 844-B-21, *Webroot, Inc. and Open Text, Inc.* v. *Forcepoint LLC,* No. 6:22-CV-00342-ADA-DTG (WD, Texas), Nov. 1, 2023, 18 pgs.
Defendant Forcepoint LLC's Final Invalidity Contentions, Exhibit 844-B-22, *Webroot, Inc. and Open Text, Inc.* v. *Forcepoint LLC,* No. 6:22-CV-00342-ADA-DTG (WD, Texas), Nov. 1, 2023, 22, 17 pgs.
Defendant Forcepoint LLC's Final Invalidity Contentions, Exhibit 844-B-23, *Webroot, Inc. and Open Text, Inc.* v. *Forcepoint LLC,* No. 6:22-CV-00342-ADA-DTG (WD, Texas), Nov. 1, 2023, 23 pgs.
Defendant Forcepoint LLC's Final Invalidity Contentions, Exhibit 844-B-24, *Webroot, Inc. and Open Text, Inc.* v. *Forcepoint LLC,* No. 6:22-CV-00342-ADA-DTG (WD, Texas), Nov. 1, 2023, 27 pgs.
Defendant Forcepoint LLC's Final Invalidity Contentions, Exhibit 844-B-25, *Webroot, Inc. and Open Text, Inc.* v. *Forcepoint LLC,* No. 6:22-CV-00342-ADA-DTG (WD, Texas), Nov. 1, 2023, 23 pgs.
Defendant Forcepoint LLC's Final Invalidity Contentions, Exhibit 844-B-26, *Webroot, Inc. and Open Text, Inc.* v. *Forcepoint LLC,* No. 6:22-CV-00342-ADA-DTG (WD, Texas), Nov. 1, 2023, 22 pgs.
Defendant Forcepoint LLC's Final Invalidity Contentions, Exhibit 844-B-27, *Webroot, Inc. and Open Text, Inc.* v. *Forcepoint LLC,* No. 6:22-CV-00342-ADA-DTG (WD, Texas), Nov. 1, 2023, 33 pgs.
Defendant Forcepoint LLC's Final Invalidity Contentions, Exhibit 844-B-28, *Webroot, Inc. and Open Text, Inc.* v. *Forcepoint LLC,* No. 6:22-CV-00342-ADA-DTG (WD, Texas), Nov. 1, 2023, 30 pgs.
Defendant Forcepoint LLC's Final Invalidity Contentions, Exhibit 844-B-29, *Webroot, Inc. and Open Text, Inc.* v. *Forcepoint LLC,* No. 6:22-CV-00342-ADA-DTG (WD, Texas), Nov. 1, 2023, 27 pgs.
Defendant Forcepoint LLC's Final Invalidity Contentions, Exhibit 869-H-1, *Webroot, Inc. and Open Text, Inc.* v. *Forcepoint LLC,* No. 6:22-CV-00342-ADA-DTG (WD, Texas), Nov. 1, 2023, 55 pgs.
Defendant Forcepoint LLC's Final Invalidity Contentions, Exhibit 869-H-2, *Webroot, Inc. and Open Text, Inc.* v. *Forcepoint LLC,* No. 6:22-CV-00342-ADA-DTG (WD, Texas), Nov. 1, 2023, 42 pgs.
Defendant Forcepoint LLC's Final Invalidity Contentions, Exhibit 869-H-3, *Webroot, Inc. and Open Text, Inc.* v. *Forcepoint LLC,* No. 6:22-CV-00342-ADA-DTG (WD, Texas), Nov. 1, 2023, 39 pgs.
Defendant Forcepoint LLC's Final Invalidity Contentions, Exhibit 869-H-4, *Webroot, Inc. and Open Text, Inc.* v. *Forcepoint LLC,* No. 6:22-CV-00342-ADA-DTG (WD, Texas), Nov. 1, 2023, 40 pgs.
Defendant Forcepoint LLC's Final Invalidity Contentions, Exhibit 869-H-5, *Webroot, Inc. and Open Text, Inc.* v. *Forcepoint LLC,* No. 6:22-CV-00342-ADA-DTG (WD, Texas), Nov. 1, 2023, 47 pgs.
Defendant Forcepoint LLC's Final Invalidity Contentions, Exhibit 869-H-6, *Webroot, Inc. and Open Text, Inc.* v. *Forcepoint LLC,* No. 6:22-CV-00342-ADA-DTG (WD, Texas), Nov. 1, 2023, 48 pgs.
Defendant Forcepoint LLC's Final Invalidity Contentions, Exhibit 869-H-7, *Webroot, Inc. and Open Text, Inc.* v. *Forcepoint LLC,* No. 6:22-CV-00342-ADA-DTG (WD, Texas), Nov. 1, 2023, 62 pgs.
Defendant Forcepoint LLC's Final Invalidity Contentions, Exhibit 869-H-8, *Webroot, Inc. and Open Text, Inc.* v. *Forcepoint LLC,* No. 6:22-CV-00342-ADA-DTG (WD, Texas), Nov. 1, 2023, 36 pgs.
Defendant Forcepoint LLC's Final Invalidity Contentions, Exhibit 869-H-9, *Webroot, Inc. and Open Text, Inc.* v. *Forcepoint LLC,* No. 6:22-CV-00342-ADA-DTG (WD, Texas), Nov. 1, 2023, 39 pgs.
Defendant Forcepoint LLC's Final Invalidity Contentions, Exhibit 869-H-10, *Webroot, Inc. and Open Text, Inc.* v. *Forcepoint LLC,* No. 6:22-CV-00342-ADA-DTG (WD, Texas), Nov. 1, 2023, 37 pgs.
Defendant Forcepoint LLC's Final Invalidity Contentions, Exhibit 869-H-11, *Webroot, Inc. and Open Text, Inc.* v. *Forcepoint LLC,* No. 6:22-CV-00342-ADA-DTG (WD, Texas), Nov. 1, 2023, 44 pgs.
Defendant Forcepoint LLC's Final Invalidity Contentions, Exhibit 869-H-12, *Webroot, Inc. and Open Text, Inc.* v. *Forcepoint LLC,* No. 6:22-CV-00342-ADA-DTG (WD, Texas), Nov. 1, 2023, 39 pgs.
Defendant Forcepoint LLC's Final Invalidity Contentions, Exhibit 869-H-13, *Webroot, Inc. and Open Text, Inc.* v. *Forcepoint LLC,* No. 6:22-CV-00342-ADA-DTG (WD, Texas), Nov. 1, 2023, 50 pgs.
Defendant Forcepoint LLC's Final Invalidity Contentions, Exhibit 869-H-14, *Webroot, Inc. and Open Text, Inc.* v. *Forcepoint LLC,* No. 6:22-CV-00342-ADA-DTG (WD, Texas), Nov. 1, 2023, 37 pgs.
Defendant Forcepoint LLC's Final Invalidity Contentions, Exhibit 869-H-15, *Webroot, Inc. and Open Text, Inc.* v. *Forcepoint LLC,* No. 6:22-CV-00342-ADA-DTG (WD, Texas), Nov. 1, 2023, 36 pgs.
Defendant Forcepoint LLC's Final Invalidity Contentions, Exhibit 869-H-16, *Webroot, Inc. and Open Text, Inc.* v. *Forcepoint LLC,* No. 6:22-CV-00342-ADA-DTG (WD, Texas), Nov. 1, 2023, 32 pgs.
Defendant Forcepoint LLC's Final Invalidity Contentions, Exhibit 869-H-17, *Webroot, Inc. and Open Text, Inc.* v. *Forcepoint LLC,* No. 6:22-CV-00342-ADA-DTG (WD, Texas), Nov. 1, 2023, 31 pgs.
Defendant Forcepoint LLC's Final Invalidity Contentions, Exhibit 869-H-18, *Webroot, Inc. and Open Text, Inc.* v. *Forcepoint LLC,* No. 6:22-CV-00342-ADA-DTG (WD, Texas), Nov. 1, 2023, 31 pgs.
Defendant Forcepoint LLC's Final Invalidity Contentions, Exhibit 869-H-19, *Webroot, Inc. and Open Text, Inc.* v. *Forcepoint LLC,* No. 6:22-CV-00342-ADA-DTG (WD, Texas), Nov. 1, 2023, 37 pgs.
Defendant Forcepoint LLC's Final Invalidity Contentions, Exhibit 869-H-20, *Webroot, Inc. and Open Text, Inc.* v. *Forcepoint LLC,* No. 6:22-CV-00342-ADA-DTG (WD, Texas), Nov. 1, 2023, 32 pgs.
Defendant Forcepoint LLC's Final Invalidity Contentions, Exhibit 869-H-21, *Webroot, Inc. and Open Text, Inc.* v. *Forcepoint LLC,* No. 6:22-CV-00342-ADA-DTG (WD, Texas), Nov. 1, 2023, 37 pgs.
Defendant Forcepoint LLC's Final Invalidity Contentions, Exhibit 869-H-22, *Webroot, Inc. and Open Text, Inc.* v. *Forcepoint LLC,* No. 6:22-CV-00342-ADA-DTG (WD, Texas), Nov. 1, 2023, 38 pgs.
Defendant Forcepoint LLC's Final Invalidity Contentions, Exhibit 869-H-23, *Webroot, Inc. and Open Text, Inc.* v. *Forcepoint LLC,* No. 6:22-CV-00342-ADA-DTG (WD, Texas), Nov. 1, 2023, 33 pgs.
Defendant Forcepoint LLC's Final Invalidity Contentions, Exhibit 869-H-24, *Webroot, Inc. and Open Text, Inc.* v. *Forcepoint LLC,* No. 6:22-CV-00342-ADA-DTG (WD, Texas), Nov. 1, 2023, 35 pgs.
Defendant Forcepoint LLC's Final Invalidity Contentions, Exhibit 869-H-25, *Webroot, Inc. and Open Text, Inc.* v. *Forcepoint LLC,* No. 6:22-CV-00342-ADA-DTG (WD, Texas), Nov. 1, 2023, 63 pgs.
Defendant Forcepoint LLC's Final Invalidity Contentions, Exhibit 869-H-26, *Webroot, Inc. and Open Text, Inc.* v. *Forcepoint LLC,* No. 6:22-CV-00342-ADA-DTG (WD, Texas), Nov. 1, 2023, 39 pgs.
Defendant Forcepoint LLC's Final Invalidity Contentions, Exhibit 869-H-27, *Webroot, Inc. and Open Text, Inc.* v. *Forcepoint LLC,* No. 6:22-CV-00342-ADA-DTG (WD, Texas), Nov. 1, 2023, Exhibit 869-H-27, 29 pgs.
Defendant Forcepoint LLC's Final Invalidity Contentions, Exhibit 869-H-28, *Webroot, Inc. and Open Text, Inc.* v. *Forcepoint LLC,* No. 6:22-CV-00342-ADA-DTG (WD, Texas), Nov. 1, 2023, 71 pgs.
Defendant Forcepoint LLC's Final Invalidity Contentions, Exhibit 869-H-29, *Webroot, Inc. and Open Text, Inc.* v. *Forcepoint LLC,* No. 6:22-CV-00342-ADA-DTG (WD, Texas), Nov. 1, 2023, 38 pgs.
Defendant Forcepoint LLC's Final Invalidity Contentions, Exhibit 869-H-30, *Webroot, Inc. and Open Text, Inc.* v. *Forcepoint LLC,* No. 6:22-CV-00342-ADA-DTG (WD, Texas), Nov. 1, 2023, 33 pgs.
Defendant Forcepoint LLC's Final Invalidity Contentions, Exhibit 869-H-31, *Webroot, Inc. and Open Text, Inc.* v. *Forcepoint LLC,* No. 6:22-CV-00342-ADA-DTG (WD, Texas), Nov. 1, 2023, 39 pgs.

(56) References Cited

OTHER PUBLICATIONS

Defendant Forcepoint LLC's Final Invalidity Contentions, Exhibit 869-H-32, *Webroot, Inc. and Open Text, Inc.* v. *Forcepoint LLC*, No. 6:22-CV-00342-ADA-DTG (WD, Texas), Nov. 1, 2023, 34 pgs.
Defendant Forcepoint LLC's Final Invalidity Contentions, Exhibit 869-H-33, *Webroot, Inc. and Open Text, Inc.* v. *Forcepoint LLC*, No. 6:22-CV-00342-ADA-DTG (WD, Texas), Nov. 1, 2023, 40 pgs.
Defendant Forcepoint LLC's Final Invalidity Contentions, Exhibit 869-H-34, *Webroot, Inc. and Open Text, Inc.* v. *Forcepoint LLC*, No. 6:22-CV-00342-ADA-DTG (WD, Texas), Nov. 1, 2023, 43 pgs.
Defendant Forcepoint LLC's Final Invalidity Contentions, Exhibit 869-H-35, *Webroot, Inc. and Open Text, Inc.* v. *Forcepoint LLC*, No. 6:22-CV-00342-ADA-DTG (WD, Texas), Nov. 1, 2023, 49 pgs.
Defendant Forcepoint LLC's Final Invalidity Contentions, Exhibit 869-H-36, *Webroot, Inc. and Open Text, Inc.* v. *Forcepoint LLC*, No. 6:22-CV-00342-ADA-DTG (WD, Texas), Nov. 1, 2023, 69 pgs.
Defendant's Final Invalidity Contentions, Exhibit 844-A-48, *Webroot, Inc. and Open Text, Inc.* v. *Trend Micro, Inc.*, Case No. 6:22-cv-00239-ADA-DTG, W.D. Tex., Nov. 1, 2023, 100 pgs.
Defendant's Final Invalidity Contentions, Exhibit 844-A-75, *Webroot, Inc. and Open Text, Inc.* v. *Trend Micro, Inc.*, Case No. 6:22-cv-00239-ADA-DTG, W.D. Tex., Nov. 1, 2023, 78 pgs.
Defendant's Final Invalidity Contentions, Exhibit 844-B, *Webroot, Inc. and Open Text, Inc.* v. *Trend Micro, Inc.*, Case No. 6:22-cv-00239-ADA-DTG, W.D. Tex., Nov. 1, 2023, 53 pgs.
Defendant's Final Invalidity Contentions, Exhibit 869-A-24, *Webroot, Inc. and Open Text, Inc.* v. *Trend Micro, Inc.*, Case No. 6:22-cv-00239-ADA-DTG, W.D. Tex., Nov. 1, 2023, 71 pgs.
Defendant's Final Invalidity Contentions, Exhibit 869-A-53, *Webroot, Inc. and Open Text, Inc.* v. *Trend Micro, Inc.*, Case No. 6:22-cv-00239-ADA-DTG, W.D. Tex., Nov. 1, 2023, 64 pgs.
Defendant's Final Invalidity Contentions, Exhibit 869-B, *Webroot, Inc. and Open Text, Inc.* v. *Trend Micro, Inc.*, Case No. 6:22-cv-00239-ADA-DTG, W.D. Tex., Nov. 1, 2023, 65 pgs.
Defendant Forcepoint LLC's Final Invalidity Contentions, Exhibit 389-A-1, *Webroot, Inc. and Open Text, Inc.* v. *Forcepoint LLC*, No. 6:22-CV-00342-ADA-DTG (WD, Texas), Nov. 1, 2023, 28 pgs.
Defendant Forcepoint LLC's Final Invalidity Contentions, Exhibit 389-A-2, *Webroot, Inc. and Open Text, Inc.* v. *Forcepoint LLC*, No. 6:22-CV-00342-ADA-DTG (WD, Texas), Nov. 1, 2023, 44 pgs.
Defendant Forcepoint LLC's Final Invalidity Contentions, Exhibit 389-A-3, *Webroot, Inc. and Open Text, Inc.* v. *Forcepoint LLC*, No. 6:22-CV-00342-ADA-DTG (WD, Texas), Nov. 1, 2023, 49 pgs.
Defendant Forcepoint LLC's Final Invalidity Contentions, Exhibit 389-A-4, *Webroot, Inc. and Open Text, Inc.* v. *Forcepoint LLC*, No. 6:22-CV-00342-ADA-DTG (WD, Texas), Nov. 1, 2023, 68 pgs.
Defendant Forcepoint LLC's Final Invalidity Contentions, Exhibit 389-A-5, *Webroot, Inc. and Open Text, Inc.* v. *Forcepoint LLC*, No. 6:22-CV-00342-ADA-DTG (WD, Texas), Nov. 1, 2023, 25 pgs.
Defendant Forcepoint LLC's Final Invalidity Contentions, Exhibit 389-A-6, *Webroot, Inc. and Open Text, Inc.* v. *Forcepoint LLC*, No. 6:22-CV-00342-ADA-DTG (WD, Texas), Nov. 1, 2023, 20 pgs.
Defendant Forcepoint LLC's Final Invalidity Contentions, Exhibit 389-A-7, *Webroot, Inc. and Open Text, Inc.* v. *Forcepoint LLC*, No. 6:22-CV-00342-ADA-DTG (WD, Texas), Nov. 1, 2023, 31 pgs.
Defendant Forcepoint LLC's Final Invalidity Contentions, Exhibit 389-A-8, *Webroot, Inc. and Open Text, Inc.* v. *Forcepoint LLC*, No. 6:22-CV-00342-ADA-DTG (WD, Texas), Nov. 1, 2023, 86 pgs.
Defendant Forcepoint LLC's Final Invalidity Contentions, Exhibit 389-A-9, *Webroot, Inc. and Open Text, Inc.* v. *Forcepoint LLC*, No. 6:22-CV-00342-ADA-DTG (WD, Texas), Nov. 1, 2023, 19 pgs.
Defendant Forcepoint LLC's Final Invalidity Contentions, Exhibit 389-A-10, *Webroot, Inc. and Open Text, Inc.* v. *Forcepoint LLC*, No. 6:22-CV-00342-ADA-DTG (WD, Texas), Nov. 1, 2023, 75 pgs.
Defendant Forcepoint LLC's Final Invalidity Contentions, Exhibit 389-A-11, *Webroot, Inc. and Open Text, Inc.* v. *Forcepoint LLC*, No. 6:22-CV-00342-ADA-DTG (WD, Texas), Nov. 1, 2023, 28 pgs.
Defendant Forcepoint LLC's Final Invalidity Contentions, Exhibit 389-A-12, *Webroot, Inc. and Open Text, Inc.* v. *Forcepoint LLC*, No. 6:22-CV-00342-ADA-DTG (WD, Texas), Nov. 1, 2023, 24 pgs.
Defendant Forcepoint LLC's Final Invalidity Contentions, Exhibit 389-A-13, *Webroot, Inc. and Open Text, Inc.* v. *Forcepoint LLC*, No. 6:22-CV-00342-ADA-DTG (WD, Texas), Nov. 1, 2023, 38 pgs.
Defendant Forcepoint LLC's Final Invalidity Contentions, Exhibit 389-A-14, *Webroot, Inc. and Open Text, Inc.* v. *Forcepoint LLC*, No. 6:22-CV-00342-ADA-DTG (WD, Texas), Nov. 1, 2023, 23 pgs.
Defendant Forcepoint LLC's Final Invalidity Contentions, Exhibit 389-A-15, *Webroot, Inc. and Open Text, Inc.* v. *Forcepoint LLC*, No. 6:22-CV-00342-ADA-DTG (WD, Texas), Nov. 1, 2023, 125 pgs.
Defendant Forcepoint LLC's Final Invalidity Contentions, Exhibit 389-A-16, *Webroot, Inc. and Open Text, Inc.* v. *Forcepoint LLC*, No. 6:22-CV-00342-ADA-DTG (WD, Texas), Nov. 1, 2023, 126 pgs.
Defendant Forcepoint LLC's Final Invalidity Contentions, Exhibit 389-A-17, *Webroot, Inc. and Open Text, Inc.* v. *Forcepoint LLC*, No. 6:22-CV-00342-ADA-DTG (WD, Texas), Nov. 1, 2023, 60 pgs.
Defendant Forcepoint LLC's Final Invalidity Contentions, Exhibit 389-A-18, *Webroot, Inc. and Open Text, Inc.* v. *Forcepoint LLC*, No. 6:22-CV-00342-ADA-DTG (WD, Texas), Nov. 1, 2023, 34 pgs.
Defendant Forcepoint LLC's Final Invalidity Contentions, Exhibit 389-A-19, *Webroot, Inc. and Open Text, Inc.* v. *Forcepoint LLC*, No. 6:22-CV-00342-ADA-DTG (WD, Texas), Nov. 1, 2023, 41 pgs.
Defendant Forcepoint LLC's Final Invalidity Contentions, Exhibit 389-A-20, *Webroot, Inc. and Open Text, Inc.* v. *Forcepoint LLC*, No. 6:22-CV-00342-ADA-DTG (WD, Texas), Nov. 1, 2023, 34 pgs.
Defendant's Final Invalidity Contentions, Exhibit 250-A-13, *Webroot, Inc. and Open Text, Inc.* v. *Trend Micro, Inc.*, Case No. 6:22-cv-00239-ADA-DTG, W.D. Tex., Nov. 1, 2023, 75 pgs.
Defendant's Final Invalidity Contentions, Exhibit 250-A-37, *Webroot, Inc. and Open Text, Inc.* v. *Trend Micro, Inc.*, Case No. 6:22-cv-00239-ADA-DTG, W.D. Tex., Nov. 1, 2023, 40 pgs.
Defendant's Final Invalidity Contentions, Exhibit 250-A-38, *Webroot, Inc. and Open Text, Inc.* v. *Trend Micro, Inc.*, Case No. 6:22-cv-00239-ADA-DTG, W.D. Tex., Nov. 1, 2023, 31 pgs.
Defendant's Final Invalidity Contentions, Exhibit 250-A-39, *Webroot, Inc. and Open Text, Inc.* v. *Trend Micro, Inc.*, Case No. 6:22-cv-00239-ADA-DTG, W.D. Tex., Nov. 1, 2023, 49 pgs.
Defendant's Final Invalidity Contentions, Exhibit 250-A-40, *Webroot, Inc. and Open Text, Inc.* v. *Trend Micro, Inc.*, Case No. 6:22-cv-00239-ADA-DTG, W.D. Tex., Nov. 1, 2023, 50 pgs.
Defendant's Final Invalidity Contentions, Exhibit 250-A-41, *Webroot, Inc. and Open Text, Inc.* v. *Trend Micro, Inc.*, Case No. 6:22-cv-00239-ADA-DTG, W.D. Tex., Nov. 1, 2023, 40 pgs.
Defendant's Final Invalidity Contentions, Exhibit 250-A-42, *Webroot, Inc. and Open Text, Inc.* v. *Trend Micro, Inc.*, Case No. 6:22-cv-00239-ADA-DTG, W.D. Tex., Nov. 1, 2023, 36 pgs.
Defendant's Final Invalidity Contentions, Exhibit 389-A-13, *Webroot, Inc. and Open Text, Inc.* v. *Trend Micro, Inc.*, Case No. 6:22-cv-00239-ADA-DTG, W.D. Tex., Nov. 1, 2023, 77 pgs.
Defendant's Final Invalidity Contentions, Exhibit 389-A-38, *Webroot, Inc. and Open Text, Inc.* v. *Trend Micro, Inc.*, Case No. 6:22-cv-00239-ADA-DTG, W.D. Tex., Nov. 1, 2023, 37 pgs.
Defendant's Final Invalidity Contentions, Exhibit 389-A-39, *Webroot, Inc. and Open Text, Inc.* v. *Trend Micro, Inc.*, Case No. 6:22-cv-00239-ADA-DTG, W.D. Tex., Nov. 1, 2023, 21 pgs.
Defendant's Final Invalidity Contentions, Exhibit 389-A-40, *Webroot, Inc. and Open Text, Inc.* v. *Trend Micro, Inc.*, Case No. 6:22-cv-00239-ADA-DTG, W.D. Tex., Nov. 1, 2023, 52 pgs.
Defendant's Final Invalidity Contentions, Exhibit 389-A-41, *Webroot, Inc. and Open Text, Inc.* v. *Trend Micro, Inc.*, Case No. 6:22-cv-00239-ADA-DTG, W.D. Tex., Nov. 1, 2023, 42 pgs.
Defendant's Final Invalidity Contentions, Exhibit 389-A-42, *Webroot, Inc. and Open Text, Inc.* v. *Trend Micro, Inc.*, Case No. 6:22-cv-00239-ADA-DTG, W.D. Tex., Nov. 1, 2023, 33 pgs.
Defendant's Final Invalidity Contentions, Exhibit 389-A-43, *Webroot, Inc. and Open Text, Inc.* v. *Trend Micro, Inc.*, Case No. 6:22-cv-00239-ADA-DTG, W.D. Tex., Nov. 1, 2023, 31 pgs.
Defendant Sophos Ltd.'s Final Invalidity Contentions, Exhibit 250-A-18, *Webroot, Inc. and Open Text, Inc.* v. *Sophos Ltd.*, Case No. 6:22-cv-00240-ADA-DTG, W.D. Tex., Nov. 1, 2023, 123 pgs.
Defendant Sophos Ltd.'s Final Invalidity Contentions, Exhibit 250-B, *Webroot, Inc. and Open Text, Inc.* v. *Sophos Ltd.*, Case No. 6:22-cv-00240-ADA-DTG, W.D. Tex., Nov. 1, 2023, 42 pgs.

(56) References Cited

OTHER PUBLICATIONS

Defendant Sophos Ltd.'s Final Invalidity Contentions, Exhibit 389-A-21, *Webroot, Inc. and Open Text, Inc. v. Sophos Ltd.*, Case No. 6:22-cv-00240-ADA-DTG, W.D. Tex., Nov. 1, 2023, 160 pgs.
Defendant Sophos Ltd.'s Final Invalidity Contentions, Exhibit 389-B, *Webroot, Inc. and Open Text, Inc. v. Sophos Ltd.*, Case No. 6:22-cv-00240-ADA-DTG, W.D. Tex., Nov. 1, 2023, 23 pgs.
Defendant Sophos Ltd.'s Final Invalidity Contentions, Exhibit 123-A-1, *Webroot, Inc. and Open Text, Inc. v. Sophos Ltd.*, Case No. 6:22-cv-00240-ADA-DTG, W.D. Tex., Nov. 1, 2023, 54 pgs.
Defendant Sophos Ltd.'s Final Invalidity Contentions, Exhibit 123-A-8, *Webroot, Inc. and Open Text, Inc. v. Sophos Ltd.*, Case No. 6:22-cv-00240-ADA-DTG, W.D. Tex., Nov. 1, 2023, 252 pgs.
Defendant Sophos Ltd.'s Final Invalidity Contentions, Exhibit 123-B, *Webroot, Inc. and Open Text, Inc. v. Sophos Ltd.*, Case No. 6:22-cv-00240-ADA-DTG, W.D. Tex., Nov. 1, 2023, 46 pgs.
Defendant Forcepoint LLC's Final Invalidity Contentions, Exhibit 721-C-1, *Webroot, Inc. and Open Text, Inc. v. Forcepoint LLC*, No. 6:22-CV-00342-ADA-DTG (WD, Texas), Nov. 1, 2023, 49 pgs.
Defendant Forcepoint LLC's Final Invalidity Contentions, Exhibit 721-C-2, *Webroot, Inc. and Open Text, Inc. v. Forcepoint LLC*, No. 6:22-CV-00342-ADA-DTG (WD, Texas), Nov. 1, 2023, 80 pgs.
Defendant Forcepoint LLC's Final Invalidity Contentions, Exhibit 721-C-3, *Webroot, Inc. and Open Text, Inc. v. Forcepoint LLC*, No. 6:22-CV-00342-ADA-DTG (WD, Texas), Nov. 1, 2023, 79 pgs.
Defendant Forcepoint LLC's Final Invalidity Contentions, Exhibit 721-C-4, *Webroot, Inc. and Open Text, Inc. v. Forcepoint LLC*, No. 6:22-CV-00342-ADA-DTG (WD, Texas), Nov. 1, 2023, 97 pgs.
Defendant Forcepoint LLC's Final Invalidity Contentions, Exhibit 721-C-5, *Webroot, Inc. and Open Text, Inc. v. Forcepoint LLC*, No. 6:22-CV-00342-ADA-DTG (WD, Texas), Nov. 1, 2023, 30 pgs.
Defendant Forcepoint LLC's Final Invalidity Contentions, Exhibit 721-C-6, *Webroot, Inc. and Open Text, Inc. v. Forcepoint LLC*, No. 6:22-CV-00342-ADA-DTG (WD, Texas), Nov. 1, 2023, 26 pgs.
Defendant Forcepoint LLC's Final Invalidity Contentions, Exhibit 721-C-7, *Webroot, Inc. and Open Text, Inc. v. Forcepoint LLC*, No. 6:22-CV-00342-ADA-DTG (WD, Texas), Nov. 1, 2023, 32 pgs.
Defendant Forcepoint LLC's Final Invalidity Contentions, Exhibit 721-C-8, *Webroot, Inc. and Open Text, Inc. v. Forcepoint LLC*, No. 6:22-CV-00342-ADA-DTG (WD, Texas), Nov. 1, 2023, 38 pgs.
Defendant Forcepoint LLC's Final Invalidity Contentions, Exhibit 721-C-9, *Webroot, Inc. and Open Text, Inc. v. Forcepoint LLC*, No. 6:22-CV-00342-ADA-DTG (WD, Texas), Nov. 1, 2023, 40 pgs.
Defendant Forcepoint LLC's Final Invalidity Contentions, Exhibit 721-C-10, *Webroot, Inc. and Open Text, Inc. v. Forcepoint LLC*, No. 6:22-CV-00342-ADA-DTG (WD, Texas), Nov. 1, 2023, 29 pgs.
Defendant Forcepoint LLC's Final Invalidity Contentions, Exhibit 721-C-11, *Webroot, Inc. and Open Text, Inc. v. Forcepoint LLC*, No. 6:22-CV-00342-ADA-DTG (WD, Texas), Nov. 1, 2023, 37 pgs.
Defendant Forcepoint LLC's Final Invalidity Contentions, Exhibit 721-C-12, *Webroot, Inc. and Open Text, Inc. v. Forcepoint LLC*, No. 6:22-CV-00342-ADA-DTG (WD, Texas), Nov. 1, 2023, 34 pgs.
Defendant Forcepoint LLC's Final Invalidity Contentions, Exhibit 721-C-13, *Webroot, Inc. and Open Text, Inc. v. Forcepoint LLC*, No. 6:22-CV-00342-ADA-DTG (WD, Texas), Nov. 1, 2023, 40 pgs.
Defendant Forcepoint LLC's Final Invalidity Contentions, Exhibit 721-C-14, *Webroot, Inc. and Open Text, Inc. v. Forcepoint LLC*, No. 6:22-CV-00342-ADA-DTG (WD, Texas), Nov. 1, 2023, 40 pgs.
Defendant Forcepoint LLC's Final Invalidity Contentions, Exhibit 721-C-15, *Webroot, Inc. and Open Text, Inc. v. Forcepoint LLC*, No. 6:22-CV-00342-ADA-DTG (WD, Texas), Nov. 1, 2023, 33 pgs.
Defendant Forcepoint LLC's Final Invalidity Contentions, Exhibit 721-C-16, *Webroot, Inc. and Open Text, Inc. v. Forcepoint LLC*, No. 6:22-CV-00342-ADA-DTG (WD, Texas), Nov. 1, 2023, 21 pgs.
Defendant Forcepoint LLC's Final Invalidity Contentions, Exhibit 721-C-17, *Webroot, Inc. and Open Text, Inc. v. Forcepoint LLC*, No. 6:22-CV-00342-ADA-DTG (WD, Texas), Nov. 1, 2023, 21 pgs.
Defendant Sophos Ltd.'s Final Invalidity Contentions, Exhibit 721-A-23, *Webroot, Inc. and Open Text, Inc. v. Sophos Ltd.*, Case No. 6:22-cv-00240-ADA-DTG, W.D. Tex., Nov. 1, 2023, 88 pgs.
Defendant Sophos Ltd.'s Final Invalidity Contentions, Exhibit 721-B, *Webroot, Inc. and Open Text, Inc. v. Sophos Ltd.*, Case No. 6:22-cv-00240-ADA-DTG, W.D. Tex., Nov. 1, 2023, 70 pgs.
Roberts, Paul, "Big Picture Security—A Multiplicity of Threats Yields an Ever-Expanding Variety of Defenses Spewing Gobs of Security Data Security Event," InfoWorld, vol. 26, Issue 44, Nov. 1, 2004, 6 pgs.
Pappas, Vasilis, et al., Transparent ROP Exploit Mitigation Using Indirect Branch Tracing, Proceedings of the 22nd USENIX Security Symposium, Washington, DC, Usenix Association, Columbia University, Aug. 14-16, 2013, pp. 447-462.
Cowan, Crispan, et al., Stackguard: Automatic Adaptive Detection and Prevention of Buffer-Overflow Attacks, 7th USENIX Security Symposium, San Antonio, TX, Usenix Association, Jan. 26-29, 1998, 16 pgs.
Asaka, Midori, et al., Information Gathering with Mobile Agents for an Intrusion Detection System, Systems and Computers in Japan, vol. 30, No. 2, 1999, 7 pgs.
Asaka, Midori, et al., Remote Attack Detection Method in IDA: MLSI-Based Intrusion Detection with Discriminant Analysis, Electronics and Communications in Japan, Part 1, vol. 86, No. 4, 2003, pp. 50-62, Wiley Periodicals, Inc. (translated from Denshi Joho Tshushin Gakki Ronbunshi, vol. J85-B, No. 1, Jan. 2002, pp. 60-74).
Kaplan, Yariv, API Spying Techniques for Windows 9x, NT and 2000, The Wayback Machine at https://web.archive.org/web/20001009011848/http://www.inte . . ., Oct. 9, 2000, 11 pgs.
Kephart, Jeffrey, et al., "An Immune System for Cyberspace," 1997 IEEE Int'l Conf. on Systems, Man, and Cybernetics, Computational Cybernetics and Simulation 1, vol. 1, 1997, pp. 879-884.
King, Samuel, et al., Enriching intrusions alerts through multi-host causality, Proceedings of the Network and Distributed System Security Symposium, 2005, San Diego, California, Jan. 1, 2005, 12 pgs.
Li, Zhenmin, et al., UCLog: A Unified, Correlated Logging Architecture for Intrusion Detection, In'tl Conf. on Telecomm. Sys. Modeling & Analysis, Jan. 2004, 15 pgs.
Lunt, Teresa F., et al., A Real-Time Intrusion-Detection Expert System, SRI International, Menlo Park, CA, Feb. 28, 1992, 166 pgs.
PrevX Home launches Worlds first free consumer intrusion prevention system, M2 Presswire, M2 Communications Ltd., Jun. 16, 2004, 2 pgs.
PrevX Home v20 Shuts the Door on the Unknown and Unwanted Internet Security Threats Upgrade to First In, Business Wire, Nov. 5, 2004, 2 pgs.
Yu, Dong and Frincke, Deborah, Alert Confidence Fusion in Intrusion Detection Systems with Extended Dempster-Shafer Theory, Proceedings of the 43rd Annual Southeast Regional Conference, vol. 2, 2005, 6 pgs.
Proventia Desktop User Guide, Version 8.0, Internet Security Systems, Inc., Atlanta, GA, Mar. 24, 2005, 132 pgs.
Feng, Henry H., et al., "Anomaly Detection Using Call Stack Information," 2003 Symposium on Security and Privacy, Berkeley, CA, 003, pp. 62-75, available at https://ieeexplore.ieee.org/document/1199328.
Kruegel, Christopher, et al., Bayesian Event Classification for Intrusion Detection, 19th Annual Computer Security Applications Conference 2003, pp. 14-23.
Yurcik, William, et al., UCLog+: A Security Data Management System for Correlating Alerts, Incidents, and Raw Data From Remote Logs, Cornell University, arXiv:cs/0607111, Jul. 25, 2006, 10 pgs.
Publications on Data Mining/Machine Learning on Systems, UCSD Operating Systems Research Group, The Wayback Machine at https://web.archive.org/web/20100907170802/http://opera.ucsd.edu:80/pub_sysmining.html, 1 pg.
Nachenberg, Carey, Behavior Blocking: The Next Step in Anti-Virus Protection, SecurityFocus, at http://ww.securityfocus.com/print/infocus/1557, Mar. 19, 2002, 7 pgs.
Ranum, Marcos J., Tales From The Early Days of the Firewall Presentation, 33 pgs.

(56) References Cited

OTHER PUBLICATIONS

Moffie, Micha, and Kaeli, David, "ASM: Application Security Monitor", ACM SIGARCH Computer Architecture News, Dec. 2005, pp. 21-26.
Chari, Suresh N., and Cheng, Pau-Chen, "BlueBoX: A policy-driven, host-based intrusion detection system," ACM Transactions on Information and System Security, vol. 6, No. 2, May 2003, pp. 173-200.
Vasudevan, Amit, and Yerraballi, Ramesh, "SPiKE: Engineering Malware Analysis Tools using Unobtrusive Binary-Instrumentation", Proceedings of the 29th Australasian Computer Science Conference, Tasmania, Australia, vol. 48, Jan. 2006, 10 pgs.
Rabek, Jesse C., et al., "Detection of injected, dynamically generated, and obfuscated malicious code", Proceedings of the 2003 ACM workshop on Rapid Malcode, 2003, pp. 76-82.
Kruegel, Christopher, et al., Intrusion Detection and Correlation: Challenges and Solutions, Springer, ISBN: 978-0-387-23398-7, 2005, 87 pgs.
Pfleeger, Charles P., and Pfleeger, Shari Lawrence, Security in Computing, 4th Edition, Prentice Hall, Jan. 2006, 237 pgs.
Abrams, Lawrence, Using Blacklight to detect and remove Rootkits from your computer, May 18, 2006, F-Secure, 8 pgs.
Adelstein, Frank, Stillerman, Matt, and Kozen, Dexter, Malicious Code Detection for Open Firmware, Proceedings of the 18th Annual Computer Security Applications Conference, IEEE, Jun. 2002, 10 pgs.
Chow, Sherman, et al., A generic anti-spyware solution by access control list at kernel level, The Journal of Systems and Software 75 (www.sciencedirect.com) available Jul. 15, 2004, pp. 227-234.
The Cure—F-Secure Blacklight (Beta Release), Aug. 2, 2005, The Wayback Machine at https://web.archive.org.web/20050802004302/http://www.f-secure.com:80/blacklight/cure.shtml, F-Secure, 2 pgs.
Grizzard, Jullian, On a µ-Kernel Based System Architecture Enabling Recovery from Rootkits, Proceedings of the First IEEE International Workshop on Critical Infrastructure Protection, IEEE, (07695-2426-5/05) Nov. 2005, 9 pgs.
Iglio, Pietro, TrustedBox: a Kernel-Level Integrity Checker, 15th Annual Computer Security Applications Conference, Phoenix, AZ, IEEE, Dec. 6-10, 1999, 20 pgs.
Kruegel, Christopher et al., Detecting Kernel-Level Rootkits Through Binary Analysis, 20th Annual Computer Security Applications Conference, Tucson, AZ, IEEE, Dec. 6-10, 2004, 18 pgs.
Levine, John G., et al., A Methodology to Characterize Kernel Level Rootkit Exploits that Overwrite the System Call Table, IEEE SoutheastCon, 2004, Proceedings., Greensboro, NC, pp. 25-31.
Levine, John, et al., Application of a Methodology to Characterize Rootkits Retrieved from Honeynets, Proceedings of the 2004 IEEE Workshop on Information Assurance, U.S. Military Academy, West Point, NY, Jun. 10-11, 2004, pp. 15-21.
Levine, John G., et al., Detecting and Categorizing Kernel-Level Rootkits to Aid Future Detection, IEEE Security & Privacy, IEEE (www.computer.org/security/), Feb. 2006, pp. 24-32.
Liang, Zhenkai, et al., Isolated Program Execution: An Application Transparent Approach for Executing Untrusted Programs, Proceedings of the 19th Annual Computer Security Applications Conference, 2003, IEEE, 10 pgs.
Mulliner, Collin, et al., Using Labeling to Prevent Cross-Service Attacks Against Smart Phones, 3rd International Conference, Detections of Intrusions and Malware & Vulnerability Assessment, Berlin, Germany, Jul. 13-14, 2006, pp. 91-108.
Munson, John C. and Wimer, Scott, Watcher: The Missing Piece of the Security Puzzle, 17th Annual Computer Security Applications Conference, New Orleans, LA, IEEE, Dec. 10-14, 2001, 17 pgs.
Provos, Niels, Improving Host Security with System Call Policies, Proceedings of the 12th USENIX Security Symposium, The USENIX Association (www.usenix.org), Aug. 4-8, 2003, pp. 257-271.
Quynh, Nguyen Anh, and Takefui, Yoshiyasu, A Real-time Integrity Monitor for Xen Virtual Machine, International Conference on Networking and Services, Jul. 2006, Silicon Valley, CA, IEEE, 20 pgs.
Shi, Weidong, et al., An Intrusion-Tolerant and Self-Recoverable Network Service System Using A Security Enhanced Chip Multiprocessor, Second International Conference on Autonomic Computing, Seattle, WA, IEEE, Jun. 13-16, 2005, 12 pgs.
Wang, Yi-Min, et al., Detecting Stealth Software with Strider GhostBuster, International Conference on Dependable Systems and Networks, Yokohama, Japan, IEEE, 2005, pp. 368-377.
Wright, Chris, et al., Linux Security Modules: General Security Support for the Linux Kernel, 11th USENIX Security Symposium, San Francisco, CA, Aug. 5-9, 2002, 21 pgs.
Xu, Haizhi, Du, Wenliang, and Chapin, Steve J., Detecting Exploit Code Execution in Loadable Kernel Modules, 20th Annual Computer Security Applications Conference, Tucson, AZ, IEEE, Dec. 6-10, 2004, 18 pgs.
Zhou, Jingyu and Vigna, Giovanni, Detecting Attacks That Exploit Application-Logic Errors Through Application-Level Auditing, 20th Annual Computer Security Applications Conference, Tucson, AZ, IEEE, Dec. 6-10, 2004, 19 pgs.
Ren, Jiangchun, Dai, Kui, and Wang, Zhiying, Trust-Enhanced Alteration Scenario For Universal Computer, 11th International Symposium Pacific Rim Dependable Computing, Changsha, Hunan, China, IEEE, Dec. 12-14, 2005, 10 pgs.
Schmid, Matthew, Hill, Frank, and Ghosh, Anup K., Protecting Data from Malicious Software, Proceedings of the 18th Annual Computer Security Applications Conference, IEEE, Dec. 2002, 10 pgs.
Russinovich, Mark, Monitoring Registry Activity During the Boot Process, The Wayback Machine at https://web.archive.org/web/20050622032630/http://www.sysinternals.com . . . , Nov. 2, 1998, 3 pgs.
Russinovich, Mark and Cogswell, Bryce, Regmon for Windows NT/9x, The Wayback Machine at https://web.archive.org/web/20050622023903/http://www.sysinternals.com:80/ . . . , Apr. 7, 2005, 4 pgs.
U.S. Appl. No. 60/762,359, filed Jan. 25, 2006, Kronenberg.
U.S. Appl. No. 60/806,143, filed Jun. 2006, Shukla.
CounterTack Scout and CounterTack Sentinel product sheet, CounterTack, Inc., Waltham, MA, at https://web.archive.org/web/20130310054238/http:/www.countertack.com/virtual-machine-introspection/, 2013, 2 pgs.
Baratloo, Arash et al., Transparent Run-Time Defense Against Stack-Smashing Attacks, Proceedings of the 2000 USENIX Annual Technical Conf., San Diego, CA, Jun. 18-23, 2000, 13 pgs.
Goel, Ashvin et al., The Taser Intrusion Recovery System, SOSP '05, Oct. 23-26, 2005, Brighton, UK, 14 pgs.
PR Newswire, ArcSight Introduces Security Management Solution, Westlaw, Jan. 28, 2002, 4 pgs.
King, Samuel T. et al., Backtracking Intrusions, ACM Transactions on Computer Systems, vol. 23, No. 1, Feb. 2005, pp. 51-76.
Xie, Yinglian, A Spatiotemporal Event Correlation Approach to Computer Security, School of Computer Science, Carnegie Mellon University, Pittsburgh, PA, Aug. 2005, 148 pgs.
TrendMicro Control Manager 6.0, Patch 2 Administrator's Guide, Trend Micro Incorporated, Cupertino, CA, Feb. 2013, 573 pgs.
Symantec Insight and SONAR product sheet, at https://vox.veritas.com/legacyfs/online/veritasdata/Sep. 2012%20Insight%20and%20SONAR%20Factsheet, 5 pgs.
Vigna, Giovanni, et al., Host-Based Intrusion Detection, https://sites.cs.ucsb.edu/~chris/research/doc/infsec05_hids.pdf, Jun. 15, 2005, 13 pgs.
Know Your Enemy: Sebek—A kernel based data capture tool, Nov. 17, 2003, The Honeynet Project, https://www.cs.jhu.edu/~rubin/courses/sp04/sebek.pdf, Nov. 17, 2003, 21 pgs.
Patil, Swapail, et al., I3FS: An In-Kernel Integrity Checker and Intrusion Detection File System, https://www.filesystems.org/docs/i3fs/i3fs.html, Sep. 17, 2004, 17 pgs.
Bravo, Pablo, Proactive Detection of Kernel-Mode Rootkits, 2011 Sixth Int'l Conf. on Availability, Reliability, Security, IEEE, https://ieeexplore.ieee.org/ document/6045970, Oct. 17, 2011, 6 pgs.
Fratric, Ivan, ROPGuard: Runtime Prevention of Return-Oriented Programming Attacks, Sep. 24, 2012, 49 pgs.
Fratric, Ivan, Runtime Prevention of Return-Oriented Programming Attacks, Github.com, https://github.com/ivanfratric/ropguard, Aug. 26, 2012, 2 pgs.

(56) References Cited

OTHER PUBLICATIONS

Srivastava, Abhinav, Efficient Protection of Kernel Data Structures via Object Partitioning, ACSAC, Orlando, FL, https://dl.acm.org/doi/10.1145/242095.2421012, Dec. 3-7, 2012, 10 pgs.
Stojanovski, Nanad, Bypassing Data Execution Prevention on Microsoft Windows Xp SP2, Second Int'l Conf. on Availability, Reliability, and Security, https://ieeexplore.ieee.org/document/4159930, Apr. 23, 2007, 5 pgs.
Egele, Manuel et al., A Survey on Automated Dynamic Malware-Analysis Techniques and Tools, ACM Computing Surveys, vol. 44, No. 2, Article 6, Feb. 8, 2012, 42 pgs.
Ficco, Massimo et al., A Generic Intrusion Detection and Diagnose System Based on Complex Event Processing, 2011 First Int'l Conf. on Data Compression, Communications and Processing, 2011, 10 pgs.
Giura, Paul, A Context-Based Detection Framework for Advanced Persistent Threats, 2012 Int'l Conf. on Cyber Security, 2012, 6 pgs.
Hua, Jingyu et al., Efficient Context-Sensitive Intrusion Detection Based on State Transition Table, IEICE Trans. Fundamentals, vol. E94-A, No. 1, Jan. 2011, pp. 255-264.
Johnson, Michael C., Correlating Intrusion Detection Events: A Data Mining & Profiling Approach, George Mason University, Fairfax, Virginia, 2005, 210 pgs.
Krugel, Christopher, Decentralized Event Correlation, ICICS 2001, LCS 2288, 2002, pp. 114-131.
Myers, Justin, et al., Insider Threat Detection Using Distributed Event Correlation of Web Server Logs, Int'l Conf. on Information Warfare and Security, Apr. 2010, 11 pgs.
Porras, Phillip, et al., EMERALD: Event Monitoring Enabling Responses to Anomalous Live Disturbances, 20th NISSC, Oct. 9, 1997, 15 pgs.
Jacobson, Emily et al., Detecting Code Reuse Attacks with a Model of Conformant Program Execution, Int'l Symposium on Engineering Secure Software and Systems, Feb. 2014, pp. 1-18.
StackwalkerAPI Programmer's Guide, 8.0 Release, Nov. 2012, Paradyn Parallel Performance Tools, Computer Sciences Department, University of Wisconsin, Madison, WI, 33 pgs.
Scott, David, et al., Abstracting Application-Level Web Security, WWW 2002, Honolulu, HI, May 7-11, 2002, pp. 396-407.
Dewald, Andreas, et al., ADSandbox: Sandboxing JavaScript to fight Malicious Websites, SAC' 2010, Sierre, Switzerland, Mar. 22-26, 2010, pp. 1859-1864.
Le, Van Lam, et al., Identification Of Potential Malicious Web Pages, Australian Computer Society, Ninth Australasian Information Security Conf., Perth Australia, CRPIT vol. 116 Information Security, 2011, pp. 33-40.
Canali, David, et al., Prophiler: A Fast for the Large-Scale Detection of Malicious Web Pages, WWW 2011 Session: Web Security, Hyderabad, IN, Mar. 28-Apr. 1, 2011, 10 pgs.
Chen, Kevin, et al., WebPatrol: Automated Collection and Replay of Web-based Malware Scenarios, ASIACCS, 2011, Hong Kong, CN, Mar. 22-24, 2011, pp. 186-195.
Yan, Wei, et al., Toward Automatic Discovery of Malware Signature for Anti-Virus Cloud Computing, Int'l Conf. on Complex Sciences, Springer, Berlin, Heidelberg, 2009, pp. 724-728.
Martinez, Cristian Adrian, et al., Malware detection based on Cloud Computing Integrating Intrusion Ontology Representation, IEEE Latin-American Conf. on Communications, 2010, 6 pgs.
Wang, Shu-Ching, et al., A Three-Phases Scheduling in a Hierarchical Cloud Computing Network, Third Int'l Conf. on Communications and Mobile Computing, IEEE, 2011, pp. 114-117.
Epshteyn, Arkady, Dejong, Gerald, Generative Prior Knowledge for Discriminative Classification, Journal of Artificial Intelligence Research 27, 2006, pp. 25-53.
Wei, Songjie, Mirkovic, Jelena, Building Reputations for Internet Clients, Electronic Notes in Theoretical Computer Science, 179, 2007, pp. 17-30.
Xia, Yingjie, Song, Guanghua, Zheng, Yao, Ni, Jun, Zhu, Mingzhe, A Small World Overlay P2P Transfer System with Role-Based and Reputation-Based Access Control Policies, 2008 Int'l Conf. on Internet Computing in Science and Engineering, IEEE, 2008, pp. 517-520.
Xu, Ziyao, He, Yeping, Deng, Lingli, A Multilevel Reputation System for Peer-to-Peer Networks, Sixth Int'l Conf. on Grid and Cooperative Computing (GCC 2007), IEEE, 2007, 8 pgs.
Arnold, William and Tesauro, Gerald, Automatically Generated WIN32 Heuristic Virus Detection, Virus Bulletin Conf., Oxfordshire, England, Sep. 2000, pp. 51-60.
Abou-Assaleh, Tony, Cercone, Nick, Keselj, Vlado, Sweidan, Ray, N-gram-based Detection of New Malicious Code, IEEE, Sep. 30, 2004, 2 pgs.
Aswini, A.M., Vinod, P., Towards the Detection of Android Malware Using Ensemble Features, Journal of Information Assurance and Security, ISSN 1554-1010 vol. 9, 2014, pp. 375-387.
Baldangombo, Usukhbayar, Jambaljav, Nyamjav, Horng, Shi-Jinn, A Static Malware Detection System Using Data Mining Methods, arXiv:1308.2831, Jul. 4, 2013, 13 pgs.
Cortes, Corinna and Vapnik, Vladimir, Support-Vector Networks, Machine Learning, 20, Sep. 1995 Kluwer Academic Publishers, Boston, pp. 273-297.
Demertzis, Konstantinos and Iliadis, Lazaros, Evolving Computational Intelligence System for Malware Detection, LNBIP 178, Jun. 20, 2014, Springer Int'l Publishing, Switzerland, pp. 322-334.
Firdausi, Ivan, Lim, Charles, Erwin, Alva and Nugroho, Anto Satriyo, Analysis of Machine Learning Techniques Used in Behavior-Based Malware Detection, IEEE, Dec. 3, 2010, pp. 201-203.
Aafer, Yousra, Du, Wenliang, Yin, Heng, DroidAPIMiner: Mining API-Level Features for Robust Malware Detection in Android, https://www.researchgate.net/publication/278705505, Sep. 2013, 18 pgs.
Islam, Rafiqul, Ronghua, Tian, Batten, Lynn and Versteeg, Steve, Classification of Malware Based on String and Function Feature Selection, CTC IEEE, 2010, pp. 9-17.
Lai, Ying-Xu, A Feature Selection for Malicious Detection, Ninth ACIS Int'l Conf. on Software Engineering, Artificial Intelligence, Networking, and Parallel/Distributed Computing, 2008, IEEE, pp. 365-370.
Leder, Felix, Steinbock, Bastian, and Martini, Peter, Classification and Detection of Metamorphic Malware using Value Set Analysis, IEEE, Oct. 14, 2009, pp. 39-46.
Liangboonprakong, Chatchai, Sornil, Ohm, Classification of Malware Families Based on N-grams Sequential Pattern Features, Proceedings of the 2013 IEEE 8$^{th}$ Conf. on Industrial Electronics and Applications, Melbourne, Australia, Jun. 19-21, 2013, pp. 777-782.
Markel, Zane and Bilzor, Michael, Building a Machine Learning Classifier for Malware Detection, IEEE, Oct. 23, 2014, 4 pgs.
Masud, Mehedy, Khan, Latifur, and Thuraisingham, Bhavani, Data Mining Tools for Malware Detection, CRC Press, 2011, 680 pgs.
Menahem, Eitan, Shabtai, Asaf, Rokach, Lior, and Elovici, Yuval, Improving Malware Detection by Applying Multi-Inducer Ensemble, Elsevier, Computational Statistics and Data Analysis 53, Feb. 2009, pp. 1483-1494.
Raman, Karthick, Selecting Features to Classify Malware, Adobe Systems, Inc., 2012, 5 pgs.
Tahan, Gil, Rokach, Lior, and Shahar, Yuval, Mal-ID: Automatic Malware Detection Using Common Segment Analysis and Meta-Features, Journal of Machine Learning, Apr. 2012, pp. 949-979.
Tian, Ronghua, An Integrated Malware Detection and Classification System, 2011, 283 pgs.
Islam, Rafiqul, Tian, Ronghua, Batten, Lynn, and Versteeg, Steve, Classification of Malware Based on Integrated Static and Dynamic Features, Journal of Network and Computer Applications, No. 36, Nov. 2, 2022, pp. 646-656.
Jiang, Quinshan, Zhao, Xinxing, Huang, Kai, A Feature Selection Method for Malware Detection, Jun. 2011, 6 pgs.
Apel, Martin, BISKUP, Joachim, FLEGEL, Ulrich and Meier, Michael, "Towards Early Warning Systems—Challenges, Technologies and Architecture," Critical Information Infrastructures Security, 2009, 14 pgs.
Doumas, Anatasia, Mavroudakis, Konstantinos, Gritzalis, Dimitris, Katsikas, Sokratis, Design of a Neural Network for Recognition and

(56) References Cited

OTHER PUBLICATIONS

Classification of Computer Viruses, Computers & Security, Elsevier Science Ltd., 14, 1995, pp. 435-448.
Faruki, Parvez et al., AndroSimilar: Robust Statistical Feature Signature for Android Malware Detection, SIN '13, Aksaray, Turkey, Nov. 26-28, 2013, 8 pgs.
Guo, Shanqing, et al., A Fine-Grained Classification Approach for the Packed Malicious Code, T.W. Chim and T.H. Yue (Eds.): ICICS 2012, LNCS 7618, Springer-Verlag Berlin Heidelberg, 2012, pp. 497-504.
Jeong, Young-Seob, et al., Malware Detection on Byte Streams of PDF Files Using Convolutional Neural Networks, Hindawi, Security and Communication Networks, vol. 2019, Article ID 8485365, 9 pgs.
Lam, Ho-Yu, and Yeung, Dit-Yan, A Learning Approach to Spam Detection based on Social Networks, CEAS 2007—Fourth Conf. on Email and Anti-Spam, Mountain View, CA, Aug. 2-3, 2007, 10 pgs.
Perdisci, Roberto, Lanzi, Andrea, and Lee, Wenke, Classification of Packed Executables for Accurate Computer Virus Detection, Elsevier, Jun. 2008, 15 pgs.
Babu Rajesh V, Phaninder Reddy, Himanshu P and Mahesh U Patil, Androinspector: A System for Comprehensive Analysis of Android Applications, Int'l Journal of Network Security & Its Application (IJNSA), vol. 7, No. 5, Sep. 2015, 22 pgs.
Ravula, Ravindar Reddy, Classification of Malware Using Reverse Engineering and Data Mining Techniques, Aug. 2011, Akron, 104 pgs.
Runwal, Neha, Graph Technique for Metamorphic Virus Detection, San Jose, CA, Dec. 2011, 93 pgs.
Sahs, Justin and Khan, Latifur, A Machine Learning Approach to Android Malware Detection, 2012 European Intelligence and Security Informatics Conf., IEEE 2012, pp. 141-147.
Schultz, Matthew G., Eskin, Eleazar, Zadok, Erez, and Stolfo, Salvatore J., Data Mining Methods for Detection of New Malicious Executables, Proceedings 2001 IEEE Symposium on Security and Privacy, S&P 2001, 2001, pp. 38-49.
Tan, Jun, Chen, Xingshu and Du, Min, An Internet Traffic Identification Approach Based on GA and PSO-SVM, Journal of Computers, vol. 7, No. 1, Jan. 2012, pp. 19-29.
Tian, R, Batten, L.M., Versteeg, S.C., Function Length as a Tool for Malware Classification, 2008 $3^{rd}$ Int'l Conf. on Malicious and Unwanted Software (MALWARE), Los Alamitos, CA, 2008, pp. 69-76.
Tesauro, Gerald J., Kephart, Jeffrey O., Sorkin, Gregory B., Neural Networks for Computer Virus Recognition, Aug. 1996, pp. 5-6.
Walenstein, Andrew, Venable, Michael, Hayes, Matthew, Thompson, Christopher, and Lakhotia, Arun, Exploiting Similarity Between Variants to Defeat Malware, Computer Science, 2007, 12 pgs.
Wang, Tzu-Yen, WU, Chin-Hsiung, Hsieh, Chu-Cheng, Detecting Unknown Malicious Executables Using Portable Executable Headers, 2009 Fifth Int'l Joint Conf. on INC, IMS, and IDC, 2009, pp. 278-284.
Gorton, Dan, Extending Intrusion Detection with Alert Correlation, Department of Computer Engineering, Chalmers University of Technology, Sweden, 2003, 121 pgs.
Shafiq, M. Zubair, S. Momina Tabish, Fauzan Mirza, and Muddassar Farooq, "A Framework For Efficient Mining Of Structural Information To Detect Zero-Day Malicious Portable Executables," Next Generation Intelligent Networks Research Center, nexGIN RC, Tech. Rep., Jan. 2009, 30 pgs.
Wang, Tzu-Yen, and Chin-Hsiung Wu, "Detection of Packed Executables Using Support Vector Machines," 2011 Int'l Conf. on Machine Learning and Cybernetics, IEEE, vol. 2, Jul. 2011, pp. 717-722.
Shafiq, M. Zubair, S. Tabish, and Muddassar Farooq, "PE-Probe: Leveraging Packer Detection and Structural Information to Detect Malicious Portable Executables," Proceedings of the Virus Bulletin Conf., vol. 8., Jun. 2009, 10 pgs.
Nath, Hiran V., and Babu M. Mehtre, "Static Malware Analysis Using Machine Learning Methods," In Recent Trends in Computer Networks and Distributed Systems Security: Second Int'l Conf., Trivandrum, India, Springer Berlin Heidelberg, Mar. 13-14, 2014, pp. 440-450.
Sun, Li, Steven Versteeg, Serdar Bozta, and Trevor Yann, "Pattern Recognition Techniques for the Classification of Malware Packers," ACISP 2010, Sydney, Australia, Jul. 5-7, 2010, pp. 370-390.
Nataraj, Lakshmanan, Grégoire Jacob, and B. S. Manjunath, "Detecting Packed executables based on raw binary data," *VRL, ECE*, 2010, 6 pgs.
Tang, Yuchun, Sven Krasser, Yuanchen He, Weilai Yang, and Dmitri Alperovitch, "Support Vector Machines and Random Forests Modeling for Spam Senders Behavior Analysis," 2008 IEEE Global Telecommunications Conf., IEEE, 2008, pp. 1-5.
S. Krasser, B. Meyer and P. Crenshaw, "Valkyrie: Behavioral Malware Detection Using Global Kernel-Level Telemetry Data," 2015 IEEE 25th Int'l Workshop on Machine Learning for Signal Processing, Boston, MA, 2015, pp. 1-6.
Hsu, Chih-Wei, Chih-Chung Chang, and Chih-Jen Lin, "A Practical Guide to Support Vector Classification," Department of Computer Science, Taiwan, 2003 (last updated Apr. 15, 2010), 16 pgs.
Krasser, Sven, Yuchun Tang, Jeremy Gould, Dmitri Alperovitch, and Paul Judge, "Identifying Image Spam Based on Header and File Properties Using C4. 5 Decision Trees and Support Vector Machine Learning," Proceedings of the 2007 IEEE Workshop on Information Assurance, West Point, NY, Jun. 2007, 7 pgs.
Cynomix malware visualization tool, The Wayback Machine—https://web.archive.org/web/20141006050639/http://cynomix.org:80/, Cynomix, 2 pgs.
Check Point Anti-Bot Software Blade Product Sheet, The Wayback Machine—https://web.archive.org/web/20150320181749/http://www.checkpoint.com/products/anti-bot-software-blade/index.html/, Check Point Software Technologies Ltd., 2015, 5 pgs.
Check Point Anti-Spam Software Blade Product Sheet, The Wayback Machine—https://web.archive.org/web/20150316022003/http://www.checkpoint.com:80//products/anti-spam-email-security-software-blade/index.html/, Check Point Software Technologies Ltd., 2015, 3 pgs.
Check Point URL Filtering Software Blade Product Sheet, The Wayback Machine—https://web.archive.org/web/20150317044930/http://www.checkpoint.com:80/products/url-filtering-software-blade/index.html/, 3 pgs.
Check Point Secure Web Gateway Product Sheet, The Wayback Machine—https://web.archive.org/web/20150313011752/http://www.checkpoint.com:80/products/next-generation-secure-web-gateway/index.html/, Check Point Software Technologies Ltd., 2015, 3 pgs.
McAfee Email Protection Product Sheet, The Wayback Machine—https://web.archive.org/web/20150317020514/http://www.mcafee.com/us/products/email-protection.aspx, McAfee Corp., San Jose, CA, 2015, 2 pgs.
McAfee Web Protection Product Sheet, The Wayback Machine—https://web.archive.org/web/20150317030901/http://www.mcafee.com/us/products/web-protection.aspx/, McAfee Corp., San Jose, CA, 2014, 2 pgs.
McAfee Content Security Suite Product Sheet, The Wayback Machine—https://web.archive.org/web/20140122063324/http://www.mcafee.com/us/products/content-security-suite.aspx/, McAfee Corp., San Jose, CA, 2014, 11 pgs.
McAfee Mobile Virus Scan Product Sheet, The Wayback Machine—https://web.archive.org/web/20150317022132/http://www.mcafee.com/us/products/virusscan-mobile.aspx/, McAfee Corp., San Jose, CA, 2015, 2 pgs.
McAfee Advanced Threat Defense Product Sheet, The Wayback Machine—https://web.archive.org/web/20140122063921/http://www.mcafee.com/us/products/advanced-threat-defense.aspx/, McAfee Corp., San Jose, CA, 2014, 5 pgs.
McAfee Endpoint Protection Product Sheet, The Wayback Machine—https://web.archive.org/web/20140122063414/http://www.mcafee.com/us/products/endpoint-protection-advced-suite.aspx/, McAfee Corp., San Jose, CA, 2014, 11 pgs.
Check Point Threat Prevention Appliance Product Sheet, The Wayback Machine—https://web.archive.org/web/20131219213701/http://www.checkpoint.com:80/products/secure-web-gateway-appliance/ind.../, Check Point Software Technologies Ltd., 2013, 5 pgs.

(56) References Cited

OTHER PUBLICATIONS

Symantec Instant Messaging Security.cloud Product Sheet, The Wayback Machine—https://web.archive.org/web/20140122064248/http://www.symantec.com/us/products/instant-messaging-secur.../, Symantec, Cupertino, CA, 2014, 13 pgs.
Symantec Web Security Product Sheet, The Wayback Machine—https://web.archive.org/web/20150423061313/http://www.symantec.com:80//web-security-cloud/, Symantec, Cupertino, CA, 2015, 13 pgs.
Symantec AntiSpam Product Sheet, The Wayback Machine—https://web.archive.org/web/20140122071106/http://www.symantec.com/premium-antispam/, Symantec, Cupertino, CA, 2014, 12 pgs.
Symantec Email Security Product Sheet, The Wayback Machine—https://web.archive.org/web/20140122064243/http://www.symantec.com/email-security-cloud, Symantec, Cupertino, CA, 2014, 13 pgs.
White Paper: Endpoint Protection.cloud, Technical Product Overview, Symantec, Mountain View, CA, 2011, 13 pgs.
Webroot SecureAnywhere Web Security Service Datasheet, Endpoint Protection, Webroot Inc., Broomfield, CO, Jan. 2015, 4 pgs.
Trend Micro InterScan Messaging Security Datasheet, Trend Micro Inc., 2014, 4 pgs.
Trend Micro Apex One (Mac), Administrator's Guide, Trend Micro Inc., Version 2019, 170 pgs.
Trend Micro Worry-Free Business Security Services Datasheet, Trend Micro Inc., 2010, 2 pgs.
File Reputation Service Datasheet, Open Text and BrightCloud, 2022, 2 pgs.
BrightCloud Mobile App Reputation Service Datasheet, Webroot Inc., Broomfield, CO, Feb. 2014, 4 pgs.
BrightCloud IP Reputation Service Datasheet, BrightCloud, copyright 2022, 2 pgs.
BrightCloud Web Classification Service and Web Reputation Services Datasheet, BrightCloud, 2022, 4 pgs.
BrightCloud Real-Time Anti-Phishing Service Datasheet, BrightCloud, 2022, 2 pgs.
Trend Micro Smart Protection Server 2.6, Administrator's Guide, Trend Micro Inc., Apr. 2013, 86 pgs.
Trend Micro NeatSuite for small and medium businesses Datasheet, Trend Micro Inc., 2004, 2 pgs.
Trend Micro Client/Service Suite for small and medium businesses Datasheet, Trend Micro Inc., 2003-2004, 2 pgs.
Trend Micro Deep Discovery Analyzer Datasheet, Trend Micro Inc., 2014, 3 pgs.
Trend Micro Hosted Email Security Datasheet, Trend Micro Inc., 2015, 2 pgs.
Abraham, Ajith, Jain, Ravi, Johnson, Thomas, and Han, Sang Yong, D-SCIDS: Distributed Soft Computing Intrusion Detection System, Journal of Network and Computer Application, 2007, pp. 81-98.
Dai, Shuaifu, Liu, Yaxi, Wang, Tielei, Wei, Tao, and Zou, Wei, Behavior-Based Malware Detection on Mobile Phone, IEEE, Sep. 25, 2010, 4 pgs.
Del Grosso, Nick, It's Time to Rethink your Corporate Malware Strategy, SANS Institute, Feb. 24, 2002, 12 pgs.
Jiang, Xiao, Hao, Zhiyu, and Wang, Yanming, A Malware Sample Capturing and Tracking System, 2010 Second WRI World Congress on Software Engineering, IEEE, 2010, pp. 69-72.
Kumar, Brijesh and Katsinis, Constantine, A Network Based Approach to Malware Detection in Large IT Infrastructures, Ninth IEEE Int'l Symposium on Network Computing and Application, Jul. 17, 2010, pp. 188-191.
Scanlan, Joel, Lorimer, Samuel, Hartnett, Jacky, and Manderson, Kevin, Intrusion Detection by Intelligent Analysis of Data Across Multiple Gateways in Real-Time, School of Computing, University of Tasmania, 8 pgs.
Bhattacharyya, Manasi, Hershkop, Shlomo, and Eskin, Eleazar, MET: An Experimental System for Malicious Email Tracking, 2002, 8 pgs.

Blue Coat WebFilter product sheet, Block Malware and Filter Content According to Strict Policy Controls, EdgeBlue.com, 1 pg. at https://web.archive.org/web/20101122082933/http://www.edgeblue.com:80/WebFilter.asp.
Colajanni, Michele, Gozzi, Daniele, and Marchetti, Mirco, Collaborative Architecture for Malware Detection and Analysis, Int'l Federation for Information Processing, Proceedings of the IFIP TC 11 23$^{rd}$ Int'l Information Security Conf., vol. 278, 2008, pp. 79-93.
Firstbrook, Peter, and Orans, Lawrence, Magic Quadrant for Secure Web Gateway, Gartner Ras Core Research Note G00172783, Jan. 8, 2010, 20 pgs.
Marchetti, Mirco, Gozzi, Daniele, and Colajanni, Michele, Peer-to-Peer Architecture for Collaborative Intrusion and Malware Detection on a Large Scale, Int'l Journal of Information Security, ISC '09: Proceedings of the 12th Int'l Conf. on Information Security, 2009, pp. 475-490.
Oberheide, Jon, Cooke, Evan and Jahanian, Farnam, CloudAV: N-Version Antivirus in a Network Cloud, USENIX Security Symposium, San Jose, CA, 2008, 24 pgs.
Royal, Paul, Halpin, Mitch, Dagon, David, Edmonds, Robert, Lee, Wenke, PolyUnpack: Automating the Hidden-Code Extraction of Unpack-Executing Malware, 22nd Annual Computer Security Applications Conf., 2006, 11 pgs.
Xin, Wang, Ting-Lei, Huang, and Zhi-Jian, Ren, Research on the Anti-Virus System of Military Network Based on Cloud Security, Oct. 2010, IEEE, pp. 656-659.
Zheng, Xufel, and Fang, Yonghui, An AIS-based Cloud Security Model, Int'l Conf. on Intelligent Control and Information Processing, Dalian, CN, Aug. 13-15, 2010, pp. 153-158.
James P. Anderson Co., Computer Security Threat Monitoring and Surveillance, Feb. 26, 1980 (Rev. Apr. 15, 1980), Fort Washington, PA, 56 pgs.
Anderson, Debra, Lunt, Teresa F., Javitz, Harold, Tamaru, Ann, Valdes, Alfonso, Detecting Unusual Program Behavior Using the Statistical Component of the Next-generation Intrusion Detection Expert System (NIDES), Trusted Information Systems, Mountain View, CA (Contract No. 910097C), May 1995, 86 pgs.
Berk, Vincent, et al., Designing a Framework for Active Worm Detection on Global Networks, IEEE, Mar. 24, 2003, 13 pgs.
Bolton, Stacy, Aladdin Esafe Enterprise v3.0, Global Information Assurance Certification Paper, Sans Institute, Aug. 1, 2002, 18 pgs.
Cai, Min, et al., Collaborative Internet Worm Containment, 3, IEEE Computer Society, Jun. 13, 2005, pp. 25-33.
Chuvakin, Anton, Security Event Analysis through Correlation, Information Systems Security, May/Jun. 2004, pp. 13-18.
Conry-Murray, Andrew, Product Focus: Behavior-Blocking Stops Unknown Malicious Code, Network Magazine, Jun. 5, 2002, 10 pgs. at http://networkmagazine.com/article/NMG20020603S0009/1.
CoreTrace Corporation: ECM 3000, Preliminary Product and Technical Information, 2 pgs., retrieved Sep. 12, 2022, at https://web.archive.org/web/20050307224541/http://www.coretrace.com:80/ecm.html.
Websense CPM Explorer v6.1, Administrator's Guide, Websense, Inc., San Diego, CA, Sep. 19, 2005, 77 pgs.
Dagon, David, et al., HoneyStat: Local Worm Detection Using Honeypots, Recent Advances In Intrusion Detection, RAID 2004, pp. 39-58.
Denning, Dorothy E., An Intrusion-Detection Model, IEEE Transactions on Software Engineering, vol. SE-13, No. 2, Feb. 1987, pp. 222-232.
Forrest, Stephanie, Hofmeyr, Steven A., and Somayaji, Anil, and Longstaff, Thomas A., A Sense of Self for Unix Processes, IEEE Symposium on Security and Privacy, IEEE Computer Society Press, Los Alamitos, CA, 1996, pp. 120-128.
Forrest, Stephanie, Hofmeyr, Steven A., and Somayaji, Anil, Computer Immunology, Communications of the ACM, vol. 40, Oct. 1997, pp. 88-96.
Hedberg, Sara, Combating Computer Viruses: IBM's new computer immune system, Industry Spotlight, IEEE Explore, Summer 1996, pp. 9-11.

(56) References Cited

OTHER PUBLICATIONS

Higgins, Kelly Jackson, Sandbox the Hackers—They're spreading viruses and stealth code. One Way to stop them: block, or 'sandbox,' the culprits, InternetWeek, Manhasset Iss. 858, Apr. 23, 2001, pp. 29-33.
Inoue, Hajime and Forrest, Stephanie, Anomaly Intrusion Detection in Dynamic Execution Environments, NSPW Proceedings of the 2002 Workshop on New Security Paradigms, Sep. 2002, pp. 52-60.
Javitz, Harold S. and Valdes, Alfonso, The NIDES Statistical Component Description and Justification, Annual Report, SRI Project 3131, Mar. 7, 1994, 52 pgs.
King, Christopher M., Security Management: Making Sense Of Events, Business Communications Review, Sep. 2001, pp. 32-38.
Leung, Linda, Advanced Technologies Aim to Protect Network Asset, Profiling Cybercrime: Network Threats And Defense Strategies, Nov. 29, 2004, pp. 56.
Nance, Barry, Server-Based Java Security Products Help Guard Your Enterprise Flank, Network Computing (www.networkcomputing.com), Dec. 1, 1998, pp. 86-99.
NetRanger Intrustion Detection System, Wheel Group Corporation, San Antonio, TX, 1997, 4 pgs.
NeuSecure 3.0, Security Management and Incident Response Platform for the Enterprise, GuardedNet, 2005, 37 pgs. at https://web.archive.org/web/20040403183424/http://www.guarded.net:80/neusecure3.0.html.
Okena StormWatch, A New Approach To Intrusion Detection: Intrusion Prevention, Intrusion Prevention White Paper, Okena, Waltham, MA, 2002, 17 pgs.
Prevx Home 2.0 Launches as Version 1.0 continues to outperform major league anti-virus and firewall products, Prevx—News and Press Releases, San Francisco, CA, 2004, 2 pgs.
PR Newswire, Finjan Software and F-Secure to Deliver Proactive Content Security For Corporate PCs in New Era of Malicious Code, PR Newswire Association LLC, New York, NY, Oct. 30, 2000, 4 pgs.
Rivest, R., The MD5 Message-Digest Algorithm, MIT Laboratory for Computer Science and RSA Data Security, Inc., Apr. 1992, 21 pgs.
SandBox Security's Secure4U, Sandbox Security AG, Germany, last modified Dec. 7, 2000, 151 pgs. at https://web.archive.org/web/20010304104828/http://sandboxsecurity.com:80/products/index.htm.
Shieh, Shiuh-Pyng and Gilgor, Virgil D., A Pattern-Oriented Intrusion-Detection Model and Its Applications, IEEE, 1991, 16 pgs.
Shieh, Shiuh-Pyng and Gilgor, Virgil D., On a Pattern-Oriented Model for Intrusion Detection, IEEE Transactions on Knowledge and Data Engineering, vol. 9, No. 4, Jul./Aug. 1997, pp. 661-667.
Finjan SurfinGuard Pro 5.7, at https://web.archive.org/web/20050207211129/http://www.finjan.com:80/Products/HomeUsers-SurfinGuardPro/default. asp (last visited Sep. 11, 2022) Finjan Software, 2005, 12 pgs.
Using Management Center for Cisco Security Agents 4.0, Cisco Systems, Inc., San Jose, CA, 2003, 413 pgs.
Webroot Spy Sweeper Enterprise: Key Features, Webroot Software, Inc., Boulder, CO, copyright 2002-2005, 2 pgs.
The Digital Immune System, Technical Brief, Symantec, Cupertino, CA, 2001, 16 pgs.
White, Steve R., Swimmer, Morton, Pring, Edward, Arnold, William C., Chess, David M. and Morar, John F., "Anatomy of a Commercial-Grade Immune System", 1999, 28 pgs.
Malin, C.H., Casey, E. and Aquilina, J.M., Malware Forensics: Investigating And Analyzing Malicious Code, Syngress, 2008, 692 pgs.
Bace, Rebecca, and Mell, Peter, NIST Special Publication On Intrusion Detection Systems, Macmillan Technical Publishing, Indianapolis, IN, 2001, 143 pgs.
Snapp, Steven R., et al., A System for Distributed Intrusion Detection, San Francisco, Feb. 25-Mar. 1, 1991, 11 pgs.
Security Threat Manager Product Sheet, OpenService, Inc., https://webarchive.org/web/20031002025323/http://www.open.com:80/products/products.shtml, copyright 2002-2003, 27 pgs.
Goel, Ashvin, Forensix: A Robust, High-Performance Reconstruction System, Proceedings of the 25th IEEE Int'l Conf. on Distributed Computing Systems Workshops, 2005, 8 pgs.
Lunt, Teresa F. et al., IDES: The Enhanced Prototype, A Real-Time Intrusion-Detection Expert System, Computer Science Laboratory, SRI International, Menlo Park, CA, Oct. 1988, 89 pgs.
Klosterboer, Larry, Implementing ITIL Configuration Management, IBM Press, 2007, 252 pgs.
Debar, Herve et al., Aggregation and Correlation of Intrusion-Detection Alerts, RAID 2001, LNCS 2212, 2001, pp. 85-103.
Carrier, Brian D. and Matheny, B., Methods for Cluster-Based Incident Detection, Information Assurance Workshop, 2004, Proceedings, Second IEEE International, IEEE, May 2004, 8 pgs.
Xie, Yinglian, Kim, Hyang-Ah, O'Hallaron, David R., Reiter, Michael K. and Zhang, Hui, "Seurat: A Pointillist Approach To Anomaly Detection," In Recent Advances in Intrusion Detection: 7th Int'l Symposium, RAID 2004, Sophia Antipolis, France, Sep. 15-17, 2004, 20 pgs.
Burbeck, Kalle and Nadjm-Tehrani, Simin, ADWICE—Anomaly Detection with Real-Time Incremental Clustering, Information Security and Cryptology, 7th Int'l Conf., Seoul, KR, Dec. 2-3, 2004, 26 pgs.
Just, J.E., et al., "Learning Unknown Attacks—A Start," Foundations of Intrusion Tolerant Systems, IEEE, Dec. 2003, 19 pgs.
Parkhouse, Jayne, Pelican SafeTNet 2.0 Product Review, The Wayback Machine https://web.archive.org/web/20030729191240/http://www.scmagazine.com :80/scma . . . , SC Magazine, Jun. 2000, 5 pgs.
Valdes, Alfonso, and Keith Skinner, "Probabilistic Alert Correlation," In Recent Advances in Intrusion Detection: 4th Int'l Symposium, RAID 2001 Davis, CA, Oct. 10-12, 2001, pp. 54-68.
Tolle, Jens, Jahnke, Marko, Bussmann, Michael, and Henkel, Sven, "Meta IDS Environments: An Event Message Anomaly Detection Approach," Third IEEE Int'l Workshop on Information Assurance, IEEE, 2005, pp. 85-94.
Defendant Forcepoint LLC's Preliminary Invalidity Contentions, *Webroot, Inc. and Open Text, Inc. v. Forcepoint LLC*, No. 6:22-CV-00342-ADA-DTG (WD, Texas), Sep. 13, 2022, 149 pgs.
Defendant Sophos Ltd.'s Preliminary Invalidity Contentions, *Webroot, Inc. and Open Text, Inc.. v. Sophos Ltd.*, CA. No. 6:22-CV-00240-ADA-DTG, W.D. Tex., Sep. 13, 2022, 127 pgs.
Defendant's Preliminary Invalidity Contentions, *Webroot Inc. and Open Text, Inc.. v. Trend Micro Inc.*, CA. No. 6:22-CV-00239-ADA-DTG, W.D. Tex., Sep. 13, 2022, 125 pgs.
Defendant AO Kaspersky Lab.'s Preliminary Invalidity Contentions, *Webroot Inc. and Open Text, Inc. v. AO Kaspersky Lab*, CA. No. 6:22-CV-00243-ADA-DTG, W.D. Tex., Sep. 14, 2022, 23 pgs.
Crowdstrike's Preliminary Invalidity Contentions, *Webroot, Inc. and Open Text, Inc. v. Crowdstrike, Inc.*, No. 6:22-CV-00241-ADA-DTG (WD, Texas), Sep. 13, 2022, 62 pgs.
Crowdstrike's Preliminary Invalidity Contentions (Patents Asserted by Amendment), *Webroot, Inc. and Open Text, Inc. v. Crowdstrike, Inc.*, No. 6:22 CV-00241-ADA-DTG (WD, Texas), Feb. 21, 2023, 86 pgs.
Crowdstrike's First Supplemental Preliminary Invalidity Contentions, *Webroot, Inc. and Open Text, Inc. v. Crowdstrike, Inc.*, No. 6:22 CV-00241-ADA-DTG (WD, Texas), Apr. 25, 2023, 85 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, 205 pgs.
Defendant AO Kaspersky Lab's Preliminary Invalidity Contentions—Appendix A, Prior Art Index, *Webroot, Inc. and Open Text, Inc. v. AO Kaspersky Lab*, No. 6:22-CV-00243 (WD, Texas), Sep. 14, 2022, 8 pgs.
Defendant AO Kaspersky Lab's Preliminary Invalidity Contentions—Appendix B, Invalidity Claim Chart Index, *Webroot, Inc. and Open Text, Inc. v. AO Kaspersky Lab*, No. 6:22-CV-00243 (WD, Texas), Sep. 14, 2022, 1 pg.

(56) References Cited

OTHER PUBLICATIONS

Defendant AO Kaspersky Lab's Preliminary Invalidity Contentions, *Webroot, Inc. and Open Text, Inc. v. AO Kaspersky Lab,* No. 6:22-CV-00243 (WD, Texas), Feb. 21, 2023, 23 pgs.
Defendant AO Kaspersky Lab's Preliminary Invalidity Contentions—Appendix C, Prior Art Index, *Webroot, Inc. and Open Text, Inc. v. AO Kaspersky Lab,* No. 6:22-CV-00243 (WD, Texas), Feb. 21, 2023, 4 pgs.
Defendant AO Kaspersky Lab's Preliminary Invalidity Contentions—Appendix D, Invalidity Claim Chart Index, *Webroot, Inc. and Open Text, Inc. v. AO Kaspersky Lab,* No. 6:22-CV-00243 (WD, Texas), Feb. 21, 2023, 1 pg.
Defendant Sophos Ltd.'s Preliminary Invalidity Contentions for Patent Plaintiffs Added by Amendment, *Webroot, Inc. and Open Text, Inc. v. Sophos Ltd.,* No. 6:22-CV-00240-ADA-DTG (WD, Texas), Feb. 21, 2023, 167 pgs.
Defendant's Preliminary Invalidity Contentions, *Webroot, Inc. and Open Text, Inc. v. Trend Micro Inc.,* No. 6:22-CV-239-ADA-DTG, Feb. 21, 2023, 94 pgs.
Defendant Crowdstrike Holdings, Inc.'s Preliminary Invalidity Contentions, Exhibit 045-A-1, *Webroot, Inc. and Open Text, Inc. v. Crowdstrike Holdings, Inc.,* No. 6:22-CV-00241-ADA-DTG (WD, Texas), Sep. 13, 2022, 35 pgs.
Defendant Crowdstrike Holdings, Inc.'s Preliminary Invalidity Contentions, Exhibit 045-A-2, *Webroot, Inc. and Open Text, Inc. v. Crowdstrike Holdings, Inc.,* No. 6:22-CV-00241-ADA-DTG (WD, Texas), Sep. 13, 2022, 36 pgs.
Defendant Crowdstrike Holdings, Inc.'s Preliminary Invalidity Contentions, Exhibit 045-A-3, *Webroot, Inc. and Open Text, Inc. v. Crowdstrike Holdings, Inc.,* No. 6:22-CV-00241-ADA-DTG (WD, Texas), Sep. 13, 2022, 52 pgs.
Defendant Crowdstrike Holdings, Inc.'s Preliminary Invalidity Contentions, Exhibit 045-A-4, *Webroot, Inc. and Open Text, Inc. v. Crowdstrike Holdings, Inc.,* No. 6:22-CV-00241-ADA-DTG (WD, Texas), Sep. 13, 2022, 34 pgs.
Defendant Crowdstrike Holdings, Inc.'s Preliminary Invalidity Contentions, Exhibit 045-A-5, *Webroot, Inc. and Open Text, Inc. v. Crowdstrike Holdings, Inc.,* No. 6:22-CV-00241-ADA-DTG (WD, Texas), Sep. 13, 2022, 33 pgs.
Defendant Crowdstrike Holdings, Inc.'s Preliminary Invalidity Contentions, Exhibit 045-A-6, *Webroot, Inc. and Open Text, Inc. v. Crowdstrike Holdings, Inc.,* No. 6:22-CV-00241-ADA-DTG (WD, Texas), Sep. 13, 2022, 15 pgs.
Defendant Crowdstrike Holdings, Inc.'s Preliminary Invalidity Contentions, Exhibit 045-A-7, *Webroot, Inc. and Open Text, Inc. v. Crowdstrike Holdings, Inc.,* No. 6:22-CV-00241-ADA-DTG (WD, Texas), Sep. 13, 2022, 16 pgs.
Defendant Crowdstrike Holdings, Inc.'s Preliminary Invalidity Contentions, Exhibit 045-A-8, *Webroot, Inc. and Open Text, Inc. v. Crowdstrike Holdings, Inc.,* No. 6:22-CV-00241-ADA-DTG (WD, Texas), Sep. 13, 2022, 69 pgs.
Defendant Crowdstrike Holdings, Inc.'s Preliminary Invalidity Contentions, Exhibit 045-A-9, *Webroot, Inc. and Open Text, Inc. v. Crowdstrike Holdings, Inc.,* No. 6:22-CV-00241-ADA-DTG (WD, Texas), Sep. 13, 2022, 21 pgs.
Defendant Crowdstrike Holdings, Inc.'s Preliminary Invalidity Contentions, Exhibit 045-A-10, *Webroot, Inc. and Open Text, Inc. v. Crowdstrike Holdings, Inc.,* No. 6:22-CV-00241-ADA-DTG (WD, Texas), Sep. 13, 2022, 21 pgs.
Defendant Crowdstrike Holdings, Inc.'s Preliminary Invalidity Contentions, Exhibit 045-A-11, *Webroot, Inc. and Open Text, Inc. v. Crowdstrike Holdings, Inc.,* No. 6:22-CV-00241-ADA-DTG (WD, Texas), Sep. 13, 2022, 38 pgs.
Defendant Crowdstrike Holdings, Inc.'s Preliminary Invalidity Contentions, Exhibit 045-A-12, *Webroot, Inc. and Open Text, Inc. v. Crowdstrike Holdings, Inc.,* No. 6:22-CV-00241-ADA-DTG (WD, Texas), Sep. 13, 2022, 34 pgs.
Defendant Crowdstrike Holdings, Inc.'s Preliminary Invalidity Contentions, Exhibit 045-A-13, *Webroot, Inc. and Open Text, Inc. v. Crowdstrike Holdings, Inc.,* No. 6:22-CV-00241-ADA-DTG (WD, Texas), Sep. 13, 2022, 50 pgs.
Defendant Crowdstrike Holdings, Inc.'s Preliminary Invalidity Contentions, Exhibit 045-A-14, *Webroot, Inc. and Open Text, Inc. v. Crowdstrike Holdings, Inc.,* No. 6:22-CV-00241-ADA-DTG (WD, Texas), Sep. 13, 2022, 38 pgs.
Defendant Crowdstrike Holdings, Inc.'s Preliminary Invalidity Contentions, Exhibit 045-A-15, *Webroot, Inc. and Open Text, Inc. v. Crowdstrike Holdings, Inc.,* No. 6:22-CV-00241-ADA-DTG (WD, Texas), Sep. 13, 2022, 43 pgs.
Defendant Crowdstrike Holdings, Inc.'s Preliminary Invalidity Contentions, Exhibit 045-A-16, *Webroot, Inc. and Open Text, Inc. v. Crowdstrike Holdings, Inc.,* No. 6:22-CV-00241-ADA-DTG (WD, Texas), Sep. 13, 2022, 52 pgs.
Defendant Crowdstrike Holdings, Inc.'s Preliminary Invalidity Contentions, Exhibit 045-A-17, *Webroot, Inc. and Open Text, Inc. v. Crowdstrike Holdings, Inc.,* No. 6:22-CV-00241-ADA-DTG (WD, Texas), Sep. 13, 2022, 47 pgs.
Defendant Crowdstrike Holdings, Inc.'s Preliminary Invalidity Contentions, Exhibit 045-A-18, *Webroot, Inc. and Open Text, Inc. v. Crowdstrike Holdings, Inc.,* No. 6:22-CV-00241-ADA-DTG (WD, Texas), Sep. 13, 2022, 57 pgs.
Defendant Crowdstrike Holdings, Inc.'s Preliminary Invalidity Contentions, Exhibit 045-A-*Webroot, Inc. and Open Text, Inc. v. Crowdstrike Holdings, Inc.,* No. 6:22-CV-00241-ADA-DTG (WD, Texas), Sep. 13, 2022, 66 pgs.
Defendant Crowdstrike Holdings, Inc.'s Preliminary Invalidity Contentions, Exhibit 045-A-20, *Webroot, Inc. and Open Text, Inc. v. Crowdstrike Holdings, Inc.,* No. 6:22-CV-00241-ADA-DTG (WD, Texas), Sep. 13, 2022, 97 pgs.
Defendant Crowdstrike Holdings, Inc.'s Preliminary Invalidity Contentions, Exhibit 045-A-21, *Webroot, Inc. and Open Text, Inc. v. Crowdstrike Holdings, Inc.,* No. 6:22-CV-00241-ADA-DTG (WD, Texas), Sep. 13, 2022, 46 pgs.
Defendant Crowdstrike Holdings, Inc.'s Preliminary Invalidity Contentions, Exhibit 045-A-22, *Webroot, Inc. and Open Text, Inc. v. Crowdstrike Holdings, Inc.,* No. 6:22-CV-00241-ADA-DTG (WD, Texas), Sep. 13, 2022, 15 pgs.
Defendant Crowdstrike Holdings, Inc.'s Preliminary Invalidity Contentions, Exhibit 045-A-23, *Webroot, Inc. and Open Text, Inc. v. Crowdstrike Holdings, Inc.,* No. 6:22-CV-00241-ADA-DTG (WD, Texas), Sep. 13, 2022, 17 pgs.
Defendant Crowdstrike Holdings, Inc.'s Preliminary Invalidity Contentions, Exhibit 045-A-24, *Webroot, Inc. and Open Text, Inc. v. Crowdstrike Holdings, Inc.,* No. 6:22-CV-00241-ADA-DTG (WD, Texas), Sep. 13, 2022, 75 pgs.
Defendant Crowdstrike Holdings, Inc.'s Preliminary Invalidity Contentions, Exhibit 045-A-25, *Webroot, Inc. and Open Text, Inc. v. Crowdstrike Holdings, Inc.,* No. 6:22-CV-00241-ADA-DTG (WD, Texas), Sep. 13, 2022, 16 pgs.
Defendant Crowdstrike Holdings, Inc.'s Preliminary Invalidity Contentions, Exhibit 045-A-26, *Webroot, Inc. and Open Text, Inc. v. Crowdstrike Holdings, Inc.,* No. 6:22-CV-00241-ADA-DTG (WD, Texas), Sep. 13, 2022, 18 pgs.
Defendant Crowdstrike Holdings, Inc.'s Preliminary Invalidity Contentions, Exhibit 045-A-27, *Webroot, Inc. and Open Text, Inc. v. Crowdstrike Holdings, Inc.,* No. 6:22-CV-00241-ADA-DTG (WD, Texas), Sep. 13, 2022, 25 pgs.
Defendant Crowdstrike Holdings, Inc.'s Preliminary Invalidity Contentions, Exhibit 045-A-28, *Webroot, Inc. and Open Text, Inc. v. Crowdstrike Holdings, Inc.,* No. 6:22-CV-00241-ADA-DTG (WD, Texas), Sep. 13, 2022, 14 pgs.
Defendant Crowdstrike Holdings, Inc.'s Preliminary Invalidity Contentions, Exhibit 045-A-29, *Webroot, Inc. and Open Text, Inc. v. Crowdstrike Holdings, Inc.,* No. 6:22-CV-00241-ADA-DTG (WD, Texas), Sep. 13, 2022, 40 pgs.
Defendant Crowdstrike Holdings, Inc.'s Preliminary Invalidity Contentions, Exhibit 045-A-30, *Webroot, Inc. and Open Text, Inc. v. Crowdstrike Holdings, Inc.,* No. 6:22-CV-00241-ADA-DTG (WD, Texas), Sep. 13, 2022, 19 pgs.

(56) References Cited

OTHER PUBLICATIONS

Defendant Crowdstrike Holdings, Inc.'s Preliminary Invalidity Contentions, Exhibit 045-A-31, *Webroot, Inc. and Open Text, Inc. v. Crowdstrike Holdings, Inc.*, No. 6:22-CV-00241-ADA-DTG (WD, Texas), Sep. 13, 2022, 45 pgs.
Defendant Crowdstrike Holdings, Inc.'s Preliminary Invalidity Contentions, Exhibit 045-A-32, *Webroot, Inc. and Open Text, Inc. v. Crowdstrike Holdings, Inc.*, No. 6:22-CV-00241-ADA-DTG (WD, Texas), Sep. 13, 2022, 19 pgs.
Defendant Crowdstrike Holdings, Inc.'s Preliminary Invalidity Contentions, Exhibit 045-A-33, *Webroot, Inc. and Open Text, Inc. v. Crowdstrike Holdings, Inc.*, No. 6:22-CV-00241-ADA-DTG (WD, Texas), Sep. 13, 2022, 42 pgs.
Defendant Crowdstrike Holdings, Inc.'s Preliminary Invalidity Contentions, Exhibit 045-A-34, *Webroot, Inc. and Open Text, Inc. v. Crowdstrike Holdings, Inc.*, No. 6:22-CV-00241-ADA-DTG (WD, Texas), Sep. 13, 2022, 51 pgs.
Defendant Crowdstrike Holdings, Inc.'s Preliminary Invalidity Contentions, Exhibit 045-B, *Webroot, Inc. and Open Text, Inc. v. Crowdstrike Holdings, Inc.*, No. 6:22-CV-00241-ADA-DTG (WD, Texas), Sep. 13, 2022, 129 pgs.
Defendant Crowdstrike Holdings, Inc.'s Preliminary Invalidity Contentions, Exhibit 224-A-1, *Webroot, Inc. and Open Text, Inc. v. Crowdstrike Holdings, Inc.*, No. 6:22-CV-00241-ADA-DTG (WD, Texas), Sep. 13, 2022, 53 pgs.
Defendant Crowdstrike Holdings, Inc.'s Preliminary Invalidity Contentions, Exhibit 224-A-2, *Webroot, Inc. and Open Text, Inc. v. Crowdstrike Holdings, Inc.*, No. 6:22-CV-00241-ADA-DTG (WD, Texas), Sep. 13, 2022, 53 pgs.
Defendant Crowdstrike Holdings, Inc.'s Preliminary Invalidity Contentions, Exhibit 224-A-3, *Webroot, Inc. and Open Text, Inc. v. Crowdstrike Holdings, Inc.*, No. 6:22-CV-00241-ADA-DTG (WD, Texas), Sep. 13, 2022, 73 pgs.
Defendant Crowdstrike Holdings, Inc.'s Preliminary Invalidity Contentions, Exhibit 224-A-4, *Webroot, Inc. and Open Text, Inc. v. Crowdstrike Holdings, Inc.*, No. 6:22-CV-00241-ADA-DTG (WD, Texas), Sep. 13, 2022, 47 pgs.
Defendant Crowdstrike Holdings, Inc.'s Preliminary Invalidity Contentions, Exhibit 224-A-5, *Webroot, Inc. and Open Text, Inc. v. Crowdstrike Holdings, Inc.*, No. 6:22-CV-00241-ADA-DTG (WD, Texas), Sep. 13, 2022, 55 pgs.
Defendant Crowdstrike Holdings, Inc.'s Preliminary Invalidity Contentions, Exhibit 224-A-6, *Webroot, Inc. and Open Text, Inc. v. Crowdstrike Holdings, Inc.*, No. 6:22-CV-00241-ADA-DTG (WD, Texas), Sep. 13, 2022, 34 pgs.
Defendant Crowdstrike Holdings, Inc.'s Preliminary Invalidity Contentions, Exhibit 224-A-7, *Webroot, Inc. and Open Text, Inc. v. Crowdstrike Holdings, Inc.*, No. 6:22-CV-00241-ADA-DTG (WD, Texas), Sep. 13, 2022, 33 pgs.
Defendant Crowdstrike Holdings, Inc.'s Preliminary Invalidity Contentions, Exhibit 224-A-8, *Webroot, Inc. and Open Text, Inc. v. Crowdstrike Holdings, Inc.*, No. 6:22-CV-00241-ADA-DTG (WD, Texas), Sep. 13, 2022, 112 pgs.
Defendant Crowdstrike Holdings, Inc.'s Preliminary Invalidity Contentions, Exhibit 224-A-9, *Webroot, Inc. and Open Text, Inc. v. Crowdstrike Holdings, Inc.*, No. 6:22-CV-00241-ADA-DTG (WD, Texas), Sep. 13, 2022, 47 pgs.
Defendant Crowdstrike Holdings, Inc.'s Preliminary Invalidity Contentions, Exhibit 224-A-10, *Webroot, Inc. and Open Text, Inc. v. Crowdstrike Holdings, Inc.*, No. 6:22-CV-00241-ADA-DTG (WD, Texas), Sep. 13, 2022, 39 pgs.
Defendant Crowdstrike Holdings, Inc.'s Preliminary Invalidity Contentions, Exhibit 224-A-11, *Webroot, Inc. and Open Text, Inc. v. Crowdstrike Holdings, Inc.*, No. 6:22-CV-00241-ADA-DTG (WD, Texas), Sep. 13, 2022, 72 pgs.
Defendant Crowdstrike Holdings, Inc.'s Preliminary Invalidity Contentions, Exhibit 224-A-12, *Webroot, Inc. and Open Text, Inc. v. Crowdstrike Holdings, Inc.*, No. 6:22-CV-00241-ADA-DTG (WD, Texas), Sep. 13, 2022, 72 pgs.
Defendant Crowdstrike Holdings, Inc.'s Preliminary Invalidity Contentions, Exhibit 224-A-13, *Webroot, Inc. and Open Text, Inc. v. Crowdstrike Holdings, Inc.*, No. 6:22-CV-00241-ADA-DTG (WD, Texas), Sep. 13, 2022, 62 pgs.
Defendant Crowdstrike Holdings, Inc.'s Preliminary Invalidity Contentions, Exhibit 224-A-14, *Webroot, Inc. and Open Text, Inc. v. Crowdstrike Holdings, Inc.*, No. 6:22-CV-00241-ADA-DTG (WD, Texas), Sep. 13, 2022, 95 pgs.
Defendant Crowdstrike Holdings, Inc.'s Preliminary Invalidity Contentions, Exhibit 224-A-15, *Webroot, Inc. and Open Text, Inc. v. Crowdstrike Holdings, Inc.*, No. 6:22-CV-00241-ADA-DTG (WD, Texas), Sep. 13, 2022, 79 pgs.
Defendant Crowdstrike Holdings, Inc.'s Preliminary Invalidity Contentions, Exhibit 224-A-16, *Webroot, Inc. and Open Text, Inc. v. Crowdstrike Holdings, Inc.*, No. 6:22-CV-00241-ADA-DTG (WD, Texas), Sep. 13, 2022, 95 pgs.
Defendant Crowdstrike Holdings, Inc.'s Preliminary Invalidity Contentions, Exhibit 224-A-17, *Webroot, Inc. and Open Text, Inc. v. Crowdstrike Holdings, Inc.*, No. 6:22-CV-00241-ADA-DTG (WD, Texas), Sep. 13, 2022, 78 pgs.
Defendant Crowdstrike Holdings, Inc.'s Preliminary Invalidity Contentions, Exhibit 224-A-18, *Webroot, Inc. and Open Text, Inc. v. Crowdstrike Holdings, Inc.*, No. 6:22-CV-00241-ADA-DTG (WD, Texas), Sep. 13, 2022, 93 pgs.
Defendant Crowdstrike Holdings, Inc.'s Preliminary Invalidity Contentions, Exhibit 224-A-19, *Webroot, Inc. and Open Text, Inc. v. Crowdstrike Holdings, Inc.*, No. 6:22-CV-00241-ADA-DTG (WD, Texas), Sep. 13, 2022, 129 pgs.
Defendant Crowdstrike Holdings, Inc.'s Preliminary Invalidity Contentions, Exhibit 224-A-20, *Webroot, Inc. and Open Text, Inc. v. Crowdstrike Holdings, Inc.*, No. 6:22-CV-00241-ADA-DTG (WD, Texas), Sep. 13, 2022, 132 pgs.
Defendant Crowdstrike Holdings, Inc.'s Preliminary Invalidity Contentions, Exhibit 224-A-21, *Webroot, Inc. and Open Text, Inc. v. Crowdstrike Holdings, Inc.*, No. 6:22-CV-00241-ADA-DTG (WD, Texas), Sep. 13, 2022, 100 pgs.
Defendant Crowdstrike Holdings, Inc.'s Preliminary Invalidity Contentions, Exhibit 224-A-22, *Webroot, Inc. and Open Text, Inc. v. Crowdstrike Holdings, Inc.*, No. 6:22-CV-00241-ADA-DTG (WD, Texas), Sep. 13, 2022, 31 pgs.
Defendant Crowdstrike Holdings, Inc.'s Preliminary Invalidity Contentions, Exhibit 224-A-23, *Webroot, Inc. and Open Text, Inc. v. Crowdstrike Holdings, Inc.*, No. 6:22-CV-00241-ADA-DTG (WD, Texas), Sep. 13, 2022, 35 pgs.
Defendant Crowdstrike Holdings, Inc.'s Preliminary Invalidity Contentions, Exhibit 224-A-24, *Webroot, Inc. and Open Text, Inc. v. Crowdstrike Holdings, Inc.*, No. 6:22-CV-00241-ADA-DTG (WD, Texas), Sep. 13, 2022, 176 pgs.
Defendant Crowdstrike Holdings, Inc.'s Preliminary Invalidity Contentions, Exhibit 224-A-25, *Webroot, Inc. and Open Text, Inc. v. Crowdstrike Holdings, Inc.*, No. 6:22-CV-00241-ADA-DTG (WD, Texas), Sep. 13, 2022, 31 pgs.
Defendant Crowdstrike Holdings, Inc.'s Preliminary Invalidity Contentions, Exhibit 224-A-26, *Webroot, Inc. and Open Text, Inc. v. Crowdstrike Holdings, Inc.*, No. 6:22-CV-00241-ADA-DTG (WD, Texas), Sep. 13, 2022, 43 pgs.
Defendant Crowdstrike Holdings, Inc.'s Preliminary Invalidity Contentions, Exhibit 224-A-27, *Webroot, Inc. and Open Text, Inc. v. Crowdstrike Holdings, Inc.*, No. 6:22-CV-00241-ADA-DTG (WD, Texas), Sep. 13, 2022, 54 pgs.
Defendant Crowdstrike Holdings, Inc.'s Preliminary Invalidity Contentions, Exhibit 224-A-28, *Webroot, Inc. and Open Text, Inc. v. Crowdstrike Holdings, Inc.*, No. 6:22-CV-00241-ADA-DTG (WD, Texas), Sep. 13, 2022, 37 pgs.
Defendant Crowdstrike Holdings, Inc.'s Preliminary Invalidity Contentions, Exhibit 224-A-29, *Webroot, Inc. and Open Text, Inc. v. Crowdstrike Holdings, Inc.*, No. 6:22-CV-00241-ADA-DTG (WD, Texas), Sep. 13, 2022, 94 pgs.
Defendant Crowdstrike Holdings, Inc.'s Preliminary Invalidity Contentions, Exhibit 224-A-30, *Webroot, Inc. and Open Text, Inc. v. Crowdstrike Holdings, Inc.*, No. 6:22-CV-00241-ADA-DTG (WD, Texas), Sep. 13, 2022, 42 pgs.

(56) References Cited

OTHER PUBLICATIONS

Defendant Crowdstrike Holdings, Inc.'s Preliminary Invalidity Contentions, Exhibit 224-A-31, *Webroot, Inc. and Open Text, Inc. v. Crowdstrike Holdings, Inc.*, No. 6:22-CV-00241-ADA-DTG (WD, Texas), Sep. 13, 2022, 64 pgs.

Defendant Crowdstrike Holdings, Inc.'s Preliminary Invalidity Contentions, Exhibit 224-A-32, *Webroot, Inc. and Open Text, Inc. v. Crowdstrike Holdings, Inc.*, No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 224-A-33, *Webroot, Inc. and Open Text, Inc. v. Crowdstrike Holdings, Inc.*, No. 6:22-CV-00241-ADA-DTG (WD, Texas), Sep. 13, 2022, 63 pgs.

Defendant Crowdstrike Holdings, Inc.'s Preliminary Invalidity Contentions, Exhibit 224-A-34, *Webroot, Inc. and Open Text, Inc. v. Crowdstrike Holdings, Inc.*, No. 6:22-CV-00241-ADA-DTG (WD, Texas), Sep. 13, 2022, 88 pgs.

Defendant Crowdstrike Holdings, Inc.'s Preliminary Invalidity Contentions, Exhibit 224-B, *Webroot, Inc. and Open Text, Inc. v. Crowdstrike Holdings, Inc.*, No. 6:22-CV-00241-ADA-DTG (WD, Texas), Sep. 13, 2022, 195 pgs.

Defendant Crowdstrike Holdings, Inc.'s Preliminary Invalidity Contentions, Exhibit 591-A-1, *Webroot, Inc. and Open Text, Inc. v. Crowdstrike Holdings, Inc.*, No. 6:22-CV-00241-ADA-DTG (WD, Texas), Sep. 13, 2022, 32 pgs.

Defendant Crowdstrike Holdings, Inc.'s Preliminary Invalidity Contentions, Exhibit 591-A-2, *Webroot, Inc. and Open Text, Inc. v. Crowdstrike Holdings, Inc.*, No. 6:22-CV-00241-ADA-DTG (WD, Texas), Sep. 13, 2022, 28 pgs.

Defendant Crowdstrike Holdings, Inc.'s Preliminary Invalidity Contentions, Exhibit 591-A-3, *Webroot, Inc. and Open Text, Inc. v. Crowdstrike Holdings, Inc.*, No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 591-A-4, *Webroot, Inc. and Open Text, Inc. v. Crowdstrike Holdings, Inc.*, No. 6:22-CV-00241-ADA-DTG (WD, Texas), Sep. 13, 2022, 36 pgs.

Defendant Crowdstrike Holdings, Inc.'s Preliminary Invalidity Contentions, Exhibit 591-A-5, *Webroot, Inc. and Open Text, Inc. v. Crowdstrike Holdings, Inc.*, No. 6:22-CV-00241-ADA-DTG (WD, Texas), Sep. 13, 2022, 59 pgs.

Defendant Crowdstrike Holdings, Inc.'s Preliminary Invalidity Contentions, Exhibit 591-A-6, *Webroot, Inc. and Open Text, Inc. v. Crowdstrike Holdings, Inc.*, No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 591-A-7, *Webroot, Inc. and Open Text, Inc. v. Crowdstrike Holdings, Inc.*, No. 6:22-CV-00241-ADA-DTG (WD, Texas), Sep. 13, 2022, 64 pgs.

Defendant Crowdstrike Holdings, Inc.'s Preliminary Invalidity Contentions, Exhibit 591-A-8, *Webroot, Inc. and Open Text, Inc. v. Crowdstrike Holdings, Inc.*, No. 6:22-CV-00241-ADA-DTG (WD, Texas), Sep. 13, 2022, 50 pgs.

Defendant Crowdstrike Holdings, Inc.'s Preliminary Invalidity Contentions, Exhibit 591-A-9, *Webroot, Inc. and Open Text, Inc. v. Crowdstrike Holdings, Inc.*, No. 6:22-CV-00241-ADA-DTG (WD, Texas), Sep. 13, 2022, 17 pgs.

Defendant Crowdstrike Holdings, Inc.'s Preliminary Invalidity Contentions, Exhibit 591-A-10, *Webroot, Inc. and Open Text, Inc. v. Crowdstrike Holdings, Inc.*, No. 6:22-CV-00241-ADA-DTG (WD, Texas), Sep. 13, 2022, 23 pgs.

Defendant Crowdstrike Holdings, Inc.'s Preliminary Invalidity Contentions, Exhibit 591-A-11, *Webroot, Inc. and Open Text, Inc. v. Crowdstrike Holdings, Inc.*, No. 6:22-CV-00241-ADA-DTG (WD, Texas), Sep. 13, 2022, 18 pgs.

Defendant Crowdstrike Holdings, Inc.'s Preliminary Invalidity Contentions, Exhibit 591-A-12, *Webroot, Inc. and Open Text, Inc. v. Crowdstrike Holdings, Inc.*, No. 6:22-CV-00241-ADA-DTG (WD, Texas), Sep. 13, 2022, 16 pgs.

Defendant Crowdstrike Holdings, Inc.'s Preliminary Invalidity Contentions, Exhibit 591-A-13, *Webroot, Inc. and Open Text, Inc. v. Crowdstrike Holdings, Inc.*, No. 6:22-CV-00241-ADA-DTG (WD, Texas), Sep. 13, 2022, 17 pgs.

Defendant Crowdstrike Holdings, Inc.'s Preliminary Invalidity Contentions, Exhibit 591-A-14, *Webroot, Inc. and Open Text, Inc. v. Crowdstrike Holdings, Inc.*, No. 6:22-CV-00241-ADA-DTG (WD, Texas), Sep. 13, 2022, 18 pgs.

Defendant Crowdstrike Holdings, Inc.'s Preliminary Invalidity Contentions, Exhibit 591-A-15, *Webroot, Inc. and Open Text, Inc. v. Crowdstrike Holdings, Inc.*, No. 6:22-CV-00241-ADA-DTG (WD, Texas), Sep. 13, 2022, 18 pgs.

Defendant Crowdstrike Holdings, Inc.'s Preliminary Invalidity Contentions, Exhibit 591-A-16, *Webroot, Inc. and Open Text, Inc. v. Crowdstrike Holdings, Inc.*, No. 6:22-CV-00241-ADA-DTG (WD, Texas), Sep. 13, 2022, 22 pgs.

Defendant Crowdstrike Holdings, Inc.'s Preliminary Invalidity Contentions, Exhibit 591-A-17, *Webroot, Inc. and Open Text, Inc. v. Crowdstrike Holdings, Inc.*, No. 6:22-CV-00241-ADA-DTG (WD, Texas), Sep. 13, 2022, 18 pgs.

Defendant Crowdstrike Holdings, Inc.'s Preliminary Invalidity Contentions, Exhibit 591-A-18, *Webroot, Inc. and Open Text, Inc. v. Crowdstrike Holdings, Inc.*, No. 6:22-CV-00241-ADA-DTG (WD, Texas), Sep. 13, 2022, 17 pgs.

Defendant Crowdstrike Holdings, Inc.'s Preliminary Invalidity Contentions, Exhibit 591-A-19, *Webroot, Inc. and Open Text, Inc. v. Crowdstrike Holdings, Inc.*, No. 6:22-CV-00241-ADA-DTG (WD, Texas), Sep. 13, 2022, 27 pgs.

Defendant Crowdstrike Holdings, Inc.'s Preliminary Invalidity Contentions, Exhibit 591-A-20, *Webroot, Inc. and Open Text, Inc. v. Crowdstrike Holdings, Inc.*, No. 6:22-CV-00241-ADA-DTG (WD, Texas), Sep. 13, 2022, 29 pgs.

Defendant Crowdstrike Holdings, Inc.'s Preliminary Invalidity Contentions, Exhibit 591-A-21, *Webroot, Inc. and Open Text, Inc. v. Crowdstrike Holdings, Inc.*, No. 6:22-CV-00241-ADA-DTG (WD, Texas), Sep. 13, 2022, 27 pgs.

Defendant Crowdstrike Holdings, Inc.'s Preliminary Invalidity Contentions, Exhibit 591-A-22, *Webroot, Inc. and Open Text, Inc. v. Crowdstrike Holdings, Inc.*, No. 6:22-CV-00241-ADA-DTG (WD, Texas), Sep. 13, 2022, 20 pgs.

Defendant Crowdstrike Holdings, Inc.'s Preliminary Invalidity Contentions, Exhibit 591-A-23, *Webroot, Inc. and Open Text, Inc. v. Crowdstrike Holdings, Inc.*, No. 6:22-CV-00241-ADA-DTG (WD, Texas), Sep. 13, 2022, 20 pgs.

Defendant Crowdstrike Holdings, Inc.'s Preliminary Invalidity Contentions, Exhibit 591-A-24, *Webroot, Inc. and Open Text, Inc. v. Crowdstrike Holdings, Inc.*, No. 6:22-CV-00241-ADA-DTG (WD, Texas), Sep. 13, 2022, 24 pgs.

Defendant Crowdstrike Holdings, Inc.'s Preliminary Invalidity Contentions, Exhibit 591-B, *Webroot, Inc. and Open Text, Inc. v. Crowdstrike Holdings, Inc.*, No. 6:22-CV-00241-ADA-DTG (WD, Texas), Sep. 13, 2022, 303 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-1, 25 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-2, 49 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-3, 36 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-4, 31 pgs.

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-5, 90 pgs.

(56) References Cited

OTHER PUBLICATIONS

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-6, 35 pgs.
Defendant Forcepoint LLC's Preliminary Invalidity *Webroot, Inc. and Open Text, Inc. v. Forcepoint LLC*, CA. No. 6:22-CV-00342-ADA-DTG, W.D. Tex., Feb. 21, 2023, Exhibit 243-F-7, 73 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-8, 58 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-9, 92 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-10, 52 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-11, 88 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-12, 64 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-13, 53 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-14, 60 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-15, 34 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-16, 53 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-17, 37 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-18, 46 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-19, 46 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-20, 45 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-21, 41 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-22, 52 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-23, 50 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-24, 54 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-25, 107 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-26, 220 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-27, 32 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 243-F-28, 29 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-1, 26 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-2, 54 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-3, 44 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-4, 33 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-5, 118 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-6, 36 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-7, 87 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-8, 70 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-9, 112 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-10, 63 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-11, 110 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-12, 74 pgs.

(56) References Cited

OTHER PUBLICATIONS

Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-13, 57 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-14, 60 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-15, 39 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-16, 62 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-17, 57 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-18, 61 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-19, 54 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-20, 57 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-21, 59 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-22, 139 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-23, 273 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-24, 39 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-25, 31 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-26, 54 pgs.
Defendant Forcepoint LLC's Preliminary Invalidity Contentions, *Webroot, Inc. and Open Text, Inc. v. Forcepoint LLC*, CA. No. 6:22-CV-00342-ADA-DTG, W.D. Tex., Feb. 21, 2023, Exhibit 932-G-27, 55 pgs.
Defendant AO Kaspersky Lab's Preliminary Invalidity Contentions—Exhibit 3A, Invalidity Claim Chart Index, *Webroot, Inc. and Open Text, Inc. v. AO Kaspersky Lab*, No. 6:22-CV-00243 (WD, Texas), Sep. 14, 2022, 22 pgs.
Defendant AO Kaspersky Lab's Preliminary Invalidity Contentions—Exhibit 4A, Invalidity Claim Chart Index, *Webroot, Inc. and Open Text, Inc. v. AO Kaspersky Lab*, No. 6:22-CV-00243 (WD, Texas), Sep. 14, 2022, 54 pgs.
Defendant AO Kaspersky Lab's Preliminary Invalidity Contentions—Exhibit 5A, Invalidity Claim Chart Index, *Webroot, Inc. and Open Text, Inc. v. AO Kaspersky Lab*, No. 6:22-CV-00243 (WD, Texas), Sep. 14, 2022, 43 pgs.
Defendant AO Kaspersky Lab's Preliminary Invalidity Contentions—Exhibit 5B, Invalidity Claim Chart Index, *Webroot, Inc. and Open Text, Inc. v. AO Kaspersky Lab*, No. 6:22-CV-00243 (WD, Texas), Sep. 14, 2022, 34 pgs.
Defendant AO Kaspersky Lab's Preliminary Invalidity Contentions—Exhibit 5C, Invalidity Claim Chart Index, *Webroot, Inc. and Open Text, Inc. v. AO Kaspersky Lab*, No. 6:22-CV-00243 (WD, Texas), Sep. 14, 2022, 36 pgs.
Defendant AO Kaspersky Lab's Preliminary Invalidity Contentions—Exhibit 5D, Invalidity Claim Chart Index, *Webroot, Inc. and Open Text, Inc. v. AO Kaspersky Lab*, No. 6:22-CV-00243 (WD, Texas), Sep. 14, 2022, 69 pgs.
Defendant AO Kaspersky Lab's Preliminary Invalidity Contentions—Exhibit 8, Invalidity Claim Chart Index, *Webroot, Inc. and Open Text, Inc. v. AO Kaspersky Lab*, No. 6:22-CV-00243 (WD, Texas), Feb. 21, 2023, 30 pgs.
Defendant AO Kaspersky Lab's Preliminary Invalidity Contentions—Exhibit 9, Invalidity Claim Chart Index, *Webroot, Inc. and Open Text, Inc. v. AO Kaspersky Lab*, No. 6:22-CV-00243 (WD, Texas), Feb. 21, 2023, 56 pgs.
Defendant AO Kaspersky Lab's Preliminary Invalidity Contentions—Exhibit 10, Invalidity Claim Chart Index, *Webroot, Inc. and Open Text, Inc. v. AO Kaspersky Lab*, No. 6:22-CV-00243 (WD, Texas), Feb. 21, 2023, 62 pgs.
Defendant Sophos Ltd.'s Preliminary Invalidity Contentions, Exhibit 045-A-1, *Webroot, Inc. and Open Text, Inc. v. Sophos Ltd.*, CA. No. 6:22-CV-00240-ADA-DTG, W.D. Tex., Sep. 13, 2022, 77 pgs.
Defendant Sophos Ltd.'s Preliminary Invalidity Contentions, Exhibit 045-A-2, *Webroot, Inc. and Open Text, Inc. v. Sophos Ltd.*, CA. No. 6:22-CV-00240-ADA-DTG, W.D. Tex., Sep. 13, 2022, 42 pgs.
Defendant Sophos Ltd.'s Preliminary Invalidity Contentions, Exhibit 045-A-3, *Webroot, Inc. and Open Text, Inc. v. Sophos Ltd.*, CA. No. 6:22-CV-00240-ADA-DTG, W.D. Tex., Sep. 13, 2022, 62 pgs.
Defendant Sophos Ltd.'s Preliminary Invalidity Contentions, Exhibit 045-A-4, *Webroot, Inc. and Open Text, Inc. v. Sophos Ltd.*, CA. No. 6:22-CV-00240-ADA-DTG, W.D. Tex., Sep. 13, 2022, 147 pgs.
Defendant Sophos Ltd.'s Preliminary Invalidity Contentions, Exhibit 045-A-5, *Webroot, Inc. and Open Text, Inc. v. Sophos Ltd.*, CA. No. 6:22-CV-00240-ADA-DTG, W.D. Tex., Sep. 13, 2022, 21 pgs.
Defendant Sophos Ltd.'s Preliminary Invalidity Contentions, Exhibit 045-A-6, *Webroot, Inc. and Open Text, Inc. v. Sophos Ltd.*, CA. No. 6:22-CV-00240-ADA-DTG, W.D. Tex., Sep. 13, 2022, 169 pgs.
Defendant Sophos Ltd.'s Preliminary Invalidity Contentions, Exhibit 045-A-7, *Webroot, Inc. and Open Text, Inc. v. Sophos Ltd.*, CA. No. 6:22-CV-00240-ADA-DTG, W.D. Tex., Sep. 13, 2022, 55 pgs.
Defendant Sophos Ltd.'s Preliminary Invalidity Contentions, Exhibit 045-A-8, *Webroot, Inc. and Open Text, Inc. v. Sophos Ltd.*, CA. No. 6:22-CV-00240-ADA-DTG, W.D. Tex., Sep. 13, 2022, 19 pgs.
Defendant Sophos Ltd.'s Preliminary Invalidity Contentions, Exhibit 045-A-9, *Webroot, Inc. and Open Text, Inc. v. Sophos Ltd.*, CA. No. 6:22-CV-00240-ADA-DTG, W.D. Tex., Sep. 13, 2022, 70 pgs.
Defendant Sophos Ltd.'s Preliminary Invalidity Contentions, Exhibit 045-A-10, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 045-A-11, *Webroot, Inc. and Open Text, Inc. v. Sophos Ltd.*, CA. No. 6:22-CV-00240-ADA-DTG, W.D. Tex., Sep. 13, 2022, 116 pgs.
Defendant Sophos Ltd.'s Preliminary Invalidity Contentions, Exhibit 045-A-12, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 045-A-13, *Webroot, Inc. and Open Text, Inc. v. Sophos Ltd.*, CA. No. 6:22-CV-00240-ADA-DTG, W.D. Tex., Sep. 13, 2022, 61 pgs.
Defendant Sophos Ltd.'s Preliminary Invalidity Contentions, Exhibit 045-A-14, *Webroot, Inc. and Open Text, Inc. v. Sophos Ltd.*, CA. No. 6:22-CV-00240-ADA-DTG, W.D. Tex., Sep. 13, 2022, 117 pgs.
Defendant Sophos Ltd.'s Preliminary Invalidity Contentions, Exhibit 045-A-15, *Webroot, Inc. and Open Text, Inc. v. Sophos Ltd.*, CA. No. 6:22-CV-00240-ADA-DTG, W.D. Tex., Sep. 13, 2022, 95 pgs.

(56) References Cited

OTHER PUBLICATIONS

Defendant Sophos Ltd.'s Preliminary Invalidity Contentions, Exhibit 045-A-16, *Webroot, Inc. and Open Text, Inc. v. Sophos Ltd.*, CA. No. 6:22-CV-00240-ADA-DTG, W.D. Tex., Sep. 13, 2022, 78 pgs.
Defendant Sophos Ltd.'s Preliminary Invalidity Contentions, Exhibit 045-A-17, *Webroot, Inc. and Open Text, Inc. v. Sophos Ltd.*, CA. No. 6:22-CV-00240-ADA-DTG, W.D. Tex., Sep. 13, 2022, 68 pgs.
Defendant Sophos Ltd.'s Preliminary Invalidity Contentions, Exhibit 045-A-18, *Webroot, Inc. and Open Text, Inc. v. Sophos Ltd.*, CA. No. 6:22-CV-00240-ADA-DTG, W.D. Tex., Sep. 13, 2022, 18 pgs.
Defendant Sophos Ltd.'s Preliminary Invalidity Contentions, Exhibit 045-A-19, *Webroot, Inc. and Open Text, Inc. v. Sophos Ltd.*, CA. No. 6:22-CV-00240-ADA-DTG, W.D. Tex., Sep. 13, 2022, 19 pgs.
Defendant Sophos Ltd.'s Preliminary Invalidity Contentions, Exhibit 045-A-20, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 045-A-21, *Webroot, Inc. and Open Text, Inc. v. Sophos Ltd.*, CA. No. 6:22-CV-00240-ADA-DTG, W.D. Tex., Sep. 13, 2022, 85 pgs.
Defendant Sophos Ltd.'s Preliminary Invalidity Contentions, Exhibit 045-A-22, *Webroot, Inc. and Open Text, Inc. v. Sophos Ltd.*, CA. No. 6:22-CV-00240-ADA-DTG, W.D. Tex., Sep. 13, 2022, 93 pgs.
Defendant Sophos Ltd.'s Preliminary Invalidity Contentions, Exhibit 045-A-23, *Webroot, Inc. and Open Text, Inc. v. Sophos Ltd.*, CA. No. 6:22-CV-00240-ADA-DTG, W.D. Tex., Sep. 13, 2022, 64 pgs.
Defendant Sophos Ltd.'s Preliminary Invalidity Contentions, Exhibit 045-A-24, *Webroot, Inc. and Open Text, Inc. v. Sophos Ltd.*, CA. No. 6:22-CV-00240-ADA-DTG, W.D. Tex., Sep. 13, 2022, 69 pgs.
Defendant Sophos Ltd.'s Preliminary Invalidity Contentions, Exhibit 045-A-25, *Webroot, Inc. and Open Text, Inc. v. Sophos Ltd.*, CA. No. 6:22-CV-00240-ADA-DTG, W.D. Tex., Sep. 13, 2022, 53 pgs.
Defendant Sophos Ltd.'s Preliminary Invalidity Contentions, Exhibit 045-A-26, *Webroot, Inc. and Open Text, Inc. v. Sophos Ltd.*, CA. No. 6:22-CV-00240-ADA-DTG, W.D. Tex., Sep. 13, 2022, 75 pgs.
Defendant Sophos Ltd.'s Preliminary Invalidity Contentions, Exhibit 045-A-27, *Webroot, Inc. and Open Text, Inc. v. Sophos Ltd.*, CA. No. 6:22-CV-00240-ADA-DTG, W.D. Tex., Sep. 13, 2022, 25 pgs.
Defendant Sophos Ltd.'s Preliminary Invalidity Contentions, Exhibit 045-A-28, *Webroot, Inc. and Open Text, Inc. v. Sophos Ltd.*, CA. No. 6:22-CV-00240-ADA-DTG, W.D. Tex., Sep. 13, 2022, 75 pgs.
Defendant Sophos Ltd.'s Preliminary Invalidity Contentions, Exhibit 045-A-29, *Webroot, Inc. and Open Text, Inc. v. Sophos Ltd.*, CA. No. 6:22-CV-00240-ADA-DTG, W.D. Tex., Sep. 13, 2022, 20 pgs.
Defendant Sophos Ltd.'s Preliminary Invalidity Contentions, Exhibit 045-A-30, *Webroot, Inc. and Open Text, Inc. v. Sophos Ltd.*, CA. No. 6:22-CV-00240-ADA-DTG, W.D. Tex., Sep. 13, 2022, 90 pgs.
Defendant Sophos Ltd.'s Preliminary Invalidity Contentions, Exhibit 045-A-31, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 045-A-32, *Webroot, Inc. and Open Text, Inc. v. Sophos Ltd.*, CA. No. 6:22-CV-00240-ADA-DTG, W.D. Tex., Sep. 13, 2022, 23 pgs.
Defendant Sophos Ltd.'s Preliminary Invalidity Contentions, Exhibit 045-A-34, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 045-A-35, *Webroot, Inc. and Open Text, Inc. v. Sophos Ltd.*, CA. No. 6:22-CV-00240-ADA-DTG, W.D. Tex., Sep. 13, 2022, 22 pgs.
Defendant Sophos Ltd.'s Preliminary Invalidity Contentions, Exhibit 045-B, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 224-A-1, *Webroot, Inc. and Open Text, Inc. v. Sophos Ltd.*, CA. No. 6:22-CV-00240-ADA-DTG, W.D. Tex., Sep. 13, 2022, 111 pgs.
Defendant Sophos Ltd.'s Preliminary Invalidity Contentions, Exhibit 224-A-2, *Webroot, Inc. and Open Text, Inc. v. Sophos Ltd.*, CA. No. 6:22-CV-00240-ADA-DTG, W.D. Tex., Sep. 13, 2022, 68 pgs.
Defendant Sophos Ltd.'s Preliminary Invalidity Contentions, Exhibit 224-A-3, *Webroot, Inc. and Open Text, Inc. v. Sophos Ltd.*, CA. No. 6:22-CV-00240-ADA-DTG, W.D. Tex., Sep. 13, 2022, 95 pgs.
Defendant Sophos Ltd.'s Preliminary Invalidity Contentions, Exhibit 224-A-4, *Webroot, Inc. and Open Text, Inc. v. Sophos Ltd.*, CA. No. 6:22-CV-00240-ADA-DTG, W.D. Tex., Sep. 13, 2022, 207 pgs.
Defendant Sophos Ltd.'s Preliminary Invalidity Contentions, Exhibit 224-A-5, *Webroot, Inc. and Open Text, Inc. v. Sophos Ltd.*, CA. No. 6:22-CV-00240-ADA-DTG, W.D. Tex., Sep. 13, 2022, 61 pgs.
Defendant Sophos Ltd.'s Preliminary Invalidity Contentions, Exhibit 224-A-6, *Webroot, Inc. and Open Text, Inc. v. Sophos Ltd.*, CA. No. 6:22-CV-00240-ADA-DTG, W.D. Tex., Sep. 13, 2022, 263 pgs.
Defendant Sophos Ltd.'s Preliminary Invalidity Contentions, Exhibit 224-A-8, *Webroot, Inc. and Open Text, Inc. v. Sophos Ltd.*, CA. No. 6:22-CV-00240-ADA-DTG, W.D. Tex., Sep. 13, 2022, 51 pgs.
Defendant Sophos Ltd.'s Preliminary Invalidity Contentions, Exhibit 224-A-9, *Webroot, Inc. and Open Text, Inc. v. Sophos Ltd.*, CA. No. 6:22-CV-00240-ADA-DTG, W.D. Tex., Sep. 13, 2022, 136 pgs.
Defendant Sophos Ltd.'s Preliminary Invalidity Contentions, Exhibit 224-A-10, *Webroot, Inc. and Open Text, Inc. v. Sophos Ltd.*, CA. No. 6:22-CV-00240-ADA-DTG, W.D. Tex., Sep. 13, 2022, 79 pgs.
Defendant Sophos Ltd.'s Preliminary Invalidity Contentions, Exhibit 224-A-11, *Webroot, Inc. and Open Text, Inc. v. Sophos Ltd.*, CA. No. 6:22-CV-00240-ADA-DTG, W.D. Tex., Sep. 13, 2022, 185 pgs.
Defendant Sophos Ltd.'s Preliminary Invalidity Contentions, Exhibit 224-A-12, *Webroot, Inc. and Open Text, Inc. v. Sophos Ltd.*, CA. No. 6:22-CV-00240-ADA-DTG, W.D. Tex., Sep. 13, 2022, 53 pgs.
Defendant Sophos Ltd.'s Preliminary Invalidity Contentions, Exhibit 224-A-13, *Webroot, Inc. and Open Text, Inc. v. Sophos Ltd.*, CA. No. 6:22-CV-00240-ADA-DTG, W.D. Tex., Sep. 13, 2022, 95 pgs.
Defendant Sophos Ltd.'s Preliminary Invalidity Contentions, Exhibit 224-A-14, *Webroot, Inc. and Open Text, Inc. v. Sophos Ltd.*, CA. No. 6:22-CV-00240-ADA-DTG, W.D. Tex., Sep. 13, 2022, 176 pgs.
Defendant Sophos Ltd.'s Preliminary Invalidity Contentions, Exhibit 224-A-15, *Webroot, Inc. and Open Text, Inc. v. Sophos Ltd.*, CA. No. 6:22-CV-00240-ADA-DTG, W.D. Tex., Sep. 13, 2022, 173 pgs.
Defendant Sophos Ltd.'s Preliminary Invalidity Contentions, Exhibit 224-A-16, *Webroot, Inc. and Open Text, Inc. v. Sophos Ltd.*, CA. No. 6:22-CV-00240-ADA-DTG, W.D. Tex., Sep. 13, 2022, 126 pgs.
Defendant Sophos Ltd.'s Preliminary Invalidity Contentions, Exhibit 224-A-17, *Webroot, Inc. and Open Text, Inc. v. Sophos Ltd.*, CA. No. 6:22-CV-00240-ADA-DTG, W.D. Tex., Sep. 13, 2022, 103 pgs.
Defendant Sophos Ltd.'s Preliminary Invalidity Contentions, Exhibit 224-A-18, *Webroot, Inc. and Open Text, Inc. v. Sophos Ltd.*, CA. No. 6:22-CV-00240-ADA-DTG, W.D. Tex., Sep. 13, 2022, 49 pgs.
Defendant Sophos Ltd.'s Preliminary Invalidity Contentions, Exhibit 224-A-19, *Webroot, Inc. and Open Text, Inc. v. Sophos Ltd.*, CA. No. 6:22-CV-00240-ADA-DTG, W.D. Tex., Sep. 13, 2022, 68 pgs.
Defendant Sophos Ltd.'s Preliminary Invalidity Contentions, Exhibit 224-A-20, *Webroot, Inc. and Open Text, Inc. v. Sophos Ltd.*, CA. No. 6:22-CV-00240-ADA-DTG, W.D. Tex., Sep. 13, 2022, 157 pgs.
Defendant Sophos Ltd.'s Preliminary Invalidity Contentions, Exhibit 224-A-21, *Webroot, Inc. and Open Text, Inc. v. Sophos Ltd.*, CA. No. 6:22-CV-00240-ADA-DTG, W.D. Tex., Sep. 13, 2022, 139 pgs.
Defendant Sophos Ltd.'s Preliminary Invalidity Contentions, Exhibit 224-A-22, *Webroot, Inc. and Open Text, Inc. v. Sophos Ltd.*, CA. No. 6:22-CV-00240-ADA-DTG, W.D. Tex., Sep. 13, 2022, 152 pgs.
Defendant Sophos Ltd.'s Preliminary Invalidity Contentions, Exhibit 224-A-23, *Webroot, Inc. and Open Text, Inc. v. Sophos Ltd.*, CA. No. 6:22-CV-00240-ADA-DTG, W.D. Tex., Sep. 13, 2022, 98 pgs.
Defendant Sophos Ltd.'s Preliminary Invalidity Contentions, Exhibit 224-A-24, *Webroot, Inc. and Open Text, Inc. v. Sophos Ltd.*, CA. No. 6:22-CV-00240-ADA-DTG, W.D. Tex., Sep. 13, 2022, 117 pgs.
Defendant Sophos Ltd.'s Preliminary Invalidity Contentions, Exhibit 224-A-25, *Webroot, Inc. and Open Text, Inc. v. Sophos Ltd.*, CA. No. 6:22-CV-00240-ADA-DTG, W.D. Tex., Sep. 13, 2022, 78 pgs.
Defendant Sophos Ltd.'s Preliminary Invalidity Contentions, Exhibit 224-A-26, *Webroot, Inc. and Open Text, Inc. v. Sophos Ltd.*, CA. No. 6:22-CV-00240-ADA-DTG, W.D. Tex., Sep. 13, 2022, 117 pgs.
Defendant Sophos Ltd.'s Preliminary Invalidity Contentions, Exhibit 224-A-27, *Webroot, Inc. and Open Text, Inc. v. Sophos Ltd.*, CA. No. 6:22-CV-00240-ADA-DTG, W.D. Tex., Sep. 13, 2022, 60 pgs.
Defendant Sophos Ltd.'s Preliminary Invalidity Contentions, Exhibit 224-A-28, *Webroot, Inc. and Open Text, Inc. v. Sophos Ltd.*, CA. No. 6:22-CV-00240-ADA-DTG, W.D. Tex., Sep. 13, 2022, 55 pgs.

(56) References Cited

OTHER PUBLICATIONS

Defendant Sophos Ltd.'s Preliminary Invalidity Contentions, Exhibit 224-A-29, *Webroot, Inc. and Open Text, Inc.* v. *Sophos Ltd.*, CA. No. 6:22-CV-00240-ADA-DTG, W.D. Tex., Sep. 13, 2022, 145 pgs.
Defendant Sophos Ltd.'s Preliminary Invalidity Contentions, Exhibit 224-A-30, *Webroot, Inc. and Open Text, Inc.* v. *Sophos Ltd.*, CA. No. 6:22-CV-00240-ADA-DTG, W.D. Tex., Sep. 13, 2022, 60 pgs.
Defendant Sophos Ltd.'s Preliminary Invalidity Contentions, Exhibit 224-A-31, *Webroot, Inc. and Open Text, Inc.* v. *Sophos Ltd.*, CA. No. 6:22-CV-00240-ADA-DTG, W.D. Tex., Sep. 13, 2022, 104 pgs.
Defendant Sophos Ltd.'s Preliminary Invalidity Contentions, Exhibit 224-A-32, *Webroot, Inc. and Open Text, Inc.* v. *Sophos Ltd.*, CA. No. 6:22-CV-00240-ADA-DTG, W.D. Tex., Sep. 13, 2022, 57 pgs.
Defendant Sophos Ltd.'s Preliminary Invalidity Contentions, Exhibit 224-A-34, *Webroot, Inc. and Open Text, Inc.* v. *Sophos Ltd.*, CA. No. 6:22-CV-00240-ADA-DTG, W.D. Tex., Sep. 13, 2022, 59 pgs.
Defendant Sophos Ltd.'s Preliminary Invalidity Contentions, Exhibit 224-A-35, *Webroot, Inc. and Open Text, Inc.* v. *Sophos Ltd.*, CA. No. 6:22-CV-00240-ADA-DTG, W.D. Tex., Sep. 13, 2022, 63 pgs.
Defendant Sophos Ltd.'s Preliminary Invalidity Contentions, Exhibit 224-B, *Webroot, Inc. and Open Text, Inc.* v. *Sophos Ltd.*, CA. No. 6:22-CV-00240-ADA-DTG, W.D. Tex., Sep. 13, 2022, 50 pgs.
Defendant Sophos Ltd.'s Preliminary Invalidity Contentions, Exhibit 591-A-1, *Webroot, Inc. and Open Text, Inc.* v. *Sophos Ltd.*, CA. No. 6:22-CV-00240-ADA-DTG, W.D. Tex., Sep. 13, 2022, 20 pgs.
Defendant Sophos Ltd.'s Preliminary Invalidity Contentions, Exhibit 591-A-2, *Webroot, Inc. and Open Text, Inc.* v. *Sophos Ltd.*, CA. No. 6:22-CV-00240-ADA-DTG, W.D. Tex., Sep. 13, 2022, 19 pgs.
Defendant Sophos Ltd.'s Preliminary Invalidity Contentions, Exhibit 591-A-3, *Webroot, Inc. and Open Text, Inc.* v. *Sophos Ltd.*, CA. No. 6:22-CV-00240-ADA-DTG, W.D. Tex., Sep. 13, 2022, 22 pgs.
Defendant Sophos Ltd.'s Preliminary Invalidity Contentions, Exhibit 591-A-4, *Webroot, Inc. and Open Text, Inc.* v. *Sophos Ltd.*, CA. No. 6:22-CV-00240-ADA-DTG, W.D. Tex., Sep. 13, 2022, 52 pgs.
Defendant Sophos Ltd.'s Preliminary Invalidity Contentions, Exhibit 591-A-5, *Webroot, Inc. and Open Text, Inc.* v. *Sophos Ltd.*, CA. No. 6:22-CV-00240-ADA-DTG, W.D. Tex., Sep. 13, 2022, 19 pgs.
Defendant Sophos Ltd.'s Preliminary Invalidity Contentions, Exhibit 591-A-6, *Webroot, Inc. and Open Text, Inc.* v. *Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 591-A-7, *Webroot, Inc. and Open Text, Inc.* v. *Sophos Ltd.*, CA. No. 6:22-CV-00240-ADA-DTG, W.D. Tex., Sep. 13, 2022, 42 pgs.
Defendant Sophos Ltd.'s Preliminary Invalidity Contentions, Exhibit 591-A-8, *Webroot, Inc. and Open Text, Inc.* v. *Sophos Ltd.*, CA. No. 6:22-CV-00240-ADA-DTG, W.D. Tex., Sep. 13, 2022, 33 pgs.
Defendant Sophos Ltd.'s Preliminary Invalidity Contentions, Exhibit 591-A-9, *Webroot, Inc. and Open Text, Inc.* v. *Sophos Ltd.*, CA. No. 6:22-CV-00240-ADA-DTG, W.D. Tex., Sep. 13, 2022, 19 pgs.
Defendant Sophos Ltd.'s Preliminary Invalidity Contentions, Exhibit 591-A-10, *Webroot, Inc. and Open Text, Inc.* v. *Sophos Ltd.*, CA. No. 6:22-CV-00240-ADA-DTG, W.D. Tex., Sep. 13, 2022, 20 pgs.
Defendant Sophos Ltd.'s Preliminary Invalidity Contentions, Exhibit 591-A-11, *Webroot, Inc. and Open Text, Inc.* v. *Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 591-A-12, *Webroot, Inc. and Open Text, Inc.* v. *Sophos Ltd.*, CA. No. 6:22-CV-00240-ADA-DTG, W.D. Tex., Sep. 13, 2022, 40 pgs.
Defendant Sophos Ltd.'s Preliminary Invalidity Contentions, Exhibit 591-A-13, *Webroot, Inc. and Open Text, Inc.* v. *Sophos Ltd.*, CA. No. 6:22-CV-00240-ADA-DTG, W.D. Tex., Sep. 13, 2022, 21 pgs.
Defendant Sophos Ltd.'s Preliminary Invalidity Contentions, Exhibit 591-A-14, *Webroot, Inc. and Open Text, Inc.* v. *Sophos Ltd.*, CA. No. 6:22-CV-00240-ADA-DTG, W.D. Tex., Sep. 13, 2022, 21 pgs.
Defendant Sophos Ltd.'s Preliminary Invalidity Contentions, Exhibit 591-A-15, *Webroot, Inc. and Open Text, Inc.* v. *Sophos Ltd.*, CA. No. 6:22-CV-00240-ADA-DTG, W.D. Tex., Sep. 13, 2022, 40 pgs.
Defendant Sophos Ltd.'s Preliminary Invalidity Contentions, Exhibit 591-A-16, *Webroot, Inc. and Open Text, Inc.* v. *Sophos Ltd.*, CA. No. 6:22-CV-00240-ADA-DTG, W.D. Tex., Sep. 13, 2022, 18 pgs.
Defendant Sophos Ltd.'s Preliminary Invalidity Contentions, Exhibit 591-A-17, *Webroot, Inc. and Open Text, Inc.* v. *Sophos Ltd.*, CA. No. 6:22-CV-00240-ADA-DTG, W.D. Tex., Sep. 13, 2022, 22 pgs.
Defendant Sophos Ltd.'s Preliminary Invalidity Contentions, Exhibit 591-A-18, *Webroot, Inc. and Open Text, Inc.* v. *Sophos Ltd.*, CA. No. 6:22-CV-00240-ADA-DTG, W.D. Tex., Sep. 13, 2022, 71 pgs.
Defendant Sophos Ltd.'s Preliminary Invalidity Contentions, Exhibit 591-A-19, *Webroot, Inc. and Open Text, Inc.* v. *Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 591-A-20, *Webroot, Inc. and Open Text, Inc.* v. *Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 591-A-21, *Webroot, Inc. and Open Text, Inc.* v. *Sophos Ltd.*, CA. No. 6:22-CV-00240-ADA-DTG, W.D. Tex., Sep. 13, 2022, 34 pgs.
Defendant Sophos Ltd.'s Preliminary Invalidity Contentions, Exhibit 591-A-22, *Webroot, Inc. and Open Text, Inc.* v. *Sophos Ltd.*, CA. No. 6:22-CV-00240-ADA-DTG, W.D. Tex., Sep. 13, 2022, 22 pgs.
Defendant Sophos Ltd.'s Preliminary Invalidity Contentions, Exhibit 591-A-23, *Webroot, Inc. and Open Text, Inc.* v. *Sophos Ltd.*, CA. No. 6:22-CV-00240-ADA-DTG, W.D. Tex., Sep. 13, 2022, 20 pgs.
Defendant Sophos Ltd.'s Preliminary Invalidity Contentions, Exhibit 591-A-24, *Webroot, Inc. and Open Text, Inc.* v. *Sophos Ltd.*, CA. No. 6:22-CV-00240-ADA-DTG, W.D. Tex., Sep. 13, 2022, 38 pgs.
Defendant Sophos Ltd.'s Preliminary Invalidity Contentions, Exhibit 591-A-25, *Webroot, Inc. and Open Text, Inc.* v. *Sophos Ltd.*, CA. No. 6:22-CV-00240-ADA-DTG, W.D. Tex., Sep. 13, 2022, 72 pgs.
Defendant Sophos Ltd.'s Preliminary Invalidity Contentions, Exhibit 591-A-26, *Webroot, Inc. and Open Text, Inc.* v. *Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 591-A-27, *Webroot, Inc. and Open Text, Inc.* v. *Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 591-B, *Webroot, Inc. and Open Text, Inc.* v. *Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 243-A-1, *Webroot, Inc. and Open Text, Inc.* v. *Sophos Ltd.*, CA. No. 6:22-CV-00240-ADA-DTG, W.D. Tex., Feb. 21, 2023, 101 pgs.
Defendant Sophos Ltd.'s Preliminary Invalidity Contentions, Exhibit 243-A-2, *Webroot, Inc. and Open Text, Inc.* v. *Sophos Ltd.*, CA. No. 6:22-CV-00240-ADA-DTG, W.D. Tex., Feb. 21, 2023, 54 pgs.
Defendant Sophos Ltd.'s Preliminary Invalidity Contentions, Exhibit 243-A-3, *Webroot, Inc. and Open Text, Inc.* v. *Sophos Ltd.*, CA. No. 6:22-CV-00240-ADA-DTG, W.D. Tex., Feb. 21, 2023, 27 pgs.
Defendant Sophos Ltd.'s Preliminary Invalidity Contentions, Exhibit 243-A-4, *Webroot, Inc. and Open Text, Inc.* v. *Sophos Ltd.*, CA. No. 6:22-CV-00240-ADA-DTG, W.D. Tex., Feb. 21, 2023, 80 pgs.
Defendant Sophos Ltd.'s Preliminary Invalidity Contentions, Exhibit 243-A-5, *Webroot, Inc. and Open Text, Inc.* v. *Sophos Ltd.*, CA. No. 6:22-CV-00240-ADA-DTG, W.D. Tex., Feb. 21, 2023, 58 pgs.
Defendant Sophos Ltd.'s Preliminary Invalidity Contentions, Exhibit 243-A-6, *Webroot, Inc. and Open Text, Inc.* v. *Sophos Ltd.*, CA. No. 6:22-CV-00240-ADA-DTG, W.D. Tex., Feb. 21, 2023, 49 pgs.
Defendant Sophos Ltd.'s Preliminary Invalidity Contentions, Exhibit 243-A-7, *Webroot, Inc. and Open Text, Inc.* v. *Sophos Ltd.*, CA. No. 6:22-CV-00240-ADA-DTG, W.D. Tex., Feb. 21, 2023, 98 pgs.
Defendant Sophos Ltd.'s Preliminary Invalidity Contentions, Exhibit 243-A-8, *Webroot, Inc. and Open Text, Inc.* v. *Sophos Ltd.*, CA. No. 6:22-CV-00240-ADA-DTG, W.D. Tex., Feb. 21, 2023, 58 pgs.
Defendant Sophos Ltd.'s Preliminary Invalidity Contentions, Exhibit 243-A-9, *Webroot, Inc. and Open Text, Inc.* v. *Sophos Ltd.*, CA. No. 6:22-CV-00240-ADA-DTG, W.D. Tex., Feb. 21, 2023, 59 pgs.
Defendant Sophos Ltd.'s Preliminary Invalidity Contentions, Exhibit 243-A-10, *Webroot, Inc. and Open Text, Inc.* v. *Sophos Ltd.*, CA. No. 6:22-CV-00240-ADA-DTG, W.D. Tex., Feb. 21, 2023, 103 pgs.
Defendant Sophos Ltd.'s Preliminary Invalidity Contentions, Exhibit 243-A-11, *Webroot, Inc. and Open Text, Inc.* v. *Sophos Ltd.*, CA. No. 6:22-CV-00240-ADA-DTG, W.D. Tex., Feb. 21, 2023, 60 pgs.
Defendant Sophos Ltd.'s Preliminary Invalidity Contentions, Exhibit 243-A-12, *Webroot, Inc. and Open Text, Inc.* v. *Sophos Ltd.*, CA. No. 6:22-CV-00240-ADA-DTG, W.D. Tex., Feb. 21, 2023, 38 pgs.

(56) References Cited

OTHER PUBLICATIONS

Defendant Sophos Ltd.'s Preliminary Invalidity Contentions, Exhibit 243-A-13, *Webroot, Inc. and Open Text, Inc.* v. *Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 243-A-14, *Webroot, Inc. and Open Text, Inc.* v. *Sophos Ltd.*, CA. No. 6:22-CV-00240-ADA-DTG, W.D. Tex., Feb. 21, 2023, 49 pgs.
Defendant Sophos Ltd.'s Preliminary Invalidity Contentions, Exhibit 243-A-15, *Webroot, Inc. and Open Text, Inc.* v. *Sophos Ltd.*, CA. No. 6:22-CV-00240-ADA-DTG, W.D. Tex., Feb. 21, 2023, 57 pgs.
Defendant Sophos Ltd.'s Preliminary Invalidity Contentions, Exhibit 243-A-16, *Webroot, Inc. and Open Text, Inc.* v. *Sophos Ltd.*, CA. No. 6:22-CV-00240-ADA-DTG, W.D. Tex., Feb. 21, 2023, 60 pgs.
Defendant Sophos Ltd.'s Preliminary Invalidity Contentions, Exhibit 243-A-17, *Webroot, Inc. and Open Text, Inc.* v. *Sophos Ltd.*, CA. No. 6:22-CV-00240-ADA-DTG, W.D. Tex., Feb. 21, 2023, 47 pgs.
Defendant Sophos Ltd.'s Preliminary Invalidity Contentions, Exhibit 243-A-18, *Webroot, Inc. and Open Text, Inc.* v. *Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 243-A-19, *Webroot, Inc. and Open Text, Inc.* v. *Sophos Ltd.*, CA. No. 6:22-CV-00240-ADA-DTG, W.D. Tex., Feb. 21, 2023, 70 pgs.
Defendant Sophos Ltd.'s Preliminary Invalidity Contentions, Exhibit 243-A-20, *Webroot, Inc. and Open Text, Inc.* v. *Sophos Ltd.*, CA. No. 6:22-CV-00240-ADA-DTG, W.D. Tex., Feb. 21, 2023, 51 pgs.
Defendant Sophos Ltd.'s Preliminary Invalidity Contentions, Exhibit 243-A-21, *Webroot, Inc. and Open Text, Inc.* v. *Sophos Ltd.*, CA. No. 6:22-CV-00240-ADA-DTG, W.D. Tex., Feb. 21, 2023, 117 pgs.
Defendant Sophos Ltd.'s Preliminary Invalidity Contentions, Exhibit 243-A-22, *Webroot, Inc. and Open Text, Inc.* v. *Sophos Ltd.*, CA. No. 6:22-CV-00240-ADA-DTG, W.D. Tex., Feb. 21, 2023, 239 pgs.
Defendant Sophos Ltd.'s Preliminary Invalidity Contentions, Exhibit 243-A-23, *Webroot, Inc. and Open Text, Inc.* v. *Sophos Ltd.*, CA. No. 6:22-CV-00240-ADA-DTG, W.D. Tex., Feb. 21, 2023, 62 pgs.
Defendant Sophos Ltd.'s Preliminary Invalidity Contentions, Exhibit 243-A-24, *Webroot, Inc. and Open Text, Inc.* v. *Sophos Ltd.*, CA. No. 6:22-CV-00240-ADA-DTG, W.D. Tex., Feb. 21, 2023, 36 pgs.
Defendant Sophos Ltd.'s Preliminary Invalidity Contentions, Exhibit 243-A-25, *Webroot, Inc. and Open Text, Inc.* v. *Sophos Ltd.*, CA. No. 6:22-CV-00240-ADA-DTG, W.D. Tex., Feb. 21, 2023, 39 pgs.
Defendant Sophos Ltd.'s Preliminary Invalidity Contentions, Exhibit 243-A-26, *Webroot, Inc. and Open Text, Inc.* v. *Sophos Ltd.*, CA. No. 6:22-CV-00240-ADA-DTG, W.D. Tex., Feb. 21, 2023, 38 pgs.
Defendant Sophos Ltd.'s Preliminary Invalidity Contentions, Exhibit 243-A-27, *Webroot, Inc. and Open Text, Inc.* v. *Sophos Ltd.*, CA. No. 6:22-CV-00240-ADA-DTG, W.D. Tex., Feb. 21, 2023, 44 pgs.
Defendant Sophos Ltd.'s Preliminary Invalidity Contentions, Exhibit 243-A-28, *Webroot, Inc. and Open Text, Inc.* v. *Sophos Ltd.*, CA. No. 6:22-CV-00240-ADA-DTG, W.D. Tex., Feb. 21, 2023, 31 pgs.
Defendant Sophos Ltd.'s Preliminary Invalidity Contentions, Exhibit 243-B, *Webroot, Inc. and Open Text, Inc.* v. *Sophos Ltd.*, CA. No. 6:22-CV-00240-ADA-DTG, W.D. Tex., Feb. 21, 2023, 111 pgs.
Defendant Sophos Ltd.'s Preliminary Invalidity Contentions, Exhibit 932-A-1, *Webroot, Inc. and Open Text, Inc.* v. *Sophos Ltd.*, CA. No. 6:22-CV-00240-ADA-DTG, W.D. Tex., Feb. 21, 2023, 122 pgs.
Defendant Sophos Ltd.'s Preliminary Invalidity Contentions, Exhibit 932-A-2, *Webroot, Inc. and Open Text, Inc.* v. *Sophos Ltd.*, CA. No. 6:22-CV-00240-ADA-DTG, W.D. Tex., Feb. 21, 2023,62 pgs.
Defendant Sophos Ltd.'s Preliminary Invalidity Contentions, Exhibit 932-A-3, *Webroot, Inc. and Open Text, Inc.* v. *Sophos Ltd.*, CA. No. 6:22-CV-00240-ADA-DTG, W.D. Tex., Feb. 21, 2023, 28 pgs.
Defendant Sophos Ltd.'s Preliminary Invalidity Contentions, Exhibit 932-A-4, *Webroot, Inc. and Open Text, Inc.* v. *Sophos Ltd.*, CA. No. 6:22-CV-00240-ADA-DTG, W.D. Tex., Feb. 21, 2023, 95 pgs.
Defendant Sophos Ltd.'s Preliminary Invalidity Contentions, Exhibit 932-A-5, *Webroot, Inc. and Open Text, Inc.* v. *Sophos Ltd.*, CA. No. 6:22-CV-00240-ADA-DTG, W.D. Tex., Feb. 21, 2023, 59 pgs.
Defendant Sophos Ltd.'s Preliminary Invalidity Contentions, Exhibit 932-A-6, *Webroot, Inc. and Open Text, Inc.* v. *Sophos Ltd.*, CA. No. 6:22-CV-00240-ADA-DTG, W.D. Tex., Feb. 21, 2023, 115 pgs.
Defendant Sophos Ltd.'s Preliminary Invalidity Contentions, Exhibit 932-A-7, *Webroot, Inc. and Open Text, Inc.* v. *Sophos Ltd.*, CA. No. 6:22-CV-00240-ADA-DTG, W.D. Tex., Feb. 21, 2023, 69 pgs.
Defendant Sophos Ltd.'s Preliminary Invalidity Contentions, Exhibit 932-A-8, *Webroot, Inc. and Open Text, Inc.* v. *Sophos Ltd.*, CA. No. 6:22-CV-00240-ADA-DTG, W.D. Tex., Feb. 21, 2023, 57 pgs.
Defendant Sophos Ltd.'s Preliminary Invalidity Contentions, Exhibit 932-A-9, *Webroot, Inc. and Open Text, Inc.* v. *Sophos Ltd.*, CA. No. 6:22-CV-00240-ADA-DTG, W.D. Tex., Feb. 21, 2023, 119 pgs.
Defendant Sophos Ltd.'s Preliminary Invalidity Contentions, Exhibit 932-A-10, *Webroot, Inc. and Open Text, Inc.* v. *Sophos Ltd.*, CA. No. 6:22-CV-00240-ADA-DTG, W.D. Tex., Feb. 21, 2023, 65 pgs.
Defendant Sophos Ltd.'s Preliminary Invalidity Contentions, Exhibit 932-A-11, *Webroot, Inc. and Open Text, Inc.* v. *Sophos Ltd.*, CA. No. 6:22-CV-00240-ADA-DTG, W.D. Tex., Feb. 21, 2023, 62 pgs.
Defendant Sophos Ltd.'s Preliminary Invalidity Contentions, Exhibit 932-A-12, *Webroot, Inc. and Open Text, Inc.* v. *Sophos Ltd.*, CA. No. 6:22-CV-00240-ADA-DTG, W.D. Tex., Feb. 21, 2023, 39 pgs.
Defendant Sophos Ltd.'s Preliminary Invalidity Contentions, Exhibit 932-A-13, *Webroot, Inc. and Open Text, Inc.* v. *Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 932-A-14, *Webroot, Inc. and Open Text, Inc.* v. *Sophos Ltd.*, CA. No. 6:22-CV-00240-ADA-DTG, W.D. Tex., Feb. 21, 2023, 59 pgs.
Defendant Sophos Ltd.'s Preliminary Invalidity Contentions, Exhibit 932-A-15, *Webroot, Inc. and Open Text, Inc.* v. *Sophos Ltd.*, CA. No. 6:22-CV-00240-ADA-DTG, W.D. Tex., Feb. 21, 2023, 66 pgs.
Defendant Sophos Ltd.'s Preliminary Invalidity Contentions, Exhibit 932-A-16, *Webroot, Inc. and Open Text, Inc.* v. *Sophos Ltd.*, CA. No. 6:22-CV-00240-ADA-DTG, W.D. Tex., Feb. 21, 2023, 60 pgs.
Defendant Sophos Ltd.'s Preliminary Invalidity Contentions, Exhibit 932-A-17, *Webroot, Inc. and Open Text, Inc.* v. *Sophos Ltd.*, CA. No. 6:22-CV-00240-ADA-DTG, W.D. Tex., Feb. 21, 2023, 65 pgs.
Defendant Sophos Ltd.'s Preliminary Invalidity Contentions, Exhibit 932-A-18, *Webroot, Inc. and Open Text, Inc.* v. *Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 932-A-19, *Webroot, Inc. and Open Text, Inc.* v. *Sophos Ltd.*, CA. No. 6:22-CV-00240-ADA-DTG, W.D. Tex., Feb. 21, 2023, 80 pgs.
Defendant Sophos Ltd.'s Preliminary Invalidity Contentions, Exhibit 932-A-20, *Webroot, Inc. and Open Text, Inc.* v. *Sophos Ltd.*, CA. No. 6:22-CV-00240-ADA-DTG, W.D. Tex., Feb. 21, 2023, 61 pgs.
Defendant Sophos Ltd.'s Preliminary Invalidity Contentions, Exhibit 932-A-21, *Webroot, Inc. and Open Text, Inc.* v. *Sophos Ltd.*, CA. No. 6:22-CV-00240-ADA-DTG, W.D. Tex., Feb. 21, 2023, 158 pgs.
Defendant Sophos Ltd.'s Preliminary Invalidity Contentions, Exhibit 932-A-22, *Webroot, Inc. and Open Text, Inc.* v. *Sophos Ltd.*, CA. No. 6:22-CV-00240-ADA-DTG, W.D. Tex., Feb. 21, 2023, 297 pgs.
Defendant Sophos Ltd.'s Preliminary Invalidity Contentions, Exhibit 932-A-23, *Webroot, Inc. and Open Text, Inc.* v. *Sophos Ltd.*, CA. No. 6:22-CV-00240-ADA-DTG, W.D. Tex., Feb. 21, 2023, 73 pgs.
Defendant Sophos Ltd.'s Preliminary Invalidity Contentions, Exhibit 932-A-24, *Webroot, Inc. and Open Text, Inc.* v. *Sophos Ltd.*, CA. No. 6:22-CV-00240-ADA-DTG, W.D. Tex., Feb. 21, 2023, 44 pgs.
Defendant Sophos Ltd.'s Preliminary Invalidity Contentions, Exhibit 932-A-25, *Webroot, Inc. and Open Text, Inc.* v. *Sophos Ltd.*, CA. No. 6:22-CV-00240-ADA-DTG, W.D. Tex., Feb. 21, 2023, 46 pgs.
Defendant Sophos Ltd.'s Preliminary Invalidity Contentions, Exhibit 932-A-26, *Webroot, Inc. and Open Text, Inc.* v. *Sophos Ltd.*, CA. No. 6:22-CV-00240-ADA-DTG, W.D. Tex., Feb. 21, 2023, 43 pgs.
Defendant Sophos Ltd.'s Preliminary Invalidity Contentions, Exhibit 932-A-27, *Webroot, Inc. and Open Text, Inc.* v. *Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 932-B, *Webroot, Inc. and Open Text, Inc.* v. *Sophos Ltd.*, CA. No. 6:22-CV-00240-ADA-DTG, W.D. Tex., Feb. 21, 2023, 139 pgs.
Defendant Sophos Ltd.'s Preliminary Invalidity Contentions, Exhibit 244-A-1, *Webroot, Inc. and Open Text, Inc.* v. *Sophos Ltd.*, CA. No. 6:22-CV-00240-ADA-DTG, W.D. Tex., Feb. 21, 2023, 290 pgs.
Defendant Sophos Ltd.'s Preliminary Invalidity Contentions, Exhibit 244-A-2, *Webroot, Inc. and Open Text, Inc.* v. *Sophos Ltd.*, CA. No. 6:22-CV-00240-ADA-DTG, W.D. Tex., Feb. 21, 2023, 104 pgs.

(56) References Cited

OTHER PUBLICATIONS

Defendant Sophos Ltd.'s Preliminary Invalidity Contentions, Exhibit 244-A-3, *Webroot, Inc. and Open Text, Inc. v. Sophos Ltd.*, CA. No. 6:22-CV-00240-ADA-DTG, W.D. Tex., Feb. 21, 2023, 71 pgs.
Defendant Sophos Ltd.'s Preliminary Invalidity Contentions, Exhibit 244-A-4, *Webroot, Inc. and Open Text, Inc. v. Sophos Ltd.*, CA. No. 6:22-CV-00240-ADA-DTG, W.D. Tex., Feb. 21, 2023, 182 pgs.
Defendant Sophos Ltd.'s Preliminary Invalidity Contentions, Exhibit 244-A-5, *Webroot, Inc. and Open Text, Inc. v. Sophos Ltd.*, CA. No. 6:22-CV-00240-ADA-DTG, W.D. Tex., Feb. 21, 2023, 37 pgs.
Defendant Sophos Ltd.'s Preliminary Invalidity Contentions, Exhibit 244-A-6, *Webroot, Inc. and Open Text, Inc. v. Sophos Ltd.*, CA. No. 6:22-CV-00240-ADA-DTG, W.D. Tex., Feb. 21, 2023, 43 pgs.
Defendant Sophos Ltd.'s Preliminary Invalidity Contentions, Exhibit 244-A-7, *Webroot, Inc. and Open Text, Inc. v. Sophos Ltd.*, CA. No. 6:22-CV-00240-ADA-DTG, W.D. Tex., Feb. 21, 2023, 55 pgs.
Defendant Sophos Ltd.'s Preliminary Invalidity Contentions, Exhibit 244-A-8, *Webroot, Inc. and Open Text, Inc. v. Sophos Ltd.*, CA. No. 6:22-CV-00240-ADA-DTG, W.D. Tex., Feb. 21, 2023, 80 pgs.
Defendant Sophos Ltd.'s Preliminary Invalidity Contentions, Exhibit 244-A-9, *Webroot, Inc. and Open Text, Inc. v. Sophos Ltd.*, CA. No. 6:22-CV-00240-ADA-DTG, W.D. Tex., Feb. 21, 2023, 62 pgs.
Defendant Sophos Ltd.'s Preliminary Invalidity Contentions, Exhibit 244-A-10, *Webroot, Inc. and Open Text, Inc. v. Sophos Ltd.*, CA. No. 6:22-CV-00240-ADA-DTG, W.D. Tex., Feb. 21, 2023, 70 pgs.
Defendant Sophos Ltd.'s Preliminary Invalidity Contentions, Exhibit 244-A-11, *Webroot, Inc. and Open Text, Inc. v. Sophos Ltd.*, CA. No. 6:22-CV-00240-ADA-DTG, W.D. Tex., Feb. 21, 2023, 45 pgs.
Defendant Sophos Ltd.'s Preliminary Invalidity Contentions, Exhibit 244-A-12, *Webroot, Inc. and Open Text, Inc. v. Sophos Ltd.*, CA. No. 6:22-CV-00240-ADA-DTG, W.D. Tex., Feb. 21, 2023, 72 pgs.
Defendant Sophos Ltd.'s Preliminary Invalidity Contentions, Exhibit 244-A-13, *Webroot, Inc. and Open Text, Inc. v. Sophos Ltd.*, CA. No. 6:22-CV-00240-ADA-DTG, W.D. Tex., Feb. 21, 2023, 68 pgs.
Defendant Sophos Ltd.'s Preliminary Invalidity Contentions, Exhibit 244-A-14, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 244-A-15, *Webroot, Inc. and Open Text, Inc. v. Sophos Ltd.*, CA. No. 6:22-CV-00240-ADA-DTG, W.D. Tex., Feb. 21, 2023, 54 pgs.
Defendant Sophos Ltd.'s Preliminary Invalidity Contentions, Exhibit 244-A-16, *Webroot, Inc. and Open Text, Inc. v. Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 244-A-17, *Webroot, Inc. and Open Text, Inc. v. Sophos Ltd.*, CA. No. 6:22-CV-00240-ADA-DTG, W.D. Tex., Feb. 21, 2023, 212 pgs.
Defendant Sophos Ltd.'s Preliminary Invalidity Contentions, Exhibit 244-A-18, *Webroot, Inc. and Open Text, Inc. v. Sophos Ltd.*, CA. No. 6:22-CV-00240-ADA-DTG, W.D. Tex., Feb. 21, 2023, 66 pgs.
Defendant Sophos Ltd.'s Preliminary Invalidity Contentions, Exhibit 244-A-19, *Webroot, Inc. and Open Text, Inc. v. Sophos Ltd.*, CA. No. 6:22-CV-00240-ADA-DTG, W.D. Tex., Feb. 21, 2023, 109 pgs.
Defendant Sophos Ltd.'s Preliminary Invalidity Contentions, Exhibit 244-A-20, *Webroot, Inc. and Open Text, Inc. v. Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 244-A-21, *Webroot, Inc. and Open Text, Inc. v. Sophos Ltd.*, CA. No. 6:22-CV-00240-ADA-DTG, W.D. Tex., Feb. 21, 2023, 4 pgs.
Defendant Sophos Ltd.'s Preliminary Invalidity Contentions, Exhibit 244-A-22, *Webroot, Inc. and Open Text, Inc. v. Sophos Ltd.*, CA. No. 6:22-CV-00240-ADA-DTG, W.D. Tex., Feb. 21, 2023, 198 pgs.
Defendant Sophos Ltd.'s Preliminary Invalidity Contentions, Exhibit 244-B, *Webroot, Inc. and Open Text, Inc. v. Sophos Ltd.*, CA. No. 6:22-CV-00240-ADA-DTG, W.D. Tex., Feb. 21, 2023, 56 pgs.
Defendant Sophos Ltd.'s Preliminary Invalidity Contentions, Exhibit 505-A-1, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 505-A-2, *Webroot, Inc. and Open Text, Inc. v. Sophos Ltd.*, CA. No. 6:22-CV-00240-ADA-DTG, W.D. Tex., Feb. 21, 2023, 39 pgs.
Defendant Sophos Ltd.'s Preliminary Invalidity Contentions, Exhibit 505-A-3, *Webroot, Inc. and Open Text, Inc. v. Sophos Ltd.*, CA. No. 6:22-CV-00240-ADA-DTG, W.D. Tex., Feb. 21, 2023, 111 pgs.
Defendant Sophos Ltd.'s Preliminary Invalidity Contentions, Exhibit 505-A-4, *Webroot, Inc. and Open Text, Inc. v. Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 505-A-5, *Webroot, Inc. and Open Text, Inc. v. Sophos Ltd.*, CA. No. 6:22-CV-00240-ADA-DTG, W.D. Tex., Feb. 21, 2023, 38 pgs.
Defendant Sophos Ltd.'s Preliminary Invalidity Contentions, Exhibit 505-A-6, *Webroot, Inc. and Open Text, Inc. v. Sophos Ltd.*, CA. No. 6:22-CV-00240-ADA-DTG, W.D. Tex., Feb. 21, 2023, 162 pgs.
Defendant Sophos Ltd.'s Preliminary Invalidity Contentions, Exhibit 505-A-7, *Webroot, Inc. and Open Text, Inc. v. Sophos Ltd.*, CA. No. 6:22-CV-00240-ADA-DTG, W.D. Tex., Feb. 21, 2023, 96 pgs.
Defendant Sophos Ltd.'s Preliminary Invalidity Contentions, Exhibit 505-A-8, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 505-A-9, *Webroot, Inc. and Open Text, Inc. v. Sophos Ltd.*, CA. No. 6:22-CV-00240-ADA-DTG, W.D. Tex., Feb. 21, 2023, 81 pgs.
Defendant Sophos Ltd.'s Preliminary Invalidity Contentions, Exhibit 505-A-10, *Webroot, Inc. and Open Text, Inc. v. Sophos Ltd.*, CA. No. 6:22-CV-00240-ADA-DTG, W.D. Tex., Feb. 21, 2023, 48 pgs.
Defendant Sophos Ltd.'s Preliminary Invalidity Contentions, Exhibit 505-A-11, *Webroot, Inc. and Open Text, Inc. v. Sophos Ltd.*, CA. No. 6:22-CV-00240-ADA-DTG, W.D. Tex., Feb. 21, 2023, 52 pgs.
Defendant Sophos Ltd.'s Preliminary Invalidity Contentions, Exhibit 505-A-12, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 505-A-13, *Webroot, Inc. and Open Text, Inc. v. Sophos Ltd.*, CA. No. 6:22-CV-00240-ADA-DTG, W.D. Tex., Feb. 21, 2023, 147 pgs.
Defendant Sophos Ltd.'s Preliminary Invalidity Contentions, Exhibit 505-A-14, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 505-A-15, *Webroot, Inc. and Open Text, Inc. v. Sophos Ltd.*, CA. No. 6:22-CV-00240-ADA-DTG, W.D. Tex., Feb. 21, 2023, 148 pgs.
Defendant Sophos Ltd.'s Preliminary Invalidity Contentions, Exhibit 505-A-16, *Webroot, Inc. and Open Text, Inc. v. Sophos Ltd.*, CA. No. 6:22-CV-00240-ADA-DTG, W.D. Tex., Feb. 21, 2023, 46 pgs.
Defendant Sophos Ltd.'s Preliminary Invalidity Contentions, Exhibit 505-A-17, *Webroot, Inc. and Open Text, Inc. v. Sophos Ltd.*, CA. No. 6:22-CV-00240-ADA-DTG, W.D. Tex., Feb. 21, 2023, 31 pgs.
Defendant Sophos Ltd.'s Preliminary Invalidity Contentions, Exhibit 505-A-18, *Webroot, Inc. and Open Text, Inc. v. Sophos Ltd.*, CA. No. 6:22-CV-00240-ADA-DTG, W.D. Tex., Feb. 21, 2023, 47 pgs.
Defendant Sophos Ltd.'s Preliminary Invalidity Contentions, Exhibit 505-A-19, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 505-A-20, *Webroot, Inc. and Open Text, Inc. v. Sophos Ltd.*, CA. No. 6:22-CV-00240-ADA-DTG, W.D. Tex., Feb. 21, 2023, 47 pgs.
Defendant Sophos Ltd.'s Preliminary Invalidity Contentions, Exhibit 505-B, *Webroot, Inc. and Open Text, Inc. v. Sophos Ltd.*, CA. No. 6:22-CV-00240-ADA-DTG, W.D. Tex., Feb. 21, 2023, 81 pgs.
Defendant's Preliminary Invalidity Contentions, Exhibit 045-A-2, *Webroot, Inc. and Open Text, Inc. v. Trend Micro Inc.*, No. 6:22-CV-00239-ADA-DTG, W.D. Tex., Sep. 13, 2022, 35 pgs.
Defendant's Preliminary Invalidity Contentions, Exhibit 045-A-3, *Webroot, Inc. and Open Text, Inc. v. Trend Micro Inc.*, No. 6:22-CV-00239-ADA-DTG, W.D. Tex., Sep. 13, 2022, 75 pgs.
Defendant's Preliminary Invalidity Contentions, Exhibit 045-A-4, *Webroot, Inc. and Open Text, Inc. v. Trend Micro Inc.*, No. 6:22-CV-00239-ADA-DTG, W.D. Tex., Sep. 13, 2022, 51 pgs.
Defendant's Preliminary Invalidity Contentions, Exhibit 045-A-5, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 045-A-6, *Webroot, Inc. and Open Text, Inc. v. Trend Micro Inc.*, No. 6:22-CV-00239-ADA-DTG, W.D. Tex., Sep. 13, 2022, 66 pgs.

(56) References Cited

OTHER PUBLICATIONS

Defendant's Preliminary Invalidity Contentions, Exhibit 045-A-7, *Webroot, Inc. and Open Text, Inc. v. Trend Micro Inc.*, No. 6:22-CV-00239-ADA-DTG, W.D. Tex., Sep. 13, 2022, 62 pgs.
Defendant's Preliminary Invalidity Contentions, Exhibit 045-A-9, *Webroot, Inc. and Open Text, Inc. v. Trend Micro Inc.*, No. 6:22-CV-00239-ADA-DTG, W.D. Tex., Sep. 13, 2022, 47 pgs.
Defendant's Preliminary Invalidity Contentions, Exhibit 045-A-10, *Webroot, Inc. and Open Text, Inc. v. Trend Micro Inc.*, No. 6:22-CV-00239-ADA-DTG, W.D. Tex., Sep. 13, 2022, 35 pgs.
Defendant's Preliminary Invalidity Contentions, Exhibit 045-A-11, *Webroot, Inc. and Open Text, Inc. v. Trend Micro Inc.*, No. 6:22-CV-00239-ADA-DTG, W.D. Tex., Sep. 13, 2022, 37 pgs.
Defendant's Preliminary Invalidity Contentions, Exhibit 045-A-12, *Webroot, Inc. and Open Text, Inc. v. Trend Micro Inc.*, No. 6:22-CV-00239-ADA-DTG, W.D. Tex., Sep. 13, 2022, 21 pgs.
Defendant's Preliminary Invalidity Contentions, Exhibit 045-A-13, *Webroot, Inc. and Open Text, Inc. v. Trend Micro Inc.*, No. 6:22-CV-00239-ADA-DTG, W.D. Tex., Sep. 13, 2022, 22 pgs.
Defendant's Preliminary Invalidity Contentions, Exhibit 045-A-14, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 045-A-15, *Webroot, Inc. and Open Text, Inc. v. Trend Micro Inc.*, No. 6:22-CV-00239-ADA-DTG, W.D. Tex., Sep. 13, 2022, 18 pgs.
Defendant's Preliminary Invalidity Contentions, Exhibit 045-A-16, *Webroot, Inc. and Open Text, Inc. v. Trend Micro Inc.*, No. 6:22-CV-00239-ADA-DTG, W.D. Tex., Sep. 13, 2022, 23 pgs.
Defendant's Preliminary Invalidity Contentions, Exhibit 045-A-17, *Webroot, Inc. and Open Text, Inc. v. Trend Micro Inc.*, No. 6:22-CV-00239-ADA-DTG, W.D. Tex., Sep. 13, 2022, 24 pgs.
Defendant's Preliminary Invalidity Contentions, Exhibit 045-A-18, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 045-A-19, *Webroot, Inc. and Open Text, Inc. v. Trend Micro Inc.*, No. 6:22-CV-00239-ADA-DTG, W.D. Tex., Sep. 13, 2022, 20 pgs.
Defendant's Preliminary Invalidity Contentions, Exhibit 045-A-20, *Webroot, Inc. and Open Text, Inc. v. Trend Micro Inc.*, No. 6:22-CV-00239-ADA-DTG, W.D. Tex., Sep. 13, 2022, 23 pgs.
Defendant's Preliminary Invalidity Contentions, Exhibit 045-A-21, *Webroot, Inc. and Open Text, Inc. v. Trend Micro Inc.*, No. 6:22-CV-00239-ADA-DTG, W.D. Tex., Sep. 13, 2022, 48 pgs.
Defendant's Preliminary Invalidity Contentions, Exhibit 045-A-22, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 045-A-23, *Webroot, Inc. and Open Text, Inc. v. Trend Micro Inc.*, No. 6:22-CV-00239-ADA-DTG, W.D. Tex., Sep. 13, 2022, 36 pgs.
Defendant's Preliminary Invalidity Contentions, Exhibit 045-A-24, *Webroot, Inc. and Open Text, Inc. v. Trend Micro Inc.*, No. 6:22-CV-00239-ADA-DTG, W.D. Tex., Sep. 13, 2022, 57 pgs.
Defendant's Preliminary Invalidity Contentions, Exhibit 045-A-25, *Webroot, Inc. and Open Text, Inc. v. Trend Micro Inc.*, No. 6:22-CV-00239-ADA-DTG, W.D. Tex., Sep. 13, 2022, 45 pgs.
Defendant's Preliminary Invalidity Contentions, Exhibit 045-A-26, *Webroot, Inc. and Open Text, Inc. v. Trend Micro Inc.*, No. 6:22-CV-00239-ADA-DTG, W.D. Tex., Sep. 13, 2022, 19 pgs.
Defendant's Preliminary Invalidity Contentions, Exhibit 045-A-27, *Webroot, Inc. and Open Text, Inc. v. Trend Micro Inc.*, No. 6:22-CV-00239-ADA-DTG, W.D. Tex., Sep. 13, 2022, 43 pgs.
Defendant's Preliminary Invalidity Contentions, Exhibit 045-A-28, *Webroot, Inc. and Open Text, Inc. v. Trend Micro Inc.*, No. 6:22-CV-00239-ADA-DTG, W.D. Tex., Sep. 13, 2022, 48 pgs.
Defendant's Preliminary Invalidity Contentions, Exhibit 045-A-29, *Webroot, Inc. and Open Text, Inc. v. Trend Micro Inc.*, No. 6:22-CV-00239-ADA-DTG, W.D. Tex., Sep. 13, 2022, 48 pgs.
Defendant's Preliminary Invalidity Contentions, Exhibit 045-A-30, *Webroot, Inc. and Open Text, Inc. v. Trend Micro Inc.*, No. 6:22-CV-00239-ADA-DTG, W.D. Tex., Sep. 13, 2022, 49 pgs.
Defendant's Preliminary Invalidity Contentions, Exhibit 045-A-31, *Webroot, Inc. and Open Text, Inc. v. Trend Micro Inc.*, No. 6:22-CV-00239-ADA-DTG, W.D. Tex., Sep. 13, 2022, 59 pgs.
Defendant's Preliminary Invalidity Contentions, Exhibit 045-A-32, *Webroot, Inc. and Open Text, Inc. v. Trend Micro Inc.*, No. 6:22-CV-00239-ADA-DTG, W.D. Tex., Sep. 13, 2022, 100 pgs.
Defendant's Preliminary Invalidity Contentions, Exhibit 045-A-33, *Webroot, Inc. and Open Text, Inc. v. Trend Micro Inc.*, No. 6:22-CV-00239-ADA-DTG, W.D. Tex., Sep. 13, 2022, 74 pgs.
Defendant's Preliminary Invalidity Contentions, Exhibit 045-A-34, *Webroot, Inc. and Open Text, Inc. v. Trend Micro Inc.*, No. 6:22-CV-00239-ADA-DTG, W.D. Tex., Sep. 13, 2022, 39 pgs.
Defendant's Preliminary Invalidity Contentions, Exhibit 045-A-35, *Webroot, Inc. and Open Text, Inc. v. Trend Micro Inc.*, No. 6:22-CV-00239-ADA-DTG, W.D. Tex., Sep. 13, 2022, 64 pgs.
Defendant's Preliminary Invalidity Contentions, Exhibit 045-A-36, *Webroot, Inc. and Open Text, Inc. v. Trend Micro Inc.*, No. 6:22-CV-00239-ADA-DTG, W.D. Tex., Sep. 13, 2022, 170 pgs.
Defendant's Preliminary Invalidity Contentions, Exhibit 045-A-37, *Webroot, Inc. and Open Text, Inc. v. Trend Micro Inc.*, No. 6:22-CV-00239-ADA-DTG, W.D. Tex., Sep. 13, 2022, 170 pgs.
Defendant's Preliminary Invalidity Contentions, Exhibit 045-A-38, *Webroot, Inc. and Open Text, Inc. v. Trend Micro Inc.*, No. 6:22-CV-00239-ADA-DTG, W.D. Tex., Sep. 13, 2022, 32 pgs.
Defendant's Preliminary Invalidity Contentions, Exhibit 045-A-39, *Webroot, Inc. and Open Text, Inc. v. Trend Micro Inc.*, No. 6:22-CV-00239-ADA-DTG, W.D. Tex., Sep. 13, 2022, 62 pgs.
Defendant's Preliminary Invalidity Contentions, Exhibit 045-A-40, *Webroot, Inc. and Open Text, Inc. v. Trend Micro Inc.*, No. 6:22-CV-00239-ADA-DTG, W.D. Tex., Sep. 13, 2022, 79 pgs.
Defendant's Preliminary Invalidity Contentions, Exhibit 045-A-41, *Webroot, Inc. and Open Text, Inc. v. Trend Micro Inc.*, No. 6:22-CV-00239-ADA-DTG, W.D. Tex., Sep. 13, 2022, 85 pgs.
Defendant's Preliminary Invalidity Contentions, Exhibit 045-A-42, *Webroot, Inc. and Open Text, Inc. v. Trend Micro Inc.*, No. 6:22-CV-00239-ADA-DTG, W.D. Tex., Sep. 13, 2022, 70 pgs.
Defendant's Preliminary Invalidity Contentions, Exhibit 045-A-43, *Webroot, Inc. and Open Text, Inc. v. Trend Micro Inc.*, No. 6:22-CV-00239-ADA-DTG, W.D. Tex., Sep. 13, 2022, 76 pgs.
Defendant's Preliminary Invalidity Contentions, Exhibit 045-A-44, *Webroot, Inc. and Open Text, Inc. v. Trend Micro Inc.*, No. 6:22-CV-00239-ADA-DTG, W.D. Tex., Sep. 13, 2022, 38 pgs.
Defendant's Preliminary Invalidity Contentions, Exhibit 045-A-45, *Webroot, Inc. and Open Text, Inc. v. Trend Micro Inc.*, No. 6:22-CV-00239-ADA-DTG, W.D. Tex., Sep. 13, 2022, 45 pgs.
Defendant's Preliminary Invalidity Contentions, Exhibit 045-A-46, *Webroot, Inc. and Open Text, Inc. v. Trend Micro Inc.*, No. 6:22-CV-00239-ADA-DTG, W.D. Tex., Sep. 13, 2022, 78 pgs.
Defendant's Preliminary Invalidity Contentions, Exhibit 045-A-47, *Webroot, Inc. and Open Text, Inc. v. Trend Micro Inc.*, No. 6:22-CV-00239-ADA-DTG, W.D. Tex., Sep. 13, 2022, 65 pgs.
Defendant's Preliminary Invalidity Contentions, Exhibit 045-A-48, *Webroot, Inc. and Open Text, Inc. v. Trend Micro Inc.*, No. 6:22-CV-00239-ADA-DTG, W.D. Tex., Sep. 13, 2022, 27 pgs.
Defendant's Preliminary Invalidity Contentions, Exhibit 045-A-49, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 045-A-50, *Webroot, Inc. and Open Text, Inc. v. Trend Micro Inc.*, No. 6:22-CV-00239-ADA-DTG, W.D. Tex., Sep. 13, 2022, 98 pgs.
Defendant's Preliminary Invalidity Contentions, Exhibit 045-B, *Webroot, Inc. and Open Text, Inc. v. Trend Micro Inc.*, No. 6:22-CV-00239-ADA-DTG, W.D. Tex., Sep. 13, 2022, 45 pgs.
Defendant's Preliminary Invalidity Contentions, Exhibit 224-A-2, *Webroot, Inc. and Open Text, Inc. v. Trend Micro Inc.*, No. 6:22-CV-00239-ADA-DTG, W.D. Tex., Sep. 13, 2022, 102 pgs.
Defendant's Preliminary Invalidity Contentions, Exhibit 224-A-3, *Webroot, Inc. and Open Text, Inc. v. Trend Micro Inc.*, No. 6:22-CV-00239-ADA-DTG, W.D. Tex., Sep. 13, 2022, 169 pgs.
Defendant's Preliminary Invalidity Contentions, Exhibit 224-A-4, *Webroot, Inc. and Open Text, Inc. v. Trend Micro Inc.*, No. 6:22-CV-00239-ADA-DTG, W.D. Tex., Sep. 13, 2022, 120 pgs.

(56) References Cited

OTHER PUBLICATIONS

Defendant's Preliminary Invalidity Contentions, Exhibit 224-A-5, *Webroot, Inc. and Open Text, Inc. v. Trend Micro Inc.*, No. 6:22-CV-00239-ADA-DTG, W.D. Tex., Sep. 13, 2022, 117 pgs.
Defendant's Preliminary Invalidity Contentions, Exhibit 224-A-6, *Webroot, Inc. and Open Text, Inc. v. Trend Micro Inc.*, No. 6:22-CV-00239-ADA-DTG, W.D. Tex., Sep. 13, 2022, 142 pgs.
Defendant's Preliminary Invalidity Contentions, Exhibit 224-A-7, *Webroot, Inc. and Open Text, Inc. v. Trend Micro Inc.*, No. 6:22-CV-00239-ADA-DTG, W.D. Tex., Sep. 13, 2022, 129 pgs.
Defendant's Preliminary Invalidity Contentions, Exhibit 224-A-9, *Webroot, Inc. and Open Text, Inc. v. Trend Micro Inc.*, No. 6:22-CV-00239-ADA-DTG, W.D. Tex., Sep. 13, 2022, 102 pgs.
Defendant's Preliminary Invalidity Contentions, Exhibit 224-A-10, *Webroot, Inc. and Open Text, Inc. v. Trend Micro Inc.*, No. 6:22-CV-00239-ADA-DTG, W.D. Tex., Sep. 13, 2022, 75 pgs.
Defendant's Preliminary Invalidity Contentions, Exhibit 224-A-11, *Webroot, Inc. and Open Text, Inc. v. Trend Micro Inc.*, No. 6:22-CV-00239-ADA-DTG, W.D. Tex., Sep. 13, 2022, 87 pgs.
Defendant's Preliminary Invalidity Contentions, Exhibit 224-A-12, *Webroot, Inc. and Open Text, Inc. v. Trend Micro Inc.*, No. 6:22-CV-00239-ADA-DTG, W.D. Tex., Sep. 13, 2022, 61 pgs.
Defendant's Preliminary Invalidity Contentions, Exhibit 224-A-13, *Webroot, Inc. and Open Text, Inc. v. Trend Micro Inc.*, No. 6:22-CV-00239-ADA-DTG, W.D. Tex., Sep. 13, 2022, 63 pgs.
Defendant's Preliminary Invalidity Contentions, Exhibit 224-A-14, *Webroot, Inc. and Open Text, Inc. v. Trend Micro Inc.*, No. 6:22-CV-00239-ADA-DTG, W.D. Tex., Sep. 13, 2022, 68 pgs.
Defendant's Preliminary Invalidity Contentions, Exhibit 224-A-15, *Webroot, Inc. and Open Text, Inc. v. Trend Micro Inc.*, No. 6:22-CV-00239-ADA-DTG, W.D. Tex., Sep. 13, 2022, 49 pgs.
Defendant's Preliminary Invalidity Contentions, Exhibit 224-A-16, *Webroot, Inc. and Open Text, Inc. v. Trend Micro Inc.*, No. 6:22-CV-00239-ADA-DTG, W.D. Tex., Sep. 13, 2022, 59 pgs.
Defendant's Preliminary Invalidity Contentions, Exhibit 224-A-17, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 224-A-18, *Webroot, Inc. and Open Text, Inc. v. Trend Micro Inc.*, No. 6:22-CV-00239-ADA-DTG, W.D. Tex., Sep. 13, 2022, 60 pgs.
Defendant's Preliminary Invalidity Contentions, Exhibit 224-A-19, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 224-A-20, *Webroot, Inc. and Open Text, Inc. v. Trend Micro Inc.*, No. 6:22-CV-00239-ADA-DTG, W.D. Tex., Sep. 13, 2022, 57 pgs.
Defendant's Preliminary Invalidity Contentions, Exhibit 224-A-21, *Webroot, Inc. and Open Text, Inc. v. Trend Micro Inc.*, No. 6:22-CV-00239-ADA-DTG, W.D. Tex., Sep. 13, 2022, 95 pgs.
Defendant's Preliminary Invalidity Contentions, Exhibit 224-A-22, *Webroot, Inc. and Open Text, Inc. v. Trend Micro Inc.*, No. 6:22-CV-00239-ADA-DTG, W.D. Tex., Sep. 13, 2022, 108 pgs.
Defendant's Preliminary Invalidity Contentions, Exhibit 224-A-23, *Webroot, Inc. and Open Text, Inc. v. Trend Micro Inc.*, No. 6:22-CV-00239-ADA-DTG, W.D. Tex., Sep. 13, 2022, 59 pgs.
Defendant's Preliminary Invalidity Contentions, Exhibit 224-A-24, *Webroot, Inc. and Open Text, Inc. v. Trend Micro Inc.*, No. 6:22-CV-00239-ADA-DTG, W.D. Tex., Sep. 13, 2022, 110 pgs.
Defendant's Preliminary Invalidity Contentions, Exhibit 224-A-25, *Webroot, Inc. and Open Text, Inc. v. Trend Micro Inc.*, No. 6:22-CV-00239-ADA-DTG, W.D. Tex., Sep. 13, 2022, 92 pgs.
Defendant's Preliminary Invalidity Contentions, Exhibit 224-A-26, *Webroot, Inc. and Open Text, Inc. v. Trend Micro Inc.*, No. 6:22-CV-00239-ADA-DTG, W.D. Tex., Sep. 13, 2022, 51 pgs.
Defendant's Preliminary Invalidity Contentions, Exhibit 224-A-27, *Webroot, Inc. and Open Text, Inc. v. Trend Micro Inc.*, No. 6:22-CV-00239-ADA-DTG, W.D. Tex., Sep. 13, 2022, 118 pgs.
Defendant's Preliminary Invalidity Contentions, Exhibit 224-A-28, *Webroot, Inc. and Open Text, Inc. v. Trend Micro Inc.*, No. 6:22-CV-00239-ADA-DTG, W.D. Tex., Sep. 13, 2022, 118 pgs.
Defendant's Preliminary Invalidity Contentions, Exhibit 224-A-29, *Webroot, Inc. and Open Text, Inc. v. Trend Micro Inc.*, No. 6:22-CV-00239-ADA-DTG, W.D. Tex., Sep. 13, 2022, 85 pgs.
Defendant's Preliminary Invalidity Contentions, Exhibit 224-A-30, *Webroot, Inc. and Open Text, Inc. v. Trend Micro Inc.*, No. 6:22-CV-00239-ADA-DTG, W.D. Tex., Sep. 13, 2022, 98 pgs.
Defendant's Preliminary Invalidity Contentions, Exhibit 224-A-31, *Webroot, Inc. and Open Text, Inc. v. Trend Micro Inc.*, No. 6:22-CV-00239-ADA-DTG, W.D. Tex., Sep. 13, 2022, 111 pgs.
Defendant's Preliminary Invalidity Contentions, Exhibit 224-A-32, *Webroot, Inc. and Open Text, Inc. v. Trend Micro Inc.*, No. 6:22-CV-00239-ADA-DTG, W.D. Tex., Sep. 13, 2022, 150 pgs.
Defendant's Preliminary Invalidity Contentions, Exhibit 224-A-33, *Webroot, Inc. and Open Text, Inc. v. Trend Micro Inc.*, No. 6:22-CV-00239-ADA-DTG, W.D. Tex., Sep. 13, 2022, 129 pgs.
Defendant's Preliminary Invalidity Contentions, Exhibit 224-A-34, *Webroot, Inc. and Open Text, Inc. v. Trend Micro Inc.*, No. 6:22-CV-00239-ADA-DTG, W.D. Tex., Sep. 13, 2022, 65 pgs.
Defendant's Preliminary Invalidity Contentions, Exhibit 224-A-35, *Webroot, Inc. and Open Text, Inc. v. Trend Micro Inc.*, No. 6:22-CV-00239-ADA-DTG, W.D. Tex., Sep. 13, 2022, 108 pgs.
Defendant's Preliminary Invalidity Contentions, Exhibit 224-A-36, *Webroot, Inc. and Open Text, Inc. v. Trend Micro Inc.*, No. 6:22-CV-00239-ADA-DTG, W.D. Tex., Sep. 13, 2022, 275 pgs.
Defendant's Preliminary Invalidity Contentions, Exhibit 224-A-37, *Webroot, Inc. and Open Text, Inc. v. Trend Micro Inc.*, No. 6:22-CV-00239-ADA-DTG, W.D. Tex., Sep. 13, 2022, 198 pgs.
Defendant's Preliminary Invalidity Contentions, Exhibit 224-A-38, *Webroot, Inc. and Open Text, Inc. v. Trend Micro Inc.*, No. 6:22-CV-00239-ADA-DTG, W.D. Tex., Sep. 13, 2022, 65 pgs.
Defendant's Preliminary Invalidity Contentions, Exhibit 224-A-39, *Webroot, Inc. and Open Text, Inc. v. Trend Micro Inc.*, No. 6:22-CV-00239-ADA-DTG, W.D. Tex., Sep. 13, 2022, 107 pgs.
Defendant's Preliminary Invalidity Contentions, Exhibit 224-A-40, *Webroot, Inc. and Open Text, Inc. v. Trend Micro Inc.*, No. 6:22-CV-00239-ADA-DTG, W.D. Tex., Sep. 13, 2022, 138 pgs.
Defendant's Preliminary Invalidity Contentions, Exhibit 224-A-41, *Webroot, Inc. and Open Text, Inc. v. Trend Micro Inc.*, No. 6:22-CV-00239-ADA-DTG, W.D. Tex., Sep. 13, 2022, 150 pgs.
Defendant's Preliminary Invalidity Contentions, Exhibit 224-A-42, *Webroot, Inc. and Open Text, Inc. v. Trend Micro Inc.*, No. 6:22-CV-00239-ADA-DTG, W.D. Tex., Sep. 13, 2022, 129 pgs.
Defendant's Preliminary Invalidity Contentions, Exhibit 224-A-43, *Webroot, Inc. and Open Text, Inc. v. Trend Micro Inc.*, No. 6:22-CV-00239-ADA-DTG, W.D. Tex., Sep. 13, 2022, 118 pgs.
Defendant's Preliminary Invalidity Contentions, Exhibit 224-A-44, *Webroot, Inc. and Open Text, Inc. v. Trend Micro Inc.*, No. 6:22-CV-00239-ADA-DTG, W.D. Tex., Sep. 13, 2022, 70 pgs.
Defendant's Preliminary Invalidity Contentions, Exhibit 224-A-45, *Webroot, Inc. and Open Text, Inc. v. Trend Micro Inc.*, No. 6:22-CV-00239-ADA-DTG, W.D. Tex., Sep. 13, 2022, 70 pgs.
Defendant's Preliminary Invalidity Contentions, Exhibit 224-A-46, *Webroot, Inc. and Open Text, Inc. v. Trend Micro Inc.*, No. 6:22-CV-00239-ADA-DTG, W.D. Tex., Sep. 13, 2022, 124 pgs.
Defendant's Preliminary Invalidity Contentions, Exhibit 224-A-47, *Webroot, Inc. and Open Text, Inc. v. Trend Micro Inc.*, No. 6:22-CV-00239-ADA-DTG, W.D. Tex., Sep. 13, 2022, 110 pgs.
Defendant's Preliminary Invalidity Contentions, Exhibit 224-A-48, *Webroot, Inc. and Open Text, Inc. v. Trend Micro Inc.*, No. 6:22-CV-00239-ADA-DTG, W.D. Tex., Sep. 13, 2022, 45 pgs.
Defendant's Preliminary Invalidity Contentions, Exhibit 224-A-49, *Webroot, Inc. and Open Text, Inc. v. Trend Micro Inc.*, No. 6:22-CV-00239-ADA-DTG, W.D. Tex., Sep. 13, 2022, 112 pgs.
Defendant's Preliminary Invalidity Contentions, Exhibit 224-A-50, *Webroot, Inc. and Open Text, Inc. v. Trend Micro Inc.*, No. 6:22-CV-00239-ADA-DTG, W.D. Tex., Sep. 13, 2022, 187 pgs.
Defendant's Preliminary Invalidity Contentions, Exhibit 224-B, *Webroot, Inc. and Open Text, Inc. v. Trend Micro Inc.*, No. 6:22-CV-00239-ADA-DTG, W.D. Tex., Sep. 13, 2022, 93 pgs.
Defendant's Preliminary Invalidity Contentions, Exhibit 591-A-1, *Webroot, Inc. and Open Text, Inc. v. Trend Micro Inc.*, No. 6:22-CV-00239-ADA-DTG, W.D. Tex., Sep. 13, 2022, 35 pgs.

(56) References Cited

OTHER PUBLICATIONS

Defendant's Preliminary Invalidity Contentions, Exhibit 591-A-2, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 591-A-3, *Webroot, Inc. and Open Text, Inc. v. Trend Micro Inc.*, No. 6:22-CV-00239-ADA-DTG, W.D. Tex., Sep. 13, 2022, 27 pgs.
Defendant's Preliminary Invalidity Contentions, Exhibit 591-A-4, *Webroot, Inc. and Open Text, Inc. v. Trend Micro Inc.*, No. 6:22-CV-00239-ADA-DTG, W.D. Tex., Sep. 13, 2022, 38 pgs.
Defendant's Preliminary Invalidity Contentions, Exhibit 591-A-5, *Webroot, Inc. and Open Text, Inc. v. Trend Micro Inc.*, No. 6:22-CV-00239-ADA-DTG, W.D. Tex., Sep. 13, 2022, 25 pgs.
Defendant's Preliminary Invalidity Contentions, Exhibit 591-A-6, *Webroot, Inc. and Open Text, Inc. v. Trend Micro Inc.*, No. 6:22-CV-00239-ADA-DTG, W.D. Tex., Sep. 13, 2022, 27 pgs.
Defendant's Preliminary Invalidity Contentions, Exhibit 591-A-7, *Webroot, Inc. and Open Text, Inc. v. Trend Micro Inc.*, No. 6:22-CV-00239-ADA-DTG, W.D. Tex., Sep. 13, 2022, 25 pgs.
Defendant's Preliminary Invalidity Contentions, Exhibit 591-A-8, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 591-A-9, *Webroot, Inc. and Open Text, Inc. v. Trend Micro Inc.*, No. 6:22-CV-00239-ADA-DTG, W.D. Tex., Sep. 13, 2022, 34 pgs.
Defendant's Preliminary Invalidity Contentions, Exhibit 591-A-10, *Webroot, Inc. and Open Text, Inc. v. Trend Micro Inc.*, No. 6:22-CV-00239-ADA-DTG, W.D. Tex., Sep. 13, 2022, 89 pgs.
Defendant's Preliminary Invalidity Contentions, Exhibit 591-A-11, *Webroot, Inc. and Open Text, Inc. v. Trend Micro Inc.*, No. 6:22-CV-00239-ADA-DTG, W.D. Tex., Sep. 13, 2022, 42 pgs.
Defendant's Preliminary Invalidity Contentions, Exhibit 591-A-12, *Webroot, Inc. and Open Text, Inc. v. Trend Micro Inc.*, No. 6:22-CV-00239-ADA-DTG, W.D. Tex., Sep. 13, 2022, 50 pgs.
Defendant's Preliminary Invalidity Contentions, Exhibit 591-A-13, *Webroot, Inc. and Open Text, Inc. v. Trend Micro Inc.*, No. 6:22-CV-00239-ADA-DTG, W.D. Tex., Sep. 13, 2022, 69 pgs.
Defendant's Preliminary Invalidity Contentions, Exhibit 591-A-14, *Webroot, Inc. and Open Text, Inc. v. Trend Micro Inc.*, No. 6:22-CV-00239-ADA-DTG, W.D. Tex., Sep. 13, 2022, 59 pgs.
Defendant's Preliminary Invalidity Contentions, Exhibit 591-A-15, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 591-A-16, *Webroot, Inc. and Open Text, Inc. v. Trend Micro Inc.*, No. 6:22-CV-00239-ADA-DTG, W.D. Tex., Sep. 13, 2022, 43 pgs.
Defendant's Preliminary Invalidity Contentions, Exhibit 591-A-17, *Webroot, Inc. and Open Text, Inc. v. Trend Micro Inc.*, No. 6:22-CV-00239-ADA-DTG, W.D. Tex., Sep. 13, 2022, 47 pgs.
Defendant's Preliminary Invalidity Contentions, Exhibit 591-A-18, *Webroot, Inc. and Open Text, Inc. v. Trend Micro Inc.*, No. 6:22-CV-00239-ADA-DTG, W.D. Tex., Sep. 13, 2022, 46 pgs.
Defendant's Preliminary Invalidity Contentions, Exhibit 591-A-19, *Webroot, Inc. and Open Text, Inc. v. Trend Micro Inc.*, No. 6:22-CV-00239-ADA-DTG, W.D. Tex., Sep. 13, 2022, 99 pgs.
Defendant's Preliminary Invalidity Contentions, Exhibit 591-A-20, *Webroot, Inc. and Open Text, Inc. v. Trend Micro Inc.*, No. 6:22-CV-00239-ADA-DTG, W.D. Tex., Sep. 13, 2022, 33 pgs.
Defendant's Preliminary Invalidity Contentions, Exhibit 591-A-21, *Webroot, Inc. and Open Text, Inc. v. Trend Micro Inc.*, No. 6:22-CV-00239-ADA-DTG, W.D. Tex., Sep. 13, 2022, 38 pgs.
Defendant's Preliminary Invalidity Contentions, Exhibit 591-A-22, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 591-A-23, *Webroot, Inc. and Open Text, Inc. v. Trend Micro Inc.*, No. 6:22-CV-00239-ADA-DTG, W.D. Tex., Sep. 13, 2022, 31 pgs.
Defendant's Preliminary Invalidity Contentions, Exhibit 591-A-24, *Webroot, Inc. and Open Text, Inc. v. Trend Micro Inc.*, No. 6:22-CV-00239-ADA-DTG, W.D. Tex., Sep. 13, 2022, 75 pgs.
Defendant's Preliminary Invalidity Contentions, Exhibit 591-A-25, *Webroot, Inc. and Open Text, Inc. v. Trend Micro Inc.*, No. 6:22-CV-00239-ADA-DTG, W.D. Tex., Sep. 13, 2022, 54 pgs.
Defendant's Preliminary Invalidity Contentions, Exhibit 591-A-26, *Webroot, Inc. and Open Text, Inc. v. Trend Micro Inc.*, No. 6:22-CV-00239-ADA-DTG, W.D. Tex., Sep. 13, 2022, 25 pgs.
Defendant's Preliminary Invalidity Contentions, Exhibit 591-A-27, *Webroot, Inc. and Open Text, Inc. v. Trend Micro Inc.*, No. 6:22-CV-00239-ADA-DTG, W.D. Tex., Sep. 13, 2022, 29 pgs.
Defendant's Preliminary Invalidity Contentions, Exhibit 591-A-28, *Webroot, Inc. and Open Text, Inc. v. Trend Micro Inc.*, No. 6:22-CV-00239-ADA-DTG, W.D. Tex., Sep. 13, 2022, 164 pgs.
Defendant's Preliminary Invalidity Contentions, Exhibit 591-A-29, *Webroot, Inc. and Open Text, Inc. v. Trend Micro Inc.*, No. 6:22-CV-00239-ADA-DTG, W.D. Tex., Sep. 13, 2022, 62 pgs.
Defendant's Preliminary Invalidity Contentions, Exhibit 591-A-30, *Webroot, Inc. and Open Text, Inc. v. Trend Micro Inc.*, No. 6:22-CV-00239-ADA-DTG, W.D. Tex., Sep. 13, 2022, 41 pgs.
Defendant's Preliminary Invalidity Contentions, Exhibit 591-A-31, *Webroot, Inc. and Open Text, Inc. v. Trend Micro Inc.*, No. 6:22-CV-00239-ADA-DTG, W.D. Tex., Sep. 13, 2022, 124 pgs.
Defendant's Preliminary Invalidity Contentions, Exhibit 591-A-32, *Webroot, Inc. and Open Text, Inc. v. Trend Micro Inc.*, No. 6:22-CV-00239-ADA-DTG, W.D. Tex., Sep. 13, 2022, 123 pgs.
Defendant's Preliminary Invalidity Contentions, Exhibit 591-A-33, *Webroot, Inc. and Open Text, Inc. v. Trend Micro Inc.*, No. 6:22-CV-00239-ADA-DTG, W.D. Tex., Sep. 13, 2022, 107 pgs.
Defendant's Preliminary Invalidity Contentions, Exhibit 591-A-34, *Webroot, Inc. and Open Text, Inc. v. Trend Micro Inc.*, No. 6:22-CV-00239-ADA-DTG, W.D. Tex., Sep. 13, 2022, 67 pgs.
Defendant's Preliminary Invalidity Contentions, Exhibit 591-A-35, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 591-A-36, *Webroot, Inc. and Open Text, Inc. v. Trend Micro Inc.*, No. 6:22-CV-00239-ADA-DTG, W.D. Tex., Sep. 13, 2022, 82 pgs.
Defendant's Preliminary Invalidity Contentions, Exhibit 591-A-37, *Webroot, Inc. and Open Text, Inc. v. Trend Micro Inc.*, No. 6:22-CV-00239-ADA-DTG, W.D. Tex., Sep. 13, 2022, 93 pgs.
Defendant's Preliminary Invalidity Contentions, Exhibit 591-A-38, *Webroot, Inc. and Open Text, Inc. v. Trend Micro Inc.*, No. 6:22-CV-00239-ADA-DTG, W.D. Tex., Sep. 13, 2022, 93 pgs.
Defendant's Preliminary Invalidity Contentions, Exhibit 591-A-39, *Webroot, Inc. and Open Text, Inc. v. Trend Micro Inc.*, No. 6:22-CV-00239-ADA-DTG, W.D. Tex., Sep. 13, 2022, 81 pgs.
Defendant's Preliminary Invalidity Contentions, Exhibit 591-A-40, *Webroot, Inc. and Open Text, Inc. v. Trend Micro Inc.*, No. 6:22-CV-00239-ADA-DTG, W.D. Tex., Sep. 13, 2022, 25 pgs.
Defendant's Preliminary Invalidity Contentions, Exhibit 591-A-41, *Webroot, Inc. and Open Text, Inc. v. Trend Micro Inc.*, No. 6:22-CV-00239-ADA-DTG, W.D. Tex., Sep. 13, 2022, 22 pgs.
Defendant's Preliminary Invalidity Contentions, Exhibit 591-A-42, *Webroot, Inc. and Open Text, Inc. v. Trend Micro Inc.*, No. 6:22-CV-00239-ADA-DTG, W.D. Tex., Sep. 13, 2022, 43 pgs.
Defendant's Preliminary Invalidity Contentions, Exhibit 591-A-43, *Webroot, Inc. and Open Text, Inc. v. Trend Micro Inc.*, No. 6:22-CV-00239-ADA-DTG, W.D. Tex., Sep. 13, 2022, 43 pgs.
Defendant's Preliminary Invalidity Contentions, Exhibit 591-A-44, *Webroot, Inc. and Open Text, Inc. v. Trend Micro Inc.*, No. 6:22-CV-00239-ADA-DTG, W.D. Tex., Sep. 13, 2022, 67 pgs.
Defendant's Preliminary Invalidity Contentions, Exhibit 591-B, *Webroot, Inc. and Open Text, Inc. v. Trend Micro Inc.*, No. 6:22-CV-00239-ADA-DTG, W.D. Tex., Sep. 13, 2022, 51 pgs.
Defendant's Preliminary Invalidity Contentions, Exhibit 243-A-1, *Webroot, Inc. and Open Text, Inc. v. Trend Micro Inc.*, No. 6:22-CV-00239-ADA-DTG, W.D. Tex., Feb. 21, 2023, 27 pgs.
Defendant's Preliminary Invalidity Contentions, Exhibit 243-A-2, *Webroot, Inc. and Open Text, Inc. v. Trend Micro Inc.*, No. 6:22-CV-00239-ADA-DTG, W.D. Tex., Feb. 21, 2023, 59 pgs.
Defendant's Preliminary Invalidity Contentions, Exhibit 243-A-3, *Webroot, Inc. and Open Text, Inc. v. Trend Micro Inc.*, No. 6:22-CV-00239-ADA-DTG, W.D. Tex., Feb. 21, 2023, 39 pgs.

(56) References Cited

OTHER PUBLICATIONS

Defendant's Preliminary Invalidity Contentions, Exhibit 243-A-4, *Webroot, Inc. and Open Text, Inc. v. Trend Micro Inc.,* No. 6:22-CV-00239-ADA-DTG, W.D. Tex., Feb. 21, 2023, 34 pgs.
Defendant's Preliminary Invalidity Contentions, Exhibit 243-A-5, *Webroot, Inc. and Open Text, Inc. v. Trend Micro Inc.,* No. 6:22-CV-00239-ADA-DTG, W.D. Tex., Feb. 21, 2023, 101 pgs.
Defendant's Preliminary Invalidity Contentions, Exhibit 243-A-6, *Webroot, Inc. and Open Text, Inc. v. Trend Micro Inc.,* No. 6:22-CV-00239-ADA-DTG, W.D. Tex., Feb. 21, 2023, 39 pgs.
Defendant's Preliminary Invalidity Contentions, Exhibit 243-A-7, *Webroot, Inc. and Open Text, Inc. v. Trend Micro Inc.,* No. 6:22-CV-00239-ADA-DTG, W.D. Tex., Feb. 21, 2023, 80 pgs.
Defendant's Preliminary Invalidity Contentions, Exhibit 243-A-8, *Webroot, Inc. and Open Text, Inc. v. Trend Micro Inc.,* No. 6:22-CV-00239-ADA-DTG, W.D. Tex., Feb. 21, 2023, 62 pgs.
Defendant's Preliminary Invalidity Contentions, Exhibit 243-A-9, *Webroot, Inc. and Open Text, Inc. v. Trend Micro Inc.,* No. 6:22-CV-00239-ADA-DTG, W.D. Tex., Feb. 21, 2023, 103 pgs.
Defendant's Preliminary Invalidity Contentions, Exhibit 243-A-10, *Webroot, Inc. and Open Text, Inc. v. Trend Micro Inc.,* No. 6:22-CV-00239-ADA-DTG, W.D. Tex., Feb. 21, 2023, 57 pgs.
Defendant's Preliminary Invalidity Contentions, Exhibit 243-A-11, *Webroot, Inc. and Open Text, Inc. v. Trend Micro Inc.,* No. 6:22-CV-00239-ADA-DTG, W.D. Tex., Feb. 21, 2023, 98 pgs.
Defendant's Preliminary Invalidity Contentions, Exhibit 243-A-12, *Webroot, Inc. and Open Text, Inc. v. Trend Micro Inc.,* No. 6:22-CV-00239-ADA-DTG, W.D. Tex., Feb. 21, 2023, 71 pgs.
Defendant's Preliminary Invalidity Contentions, Exhibit 243-A-13, *Webroot, Inc. and Open Text, Inc. v. Trend Micro Inc.,* No. 6:22-CV-00239-ADA-DTG, W.D. Tex., Feb. 21, 2023, 49 pgs.
Defendant's Preliminary Invalidity Contentions, Exhibit 243-A-14, *Webroot, Inc. and Open Text, Inc. v. Trend Micro Inc.,* No. 6:22-CV-00239-ADA-DTG, W.D. Tex., Feb. 21, 2023, 60 pgs.
Defendant's Preliminary Invalidity Contentions, Exhibit 243-A-15, *Webroot, Inc. and Open Text, Inc. v. Trend Micro Inc.,* No. 6:22-CV-00239-ADA-DTG, W.D. Tex., Feb. 21, 2023, 38 pgs.
Defendant's Preliminary Invalidity Contentions, Exhibit 243-A-16, *Webroot, Inc. and Open Text, Inc. v. Trend Micro Inc.,* No. 6:22-CV-00239-ADA-DTG, W.D. Tex., Feb. 21, 2023, 54 pgs.
Defendant's Preliminary Invalidity Contentions, Exhibit 243-A-17, *Webroot, Inc. and Open Text, Inc. v. Trend Micro Inc.,* No. 6:22-CV-00239-ADA-DTG, W.D. Tex., Feb. 21, 2023, 44 pgs.
Defendant's Preliminary Invalidity Contentions, Exhibit 243-A-18, *Webroot, Inc. and Open Text, Inc. v. Trend Micro Inc.,* No. 6:22-CV-00239-ADA-DTG, W.D. Tex., Feb. 21, 2023, 48 pgs.
Defendant's Preliminary Invalidity Contentions, Exhibit 243-A-19, *Webroot, Inc. and Open Text, Inc. v. Trend Micro Inc.,* No. 6:22-CV-00239-ADA-DTG, W.D. Tex., Feb. 21, 2023, 37 pgs.
Defendant's Preliminary Invalidity Contentions, Exhibit 243-A-20, *Webroot, Inc. and Open Text, Inc. v. Trend Micro Inc.,* No. 6:22-CV-00239-ADA-DTG, W.D. Tex., Feb. 21, 2023, 32 pgs.
Defendant's Preliminary Invalidity Contentions, Exhibit 243-A-21, *Webroot, Inc. and Open Text, Inc. v. Trend Micro Inc.,* No. 6:22-CV-00239-ADA-DTG, W.D. Tex., Feb. 21, 2023, 240 pgs.
Defendant's Preliminary Invalidity Contentions, Exhibit 243-A-22, *Webroot, Inc. and Open Text, Inc. v. Trend Micro Inc.,* No. 6:22-CV-00239-ADA-DTG, W.D. Tex., Feb. 21, 2023, 117 pgs.
Defendant's Preliminary Invalidity Contentions, Exhibit 243-A-23, *Webroot, Inc. and Open Text, Inc. v. Trend Micro Inc.,* No. 6:22-CV-00239-ADA-DTG, W.D. Tex., Feb. 21, 2023, 58 pgs.
Defendant's Preliminary Invalidity Contentions, Exhibit 243-A-24, *Webroot, Inc. and Open Text, Inc. v. Trend Micro Inc.,* No. 6:22-CV-00239-ADA-DTG, W.D. Tex., Feb. 21, 2023, 61 pgs.
Defendant's Preliminary Invalidity Contentions, Exhibit 243-A-25, *Webroot, Inc. and Open Text, Inc. v. Trend Micro Inc.,* No. 6:22-CV-00239-ADA-DTG, W.D. Tex., Feb. 21, 2023, 50 pgs.
Defendant's Preliminary Invalidity Contentions, Exhibit 243-A-26, *Webroot, Inc. and Open Text, Inc. v. Trend Micro Inc.,* No. 6:22-CV-00239-ADA-DTG, W.D. Tex., Feb. 21, 2023, 40 pgs.
Defendant's Preliminary Invalidity Contentions, Exhibit 243-A-27, *Webroot, Inc. and Open Text, Inc. v. Trend Micro Inc.,* No. 6:22-CV-00239-ADA-DTG, W.D. Tex., Feb. 21, 2023, 49 pgs.
Defendant's Preliminary Invalidity Contentions, Exhibit 243-A-28, *Webroot, Inc. and Open Text, Inc. v. Trend Micro Inc.,* No. 6:22-CV-00239-ADA-DTG, W.D. Tex., Feb. 21, 2023, 51 pgs.
Defendant's Preliminary Invalidity Contentions, Exhibit 243-A-29, *Webroot, Inc. and Open Text, Inc. v. Trend Micro Inc.,* No. 6:22-CV-00239-ADA-DTG, W.D. Tex., Feb. 21, 2023, 110 pgs.
Defendant's Preliminary Invalidity Contentions, Exhibit 243-A-30, *Webroot, Inc. and Open Text, Inc. v. Trend Micro Inc.,* No. 6:22-CV-00239-ADA-DTG, W.D. Tex., Feb. 21, 2023, 76 pgs.
Defendant's Preliminary Invalidity Contentions, Exhibit 243-A-32, *Webroot, Inc. and Open Text, Inc. v. Trend Micro Inc.,* No. 6:22-CV-00239-ADA-DTG, W.D. Tex., Feb. 21, 2023, 107 pgs.
Defendant's Preliminary Invalidity Contentions, Exhibit 243-A-33, *Webroot, Inc. and Open Text, Inc. v. Trend Micro Inc.,* No. 6:22-CV-00239-ADA-DTG, W.D. Tex., Feb. 21, 2023, 137 pgs.
Defendant's Preliminary Invalidity Contentions, Exhibit 243-A-34, *Webroot, Inc. and Open Text, Inc. v. Trend Micro Inc.,* No. 6:22-CV-00239-ADA-DTG, W.D. Tex., Feb. 21, 2023, 93 pgs.
Defendant's Preliminary Invalidity Contentions, Exhibit 243-A-35, *Webroot, Inc. and Open Text, Inc. v. Trend Micro Inc.,* No. 6:22-CV-00239-ADA-DTG, W.D. Tex., Feb. 21, 2023, 72 pgs.
Defendant's Preliminary Invalidity Contentions, Exhibit 243-B, *Webroot, Inc. and Open Text, Inc. v. Trend Micro Inc.,* No. 6:22-CV-00239-ADA-DTG, W.D. Tex., Feb. 21, 2023, 115 pgs.
Defendant's Preliminary Invalidity Contentions, Exhibit 932-A-1, *Webroot, Inc. and Open Text, Inc. v. Trend Micro Inc.,* No. 6:22-CV-00239-ADA-DTG, W.D. Tex., Feb. 21, 2023, 28 pgs.
Defendant's Preliminary Invalidity Contentions, Exhibit 932-A-2, *Webroot, Inc. and Open Text, Inc. v. Trend Micro Inc.,* No. 6:22-CV-00239-ADA-DTG, W.D. Tex., Feb. 21, 2023, 57 pgs.
Defendant's Preliminary Invalidity Contentions, Exhibit 932-A-3, *Webroot, Inc. and Open Text, Inc. v. Trend Micro Inc.,* No. 6:22-CV-00239-ADA-DTG, W.D. Tex., Feb. 21, 2023, 46 pgs.
Defendant's Preliminary Invalidity Contentions, Exhibit 932-A-4, *Webroot, Inc. and Open Text, Inc. v. Trend Micro Inc.,* No. 6:22-CV-00239-ADA-DTG, W.D. Tex., Feb. 21, 2023, 36 pgs.
Defendant's Preliminary Invalidity Contentions, Exhibit 932-A-5, *Webroot, Inc. and Open Text, Inc. v. Trend Micro Inc.,* No. 6:22-CV-00239-ADA-DTG, W.D. Tex., Feb. 21, 2023, 122 pgs.
Defendant's Preliminary Invalidity Contentions, Exhibit 932-A-6, *Webroot, Inc. and Open Text, Inc. v. Trend Micro Inc.,* No. 6:22-CV-00239-ADA-DTG, W.D. Tex., Feb. 21, 2023, 39 pgs.
Defendant's Preliminary Invalidity Contentions, Exhibit 932-A-7, *Webroot, Inc. and Open Text, Inc. v. Trend Micro Inc.,* No. 6:22-CV-00239-ADA-DTG, W.D. Tex., Feb. 21, 2023, 95 pgs.
Defendant's Preliminary Invalidity Contentions, Exhibit 932-A-8, *Webroot, Inc. and Open Text, Inc. v. Trend Micro Inc.,* No. 6:22-CV-00239-ADA-DTG, W.D. Tex., Feb. 21, 2023, 73 pgs.
Defendant's Preliminary Invalidity Contentions, Exhibit 932-A-9, *Webroot, Inc. and Open Text, Inc. v. Trend Micro Inc.,* No. 6:22-CV-00239-ADA-DTG, W.D. Tex., Feb. 21, 2023, 119 pgs.
Defendant's Preliminary Invalidity Contentions, Exhibit 932-A-10, *Webroot, Inc. and Open Text, Inc. v. Trend Micro Inc.,* No. 6:22-CV-00239-ADA-DTG, W.D. Tex., Feb. 21, 2023, 66 pgs.
Defendant's Preliminary Invalidity Contentions, Exhibit 932-A-11, *Webroot, Inc. and Open Text, Inc. v. Trend Micro Inc.,* No. 6:22-CV-00239-ADA-DTG, W.D. Tex., Feb. 21, 2023, 115 pgs.
Defendant's Preliminary Invalidity Contentions, Exhibit 932-A-12, *Webroot, Inc. and Open Text, Inc. v. Trend Micro Inc.,* No. 6:22-CV-00239-ADA-DTG, W.D. Tex., Feb. 21, 2023, 81 pgs.
Defendant's Preliminary Invalidity Contentions, Exhibit 932-A-13, *Webroot, Inc. and Open Text, Inc. v. Trend Micro Inc.,* No. 6:22-CV-00239-ADA-DTG, W.D. Tex., Feb. 21, 2023, 60 pgs.
Defendant's Preliminary Invalidity Contentions, Exhibit 932-A-14, *Webroot, Inc. and Open Text, Inc. v. Trend Micro Inc.,* No. 6:22-CV-00239-ADA-DTG, W.D. Tex., Feb. 21, 2023, 60 pgs.
Defendant's Preliminary Invalidity Contentions, Exhibit 932-A-15, *Webroot, Inc. and Open Text, Inc. v. Trend Micro Inc.,* No. 6:22-CV-00239-ADA-DTG, W.D. Tex., Feb. 21, 2023, 43 pgs.

(56) References Cited

OTHER PUBLICATIONS

Defendant's Preliminary Invalidity Contentions, Exhibit 932-A-16, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 932-A-17, *Webroot, Inc. and Open Text, Inc. v. Trend Micro Inc.*, No. 6:22-CV-00239-ADA-DTG, W.D. Tex., Feb. 21, 2023, 49 pgs.
Defendant's Preliminary Invalidity Contentions, Exhibit 932-A-18, *Webroot, Inc. and Open Text, Inc. v. Trend Micro Inc.*, No. 6:22-CV-00239-ADA-DTG, W.D. Tex., Feb. 21, 2023, 66 pgs.
Defendant's Preliminary Invalidity Contentions, Exhibit 932-A-19, *Webroot, Inc. and Open Text, Inc. v. Trend Micro Inc.*, No. 6:22-CV-00239-ADA-DTG, W.D. Tex., Feb. 21, 2023, 44 pgs.
Defendant's Preliminary Invalidity Contentions, Exhibit 932-A-20, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 932-A-21, *Webroot, Inc. and Open Text, Inc. v. Trend Micro Inc.*, No. 6:22-CV-00239-ADA-DTG, W.D. Tex., Feb. 21, 2023, 298 pgs.
Defendant's Preliminary Invalidity Contentions, Exhibit 932-A-22, *Webroot, Inc. and Open Text, Inc. v. Trend Micro Inc.*, No. 6:22-CV-00239-ADA-DTG, W.D. Tex., Feb. 21, 2023, 158 pgs.
Defendant's Preliminary Invalidity Contentions, Exhibit 932-A-23, *Webroot, Inc. and Open Text, Inc. v. Trend Micro Inc.*, No. 6:22-CV-00239-ADA-DTG, W.D. Tex., Feb. 21, 2023, 70 pgs.
Defendant's Preliminary Invalidity Contentions, Exhibit 932-A-24, *Webroot, Inc. and Open Text, Inc. v. Trend Micro Inc.*, No. 6:22-CV-00239-ADA-DTG, W.D. Tex., Feb. 21, 2023, 65 pgs.
Defendant's Preliminary Invalidity Contentions, Exhibit 932-A-25, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 932-A-26, *Webroot, Inc. and Open Text, Inc. v. Trend Micro Inc.*, No. 6:22-CV-00239-ADA-DTG, W.D. Tex., Feb. 21, 2023, 63 pgs.
Defendant's Preliminary Invalidity Contentions, Exhibit 932-A-27, *Webroot, Inc. and Open Text, Inc. v. Trend Micro Inc.*, No. 6:22-CV-00239-ADA-DTG, W.D. Tex., Feb. 21, 2023, 59 pgs.
Defendant's Preliminary Invalidity Contentions, Exhibit 932-A-28, *Webroot, Inc. and Open Text, Inc. v. Trend Micro Inc.*, No. 6:22-CV-00239-ADA-DTG, W.D. Tex., Feb. 21, 2023, 61 pgs.
Defendant's Preliminary Invalidity Contentions, Exhibit 932-A-29, *Webroot, Inc. and Open Text, Inc. v. Trend Micro Inc.*, No. 6:22-CV-00239-ADA-DTG, W.D. Tex., Feb. 21, 2023, 145 pgs.
Defendant's Preliminary Invalidity Contentions, Exhibit 932-A-30, *Webroot, Inc. and Open Text, Inc. v. Trend Micro Inc.*, No. 6:22-CV-00239-ADA-DTG, W.D. Tex., Feb. 21, 2023, 89 pgs.
Defendant's Preliminary Invalidity Contentions, Exhibit 932-A-32, *Webroot, Inc. and Open Text, Inc. v. Trend Micro Inc.*, No. 6:22-CV-00239-ADA-DTG, W.D. Tex., Feb. 21, 2023, 130 pgs.
Defendant's Preliminary Invalidity Contentions, Exhibit 932-A-33, *Webroot, Inc. and Open Text, Inc. v. Trend Micro Inc.*, No. 6:22-CV-00239-ADA-DTG, W.D. Tex., Feb. 21, 2023, 165 pgs.
Defendant's Preliminary Invalidity Contentions, Exhibit 932-A-34, *Webroot, Inc. and Open Text, Inc. v. Trend Micro Inc.*, No. 6:22-CV-00239-ADA-DTG, W.D. Tex., Feb. 21, 2023, 110 pgs.
Defendant's Preliminary Invalidity Contentions, Exhibit 932-A-35, *Webroot, Inc. and Open Text, Inc. v. Trend Micro Inc.*, No. 6:22-CV-00239-ADA-DTG, W.D. Tex., Feb. 21, 2023, 80 pgs.
Defendant's Preliminary Invalidity Contentions, Exhibit 932-B, *Webroot, Inc. and Open Text, Inc. v. Trend Micro Inc.*, No. 6:22-CV-00239-ADA-DTG, W.D. Tex., Feb. 21, 2023, 141 pgs.
Defendant's Preliminary Invalidity Contentions, Exhibit 244-A-1, *Webroot, Inc. and Open Text, Inc. v. Trend Micro Inc.*, No. 6:22-CV-00239-ADA-DTG, W.D. Tex., Feb. 21, 2023, 39 pgs.
Defendant's Preliminary Invalidity Contentions, Exhibit 244-A-2, *Webroot, Inc. and Open Text, Inc. v. Trend Micro Inc.*, No. 6:22-CV-00239-ADA-DTG, W.D. Tex., Feb. 21, 2023, 66 pgs.
Defendant's Preliminary Invalidity Contentions, Exhibit 244-A-3, *Webroot, Inc. and Open Text, Inc. v. Trend Micro Inc.*, No. 6:22-CV-00239-ADA-DTG, W.D. Tex., Feb. 21, 2023, 67 pgs.
Defendant's Preliminary Invalidity Contentions, Exhibit 244-A-4, *Webroot, Inc. and Open Text, Inc. v. Trend Micro Inc.*, No. 6:22-CV-00239-ADA-DTG, W.D. Tex., Feb. 21, 2023, 57 pgs.
Defendant's Preliminary Invalidity Contentions, Exhibit 244-A-5, *Webroot, Inc. and Open Text, Inc. v. Trend Micro Inc.*, No. 6:22-CV-00239-ADA-DTG, W.D. Tex., Feb. 21, 2023, 106 pgs.
Defendant's Preliminary Invalidity Contentions, Exhibit 244-A-6, *Webroot, Inc. and Open Text, Inc. v. Trend Micro Inc.*, No. 6:22-CV-00239-ADA-DTG, W.D. Tex., Feb. 21, 2023, 47 pgs.
Defendant's Preliminary Invalidity Contentions, Exhibit 244-A-7, *Webroot, Inc. and Open Text, Inc. v. Trend Micro Inc.*, No. 6:22-CV-00239-ADA-DTG, W.D. Tex., Feb. 21, 2023, 46 pgs.
Defendant's Preliminary Invalidity Contentions, Exhibit 244-A-8, *Webroot, Inc. and Open Text, Inc. v. Trend Micro Inc.*, No. 6:22-CV-00239-ADA-DTG, W.D. Tex., Feb. 21, 2023, 69 pgs.
Defendant's Preliminary Invalidity Contentions, Exhibit 244-A-9, *Webroot, Inc. and Open Text, Inc. v. Trend Micro Inc.*, No. 6:22-CV-00239-ADA-DTG, W.D. Tex., Feb. 21, 2023, 72 pgs.
Defendant's Preliminary Invalidity Contentions, Exhibit 244-A-10, *Webroot, Inc. and Open Text, Inc. v. Trend Micro Inc.*, No. 6:22-CV-00239-ADA-DTG, W.D. Tex., Feb. 21, 2023, 81 pgs.
Defendant's Preliminary Invalidity Contentions, Exhibit 244-A-11, *Webroot, Inc. and Open Text, Inc. v. Trend Micro Inc.*, No. 6:22-CV-00239-ADA-DTG, W.D. Tex., Feb. 21, 2023, 77 pgs.
Defendant's Preliminary Invalidity Contentions, Exhibit 244-A-12, *Webroot, Inc. and Open Text, Inc. v. Trend Micro Inc.*, No. 6:22-CV-00239-ADA-DTG, W.D. Tex., Feb. 21, 2023, 64 pgs.
Defendant's Preliminary Invalidity Contentions, Exhibit 244-A-13, *Webroot, Inc. and Open Text, Inc. v. Trend Micro Inc.*, No. 6:22-CV-00239-ADA-DTG, W.D. Tex., Feb. 21, 2023, 57 pgs.
Defendant's Preliminary Invalidity Contentions, Exhibit 244-A-14, *Webroot, Inc. and Open Text, Inc. v. Trend Micro Inc.*, No. 6:22-CV-00239-ADA-DTG, W.D. Tex., Feb. 21, 2023, 71 pgs.
Defendant's Preliminary Invalidity Contentions, Exhibit 244-A-15, *Webroot, Inc. and Open Text, Inc. v. Trend Micro Inc.*, No. 6:22-CV-00239-ADA-DTG, W.D. Tex., Feb. 21, 2023, 43 pgs.
Defendant's Preliminary Invalidity Contentions, Exhibit 244-A-16, *Webroot, Inc. and Open Text, Inc. v. Trend Micro Inc.*, No. 6:22-CV-00239-ADA-DTG, W.D. Tex., Feb. 21, 2023, 73 pgs.
Defendant's Preliminary Invalidity Contentions, Exhibit 244-A-17, *Webroot, Inc. and Open Text, Inc. v. Trend Micro Inc.*, No. 6:22-CV-00239-ADA-DTG, W.D. Tex., Feb. 21, 2023, 49 pgs.
Defendant's Preliminary Invalidity Contentions, Exhibit 244-A-18, *Webroot, Inc. and Open Text, Inc. v. Trend Micro Inc.*, No. 6:22-CV-00239-ADA-DTG, W.D. Tex., Feb. 21, 2023, 42 pgs.
Defendant's Preliminary Invalidity Contentions, Exhibit 244-A-19, *Webroot, Inc. and Open Text, Inc. v. Trend Micro Inc.*, No. 6:22-CV-00239-ADA-DTG, W.D. Tex., Feb. 21, 2023, 38 pgs.
Defendant's Preliminary Invalidity Contentions, Exhibit 244-A-20, *Webroot, Inc. and Open Text, Inc. v. Trend Micro Inc.*, No. 6:22-CV-00239-ADA-DTG, W.D. Tex., Feb. 21, 2023, 36 pgs.
Defendant's Preliminary Invalidity Contentions, Exhibit 244-A-21, *Webroot, Inc. and Open Text, Inc. v. Trend Micro Inc.*, No. 6:22-CV-00239-ADA-DTG, W.D. Tex., Feb. 21, 2023, 215 pgs.
Defendant's Preliminary Invalidity Contentions, Exhibit 244-A-22, *Webroot, Inc. and Open Text, Inc. v. Trend Micro Inc.*, No. 6:22-CV-00239-ADA-DTG, W.D. Tex., Feb. 21, 2023, 140 pgs.
Defendant's Preliminary Invalidity Contentions, Exhibit 244-A-23, *Webroot, Inc. and Open Text, Inc. v. Trend Micro Inc.*, No. 6:22-CV-00239-ADA-DTG, W.D. Tex., Feb. 21, 2023, 68 pgs.
Defendant's Preliminary Invalidity Contentions, Exhibit 244-A-24, *Webroot, Inc. and Open Text, Inc. v. Trend Micro Inc.*, No. 6:22-CV-00239-ADA-DTG, W.D. Tex., Feb. 21, 2023, 301 pgs.
Defendant's Preliminary Invalidity Contentions, Exhibit 244-A-25, *Webroot, Inc. and Open Text, Inc. v. Trend Micro Inc.*, No. 6:22-CV-00239-ADA-DTG, W.D. Tex., Feb. 21, 2023, 113 pgs.
Defendant's Preliminary Invalidity Contentions, Exhibit 244-A-26, *Webroot, Inc. and Open Text, Inc. v. Trend Micro Inc.*, No. 6:22-CV-00239-ADA-DTG, W.D. Tex., Feb. 21, 2023, 207 pgs.
Defendant's Preliminary Invalidity Contentions, Exhibit 244-A-27, *Webroot, Inc. and Open Text, Inc. v. Trend Micro Inc.*, No. 6:22-CV-00239-ADA-DTG, W.D. Tex., Feb. 21, 2023, 187 pgs.

(56) References Cited

OTHER PUBLICATIONS

Defendant's Preliminary Invalidity Contentions, Exhibit 244-A-28, *Webroot, Inc. and Open Text, Inc. v. Trend Micro Inc.*, No. 6:22-CV-00239-ADA-DTG, W.D. Tex., Feb. 21, 2023, 88 pgs.
Defendant's Preliminary Invalidity Contentions, Exhibit 244-A-29, *Webroot, Inc. and Open Text, Inc. v. Trend Micro Inc.*, No. 6:22-CV-00239-ADA-DTG, W.D. Tex., Feb. 21, 2023, 88 pgs.
Defendant's Preliminary Invalidity Contentions, Exhibit 244-A-31, *Webroot, Inc. and Open Text, Inc. v. Trend Micro Inc.*, No. 6:22-CV-00239-ADA-DTG, W.D. Tex., Feb. 21, 2023, 122 pgs.
Defendant's Preliminary Invalidity Contentions, Exhibit 244-A-32, *Webroot, Inc. and Open Text, Inc. v. Trend Micro Inc.*, No. 6:22-CV-00239-ADA-DTG, W.D. Tex., Feb. 21, 2023, 136 pgs.
Defendant's Preliminary Invalidity Contentions, Exhibit 244-A-33, *Webroot, Inc. and Open Text, Inc. v. Trend Micro Inc.*, No. 6:22-CV-00239-ADA-DTG, W.D. Tex., Feb. 21, 2023, 86 pgs.
Defendant's Preliminary Invalidity Contentions, Exhibit 244-A-34, *Webroot, Inc. and Open Text, Inc. v. Trend Micro Inc.*, No. 6:22-CV-00239-ADA-DTG, W.D. Tex., Feb. 21, 2023, 105 pgs.
Defendant's Preliminary Invalidity Contentions, Exhibit 244-B, *Webroot, Inc. and Open Text, Inc. v. Trend Micro Inc.*, No. 6:22-CV-00239-ADA-DTG, W.D. Tex., Feb. 21, 2023, 294 pgs.
Defendant's Preliminary Invalidity Contentions, Exhibit 505-A-1, *Webroot, Inc. and Open Text, Inc. v. Trend Micro Inc.*, No. 6:22-CV-00239-ADA-DTG, W.D. Tex., Feb. 21, 2023, 47 pgs.
Defendant's Preliminary Invalidity Contentions, Exhibit 505-A-2, *Webroot, Inc. and Open Text, Inc. v. Trend Micro Inc.*, No. 6:22-CV-00239-ADA-DTG, W.D. Tex., Feb. 21, 2023, 40 pgs.
Defendant's Preliminary Invalidity Contentions, Exhibit 505-A-3, *Webroot, Inc. and Open Text, Inc. v. Trend Micro Inc.*, No. 6:22-CV-00239-ADA-DTG, W.D. Tex., Feb. 21, 2023, 48 pgs.
Defendant's Preliminary Invalidity Contentions, Exhibit 505-A-4, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 505-A-5, *Webroot, Inc. and Open Text, Inc. v. Trend Micro Inc.*, No. 6:22-CV-00239-ADA-DTG, W.D. Tex., Feb. 21, 2023, 161 pgs.
Defendant's Preliminary Invalidity Contentions, Exhibit 505-A-6, *Webroot, Inc. and Open Text, Inc. v. Trend Micro Inc.*, No. 6:22-CV-00239-ADA-DTG, W.D. Tex., Feb. 21, 2023, 34 pgs.
Defendant's Preliminary Invalidity Contentions, Exhibit 505-A-7, *Webroot, Inc. and Open Text, Inc. v. Trend Micro Inc.*, No. 6:22-CV-00239-ADA-DTG, W.D. Tex., Feb. 21, 2023, 34 pgs.
Defendant's Preliminary Invalidity Contentions, Exhibit 505-A-8, *Webroot, Inc. and Open Text, Inc. v. Trend Micro Inc.*, No. 6:22-CV-00239-ADA-DTG, W.D. Tex., Feb. 21, 2023, 52 pgs.
Defendant's Preliminary Invalidity Contentions, Exhibit 505-A-9, *Webroot, Inc. and Open Text, Inc. v. Trend Micro Inc.*, No. 6:22-CV-00239-ADA-DTG, W.D. Tex., Feb. 21, 2023, 33 pgs.
Defendant's Preliminary Invalidity Contentions, Exhibit 505-A-10, *Webroot, Inc. and Open Text, Inc. v. Trend Micro Inc.*, No. 6:22-CV-00239-ADA-DTG, W.D. Tex., Feb. 21, 2023, 34 pgs.
Defendant's Preliminary Invalidity Contentions, Exhibit 505-A-11, *Webroot, Inc. and Open Text, Inc. v. Trend Micro Inc.*, No. 6:22-CV-00239-ADA-DTG, W.D. Tex., Feb. 21, 2023, 51 pgs.
Defendant's Preliminary Invalidity Contentions, Exhibit 505-A-12, *Webroot, Inc. and Open Text, Inc. v. Trend Micro Inc.*, No. 6:22-CV-00239-ADA-DTG, W.D. Tex., Feb. 21, 2023, 46 pgs.
Defendant's Preliminary Invalidity Contentions, Exhibit 505-A-13, *Webroot, Inc. and Open Text, Inc. v. Trend Micro Inc.*, No. 6:22-CV-00239-ADA-DTG, W.D. Tex., Feb. 21, 2023, 38 pgs.
Defendant's Preliminary Invalidity Contentions, Exhibit 505-A-14, *Webroot, Inc. and Open Text, Inc. v. Trend Micro Inc.*, No. 6:22-CV-00239-ADA-DTG, W.D. Tex., Feb. 21, 2023, 146 pgs.
Defendant's Preliminary Invalidity Contentions, Exhibit 505-A-15, *Webroot, Inc. and Open Text, Inc. v. Trend Micro Inc.*, No. 6:22-CV-00239-ADA-DTG, W.D. Tex., Feb. 21, 2023, 148 pgs.
Defendant's Preliminary Invalidity Contentions, Exhibit 505-A-16, *Webroot, Inc. and Open Text, Inc. v. Trend Micro Inc.*, No. 6:22-CV-00239-ADA-DTG, W.D. Tex., Feb. 21, 2023, 47 pgs.
Defendant's Preliminary Invalidity Contentions, Exhibit 505-A-17, *Webroot, Inc. and Open Text, Inc. v. Trend Micro Inc.*, No. 6:22-CV-00239-ADA-DTG, W.D. Tex., Feb. 21, 2023, 111 pgs.
Defendant's Preliminary Invalidity Contentions, Exhibit 505-A-18, *Webroot, Inc. and Open Text, Inc. v. Trend Micro Inc.*, No. 6:22-CV-00239-ADA-DTG, W.D. Tex., Feb. 21, 2023, 96 pgs.
Defendant's Preliminary Invalidity Contentions, Exhibit 505-A-19, *Webroot, Inc. and Open Text, Inc. v. Trend Micro Inc.*, No. 6:22-CV-00239-ADA-DTG, W.D. Tex., Feb. 21, 2023, 81 pgs.
Defendant's Preliminary Invalidity Contentions, Exhibit 505-A-20, *Webroot, Inc. and Open Text, Inc. v. Trend Micro Inc.*, No. 6:22-CV-00239-ADA-DTG, W.D. Tex., Feb. 21, 2023, 70 pgs.
Defendant's Preliminary Invalidity Contentions, Exhibit 505-A-21, *Webroot, Inc. and Open Text, Inc. v. Trend Micro Inc.*, No. 6:22-CV-00239-ADA-DTG, W.D. Tex., Feb. 21, 2023, 65 pgs.
Defendant's Preliminary Invalidity Contentions, Exhibit 505-A-22, *Webroot, Inc. and Open Text, Inc. v. Trend Micro Inc.*, No. 6:22-CV-00239-ADA-DTG, W.D. Tex., Feb. 21, 2023, 73 pgs.
Defendant's Preliminary Invalidity Contentions, Exhibit 505-A-23, *Webroot, Inc. and Open Text, Inc. v. Trend Micro Inc.*, No. 6:22-CV-00239-ADA-DTG, W.D. Tex., Feb. 21, 2023, 75 pgs.
Defendant's Preliminary Invalidity Contentions, Exhibit 505-A-24, *Webroot, Inc. and Open Text, Inc. v. Trend Micro Inc.*, No. 6:22-CV-00239-ADA-DTG, W.D. Tex., Feb. 21, 2023, 63 pgs.
Defendant's Preliminary Invalidity Contentions, Exhibit 505-A-25, *Webroot, Inc. and Open Text, Inc. v. Trend Micro Inc.*, 6:22-CV-00239-ADA-DTG, W.D. Tex., Feb. 21, 2023, 61 pgs.
Defendant's Preliminary Invalidity Contentions, Exhibit 505-A-26, *Webroot, Inc. and Open Text, Inc. v. Trend Micro Inc.*, No. 6:22-CV-00239-ADA-DTG, W.D. Tex., Feb. 21, 2023, 78 pgs.
Defendant's Preliminary Invalidity Contentions, Exhibit 505-B, *Webroot, Inc. and Open Text, Inc. v. Trend Micro Inc.*, No. 6:22-CV-00239-ADA-DTG, W.D. Tex., Feb. 21, 2023, 428 pgs.
Defendant Crowdstrike Holdings, Inc.'s Preliminary Invalidity Contentions, Exhibit 250-A-1, *Webroot, Inc. and Open Text, Inc. v. Crowdstrike Holdings, Inc.*, No. 6:22-CV-00241-ADA-DTG (WD, Texas), Sep. 13, 2022, 42 pgs.
Defendant Crowdstrike Holdings, Inc.'s Preliminary Invalidity Contentions, Exhibit 250-A-2, *Webroot, Inc. and Open Text, Inc. v. Crowdstrike Holdings, Inc.*, No. 6:22-CV-00241-ADA-DTG (WD, Texas), Sep. 13, 2022, 31 pgs.
Defendant Crowdstrike Holdings, Inc.'s Preliminary Invalidity Contentions, Exhibit 250-A-3, *Webroot, Inc. and Open Text, Inc. v. Crowdstrike Holdings, Inc.*, No. 6:22-CV-00241-ADA-DTG (WD, Texas), Sep. 13, 2022, 120 pgs.
Defendant Crowdstrike Holdings, Inc.'s Preliminary Invalidity Contentions, Exhibit 250-A-4, *Webroot, Inc. and Open Text, Inc. v. Crowdstrike Holdings, Inc.*, No. 6:22-CV-00241-ADA-DTG (WD, Texas), Sep. 13, 2022, 112 pgs.
Defendant Crowdstrike Holdings, Inc.'s Preliminary Invalidity Contentions, Exhibit 250-A-5, *Webroot, Inc. and Open Text, Inc. v. Crowdstrike Holdings, Inc.*, No. 6:22-CV-00241-ADA-DTG (WD, Texas), Sep. 13, 2022, 51 pgs.
Defendant Crowdstrike Holdings, Inc.'s Preliminary Invalidity Contentions, Exhibit 250-A-6, *Webroot, Inc. and Open Text, Inc. v. Crowdstrike Holdings, Inc.*, No. 6:22-CV-00241-ADA-DTG (WD, Texas), Sep. 13, 2022, 34 pgs.
Defendant Crowdstrike Holdings, Inc.'s Preliminary Invalidity Contentions, Exhibit 250-A-7, *Webroot, Inc. and Open Text, Inc. v. Crowdstrike Holdings, Inc.*, No. 6:22-CV-00241-ADA-DTG (WD, Texas), Sep. 13, 2022, 70 pgs.
Defendant Crowdstrike Holdings, Inc.'s Preliminary Invalidity Contentions, Exhibit 250-A-8, *Webroot, Inc. and Open Text, Inc. v. Crowdstrike Holdings, Inc.*, No. 6:22-CV-00241-ADA-DTG (WD, Texas), Sep. 13, 2022, 32 pgs.
Defendant Crowdstrike Holdings, Inc.'s Preliminary Invalidity Contentions, Exhibit 250-A-9, *Webroot, Inc. and Open Text, Inc. v. Crowdstrike Holdings, Inc.*, No. 6:22-CV-00241-ADA-DTG (WD, Texas), Sep. 13, 2022, 44 pgs.
Defendant Crowdstrike Holdings, Inc.'s Preliminary Invalidity Contentions, Exhibit 250-A-10, *Webroot, Inc. and Open Text, Inc. v. Crowdstrike Holdings, Inc.*, No. 6:22-CV-00241-ADA-DTG (WD, Texas), Sep. 13, 2022, 32 pgs.

(56) References Cited

OTHER PUBLICATIONS

Defendant Crowdstrike Holdings, Inc.'s Preliminary Invalidity Contentions, Exhibit 250-A-11, *Webroot, Inc. and Open Text, Inc.* v. *Crowdstrike Holdings, Inc.*, No. 6:22-CV-00241-ADA-DTG (WD, Texas), Sep. 13, 2022, 77 pgs.
Defendant Crowdstrike Holdings, Inc.'s Preliminary Invalidity Contentions, Exhibit 250-A-12, *Webroot, Inc. and Open Text, Inc.* v. *Crowdstrike Holdings, Inc.*, No. 6:22-CV-00241-ADA-DTG (WD, Texas), Sep. 13, 2022, 25 pgs.
Defendant Crowdstrike Holdings, Inc.'s Preliminary Invalidity Contentions, Exhibit 250-A-13, *Webroot, Inc. and Open Text, Inc.* v. *Crowdstrike Holdings, Inc.*, No. 6:22-CV-00241-ADA-DTG (WD, Texas), Sep. 13, 2022, 76 pgs.
Defendant Crowdstrike Holdings, Inc.'s Preliminary Invalidity Contentions, Exhibit 250-A-14, *Webroot, Inc. and Open Text, Inc.* v. *Crowdstrike Holdings, Inc.*, No. 6:22-CV-00241-ADA-DTG (WD, Texas), Sep. 13, 2022, 27 pgs.
Defendant Crowdstrike Holdings, Inc.'s Preliminary Invalidity Contentions, Exhibit 250-A-15, *Webroot, Inc. and Open Text, Inc.* v. *Crowdstrike Holdings, Inc.*, No. 6:22-CV-00241-ADA-DTG (WD, Texas), Sep. 13, 2022, 35 pgs.
Defendant Crowdstrike Holdings, Inc.'s Preliminary Invalidity Contentions, Exhibit 250-A-16, *Webroot, Inc. and Open Text, Inc.* v. *Crowdstrike Holdings, Inc.*, No. 6:22-CV-00241-ADA-DTG (WD, Texas), Sep. 13, 2022, 25 pgs.
Defendant Crowdstrike Holdings, Inc.'s Preliminary Invalidity Contentions, Exhibit 250-B, *Webroot, Inc. and Open Text, Inc.* v. *Crowdstrike Holdings, Inc.*, No. 6:22-CV-00241-ADA-DTG (WD, Texas), Sep. 13, 2022, 130 pgs.
Defendant Crowdstrike Holdings, Inc.'s Preliminary Invalidity Contentions, Exhibit 389-A-1, *Webroot, Inc. and Open Text, Inc.* v. *Crowdstrike Holdings, Inc.*, No. 6:22-CV-00241-ADA-DTG (WD, Texas), Sep. 13, 2022, 37 pgs.
Defendant Crowdstrike Holdings, Inc.'s Preliminary Invalidity Contentions, Exhibit 389-A-2, *Webroot, Inc. and Open Text, Inc.* v. *Crowdstrike Holdings, Inc.*, No. 6:22-CV-00241-ADA-DTG (WD, Texas), Sep. 13, 2022, 24 pgs.
Defendant Crowdstrike Holdings, Inc.'s Preliminary Invalidity Contentions, Exhibit 389-A-3, *Webroot, Inc. and Open Text, Inc.* v. *Crowdstrike Holdings, Inc.*, No. 6:22-CV-00241-ADA-DTG (WD, Texas), Sep. 13, 2022, 150 pgs.
Defendant Crowdstrike Holdings, Inc.'s Preliminary Invalidity Contentions, Exhibit 389-A-4, *Webroot, Inc. and Open Text, Inc.* v. *Crowdstrike Holdings, Inc.*, No. 6:22-CV-00241-ADA-DTG (WD, Texas), Sep. 13, 2022, 151 pgs.
Defendant Crowdstrike Holdings, Inc.'s Preliminary Invalidity Contentions, Exhibit 389-A-5, *Webroot, Inc. and Open Text, Inc.* v. *Crowdstrike Holdings, Inc.*, No. 6:22-CV-00241-ADA-DTG (WD, Texas), Sep. 13, 2022, 46 pgs.
Defendant Crowdstrike Holdings, Inc.'s Preliminary Invalidity Contentions, Exhibit 389-A-6, *Webroot, Inc. and Open Text, Inc.* v. *Crowdstrike Holdings, Inc.*, No. 6:22-CV-00241-ADA-DTG (WD, Texas), Sep. 13, 2022, 37 pgs.
Defendant Crowdstrike Holdings, Inc.'s Preliminary Invalidity Contentions, Exhibit 389-A-7, *Webroot, Inc. and Open Text, Inc.* v. *Crowdstrike Holdings, Inc.*, No. 6:22-CV-00241-ADA-DTG (WD, Texas), Sep. 13, 2022, 74 pgs.
Defendant Crowdstrike Holdings, Inc.'s Preliminary Invalidity Contentions, Exhibit 389-A-8, *Webroot, Inc. and Open Text, Inc.* v. *Crowdstrike Holdings, Inc.*, No. 6:22-CV-00241-ADA-DTG (WD, Texas), Sep. 13, 2022, 26 pgs.
Defendant Crowdstrike Holdings, Inc.'s Preliminary Invalidity Contentions, Exhibit 389-A-9, *Webroot, Inc. and Open Text, Inc.* v. *Crowdstrike Holdings, Inc.*, No. 6:22-CV-00241-ADA-DTG (WD, Texas), Sep. 13, 2022, 41 pgs.
Defendant Crowdstrike Holdings, Inc.'s Preliminary Invalidity Contentions, Exhibit 389-A-10, *Webroot, Inc. and Open Text, Inc.* v. *Crowdstrike Holdings, Inc.*, No. 6:22-CV-00241-ADA-DTG (WD, Texas), Sep. 13, 2022, 35 pgs.
Defendant Crowdstrike Holdings, Inc.'s Preliminary Invalidity Contentions, Exhibit 389-A-11, *Webroot, Inc. and Open Text, Inc.* v. *Crowdstrike Holdings, Inc.*, No. 6:22-CV-00241-ADA-DTG (WD, Texas), Sep. 13, 2022, 104 pgs.
Defendant Crowdstrike Holdings, Inc.'s Preliminary Invalidity Contentions, Exhibit 389-A-12, *Webroot, Inc. and Open Text, Inc.* v. *Crowdstrike Holdings, Inc.*, No. 6:22-CV-00241-ADA-DTG (WD, Texas), Sep. 13, 2022, 29 pgs.
Defendant Crowdstrike Holdings, Inc.'s Preliminary Invalidity Contentions, Exhibit 389-A-13, *Webroot, Inc. and Open Text, Inc.* v. *Crowdstrike Holdings, Inc.*, No. 6:22-CV-00241-ADA-DTG (WD, Texas), Sep. 13, 2022, 92 pgs.
Defendant Crowdstrike Holdings, Inc.'s Preliminary Invalidity Contentions, Exhibit 389-A-14, *Webroot, Inc. and Open Text, Inc.* v. *Crowdstrike Holdings, Inc.*, No. 6:22-CV-00241-ADA-DTG (WD, Texas), Sep. 13, 2022, 22 pgs.
Defendant Crowdstrike Holdings, Inc.'s Preliminary Invalidity Contentions, Exhibit 389-A-15, *Webroot, Inc. and Open Text, Inc.* v. *Crowdstrike Holdings, Inc.*, No. 6:22-CV-00241-ADA-DTG (WD, Texas), Sep. 13, 2022, 54 pgs.
Defendant Crowdstrike Holdings, Inc.'s Preliminary Invalidity Contentions, Exhibit 389-A-16, *Webroot, Inc. and Open Text, Inc.* v. *Crowdstrike Holdings, Inc.*, No. 6:22-CV-00241-ADA-DTG (WD, Texas), Sep. 13, 2022, 26 pgs.
Defendant Crowdstrike Holdings, Inc.'s Preliminary Invalidity Contentions, Exhibit 389-A-17, *Webroot, Inc. and Open Text, Inc.* v. *Crowdstrike Holdings, Inc.*, No. 6:22-CV-00241-ADA-DTG (WD, Texas), Sep. 13, 2022, 30 pgs.
Defendant Crowdstrike Holdings, Inc.'s Preliminary Invalidity Contentions, Exhibit 389-A-18, *Webroot, Inc. and Open Text, Inc.* v. *Crowdstrike Holdings, Inc.*, No. 6:22-CV-00241-ADA-DTG (WD, Texas), Sep. 13, 2022, 45 pgs.
Defendant Crowdstrike Holdings, Inc.'s Preliminary Invalidity Contentions, Exhibit 389-B, *Webroot, Inc. and Open Text, Inc.* v. *Crowdstrike Holdings, Inc.*, No. 6:22-CV-00241-ADA-DTG (WD, Texas), Sep. 13, 2022, 195 pgs.
Defendant Crowdstrike Holdings, Inc.'s Preliminary Invalidity Contentions, Exhibit 844-A-1, *Webroot, Inc. and Open Text, Inc.* v. *Crowdstrike Holdings, Inc.*, No. 6:22-CV-00241-ADA-DTG (WD, Texas), Sep. 13, 2022, 33 pgs.
Defendant Crowdstrike Holdings, Inc.'s Preliminary Invalidity Contentions, Exhibit 844-A-2, *Webroot, Inc. and Open Text, Inc.* v. *Crowdstrike Holdings, Inc.*, No. 6:22-CV-00241-ADA-DTG (WD, Texas), Sep. 13, 2022, 44 pgs.
Defendant Crowdstrike Holdings, Inc.'s Preliminary Invalidity Contentions, Exhibit 844-A-3, *Webroot, Inc. and Open Text, Inc.* v. *Crowdstrike Holdings, Inc.*, No. 6:22-CV-00241-ADA-DTG (WD, Texas), Sep. 13, 2022, 34 pgs.
Defendant Crowdstrike Holdings, Inc.'s Preliminary Invalidity Contentions, Exhibit 844-A-4, *Webroot, Inc. and Open Text, Inc.* v. *Crowdstrike Holdings, Inc.*, No. 6:22-CV-00241-ADA-DTG (WD, Texas), Sep. 13, 2022, 43 pgs.
Defendant Crowdstrike Holdings, Inc.'s Preliminary Invalidity Contentions, Exhibit 844-A-5, *Webroot, Inc. and Open Text, Inc.* v. *Crowdstrike Holdings, Inc.*, No. 6:22-CV-00241-ADA-DTG (WD, Texas), Sep. 13, 2022, 34 pgs.
Defendant Crowdstrike Holdings, Inc.'s Preliminary Invalidity Contentions, Exhibit 844-A-6, *Webroot, Inc. and Open Text, Inc.* v. *Crowdstrike Holdings, Inc.*, No. 6:22-CV-00241-ADA-DTG (WD, Texas), Sep. 13, 2022, 31 pgs.
Defendant Crowdstrike Holdings, Inc.'s Preliminary Invalidity Contentions, Exhibit 844-A-7, *Webroot, Inc. and Open Text, Inc.* v. *Crowdstrike Holdings, Inc.*, No. 6:22-CV-00241-ADA-DTG (WD, Texas), Sep. 13, 2022, 28 pgs.
Defendant Crowdstrike Holdings, Inc.'s Preliminary Invalidity Contentions, Exhibit 844-A-8, *Webroot, Inc. and Open Text, Inc.* v. *Crowdstrike Holdings, Inc.*, No. 6:22-CV-00241-ADA-DTG (WD, Texas), Sep. 13, 2022, 28 pgs.
Defendant Crowdstrike Holdings, Inc.'s Preliminary Invalidity Contentions, Exhibit 844-A-9, *Webroot, Inc. and Open Text, Inc.* v. *Crowdstrike Holdings, Inc.*, No. 6:22-CV-00241-ADA-DTG (WD, Texas), Sep. 13, 2022, 35 pgs.

(56) References Cited

OTHER PUBLICATIONS

Defendant Crowdstrike Holdings, Inc.'s Preliminary Invalidity Contentions, Exhibit 844-A-10, *Webroot, Inc. and Open Text, Inc. v. Crowdstrike Holdings, Inc.,* No. 6:22-CV-00241-ADA-DTG (WD, Texas), Sep. 13, 2022, 28 pgs.

Defendant Crowdstrike Holdings, Inc.'s Preliminary Invalidity Contentions, Exhibit 844-A-11, *Webroot, Inc. and Open Text, Inc. v. Crowdstrike Holdings, Inc.,* No. 6:22-CV-00241-ADA-DTG (WD, Texas), Sep. 13, 2022, 27 pgs.

Defendant Crowdstrike Holdings, Inc.'s Preliminary Invalidity Contentions, Exhibit 844-A-12, *Webroot, Inc. and Open Text, Inc. v. Crowdstrike Holdings, Inc.,* No. 6:22-CV-00241-ADA-DTG (WD, Texas), Sep. 13, 2022, 32 pgs.

Defendant Crowdstrike Holdings, Inc.'s Preliminary Invalidity Contentions, Exhibit 844-A-13, *Webroot, Inc. and Open Text, Inc. v. Crowdstrike Holdings, Inc.,* No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 844-A-14, *Webroot, Inc. and Open Text, Inc. v. Crowdstrike Holdings, Inc.,* No. 6:22-CV-00241-ADA-DTG (WD, Texas), Sep. 13, 2022, 32 pgs.

Defendant Crowdstrike Holdings, Inc.'s Preliminary Invalidity Contentions, Exhibit 844-A-15, *Webroot, Inc. and Open Text, Inc. v. Crowdstrike Holdings, Inc.,* No. 6:22-CV-00241-ADA-DTG (WD, Texas), Sep. 13, 2022, 32 pgs.

Defendant Crowdstrike Holdings, Inc.'s Preliminary Invalidity Contentions, Exhibit 844-A-16, *Webroot, Inc. and Open Text, Inc. v. Crowdstrike Holdings, Inc.,* No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 844-A-17, *Webroot, Inc. and Open Text, Inc. v. Crowdstrike Holdings, Inc.,* No. 6:22-CV-00241-ADA-DTG (WD, Texas), Sep. 13, 2022, 35 pgs.

Defendant Crowdstrike Holdings, Inc.'s Preliminary Invalidity Contentions, Exhibit 844-A-18, *Webroot, Inc. and Open Text, Inc. v. Crowdstrike Holdings, Inc.,* No. 6:22-CV-00241-ADA-DTG (WD, Texas), Sep. 13, 2022, 42 pgs.

Defendant Crowdstrike Holdings, Inc.'s Preliminary Invalidity Contentions, Exhibit 844-A-19, *Webroot, Inc. and Open Text, Inc. v. Crowdstrike Holdings, Inc.,* No. 6:22-CV-00241-ADA-DTG (WD, Texas), Sep. 13, 2022, 28 pgs.

Defendant Crowdstrike Holdings, Inc.'s Preliminary Invalidity Contentions, Exhibit 844-A-20, *Webroot, Inc. and Open Text, Inc. v. Crowdstrike Holdings, Inc.,* No. 6:22-CV-00241-ADA-DTG (WD, Texas), Sep. 13, 2022, 33 pgs.

Defendant Crowdstrike Holdings, Inc.'s Preliminary Invalidity Contentions, Exhibit 844-A-21, *Webroot, Inc. and Open Text, Inc. v. Crowdstrike Holdings, Inc.,* No. 6:22-CV-00241-ADA-DTG (WD, Texas), Sep. 13, 2022, 44 pgs.

Defendant Crowdstrike Holdings, Inc.'s Preliminary Invalidity Contentions, Exhibit 844-A-22, *Webroot, Inc. and Open Text, Inc. v. Crowdstrike Holdings, Inc.,* No. 6:22-CV-00241-ADA-DTG (WD, Texas), Sep. 13, 2022, 29 pgs.

Defendant Crowdstrike Holdings, Inc.'s Preliminary Invalidity Contentions, Exhibit 844-A-23, *Webroot, Inc. and Open Text, Inc. v. Crowdstrike Holdings, Inc.,* No. 6:22-CV-00241-ADA-DTG (WD, Texas), Sep. 13, 2022, 26 pgs.

Defendant Crowdstrike Holdings, Inc.'s Preliminary Invalidity Contentions, Exhibit 844-A-24, *Webroot, Inc. and Open Text, Inc. v. Crowdstrike Holdings, Inc.,* No. 6:22-CV-00241-ADA-DTG (WD, Texas), Sep. 13, 2022, 30 pgs.

Defendant Crowdstrike Holdings, Inc.'s Preliminary Invalidity Contentions, Exhibit 844-A-25, *Webroot, Inc. and Open Text, Inc. v. Crowdstrike Holdings, Inc.,* No. 6:22-CV-00241-ADA-DTG (WD, Texas), Sep. 13, 2022, 37 pgs.

Defendant Crowdstrike Holdings, Inc.'s Preliminary Invalidity Contentions, Exhibit 844-A-26, *Webroot, Inc. and Open Text, Inc. v. Crowdstrike Holdings, Inc.,* No. 6:22-CV-00241-ADA-DTG (WD, Texas), Sep. 13, 2022, 26 pgs.

Defendant Crowdstrike Holdings, Inc.'s Preliminary Invalidity Contentions, Exhibit 844-A-27, *Webroot, Inc. and Open Text, Inc. v. Crowdstrike Holdings, Inc.,* No. 6:22-CV-00241-ADA-DTG (WD, Texas), Sep. 13, 2022, 45 pgs.

Defendant Crowdstrike Holdings, Inc.'s Preliminary Invalidity Contentions, Exhibit 844-A-28, *Webroot, Inc. and Open Text, Inc. v. Crowdstrike Holdings, Inc.,* No. 6:22-CV-00241-ADA-DTG (WD, Texas), Sep. 13, 2022, 41 pgs.

Defendant Crowdstrike Holdings, Inc.'s Preliminary Invalidity Contentions, Exhibit 844-A-29, *Webroot, Inc. and Open Text, Inc. v. Crowdstrike Holdings, Inc.,* No. 6:22-CV-00241-ADA-DTG (WD, Texas), Sep. 13, 2022, 38 pgs.

Defendant Crowdstrike Holdings, Inc.'s Preliminary Invalidity Contentions, Exhibit 844-B, *Webroot, Inc. and Open Text, Inc. v. Crowdstrike Holdings, Inc.,* No. 6:22-CV-00241-ADA-DTG (WD, Texas), Sep. 13, 2022, 167 pgs.

Defendant Forcepoint LLC's Preliminary Invalidity Contentions, Exhibit 389-A-1, *Webroot, Inc. and Open Text, Inc. v. Forcepoint LLC,* No. 6:22-CV-00342-ADA-DTG (WD, Texas), Sep. 13, 2022, 29 pgs.

Defendant Forcepoint LLC's Preliminary Invalidity Contentions, Exhibit 389-A-2, *Webroot, Inc. and Open Text, Inc. v. Forcepoint LLC,* No. 6:22-CV-00342-ADA-DTG (WD, Texas), Sep. 13, 2022, 45 pgs.

Defendant Forcepoint LLC's Preliminary Invalidity Contentions, Exhibit 389-A-3, *Webroot, Inc. and Open Text, Inc. v. Forcepoint LLC,* No. 6:22-CV-00342-ADA-DTG (WD, Texas), Sep. 13, 2022, 51 pgs.

Defendant Forcepoint LLC's Preliminary Invalidity Contentions, Exhibit 389-A-4, *Webroot, Inc. and Open Text, Inc. v. Forcepoint LLC,* No. 6:22-CV-00342-ADA-DTG (WD, Texas), Sep. 13, 2022, 71 pgs.

Defendant Forcepoint LLC's Preliminary Invalidity Contentions, Exhibit 389-A-5, *Webroot, Inc. and Open Text, Inc. v. Forcepoint LLC,* No. 6:22-CV-00342-ADA-DTG (WD, Texas), Sep. 13, 2022, 26 pgs.

Defendant Forcepoint LLC's Preliminary Invalidity Contentions, Exhibit 389-A-6, *Webroot, Inc. and Open Text, Inc. v. Forcepoint LLC,* No. 6:22-CV-00342-ADA-DTG (WD, Texas), Sep. 13, 2022, 21 pgs.

Defendant Forcepoint LLC's Preliminary Invalidity Contentions, Exhibit 389-A-7, *Webroot, Inc. and Open Text, Inc. v. Forcepoint LLC,* No. 6:22-CV-00342-ADA-DTG (WD, Texas), Sep. 13, 2022, 32 pgs.

Defendant Forcepoint LLC's Preliminary Invalidity Contentions, Exhibit 389-A-8, *Webroot, Inc. and Open Text, Inc. v. Forcepoint LLC,* No. 6:22-CV-00342-ADA-DTG (WD, Texas), Sep. 13, 2022, 87 pgs.

Defendant Forcepoint LLC's Preliminary Invalidity Contentions, Exhibit 389-A-9, *Webroot, Inc. and Open Text, Inc. v. Forcepoint LLC,* No. 6:22-CV-00342-ADA-DTG (WD, Texas), Sep. 13, 2022, 20 pgs.

Defendant Forcepoint LLC's Preliminary Invalidity Contentions, Exhibit 389-A-10, *Webroot, Inc. and Open Text, Inc. v. Forcepoint LLC,* No. 6:22-CV- 00342-ADA-DTG (WD, Texas), Sep. 13, 2022, 76 pgs.

Defendant Forcepoint LLC's Preliminary Invalidity Contentions, Exhibit 389-A- 11, *Webroot, Inc. and Open Text, Inc. v. Forcepoint LLC,* No. 6:22-CV-00342-ADA-DTG (WD, Texas), Sep. 13, 2022, 29 pgs.

Defendant Forcepoint LLC's Preliminary Invalidity Contentions, Exhibit 389-A-12, *Webroot, Inc. and Open Text, Inc. v. Forcepoint LLC,* No. 6:22-CV-00342-ADA-DTG (WD, Texas), Sep. 13, 2022, 25 pgs.

Defendant Forcepoint LLC's Preliminary Invalidity Contentions, Exhibit 389-A-13, *Webroot, Inc. and Open Text, Inc. v. Forcepoint LLC,* No. 6:22-CV-00342-ADA-DTG (WD, Texas), Sep. 13, 2022, 39 pgs.

Defendant Forcepoint LLC's Preliminary Invalidity Contentions, Exhibit 389-A-14, *Webroot, Inc. and Open Text, Inc. v. Forcepoint LLC,* No. 6:22-CV-00342-ADA-DTG (WD, Texas), Sep. 13, 2022, 24 pgs.

(56) References Cited

OTHER PUBLICATIONS

Defendant Forcepoint LLC's Preliminary Invalidity Contentions, Exhibit 389-A-15, *Webroot, Inc. and Open Text, Inc.* v. *Forcepoint LLC*, No. 6:22-CV-00342-ADA-DTG (WD, Texas), Sep. 13, 2022, 126 pgs.
Defendant Forcepoint LLC's Preliminary Invalidity Contentions, Exhibit 389-A-16, *Webroot, Inc. and Open Text, Inc.* v. *Forcepoint LLC*, No. 6:22-CV-00342-ADA-DTG (WD, Texas), Sep. 13, 2022, 127 pgs.
Defendant Forcepoint LLC's Preliminary Invalidity Contentions, Exhibit 389-A-17, *Webroot, Inc. and Open Text, Inc.* v. *Forcepoint LLC*, No. 6:22-CV-00342-ADA-DTG (WD, Texas), Sep. 13, 2022, 61 pgs.
Defendant Forcepoint LLC's Preliminary Invalidity Contentions, Exhibit 389-A-18, *Webroot, Inc. and Open Text, Inc.* v. *Forcepoint LLC*, No. 6:22-CV-00342-ADA-DTG (WD, Texas), Sep. 13, 2022, 35 pgs.
Defendant Forcepoint LLC's Preliminary Invalidity Contentions, Exhibit 389-A-19, *Webroot, Inc. and Open Text, Inc.* v. *Forcepoint LLC*, No. 6:22-CV-00342-ADA-DTG (WD, Texas), Sep. 13, 2022, 42 pgs.
Defendant Forcepoint LLC's Preliminary Invalidity Contentions, Exhibit 389-A-20, *Webroot, Inc. and Open Text, Inc.* v. *Forcepoint LLC*, No. 6:22-CV-00342-ADA-DTG (WD, Texas), Sep. 13, 2022, 35 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-1, 24 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-2, 23 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-3, 28 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-4, 24 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-5, 26 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-6, 22 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-7, 30 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-8, 25 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-9, 24 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-10, 21 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-11, 26 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-12, 25 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-13, 25 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-14, 22 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-15, 18 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-16, 21 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-17, 19 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-18, 19 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-19, 21 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-20, 18 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-21, 19 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-22, 18 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-23, 24 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-24, 28 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-25, 25 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-26, 23 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-27, 34 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-28, 31 pgs.
Defendant Forcepoint LLC's Preliminary Invalidity Contentions, *Webroot, Inc. and Open Text, Inc.* v. *Forcepoint LLC*, CA. No. 6:22-CV-00342-ADA-DTG, W.D. Tex., Sep. 13, 2022, Exhibit 844-B-29, 28 pgs.

(56) References Cited

OTHER PUBLICATIONS

Defendant Forcepoint LLC's Preliminary Invalidity Contentions, Exhibit 721-C-1, *Webroot, Inc. and Open Text, Inc. v. Forcepoint LLC*, No. 6:22-CV-00342-ADA-DTG (WD, Texas), Sep. 13, 2022, 44 pgs.

Defendant Forcepoint LLC's Preliminary Invalidity Contentions, Exhibit 721-C-2, *Webroot, Inc. and Open Text, Inc. v. Forcepoint LLC*, No. 6:22-CV-00342-ADA-DTG (WD, Texas), Sep. 13, 2022, 76 pgs.

Defendant Forcepoint LLC's Preliminary Invalidity Contentions, Exhibit 721-C-3, *Webroot, Inc. and Open Text, Inc. v. Forcepoint LLC*, No. 6:22-CV-00342-ADA-DTG (WD, Texas), Sep. 13, 2022, 73 pgs.

Defendant Forcepoint LLC's Preliminary Invalidity Contentions, Exhibit 721-C-4, *Webroot, Inc. and Open Text, Inc. v. Forcepoint LLC*, No. 6:22-CV-00342-ADA-DTG (WD, Texas), Sep. 13, 2022, 92 pgs.

Defendant Forcepoint LLC's Preliminary Invalidity Contentions, Exhibit 721-C-5, *Webroot, Inc. and Open Text, Inc. v. Forcepoint LLC*, No. 6:22-CV-00342-ADA-DTG (WD, Texas), Sep. 13, 2022, 24 pgs.

Defendant Forcepoint LLC's Preliminary Invalidity Contentions, Exhibit 721-C-6, *Webroot, Inc. and Open Text, Inc. v. Forcepoint LLC*, No. 6:22-CV-00342-ADA-DTG (WD, Texas), Sep. 13, 2022, 21 pgs.

Defendant Forcepoint LLC's Preliminary Invalidity Contentions, Exhibit 721-C-7, *Webroot, Inc. and Open Text, Inc. v. Forcepoint LLC*, No. 6:22-CV-00342-ADA-DTG (WD, Texas), Sep. 13, 2022, 27 pgs.

Defendant Forcepoint LLC's Preliminary Invalidity Contentions, Exhibit 721-C-8, *Webroot, Inc. and Open Text, Inc. v. Forcepoint LLC*, No. 6:22-CV-00342-ADA-DTG (WD, Texas), Sep. 13, 2022, 33 pgs.

Defendant Forcepoint LLC's Preliminary Invalidity Contentions, Exhibit 721-C-9, *Webroot, Inc. and Open Text, Inc. v. Forcepoint LLC*, No. 6:22-CV-00342-ADA-DTG (WD, Texas), Sep. 13, 2022, 38 pgs.

Defendant Forcepoint LLC's Preliminary Invalidity Contentions, Exhibit 721-C-10, *Webroot, Inc. and Open Text, Inc. v. Forcepoint LLC*, No. 6:22-CV-00342-ADA-DTG (WD, Texas), Sep. 13, 2022, 27 pgs.

Defendant Forcepoint LLC's Preliminary Invalidity Contentions, Exhibit 721-C-11, *Webroot, Inc. and Open Text, Inc. v. Forcepoint LLC*, No. 6:22-CV-00342-ADA-DTG (WD, Texas), Sep. 13, 2022, 34 pgs.

Defendant Forcepoint LLC's Preliminary Invalidity Contentions, Exhibit 721-C-12, *Webroot, Inc. and Open Text, Inc. v. Forcepoint LLC*, No. 6:22-CV-00342-ADA-DTG (WD, Texas), Sep. 13, 2022, 31 pgs.

Defendant Forcepoint LLC's Preliminary Invalidity Contentions, Exhibit 721-C-13, *Webroot, Inc. and Open Text, Inc. v. Forcepoint LLC*, No. 6:22-CV-00342-ADA-DTG (WD, Texas), Sep. 13, 2022, 39 pgs.

Defendant Forcepoint LLC's Preliminary Invalidity Contentions, Exhibit 721-C-14, *Webroot, Inc. and Open Text, Inc. v. Forcepoint LLC*, No. 6:22-CV-00342-ADA-DTG (WD, Texas), Sep. 13, 2022, 40 pgs.

Defendant Forcepoint LLC's Preliminary Invalidity Contentions, Exhibit 721-C-15, *Webroot, Inc. and Open Text, Inc. v. Forcepoint LLC*, No. 6:22-CV-00342-ADA-DTG (WD, Texas), Sep. 13, 2022, 28 pgs.

Defendant Forcepoint LLC's Preliminary Invalidity Contentions, Exhibit 721-C-16, *Webroot, Inc. and Open Text, Inc. v. Forcepoint LLC*, No. 6:22-CV-00342-ADA-DTG (WD, Texas), Sep. 13, 2022, 18 pgs.

Defendant Forcepoint LLC's Preliminary Invalidity Contentions, Exhibit 721-C-17, *Webroot, Inc. and Open Text, Inc. v. Forcepoint LLC*, No. 6:22-CV-00342-ADA-DTG (WD, Texas), Sep. 13, 2022, 18 pgs.

Defendant Forcepoint LLC's Preliminary Invalidity Contentions, Exhibit 386-D-1, *Webroot, Inc. and Open Text, Inc. v. Forcepoint LLC*, No. 6:22-CV-00342-ADA-DTG (WD, Texas), Sep. 13, 2022, 91 pgs.

Defendant Forcepoint LLC's Preliminary Invalidity Contentions, Exhibit 386-D-2, *Webroot, Inc. and Open Text, Inc. v. Forcepoint LLC*, No. 6:22-CV-00342-ADA-DTG (WD, Texas), Sep. 13, 2022, 64 pgs.

Defendant Forcepoint LLC's Preliminary Invalidity Contentions, Exhibit 386-D-3, *Webroot, Inc. and Open Text, Inc. v. Forcepoint LLC*, No. 6:22-CV-00342-ADA-DTG (WD, Texas), Sep. 13, 2022, 75 pgs.

Defendant Forcepoint LLC's Preliminary Invalidity Contentions, Exhibit 386-D-4, *Webroot, Inc. and Open Text, Inc. v. Forcepoint LLC*, No. 6:22-CV-00342-ADA-DTG (WD, Texas), Sep. 13, 2022, 72 pgs.

Defendant Forcepoint LLC's Preliminary Invalidity Contentions, Exhibit 386-D-5, *Webroot, Inc. and Open Text, Inc. v. Forcepoint LLC*, No. 6:22-CV-00342-ADA-DTG (WD, Texas), Sep. 13, 2022, 76 pgs.

Defendant Forcepoint LLC's Preliminary Invalidity Contentions, Exhibit 928-E-1, *Webroot, Inc. and Open Text, Inc. v. Forcepoint LLC*, No. 6:22-CV-00342-ADA-DTG (WD, Texas), Sep. 13, 2022, 27 pgs.

Defendant Forcepoint LLC's Preliminary Invalidity Contentions, Exhibit 928-E-2, *Webroot, Inc. and Open Text, Inc. v. Forcepoint LLC*, No. 6:22-CV-00342-ADA-DTG (WD, Texas), Sep. 13, 2022, 25 pgs.

Defendant Forcepoint LLC's Preliminary Invalidity Contentions, Exhibit 928-E-3, *Webroot, Inc. and Open Text, Inc. v. Forcepoint LLC*, No. 6:22-CV-00342-ADA-DTG (WD, Texas), Sep. 13, 2022, 28 pgs.

Defendant Forcepoint LLC's Preliminary Invalidity Contentions, Exhibit 928-E-4, *Webroot, Inc. and Open Text, Inc. v. Forcepoint LLC*, No. 6:22-CV-00342-ADA-DTG (WD, Texas), Sep. 13, 2022, 31 pgs.

Defendant Forcepoint LLC's Preliminary Invalidity Contentions, Exhibit 928-E-5, *Webroot, Inc. and Open Text, Inc. v. Forcepoint LLC*, No. 6:22-CV-00342-ADA-DTG (WD, Texas), Sep. 13, 2022, 31 pgs.

Defendant Forcepoint LLC's Preliminary Invalidity Contentions, Exhibit 869-H-1, *Webroot, Inc. and Open Text, Inc. v. Forcepoint LLC*, CA. No. 6:22-CV-00342-ADA-DTG, W.D. Tex., Feb. 21, 2023, 55 pgs.

Defendant Forcepoint LLC's Preliminary Invalidity Contentions, Exhibit 869-H-2, *Webroot, Inc. and Open Text, Inc. v. Forcepoint LLC*, CA. No. 6:22-CV-00342-ADA-DTG, W.D. Tex., Feb. 21, 2023, 42 pgs.

Defendant Forcepoint LLC's Preliminary Invalidity Contentions, Exhibit 869-H-3, *Webroot, Inc. and Open Text, Inc. v. Forcepoint LLC*, CA. No. 6:22-CV-00342-ADA-DTG, W.D. Tex., Feb. 21, 2023, 39 pgs.

Defendant Forcepoint LLC's Preliminary Invalidity Contentions, Exhibit 869-H-4, *Webroot, Inc. and Open Text, Inc. v. Forcepoint LLC*, CA. No. 6:22-CV-00342-ADA-DTG, W.D. Tex., Feb. 21, 2023, 40 pgs.

Defendant Forcepoint LLC's Preliminary Invalidity Contentions, Exhibit 869-H-5, *Webroot, Inc. and Open Text, Inc. v. Forcepoint LLC*, CA. No. 6:22-CV-00342-ADA-DTG, W.D. Tex., Feb. 21, 2023, 47 pgs.

Defendant Forcepoint LLC's Preliminary Invalidity Contentions, Exhibit 869-H-6, *Webroot, Inc. and Open Text, Inc. v. Forcepoint LLC*, CA. No. 6:22-CV-00342-ADA-DTG, W.D. Tex., Feb. 21, 2023, 48 pgs.

Defendant Forcepoint LLC's Preliminary Invalidity Contentions, Exhibit 869-H-7, *Webroot, Inc. and Open Text, Inc. v. Forcepoint LLC*, CA. No. 6:22-CV-00342-ADA-DTG, W.D. Tex., Feb. 21, 2023, 62 pgs.

Defendant Forcepoint LLC's Preliminary Invalidity Contentions, Exhibit 869-H-8, *Webroot, Inc. and Open Text, Inc. v. Forcepoint LLC*, CA. No. 6:22-CV-00342-ADA-DTG, W.D. Tex., Feb. 21, 2023, 36 pgs.

(56) References Cited

OTHER PUBLICATIONS

Defendant Forcepoint LLC's Preliminary Invalidity Contentions, Exhibit 869-H-9, *Webroot, Inc. and Open Text, Inc.* v. *Forcepoint LLC*, CA. No. 6:22-CV-00342-ADA-DTG, W.D. Tex., Feb. 21, 2023, 39 pgs.

Defendant Forcepoint LLC's Preliminary Invalidity Contentions, Exhibit 869-H-10, *Webroot, Inc. and Open Text, Inc.* v. *Forcepoint LLC*, CA. No. 6:22-CV-00342-ADA-DTG, W.D. Tex., Feb. 21, 2023, 37 pgs.

Defendant Forcepoint LLC's Preliminary Invalidity Contentions, Exhibit 869-H-11, *Webroot, Inc. and Open Text, Inc.* v. *Forcepoint LLC*, CA. No. 6:22-CV-00342-ADA-DTG, W.D. Tex., Feb. 21, 2023, 44 pgs.

Defendant Forcepoint LLC's Preliminary Invalidity Contentions, Exhibit 869-H-12, *Webroot, Inc. and Open Text, Inc.* v. *Forcepoint LLC*, CA. No. 6:22-CV-00342-ADA-DTG, W.D. Tex., Feb. 21, 2023, 39 pgs.

Defendant Forcepoint LLC's Preliminary Invalidity Contentions, Exhibit 869-H-13, *Webroot, Inc. and Open Text, Inc.* v. *Forcepoint LLC*, CA. No. 6:22-CV-00342-ADA-DTG, W.D. Tex., Feb. 21, 2023, 50 pgs.

Defendant Forcepoint LLC's Preliminary Invalidity Contentions, Exhibit 869-H-14, *Webroot, Inc. and Open Text, Inc.* v. *Forcepoint LLC*, CA. No. 6:22-CV-00342-ADA-DTG, W.D. Tex., Feb. 21, 2023, 37 pgs.

Defendant Forcepoint LLC's Preliminary Invalidity Contentions, Exhibit 869-H-15, *Webroot, Inc. and Open Text, Inc.* v. *Forcepoint LLC*, CA. No. 6:22-CV-00342-ADA-DTG, W.D. Tex., Feb. 21, 2023, 36 pgs.

Defendant Forcepoint LLC's Preliminary Invalidity Contentions, Exhibit 869-H-16, *Webroot, Inc. and Open Text, Inc.* v. *Forcepoint LLC*, CA. No. 6:22-CV-00342-ADA-DTG, W.D. Tex., Feb. 21, 2023, 32 pgs.

Defendant Forcepoint LLC's Preliminary Invalidity Contentions, Exhibit 869-H-17, *Webroot, Inc. and Open Text, Inc.* v. *Forcepoint LLC*, CA. No. 6:22-CV-00342-ADA-DTG, W.D. Tex., Feb. 21, 2023, 31 pgs.

Defendant Forcepoint LLC's Preliminary Invalidity Contentions, Exhibit 869-H-18, *Webroot, Inc. and Open Text, Inc.* v. *Forcepoint LLC*, CA. No. 6:22-CV-00342-ADA-DTG, W.D. Tex., Feb. 21, 2023, 30 pgs.

Defendant Forcepoint LLC's Preliminary Invalidity Contentions, Exhibit 869-H-19, *Webroot, Inc. and Open Text, Inc.* v. *Forcepoint LLC* CA. No. 6:22-CV-00342-ADA-DTG, W.D. Tex., Feb. 21, 2023, 37 pgs.

Defendant Forcepoint LLC's Preliminary Invalidity Contentions, Exhibit 869-H-20, *Webroot, Inc. and Open Text, Inc.* v. *Forcepoint LLC*, CA. No. 6:22-CV-00342-ADA-DTG, W.D. Tex., Feb. 21, 2023, 32 pgs.

Defendant Forcepoint LLC's Preliminary Invalidity Contentions, Exhibit 869-H-21, *Webroot, Inc. and Open Text, Inc.* v. *Forcepoint LLC*, CA. No. 6:22-CV-00342-ADA-DTG, W.D. Tex., Feb. 21, 2023, 37 pgs.

Defendant Forcepoint LLC's Preliminary Invalidity Contentions, Exhibit 869-H-22, *Webroot, Inc. and Open Text, Inc.* v. *Forcepoint LLC*, CA. No. 6:22-CV-00342-ADA-DTG, W.D. Tex., Feb. 21, 2023, 38 pgs.

Defendant Forcepoint LLC's Preliminary Invalidity Contentions, Exhibit 869-H-23, *Webroot, Inc. and Open Text, Inc.* v. *Forcepoint LLC*, CA. No. 6:22-CV-00342-ADA-DTG, W.D. Tex., Feb. 21, 2023, 33 pgs.

Defendant Forcepoint LLC's Preliminary Invalidity Contentions, Exhibit 869-H-24, *Webroot, Inc. and Open Text, Inc.* v. *Forcepoint LLC*, CA. No. 6:22-CV-00342-ADA-DTG, W.D. Tex., Feb. 21, 2023, 35 pgs.

Defendant Forcepoint LLC's Preliminary Invalidity Contentions, Exhibit 869-H-25, *Webroot, Inc. and Open Text, Inc.* v. *Forcepoint LLC*, CA. No. 6:22-CV-00342-ADA-DTG, W.D. Tex., Feb. 21, 2023, 63 pgs.

Defendant Forcepoint LLC's Preliminary Invalidity Contentions, Exhibit 869-H-26, *Webroot, Inc. and Open Text, Inc.* v. *Forcepoint LLC* CA. No. 6:22-CV-00342-ADA-DTG, W.D. Tex., Feb. 21, 2023, 39 pgs.

Defendant Forcepoint LLC's Preliminary Invalidity Contentions, Exhibit 869-H-27, *Webroot, Inc. and Open Text, Inc.* v. *Forcepoint LLC* CA. No. 6:22-CV-00342-ADA-DTG, W.D. Tex., Feb. 21, 2023, 29 pgs.

Defendant Forcepoint LLC's Preliminary Invalidity Contentions, Exhibit 869-H-28, *Webroot, Inc. and Open Text, Inc.* v. *Forcepoint LLC* CA. No. 6:22-CV-00342-ADA-DTG, W.D. Tex., Feb. 21, 2023, 71 pgs.

Defendant Forcepoint LLC's Preliminary Invalidity Contentions, Exhibit 869-H-29, *Webroot, Inc. and Open Text, Inc.* v. *Forcepoint LLC* CA. No. 6:22-CV-00342-ADA-DTG, W.D. Tex., Feb. 21, 2023, 38 pgs.

Defendant Forcepoint LLC's Preliminary Invalidity Contentions, Exhibit 869-H-30, *Webroot, Inc. and Open Text, Inc.* v. *Forcepoint LLC* CA. No. 6:22-CV-00342-ADA-DTG, W.D. Tex., Feb. 21, 2023, 33 pgs.

Defendant Forcepoint LLC's Preliminary Invalidity Contentions, Exhibit 869-H-31, *Webroot, Inc. and Open Text, Inc.* v. *Forcepoint LLC* CA. No. 6:22-CV-00342-ADA-DTG, W.D. Tex., Feb. 21, 2023, 39 pgs.

Defendant Forcepoint LLC's Preliminary Invalidity Contentions, Exhibit 869-H-32, *Webroot, Inc. and Open Text, Inc.* v. *Forcepoint LLC* CA. No. 6:22-CV-00342-ADA-DTG, W.D. Tex., Feb. 21, 2023, 34 pgs.

Defendant Forcepoint LLC's Preliminary Invalidity Contentions, Exhibit 869-H-33, *Webroot, Inc. and Open Text, Inc.* v. *Forcepoint LLC* CA. No. 6:22-CV-00342-ADA-DTG, W.D. Tex., Feb. 21, 2023, 40 pgs.

Defendant Forcepoint LLC's Preliminary Invalidity Contentions, Exhibit 869-H-34, *Webroot, Inc. and Open Text, Inc.* v. *Forcepoint LLC* CA. No. 6:22-CV-00342-ADA-DTG, W.D. Tex., Feb. 21, 2023, 43 pgs.

Defendant Forcepoint LLC's Preliminary Invalidity Contentions, Exhibit 869-H-35, *Webroot, Inc. and Open Text, Inc.* v. *Forcepoint LLC* CA. No. 6:22-CV-00342-ADA-DTG, W.D. Tex., Feb. 21, 2023, 49 pgs.

Defendant Forcepoint LLC's Preliminary Invalidity Contentions, Exhibit 869-H-36, *Webroot, Inc. and Open Text, Inc.* v. *Forcepoint LLC* CA. No. 6:22-CV-00342-ADA-DTG, W.D. Tex., Feb. 21, 2023, 69 pgs.

Defendant AO Kaspersky Lab's Preliminary Invalidity Contentions—Exhibit 1A, Prior Art Index, *Webroot, Inc. and Open Text, Inc.* v. *AO Kaspersky Lab*, No. 6:22-CV-00243 (WD, Texas), Sep. 14, 2022, 67 pgs.

Defendant AO Kaspersky Lab's Preliminary Invalidity Contentions—Exhibit 2A, Invalidity Claim Chart Index, *Webroot, Inc. and Open Text, Inc.* v. *AO Kaspersky Lab*, No. 6:22-CV-00243 (WD, Texas), Sep. 14, 2022, 19 pgs.

Defendant AO Kaspersky Lab's Preliminary Invalidity Contentions—Exhibit 2B, Invalidity Claim Chart Index, *Webroot, Inc. and Open Text, Inc.* v. *AO Kaspersky Lab*, No. 6:22-CV-00243 (WD, Texas), Sep. 14, 2022, 22 pgs.

Defendant AO Kaspersky Lab's Preliminary Invalidity Contentions—Exhibit 6A, *Webroot, Inc. and Open Text, Inc.* v. *AO Kaspersky Lab*, No. 6:22-CV-00243 (WD, Texas), Sep. 14, 2022, 70 pgs.

Defendant AO Kaspersky Lab's Preliminary Invalidity Contentions—Exhibit 6B, *Webroot, Inc. and Open Text, Inc.* v. *AO Kaspersky Lab*, No. 6:22-CV-00243 (WD, Texas), Sep. 14, 2022, 55 pgs.

Defendant AO Kaspersky Lab's Preliminary Invalidity Contentions—Exhibit 6C, *Webroot, Inc. and Open Text, Inc.* v. *AO Kaspersky Lab*, No. 6:22-CV-00243 (WD, Texas), Sep. 14, 2022, 37 pgs.

Defendant AO Kaspersky Lab's Preliminary Invalidity Contentions—Exhibit 7A, *Webroot, Inc. and Open Text, Inc.* v. *AO Kaspersky Lab*, No. 6:22-CV-00243 (WD, Texas), Feb. 21, 2023, 71 pgs.

Defendant AO Kaspersky Lab's Preliminary Invalidity Contentions—Exhibit 7B, *Webroot, Inc. and Open Text, Inc.* v. *AO Kaspersky Lab*, No. 6:22-CV-00243 (WD, Texas), Feb. 21, 2023, 68 pgs.

(56) References Cited

OTHER PUBLICATIONS

Defendant Sophos Ltd.'s Preliminary Invalidity Contentions, Exhibit 250-A-1, *Webroot, Inc. and Open Text, Inc.* v. *Sophos Ltd.,* No. 6:22-CV-00240-ADA-DTG (WD, Texas), Sep. 13, 2022, 65 pgs.
Defendant Sophos Ltd.'s Preliminary Invalidity Contentions, Exhibit 250-A-2, *Webroot, Inc. and Open Text, Inc.* v. *Sophos Ltd.,* No. 6:22-CV-00240-ADA-DTG (WD, Texas), Sep. 13, 2022, 44 pgs.
Defendant Sophos Ltd.'s Preliminary Invalidity Contentions, Exhibit 250-A-3, *Webroot, Inc. and Open Text, Inc.* v. *Sophos Ltd.,* No. 6:22-CV-00240-ADA-DTG (WD, Texas), Sep. 13, 2022, 120 pgs.
Defendant Sophos Ltd.'s Preliminary Invalidity Contentions, Exhibit 250-A-4, *Webroot, Inc. and Open Text, Inc.* v. *Sophos Ltd.,* No. 6:22-CV-00240-ADA-DTG (WD, Texas), Sep. 13, 2022, 30 pgs.
Defendant Sophos Ltd.'s Preliminary Invalidity Contentions, Exhibit 250-A-5, *Webroot, Inc. and Open Text, Inc.* v. *Sophos Ltd.,* No. 6:22-CV-00240-ADA-DTG (WD, Texas), Sep. 13, 2022, 112 pgs.
Defendant Sophos Ltd.'s Preliminary Invalidity Contentions, Exhibit 250-A-6, *Webroot, Inc. and Open Text, Inc.* v. *Sophos Ltd.,* No. 6:22-CV-00240-ADA-DTG (WD, Texas), Sep. 13, 2022, 51 pgs.
Defendant Sophos Ltd.'s Preliminary Invalidity Contentions, Exhibit 250-A-7, *Webroot, Inc. and Open Text, Inc.* v. *Sophos Ltd.,* No. 6:22-CV-00240-ADA-DTG (WD, Texas), Sep. 13, 2022, 42 pgs.
Defendant Sophos Ltd.'s Preliminary Invalidity Contentions, Exhibit 250-A-8, *Webroot, Inc. and Open Text, Inc.* v. *Sophos Ltd.,* No. 6:22-CV-00240-ADA-DTG (WD, Texas), Sep. 13, 2022, 71 pgs.
Defendant Sophos Ltd.'s Preliminary Invalidity Contentions, Exhibit 250-A-9, *Webroot, Inc. and Open Text, Inc.* v. *Sophos Ltd.,* No. 6:22-CV-00240-ADA-DTG (WD, Texas), Sep. 13, 2022, 45 pgs.
Defendant Sophos Ltd.'s Preliminary Invalidity Contentions, Exhibit 250-A-10, *Webroot, Inc. and Open Text, Inc.* v. *Sophos Ltd.,* No. 6:22-CV-00240-ADA-DTG (WD, Texas), Sep. 13, 2022, 31 pgs.
Defendant Sophos Ltd.'s Preliminary Invalidity Contentions, Exhibit 250-A-11, *Webroot, Inc. and Open Text, Inc.* v. *Sophos Ltd.,* No. 6:22-CV-00240-ADA-DTG (WD, Texas), Sep. 13, 2022, 77 pgs.
Defendant Sophos Ltd.'s Preliminary Invalidity Contentions, Exhibit 250-A-12, *Webroot, Inc. and Open Text, Inc.* v. *Sophos Ltd.,* No. 6:22-CV-00240-ADA-DTG (WD, Texas), Sep. 13, 2022, 31 pgs.
Defendant Sophos Ltd.'s Preliminary Invalidity Contentions, Exhibit 250-A-13, *Webroot, Inc. and Open Text, Inc.* v. *Sophos Ltd.,* No. 6:22-CV-00240-ADA-DTG (WD, Texas), Sep. 13, 2022, 77 pgs.
Defendant Sophos Ltd.'s Preliminary Invalidity Contentions, Exhibit 250-A-14, *Webroot, Inc. and Open Text, Inc.* v. *Sophos Ltd.,* No. 6:22-CV-00240-ADA-DTG (WD, Texas), Sep. 13, 2022, 41 pgs.
Defendant Sophos Ltd.'s Preliminary Invalidity Contentions, Exhibit 250-A-15, *Webroot, Inc. and Open Text, Inc.* v. *Sophos Ltd.,* No. 6:22-CV-00240-ADA-DTG (WD, Texas), Sep. 13, 2022, 34 pgs.
Defendant Sophos Ltd.'s Preliminary Invalidity Contentions, Exhibit 250-A-16, *Webroot, Inc. and Open Text, Inc.* v. *Sophos Ltd.,* No. 6:22-CV-00240-ADA-DTG (WD, Texas), Sep. 13, 2022, 33 pgs.
Defendant Sophos Ltd.'s Preliminary Invalidity Contentions, Exhibit 250-A-17, *Webroot, Inc. and Open Text, Inc.* v. *Sophos Ltd.,* No. 6:22-CV-00240-ADA-DTG (WD, Texas), Sep. 13, 2022, 37 pgs.
Defendant Sophos Ltd.'s Preliminary Invalidity Contentions, Exhibit 250-B, *Webroot, Inc. and Open Text, Inc.* v. *Sophos Ltd.,* No. 6:22-CV-00240-ADA-DTG (WD, Texas), Sep. 13, 2022, 41 pgs.
Defendant Sophos Ltd.'s Preliminary Invalidity Contentions, Exhibit 389-A-1, *Webroot, Inc. and Open Text, Inc.* v. *Sophos Ltd.,* No. 6:22-CV-00240-ADA-DTG (WD, Texas), Sep. 13, 2022, 52 pgs.
Defendant Sophos Ltd.'s Preliminary Invalidity Contentions, Exhibit 389-A-2, *Webroot, Inc. and Open Text, Inc.* v. *Sophos Ltd.,* No. 6:22-CV-00240-ADA-DTG (WD, Texas), Sep. 13, 2022, 30 pgs.
Defendant Sophos Ltd.'s Preliminary Invalidity Contentions, Exhibit 389-A-3, *Webroot, Inc. and Open Text, Inc.* v. *Sophos Ltd.,* No. 6:22-CV-00240-ADA-DTG (WD, Texas), Sep. 13, 2022, 44 pgs.
Defendant Sophos Ltd.'s Preliminary Invalidity Contentions, Exhibit 389-A-4, *Webroot, Inc. and Open Text, Inc.* v. *Sophos Ltd.,* No. 6:22-CV-00240-ADA-DTG (WD, Texas), Sep. 13, 2022, 40 pgs.
Defendant Sophos Ltd.'s Preliminary Invalidity Contentions, Exhibit 389-A-5, *Webroot, Inc. and Open Text, Inc.* v. *Sophos Ltd.,* No. 6:22-CV-00240-ADA-DTG (WD, Texas), Sep. 13, 2022, 151 pgs.
Defendant Sophos Ltd.'s Preliminary Invalidity Contentions, Exhibit 389-A-6, *Webroot, Inc. and Open Text, Inc.* v. *Sophos Ltd.,* No. 6:22-CV-00240-ADA-DTG (WD, Texas), Sep. 13, 2022, 23 pgs.
Defendant Sophos Ltd.'s Preliminary Invalidity Contentions, Exhibit 389-A-7, *Webroot, Inc. and Open Text, Inc.* v. *Sophos Ltd.,* No. 6:22-CV-00240-ADA-DTG (WD, Texas), Sep. 13, 2022, 152 pgs.
Defendant Sophos Ltd.'s Preliminary Invalidity Contentions, Exhibit 389-A-8, *Webroot, Inc. and Open Text, Inc.* v. *Sophos Ltd.,* No. 6:22-CV-00240-ADA-DTG (WD, Texas), Sep. 13, 2022, 45 pgs.
Defendant Sophos Ltd.'s Preliminary Invalidity Contentions, Exhibit 389-A-9, *Webroot, Inc. and Open Text, Inc.* v. *Sophos Ltd.,* No. 6:22-CV-00240-ADA-DTG (WD, Texas), Sep. 13, 2022, 38 pgs.
Defendant Sophos Ltd.'s Preliminary Invalidity Contentions, Exhibit 389-A-10, *Webroot, Inc. and Open Text, Inc.* v. *Sophos Ltd.,* No. 6:22-CV-00240-ADA-DTG (WD, Texas), Sep. 13, 2022, 76 pgs.
Defendant Sophos Ltd.'s Preliminary Invalidity Contentions, Exhibit 389-A-11, *Webroot, Inc. and Open Text, Inc.* v. *Sophos Ltd.,* No. 6:22-CV-00240-ADA-DTG (WD, Texas), Sep. 13, 2022, 42 pgs.
Defendant Sophos Ltd.'s Preliminary Invalidity Contentions, Exhibit 389-A-12, *Webroot, Inc. and Open Text, Inc.* v. *Sophos Ltd.,* No. 6:22-CV-00240-ADA-DTG (WD, Texas), Sep. 13, 2022, 29 pgs.
Defendant Sophos Ltd.'s Preliminary Invalidity Contentions, Exhibit 389-A-13, *Webroot, Inc. and Open Text, Inc.* v. *Sophos Ltd.,* No. 6:22-CV-00240-ADA-DTG (WD, Texas), Sep. 13, 2022, 93 pgs.
Defendant Sophos Ltd.'s Preliminary Invalidity Contentions, Exhibit 389-A-14, *Webroot, Inc. and Open Text, Inc.* v. *Sophos Ltd.,* No. 6:22-CV-00240-ADA-DTG (WD, Texas), Sep. 13, 2022, 25 pgs.
Defendant Sophos Ltd.'s Preliminary Invalidity Contentions, Exhibit 389-A-15, *Webroot, Inc. and Open Text, Inc.* v. *Sophos Ltd.,* No. 6:22-CV-00240-ADA-DTG (WD, Texas), Sep. 13, 2022, 98 pgs.
Defendant Sophos Ltd.'s Preliminary Invalidity Contentions, Exhibit 389-A-16, *Webroot, Inc. and Open Text, Inc.* v. *Sophos Ltd.,* No. 6:22-CV-00240-ADA-DTG (WD, Texas), Sep. 13, 2022.
Defendant Sophos Ltd.'s Preliminary Invalidity Contentions, Exhibit 389-A-17, *Webroot, Inc. and Open Text, Inc.* v. *Sophos Ltd.,* No. 6:22-CV-00240-ADA-DTG (WD, Texas), Sep. 13, 2022, 52 pgs.
Defendant Sophos Ltd.'s Preliminary Invalidity Contentions, Exhibit 389-A-18, *Webroot, Inc. and Open Text, Inc.* v. *Sophos Ltd.,* No. 6:22-CV-00240-ADA-DTG (WD, Texas), Sep. 13, 2022, 57 pgs.
Defendant Sophos Ltd.'s Preliminary Invalidity Contentions, Exhibit 389-A-19, *Webroot, Inc. and Open Text, Inc.* v. *Sophos Ltd.,* No. 6:22-CV-00240-ADA-DTG (WD, Texas), Sep. 13, 2022, 79 pgs.
Defendant Sophos Ltd.'s Preliminary Invalidity Contentions, Exhibit 389-A-20, *Webroot, Inc. and Open Text, Inc.* v. *Sophos Ltd.,* No. 6:22-CV-00240-ADA-DTG (WD, Texas), Sep. 13, 2022, 36 pgs.
Defendant Sophos Ltd.'s Preliminary Invalidity Contentions, Exhibit 389-B, *Webroot, Inc. and Open Text, Inc.* v. *Sophos Ltd.,* No. 6:22-CV-00240-ADA-DTG (WD, Texas), Sep. 13, 2022, 21 pgs.
Defendant Sophos Ltd.'s Preliminary Invalidity Contentions, Exhibit 721-A-1, *Webroot, Inc. and Open Text, Inc.* v. *Sophos Ltd.,* No. 6:22-CV-00240-ADA-DTG (WD, Texas), Sep. 13, 2022, 14 pgs.
Defendant Sophos Ltd.'s Preliminary Invalidity Contentions, Exhibit 721-A-2, *Webroot, Inc. and Open Text, Inc.* v. *Sophos Ltd.,* No. 6:22-CV-00240-ADA-DTG (WD, Texas), Sep. 13, 2022, 14 pgs.
Defendant Sophos Ltd.'s Preliminary Invalidity Contentions, Exhibit 721-A-3, *Webroot, Inc. and Open Text, Inc.* v. *Sophos Ltd.,* No. 6:22-CV-00240-ADA-DTG (WD, Texas), Sep. 13, 2022, 31 pgs.
Defendant Sophos Ltd.'s Preliminary Invalidity Contentions, Exhibit 721-A-4, *Webroot, Inc. and Open Text, Inc.* v. *Sophos Ltd.,* No. 6:22-CV-00240-ADA-DTG (WD, Texas), Sep. 13, 2022, 50 pgs.
Defendant Sophos Ltd.'s Preliminary Invalidity Contentions, Exhibit 721-A-5, *Webroot, Inc. and Open Text, Inc.* v. *Sophos Ltd.,* No. 6:22-CV-00240-ADA-DTG (WD, Texas), Sep. 13, 2022, 39 pgs.
Defendant Sophos Ltd.'s Preliminary Invalidity Contentions, Exhibit 721-A-6, *Webroot, Inc. and Open Text, Inc.* v. *Sophos Ltd.,* No. 6:22-CV-00240-ADA-DTG (WD, Texas), Sep. 13, 2022, 17 pgs.
Defendant Sophos Ltd.'s Preliminary Invalidity Contentions, Exhibit 721-A-7, *Webroot, Inc. and Open Text, Inc.* v. *Sophos Ltd.,* No. 6:22-CV-00240-ADA-DTG (WD, Texas), Sep. 13, 2022, 33 pgs.
Defendant Sophos Ltd.'s Preliminary Invalidity Contentions, Exhibit 721-A-8, *Webroot, Inc. and Open Text, Inc.* v. *Sophos Ltd.,* No. 6:22-CV-00240-ADA-DTG (WD, Texas), Sep. 13, 2022, 40 pgs.

(56) References Cited

OTHER PUBLICATIONS

Defendant Sophos Ltd.'s Preliminary Invalidity Contentions, Exhibit 721-A-9, *Webroot, Inc. and Open Text, Inc. v. Sophos Ltd.*, No. 6:22-CV-00240-ADA-DTG (WD, Texas), Sep. 13, 2022, 29 pgs.
Defendant Sophos Ltd.'s Preliminary Invalidity Contentions, Exhibit 721-A-10, *Webroot, Inc. and Open Text, Inc. v. Sophos Ltd.*, No. 6:22-CV-00240-ADA-DTG (WD, Texas), Sep. 13, 2022, 114 pgs.
Defendant Sophos Ltd.'s Preliminary Invalidity Contentions, Exhibit 721-A-11, *Webroot, Inc. and Open Text, Inc. v. Sophos Ltd.*, No. 6:22-CV-00240-ADA-DTG (WD, Texas), Sep. 13, 2022, 24 pgs.
Defendant Sophos Ltd.'s Preliminary Invalidity Contentions, Exhibit 721-A-12, *Webroot, Inc. and Open Text, Inc. v. Sophos Ltd.*, No. 6:22-CV-00240-ADA-DTG (WD, Texas), Sep. 13, 2022, 37 pgs.
Defendant Sophos Ltd.'s Preliminary Invalidity Contentions, Exhibit 721-A-13, *Webroot, Inc. and Open Text, Inc. v. Sophos Ltd.*, No. 6:22-CV-00240-ADA-DTG (WD, Texas), Sep. 13, 2022, 34 pgs.
Defendant Sophos Ltd.'s Preliminary Invalidity Contentions, Exhibit 721-A-14, *Webroot, Inc. and Open Text, Inc. v. Sophos Ltd.*, No. 6:22-CV-00240-ADA-DTG (WD, Texas), Sep. 13, 2022, 44 pgs.
Defendant Sophos Ltd.'s Preliminary Invalidity Contentions, Exhibit 721-A-15, *Webroot, Inc. and Open Text, Inc. v. Sophos Ltd.*, No. 6:22-CV-00240-ADA-DTG (WD, Texas), Sep. 13, 2022, 28 pgs.
Defendant Sophos Ltd.'s Preliminary Invalidity Contentions, Exhibit 721-A-16, *Webroot, Inc. and Open Text, Inc. v. Sophos Ltd.*, No. 6:22-CV-00240-ADA-DTG (WD, Texas), Sep. 13, 2022, 92 pgs.
Defendant Sophos Ltd.'s Preliminary Invalidity Contentions, Exhibit 721-A-17, *Webroot, Inc. and Open Text, Inc. v. Sophos Ltd.*, No. 6:22-CV-00240-ADA-DTG (WD, Texas), Sep. 13, 2022, 19 pgs.
Defendant Sophos Ltd.'s Preliminary Invalidity Contentions, Exhibit 721-A-18, *Webroot, Inc. and Open Text, Inc. v. Sophos Ltd.*, No. 6:22-CV-00240-ADA-DTG (WD, Texas), Sep. 13, 2022, 19 pgs.
Defendant Sophos Ltd.'s Preliminary Invalidity Contentions, Exhibit 721-A-19, *Webroot, Inc. and Open Text, Inc. v. Sophos Ltd.*, No. 6:22-CV-00240-ADA-DTG (WD, Texas), Sep. 13, 2022, 41 pgs.
Defendant Sophos Ltd.'s Preliminary Invalidity Contentions, Exhibit 721-A-20, *Webroot, Inc. and Open Text, Inc. v. Sophos Ltd.*, No. 6:22-CV-00240-ADA-DTG (WD, Texas), Sep. 13, 2022, 85 pgs.
Defendant Sophos Ltd.'s Preliminary Invalidity Contentions, Exhibit 721-A-21, *Webroot, Inc. and Open Text, Inc. v. Sophos Ltd.*, No. 6:22-CV-00240-ADA-DTG (WD, Texas), Sep. 13, 2022, 27 pgs.
Defendant Sophos Ltd.'s Preliminary Invalidity Contentions, Exhibit 721-A-22, *Webroot, Inc. and Open Text, Inc. v. Sophos Ltd.*, No. 6:22-CV-00240-ADA-DTG (WD, Texas), Sep. 13, 2022, 31 pgs.
Defendant Sophos Ltd.'s Preliminary Invalidity Contentions, Exhibit 721-B, *Webroot, Inc. and Open Text, Inc. v. Sophos Ltd.*, No. 6:22-CV-00240-ADA-DTG (WD, Texas), Sep. 13, 2022, 23 pgs.
Defendant Sophos Ltd.'s Preliminary Invalidity Contentions, Exhibit 844-A-1, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-2, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 844-A-3, *Webroot, Inc. and Open Text, Inc. v. Sophos Ltd.*, CA. No. 6:22-CV-00240-ADA-DTG, W.D. Tex., Sep. 13, 2022, 39 pgs.
Defendant Sophos Ltd.'s Preliminary Invalidity Contentions, Exhibit 844-A-4, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-5, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-6, *Webroot, Inc. and Open Text, Inc. v. Sophos Ltd.*, CA. No. 6:22-CV-00240-ADA-DTG, W.D. Tex., Sep. 13, 2022, 48 pgs.
Defendant Sophos Ltd.'s Preliminary Invalidity Contentions, Exhibit 844-A-7, *Webroot, Inc. and Open Text, Inc. v. Sophos Ltd.*, CA. No. 6:22-CV-00240-ADA-DTG, W.D. Tex., Sep. 13, 2022, 25 pgs.
Defendant Sophos Ltd.'s Preliminary Invalidity Contentions, Exhibit 844-A-8, *Webroot, Inc. and Open Text, Inc. v. Sophos Ltd.*, CA. No. 6:22-CV-00240-ADA-DTG, W.D. Tex., Sep. 13, 2022, 33 pgs.
Defendant Sophos Ltd.'s Preliminary Invalidity Contentions, Exhibit 844-A-9, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-10, *Webroot, Inc. and Open Text, Inc. v. Sophos Ltd.*, CA. No. 6:22-CV-00240-ADA-DTG, W.D. Tex., Sep. 13, 2022, 25 pgs.
Defendant Sophos Ltd.'s Preliminary Invalidity Contentions, Exhibit 844-A-11, *Webroot, Inc. and Open Text, Inc. v. Sophos Ltd.*, CA. No. 6:22-CV-00240-ADA-DTG, W.D. Tex., Sep. 13, 2022, 29 pgs.
Defendant Sophos Ltd.'s Preliminary Invalidity Contentions, Exhibit 844-A-12, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-13, *Webroot, Inc. and Open Text, Inc. v. Sophos Ltd.*, CA. No. 6:22-CV-00240-ADA-DTG, W.D. Tex., Sep. 13, 2022, 34 pgs.
Defendant Sophos Ltd.'s Preliminary Invalidity Contentions, Exhibit 844-A-14, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-15, *Webroot, Inc. and Open Text, Inc. v. Sophos Ltd.*, CA. No. 6:22-CV-00240-ADA-DTG, W.D. Tex., Sep. 13, 2022, 42 pgs.
Defendant Sophos Ltd.'s Preliminary Invalidity Contentions, Exhibit 844-A-16, *Webroot, Inc. and Open Text, Inc. v. Sophos Ltd.*, CA. No. 6:22-CV-00240-ADA-DTG, W.D. Tex., Sep. 13, 2022, 31 pgs.
Defendant Sophos Ltd.'s Preliminary Invalidity Contentions, Exhibit 844-A-17, *Webroot, Inc. and Open Text, Inc. v. Sophos Ltd.*, CA. No. 6:22-CV-00240-ADA-DTG, W.D. Tex., Sep. 13, 2022, 38 pgs.
Defendant Sophos Ltd.'s Preliminary Invalidity Contentions, Exhibit 844-A-18, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-19, *Webroot, Inc. and Open Text, Inc. v. Sophos Ltd.*, CA. No. 6:22-CV-00240-ADA-DTG, W.D. Tex., Sep. 13, 2022, 35 pgs.
Defendant Sophos Ltd.'s Preliminary Invalidity Contentions, Exhibit 844-A-20, *Webroot, Inc. and Open Text, Inc. v. Sophos Ltd.*, CA. No. 6:22-CV-00240-ADA-DTG, W.D. Tex., Sep. 13, 2022, 43 pgs.
Defendant Sophos Ltd.'s Preliminary Invalidity Contentions, Exhibit 844-A-21, *Webroot, Inc. and Open Text, Inc. v. Sophos Ltd.*, CA. No. 6:22-CV-00240-ADA-DTG, W.D. Tex., Sep. 13, 2022, 42 pgs.
Defendant Sophos Ltd.'s Preliminary Invalidity Contentions, Exhibit 844-A-22, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-23, *Webroot, Inc. and Open Text, Inc. v. Sophos Ltd.*, CA. No. 6:22-CV-00240-ADA-DTG, W.D. Tex., Sep. 13, 2022, 48 pgs.
Defendant Sophos Ltd.'s Preliminary Invalidity Contentions, Exhibit 844-A-24, *Webroot, Inc. and Open Text, Inc. v. Sophos Ltd.*, CA. No. 6:22-CV-00240-ADA-DTG, W.D. Tex., Sep. 13, 2022, 36 pgs.
Defendant Sophos Ltd.'s Preliminary Invalidity Contentions, Exhibit 844-A-25, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 844-A-26, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 844-A-27, *Webroot, Inc. and Open Text, Inc. v. Sophos Ltd.*, CA. No. 6:22-CV-00240-ADA-DTG, W.D. Tex., Sep. 13, 2022, 30 pgs.
Defendant Sophos Ltd.'s Preliminary Invalidity Contentions, Exhibit 844-A-28, *Webroot, Inc. and Open Text, Inc. v. Sophos Ltd.*, CA. No. 6:22-CV-00240-ADA-DTG, W.D. Tex., Sep. 13, 2022, 37 pgs.
Defendant Sophos Ltd.'s Preliminary Invalidity Contentions, Exhibit 844-A-29, *Webroot, Inc. and Open Text, Inc. v. Sophos Ltd.*, CA. No. 6:22-CV-00240-ADA-DTG, W.D. Tex., Sep. 13, 2022, 26 pgs.
Defendant Sophos Ltd.'s Preliminary Invalidity Contentions, Exhibit 844-A-30, *Webroot, Inc. and Open Text, Inc. v. Sophos Ltd.*, CA. No. 6:22-CV-00240-ADA-DTG, W.D. Tex., Sep. 13, 2022, 42 pgs.
Defendant Sophos Ltd.'s Preliminary Invalidity Contentions, Exhibit 844-A-31, *Webroot, Inc. and Open Text, Inc. v. Sophos Ltd.*, CA. No. 6:22-CV-00240-ADA-DTG, W.D. Tex., Sep. 13, 2022, 27 pgs.
Defendant Sophos Ltd.'s Preliminary Invalidity Contentions, Exhibit 844-A-32, *Webroot, Inc. and Open Text, Inc. v. Sophos Ltd.*, CA. No. 6:22-CV-00240-ADA-DTG, W.D. Tex., Sep. 13, 2022, 25 pgs.

(56) References Cited

OTHER PUBLICATIONS

Defendant Sophos Ltd.'s Preliminary Invalidity Contentions, Exhibit 844-A-33, *Webroot, Inc. and Open Text, Inc. v. Sophos Ltd.*, CA. No. 6:22-CV-00240-ADA-DTG, W.D. Tex., Sep. 13, 2022, 29 pgs.
Defendant Sophos Ltd.'s Preliminary Invalidity Contentions, Exhibit 844-B, *Webroot, Inc. and Open Text, Inc. v. Sophos Ltd.*, CA. No. 6:22-CV-00240-ADA-DTG, W.D. Tex., Sep. 13, 2022, 36 pgs.
Defendant Sophos Ltd.'s Preliminary Invalidity Contentions, Exhibit 123-A-1, *Webroot, Inc. and Open Text, Inc. v. Sophos Ltd.*, CA. No. 6:22-CV-00240-ADA-DTG, W.D. Tex., Feb. 21, 2023, 48 pgs.
Defendant Sophos Ltd.'s Preliminary Invalidity Contentions, Exhibit 123-A-2, *Webroot, Inc. and Open Text, Inc. v. Sophos Ltd.*, CA. No. 6:22-CV-00240-ADA-DTG, W.D. Tex., Feb. 21, 2023, 57 pgs.
Defendant Sophos Ltd.'s Preliminary Invalidity Contentions, Exhibit 123-A-3, *Webroot, Inc. and Open Text, Inc. v. Sophos Ltd.*, CA. No. 6:22-CV-00240-ADA-DTG, W.D. Tex., Feb. 21, 2023, 83 pgs.
Defendant Sophos Ltd.'s Preliminary Invalidity Contentions, Exhibit 123-A-4, *Webroot, Inc. and Open Text, Inc. v. Sophos Ltd.*, CA. No. 6:22-CV-00240-ADA-DTG, W.D. Tex., Feb. 21, 2023, 45 pgs.
Defendant Sophos Ltd.'s Preliminary Invalidity Contentions, Exhibit 123-A-5, *Webroot, Inc. and Open Text, Inc. v. Sophos Ltd.*, CA. No. 6:22-CV-00240-ADA-DTG, W.D. Tex., Feb. 21, 2023, 57 pgs.
Defendant Sophos Ltd.'s Preliminary Invalidity Contentions, Exhibit 123-A-6, *Webroot, Inc. and Open Text, Inc. v. Sophos Ltd.*, CA. No. 6:22-CV-00240-ADA-DTG, W.D. Tex., Feb. 21, 2023, 41 pgs.
Defendant Sophos Ltd.'s Preliminary Invalidity Contentions, Exhibit 123-A-7, *Webroot, Inc. and Open Text, Inc. v. Sophos Ltd.*, CA. No. 6:22-CV-00240-ADA-DTG, W.D. Tex., Feb. 21, 2023, 51 pgs.
Defendant Sophos Ltd.'s Preliminary Invalidity Contentions, Exhibit 123-B, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-1, *Webroot, Inc. and Open Text, Inc. v. Sophos Ltd.*, CA. No. 6:22-CV-00240-ADA-DTG, W.D. Tex., Feb. 21, 2023, 49 pgs.
Defendant Sophos Ltd.'s Preliminary Invalidity Contentions, Exhibit 869-A-2, *Webroot, Inc. and Open Text, Inc. v. Sophos Ltd.*, CA. No. 6:22-CV-00240-ADA-DTG, W.D. Tex., Feb. 21, 2023, 37 pgs.
Defendant Sophos Ltd.'s Preliminary Invalidity Contentions, Exhibit 869-A-3, *Webroot, Inc. and Open Text, Inc. v. Sophos Ltd.*, CA. No. 6:22-CV-00240-ADA-DTG, W.D. Tex., Feb. 21, 2023, 29 pgs.
Defendant Sophos Ltd.'s Preliminary Invalidity Contentions, Exhibit 869-A-4, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 869-A-5, *Webroot, Inc. and Open Text, Inc. v. Sophos Ltd.*, CA. No. 6:22-CV-00240-ADA-DTG, W.D. Tex., Feb. 21, 2023, 29 pgs.
Defendant Sophos Ltd.'s Preliminary Invalidity Contentions, Exhibit 869-A-6, *Webroot, Inc. and Open Text, Inc. v. Sophos Ltd.*, CA. No. 6:22-CV-00240-ADA-DTG, W.D. Tex., Feb. 21, 2023, 30 pgs.
Defendant Sophos Ltd.'s Preliminary Invalidity Contentions, Exhibit 869-A-7, *Webroot, Inc. and Open Text, Inc. v. Sophos Ltd.*, CA. No. 6:22-CV-00240-ADA-DTG, W.D. Tex., Feb. 21, 2023, 29 pgs.
Defendant Sophos Ltd.'s Preliminary Invalidity Contentions, Exhibit 869-A-8, *Webroot, Inc. and Open Text, Inc. v. Sophos Ltd.*, CA. No. 6:22-CV-00240-ADA-DTG, W.D. Tex., Feb. 21, 2023, 27 pgs.
Defendant Sophos Ltd.'s Preliminary Invalidity Contentions, Exhibit 869-A-9, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-10, *Webroot, Inc. and Open Text, Inc. v. Sophos Ltd.*, CA. No. 6:22-CV-00240-ADA-DTG, W.D. Tex., Feb. 21, 2023, 53 pgs.
Defendant Sophos Ltd.'s Preliminary Invalidity Contentions, Exhibit 869-A-11, *Webroot, Inc. and Open Text, Inc. v. Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 869-A-12, *Webroot, Inc. and Open Text, Inc. v. Sophos Ltd.*, CA. No. 6:22-CV-00240-ADA-DTG, W.D. Tex., Feb. 21, 2023, 32 pgs.
Defendant Sophos Ltd.'s Preliminary Invalidity Contentions, Exhibit 869-A-13, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-14, *Webroot, Inc. and Open Text, Inc. v. Sophos Ltd.*, CA. No. 6:22-CV-00240-ADA-DTG, W.D. Tex., Feb. 21, 2023, 63 pgs.
Defendant Sophos Ltd.'s Preliminary Invalidity Contentions, Exhibit 869-A-15, *Webroot, Inc. and Open Text, Inc. v. Sophos Ltd.*, CA. No. 6:22-CV-00240-ADA-DTG, W.D. Tex., Feb. 21, 2023, 75 pgs.
Defendant Sophos Ltd.'s Preliminary Invalidity Contentions, Exhibit 869-A-16, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-17, *Webroot, Inc. and Open Text, Inc. v. Sophos Ltd.*, CA. No. 6:22-CV-00240-ADA-DTG, W.D. Tex., Feb. 21, 2023, 54 pgs.
Defendant Sophos Ltd.'s Preliminary Invalidity Contentions, Exhibit 869-A-18, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 869-A-19, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-20, *Webroot, Inc. and Open Text, Inc. v. Sophos Ltd.*, CA. No. 6:22-CV-00240-ADA-DTG, W.D. Tex., Feb. 21, 2023, 44 pgs.
Defendant Sophos Ltd.'s Preliminary Invalidity Contentions, Exhibit 869-A-21, *Webroot, Inc. and Open Text, Inc. v. Sophos Ltd.*, CA. No. 6:22-CV-00240-ADA-DTG, W.D. Tex., Feb. 21, 2023, 34 pgs.
Defendant Sophos Ltd.'s Preliminary Invalidity Contentions, Exhibit 869-A-22, *Webroot, Inc. and Open Text, Inc. v. Sophos Ltd.*, CA. No. 6:22-CV-00240-ADA-DTG, W.D. Tex., Feb. 21, 2023, 65 pgs.
Defendant Sophos Ltd.'s Preliminary Invalidity Contentions, Exhibit 869-A-23, *Webroot, Inc. and Open Text, Inc. v. Sophos Ltd.*, CA. No. 6:22-CV-00240-ADA-DTG, W.D. Tex., Feb. 21, 2023, 45 pgs.
Defendant Sophos Ltd.'s Preliminary Invalidity Contentions, Exhibit 869-A-24, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-25, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-26, *Webroot, Inc. and Open Text, Inc. v. Sophos Ltd.*, CA. No. 6:22-CV-00240-ADA-DTG, W.D. Tex., Feb. 21, 2023, 40 pgs.
Defendant Sophos Ltd.'s Preliminary Invalidity Contentions, Exhibit 869-A-27, *Webroot, Inc. and Open Text, Inc. v. Sophos Ltd.*, CA. No. 6:22-CV-00240-ADA-DTG, W.D. Tex., Feb. 21, 2023, 39 pgs.
Defendant Sophos Ltd.'s Preliminary Invalidity Contentions, Exhibit 869-A-28, *Webroot, Inc. and Open Text, Inc. v. Sophos Ltd.*, CA. No. 6:22-CV-00240-ADA-DTG, W.D. Tex., Feb. 21, 2023, 33 pgs.
Defendant Sophos Ltd.'s Preliminary Invalidity Contentions, Exhibit 869-A-29, *Webroot, Inc. and Open Text, Inc. v. Sophos Ltd.*, CA. No. 6:22-CV-00240-ADA-DTG, W.D. Tex., Feb. 21, 2023, 43 pgs.
Defendant Sophos Ltd.'s Preliminary Invalidity Contentions, Exhibit 869-A-30, *Webroot, Inc. and Open Text, Inc. v. Sophos Ltd.*, CA. No. 6:22-CV-00240-ADA-DTG, W.D. Tex., Feb. 21, 2023, 48 pgs.
Defendant Sophos Ltd.'s Preliminary Invalidity Contentions, Exhibit 869-A-31, *Webroot, Inc. and Open Text, Inc. v. Sophos Ltd.*, CA. No. 6:22-CV-00240-ADA-DTG, W.D. Tex., Feb. 21, 2023, 37 pgs.
Defendant Sophos Ltd.'s Preliminary Invalidity Contentions, Exhibit 869-A-32, *Webroot, Inc. and Open Text, Inc. v. Sophos Ltd.*, CA. No. 6:22-CV-00240-ADA-DTG, W.D. Tex., Feb. 21, 2023, 31 pgs.
Defendant Sophos Ltd.'s Preliminary Invalidity Contentions, Exhibit 869-A-33, *Webroot, Inc. and Open Text, Inc. v. Sophos Ltd.*, CA. No. 6:22-CV-00240-ADA-DTG, W.D. Tex., Feb. 21, 2023, 35 pgs.
Defendant Sophos Ltd.'s Preliminary Invalidity Contentions, Exhibit 869-A-34, *Webroot, Inc. and Open Text, Inc. v. Sophos Ltd.*, CA. No. 6:22-CV-00240-ADA-DTG, W.D. Tex., Feb. 21, 2023, 58 pgs.
Defendant Sophos Ltd.'s Preliminary Invalidity Contentions, Exhibit 869-A-35, *Webroot, Inc. and Open Text, Inc. v. Sophos Ltd.*, CA. No. 6:22-CV-00240-ADA-DTG, W.D. Tex., Feb. 21, 2023, 36 pgs.
Defendant Sophos Ltd.'s Preliminary Invalidity Contentions, Exhibit 869-A-36, *Webroot, Inc. and Open Text, Inc. v. Sophos Ltd.*, CA. No. 6:22-CV-00240-ADA-DTG, W.D. Tex., Feb. 21, 2023, 37 pgs.
Defendant Sophos Ltd.'s Preliminary Invalidity Contentions, Exhibit 869-B, *Webroot, Inc. and Open Text, Inc. v. Sophos Ltd.*, CA. No. 6:22-CV-00240-ADA-DTG, W.D. Tex., Feb. 21, 2023, 75 pgs.

(56) References Cited

OTHER PUBLICATIONS

Defendant's Preliminary Invalidity Contentions Exhibit 250-A-1, *Webroot, Inc. and Open Text, Inc. v. Trend Micro Inc.*, No. 6:22-CV-00239-ADA-DTG (WD, Texas), Sep. 13, 2022, 89 pgs.
Defendant's Preliminary Invalidity Contentions Exhibit 250-A-2, *Webroot, Inc. and Open Text, Inc. v. Trend Micro Inc.*, No. 6:22-CV-00239-ADA-DTG (WD, Texas), Sep. 13, 2022, 64 pgs.
Defendant's Preliminary Invalidity Contentions Exhibit 250-A-3, *Webroot, Inc. and Open Text, Inc. v. Trend Micro Inc.*, No. 6:22-CV-00239-ADA-DTG (WD, Texas), Sep. 13, 2022, 104 pgs.
Defendant's Preliminary Invalidity Contentions Exhibit 250-A-4, *Webroot, Inc. and Open Text, Inc. v. Trend Micro Inc.*, No. 6:22-CV-00239-ADA-DTG (WD, Texas), Sep. 13, 2022, 54 pgs.
Defendant's Preliminary Invalidity Contentions Exhibit 250-A-5, *Webroot, Inc. and Open Text, Inc. v. Trend Micro Inc.*, No. 6:22-CV-00239-ADA-DTG (WD, Texas), Sep. 13, 2022, 45 pgs.
Defendant's Preliminary Invalidity Contentions Exhibit 250-A-6, *Webroot, Inc. and Open Text, Inc. v. Trend Micro Inc.*, No. 6:22-CV-00239-ADA-DTG (WD, Texas), Sep. 13, 2022, 36 pgs.
Defendant's Preliminary Invalidity Contentions Exhibit 250-A-7, *Webroot, Inc. and Open Text, Inc. v. Trend Micro Inc.*, No. 6:22-CV-00239-ADA-DTG (WD, Texas), Sep. 13, 2022, 42 pgs.
Defendant's Preliminary Invalidity Contentions Exhibit 250-A-8, *Webroot, Inc. and Open Text, Inc. v. Trend Micro Inc.*, No. 6:22-CV-00239-ADA-DTG (WD, Texas), Sep. 13, 2022, 105 pgs.
Defendant's Preliminary Invalidity Contentions Exhibit 250-A-9, *Webroot, Inc. and Open Text, Inc. v. Trend Micro Inc.*, No. 6:22-CV-00239-ADA-DTG (WD, Texas), Sep. 13, 2022, 44 pgs.
Defendant's Preliminary Invalidity Contentions Exhibit 250-A-10, *Webroot, Inc. and Open Text, Inc. v. Trend Micro Inc.*, No. 6:22-CV-00239-ADA-DTG (WD, Texas), Sep. 13, 2022, 46 pgs.
Defendant's Preliminary Invalidity Contentions Exhibit 250-A-11, *Webroot, Inc. and Open Text, Inc. v. Trend Micro Inc.*, No. 6:22-CV-00239-ADA-DTG (WD, Texas), Sep. 13, 2022, 45 pgs.
Defendant's Preliminary Invalidity Contentions Exhibit 250-A-12, *Webroot, Inc. and Open Text, Inc. v. Trend Micro Inc.*, No. 6:22-CV-00239-ADA-DTG (WD, Texas), Sep. 13, 2022, 166 pgs.
Defendant's Preliminary Invalidity Contentions Exhibit 250-A-13, *Webroot, Inc. and Open Text, Inc. v. Trend Micro Inc.*, No. 6:22-CV-00239-ADA-DTG (WD, Texas), Sep. 13, 2022, 169 pgs.
Defendant's Preliminary Invalidity Contentions Exhibit 250-A-14, *Webroot, Inc. and Open Text, Inc. v. Trend Micro Inc.*, No. 6:22-CV-00239-ADA-DTG (WD, Texas), Sep. 13, 2022, 51 pgs.
Defendant's Preliminary Invalidity Contentions Exhibit 250-A-15, *Webroot, Inc. and Open Text, Inc. v. Trend Micro Inc.*, No. 6:22-CV-00239-ADA-DTG (Wd, Texas), Sep. 13, 2022, 44 pgs.
Defendant's Preliminary Invalidity Contentions Exhibit 250-A-16, *Webroot, Inc. and Open Text, Inc. v. Trend Micro Inc.*, No. 6:22-CV-00239-ADA-DTG (WD, Texas), Sep. 13, 2022, 34 pgs.
Defendant's Preliminary Invalidity Contentions Exhibit 250-A-17, *Webroot, Inc. and Open Text, Inc. v. Trend Micro Inc.*, No. 6:22-CV-00239-ADA-DTG (WD, Texas), Sep. 13, 2022, 31 pgs.
Defendant's Preliminary Invalidity Contentions Exhibit 250-A-18, *Webroot, Inc. and Open Text, Inc. v. Trend Micro Inc.*, No. 6:22-CV-00239-ADA-DTG (WD, Texas), Sep. 13, 2022, 32 pgs.
Defendant's Preliminary Invalidity Contentions Exhibit 250-A-19, *Webroot, Inc. and Open Text, Inc. v. Trend Micro Inc.*, No. 6:22-CV-00239-ADA-DTG (WD, Texas), Sep. 13, 2022, 42 pgs.
Defendant's Preliminary Invalidity Contentions Exhibit 250-A-20, *Webroot, Inc. and Open Text, Inc. v. Trend Micro Inc.*, No. 6:22-CV-00239-ADA-DTG (WD, Texas), Sep. 13, 2022, 42 pgs.
Defendant's Preliminary Invalidity Contentions Exhibit 250-A-21, *Webroot, Inc. and Open Text, Inc. v. Trend Micro Inc.*, No. 6:22-CV-00239-ADA-DTG (WD, Texas), Sep. 13, 2022, 192 pgs.
Defendant's Preliminary Invalidity Contentions Exhibit 250-A-22, *Webroot, Inc. and Open Text, Inc. v. Trend Micro Inc.*, No. 6:22-CV-00239-ADA-DTG (WD, Texas), Sep. 13, 2022, 127 pgs.
Defendant's Preliminary Invalidity Contentions Exhibit 250-A-23, *Webroot, Inc. and Open Text, Inc. v. Trend Micro Inc.*, No. 6:22-CV-00239-ADA-DTG (WD, Texas), Sep. 13, 2022, 120 pgs.
Defendant's Preliminary Invalidity Contentions Exhibit 250-A-24, *Webroot, Inc. and Open Text, Inc. v. Trend Micro Inc.*, No. 6:22-CV-00239-ADA-DTG (WD, Texas), Sep. 13, 2022, 113 pgs.
Defendant's Preliminary Invalidity Contentions Exhibit 250-A-25, *Webroot, Inc. and Open Text, Inc. v. Trend Micro Inc.*, No. 6:22-CV-00239-ADA-DTG (WD, Texas), Sep. 13, 2022, 71 pgs.
Defendant's Preliminary Invalidity Contentions Exhibit 250-A-26, *Webroot, Inc. and Open Text, Inc. v. Trend Micro Inc.*, No. 6:22-CV-00239-ADA-DTG (WD, Texas), Sep. 13, 2022, 77 pgs.
Defendant's Preliminary Invalidity Contentions Exhibit 250-A-27, *Webroot, Inc. and Open Text, Inc. v. Trend Micro Inc.*, No. 6:22-CV-00239-ADA-DTG (WD, Texas), Sep. 13, 2022, 32 pgs.
Defendant's Preliminary Invalidity Contentions Exhibit 250-A-28, *Webroot, Inc. and Open Text, Inc. v. Trend Micro Inc.*, No. 6:22-CV-00239-ADA-DTG (WD, Texas), Sep. 13, 2022, 77 pgs.
Defendant's Preliminary Invalidity Contentions Exhibit 250-A-29, *Webroot, Inc. and Open Text, Inc. v. Trend Micro Inc.*, No. 6:22-CV-00239-ADA-DTG (WD, Texas), Sep. 13, 2022, 45 pgs.
Defendant's Preliminary Invalidity Contentions Exhibit 250-A-30, *Webroot, Inc. and Open Text, Inc. v. Trend Micro Inc.*, No. 6:22-CV-00239-ADA-DTG (WD, Texas), Sep. 13, 2022, 31 pgs.
Defendant's Preliminary Invalidity Contentions Exhibit 250-A-31, *Webroot, Inc. and Open Text, Inc. v. Trend Micro Inc.*, No. 6:22-CV-00239-ADA-DTG (WD, Texas), Sep. 13, 2022, 29 pgs.
Defendant's Preliminary Invalidity Contentions Exhibit 250-A-32, *Webroot, Inc. and Open Text, Inc. v. Trend Micro Inc.*, No. 6:22-CV-00239-ADA-DTG (WD, Texas), Sep. 13, 2022, 34 pgs.
Defendant's Preliminary Invalidity Contentions Exhibit 250-A-33, *Webroot, Inc. and Open Text, Inc. v. Trend Micro Inc.*, No. 6:22-CV-00239-ADA-DTG (WD, Texas), Sep. 13, 2022, 41 pgs.
Defendant's Preliminary Invalidity Contentions Exhibit 250-A-34, *Webroot, Inc. and Open Text, Inc. v. Trend Micro Inc.*, No. 6:22-CV-00239-ADA-DTG (WD, Texas), Sep. 13, 2022, 59 pgs.
Defendant's Preliminary Invalidity Contentions Exhibit 250-A-35, *Webroot, Inc. and Open Text, Inc. v. Trend Micro Inc.*, No. 6:22-CV-00239-ADA-DTG (WD, Texas), Sep. 13, 2022, 42 pgs.
Defendant's Preliminary Invalidity Contentions Exhibit 250-A-36, *Webroot, Inc. and Open Text, Inc. v. Trend Micro Inc.*, No. 6:22-CV-00239-ADA-DTG (WD, Texas), Sep. 13, 2022, 29 pgs.
Defendant's Preliminary Invalidity Contentions Exhibit 250-B, *Webroot, Inc. and Open Text, Inc. v. Trend Micro Inc.*, No. 6:22-CV-00239-ADA-DTG (WD, Texas), Sep. 13, 2022, 91 pgs.
Defendant's Preliminary Invalidity Contentions, Exhibit 389-A-1, *Webroot, Inc. and Open Text, Inc. v. Trend Micro Inc.*, No. 6:22-CV-00239-ADA-DTG (WD, Texas), Sep. 13, 2022, 83 pgs.
Defendant's Preliminary Invalidity Contentions, Exhibit 389-A-2, *Webroot, Inc. and Open Text, Inc. v. Trend Micro Inc.*, No. 6:22-CV-00239-ADA-DTG (WD, Texas), Sep. 13, 2022, 59 pgs.
Defendant's Preliminary Invalidity Contentions, Exhibit 389-A-3, *Webroot, Inc. and Open Text, Inc. v. Trend Micro Inc.*, No. 6:22-CV-00239-ADA-DTG (WD, Texas), Sep. 13, 2022, 120 pgs.
Defendant's Preliminary Invalidity Contentions, Exhibit 389-A-4, *Webroot, Inc. and Open Text, Inc. v. Trend Micro Inc.*, No. 6:22-CV-00239-ADA-DTG (WD, Texas), Sep. 13, 2022, 45 pgs.
Defendant's Preliminary Invalidity Contentions, Exhibit 389-A-5, *Webroot, Inc. and Open Text, Inc. v. Trend Micro Inc.*, No. 6:22-CV-00239-ADA-DTG (WD, Texas), Sep. 13, 2022, 40 pgs.
Defendant's Preliminary Invalidity Contentions, Exhibit 389-A-6, *Webroot, Inc. and Open Text, Inc. v. Trend Micro Inc.*, No. 6:22-CV-00239-ADA-DTG (WD, Texas), Sep. 13, 2022, 32 pgs.
Defendant's Preliminary Invalidity Contentions, Exhibit 389-A-7, *Webroot, Inc. and Open Text, Inc. v. Trend Micro Inc.*, No. 6:22-CV-00239-ADA-DTG (WD, Texas), Sep. 13, 2022, 37 pgs.
Defendant's Preliminary Invalidity Contentions, Exhibit 389-A-8, *Webroot, Inc. and Open Text, Inc. v. Trend Micro Inc.*, No. 6:22-CV-00239-ADA-DTG (WD, Texas), Sep. 13, 2022, 106 pgs.
Defendant's Preliminary Invalidity Contentions, Exhibit 389-A-9, *Webroot, Inc. and Open Text, Inc. v. Trend Micro Inc.*, No. 6:22-CV-00239-ADA-DTG (WD, Texas), Sep. 13, 2022, 40 pgs.
Defendant's Preliminary Invalidity Contentions, Exhibit 389-A-10, *Webroot, Inc. and Open Text, Inc. v. Trend Micro Inc.*, No. 6:22-CV-00239-ADA-DTG (WD, Texas), Sep. 13, 2022, 43 pgs.

(56) References Cited

OTHER PUBLICATIONS

Defendant's Preliminary Invalidity Contentions, Exhibit 389-A-11, *Webroot, Inc. and Open Text, Inc. v. Trend Micro Inc.*, No. 6:22-CV-00239-ADA-DTG (WD, Texas), Sep. 13, 2022, 43 pgs.
Defendant's Preliminary Invalidity Contentions, Exhibit 389-A-12, *Webroot, Inc. and Open Text, Inc. v. Trend Micro Inc.*, No. 6:22-CV-00239-ADA-DTG (WD, Texas), Sep. 13, 2022, 179 pgs.
Defendant's Preliminary Invalidity Contentions, Exhibit 389-A-13, *Webroot, Inc. and Open Text, Inc. v. Trend Micro Inc.*, No. 6:22-CV-00239-ADA-DTG (WD, Texas), Sep. 13, 2022, 192 pgs.
Defendant's Preliminary Invalidity Contentions, Exhibit 389-A-14, *Webroot, Inc. and Open Text, Inc. v. Trend Micro Inc.*, No. 6:22-CV-00239-ADA-DTG (WD, Texas), Sep. 13, 2022, 46 pgs.
Defendant's Preliminary Invalidity Contentions, Exhibit 389-A-15, *Webroot, Inc. and Open Text, Inc. v. Trend Micro Inc.*, No. 6:22-CV-00239-ADA-DTG (WD, Texas), Sep. 13, 2022, 41 pgs.
Defendant's Preliminary Invalidity Contentions, Exhibit 389-A-16, *Webroot, Inc. and Open Text, Inc. v. Trend Micro Inc.*, No. 6:22-CV-00239-ADA-DTG (WD, Texas), Sep. 13, 2022, 37 pgs.
Defendant's Preliminary Invalidity Contentions, Exhibit 389-A-17, *Webroot, Inc. and Open Text, Inc. v. Trend Micro Inc.*, No. 6:22-CV-00239-ADA-DTG (WD, Texas), Sep. 13, 2022, 24 pgs.
Defendant's Preliminary Invalidity Contentions, Exhibit 389-A-18, *Webroot, Inc. and Open Text, Inc. v. Trend Micro Inc.*, No. 6:22-CV-00239-ADA-DTG (WD, Texas), Sep. 13, 2022, 26 pgs.
Defendant's Preliminary Invalidity Contentions, Exhibit 389-A-19, *Webroot, Inc. and Open Text, Inc. v. Trend Micro Inc.*, No. 6:22-CV-00239-ADA-DTG (WD, Texas), Sep. 13, 2022, 38 pgs.
Defendant's Preliminary Invalidity Contentions, Exhibit 389-A-20, *Webroot, Inc. and Open Text, Inc. v. Trend Micro Inc.*, No. 6:22-CV-00239-ADA-DTG (WD, Texas), Sep. 13, 2022, 37 pgs.
Defendant's Preliminary Invalidity Contentions, Exhibit 389-A-21, *Webroot, Inc. and Open Text, Inc. v. Trend Micro Inc.*, No. 6:22-CV-00239-ADA-DTG (WD, Texas), Sep. 13, 2022, 206 pgs.
Defendant's Preliminary Invalidity Contentions, Exhibit 389-A-22, *Webroot, Inc. and Open Text, Inc. v. Trend Micro Inc.*, No. 6:22-CV-00239-ADA-DTG (WD, Texas), Sep. 13, 2022, 138 pgs.
Defendant's Preliminary Invalidity Contentions, Exhibit 389-A-23, *Webroot, Inc. and Open Text, Inc. v. Trend Micro Inc.*, No. 6:22-CV-00239-ADA-DTG (WD, Texas), Sep. 13, 2022, 149 pgs.
Defendant's Preliminary Invalidity Contentions, Exhibit 389-A-24, *Webroot, Inc. and Open Text, Inc. v. Trend Micro Inc.*, No. 6:22-CV-00239-ADA-DTG (WD, Texas), Sep. 13, 2022, 152 pgs.
Defendant's Preliminary Invalidity Contentions, Exhibit 389-A-25, *Webroot, Inc. and Open Text, Inc. v. Trend Micro Inc.*, No. 6:22-CV-00239-ADA-DTG (WD, Texas), Sep. 13, 2022, 73 pgs.
Defendant's Preliminary Invalidity Contentions, Exhibit 389-A-26, *Webroot, Inc. and Open Text, Inc. v. Trend Micro Inc.*, No. 6:22-CV-00239-ADA-DTG (WD, Texas), Sep. 13, 2022, 91 pgs.
Defendant's Preliminary Invalidity Contentions, Exhibit 389-A-27, *Webroot, Inc. and Open Text, Inc. v. Trend Micro Inc.*, No. 6:22-CV-00239-ADA-DTG (WD, Texas), Sep. 13, 2022, 34 pgs.
Defendant's Preliminary Invalidity Contentions, Exhibit 389-A-28, *Webroot, Inc. and Open Text, Inc. v. Trend Micro Inc.*, No. 6:22-CV-00239-ADA-DTG (WD, Texas), Sep. 13, 2022, 102 pgs.
Defendant's Preliminary Invalidity Contentions, Exhibit 389-A-29, *Webroot, Inc. and Open Text, Inc. v. Trend Micro Inc.*, No. 6:22-CV-00239-ADA-DTG (WD, Texas), Sep. 13, 2022, 30 pgs.
Defendant's Preliminary Invalidity Contentions, Exhibit 389-A-30, *Webroot, Inc. and Open Text, Inc. v. Trend Micro Inc.*, No. 6:22-CV-00239-ADA-DTG (WD, Texas), Sep. 13, 2022, 21 pgs.
Defendant's Preliminary Invalidity Contentions, Exhibit 389-A-31, *Webroot, Inc. and Open Text, Inc. v. Trend Micro Inc.*, No. 6:22-CV-00239-ADA-DTG (WD, Texas), Sep. 13, 2022, 28 pgs.
Defendant's Preliminary Invalidity Contentions, Exhibit 389-A-32, *Webroot, Inc. and Open Text, Inc. v. Trend Micro Inc.*, No. 6:22-CV-00239-ADA-DTG (WD, Texas), Sep. 13, 2022, 48 pgs.
Defendant's Preliminary Invalidity Contentions, Exhibit 389-A-33, *Webroot, Inc. and Open Text, Inc. v. Trend Micro Inc.*, No. 6:22-CV-00239-ADA-DTG (WD, Texas), Sep. 13, 2022, 54 pgs.
Defendant's Preliminary Invalidity Contentions, Exhibit 389-A-34, *Webroot, Inc. and Open Text, Inc. v. Trend Micro Inc.*, No. 6:22-CV-00239-ADA-DTG (WD, Texas), Sep. 13, 2022, 78 pgs.
Defendant's Preliminary Invalidity Contentions, Exhibit 389-A-35, *Webroot, Inc. and Open Text, Inc. v. Trend Micro Inc.*, No. 6:22-CV-00239-ADA-DTG (WD, Texas), Sep. 13, 2022, 39 pgs.
Defendant's Preliminary Invalidity Contentions, Exhibit 389-A-36, *Webroot, Inc. and Open Text, Inc. v. Trend Micro Inc.*, No. 6:22-CV-00239-ADA-DTG (WD, Texas), Sep. 13, 2022, 21 pgs.
Defendant's Preliminary Invalidity Contentions, Exhibit 389-A-37, *Webroot, Inc. and Open Text, Inc. v. Trend Micro Inc.*, No. 6:22-CV-00239-ADA-DTG (WD, Texas), Sep. 13, 2022, 26 pgs.
Defendant's Preliminary Invalidity Contentions, Exhibit 389-B, *Webroot, Inc. and Open Text, Inc. v. Trend Micro Inc.*, No. 6:22-CV-00239-ADA-DTG (WD, Texas), Sep. 13, 2022, 92 pgs.
Defendant's Preliminary Invalidity Contentions, Exhibit 844-A-1, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 844-A-2, *Webroot, Inc. and Open Text, Inc. v. Trend Micro Inc.*, No. 6:22-CV-00239-ADA-DTG, W.D. Tex., Sep. 13, 2022, 30 pgs.
Defendant's Preliminary Invalidity Contentions, Exhibit 844-A-3, *Webroot, Inc. and Open Text, Inc. v. Trend Micro Inc.*, No. 6:22-CV-00239-ADA-DTG, W.D. Tex., Sep. 13, 2022, 27 pgs.
Defendant's Preliminary Invalidity Contentions, Exhibit 844-A-4, *Webroot, Inc. and Open Text, Inc. v. Trend Micro Inc.*, No. 6:22-CV-00239-ADA-DTG, W.D. Tex., Sep. 13, 2022, 31 pgs.
Defendant's Preliminary Invalidity Contentions, Exhibit 844-A-5, *Webroot, Inc. and Open Text, Inc. v. Trend Micro Inc.*, No. 6:22-CV-00239-ADA-DTG, W.D. Tex., Sep. 13, 2022, 34 pgs.
Defendant's Preliminary Invalidity Contentions, Exhibit 844-A-6, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 844-A-7, *Webroot, Inc. and Open Text, Inc. v. Trend Micro Inc.*, No. 6:22-CV-00239-ADA-DTG, W.D. Tex., Sep. 13, 2022, 45 pgs.
Defendant's Preliminary Invalidity Contentions, Exhibit 844-A-8, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 844-A-9, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 844-A-10, *Webroot, Inc. and Open Text, Inc. v. Trend Micro Inc.*, No. 6:22-CV-00239-ADA-DTG, W.D. Tex., Sep. 13, 2022, 35 pgs.
Defendant's Preliminary Invalidity Contentions, Exhibit 844-A-11, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 844-A-12, *Webroot, Inc. and Open Text, Inc. v. Trend Micro Inc.*, No. 6:22-CV-00239-ADA-DTG, W.D. Tex., Sep. 13, 2022, 40 pgs.
Defendant's Preliminary Invalidity Contentions, Exhibit 844-A-13, *Webroot, Inc. and Open Text, Inc. v. Trend Micro Inc.*, No. 6:22-CV-00239-ADA-DTG, W.D. Tex., Sep. 13, 2022, 38 pgs.
Defendant's Preliminary Invalidity Contentions, Exhibit 844-A-14, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 844-A-15, *Webroot, Inc. and Open Text, Inc. v. Trend Micro Inc.*, No. 6:22-CV-00239-ADA-DTG, W.D. Tex., Sep. 13, 2022, 31 pgs.
Defendant's Preliminary Invalidity Contentions, Exhibit 844-A-16, *Webroot, Inc. and Open Text, Inc. v. Trend Micro Inc.*, No. 6:22-CV-00239-ADA-DTG, W.D. Tex., Sep. 13, 2022, 40 pgs.
Defendant's Preliminary Invalidity Contentions, Exhibit 844-A-17, *Webroot, Inc. and Open Text, Inc. v. Trend Micro Inc.*, No. 6:22-CV-00239-ADA-DTG, W.D. Tex., Sep. 13, 2022, 43 pgs.
Defendant's Preliminary Invalidity Contentions, Exhibit 844-A-18, *Webroot, Inc. and Open Text, Inc. v. Trend Micro Inc.*, No. 6:22-CV-00239-ADA-DTG, W.D. Tex., Sep. 13, 2022, 44 pgs.
Defendant's Preliminary Invalidity Contentions, Exhibit 844-A-19, *Webroot, Inc. and Open Text, Inc. v. Trend Micro Inc.*, No. 6:22-CV-00239-ADA-DTG, W.D. Tex., Sep. 13, 2022, 40 pgs.

(56) References Cited

OTHER PUBLICATIONS

Defendant's Preliminary Invalidity Contentions, Exhibit 844-A-20, *Webroot, Inc. and Open Text, Inc. v. Trend Micro Inc.*, No. 6:22-CV-00239-ADA-DTG, W.D. Tex., Sep. 13, 2022, 32 pgs.
Defendant's Preliminary Invalidity Contentions, Exhibit 844-A-21, *Webroot, Inc. and Open Text, Inc. v. Trend Micro Inc.*, No. 6:22-CV-00239-ADA-DTG, W.D. Tex., Sep. 13, 2022, 26 pgs.
Defendant's Preliminary Invalidity Contentions, Exhibit 844-A-22, *Webroot, Inc. and Open Text, Inc. v. Trend Micro Inc.*, No. 6:22-CV-00239-ADA-DTG, W.D. Tex., Sep. 13, 2022, 39 pgs.
Defendant's Preliminary Invalidity Contentions, Exhibit 844-A-23, *Webroot, Inc. and Open Text, Inc. v. Trend Micro Inc.*, No. 6:22-CV-00239-ADA-DTG, W.D. Tex., Sep. 13, 2022, 30 pgs.
Defendant's Preliminary Invalidity Contentions, Exhibit 844-A-24, *Webroot, Inc. and Open Text, Inc. v. Trend Micro Inc.*, No. 6:22-CV-00239-ADA-DTG, W.D. Tex., Sep. 13, 2022, 31 pgs.
Defendant's Preliminary Invalidity Contentions, Exhibit 844-A-25, *Webroot, Inc. and Open Text, Inc. v. Trend Micro Inc.*, No. 6:22-CV-00239-ADA-DTG, W.D. Tex., Sep. 13, 2022, 36 pgs.
Defendant's Preliminary Invalidity Contentions, Exhibit 844-A-26, *Webroot, Inc. and Open Text, Inc. v. Trend Micro Inc.*, No. 6:22-CV-00239-ADA-DTG, W.D. Tex., Sep. 13, 2022, 35 pgs.
Defendant's Preliminary Invalidity Contentions, Exhibit 844-A-27, *Webroot, Inc. and Open Text, Inc. v. Trend Micro Inc.*, No. 6:22-CV-00239-ADA-DTG, W.D. Tex., Sep. 13, 2022, 37 pgs.
Defendant's Preliminary Invalidity Contentions, Exhibit 844-A-28, *Webroot, Inc. and Open Text, Inc. v. Trend Micro Inc.*, No. 6:22-CV-00239-ADA-DTG, W.D. Tex., Sep. 13, 2022, 32 pgs.
Defendant's Preliminary Invalidity Contentions, Exhibit 844-A-29, *Webroot, Inc. and Open Text, Inc. v. Trend Micro Inc.*, No. 6:22-CV-00239-ADA-DTG, W.D. Tex., Sep. 13, 2022, 31 pgs.
Defendant's Preliminary Invalidity Contentions, Exhibit 844-A-30, *Webroot, Inc. and Open Text, Inc. v. Trend Micro Inc.*, No. 6:22-CV-00239-ADA-DTG, W.D. Tex., Sep. 13, 2022, 93 pgs.
Defendant's Preliminary Invalidity Contentions, Exhibit 844-A-31, *Webroot, Inc. and Open Text, Inc. v. Trend Micro Inc.*, No. 6:22-CV-00239-ADA-DTG, W.D. Tex., Sep. 13, 2022, 39 pgs.
Defendant's Preliminary Invalidity Contentions, Exhibit 844-A-32, *Webroot, Inc. and Open Text, Inc. v. Trend Micro Inc.*, No. 6:22-CV-00239-ADA-DTG, W.D. Tex., Sep. 13, 2022, 93 pgs.
Defendant's Preliminary Invalidity Contentions, Exhibit 844-A-33, *Webroot, Inc. and Open Text, Inc. v. Trend Micro Inc.*, No. 6:22-CV-00239-ADA-DTG, W.D. Tex., Sep. 13, 2022, 54 pgs.
Defendant's Preliminary Invalidity Contentions, Exhibit 844-A-34, *Webroot, Inc. and Open Text, Inc. v. Trend Micro Inc.*, No. 6:22-CV-00239-ADA-DTG, W.D. Tex., Sep. 13, 2022, 68 pgs.
Defendant's Preliminary Invalidity Contentions, Exhibit 844-A-35, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 844-A-36, *Webroot, Inc. and Open Text, Inc. v. Trend Micro Inc.*, No. 6:22-CV-00239-ADA-DTG, W.D. Tex., Sep. 13, 2022, 53 pgs.
Defendant's Preliminary Invalidity Contentions, Exhibit 844-A-37, *Webroot, Inc. and Open Text, Inc. v. Trend Micro Inc.*, No. 6:22-CV-00239-ADA-DTG, W.D. Tex., Sep. 13, 2022, 42 pgs.
Defendant's Preliminary Invalidity Contentions, Exhibit 844-A-38, *Webroot, Inc. and Open Text, Inc. v. Trend Micro Inc.*, No. 6:22-CV-00239-ADA-DTG, W.D. Tex., Sep. 13, 2022, 68 pgs.
Defendant's Preliminary Invalidity Contentions, Exhibit 844-A-39, *Webroot, Inc. and Open Text, Inc. v. Trend Micro Inc.*, No. 6:22-CV-00239-ADA-DTG, W.D. Tex., Sep. 13, 2022, 54 pgs.
Defendant's Preliminary Invalidity Contentions, Exhibit 844-A-40, *Webroot, Inc. and Open Text, Inc. v. Trend Micro Inc.*, No. 6:22-CV-00239-ADA-DTG, W.D. Tex., Sep. 13, 2022, 69 pgs.
Defendant's Preliminary Invalidity Contentions, Exhibit 844-A-41, *Webroot, Inc. and Open Text, Inc. v. Trend Micro Inc.*, No. 6:22-CV-00239-ADA-DTG, W.D. Tex., Sep. 13, 2022, 68 pgs.
Defendant's Preliminary Invalidity Contentions, Exhibit 844-A-42, *Webroot, Inc. and Open Text, Inc. v. Trend Micro Inc.*, No. 6:22-CV-00239-ADA-DTG, W.D. Tex., Sep. 13, 2022, 40 pgs.
Defendant's Preliminary Invalidity Contentions, Exhibit 844-A-43, *Webroot, Inc. and Open Text, Inc. v. Trend Micro Inc.*, No. 6:22-CV-00239-ADA-DTG, W.D. Tex., Sep. 13, 2022, 56 pgs.
Defendant's Preliminary Invalidity Contentions, Exhibit 844-A-44, *Webroot, Inc. and Open Text, Inc. v. Trend Micro Inc.*, No. 6:22-CV-00239-ADA-DTG, W.D. Tex., Sep. 13, 2022, 67 pgs.
Defendant's Preliminary Invalidity Contentions, Exhibit 844-A-45, *Webroot, Inc. and Open Text, Inc. v. Trend Micro Inc.*, No. 6:22-CV-00239-ADA-DTG, W.D. Tex., Sep. 13, 2022, 66 pgs.
Defendant's Preliminary Invalidity Contentions, Exhibit 844-A-46, *Webroot, Inc. and Open Text, Inc. v. Trend Micro Inc.*, No. 6:22-CV-00239-ADA-DTG, W.D. Tex., Sep. 13, 2022, 81 pgs.
Defendant's Preliminary Invalidity Contentions, Exhibit 844-A-47, *Webroot, Inc. and Open Text, Inc. v. Trend Micro Inc.*, No. 6:22-CV-00239-ADA-DTG, W.D. Tex., Sep. 13, 2022, 24 pgs.
Defendant's Preliminary Invalidity Contentions, Exhibit 844-A-48, *Webroot, Inc. and Open Text, Inc. v. Trend Micro Inc.*, No. 6:22-CV-00239-ADA-DTG, W.D. Tex., Sep. 13, 2022, 78 pgs.
Defendant's Preliminary Invalidity Contentions, Exhibit 844-A-49, *Webroot, Inc. and Open Text, Inc. v. Trend Micro Inc.*, No. 6:22-CV-00239-ADA-DTG, W.D. Tex., Sep. 13, 2022, 79 pgs.
Defendant's Preliminary Invalidity Contentions, Exhibit 844-A-50, *Webroot, Inc. and Open Text, Inc. v. Trend Micro Inc.*, No. 6:22-CV-00239-ADA-DTG, W.D. Tex., Sep. 13, 2022, 73 pgs.
Defendant's Preliminary Invalidity Contentions, Exhibit 844-A-51, *Webroot, Inc. and Open Text, Inc. v. Trend Micro Inc.*, No. 6:22-CV-00239-ADA-DTG, W.D. Tex., Sep. 13, 2022, 53 pgs.
Defendant's Preliminary Invalidity Contentions, Exhibit 844-A-52, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 844-A-53, *Webroot, Inc. and Open Text, Inc. v. Trend Micro Inc.*, No. 6:22-CV-00239-ADA-DTG, W.D. Tex., Sep. 13, 2022, 75 pgs.
Defendant's Preliminary Invalidity Contentions, Exhibit 844-A-54, *Webroot, Inc. and Open Text, Inc. v. Trend Micro Inc.*, No. 6:22-CV-00239-ADA-DTG, W.D. Tex., Sep. 13, 2022, 23 pgs.
Defendant's Preliminary Invalidity Contentions, Exhibit 844-A-55, *Webroot, Inc. and Open Text, Inc. v. Trend Micro Inc.*, No. 6:22-CV-00239-ADA-DTG, W.D. Tex., Sep. 13, 2022, 19 pgs.
Defendant's Preliminary Invalidity Contentions, Exhibit 844-A-56, *Webroot, Inc. and Open Text, Inc. v. Trend Micro Inc.*, No. 6:22-CV-00239-ADA-DTG, W.D. Tex., Sep. 13, 2022, 55 pgs.
Defendant's Preliminary Invalidity Contentions, Exhibit 844-A-57, *Webroot, Inc. and Open Text, Inc. v. Trend Micro Inc.*, No. 6:22-CV-00239-ADA-DTG, W.D. Tex., Sep. 13, 2022, 105 pgs.
Defendant's Preliminary Invalidity Contentions, Exhibit 844-A-58, *Webroot, Inc. and Open Text, Inc. v. Trend Micro Inc.*, No. 6:22-CV-00239-ADA-DTG, W.D. Tex., Sep. 13, 2022, 82 pgs.
Defendant's Preliminary Invalidity Contentions, Exhibit 844-A-59, *Webroot, Inc. and Open Text, Inc. v. Trend Micro Inc.*, No. 6:22-CV-00239-ADA-DTG, W.D. Tex., Sep. 13, 2022, 78 pgs.
Defendant's Preliminary Invalidity Contentions, Exhibit 844-A-60, *Webroot, Inc. and Open Text, Inc. v. Trend Micro Inc.*, No. 6:22-CV-00239-ADA-DTG, W.D. Tex., Sep. 13, 2022, 64 pgs.
Defendant's Preliminary Invalidity Contentions, Exhibit 844-A-61, *Webroot, Inc. and Open Text, Inc. v. Trend Micro Inc.*, No. 6:22-CV-00239-ADA-DTG, W.D. Tex., Sep. 13, 2022, 59 pgs.
Defendant's Preliminary Invalidity Contentions, Exhibit 844-A-62, *Webroot, Inc. and Open Text, Inc. v. Trend Micro Inc.*, No. 6:22-CV-00239-ADA-DTG, W.D. Tex., Sep. 13, 2022, 81 pgs.
Defendant's Preliminary Invalidity Contentions, Exhibit 844-A-63, *Webroot, Inc. and Open Text, Inc. v. Trend Micro Inc.*, No. 6:22-CV-00239-ADA-DTG, W.D. Tex., Sep. 13, 2022, 47 pgs.
Defendant's Preliminary Invalidity Contentions, Exhibit 844-A-64, *Webroot, Inc. and Open Text, Inc. v. Trend Micro Inc.*, No. 6:22-CV-00239-ADA-DTG, W.D. Tex., Sep. 13, 2022, 81 pgs.
Defendant's Preliminary Invalidity Contentions, Exhibit 844-A-65, *Webroot, Inc. and Open Text, Inc. v. Trend Micro Inc.*, No. 6:22-CV-00239-ADA-DTG, W.D. Tex., Sep. 13, 2022, 52 pgs.
Defendant's Preliminary Invalidity Contentions, Exhibit 844-A-66, *Webroot, Inc. and Open Text, Inc. v. Trend Micro Inc.*, No. 6:22-CV-00239-ADA-DTG, W.D. Tex., Sep. 13, 2022, 83 pgs.

(56) References Cited

OTHER PUBLICATIONS

Defendant's Preliminary Invalidity Contentions, Exhibit 844-A-67, *Webroot, Inc. and Open Text, Inc. v. Trend Micro Inc.*, No. 6:22-CV-00239-ADA-DTG, W.D. Tex., Sep. 13, 2022, 25 pgs.
Defendant's Preliminary Invalidity Contentions, Exhibit 844-A-68, *Webroot, Inc. and Open Text, Inc. v. Trend Micro Inc.*, No. 6:22-CV-00239-ADA-DTG, W.D. Tex., Sep. 13, 2022, 28 pgs.
Defendant's Preliminary Invalidity Contentions, Exhibit 844-A-69, *Webroot, Inc. and Open Text, Inc. v. Trend Micro Inc.*, No. 6:22-CV-00239-ADA-DTG, W.D. Tex., Sep. 13, 2022, 80 pgs.
Defendant's Preliminary Invalidity Contentions, Exhibit 844-A-70, *Webroot, Inc. and Open Text, Inc. v. Trend Micro Inc.*, No. 6:22-CV-00239-ADA-DTG, W.D. Tex., Sep. 13, 2022, 88 pgs.
Defendant's Preliminary Invalidity Contentions, Exhibit 844-A-71, *Webroot, Inc. and Open Text, Inc. v. Trend Micro Inc.*, No. 6:22-CV-00239-ADA-DTG, W.D. Tex., Sep. 13, 2022, 100 pgs.
Defendant's Preliminary Invalidity Contentions, Exhibit 844-A-72, *Webroot, Inc. and Open Text, Inc. v. Trend Micro Inc.*, No. 6:22-CV-00239-ADA-DTG, W.D. Tex., Sep. 13, 2022, 63 pgs.
Defendant's Preliminary Invalidity Contentions, Exhibit 844-A-73, *Webroot, Inc. and Open Text, Inc. v. Trend Micro Inc.*, No. 6:22-CV-00239-ADA-DTG, W.D. Tex., Sep. 13, 2022, 97 pgs.
Defendant's Preliminary Invalidity Contentions, Exhibit 844-A-74, *Webroot, Inc. and Open Text, Inc. v. Trend Micro Inc.*, No. 6:22-CV-00239-ADA-DTG, W.D. Tex., Sep. 13, 2022, 149 pgs.
Defendant's Preliminary Invalidity Contentions, Exhibit 844-A-75, *Webroot, Inc. and Open Text, Inc. v. Trend Micro Inc.*, No. 6:22-CV-00239-ADA-DTG, W.D. Tex., Sep. 13, 2022, 57 pgs.
Defendant's Preliminary Invalidity Contentions, Exhibit 844-A-76, *Webroot, Inc. and Open Text, Inc. v. Trend Micro Inc.*, No. 6:22-CV-00239-ADA-DTG, W.D. Tex., Sep. 13, 2022, 73 pgs.
Defendant's Preliminary Invalidity Contentions, Exhibit 844-A-77, *Webroot, Inc. and Open Text, Inc. v. Trend Micro Inc.*, No. 6:22-CV-00239-ADA-DTG, W.D. Tex., Sep. 13, 2022, 48 pgs.
Defendant's Preliminary Invalidity Contentions, Exhibit 844-B, *Webroot, Inc. and Open Text, Inc. v. Trend Micro Inc.*, No. 6:22-CV-00239-ADA-DTG, W.D. Tex., Sep. 13, 2022, 52 pgs.
Defendant's Preliminary Invalidity Contentions, Exhibit 869-A-1, *Webroot, Inc. and Open Text, Inc. v. Trend Micro Inc.*, No. 6:22-CV-00239-ADA-DTG, W.D. Tex., Feb. 21, 2023, 31 pgs.
Defendant's Preliminary Invalidity Contentions, Exhibit 869-A-2, *Webroot, Inc. and Open Text, Inc. v. Trend Micro Inc.*, No. 6:22-CV-00239-ADA-DTG, W.D. Tex., Feb. 21, 2023, 59 pgs.
Defendant's Preliminary Invalidity Contentions, Exhibit 869-A-3, *Webroot, Inc. and Open Text, Inc. v. Trend Micro Inc.*, No. 6:22-CV-00239-ADA-DTG, W.D. Tex., Feb. 21, 2023, 36 pgs.
Defendant's Preliminary Invalidity Contentions, Exhibit 869-A-4, *Webroot, Inc. and Open Text, Inc. v. Trend Micro Inc.*, No. 6:22-CV-00239-ADA-DTG, W.D. Tex., Feb. 21, 2023, 37 pgs.
Defendant's Preliminary Invalidity Contentions, Exhibit 869-A-5, *Webroot, Inc. and Open Text, Inc. v. Trend Micro Inc.*, No. 6:22-CV-00239-ADA-DTG, W.D. Tex., Feb. 21, 2023, 32 pgs.
Defendant's Preliminary Invalidity Contentions, Exhibit 869-A-6, *Webroot, Inc. and Open Text, Inc. v. Trend Micro Inc.*, No. 6:22-CV-00239-ADA-DTG, W.D. Tex., Feb. 21, 2023, 65 pgs.
Defendant's Preliminary Invalidity Contentions, Exhibit 869-A-7, *Webroot, Inc. and Open Text, Inc. v. Trend Micro Inc.*, No. 6:22-CV-00239-ADA-DTG, W.D. Tex., Feb. 21, 2023, 27 pgs.
Defendant's Preliminary Invalidity Contentions, Exhibit 869-A-8, *Webroot, Inc. and Open Text, Inc. v. Trend Micro Inc.*, No. 6:22-CV-00239-ADA-DTG, W.D. Tex., Feb. 21, 2023, 29 pgs.
Defendant's Preliminary Invalidity Contentions, Exhibit 869-A-9, *Webroot, Inc. and Open Text, Inc. v. Trend Micro Inc.*, No. 6:22-CV-00239-ADA-DTG, W.D. Tex., Feb. 21, 2023, 29 pgs.
Defendant's Preliminary Invalidity Contentions, Exhibit 869-A-10, *Webroot, Inc. and Open Text, Inc. v. Trend Micro Inc.*, No. 6:22-CV-00239-ADA-DTG, W.D. Tex., Feb. 21, 2023, 30 pgs.
Defendant's Preliminary Invalidity Contentions, Exhibit 869-A-11, *Webroot, Inc. and Open Text, Inc. v. Trend Micro Inc.*, No. 6:22-CV-00239-ADA-DTG, W.D. Tex., Feb. 21, 2023, 30 pgs.
Defendant's Preliminary Invalidity Contentions, Exhibit 869-A-12, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 869-A-13, *Webroot, Inc. and Open Text, Inc. v. Trend Micro Inc.*, No. 6:22-CV-00239-ADA-DTG, W.D. Tex., Feb. 21, 2023, 36 pgs.
Defendant's Preliminary Invalidity Contentions, Exhibit 869-A-14, *Webroot, Inc. and Open Text, Inc. v. Trend Micro Inc.*, No. 6:22-CV-00239-ADA-DTG, W.D. Tex., Feb. 21, 2023, 32 pgs.
Defendant's Preliminary Invalidity Contentions, Exhibit 869-A-15, *Webroot, Inc. and Open Text, Inc. v. Trend Micro Inc.*, No. 6:22-CV-00239-ADA-DTG, W.D. Tex., Feb. 21, 2023, 33 pgs.
Defendant's Preliminary Invalidity Contentions, Exhibit 869-A-16, *Webroot, Inc. and Open Text, Inc. v. Trend Micro Inc.*, No. 6:22-CV-00239-ADA-DTG, W.D. Tex., Feb. 21, 2023, 34 pgs.
Defendant's Preliminary Invalidity Contentions, Exhibit 869-A-17, *Webroot, Inc. and Open Text, Inc. v. Trend Micro Inc.*, No. 6:22-CV-00239-ADA-DTG, W.D. Tex., Feb. 21, 2023, 48 pgs.
Defendant's Preliminary Invalidity Contentions, Exhibit 869-A-18, *Webroot, Inc. and Open Text, Inc. v. Trend Micro Inc.*, No. 6:22-CV-00239-ADA-DTG, W.D. Tex., Feb. 21, 2023, 38 pgs.
Defendant's Preliminary Invalidity Contentions, Exhibit 869-A-19, *Webroot, Inc. and Open Text, Inc. v. Trend Micro Inc.*, No. 6:22-CV-00239-ADA-DTG, W.D. Tex., Feb. 21, 2023, 33 pgs.
Defendant's Preliminary Invalidity Contentions, Exhibit 869-A-20, *Webroot, Inc. and Open Text, Inc. v. Trend Micro Inc.*, No. 6:22-CV-00239-ADA-DTG, W.D. Tex., Feb. 21, 2023, 33 pgs.
Defendant's Preliminary Invalidity Contentions, Exhibit 869-A-21, *Webroot, Inc. and Open Text, Inc. v. Trend Micro Inc.*, No. 6:22-CV-00239-ADA-DTG, W.D. Tex., Feb. 21, 2023, 45 pgs.
Defendant's Preliminary Invalidity Contentions, Exhibit 869-A-22, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 869-A-23, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 869-A-24, *Webroot, Inc. and Open Text, Inc. v. Trend Micro Inc.*, No. 6:22-CV-00239-ADA-DTG, W.D. Tex., Feb. 21, 2023, 55 pgs.
Defendant's Preliminary Invalidity Contentions, Exhibit 869-A-25, *Webroot, Inc. and Open Text, Inc. v. Trend Micro Inc.*, No. 6:22-CV-00239-ADA-DTG, W.D. Tex., Feb. 21, 2023, 56 pgs.
Defendant's Preliminary Invalidity Contentions, Exhibit 869-A-26, *Webroot, Inc. and Open Text, Inc. v. Trend Micro Inc.*, No. 6:22-CV-00239-ADA-DTG, W.D. Tex., Feb. 21, 2023, 83 pgs.
Defendant's Preliminary Invalidity Contentions, Exhibit 869-A-27, *Webroot, Inc. and Open Text, Inc. v. Trend Micro Inc.*, No. 6:22-CV-00239-ADA-DTG, W.D. Tex., Feb. 21, 2023, 25 pgs.
Defendant's Preliminary Invalidity Contentions, Exhibit 869-A-28, *Webroot, Inc. and Open Text, Inc. v. Trend Micro Inc.*, No. 6:22-CV-00239-ADA-DTG, W.D. Tex., Feb. 21, 2023, 79 pgs.
Defendant's Preliminary Invalidity Contentions, Exhibit 869-A-29, *Webroot, Inc. and Open Text, Inc. v. Trend Micro Inc.*, No. 6:22-CV-00239-ADA-DTG, W.D. Tex., Feb. 21, 2023, 95 pgs.
Defendant's Preliminary Invalidity Contentions, Exhibit 869-A-30, *Webroot, Inc. and Open Text, Inc. v. Trend Micro Inc.*, No. 6:22-CV-00239-ADA-DTG, W.D. Tex., Feb. 21, 2023, 24 pgs.
Defendant's Preliminary Invalidity Contentions, Exhibit 869-A-31, *Webroot, Inc. and Open Text, Inc. v. Trend Micro Inc.*, No. 6:22-CV-00239-ADA-DTG, W.D. Tex., Feb. 21, 2023, 25 pgs.
Defendant's Preliminary Invalidity Contentions, Exhibit 869-A-32, *Webroot, Inc. and Open Text, Inc. v. Trend Micro Inc.*, No. 6:22-CV-00239-ADA-DTG, W.D. Tex., Feb. 21, 2023, 68 pgs.
Defendant's Preliminary Invalidity Contentions, Exhibit 869-A-33, *Webroot, Inc. and Open Text, Inc. v. Trend Micro Inc.*, No. 6:22-CV-00239-ADA-DTG, W.D. Tex., Feb. 21, 2023, 27 pgs.
Defendant's Preliminary Invalidity Contentions, Exhibit 869-A-34, *Webroot, Inc. and Open Text, Inc. v. Trend Micro Inc.*, No. 6:22-CV-00239-ADA-DTG, W.D. Tex., Feb. 21, 2023, 21 pgs.
Defendant's Preliminary Invalidity Contentions, Exhibit 869-A-35, *Webroot, Inc. and Open Text, Inc. v. Trend Micro Inc.*, No. 6:22-CV-00239-ADA-DTG, W.D. Tex., Feb. 21, 2023, 126 pgs.

(56) References Cited

OTHER PUBLICATIONS

Defendant's Preliminary Invalidity Contentions, Exhibit 869-A-36, *Webroot, Inc. and Open Text, Inc. v. Trend Micro Inc.*, No. 6:22-CV-00239-ADA-DTG, W.D. Tex., Feb. 21, 2023, 27 pgs.
Defendant's Preliminary Invalidity Contentions, Exhibit 869-A-37, *Webroot, Inc. and Open Text, Inc. v. Trend Micro Inc.*, No. 6:22-CV-00239-ADA-DTG, W.D. Tex., Feb. 21, 2023, 112 pgs.
Defendant's Preliminary Invalidity Contentions, Exhibit 869-A-38, *Webroot, Inc. and Open Text, Inc. v. Trend Micro Inc.*, No. 6:22-CV-00239-ADA-DTG, W.D. Tex., Feb. 21, 2023, 41 pgs.
Defendant's Preliminary Invalidity Contentions, Exhibit 869-A-39, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 869-A-40, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 869-A-41, *Webroot, Inc. and Open Text, Inc. v. Trend Micro Inc.*, No. 6:22-CV-00239-ADA-DTG, W.D. Tex., Feb. 21, 2023, 54 pgs.
Defendant's Preliminary Invalidity Contentions, Exhibit 869-A-42, *Webroot, Inc. and Open Text, Inc. v. Trend Micro Inc.*, No. 6:22-CV-00239-ADA-DTG, W.D. Tex., Feb. 21, 2023, 63 pgs.
Defendant's Preliminary Invalidity Contentions, Exhibit 869-A-43, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 869-A-44, *Webroot, Inc. and Open Text, Inc. v. Trend Micro Inc.*, No. 6:22-CV-00239-ADA-DTG, W.D. Tex., Feb. 21, 2023, 64 pgs.
Defendant's Preliminary Invalidity Contentions, Exhibit 869-A-45, *Webroot, Inc. and Open Text, Inc. v. Trend Micro Inc.*, No. 6:22-CV-00239-ADA-DTG, W.D. Tex., Feb. 21, 2023, 23 pgs.
Defendant's Preliminary Invalidity Contentions, Exhibit 869-A-46, *Webroot, Inc. and Open Text, Inc. v. Trend Micro Inc.*, No. 6:22-CV-00239-ADA-DTG, W.D. Tex., Feb. 21, 2023, 22 pgs.
Defendant's Preliminary Invalidity Contentions, Exhibit 869-A-47, *Webroot, Inc. and Open Text, Inc. v. Trend Micro Inc.*, No. 6:22-CV-00239-ADA-DTG, W.D. Tex., Feb. 21, 2023, 22 pgs.
Defendant's Preliminary Invalidity Contentions, Exhibit 869-A-48, *Webroot, Inc. and Open Text, Inc. v. Trend Micro Inc.*, No. 6:22-CV-00239-ADA-DTG, W.D. Tex., Feb. 21, 2023, 64 pgs.
Defendant's Preliminary Invalidity Contentions, Exhibit 869-A-49, *Webroot, Inc. and Open Text, Inc. v. Trend Micro Inc.*, No. 6:22-CV-00239-ADA-DTG, W.D. Tex., Feb. 21, 2023, 65 pgs.
Defendant's Preliminary Invalidity Contentions, Exhibit 869-A-50, *Webroot, Inc. and Open Text, Inc. v. Trend Micro Inc.*, No. 6:22-CV-00239-ADA-DTG, W.D. Tex., Feb. 21, 2023, 108 pgs.
Defendant's Preliminary Invalidity Contentions, Exhibit 869-A-51, *Webroot, Inc. and Open Text, Inc. v. Trend Micro Inc.*, No. 6:22-CV-00239-ADA-DTG, W.D. Tex., Feb. 21, 2023, 111 pgs.
Defendant's Preliminary Invalidity Contentions, Exhibit 869-A-52, *Webroot, Inc. and Open Text, Inc. v. Trend Micro Inc.*, No. 6:22-CV-00239-ADA-DTG, W.D. Tex., Feb. 21, 2023, 81 pgs.
Defendant's Preliminary Invalidity Contentions, Exhibit 869-A-53, *Webroot, Inc. and Open Text, Inc. v. Trend Micro Inc.*, No. 6:22-CV-00239-ADA-DTG, W.D. Tex., Feb. 21, 2023, 51 pgs.
Defendant's Preliminary Invalidity Contentions, Exhibit 869-A-54, *Webroot, Inc. and Open Text, Inc. v. Trend Micro Inc.*, No. 6:22-CV-00239-ADA-DTG, W.D. Tex., Feb. 21, 2023, 61 pgs.
Defendant's Preliminary Invalidity Contentions, Exhibit 869-A-55, *Webroot, Inc. and Open Text, Inc. v. Trend Micro Inc.*, No. 6:22-CV-00239-ADA-DTG, W.D. Tex., Feb. 21, 2023, 61 pgs.
Defendant's Preliminary Invalidity Contentions, Exhibit 869-A-56, *Webroot, Inc. and Open Text, Inc. v. Trend Micro Inc.*, No. 6:22-CV-00239-ADA-DTG, W.D. Tex., Feb. 21, 2023, 107 pgs.
Defendant's Preliminary Invalidity Contentions, Exhibit 869-A-57, *Webroot, Inc. and Open Text, Inc. v. Trend Micro Inc.*, No. 6:22-CV-00239-ADA-DTG, W.D. Tex., Feb. 21, 2023, 47 pgs.
Defendant's Preliminary Invalidity Contentions, Exhibit 869-A-58, *Webroot, Inc. and Open Text, Inc. v. Trend Micro Inc.*, No. 6:22-CV-00239-ADA-DTG, W.D. Tex., Feb. 21, 2023, 108 pgs.
Defendant's Preliminary Invalidity Contentions, Exhibit 869-A-59, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 869-A-60, *Webroot, Inc. and Open Text, Inc. v. Trend Micro Inc.*, No. 6:22-CV-00239-ADA-DTG, W.D. Tex., Feb. 21, 2023, 78 pgs.
Defendant's Preliminary Invalidity Contentions, Exhibit 869-A-61, *Webroot, Inc. and Open Text, Inc. v. Trend Micro Inc.*, No. 6:22-CV-00239-ADA-DTG, W.D. Tex., Feb. 21, 2023, 62 pgs.
Defendant's Preliminary Invalidity Contentions, Exhibit 869-A-62, *Webroot, Inc. and Open Text, Inc. v. Trend Micro Inc.*, No. 6:22-CV-00239-ADA-DTG, W.D. Tex., Feb. 21, 2023, 77 pgs.
Defendant's Preliminary Invalidity Contentions, Exhibit 869-A-63, *Webroot, Inc. and Open Text, Inc. v. Trend Micro Inc.*, No. 6:22-CV-00239-ADA-DTG, W.D. Tex., Feb. 21, 2023, 80 pgs.
Defendant's Preliminary Invalidity Contentions, Exhibit 869-A-64, *Webroot, Inc. and Open Text, Inc. v. Trend Micro Inc.*, No. 6:22-CV-00239-ADA-DTG, W.D. Tex., Feb. 21, 2023, 76 pgs.
Defendant's Preliminary Invalidity Contentions, Exhibit 869-A-65, *Webroot, Inc. and Open Text, Inc. v. Trend Micro Inc.*, No. 6:22-CV-00239-ADA-DTG, W.D. Tex., Feb. 21, 2023, 77 pgs.
Defendant's Preliminary Invalidity Contentions, Exhibit 869-A-66, *Webroot, Inc. and Open Text, Inc. v. Trend Micro Inc.*, No. 6:22-CV-00239-ADA-DTG, W.D. Tex., Feb. 21, 2023, 76 pgs.
Defendant's Preliminary Invalidity Contentions, Exhibit 869-A-67, *Webroot, Inc. and Open Text, Inc. v. Trend Micro Inc.*, No. 6:22-CV-00239-ADA-DTG, W.D. Tex., Feb. 21, 2023, 78 pgs.
Defendant's Preliminary Invalidity Contentions, Exhibit 869-A-68, *Webroot, Inc. and Open Text, Inc. v. Trend Micro Inc.*, No. 6:22-CV-00239-ADA-DTG, W.D. Tex., Feb. 21, 2023, 46 pgs.
Defendant's Preliminary Invalidity Contentions, Exhibit 869-A-69, *Webroot, Inc. and Open Text, Inc. v. Trend Micro Inc.*, No. 6:22-CV-00239-ADA-DTG, W.D. Tex., Feb. 21, 2023, 63 pgs.
Defendant's Preliminary Invalidity Contentions, Exhibit 869-A-70, *Webroot, Inc. and Open Text, Inc. v. Trend Micro Inc.*, No. 6:22-CV-00239-ADA-DTG, W.D. Tex., Feb. 21, 2023, 94 pgs.
Defendant's Preliminary Invalidity Contentions, Exhibit 869-A-72, *Webroot, Inc. and Open Text, Inc. v. Trend Micro Inc.*, No. 6:22-CV-00239-ADA-DTG, W.D. Tex., Feb. 21, 2023, 49 pgs.
Defendant's Preliminary Invalidity Contentions, Exhibit 869-A-73, *Webroot, Inc. and Open Text, Inc. v. Trend Micro Inc.*, No. 6:22-CV-00239-ADA-DTG, W.D. Tex., Feb. 21, 2023, 53 pgs.
Defendant's Preliminary Invalidity Contentions, Exhibit 869-A-74, *Webroot, Inc. and Open Text, Inc. v. Trend Micro Inc.*, No. 6:22-CV-00239-ADA-DTG, W.D. Tex., Feb. 21, 2023, 64 pgs.
Defendant's Preliminary Invalidity Contentions, Exhibit 869-A-75, *Webroot, Inc. and Open Text, Inc. v. Trend Micro Inc.*, No. 6:22-CV-00239-ADA-DTG, W.D. Tex., Feb. 21, 2023, 44 pgs.
Defendant's Preliminary Invalidity Contentions, Exhibit 869-A-76, *Webroot, Inc. and Open Text, Inc. v. Trend Micro Inc.*, No. 6:22-CV-00239-ADA-DTG, W.D. Tex., Feb. 21, 2023, 73 pgs.
Defendant's Preliminary Invalidity Contentions, Exhibit 869-A-77, *Webroot, Inc. and Open Text, Inc. v. Trend Micro Inc.*, No. 6:22-CV-00239-ADA-DTG, W.D. Tex., Feb. 21, 2023, 54 pgs.
Defendant's Preliminary Invalidity Contentions, Exhibit 869-A-78, *Webroot, Inc. and Open Text, Inc. v. Trend Micro Inc.*, No. 6:22-CV-00239-ADA-DTG, W.D. Tex., Feb. 21, 2023, 44 pgs.
Defendant's Preliminary Invalidity Contentions, Exhibit 869-A-79, *Webroot, Inc. and Open Text, Inc. v. Trend Micro Inc.*, No. 6:22-CV-00239-ADA-DTG, W.D. Tex., Feb. 21, 2023, 56 pgs.
Defendant's Preliminary Invalidity Contentions, Exhibit 869-A-80, *Webroot, Inc. and Open Text, Inc. v. Trend Micro Inc.*, No. 6:22-CV-00239-ADA-DTG, W.D. Tex., Feb. 21, 2023, 43 pgs.
Defendant's Preliminary Invalidity Contentions, Exhibit 869-A-81, *Webroot, Inc. and Open Text, Inc. v. Trend Micro Inc.*, No. 6:22-CV-00239-ADA-DTG, W.D. Tex., Feb. 21, 2023, 40 pgs.
Defendant's Preliminary Invalidity Contentions, Exhibit 869-A-82, *Webroot, Inc. and Open Text, Inc. v. Trend Micro Inc.*, No. 6:22-CV-00239-ADA-DTG, W.D. Tex., Feb. 21, 2023, 40 pgs.
Defendant's Preliminary Invalidity Contentions, Exhibit 869-A-83, *Webroot, Inc. and Open Text, Inc. v. Trend Micro Inc.*, No. 6:22-CV-00239-ADA-DTG, W.D. Tex., Feb. 21, 2023, 44 pgs.

(56) References Cited

OTHER PUBLICATIONS

Defendant's Preliminary Invalidity Contentions, Exhibit 869-A-84, *Webroot, Inc. and Open Text, Inc. v. Trend Micro Inc.*, No. 6:22-CV-00239-ADA-DTG, W.D. Tex., Feb. 21, 2023, 74 pgs.
Defendant's Preliminary Invalidity Contentions, Exhibit 869-A-85, *Webroot, Inc. and Open Text, Inc. v. Trend Micro Inc.*, No. 6:22-CV-00239-ADA-DTG, W.D. Tex., Feb. 21, 2023, 42 pgs.
Defendant's Preliminary Invalidity Contentions, Exhibit 869-A-86, *Webroot, Inc. and Open Text, Inc. v. Trend Micro Inc.*, No. 6:22-CV-00239-ADA-DTG, W.D. Tex., Feb. 21, 2023, 38 pgs.
Defendant's Preliminary Invalidity Contentions, Exhibit 869-A-87, *Webroot, Inc. and Open Text, Inc. v. Trend Micro Inc.*, No. 6:22-CV-00239-ADA-DTG, W.D. Tex., Feb. 21, 2023, 30 pgs.
Defendant's Preliminary Invalidity Contentions, Exhibit 869-A-88, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 869-A-89, *Webroot, Inc. and Open Text, Inc. v. Trend Micro Inc.*, No. 6:22-CV-00239-ADA-DTG, W.D. Tex., Feb. 21, 2023, 35 pgs.
Defendant's Preliminary Invalidity Contentions, Exhibit 869-A-90, *Webroot, Inc. and Open Text, Inc. v. Trend Micro Inc.*, No. 6:22-CV-00239-ADA-DTG, W.D. Tex., Feb. 21, 2023, 41 pgs.
Defendant's Preliminary Invalidity Contentions, Exhibit 869-B, *Webroot, Inc. and Open Text, Inc. v. Trend Micro Inc.*, No. 6:22-CV-00239-ADA-DTG, W.D. Tex., Feb. 21, 2023, 64 pgs.
*Sophos Ltd. and Sophos Inc. v. Webroot Inc.*, PTAB Case No. IPR2024-00252, Petition for Inter Partes Review of U.S. Pat. No. 8,201,243, Dec. 8, 2023, 87 pgs.
*Sophos Ltd. and Sophos Inc. v. Webroot Inc.*, PTAB Case No. IPR2024-00252, Exhibit 1001: U.S. Pat. No. 8,201,243, Boney, Jun. 12, 2012, 13 pgs.
*Sophos Ltd. and Sophos Inc. v. Webroot Inc.*, PTAB Case No. IPR2024-00252, Exhibit 1002: File History of the '243 Patent, Dec. 8, 2023, 423 pgs.
*Sophos Ltd. and Sophos Inc. v. Webroot Inc.*, PTAB Case No. IPR2024-00252, Exhibit 1003: Declaration of Dr. Henry Houh, Nov. 29, 2023, 113 pgs.
*Sophos Ltd. and Sophos Inc. v. Webroot Inc.*, PTAB Case No. IPR2024-00252, Exhibit 1004: Curriculum Vitae of Dr. Henry Houh, Dec. 8, 2023, 12 pgs.
*Sophos Ltd. and Sophos Inc. v. Webroot Inc.*, PTAB Case No. IPR2024-00252, Exhibit 1005: Li, et al., UCLog: A Unified, Correlated Logging Architecture for Intrusion Detection,Int'l Conf. on Telecomm. Sys.Modelling & Analysis, Jan. 2004, 15 pgs.
*Sophos Ltd. and Sophos Inc. v. Webroot Inc.*, PTAB Case No. IPR2024-00252, Exhibit 1006: U.S. Pat. No. 8,117,659, Hartrell, Feb. 14, 2002, 16 pgs.
*Sophos Ltd. and Sophos Inc. v. Webroot Inc.*, PTAB Case No. IPR2024-00252, Exhibit 1007: Salvador Mandujano Vergara, A multiagent approach to outbound intrusion detection, (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library), 2004, 216 pgs.
*Sophos Ltd. and Sophos Inc. v. Webroot Inc.*, PTAB Case No. IPR2024-00252, Exhibit 1008: U.S. Pat. No. 7,174,566, Yadav, Feb. 6, 2007, 17 pgs.
*Sophos Ltd. and Sophos Inc. v. Webroot Inc.*, PTAB Case No. IPR2024-00252, Exhibit 1009: Declaration of Dr. Mary K. Bolin, Dec. 11, 2023, 318 pgs.
*Sophos Ltd. and Sophos Inc. v. Webroot Inc.*, PTAB Case No. IPR2024-00252, Exhibit 1010: Webroot Infringement Contentions, Oct. 25, 2022, 9 pgs.
*Sophos Ltd. and Sophos Inc. v. Webroot Inc.*, PTAB Case No. IPR2024-00252, Exhibit 1011: Jeff Crume, Inside Internet Security: What Hackers Don't Want You to Know, Pearson Educ. Ltd., 2000, 293 pgs.
*Sophos Ltd. and Sophos Inc. v. Webroot Inc.*, PTAB Case No. IPR2024-00252, Exhibit 1012: Information Sciences Institute, Univ. of S. Cal., Internet Protocol: DARPA Internet Program Protocol Specification, Sep. 1981, 51 pgs.
*Sophos Ltd. and Sophos Inc. v. Webroot Inc.*, PTAB Case No. IPR2024-00252, Exhibit 1013: Stipulation Waiving IPR Claims in District Court Litigation, Dec. 6, 2023, 7 pgs.
*Sophos Ltd. and Sophos Inc. v. Webroot Inc.*, PTAB Case No. IPR2024-00252, Exhibit 1014: Mandia, Kevin and Prosise, Chris, Incident Response, Investigating Computer Crime, Osborne/McGraw-Hill, Berkeley, CA, copyright 2001, 23 pgs.
*Sophos Ltd. and Sophos Inc. v. Webroot Inc.*, PTAB Case No. IPR2024-00252, Exhibit 1015: Declaration of Cristina L. Abad, Ph.D., Sep. 26, 2023, 61 pgs.
*Sophos Ltd. and Sophos Inc. v. Webroot Inc.*, PTAB Case No. IPR2024-00252, Exhibit 1016: Declaration of Z. Morley Mao, Ph.D., Oct. 11, 2023, 33 pgs.
*Sophos Ltd. and Sophos Inc. v. Webroot Inc.*, PTAB Case No. IPR2024-00252, Exhibit 1017: District Court Claim Construction Order entered in *Webroot, Inc. v. AO Kaspersky Lab*, No. 6:22-cv-00243-ADA-DTG (W.D. Tex.) (Dkt. 391) Jul. 25, 2023, 19 pgs.
*Sophos Ltd. and Sophos Inc. v. Webroot Inc.*, PTAB Case No. IPR2024-00253, Petition for Inter Partes Review of U.S. Pat. No. 8,719,932, Dec. 8, 2023, 86 pgs.
*Sophos Ltd. and Sophos Inc. v. Webroot Inc.*, PTAB Case No. IPR2024-00253, Exhibit 1001: U.S. Pat. No. 8,719,932, Boney, May 6, 2014, 12 pgs.
*Sophos Ltd. and Sophos Inc. v. Webroot Inc.*, PTAB Case No. IPR2024-00253, Exhibit 1002: File History of the '932 Patent, Dec. 8, 2023, 120 pgs.
*Sophos Ltd. and Sophos Inc. v. Webroot Inc.*, PTAB Case No. IPR2024-00253, Exhibit 1003: Declaration of Dr. Henry Houh, Nov. 29, 2023, 111 pgs.
*Sophos Ltd. and Sophos Inc. v. Webroot Inc.*, PTAB Case No. IPR2024-00253, Exhibit 1004: Curriculum Vitae of Dr. Henry Houh, Dec. 8, 2023, 12 pgs.
*Sophos Ltd. and Sophos Inc. v. Webroot Inc.*, PTAB Case No. IPR2024-00253, Exhibit 1005: Li, et al., UCLog: A Unified, Correlated Logging Architecture for Intrusion Detection Int'l Conf. on Telecomm. Sys.—Modelling & Analysis, Jan. 2004, 15 pgs.
*Sophos Ltd. and Sophos Inc. v. Webroot Inc.*, PTAB Case No. IPR2024-00253, Exhibit 1006: U.S. Pat. No. 8,117,659, Hartrell, Feb. 14, 2012, 16 pgs.
*Sophos Ltd. and Sophos Inc. v. Webroot Inc.*, PTAB Case No. IPR2024-00253, Exhibit 1007: Salvador Mandujano Vergara, A multiagent approach to outbound intrusion detection, (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library), 2004, 216 pgs.
*Sophos Ltd. and Sophos Inc. v. Webroot Inc.*, PTAB Case No. IPR2024-00253, Exhibit 1008: U.S. Patent No. Yadav, Feb. 6, 2007, 17 pgs.
*Sophos Ltd. and Sophos Inc. v. Webroot Inc.*, PTAB Case No. IPR2024-00253, Exhibit 1009: Declaration of Dr. Mary K. Bolin, Dec. 11, 2023, 318 pgs.
*Sophos Ltd. and Sophos Inc. v. Webroot Inc.*, PTAB Case No. IPR2024-00253, Exhibit 1010: Webroot Infringement Contentions, Oct. 25, 2022, 9 pgs.
*Sophos Ltd. and Sophos Inc. v. Webroot Inc.*, PTAB Case No. IPR2024-00253, Exhibit 1011: Crume, Jeff, Inside Internet Security, What Hackers Don't Want You to Know, Addison-Wesley, GB, first published 2000, 293 pgs.
*Sophos Ltd. and Sophos Inc. v. Webroot Inc.*, PTAB Case No. IPR2024-00253, Exhibit 1012: Internet Protocol DARPA Internet Program Protocol Specification, Marina del Rey, CA, Sep. 1981, 51 pgs.
*Sophos Ltd. and Sophos Inc. v. Webroot Inc.*, PTAB Case No. IPR2024-00253, Exhibit 1013: U.S. Pat. No. 8,201,243, Boney, Jun. 12, 2012, 13 pgs.
*Sophos Ltd. and Sophos Inc. v. Webroot Inc.*, PTAB Case No. IPR2024-00253, Exhibit 1014: File History of U.S. Pat. No. 8,201,243, Dec. 8, 2023, 423 pgs.

(56) References Cited

OTHER PUBLICATIONS

*Sophos Ltd. and Sophos Inc.* v. *Webroot Inc.,* PTAB Case No. IPR2024-00253, Exhibit 1015: Mandia, Kevin and Prosise, Chris, Incident Response, Investigating Computer Crime, Osborne/McGraw-Hill, Berkeley, CA, copyright 2001, 23 pgs.
*Sophos Ltd. and Sophos Inc.* v. *Webroot Inc.,* PTAB Case No. IPR2024-00253, Exhibit 1016: Stipulation Waiving IPR Claims in District Court Litigation, Dec. 6, 2023, 5 pgs.
*Sophos Ltd. and Sophos Inc.* v. *Webroot Inc.,* PTAB Case No. IPR2024-00253, Exhibit 1017: District Court Claim Construction Order entered in *Webroot, Inc.* v. *AO Kaspersky Lab,* No. 6:22-cv-00243-ADA-DTG (W.D. Tex.) (Dkt. 391), Jul. 25, 2023, 19 pgs.
*Sophos Ltd. and Sophos Inc.* v. *Webroot Inc.,* PTAB Case No. IPR2024-00253, Exhibit 1018: Declaration of Cristina L. Abad, Ph.D., Sep. 26, 2023, 61 pgs.
*Sophos Ltd. and Sophos Inc.* v. *Webroot Inc.,* PTAB Case No. IPR2024-00253, Exhibit 1019: Declaration of Z. Morley Mao, Ph.D., Oct. 11, 2023, 33 pgs.
*AO Kaspersky Lab* v. *Open Text Inc.,* PTAB Case No. IPR2024-00297, Petition for Inter Partes Review of U.S. Pat. No. 8,719,932, Dec. 8, 2023, 76 pgs.
*AO Kaspersky Lab* v. *Open Text Inc.,* PTAB Case No. IPR2024-00297, Exhibit 1001: U.S. Pat. No. 8,719,932, Boney, May 6, 2014, 12 pgs.
*AO Kaspersky Lab* v. *Open Text Inc.,* PTAB Case No. IPR2024-00297, Exhibit 1002: Declaration of Michael J. Donahoo, Ph.D. under 37 C.F.R. §1.68, Dec. 8, 2023, 113 pgs.
*AO Kaspersky Lab* v. *Open Text Inc.,* PTAB Case No. IPR2024-00297, Exhibit 1003: Curriculum Vitae of Michael J. Donahoo, Ph.D., Dec. 8, 2023, 12 pgs.
*AO Kaspersky Lab* v. *Open Text Inc.,* PTAB Case No. IPR2024-00297, Exhibit 1004: File History of U.S. Pat. No. 8,719,932, Dec. 8, 2023, 120 pgs.
*AO Kaspersky Lab* v. *Open Text Inc.,* PTAB Case No. IPR2024-00297, Exhibit 1005: U.S. Pat. No. 8,719,924, Williamson, May 6, 2014, 14 pgs.
*AO Kaspersky Lab* v. *Open Text Inc.,* PTAB Case No. IPR2024-00297, Exhibit 1006: U.S. Patent Publication No. 20070016951, Piccard, Jan. 18, 2007, 8 pgs.
*AO Kaspersky Lab* v. *Open Text Inc.,* PTAB Case No. IPR2024-00297, Exhibit 1007: U.S. Pat. No. 7,934,103, Kidron, Apr. 26, 2011, 13 pgs.
*AO Kaspersky Lab* v. *Open Text Inc.,* PTAB Case No. IPR2024-00297, Exhibit 1008: Walter Oney, Programming The Microsoft Windows Driver Model, 2nd ed., 2003, 467 pgs.
*AO Kaspersky Lab* v. *Open Text Inc.,* PTAB Case No. IPR2024-00297, Exhibit 1009: Ted Hudek & Don Marshall, KMDF Version History, Microsoft, at https://learn.microsoft.com/en-us/windows-hardware/drivers/wdf/kmdf-version-history, Oct. 31, 2023, 8 pgs.
*AO Kaspersky Lab* v. *Open Text Inc.,* PTAB Case No. IPR2024-00297, Exhibit 1010: Troy Mott, Learning Carbon, Apple Computer, Inc. eds., 1st ed., 2001, 3 pgs.
*AO Kaspersky Lab* v. *Open Text Inc.,* PTAB Case No. IPR2024-00297, Exhibit 1011: T James Gosling, Frank Yellin, & The Java Team, The Java™ Application Programming Interface, vol. 1: Core Packages in The Java Series . . . From The Source, May 29, 1996, 10 pgs.
*AO Kaspersky Lab* v. *Open Text Inc.,* PTAB Case No. IPR2024-00297, Exhibit 1012: Dictionary Of Computing, 4th ed. 1996, 6 pgs.
*AO Kaspersky Lab* v. *Open Text Inc.,* PTAB Case No. IPR2024-00297, Exhibit 1013: Sixth Amended Scheduling Order, *Open Text Inc.* v. *AO Kaspersky Lab,* 6:22-cv-00243-ADA-DTG (U.S. Dist. Ct. W. Dist. Tx. Waco Div.), Oct. 30, 2023, pgs.
*AO Kaspersky Lab* v. *Open Text Inc.,* PTAB Case No. IPR2024-00297, Exhibit 1014: Claim Construction Order, *Webroot, Inc., Open Text Inc.* v. *AO Kaspersky Lab,* 6:22-cv-00243-ADA-DTG (U.S. Dist. Ct. W. Dist. Tx. Waco Div.), Jul. 25, 2023, 19 pgs.
*AO Kaspersky Lab* v. *Open Text Inc.,* PTAB Case No. IPR2024-00297, Exhibit 1015: Fifth Amended Scheduling Order, *Open Text Inc.* v. *AO Kaspersky Lab,* 6:22-cv-00243-ADA-DTG (U.S. Dist. Ct. W. Dist. Tx. Waco Div.), Mar. 29, 2023, 9 pgs.
*AO Kaspersky Lab* v. *Open Text Inc.,* PTAB Case No. IPR2024-00297, Exhibit 1016: Plaintiffs' Responsive Claim Construction Brief Regarding Patents Plaintiffs Added by Amendment [263], *Open Text Inc.* v. *AO Kaspersky Lab,* 6:22-cv-00243-ADA-DTG (U.S. Dist. Ct. W. Dist. Tx. Waco Div.) May 5, 2023, 70 pgs.
*AO Kaspersky Lab* v. *Open Text Inc.,* PTAB Case No. IPR2024-00297, Exhibit 1017: File History of U.S. Pat. No. 8,201,243, Dec. 8, 2023, 423 pgs.
*AO Kaspersky Lab* v. *Open Text Inc.,* PTAB Case No. IPR2024-00297, Exhibit 1018: James Boney, Cisco IOS In A Nutshell, Dec. 2001, 1381 pgs.
*AO Kaspersky Lab* v. *Open Text Inc.,* PTAB Case No. IPR2024-00297, Exhibit 1019: David Hucaby, Cisco ASA And PIX Firewall Logging, provided by Cisco Press, at https://www.ciscopress.com/articles/article.asp?p=424447&seqNum=2, Dec. 7, 2023, 19 pgs.
*AO Kaspersky Lab* v. *Open Text Inc.,* PTAB Case No. IPR2024-00297, Exhibit 1020: Jennifer M. Anderson, et al., Continuous Profiling: Where Have All the Cycles Gone?, 15 ACM Transactions on Computer Systems 357, Nov. 1997, 34 pgs.
*Trend Micro, Inc.* v. *Open Text Inc.,* PTAB Case No. IPR2023-01459, Petition for Inter Partes Review of U.S. Pat. No. 8,726,389, Oct. 4, 2023, 89 pgs.
*Trend Micro, Inc.* v. *Open Text Inc.,* PTAB Case No. IPR2023-01459, Exhibit 1001: U.S. Pat. No. 8,726,389, Morris, May 13, 2014, 17 pgs.
*Trend Micro, Inc.* v. *Open Text Inc.,* PTAB Case No. IPR2023-01459, Exhibit 1002: File History of U.S. Pat. No. 8,726,389, Oct. 4, 2023, 276 pgs.
*Trend Micro, Inc.* v. *Open Text Inc.,* PTAB Case No. IPR2023-01459, Exhibit 1003: Declaration of Dr. Wenke Lee, Feb. 17, 2023, 164 pgs.
*Trend Micro, Inc.* v. *Open Text Inc.,* PTAB Case No. IPR2023-01459, Exhibit 1004: U.S. Patent Application Publication No. 20050210035 A1, Kester et al., Sep. 22, 2005, 42 pgs.
*Trend Micro, Inc.* v. *Open Text Inc.,* PTAB Case No. IPR2023-01459, Exhibit 1005: U.S. Pat. No. 7,594,272, Kennedy et al., Sep. 22, 2009, 10 pgs.
*Trend Micro, Inc.* v. *Open Text Inc.,* PTAB Case No. IPR2023-01459, Exhibit 1006: U.S. Pat. No. 7,225,343, Honig et al., May 29, 2007, 22 pgs.
*Trend Micro, Inc.* v. *Open Text Inc.,* PTAB Case No. IPR2023-01459, Exhibit 1007: PO Opposition Markman Brief, 22-cv-00243 WDTX, No. 98, Nov. 18, 2022, 86 pgs.
*Trend Micro, Inc.* v. *Open Text Inc.,* PTAB Case No. IPR2023-01459, Exhibit 1008: Defendants' Markman Brief, 22-cv-00243 WDTX, No. 86, Oct. 28, 2022, 84 pgs.
*Trend Micro, Inc.* v. *Open Text Inc.,* PTAB Case No. IPR2023-01459, Exhibit 1009: Order Granting Fifth Amended Scheduling Order, 22-cv-00243 WDTX, No. 252, Mar. 29, 2023, 9 pgs.
*Trend Micro, Inc.* v. *Open Text Inc.,* PTAB Case No. IPR2023-01459, Exhibit 1010: SANS Institute, Host- vs. Network-Based Intrusion Detection Systems, 2000-2005, 11 pgs.
*Trend Micro, Inc.* v. *Open Text Inc.,* PTAB Case No. IPR2023-01459, Exhib: Intrusion Detection with Unlabeled Data Using Clustering by Leonid Portnoy, et al., Nov. 2001, 25 pgs.
*Trend Micro, Inc.* v. *Open Text Inc.,* PTAB Case No. IPR2023-01459, Exhibit 1012: U.S. Pat. No. 6,944,772, Dozortsev, Sep. 13, 2005, 10 pgs.
*Trend Micro, Inc.* v. *Open Text Inc.,* PTAB Case No. IPR2023-01459, Exhibit 1013: U.S. Pat. No. 6,772,346, Chess et al., Aug. 3, 2004, 14 pgs.
*Trend Micro, Inc.* v. *Open Text Inc.,* PTAB Case No. IPR2023-01459, Exhibit 1014: WO 2002033525, Shyne-Song Chuang, Apr. 25, 2002, 18 pgs.
*Trend Micro, Inc.* v. *Open Text Inc.,* PTAB Case No. IPR2023-01459, Exhibit 1015: EP 1,549,012, Kristof De Spiegeleer, Jun. 29, 2005, 19 pgs.
*Trend Micro, Inc.* v. *Open Text Inc.,* PTAB Case No. IPR2023-01459, Exhibit 1016: EP 1,280,040, Alexander James Hinchliffe, et al., Jan. 29, 2003, 17 pgs.

(56) References Cited

OTHER PUBLICATIONS

*Trend Micro, Inc.* v. *Open Text Inc.*, PTAB Case No. IPR2023-01459, Exhibit 1017: U.S. Pat. No. 7,089,428, Farley et al., Aug. 8, 2006, 35 pgs.
*Trend Micro, Inc.* v. *Open Text Inc.*, PTAB Case No. IPR2023-01459, Exhibit 1018: U.S. Patent Publication No. 20040153644, McCorkendale, Aug. 5, 2004, 16 pgs.
*Trend Micro, Inc.* v. *Open Text Inc.*, PTAB Case No. IPR2023-01459, Exhibit 1019: The NIDES Statistical Component: Description and Justification by Harold S. Javitz et al., Mar. 7, 1994, 52 pgs.
*Trend Micro, Inc.* v. *Open Text Inc.*, PTAB Case No. IPR2023-01459, Exhibit 1020: U.S. Pat. No. 7,516,476, Kraemer et al., Apr. 7, 2009, 13 pgs.
*Trend Micro, Inc.* v. *Open Text Inc.*, PTAB Case No. IPR2023-01459, Exhibit 1021: U.S. Pat. No. 8,418,250, Morris et al., Apr. 9, 2013, 17 pgs.
*Trend Micro, Inc.* v. *Open Text Inc.*, PTAB Case No. IPR2023-01459, Exhibit 1022: U.S. Pat. No. 10,284,591, Giuliani et al., May 7, 2019, 14 pgs.
*Trend Micro, Inc.* v. *Open Text Inc.*, PTAB Case No. IPR2023-01459, Notice of Filing Date Accorded to Petition and Time for Filing Patent Owner Preliminary Response, Oct. 17, 2023, 6 pgs.
*Trend Micro, Inc.* v. *Open Text Inc.*, PTAB Case No. IPR2023-01459, Patent Owner Open Text Inc.'s Mandatory Notices Pursuant to 37 CFR § 42.8(b), Oct. 25, 2023, 11 pgs.
*AO Kaspersky Lab* v. *Webroot Inc.*, PTAB Case No. IPR2024-00035, Petition for Inter Partes Review of U.S. Pat. No. 8,726,389, Oct. 11, 2023, 76 pgs.
*AO Kaspersky Lab* v. *Webroot Inc.*, PTAB Case No. IPR2024-00035, Exhibit 1001: U.S. Pat. No. 8,726,389, Morris et al., May 13, 2014, 17 pgs.
*AO Kaspersky Lab* v. *Webroot Inc.*, PTAB Case No. IPR2024-00035, Exhibit 1002: File History of U.S. Pat. No. 8,726,389, Oct. 11, 2023, 276 pgs.
*AO Kaspersky Lab* v. *Webroot Inc.*, PTAB Case No. IPR2024-00035, Exhibit 1003: Declaration of Dr. Wenke Lee, Feb. 17, 2023, 164 pgs.
*AO Kaspersky Lab* v. *Webroot Inc.*, PTAB Case No. IPR2024-00035, Exhibit 1004: U.S. Patent Application Publication No. 2005/0210035 A1, Kester et al., Sep. 22, 2005, 42 pgs.
*AO Kaspersky Lab* v. *Webroot Inc.*, PTAB Case No. IPR2024-00035, Exhibit 1005: U.S. Pat. No. 7,594,272, Kennedy et al., Sep. 22, 2009, 10 pgs.
*AO Kaspersky Lab* v. *Webroot Inc.*, PTAB Case No. IPR2024-00035, Exhibit 1006: U.S. Pat. No. 7,225,343, Honig et al., May 29, 2007, 22 pgs.
*AO Kaspersky Lab* v. *Webroot Inc.*, PTAB Case No. IPR2024-00035, Exhibit 1007: PO Opposition Markman Brief, 22-cv-00243 WDTX, No. 98, Nov. 18, 2022, 86 pgs.
*AO Kaspersky Lab* v. *Webroot Inc.*, PTAB Case No. IPR2024-00035, Exhibit 1008: Defendants' Opening Markman Brief, 22-cv-00243 WDTX, No. 86, Oct. 28, 2022, 84 pgs.
*AO Kaspersky Lab* v. *Webroot Inc.*, PTAB Case No. IPR2024-00035, Exhibit 1009: Order Granting Fourth Amended Scheduling Order, 22-cv-00243 WDTX, No. 160, Jan. 22, 2023, 7 pgs.
*AO Kaspersky Lab* v. *Webroot Inc.*, PTAB Case No. IPR2024-00035, Exhibit 1010: SANS Institute, Host- vs. Network-Based Intrusion Detection Systems, 2000-2005, 11 pgs.
*AO Kaspersky Lab* v. *Webroot Inc.*, PTAB Case No. IPR2024-00035, Exhibit 1011: Intrusion Detection with Unlabeled Data Using Clustering by Leonid Portnoy, et al., Nov. 2001, 25 pgs.
*AO Kaspersky Lab* v. *Webroot Inc.*, PTAB Case No. IPR2024-00035, Exhibit 1012: U.S. Pat. No. 6,944,772, Dozortsev, Sep. 13, 2005, 10 pgs.
*AO Kaspersky Lab* v. *Webroot Inc.*, PTAB Case No. IPR2024-00035, Exhibit 1013: U.S. Pat. No. 6,772,346, Chess et al., Aug. 3, 2004, 14 pgs.
*AO Kaspersky Lab* v. *Webroot Inc.*, PTAB Case No. IPR2024-00035, Exhibit 1014: WO 2002/033525, Shyne-Song Chuang, Apr. 25, 2002, 18 pgs.
*AO Kaspersky Lab* v. *Webroot Inc.*, PTAB Case No. IPR2024-00035, Exhibit 1015: EP 1,549,012, Kristof De Spiegeleer, Jun. 29, 2005, 19 pgs.
*AO Kaspersky Lab* v. *Webroot Inc.*, PTAB Case No. IPR2024-00035, Exhibit 1016: EP 1,280,040, Alexander James Hinchliffe, et al., Jan. 29, 2003, 17 pgs.
*AO Kaspersky Lab* v. *Webroot Inc.*, PTAB Case No. IPR2024-00035, Exhibit 1017: U.S. Pat. No. 7,089,428, Farley et al., Aug. 8, 2006, 35 pgs.
*AO Kaspersky Lab* v. *Webroot Inc.*, PTAB Case No. IPR2024-00035, Exhibit 1018: U.S. Patent Publication No. 20040153644, McCorkendale, Aug. 5, 2004, 15 pgs.
*AO Kaspersky Lab* v. *Webroot Inc.*, PTAB Case No. IPR2024-00035, Exhibit 1019: The NIDES Statistical Component: Description and Justification by Harold S. Javitz et al., Mar. 7, 1994, 52 pgs.
*AO Kaspersky Lab* v. *Webroot Inc.*, PTAB Case No. IPR2024-00035, Exhibit 1020: U.S. Pat. No. 7516476, Kraemer et al., Apr. 7, 2009, 13 pgs.
*AO Kaspersky Lab* v. *Webroot Inc.*, PTAB Case No. IPR2024-00035, Exhibit 1021: U.S. Pat. No. 8,418,250, Morris et al., Apr. 9, 2013, 17 pgs.
*AO Kaspersky Lab* v. *Webroot Inc.*, PTAB Case No. IPR2024-00035, Exhibit 1022: U.S. Pat. No. 10,284,591, Giuliani et al., May 7, 2019, 14 pgs.
*AO Kaspersky Lab* v. *Webroot Inc.*, PTAB Case No. IPR2024-00035, Exhibit 1023: Declaration of V.S. Subrahmanian, Ph.D., Oct. 9, 2023, 88 pgs.
*AO Kaspersky Lab* v. *Webroot Inc.*, PTAB Case No. IPR2024-00035, Exhibit 1024: Order Granting Fifth Amended Scheduling Order, ECF No. 252, Mar. 29, 2023, 9 pgs.
*AO Kaspersky Lab* v. *Webroot Inc.*, PTAB Case No. IPR2024-00035, Notice of Filing Date Accorded to Petition and Time for Filing Patent Owner Preliminary Response, Oct. 18, 2023, 6 pgs.
*AO Kaspersky Lab* v. *Webroot Inc.*, PTAB Case No. IPR2024-00035, Patent Owner Open Text Inc.'s Mandatory Notices Pursuant to 37 CFR § 42.8(b), Nov. 10, 2023, 11 pgs.
*Trend Micro, Inc.* v. *Webroot Inc.*, PTAB Case No. IPR2024-00106, Petition for Inter Partes Review of U.S. Pat. No. 8,418,250, Nov. 8, 2023, 85 pgs.
*Trend Micro, Inc.* v. *Webroot Inc.*, PTAB Case No. IPR2024-00106, Exhibit 1001: U.S. Pat. No. 8,418,250, Morris, Apr. 9, 2013, 17 pgs.
*Trend Micro, Inc.* v. *Webroot Inc.*, PTAB Case No. IPR2024-00106, Exhibit 1002: File History for U.S. Pat. No. 8,418,250, Nov. 8, 2023, 888 pgs.
*Trend Micro, Inc.* v. *Webroot Inc.*, PTAB Case No. IPR2024-00106, Exhibit 1003: Complaint, *Webroot Inc, et al.* v. *Sophos Ltd.*, No. 6:22-cv-240 (W.D. Tex.), Mar. 4, 2022, 144 pgs.
*Trend Micro, Inc.* v. *Webroot Inc.*, PTAB Case No. IPR2024-00106, Exhibit 1004: Declaration of Dr. Richard Newman, Mar. 8, 2023, 85 pgs.
*Trend Micro, Inc.* v. *Webroot Inc.*, PTAB Case No. IPR2024-00106, Exhibit 1005: Curriculum Vitae of Dr. Richard Newman, Nov. 8, 2023, 13 pgs.
*Trend Micro, Inc.* v. *Webroot Inc.*, PTAB Case No. IPR2024-00106, Exhibit 1006: U.S. Patent Appl. Pub. No. 2004/0111632, Halperin, Jun. 10, 2004, 22 pgs.
*Trend Micro, Inc.* v. *Webroot Inc.*, PTAB Case No. IPR2024-00106, Exhibit 1007: U.S. Pat. No. 7,694,150, Kirby, Apr. 6, 2010, 22 pgs.
*Trend Micro, Inc.* v. *Webroot Inc.*, PTAB Case No. IPR2024-00106, Exhibit 1008: U.S. Pat. No. 7,900,194, Mankins, Mar. 1, 2011, 12 pgs.
*Trend Micro, Inc.* v. *Webroot Inc.*, PTAB Case No. IPR2024-00106, Exhibit 1009: Stipulation Waiving IPR Claims in District Court Litigation, Mar. 8, 2023, 4 pgs.
*Trend Micro, Inc.* v. *Webroot Inc.*, PTAB Case No. IPR2024-00106, Exhibit 1010: S. Forrest et al., Computer Immunology, Comms. of the ACM, vol. 40, No. 10, 88-96, 1997, 9 pgs.
*Trend Micro, Inc.* v. *Webroot Inc.*, PTAB Case No. IPR2024-00106, Exhibit 1011: A. Snoeren et al., Single-Packet IP Traceback, IEEE/ACM Trans. on Networking (TON), vol. 10, No. 6, 721-34, 2002, 14 pgs.

(56) References Cited

OTHER PUBLICATIONS

*Trend Micro, Inc.* v. *Webroot Inc.*, PTAB Case No. IPR2024-00106, Exhibit 1012: S. Hofmeyr, Intrusion Detection Using Sequences of System Calls, J. Computer Security, vol. 6, Issue 3, 151-180, Aug. 18, 1998, 25 pgs.
*Trend Micro, Inc.* v. *Webroot Inc.*, PTAB Case No. IPR2024-00106, Exhibit 1013: S. Forrest et al., A Sense of Self for Unix Processes, Proc. 1996 IEEE Symp. on Security and Privacy, 120-28 1996, 9 pgs.
*Trend Micro, Inc.* v. *Webroot Inc.*, PTAB Case No. IPR2024-00106, Exhibit 1014: Order Granting Fifth Amended Scheduling Order, Dkt. 253, *Webroot, Inc., et al.* v. *AO Kaspersky Lab*, No. 6:22-cv-00243-ADA-DTG (W.D. Tex.) Mar. 29, 2023, 7 pgs.
*Trend Micro, Inc.* v. *Webroot Inc.*, PTAB Case No. IPR2024-00106, Exhibit 1015: Excerpt from Transcript of Motions Hearing in *Webroot, Inc., et al.* v. *AO Kaspersky Lab*, No. 6:22-cv-00243-ADA-DTG (W.D. Tex.) Dec. 9, 2022, 7 pgs.
*Trend Micro, Inc.* v. *Webroot Inc.*, PTAB Case No. IPR2024-00106, Exhibit 1016: Threat Graphs examples: Malware detection, Sophos Ltd., KB-000036359, https://support.sophos.com/support/s/article/KB000036359?language=en_US, Feb. 23, 2023, 15 pgs.
*Trend Micro, Inc.* v. *Webroot Inc.*, PTAB Case No. IPR2024-00106, Corrected Exhibit, Nov. 22, 2023, 4 pgs.
*Trend Micro, Inc.* v. *Webroot Inc.*, PTAB Case No. IPR2024-00106, Exhibit 1014: Order Granting Fifth Amended Scheduling Order, Dkt. 253, *Webroot Inc et al.* v. *AO Kaspersky Lab*, No. 6:22-CV-00243-ADA-DTG (W.D. Tex, Mar. 29, 2023), Nov. 22, 2023, 9 pgs.
*Trend Micro, Inc.* v. *Webroot Inc.*, PTAB Case No. IPR2024-00106, Notice of Filing Date Accorded to Petition and Time for Filing Patent Owner Preliminary Response, Nov. 22, 2023, 6 pgs.
*Trend Micro, Inc.* v. *Webroot Inc.*, PTAB Case No. IPR2024-00106, Patent Owner Open Text Inc.'s Mandatory Notices Pursuant to 37 CFR § 42.8(b), Nov. 29, 2023, 10 pgs.
*Crowdstrike, Inc.* v. *Webroot Inc.*, PTAB Case No. IPR2022-01522, Joint Stipulation to Modify Due Dates 2-3, Oct. 6, 2023, 4 pgs.
*Crowdstrike, Inc.* v. *Webroot Inc.*, PTAB Case No. IPR2022-01522, Joint Stipulation to Modify Due Dates 2-3, Oct. 20, 2023, 4 pgs.
*Crowdstrike, Inc.* v. *Webroot Inc.*, PTAB Case No. IPR2022-01522, Panel Change Order, Nov. 6, 2023, 3 pgs.
*Crowdstrike, Inc.* v. *Webroot Inc.*, PTAB Case No. IPR2022-01522, Second Updated Joint Stipulation to Modify Due Dates 2-3, Nov. 7, 2023, 4 pgs.
*Crowdstrike, Inc.* v. *Webroot Inc.*, PTAB Case No. IPR2022-01522, Joint Motion to Terminate Proceeding, Nov. 20, 2023, 10 pgs.
*Crowdstrike, Inc.* v. *Webroot Inc.*, PTAB Case No. IPR2022-01522, Joint Request to Treat Agreement as Business Confidential Information, Nov. 20, 2023, 5 pgs.
*Crowdstrike, Inc.* v. *Webroot Inc.*, PTAB Case No. IPR2022-01522, Patent Owner's Request for Oral Argument, Dec. 12, 2023, 4 pgs.
*Crowdstrike, Inc.* v. *Webroot Inc.*, PTAB Case No. IPR2022-01522, Termination due to Settlement Prior to Institution of Trial, Jan. 8, 2024, 4 pgs.
*AO Kaspersky Lab* v. *Webroot Inc.*, PTAB Case No. IPR2023-00895, Decision denying Institution of Inter Partes Review, Dec. 7, 2023, 12 pgs.
*AO Kaspersky Lab* v. *Webroot Inc.*, PTAB Case No. IPR2023-00895, Petitioner's Request for Rehearing, Jan. 5, 2024, 20 pgs.
*AO Kaspersky Lab* v. *Webroot Inc.*, PTAB Case No. IPR2023-00895, Exhibit 1032: Fratric, Runtime Prevention of Return-Oriented Programming Attacks, Sep. 24, 2012, 16 pgs.
*AO Kaspersky Lab* v. *Webroot Inc.*, PTAB Case No. IPR2023-00895, Exhibit 1033: Fratric, Abstract of Runtime Prevention of Return-Oriented Programming Attacks, Jan. 5, 2024, 1 pgs.
*AO Kaspersky Lab* v. *Webroot Inc.*, PTAB Case No. IPR2023-00895, Exhibit 1034, Jan. 5, 2024, 2 pgs.
*AO Kaspersky Lab* v. *Webroot Inc.*, PTAB Case No. IPR2023-00895, Exhibit 1035: Email re: Subpoena served on GitHub, Dec. 6, 2023, 1 pg.
*AO Kaspersky Lab* v. *Webroot Inc.*, PTAB Case No. IPR2023-00895, Exhibit 1036: screenshot of Ivan Fratric communication dated Dec. 23, 2023, 1 pg.
*AO Kaspersky Lab* v. *Webroot Inc.*, PTAB Case No. IPR2023-00895, Exhibit 1037: screenshot of post of Ivan Fratric post dated Aug. 26, 2012, 1 pg.
*AO Kaspersky Lab* v. *Webroot Inc.*, PTAB Case No. IPR2023-00895, Exhibit 1038: Ivan Fratic's Security Blog dated Dec. 28, 23, 3 pgs.
*AO Kaspersky Lab* v. *Webroot Inc.*, PTAB Case No. IPR2023-00895, Exhibit 1039: Ivan Fratric's Security Blog dated Sep. 29, 2012, 16 pgs.
*AO Kaspersky Lab* v. *Webroot Inc.*, PTAB Case No. IPR2023-00895, Exhibit 1040: Google Code archive for Runtime Prevention of Return-Oriented Programming Attacks, Dec. 28, 2023, 1 pg.
*AO Kaspersky Lab* v. *Webroot Inc.*, PTAB Case No. IPR2023-00895, Exhibit 1041: Twitter listing of Users who reposted this post / X, Dec. 28, 2023, 4 pgs.
*AO Kaspersky Lab* v. *Webroot Inc.*, PTAB Case No. IPR2023-00895, Exhibit 1042: screenshot of Twitter posts, Jan. 5, 2024, 1 pg.
*Crowdstrike, Inc.* v. *Webroot Inc.*, PTAB Case No. IPR2023-00124, Decision denying Patent Owner's Request on Rehearing of Decision granting Institution of Inter Partes Review, Oct. 13, 2023, 11 pgs.
*Crowdstrike, Inc.* v. *Webroot Inc.*, PTAB Case No. IPR2023-00124, Panel Change Order, Nov. 6, 2023, 3 pgs.
*Crowdstrike, Inc.* v. *Webroot Inc.*, PTAB Case No. IPR2023-00124, Joint Motion to Terminate Proceeding, Nov. 20, 2023, 10 pgs.
*Crowdstrike, Inc.* v. *Webroot Inc.*, PTAB Case No. IPR2023-00124, Joint Request to Treat Agreement as Business Confidential Information, Nov. 20, 2023, 5 pgs.
*Crowdstrike, Inc.* v. *Webroot Inc.*, PTAB Case No. IPR2023-00124, Decision granting Institution of Inter Parties Review and granting Motion for Joinder, Dec. 21, 2023, 10 pgs.
*Crowdstrike, Inc.* v. *Webroot Inc.*, PTAB Case No. IPR2023-00124, Order on Settlement as to CrowdStrike, Inc., Jan. 5, 2024, 5 pgs.
*Crowdstrike, Inc.* v. *Webroot Inc.*, PTAB Case No. IPR2023-00124, Petitioner's Reply to Patent Owner's Response, Jan. 8, 2024, 27 pgs.
*Crowdstrike, Inc.* v. *Webroot Inc.*, PTAB Case No. IPR2023-00124, Exhibit 1035: *Webroot, Inc. and Open Text Inc.* v. *AO Kaspserksy Lab, et al.*, Case No. 6:22- CV-243-ADA-DTG, Joint Claim Construction Statement, Dkt 185 (W.D. Tex., Feb. 20, 23), 12 pgs.
*Crowdstrike, Inc.* v. *Webroot Inc.*, PTAB Case No. IPR2023-00124, Exhibit 1036, Robert Sedgewick, Algorithms in C: Graph Algorithms (3rd ed.), Pearson Education, 2002, 571 pgs.
*Crowdstrike, Inc.* v. *Webroot Inc.*, PTAB Case No. IPR2023-00124, Exhibit 1037: David B. Guralnik, Webster's New World Dictionary of the American Language, 1984, 3 pgs.
*AO Kaspersky Lab* v. *Webroot Inc.*, PTAB Case No. IPR2023-01199, Patent Owner's Preliminary Response, Dec. 19, 2023, 14 pgs.
*AO Kaspersky Lab* v. *Webroot Inc.*, PTAB Case No. IPR2023-01199, Exhibit 2001: *Webroot, Inc. and Open Text Inc.* v. *AO Kaspersky Lab*, Case No. 6:22- cv-00243-ADA, Complaint, Dkt. 1 (W.D. Tex., Mar. 4, 2022), Dec. 19, 2023, 115 pgs.
*AO Kaspersky Lab* v. *Webroot Inc.*, PTAB Case No. IPR2023-01199, Exhibit 2002: *Webroot, Inc. and Open Text Inc.* v. *AO Kaspersky Lab*, Case No. 6:22- cv-00243-ADA, Waiver of the Service of Summons, Dkt. 16 (W.D. Tex., May 25, 2022), Dec. 19, 2023, 1 pgs.
*AO Kaspersky Lab* v. *Webroot Inc.*, PTAB Case No. IPR2023-01199, Exhibit 2003: Email chain from PTAB Trials to E. Block re *Crowdstrike* v. *Open Text Inc.*—IPR2023-00124 & IPR2023-001199 (U.S. Pat. No. 9,578,045) / Conference Call, (dated Nov. 21, 2023) , Dec. 19, 2023, 4 pgs.
*AO Kaspersky Lab* v. *Webroot Inc.*, PTAB Case No. IPR2023-01199, Decision granting Inter Partes Review and Motion for Joinder, Dec. 21, 2023, 10 pgs.
*AO Kaspersky Lab* v. *Webroot Inc.*, PTAB Case No. IPR2023-01199, Petitioner's Reply to Patent Owner's Response, Dec. 28, 2023, 27 pgs.

(56) References Cited

OTHER PUBLICATIONS

*AO Kaspersky Lab* v. *Webroot Inc.,* PTAB Case No. IPR2023-01199, Exhibit 1035: *Webroot, Inc. and Open Text Inc.* v. *AO Kaspserksy Lab, et al.,* Case No. 6:22-CV-243-ADA-DTG, Joint Claim Construction Statement, Dkt 185 (W.D. Tex., Feb. 20, 23), 12 pgs.
*AO Kaspersky Lab* v. *Webroot Inc.,* PTAB Case No. IPR2023-01199, Exhibit 1036, Robert Sedgewick, Algorithms in C: Graph Algorithms (3rd ed.), Pearson Education, 2002, 571 pgs.
*AO Kaspersky Lab* v. *Webroot Inc.,* PTAB Case No. IPR2023-01199, Exhibit 1037: David B. Guralnik, Webster's New World Dictionary of the American Language, 1984, 3 pgs.
*Crowdstrike, Inc.* v. *Webroot Inc.,* PTAB Case No. IPR2023-00126, Patent Owner's Response to Petition, Jul. 28, 2023, 71 pgs.
*Crowdstrike, Inc.* v. *Webroot Inc.,* PTAB Case No. IPR2023-00126, Exhibit 2022: Deposition Transcript of Wendke Lee Ph.D, dated Jul. 17, 2023, *Crowdstrike, Inc.* v. *Open Text Inc.,* Jul. 28, 2023, 268 pgs.
*Crowdstrike, Inc.* v. *Webroot Inc.,* PTAB Case No. IPR2023-00126, Exhibit 2023: Second Declaration of Professor Nenad Medvidovic, Jul. 28, 2023, 73 pgs.
*Crowdstrike, Inc.* v. *Webroot Inc.,* PTAB Case No. IPR2023-00126, Patent Owner Open Text Inc.'s Second Updated Mandatory Notices, Oct. 3, 2023, 10 pgs.
*Crowdstrike, Inc.* v. *Webroot Inc.,* PTAB Case No. IPR2023-00126, Joint Motion to Modify Due Dates 2 and 3, Oct. 6, 2023, 4 pgs.
*Crowdstrike, Inc.* v. *Webroot Inc.,* PTAB Case No. IPR2023-00126, Joint Motion to Modify Due Dates 2 and 3, Oct. 20, 2023, 4 pgs.
*Crowdstrike, Inc.* v. *Webroot Inc.,* PTAB Case No. IPR2023-00126, Second Updated Joint Stipulation to Modify Due Dates 2 and 3, Nov. 7, 2023, 4 pgs.
*Crowdstrike, Inc.* v. *Webroot Inc.,* PTAB Case No. IPR2023-00126, Panel Change Order, Nov. 9, 2023, 3 pgs.
*Crowdstrike, Inc.* v. *Webroot Inc.,* PTAB Case No. IPR2023-00126, Decision denying Patent Owner's Request for Rehearing of Decision granting Institution of Inter Partes Review, Nov. 15, 2023, 11 pgs.
*Crowdstrike, Inc.* v. *Webroot Inc.,* PTAB Case No. IPR2023-00126, Joint Motion to Terminate Proceeding, Nov. 20, 2023, 10 pgs.
*Crowdstrike, Inc.* v. *Webroot Inc.,* PTAB Case No. IPR2023-00126, Joint Request to Treat Agreement as Business Confidential Information, Nov. 20, 2023, 5 pgs.
*Crowdstrike, Inc.* v. *Webroot Inc.,* PTAB Case No. IPR2023-00126, Decision instituting Inter Partes Review and granting Petitioner's Motion for Joinder Nov. 28, 2023, 6 pgs.
*Crowdstrike, Inc.* v. *Webroot Inc.,* PTAB Case No. IPR2023-00126, Patent Owner's Request for Oral Argument, Dec. 22, 2023, 5 pgs.
*Crowdstrike, Inc.* v. *Webroot Inc.,* PTAB Case No. IPR2023-00126, Order Settlement as to Crowdstrike, Inc., Jan. 5, 2024, 4 pgs.
*Crowdstrike, Inc.* v. *Webroot Inc.,* PTAB Case No. IPR2023-00126, Order setting Oral Argument, Jan. 9, 2024, 9 pgs.
*AO Kaspersky Lab* v. *Webroot Inc.,* PTAB Case No. IPR2023-01011, Decision instituting Inter Partes Review, Nov. 28, 2023, 6 pgs.
*AO Kaspersky Lab* v. *Webroot Inc.,* PTAB Case No. IPR2023-01011, Petitioner's Reply to Patent Owner's Response, Dec. 18, 2023, 27 pgs.
*AO Kaspersky Lab* v. *Webroot Inc.,* PTAB Case No. IPR2023-01011, Exhibit 1034: *Webroot, Inc. and Open Text Inc.* v. *AO Kaspserksy Lab, et al.,* Case No. 6:22- CV-243-ADA-DTG, Joint Claim Construction Statement, Dkt 185 (W.D. Tex., Feb. 20, 23), 12 pgs.
*AO Kaspersky Lab* v. *Webroot Inc.,* PTAB Case No. IPR2023-01011, Exhibit 1035, Robert Sedgewick, Algorithms in C: Graph Algorithms (3rd ed.), Pearson Education, 2002, 571 pgs.
*AO Kaspersky Lab* v. *Webroot Inc.,* PTAB Case No. IPR2023-01011, Exhibit 1036: David B. Guralnik, Webster's New World Dictionary of the American Language, 1984, 3 pgs.
*Sophos Ltd. and Sophos Inc.* v. *Webroot Inc.,* PTAB Case No. IPR2023-00731, Order—Conduct of the Proceeding, Oct. 2, 2023, 3 pgs.
*Sophos Ltd. and Sophos Inc.* v. *Webroot Inc.,* PTAB Case No. IPR2023-00731, Motion to Dismiss Petition for Inter Partes Review, Oct. 10, 2023, 10 pgs.
*Sophos Ltd. and Sophos Inc.* v. *Webroot Inc.,* PTAB Case No. IPR2023-00731, Patent Owner's Opposition to Petitioners' Motion to Dismiss Petition, Oct. 13, 2023, 9 pgs.
*Sophos Ltd. and Sophos Inc.* v. *Webroot Inc.,* PTAB Case No. IPR2023-00731, Patent Owner's Updated Exhibit List, Oct. 13, 2023, 6 pgs.
*Sophos Ltd. and Sophos Inc.* v. *Webroot Inc.,* PTAB Case No. IPR2023-00731, Exhibit 2016: Best email to Eutermoser, Oct. 13, 2023, 3 pgs.
*Sophos Ltd. and Sophos Inc.* v. *Webroot Inc.,* PTAB Case No. IPR2023-00731, Exhibit 3002: Board email to Best, Oct. 16, 2023, 3 pgs.
*Sophos Ltd. and Sophos Inc.* v. *Webroot Inc.,* PTAB Case No. IPR2023-00731, Order denying Motion to Dismiss, Nov. 1, 2023, 6 pgs.
*Sophos Ltd. and Sophos Inc.* v. *Webroot Inc.,* PTAB Case No. IPR2023-00731, Decision denying Institution of Inter Partes Review, Nov. 2, 2023, 20 pgs.
*Sophos Ltd. and Sophos Inc.* v. *Webroot Inc.,* PTAB Case No. IPR2023-00731, Petitioners' Request for Rehearing by the Director, Dec. 4, 2023, 17 pgs.
*Sophos Ltd. and Sophos Inc.* v. *Webroot Inc.,* PTAB Case No. IPR2023-00731, Exhibit 3100: Best email re Request for Rehearing by the Director, Dec. 5, 2023, 2 pgs.
*Sophos Ltd. and Sophos Inc.* v. *Webroot Inc.,* PTAB Case No. IPR2023-00731, Order Denying Director Review, Dec. 21, 2023, 3 pgs.
*Crowdstrike, Inc.* v. *Webroot Inc.,* PTAB Case No. IPR2023-01052, Joint Motion to Terminate Proceeding, Nov. 20, 2023, 9 pgs.
*Crowdstrike, Inc.* v. *Open Text Inc.,* PTAB Case No. IPR2023-01052, Joint Request to Treat Agreement as Business Confidential Information, Nov. 20, 2023, 5 pgs.
*Crowdstrike, Inc.* v. *Webroot Inc.,* PTAB Case No. IPR2023-01052, Decision, Settlement Prior to Institution of Trial, Dec. 4, 2023, 5 pgs.
*Crowdstrike, Inc.* v. *Webroot Inc.,* PTAB Case No. IPR2023-01052, Exhibit 3001: Email regarding Joint Motion to Terminate Proceeding, Dec. 4, 2023, 2 pgs.
*Crowdstrike, Inc.* v. *Open Text Inc.,* PTAB Case No. IPR2023-01051, Joint Motion to Terminate Proceeding, Nov. 20, 2023, 9 pgs.
*Crowdstrike, Inc.* v. *Open Text Inc.,* PTAB Case No. IPR2023-01051, Joint Request to Treat Agreement as Business Confidential Information, Nov. 20, 2023, 5 pgs.
*Crowdstrike, Inc.* v. *Webroot Inc.,* PTAB Case No. IPR2023-01051, Decision, Settlement Prior to Institution of Trial, Dec. 4, 2023, 5 pgs.
*Crowdstrike, Inc.* v. *Webroot Inc.,* PTAB Case No. IPR2023-01051, Exhibit 3001: Email regarding Joint Motion to Terminate Proceeding, Dec. 4, 2023, 2 pgs.
*Crowdstrike, Inc.* v. *Webroot Inc.,* PTAB Case No. IPR2023-01159, Joint Motion to Terminate Proceeding, Nov. 20, 2023, 9 pgs.
*Crowdstrike, Inc.* v. *Open Text Inc.,* PTAB Case No. IPR2023-01159, Joint Request to Treat Agreement as Business Confidential Information, Nov. 20, 2023, 5 pgs.
*Crowdstrike, Inc.* v. *Webroot Inc.,* PTAB Case No. IPR2023-01159, Decision, Settlement Prior to Institution of Trial, Dec. 4, 2023, 5 pgs.
*Crowdstrike, Inc.* v. *Webroot Inc.,* PTAB Case No. IPR2023-01159, Exhibit 3001: Email regarding Joint Motion to Terminate Proceeding, Dec. 4, 2023, 2 pgs.
*Crowdstrike, Inc.* v. *Webroot Inc.,* PTAB Case No. IPR2023-01158, Joint Motion to Terminate Proceeding, Nov. 20, 2023, 9 pgs.
*Crowdstrike, Inc.* v. *Open Text Inc.,* PTAB Case No. IPR2023-01158, Joint Request to Treat Agreement as Business Confidential Information, Nov. 20, 2023, 5 pgs.
*Crowdstrike, Inc.* v. *Webroot Inc.,* PTAB Case No. IPR2023-01158, Decision, Settlement Prior to Institution of Trial, Dec. 4, 2023, 5 pgs.

(56) References Cited

OTHER PUBLICATIONS

*Crowdstrike, Inc.* v. *Webroot Inc.*, PTAB Case No. IPR2023-01158, Exhibit 3001: Email regarding Joint Motion to Terminate Proceeding, Dec. 4, 2023, 2 pgs.
*Forcepoint LLC* v. *Open Text, Inc.*, PTAB Case No. IPR2023-00786, Petitioner Forcepoint LLC's Updated Mandatory Notices Pursuant to 37 CFR § 42.8, Oct. 25, 2023, 5 pgs.
*Forcepoint LLC* v. *Open Text, Inc.*, PTAB Case No. IPR2023-00786, Order, Conduct of Proceedings, Oct. 30, 2023, 4 pgs.
*Forcepoint LLC* v. *Open Text, Inc.*, PTAB Case No. IPR2023-00786, Notice of Stipulation regarding Invalidity Contentions, Nov. 1, 2023, 5 pgs.
*Forcepoint LLC* v. *Open Text, Inc.*, PTAB Case No. IPR2023-00786, Patent Owner's Reply to Stipulation, Nov. 3, 2023, 7 pgs.
*Forcepoint LLC* v. *Open Text, Inc.*, PTAB Case No. IPR2023-00786, Exhibit 2013: Defendant Forcepoint LLC's Final Invalidity Contentions, Nov. 3, 2023, 394 pgs.
*Forcepoint LLC* v. *Open Text, Inc.*, PTAB Case No. IPR2023-00786, Decision denying Institution of Inter Partes Review, Nov. 9, 2023, 24 pgs.
*Forcepoint LLC* v. *Open Text, Inc.*, PTAB Case No. IPR2023-00786, Petitioner's Request for Rehearing, Nov. 22, 2023, 12 pgs.
*Forcepoint LLC* v. *Open Text, Inc.*, PTAB Case No. IPR2023-00786, Petitioner's Unopposed Motion to Withdraw Request for Rehearing of the Board's Decision Denying Inter Partes Review, Nov. 22, 2023, 5 pgs.
*Forcepoint LLC* v. *Webroot, Inc. and Open Text, Inc.*, Case No. IPR2023-00784, Petitioner's Forcepoint LLC's Updated Mandatory Notices Pursuant to 37 CFR § 42.8, Oct. 25, 2023, 5 pgs.
*Forcepoint LLC* v. *Webroot, Inc. and Open Text, Inc.*, Case No. IPR2023-00784, Order Conduct of the Proceeding, Oct. 30, 2023, 4 pgs.
*Forcepoint LLC* v. *Webroot, Inc. and Open Text, Inc.*, Case No. IPR2023-00784, Petitioner Forcepoint LLC's Notice of Stipulation regarding Invalidity Contentions, Nov. 1, 2023, 5 pgs.
*Forcepoint LLC* v. *Webroot, Inc. and Open Text, Inc.*, Case No. IPR2023-00784, Patent Owner's Reply to Stipulation, Nov. 3, 2023, 7 pgs.
*Forcepoint LLC* v. *Webroot, Inc. and Open Text, Inc.*, Case No. IPR2023-00784, Exhibit 2013: Final Invalidity Contentions, 394 pgs.
*Forcepoint LLC* v. *Webroot, Inc. and Open Text, Inc.*, Case No. IPR2023-00784, Decision denying Institution of Inter Partes Review, Nov. 13, 2023, 27 pgs.
*Forcepoint LLC* v. *Webroot, Inc. and Open Text, Inc.*, Case No. IPR2023-00784, Petitioner's Request for Rehearing, Nov. 27, 2023, 12 pgs.
*Forcepoint LLC* v. *Webroot, Inc. and Open Text, Inc.*, Case No. IPR2023-00784, Petitioner's Unopposed Motion to Withdraw its Request for Rehearing of the Board's Decision Denying Inter Partes Review, Dec. 12, 2023, 5 pgs.
*Forcepoint LLC* v. *Webroot, Inc. and Open Text, Inc.*, Case No. IPR2023-00784, Order granting Petitioner's Unopposed Motion to Withdraw its Request for Rehearing of the Board's Decision Denying Inter Partes Review, Dec. 13, 2023, 3 pgs.
*Sophos Ltd. and Sophos Inc.* v. *Webroot Inc.*, PTAB Case No. PGR2023-00031, Decision denying Institution of Post-Grant Review, Nov. 29, 2023, 33 pgs.
*AO Kaspersky Lab* v. *Webroot Inc.*, PTAB Case No. IPR2023-01160, Patent Owner's Preliminary Response, Nov. 21, 2023, 60 pgs.
*AO Kaspersky Lab* v. *Webroot Inc.*, PTAB Case No. IPR2023-01160, Exhibit 2001: Declaration Of Sam Malek, Ph.D., Nov. 21, 2023, 37 pgs.
*AO Kaspersky Lab* v. *Webroot Inc.*, PTAB Case No. IPR2023-01160, Exhibit 2002: Curriculum Vitae of Sam Malek, Ph.D., Nov. 21, 2023, 36 pgs.
*AO Kaspersky Lab* v. *Webroot Inc.*, PTAB Case No. IPR2023-01160, Exhibit 2003: *Webroot, Inc., Open Text Inc.*, v. *AO Kaspersky Lab et al.*, Case No. 6:22-cv-00243-ADA-DTG, Claim Construction Order, Dkt. 391 (W.D. Tex Jul. 25, 2023), Nov. 21, 2023, 19 pgs.
*AO Kaspersky Lab* v. *Webroot Inc.*, PTAB Case No. IPR2023-01160, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), Nov. 21, 2023, 17 pgs.
*AO Kaspersky Lab* v. *Webroot Inc.*, PTAB Case No. IPR2023-01160, Exhibit 2005: *mCom IP, LLC,* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), Nov. 21, 2023, 7 pgs.
*AO Kaspersky Lab* v. *Webroot Inc.*, PTAB Case No. IPR2023-01160, Exhibit 2006: Intellectual *Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), Nov. 21, 2023, 8 pgs.
*AO Kaspersky Lab* v. *Webroot Inc.*, PTAB Case No. IPR2023-01160, Exhibit 2007: Email dated Nov. 8, 2023 from David Holt to Trials@USPTO.gov re *CrowdStrike* v *Open Text* / Webroot IPRs: Request to File Motions to Terminate, Nov. 21, 2023, 1 pg.
*AO Kaspersky Lab* v. *Webroot Inc.*, PTAB Case No. IPR2023-01160, Exhibit 2008: Email dated Nov. 13, 2023 from Trials@USPTO.gov to David Holt RE: *CrowdStrike* v *Open Text* / Webroot IPRs: Request to File Motions to Terminate, Nov. 21, 2023, 2 pgs.
*AO Kaspersky Lab* v. *Webroot Inc.*, PTAB Case No. IPR2023-01160, Exhibit 2009: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), Nov. 21, 2023, 2 pgs.
*AO Kaspersky Lab* v. *Webroot Inc.*, PTAB Case No. IPR2023-01160, Exhibit 2010: Dani Kass, "Catching Up On Patent Litigation With Judge Albright" (Law360 Mar. 14, 2023); https://www.law360.com/pulse/articles/1582438/print?section=pulse/courts, Nov. 21, 2023, 3 pgs.
*AO Kaspersky Lab* v. *Webroot Inc.*, PTAB Case No. IPR2023-01160, Exhibit 2011: *Webroot, Inc. and Open Text Inc.*, v. *AO Kaspersky Lab et al.*, Case No. 6:22-cv-243-ADA-DTG, Unopposed Motion to Modify the Scheduling Order, Dkt. 468 (W.D. Tex. Oct. 23, 2023) , Nov. 21, 2023, 10 pgs.
*AO Kaspersky Lab* v. *Webroot Inc.*, PTAB Case No. IPR2023-01160, Exhibit 2012: *Webroot, Inc., Open Text Inc.*, v. *AO Kaspersky Lab et al.*, Case No. 6:22-cv-00243-ADA-DTG, Order Granting Fifth Amended Scheduling Order, Dkt. 252 (W.D. Tex., Mar. 29, 2023) , Nov. 21, 2023, 9 pgs.
*AO Kaspersky Lab* v. *Webroot Inc.*, PTAB Case No. IPR2023-01160, Exhibit 2013: *Webroot, Inc. and Open Text Inc.*, v. *AO Kaspersky Lab*, Case No. 6:22-cv-00243-ADA-DTG, Defendant's AO Kaspersky Lab's Preliminary Invalidity Contentions, Appendix C (W.D. Tex., Feb. 21, 23) (excerpted) , Nov. 21, 2023, 4 pgs.
*AO Kaspersky Lab* v. *Webroot Inc.*, PTAB Case No. IPR2023-01160, Exhibit 2014: *Webroot, Inc. and Open Text Inc.*, v. *Sophos Ltd.*, Case No. 6:22-cv-00240-ADA-DTG, Defendant Sophos Ltd.'s Final Invalidity Contentions (W.D. Tex., Nov. 1, 2023) (excerpted), Nov. 21, 2023, 22 pgs.
*AO Kaspersky Lab* v. *Webroot Inc.*, PTAB Case No. IPR2023-01160, Exhibit 2015: *Webroot, Inc. and Open Text Inc.*, v. *AO Kaspersky Lab*, Case No. 6:22-cv-00243-ADA, Second Amended Complaint for Patent Infringement, Dkt. 122 (W.D. Tex., Dec. 9, 2022) , Nov. 21, 2023, 227 pgs.
*AO Kaspersky Lab* v. *Webroot Inc.*, PTAB Case No. IPR2023-01160, Exhibit 2016: *Webroot, Inc. and Open Text Inc.*, v. *Forcepoint LLC*, Case No. 6:22-cv-00342-ADA, Defendant Forcepoint LLC's Final Invalidity, (W.D. Tex., Nov. 1, 2023) (excerpted), Nov. 21, 2023, 89 pgs.
*AO Kaspersky Lab* v. *Webroot Inc.*, PTAB Case No. IPR2023-01160, Exhibit 2017: *Webroot, Inc. and Open Text Inc.*, v. *Trend Micro Inc.*, Case No. 6:22-cv-00243-ADA, Defendant's Final Invalidity Contentions (W.D. Tex., Nov. 1, 2023) (excerpted), Nov. 21, 2023, 7 pgs.

(56) References Cited

OTHER PUBLICATIONS

*AO Kaspersky Lab v. Webroot Inc.*, PTAB Case No. IPR2023-01160, Decision denying institution of Inter Parties Review, Feb. 7, 2024, 27 pgs.
*Crowdstrike, Inc. v. Webroot Inc.*, PTAB Case No. IPR2023-01053, Joint Motion to Terminate Proceeding, Nov. 20, 2023, 10 pgs.
*Crowdstrike, Inc. v. Webroot Inc.*, PTAB Case No. IPR2023-01053, Joint Request to Treat Agreement as Business Confidential Information, Nov. 20, 2023, 5 pgs.
*Crowdstrike, Inc. v. Webroot Inc.*, PTAB Case No. IPR2023-01053, Decision, Settlement Prior to Institution of Trial, Dec. 4, 2023, 5 pgs.
*Crowdstrike, Inc. v. Webroot Inc.*, PTAB Case No. IPR2023-01053, Exhibit 3001: email, Dec. 21, 2023, 2 pgs.
*Crowdstrike, Inc. v. Webroot Inc.*, PTAB Case No. IPR2023-00289, Updated Joint Stipulation to Modify Due Dates, Oct. 20, 2023, 4 pgs.
*Crowdstrike, Inc. v. Webroot Inc.*, PTAB Case No. IPR2023-00289, Second Updated Joint Stipulation to Modify Due Dates, Nov. 7, 2023, 4 pgs.
*Crowdstrike, Inc. v. Webroot Inc.*, PTAB Case No. IPR2023-00289, Panel Change Order, Nov. 9, 2023, 3 pgs.
*Crowdstrike, Inc. v. Webroot Inc.*, PTAB Case No. IPR2023-00289, Third Updated Joint Stipulation to Modify Due Dates, Nov. 16, 2023, 4 pgs.
*Crowdstrike, Inc. v. Webroot Inc.*, PTAB Case No. IPR2023-00289, Joint Motion to Terminate Proceeding, Nov. 20, 2023, 9 pgs.
*Crowdstrike, Inc. v. Webroot Inc.*, PTAB Case No. IPR2023-00289, Joint Request to Treat Agreement as Business Confidential Information, Nov. 20, 2023, 5 pgs.
*Crowdstrike, Inc. v. Webroot Inc.*, PTAB Case No. IPR2023-00289, Patent Owner's Response, Dec. 21, 2023, 72 pgs.
*Crowdstrike, Inc. v. Webroot Inc.*, PTAB Case No. IPR2023-00289, Exhibit 2018: Transcript of Wenke Lee, Ph.D., Dec. 21, 2023, 86 pgs.
*Crowdstrike, Inc. v. Webroot Inc.*, PTAB Case No. IPR2023-00289, Exhibit 2019: Declaration of Professor Nenad Medvidovic, Dec. 21, 2023, 87 pgs.
*Crowdstrike, Inc. v. Webroot Inc.*, PTAB Case No. IPR2023-00289, Exhibit 2020: *Webroot, Inc. v. Open Text Inc. v. AO Kaspersky Lab, et al.*, Case No. 22-cv-00243-ADA-DTG, Open Claim Construction Brief from: OA Kaspersky Lab et al., Dkt. 86 (W.D. Tex. Oct. 28, 2022) (excerpted), Dec. 21, 2023, 29 pgs.
*Crowdstrike, Inc. v. Webroot Inc.*, PTAB Case No. IPR2023-00289, Decision Granting Institution of Inter Partes Review and granting Motion for Joinder, Dec. 21, 2023, 10 pgs.
*Crowdstrike, Inc. v. Webroot Inc.*, PTAB Case No. IPR2023-00289, Order of Settlement as to Crowdstrike, Jan. 4, 2024, 5 pgs.
*Crowdstrike, Inc. v. Webroot Inc.*, PTAB Case No. IPR2023-00289, Exhibit 3001: email, Dec. 21, 2023, 2 pgs.
*Sophos Ltd. and Sophos Inc. v. Webroot Inc.*, PTAB Case No. IPR2023-00699, Patent Owner's Objections to Evidence submitted by Petitioner, Oct. 25, 2023, 6 pgs.
*Sophos Ltd. and Sophos Inc. v. Webroot Inc.*, PTAB Case No. IPR2023-00699, Petitioner's Updated Mandatory Notices, Nov. 27, 2023, 5 pgs.
*Sophos Ltd. and Sophos Inc. v. Webroot Inc.*, PTAB Case No. IPR2023-00699, Patent Owner's Response, Jan. 2, 2024, 80 pgs.
*Sophos Ltd. and Sophos Inc. v. Webroot Inc.*, PTAB Case No. IPR2023-00699, Exhibit 2015: Declaration of Nanad Medvidovic, Ph.D., Jan. 2, 2024, 76 pgs.
*Sophos Ltd. and Sophos Inc. v. Webroot Inc.*, PTAB Case No. IPR2023-00699, Exhibit 2016: Excerpt of Dr. Richard Newman Deposition Transcript, Jan. 2, 2024, 21 pgs.
*Sophos Ltd. and Sophos Inc. v. Webroot Inc.*, PTAB Case No. IPR2023-00699, Exhibit 2017: Gheorghescu—Automated Virus Classification System, Jan. 2, 2024, 7 pgs.
*Crowdstrike, Inc. v. Webroot Inc.*, PTAB Case No. IPR2023-00556, Panel Change Order, Nov. 8, 2023, 3 pgs.
*Crowdstrike, Inc. v. Webroot Inc.*, PTAB Case No. IPR2023-00556, Joint Stipulation to Modify Due Date 1, Nov. 16, 2023, 4 pgs.
*Crowdstrike, Inc. v. Webroot Inc.*, PTAB Case No. IPR2023-00556, Joint Motion to Terminate Proceeding, Nov. 20, 2023, 9 pgs.
*Crowdstrike, Inc. v. Webroot Inc.*, PTAB Case No. IPR2023-00556, Joint Request to Treat Agreement as Business Confidential Information, Nov. 20, 2023, 5 pgs.
*Crowdstrike, Inc. v. Webroot Inc.*, PTAB Case No. IPR2023-00556, Revised Scheduling Order, Jan. 2, 2024, 4 pgs.
*Crowdstrike, Inc. v. Webroot Inc.*, PTAB Case No. IPR2023-01050, Joint Request to Treat Agreement as Business Confidential Information, Nov. 20, 2023, 5 pgs.
*Crowdstrike, Inc. v. Webroot Inc.*, PTAB Case No. IPR2023-01050, Joint Motion to Terminate Proceeding, Nov. 20, 2023, 9 pgs.
*Crowdstrike, Inc. v. Webroot Inc.*, PTAB Case No. IPR2023-01050, Decision, Settlement Prior to Institution of Trial, Dec. 4, 2023, 5 pgs.
*Crowdstrike, Inc. v. Webroot Inc.*, PTAB Case No. IPR2023-01050, Exhibit 3001: Email regarding Joint Motion to Terminate Proceeding, Dec. 4, 2023, 2 pgs.
Request for Ex Parte Reexamination of U.S. Pat. No. 10,599,844 under 35 U.S.C. § 302 and 37 C.F.R. § 1.510, U.S. Appl. No. 90/015,286, filed Aug. 31, 2023, 85 pgs.
Exhibit 1001: U.S. Pat. No. 10,599,844 to Request for Ex Parte Reexamination of U.S. Pat. No. 10,599,844, U.S. Appl. No. 90/015,286, filed Aug. 31, 2023, 16 pgs.
Exhibit 1002: File History of U.S. Pat. No. 10,599,844 to Request for Ex Parte Reexamination of U.S. Pat. No. 10,599,844, U.S. Appl. No. 90/015,286, filed Aug. 31, 2023, 459 pgs.
Exhibit 1003: Declaration of Dr. Markus Jakobsson to Request for Ex Parte Reexamination of U.S. Pat. No. 10,599,844, U.S. Appl. No. 90/015,286, filed Aug. 31, 2023, 132 pgs.
Exhibit 1004: U.S. Patent Pub. No. 2012/0317644 to Kumar et al. to Request for Ex Parte Reexamination of U.S. Pat. No. 10,599,844, U.S. Appl. No. 90/015,286, filed Aug. 31, 2023, 17 pgs.
Exhibit 1005: Mal-ID: Automatic Malware Detection Using Common Segment Analysis and Meta-Features by Gil Tahan et al. to Request for Ex Parte Reexamination of U.S. Pat. No. 10,599,844, U.S. Appl. No. 90/015,286, filed Aug. 31, 2023, 32 pgs.
Exhibit 1006: U.S. Pat. No. 10,666,676 to Hsu et al. to Request for Ex Parte Reexamination of U.S. Pat. No. 10,599,844, U.S. Appl. No. 90/015,286, filed Aug. 31, 2023, 21 pgs.
Exhibit 1007: 22-cv-00243, Dkt. 304, Plaintiffs' Responsive Claim Construction Brief ("Responsive Markman Brief, Dkt. 304") to Request for Ex Parte Reexamination of U.S. Pat. No. 10,599,844, U.S. Appl. No. 90/015,286, filed Aug. 31, 2023, 71 pgs.
Exhibit 1008: Declaration of June Ann Munford to Request for Ex Parte Reexamination of U.S. Pat. No. 10,599,844, U.S. Appl. No. 90/015,286, filed Aug. 31, 2023, 51 pgs.
Exhibit 1009: 22-cv-00243, Dkt. 98, Plaintiffs' Responsive Claim Construction Brief to Request for Ex Parte Reexamination of U.S. Pat. No. 10,599,844, U.S. Appl. No. 90/015,286, filed Aug. 31, 2023, 87 pgs.
Exhibit 1010: 22-cv-00243, Dkt. 236 Claim Construction Order to Request for Ex Parte Reexamination of U.S. Pat. No. 10,599,844, U.S. Appl. No. 90/015,286, filed Aug. 31, 2023, 21 pgs.
Exhibit 1011: Declaration of Dr. Ingrid Hsieg Yee to Request for Ex Parte Reexamination of U.S. Pat. No. 10,599,844, U.S. Appl. No. 90/015,286, filed Aug. 31, 2023, 99 pgs.
Exhibit 1012: U.S. Patent Application No. 2013/0326625 to Anderson et al. to Request for Ex Parte Reexamination of U.S. Pat. No. 10,599,844, U.S. Appl. No. 90/015,286, filed Aug. 31, 2023, 83 pgs.
Exhibit 1013: U.S. Pat. No. 8,266,698 to Seshardi et al. to Request for Ex Parte Reexamination of U.S. Pat. No. 10,599,844, U.S. Appl. No. 90/015,286, filed Aug. 31, 2023, 17 pgs.
Exhibit 1014: U.S. Pat. No. 9,489,514 to Mankin et al. to Request for Ex Parte Reexamination of U.S. Pat. No. 10,599,844, U.S. Appl. No. 90/015,286, filed Aug. 31, 2023, 13 pgs.
Exhibit 1015: Intrusion Detection Using The Support Vector Machine Enhanced With A Feature—Weight Kernel by Songlun Zhao et al. to Request for Ex Parte Reexamination of U.S. Pat. No. 10,599,844, U.S. Appl. No. 90/015,286, filed Aug. 31, 2023, 89 pgs.

(56) References Cited

OTHER PUBLICATIONS

Exhibit 1016: Intrusion Detection Using Neural Networks and Support Vector Machines by Srinivas Mukkamala et al. to Request for Ex Parte Reexamination of U.S. Pat. No. 10,599,844, U.S. Appl. No. 90/015,286, filed Aug. 31, 2023, 7 pgs.
Exhibit 1017: Classification of Malicious Domain Names using Support Vector Machine and Bi-gram Method by Nhauo Davuth et al. to Request for Ex Parte Reexamination of U.S. Pat. No. 10,599,844, U.S. Appl. No. 90/015,286, filed Aug. 31, 2023, 9 pgs.
Exhibit 1018: Malware behavioral detection and vaccine development by using a support vector model classifier by Ping Wang et al. to Request for Ex Parte Reexamination of U.S. Pat. No. 10,599,844, U.S. Appl. No. 90/015,286, filed Aug. 31, 2023, 16 pgs.
Exhibit 1019: U.S. Patent Publication No. 2008/0319932 to Wentau Yih et al. to Request for Ex Parte Reexamination of U.S. Pat. No. 10,599,844, U.S. Appl. No. 90/015,286, filed Aug. 31, 2023, 27 pgs.
Exhibit 1020: Comparative Analysis of Combinations of Dimension Reduction and Data Mining Techniques for Malware Detection, by Proceso L. Fernandez Jr. et al. to Request for Ex Parte Reexamination of U.S. Pat. No. 10,599,844, U.S. Appl. No. 90/015,286, filed Aug. 31, 2023, 10 pgs.
Exhibit 1021: U.S. Pat. No. 9,349,103 to Eberhardt, III et al. to Request for Ex Parte Reexamination of U.S. Pat. No. 10,599,844, U.S. Appl. No. 90/015,286, filed Aug. 31, 2023, 25 pgs.
Exhibit 1022: U.S. Pat. No. 9,043,894 to Dennison et al. to Request for Ex Parte Reexamination of U.S. Pat. No. 10,599,844, U.S. Appl. No. 90/015,286, filed Aug. 31, 2023, 49 pgs.
Exhibit 1023: U.S. Pat. No. 9,306,971 to Altman et al. to Request for Ex Parte Reexamination of U.S. Pat. No. 10,599,844, U.S. Appl. No. 90/015,286, filed Aug. 31, 2023, 10 pgs.
Exhibit 1024: FIRMA: Malware Clustering and Network Signature Generation with Mixed Network Behaviors by M. Zubair Rafique to Request for Ex Parte Reexamination of U.S. Pat. No. 10,599,844, U.S. Appl. No. 90/015,286, filed Aug. 31, 2023, 21 pgs.
Exhibit 1025: IPR2023-00528—*Sophos, Inc* v. *Open Text Inc et al.*, Petition for IPR, Paper 1, to Request for Ex Parte Reexamination of U.S. Pat. No. 10,599,844, U.S. Appl. No. 90/015,286, filed Aug. 31, 2023, 87 pgs.
Exhibit 1026: IPR2023-00662—*Trend Micro, Inc* v. *Webroot, Inc et al.* Petition for IPR, Paper 2, to Request for Ex Parte Reexamination of U.S. Pat. No. 10,599,844, U.S. Appl. No. 90/015,286, filed Aug. 31, 2023, 86 pgs.
Exhibit 1027: IPR2023-01053—*CrowdStrike, Inc.* v. *Webroot Inc.*, Petitioner for IPR, Paper 2, to Request for Ex Parte Reexamination of U.S. Pat. No. 10,599,844, U.S. Appl. No. 90/015,286, filed Aug. 31, 2023, 85 pgs.
Exhibit 1028: U.S. Pat. No. 11,409,869 to Request for Ex Parte Reexamination of U.S. Pat. No. 10,599,844, U.S. Appl. No. 90/015,286, filed Aug. 31, 2023, 17 pgs.
Information Disclosure Statement submitted with Request for Ex Parte Reexamination of U.S. Pat. No. 10,599,844, U.S. Appl. No. 90/015,286, filed Aug. 31, 2023, 4 pgs.
Notice of Assignment of Reexamination Request issued in U.S. Appl. No. 90/015,286, dated Sep. 15, 2023, 1 pg.
Notice of Reexamination Request Filing Date issued in U.S. Appl. No. 90/015,286, dated Sep. 15, 2023, 1 pg.
Order Granting Request for Ex Parte Reexamination issued in U.S. Appl. No. 90/015,286, dated Sep. 15, 2023, 17 pgs.
*Trend Micro, Inc.* v. *Webroot Inc.*, PTAB Case No. IPR2023-01390, Patent Owner Open Text Inc.'s Mandatory Notices Pursuant to 37 CFR § 42.8(b), Sep. 28, 2023, 6 pgs.
*Trend Micro, Inc.* v. *Webroot Inc.*, PTAB Case No. IPR2023-01390, Patent Owner's Preliminary Response, Dec. 18, 2023, 32 pgs.
*Trend Micro, Inc.* v. *Webroot Inc.*, PTAB Case No. IPR2023-01390, Exhibit 2001: Declaration Of Matthew L. Boney In Support Of Patent Owner's Preliminary Response, Dec. 18, 2023, 1 pg.
*Trend Micro, Inc.* v. *Webroot Inc.*, PTAB Case No. IPR2023-01390, Exhibit 2002: Assignment of U.S. Publication No. 2007/0006310 A1 from Paul Piccard to Webroot Software, Inc. executed Jun. 30, 2005 and Corrective Assignment, Dec. 18, 2023, 5 pgs.

*Trend Micro, Inc.* v. *Webroot Inc.*, PTAB Case No. IPR2023-01390, Exhibit 2003: Paul Piccard LinkedIn, Dec. 18, 2023, 4 pgs.
*Trend Micro, Inc.* v. *Webroot Inc.*, PTAB Case No. IPR2023-01390, Exhibit 2004: Assignment of U.S. Appl. No. 11/408,146 from Matthew L. Boney to Webroot Software, Inc. executed on Jun. 7, 2006, Dec. 18, 2023, 4 pgs.
*Trend Micro, Inc.* v. *Webroot Inc.*, PTAB Case No. IPR2023-01390, Exhibit 2005: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), Dec. 18, 2023, 7 pgs.
*Trend Micro, Inc.* v. *Webroot Inc.*, PTAB Case No. IPR2023-01390, Exhibit 2006: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), Dec. 18, 2023, 7 pgs.
*Trend Micro, Inc.* v. *Webroot Inc.*, PTAB Case No. IPR2023-01390, Exhibit 2007: Intellectual *Ventures I LLC et al.* v. *Hewlett Packard Enterprise Co.*, No. 6:21-cv-00596—*Trend Micro, Inc.* v. *Webroot Inc.*, PTAB Case No. IPR2023-01391, Exhibit ADA, Order Denying Hewlett Packard Enterprise Company's Opposed Motion to Stay Pending Resolution of Inter Partes Review, Dkt. 104 (W.D. Tex., Dec. 22, 2022), Dec. 18, 2023, 8 pgs.
*Trend Micro, Inc.* v. *Webroot Inc.*, PTAB Case No. IPR2023-01390, Exhibit 2008: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), Dec. 18, 2023, 2 pgs.
*Trend Micro, Inc.* v. *Webroot Inc.*, PTAB Case No. IPR2023-01390, Exhibit 2009: Dani Kass, "Catching Up On Patent Litigation With Judge Albright" (Law360 Mar. 14, 2023), Dec. 18, 2023, 3 pgs.
*Trend Micro, Inc.* v. *Webroot Inc.*, PTAB Case No. IPR2023-01390, Exhibit 2010: *Webroot, Inc. and Open Text Inc.*, v. *Trend Micro, Inc et al.*, Case No. 6:22-cv-243-ADA-DTG, Amend the Schedule Order, Dkt. 521 (W.D. Tex. Dec. 7, 2023), Dec. 18, 2023, 4 pgs.
*Trend Micro, Inc.* v. *Webroot Inc.*, PTAB Case No. IPR2023-01390, Exhibit 2011: *Webroot, Inc. and Open Text Inc.*, v. *Sophos Ltd.*, Case No. 6:22-cv-00240-ADA-DTG, Defendant Sophos Ltd.'s Final Invalidity Contentions (W.D. Tex., Nov. 1, 2022) (excerpted), Dec. 18, 2023, 11 pgs.
*Trend Micro, Inc.* v. *Webroot Inc.*, PTAB Case No. IPR2023-01390, Exhibit 2012: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), Dec. 18, 2023, 19 pgs.
*Trend Micro, Inc.* v. *Webroot Inc.*, PTAB Case No. IPR2023-01390, Exhibit 2013: USPTO Assignment Record for U.S. Pub. No. 2009/0144826 A2 (Prior U.S. Pub. No. 2007/0006310 A1), U.S. Appl. No. 11/171,924, filed Jun. 30, 2005, issued Jun. 4, 2009, Dec. 18, 2023, 2 pgs.
*Trend Micro, Inc.* v. *Webroot Inc.*, PTAB Case No. IPR2023-01390, Exhibit 2014: USPTO Assignment Record for U.S. Pat. No. 8,201,243, U.S. Pub. No. 2007/0250817 A1, U.S. Appl. No. 11/408,146, filed Apr. 20, 2006, issued Jun. 12, 2012, Dec. 18, 2023, 3 pgs.
*Trend Micro, Inc.* v. *Webroot Inc.*, PTAB Case No. IPR2023-01390, Decision denying Institution of Inter Partes Review, Feb. 17, 2024, 9 pgs.
*Trend Micro, Inc.* v. *Webroot Inc.*, PTAB Case No. IPR2023-01391, Patent Owner Open Text Inc.'s Mandatory Notices Pursuant to 37 CFR § 42.8(b), Sep. 28, 2023, 6 pgs.
*Trend Micro, Inc.* v. *Webroot Inc.*, PTAB Case No. IPR2023-01391, Patent Owner's Preliminary Response, Dec. 18, 2023, 32 pgs.
*Trend Micro, Inc.* v. *Webroot Inc.*, PTAB Case No. IPR2023-01391, Exhibit 2001: Declaration Of Matthew L. Boney In Support Of Patent Owner's Preliminary Response, Dec. 18, 2023, 1 pg.
*Trend Micro, Inc.* v. *Webroot Inc.*, PTAB Case No. IPR2023-01391, Exhibit 2002: Assignment of U.S. Publication No. 2007/0006310 A1 from Paul Piccard to Webroot Software, Inc. executed Jun. 30, 2005 and Corrective Assignment, Dec. 18, 2023, 5 pgs.
*Trend Micro, Inc.* v. *Webroot Inc.*, PTAB Case No. IPR2023-01391, Exhibit 2003: Paul Piccard LinkedIn, Dec. 18, 2023, 4 pgs.

(56) References Cited

OTHER PUBLICATIONS

Trend Micro, Inc. v. Webroot Inc., PTAB Case No. IPR2023-01391, Exhibit 2004: Assignment of U.S. Appl. No. 13/490,294 from Matthew L. Boney to Webroot Software, Inc. executed on Jun. 7, 2006, Dec. 18, 2023, 4 pgs.
Trend Micro, Inc. v. Webroot Inc., PTAB Case No. IPR2023-01391, Exhibit 2005: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), Dec. 18, 2023, 7 pgs.
Trend Micro, Inc. v. Webroot Inc., PTAB Case No. IPR2023-01391, Exhibit 2006: *mCom IP, LLC v. Cisco Systems, Inc.*, Case No. 6:22-cv-00261- ADA, Order Denying Defendant's Motion to Stay Pending Inter Partes Review, Dkt. 42 (W.D. Tex., Oct. 20, 2022), Dec. 18, 2023, 7 pgs.
Trend Micro, Inc. v. Webroot Inc., PTAB Case No. IPR2023-01391, Exhibit 2007: *Intellectual Ventures I LLC et al. v. Hewlett Packard Enterprise Co.*, No. 6:21-cv-00596—Trend Micro, Inc. v. Webroot Inc., PTAB Case No. IPR2023-01391, Exhibit ADA, Order Denying Hewlett Packard Enterprise Company's Opposed Motion to Stay Pending Resolution of Inter Partes Review, Dkt. 104 (W.D. Tex., Dec. 22, 2022), Dec. 18, 2023, 8 pgs.
Trend Micro, Inc. v. Webroot Inc., PTAB Case No. IPR2023-01391, Exhibit 2008: *Webroot, Inc. and Open Text Inc., v. AO Kaspersky Lab et al.*, Case No. 6:22-cv- 243-ADA-DTG, Dec. 9, 2022 Transcript of Motions Hearing, Dkt. 133 (W.D. Tex. Dec. 15, 2022) (excerpted), Dec. 18, 2023, 2 pgs.
Trend Micro, Inc. v. Webroot Inc., PTAB Case No. IPR2023-01391, Exhibit 2009: Dani Kass, "Catching Up On Patent Litigation With Judge Albright" (Law360 Mar. 14, 2023), Dec. 18, 2023, 3 pgs.
Trend Micro, Inc. v. Webroot Inc., PTAB Case No. IPR2023-01391, Exhibit 2010: *Webroot, Inc. and Open Text Inc., v. Trend Micro, Inc et al.*, Case No. 6:22-cv-243- ADA-DTG, Amend the Schedule Order, Dkt. 521 (W.D. Tex. Dec. 7, 2023), Dec. 18, 2023, 4 pgs.
Trend Micro, Inc. v. Webroot Inc., PTAB Case No. IPR2023-01391, Exhibit 2011: *Webroot, Inc. and Open Text Inc., v. Sophos Ltd.*, Case No. 6:22-cv-00240-ADA-DTG, Defendant Sophos Ltd.'s Final Invalidity Contentions (W.D. Tex., Nov. 1, 2022) (excerpted), Dec. 18, 2023, 11 pgs.
Trend Micro, Inc. v. Webroot Inc., PTAB Case No. IPR2023-01391, Exhibit 2012: *Webroot, Inc. and Open Text Inc., v. AO Kaspersky Lab et al.*, Case No. 6:22-cv- 243-ADA-DTG, Claim Construction Order, Dkt. 391 (W.D. Tex. Jul. 25, 2023), Dec. 18, 2023, 19 pgs.
Trend Micro, Inc. v. Webroot Inc., PTAB Case No. IPR2023-01391, Exhibit 2013: USPTO Assignment Record for U.S. Pub. No. 2009/0144826 A2 (Prior U.S. Pub. No. 2007/0006310 A1), U.S. Appl. No. 11/171,924, filed Jun. 30, 2005, issued Jun. 4, 2009, Dec. 18, 2023, 2 pgs.
Trend Micro, Inc. v. Webroot Inc., PTAB Case No. IPR2023-01391, Exhibit 2014: USPTO Assignment Record for U.S. Pat. No. 8,719,932, U.S. Pub. No. 2012/0246722 A1, U.S. Appl. No. 13/490,294, filed Jun. 26, 2012, issued May 6, 2014, Dec. 18, 2023, 3 pgs.
Trend Micro, Inc. v. Webroot Inc., PTAB Case No. IPR2023-01391, Decision denying Institution of Inter Partes Review, Feb. 17, 2024, 9 pgs.
Trend Micro, Inc. v. Webroot Inc., PTAB Case No. IPR2023-01380, Patent Owner Open Text Inc.'s Mandatory Notices pursuant to 37 CFR § 42.8(b), Sep. 26, 2023, 9 pgs.
Trend Micro, Inc. v. Webroot Inc., PTAB Case No. IPR2023-01380, Notice of Filing Date Accorded to Petition and Time for filing Patent Owner Preliminary Response, Sep. 26, 2023, 6 pgs.
Trend Micro, Inc. v. Webroot Inc., PTAB Case No. IPR2023-01380, Patent Owner's Preliminary Response, Dec. 21, 2023, 75 pgs.
Trend Micro, Inc. v. Webroot Inc., PTAB Case No. IPR2023-01380, Exhibit 2001: Declaration Of Sam Malek, Ph.D., Dec. 21, 2023, 55 pgs.
Trend Micro, Inc. v. Webroot Inc., PTAB Case No. IPR2023-01380, Exhibit 2002: Curriculum Vitae of Sam Malek, Ph.D., Feb. 14, 2023, 36 pgs.
Trend Micro, Inc. v. Webroot Inc., PTAB Case No. IPR2023-01380, Exhibit 2003: *Webroot, Inc., Open Text Inc., v. AO Kaspersky Lab et al.*, Case No. 6:22-cv-00243-ADA-DTG, Order Granting Amended Scheduling Order, Dkt. 521 (W.D. Tex., Dec. 7, 2023), 4 pgs.
Trend Micro, Inc. v. Webroot Inc., PTAB Case No. IPR2023-01380, Exhibit 2004: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
Trend Micro, Inc. v. Webroot Inc., PTAB Case No. IPR2023-01380, Exhibit 2005: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
Trend Micro, Inc. v. Webroot Inc., PTAB Case No. IPR2023-01380, Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
Trend Micro, Inc. v. Webroot Inc., PTAB Case No. IPR2023-01380, Exhibit 2007: *Webroot, Inc. and Open Text Inc., v. AO Kaspersky Lab et al.*, Case No. 6:22-cv-243-ADA-DTG, Claim Construction Order, Dkt. 236 (W.D. Tex., Mar. 16, 2023), 20 pgs.
Trend Micro, Inc. v. Webroot Inc., PTAB Case No. IPR2023-01380, Exhibit 2008: Dani Kass, "Catching Up On Patent Litigation With Judge Albright" (Law360 Mar. 14, 2023) at https://www.law360.com/pulse/articles/1582438/print?section= pulse/courts, 3 pgs.
Trend Micro, Inc. v. Webroot Inc., PTAB Case No. IPR2023-01380, Exhibit 2009: *Webroot, Inc. and Open Text Inc., v. AO Kaspersky Lab et al.*, Case No. 6:22-cv-243-ADA-DTG, Claim Construction Order, Dkt. 391 (W.D. Tex. Jul. 25, 2023), 19 pgs.
Trend Micro, Inc. v. Webroot Inc., PTAB Case No. IPR2023-01380, Exhibit 2010: *Webroot, Inc. and Open Text Inc., v. AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.
Trend Micro, Inc. v. Webroot Inc., PTAB Case No. IPR2023-01380, Exhibit 2011: *Webroot, Inc. and Open Text Inc., v. Trend Micro, Inc.*, Case No. 6:22- CV-00239-ADA, Complaint for Patent Infringement, Dkt. 1 (W.D. Tex., Mar. 4, 2022), 6 pgs.
Trend Micro, Inc. v. Webroot Inc., PTAB Case No. IPR2023-01380, Exhibit 2012: *Webroot, Inc. and Open Text Inc., v. AO Kaspersky Lab*, Case No. 6:22- CV-00243-ADA-DTG, Defendant's Preliminary Invalidity Contentions Appendix C (W.D. Tex., Sep. 14, 2022), 4 pgs.
Trend Micro, Inc. v. Webroot Inc., PTAB Case No. IPR2023-01380, Exhibit 2013: *Webroot, Inc. and Open Text Inc., v. Sophos Ltd.*, Case No. 6:22-cv-00240-ADA-DTG, Defendant Sophos Ltd.'s Final Invalidity Contentions (W.D. Tex., Nov. 1, 2023) (excerpted), 4 pgs.
Trend Micro, Inc. v. Webroot Inc., PTAB Case No. IPR2023-01380, Exhibit 2014: *Webroot, Inc. and Open Text Inc., v. Trend Micro Inc.*, Case No. 6:22-cv-00239-ADA-DTG,: Defendant's Final Invalidity Contentions (W.D. Tex., Nov. 1, 2023) (excerpted), 7 pgs.
Trend Micro, Inc. v. Webroot Inc., PTAB Case No. IPR2023-01380, Joint Motion to Terminate Proceedings, Feb. 19, 2024, 16 pgs.
Trend Micro, Inc. v. Webroot Inc., PTAB Case No. IPR2023-01380, Joint Request to Treat Agreement as Confidential Information, Feb. 19, 2024, 7 pgs.
Trend Micro, Inc. v. Webroot Inc., PTAB Case No. IPR2023-01380, Decision—Settlement prior to Institution of Trial, Feb. 28, 2024, 5 pgs.
Trend Micro, Inc. v. Webroot Inc., PTAB Case No. IPR2023-01389, Notice of Filing Date Accorded to Petition and Time for Filing Patent Owner Preliminary Response, Sep. 26, 2023, 6 pgs.
Trend Micro, Inc. v. Webroot Inc., PTAB Case No. IPR2023-01389, Patent Owner Open Text Inc.'s Mandatory Notices Pursuant to 37 CFR § 42.8(b), Sep. 28, 2023,.
Trend Micro, Inc. v. Webroot Inc., PTAB Case No. IPR2023-01389, Patent Owner's Preliminary Response, Dec. 22, 2023, 72 pgs.
Trend Micro, Inc. v. Webroot Inc., PTAB Case No. IPR2023-01389, Exhibit 2001: Declaration of Ron Schnell, 26 pgs.

(56) References Cited

OTHER PUBLICATIONS

*Trend Micro, Inc.* v. *Webroot Inc.*, PTAB Case No. IPR2023-01389, Exhibit 2002: Curriculum Vitae of Ron Schnell, 5 pgs.

*Trend Micro, Inc.* v. *Webroot Inc.*, PTAB Case No. IPR2023-01389, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 5 pgs.

*Trend Micro, Inc.* v. *Webroot Inc.*, PTAB Case No. IPR2023-01389, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Trend Micro, Inc.* v. *Webroot Inc.*, PTAB Case No. IPR2023-01389, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Trend Micro, Inc.* v. *Webroot Inc.*, PTAB Case No. IPR2023-01389, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*Trend Micro, Inc.* v. *Webroot Inc.*, PTAB Case No. IPR2023-01389, Exhibit 2007: Dani Kass, "Catching Up On Patent Litigation With Judge Albright" (Law360 Mar. 14, 2023), 3 pgs.

*Trend Micro, Inc.* v. *Webroot Inc.*, PTAB Case No. IPR2023-01389, Exhibit 2008: *Webroot, Inc. and Open Text Inc.*, v. *Trend Micro, Inc et al.*, Case No. 6:22-cv-243-ADA-DTG, Amend the Schedule Order, Dkt. 521 (W.D. Tex. Dec. 7, 2023), 4 pgs.

*Trend Micro, Inc.* v. *Webroot Inc.*, PTAB Case No. IPR2023-01389, Exhibit 2009: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), 19 pgs.

*Trend Micro, Inc.* v. *Webroot Inc.*, PTAB Case No. IPR2023-01389, Exhibit 2010: *Webroot, Inc. and Open Text Inc.*, v. *Sophos Ltd.*, Case No. 6:22-cv-240-ADA-DTG, Defendant Sophos Ltd.'s Final Invalidity Contentions—Claim Chart 505-A-21, Garfinkel, (W.D. Tex. Nov. 1, 2023) (excerpted), 30 pgs.

*Trend Micro, Inc.* v. *Webroot Inc.*, PTAB Case No. IPR2023-01389, Exhibit 2011: *Webroot, Inc. and Open Text Inc.*, v. *Sophos Ltd.*, Case No. 6:22-cv-240-ADA-DTG, Defendant Sophos Ltd.'s Final Invalidity Contentions—Claim Chart 505-A-22 ("Hoglund") (W.D. Tex. Nov. 1, 2023) (excerpted), 32 pgs.

*Trend Micro, Inc.* v. *Webroot Inc.*, PTAB Case No. IPR2023-01389, Exhibit 2012: Wayback Machine re symposium website address, https://web.archive.org/web/20230000000000*/https:/www.ndss-symposium.org/ndss2003/, 3 pgs.

*Trend Micro, Inc.* v. *Webroot Inc.*, PTAB Case No. IPR2023-01389, Exhibit 2013: Network and Distributed System Security Symposium conference proceedings—2003 [electronic resource]: NDSS '03 Symposium; https://science-catalogue.canada.ca/record=b2011094~S6, 3 pgs.

*Trend Micro, Inc.* v. *Webroot Inc.*, PTAB Case No. IPR2023-01389, Order: Conduct of the Proceeding, Jan. 29, 2024, 5 pgs.

*Trend Micro, Inc.* v. *Webroot Inc.*, PTAB Case No. IPR2023-01389, Exhibit 3001: Jan. 29, 2024 Joint email re: Petitioner's Request for Leave to file Appendices Missing from Dr. Yee's Declaration, 2 pgs.

*Trend Micro, Inc.* v. *Webroot Inc.*, PTAB Case No. IPR2023-01389, Joint Motion to Terminate Proceedings, Feb. 19, 2024, 9 pgs.

*Trend Micro, Inc.* v. *Webroot Inc.*, PTAB Case No. IPR2023-01389, Joint Request to Treat Agreement as Confidential Information, Feb. 19, 2024, 6 pgs.

*Trend Micro, Inc.* v. *Webroot Inc.*, PTAB Case No. IPR2023-01389, Decision—Settlement prior to Institution of Trial, Feb. 28, 2024, 5 pgs.

*Trend Micro, Inc.* v. *Webroot Inc.*, PTAB Case No. IPR2023-01392, Notice of Accepting Corrected Petition, Sep. 26, 2023, 2 pgs.

*Trend Micro, Inc.* v. *Webroot Inc.*, PTAB Case No. IPR2023-01392, Patent Owner Open Text Inc.'s Mandatory Notices Pursuant to 37 CFR § 42.8(b), Sep. 28, 2023, 10 pgs.

*Trend Micro, Inc.* v. *Webroot Inc.*, PTAB Case No. IPR2023-01392, Corrected Petition for Inter Partes Review of U.S. Pat. No. 8181244, Oct. 26, 2023, 87 pgs.

*Trend Micro, Inc.* v. *Webroot Inc.*, PTAB Case No. IPR2023-01392, Exhibit 1020: Redlined Petition for Inter Partes Review of U.S. Pat. No. 8181244, Oct. 26, 2023, 94 pgs.

*Trend Micro, Inc.* v. *Webroot Inc.*, PTAB Case No. IPR2023-01392, Patent Owner's Preliminary Response, Dec. 18, 2023, 32 pgs.

*Trend Micro, Inc.* v. *Webroot Inc.*, PTAB Case No. IPR2023-01392, Exhibit 2001: Declaration Of Matthew L. Boney In Support Of Patent Owner's Preliminary Response, 1 pg.

*Trend Micro, Inc.* v. *Webroot Inc.*, PTAB Case No. IPR2023-01392, Exhibit 2002: Assignment of U.S. Patent Publication No. 2007/0006310 A1 from Paul Piccard to Webroot Software, Inc. executed Jun. 30, 2005 and Corrective Assignment, 5 pgs.

*Trend Micro, Inc.* v. *Webroot Inc.*, PTAB Case No. IPR2023-01392, Exhibit 2003: Paul Piccard LinkedIn, 4 pgs.

*Trend Micro, Inc.* v. *Webroot Inc.*, PTAB Case No. IPR2023-01392, Exhibit 2004: Assignment of U.S. Appl. No. 11/408,145 from Matthew L. Boney to Webroot Software, Inc. executed on Jun. 7, 2006, 4 pgs.

*Trend Micro, Inc.* v. *Webroot Inc.*, PTAB Case No. IPR2023-01392, Exhibit 2005: USPTO Assignment Record for U.S. Pub. No. 2009/0144826 A2 (Prior U.S. Pub. No. 2007/0006310 A1), U.S. Appl. No. 11/171,924, filed Jun. 30, 2005, issued Jun. 4, 2009, 2 pgs.

*Trend Micro, Inc.* v. *Webroot Inc.*, PTAB Case No. IPR2023-01392, Exhibit 2006: USPTO Assignment Record for U.S. Pat. No. 8,181,244, U.S. Pub. No. 2007/0250928 A1, U.S. Appl. No. 11/408,145, filed Apr. 20, 2006, issued May 15, 2012, 3 pgs.

*Trend Micro, Inc.* v. *Webroot Inc.*, PTAB Case No. IPR2023-01392, Exhibit 2007: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Trend Micro, Inc.* v. *Webroot Inc.*, PTAB Case No. IPR2023-01392, Exhibit 2008: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Trend Micro, Inc.* v. *Webroot Inc.*, PTAB Case No. IPR2023-01392, Exhibit 2009: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Trend Micro, Inc.* v. *Webroot Inc.*, PTAB Case No. IPR2023-01392, Exhibit 2010: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*Trend Micro, Inc.* v. *Webroot Inc.*, PTAB Case No. IPR2023-01392, Exhibit 2011: Dani Kass, "Catching Up On Patent Litigation With Judge Albright" (Law360 Mar. 14, 2023), 3 pgs.

*Trend Micro, Inc.* v. *Webroot Inc.*, PTAB Case No. IPR2023-01392, Exhibit 2012: *Webroot, Inc. and Open Text Inc.*, v. *Trend Micro, Inc et al.*, Case No. 6:22-cv-243-ADA-DTG, Amend the Schedule Order, Dkt. 521 (W.D. Tex. Dec. 7, 2023), 4 pgs.

*Trend Micro, Inc.* v. *Webroot Inc.*, PTAB Case No. IPR2023-01392, Exhibit 2013: *Webroot, Inc. and Open Text Inc.*, v. *Sophos Ltd.*, Case No. 6:22-cv-00240-ADA-DTG, Defendant Sophos Ltd.'s Final Invalidity Contentions (W.D. Tex., Nov. 1, 2022) (excerpted), 16 pgs.

*Trend Micro, Inc.* v. *Webroot Inc.*, PTAB Case No. IPR2023-01392, Exhibit 2014: *Webroot, Inc. and Open Text Inc.*, v. *AO Kaspersky Lab et al.*, Case No. 6:22-cv-243-ADA-DTG, Claim Construction Order, Dkt. 391 (W.D. Tex. Jul. 25, 2023), 19 pgs.

*Trend Micro, Inc.* v. *Webroot Inc.*, PTAB Case No. IPR2023-01392, Joint Request to Treat Agreement as Confidential Information, Feb. 19, 2024, Feb. 19, 2024, 7 pgs.

(56) References Cited

OTHER PUBLICATIONS

*Trend Micro, Inc.* v. *Webroot Inc.,* PTAB Case No. IPR2023-01392, Joint Motion to Terminate Proceedings, Feb. 19, 2024, 9 pgs.

*Trend Micro, Inc.* v. *Webroot Inc.,* PTAB Case No. IPR2023-01392, Decision—Settlement prior to Institution of Trial, Feb. 28, 2024, 5 pgs.

*Trend Micro, Inc.* v. *Webroot Inc.,* PTAB Case No. IPR2024-00106, Patent Owner's Opposition to Petitioner's Motion for Joinder, Dec. 8, 2023, 18 pgs.

*Trend Micro, Inc.* v. *Webroot Inc.,* PTAB Case No. IPR2024-00106, Exhibit 2001: *Webroot, Inc. and Open Text, Inc.'s* v. *Trend Micro Inc.,* Case No. 6:22- CV-0239-ADA-DTG, Defendants' Preliminary Invalidity Contentions, dated Sep. 13, 2022 (W.D. Tex), 125 pgs.

*Trend Micro, Inc.* v. *Webroot Inc.,* PTAB Case No. IPR2024-00106, Exhibit 2002: *Webroot, Inc. and Open Text, Inc.'s* v. *Trend Micro Inc.,* Case No. 6:22-cv-0239-ADA-DTG, Defendants' Final Invalidity Contentions, dated Nov. 1, 2023 (W.D. Tex), 168 pgs.

*Trend Micro, Inc.* v. *Webroot Inc.,* PTAB Case No. IPR2024-00106, Exhibit 2003: *Webroot, Inc. and Open Text, Inc.'s* v. *Trend Micro Inc.,* Case No. 6:22-cv-0239-ADA-DTG, Order to Amend the Scheduling Order, Dkt. 521, dated Dec. 7, 2023 (W.D. Tex), 4 pgs.

*Trend Micro, Inc.* v. *Webroot Inc.,* PTAB Case No. IPR2024-00106, Joint Request to Treat Agreement as Business Confidential Information, Feb. 19, 2024, 6 pgs.

*Trend Micro, Inc.* v. *Webroot Inc.,* PTAB Case No. IPR2024-00106, Joint Motion to Terminate Proceedings, Feb. 19, 2024, 8 pgs.

*Trend Micro, Inc.* v. *Webroot Inc.,* PTAB Case No. IPR2024-00106, Patent Owner's Preliminary Response, Feb. 22, 2024, 19 pgs.

*Trend Micro, Inc.* v. *Webroot Inc.,* PTAB Case No. IPR2024-00106, Exhibit 2004: Email from B. Hansen to Trials@USPTO.gov, cc: B. Eutermoser et al. re Request for permission to file joint motions to terminate five IPRs: IPR 2023-01380, IPR 2023-01389, IPR 2023-01392, IPR2023-01459, and IPR2024- 00106, dated Feb. 15, 2024, 42 pgs.

*Trend Micro, Inc.* v. *Webroot Inc.,* PTAB Case No. IPR2024-00106, Exhibit 2005: Email from Trials@USPTO.gov to Bob Hansen et al. re Authorized to file joint motion to terminate and request to file settlement agreement as CBI, dated Feb. 16, 2024, 2 pgs.

*Trend Micro, Inc.* v. *Webroot Inc.,* PTAB Case No. IPR2024-00106, Exhibit 2006: *Trend Micro, Inc.* v. *Open Text, Inc.,* IPR2024-00106, Joint Motion to Terminate Proceedings (P.T.A.B. Feb. 19, 2024), 8 pgs.

*Trend Micro, Inc.* v. *Webroot Inc.,* PTAB Case No. IPR2024-00106, Decision—Settlement prior to Institution of Trial, Feb. 28, 2024, 5 pgs.

*AO Kaspersky Lab* v. *Webroot Inc.,* PTAB Case No. IPR2023-01011, Termination due to Settlement after Institution of Trial, Apr. 17, 2024, 5 pgs.

*AO Kaspersky Lab* v. *Webroot Inc.,* PTAB Case No. IPR2023-01199, Panel Change Order, Conduct of the Proceeding, 37 CFR § 42.5, Feb. 23, 2024, 3 pgs.

*AO Kaspersky Lab* v. *Webroot Inc.,* PTAB Case No. IPR2023-01199, Termination due to Settlement after Institution of Trial, Apr. 17, 2024, 5 pgs.

*Sophos Ltd. and Sophos Inc.* v. *Webroot Inc.,* PTAB Case No. IPR2024-00252, Notice of Filing Date Accorded to Petition and Time for Filing Patent Owner Preliminary Response, Dec. 22, 2023, 6 pgs.

*Sophos Ltd. and Sophos Inc.* v. *Webroot Inc.,* PTAB Case No. IPR2024-00252, Patent Owner Open Text Inc.'s Mandatory Notices Pursuant to 37 CFR § 42.8(b), Dec. 29, 2023, 10 pgs.

*Sophos Ltd. and Sophos Inc.* v. *Webroot Inc.,* PTAB Case No. IPR2024-00252, Patent Owner's Preliminary Response, Mar. 22, 2023, 62 pgs.

*Sophos Ltd. and Sophos Inc.* v. *Webroot Inc.,* PTAB Case No. IPR2024-00252, Exhibit 2001: Declaration of Professor Ron Schnell (Patent Owner Exhibit 2001, PR2023-00731), Aug. 10, 2023, 41 pgs.

*Sophos Ltd. and Sophos Inc.* v. *Webroot Inc.,* PTAB Case No. IPR2024-00252, Exhibit 2002: Curriculum Vitae of Professor Ron Schnell (Patent Owner Exhibit 2002, IPR2023-00731), Feb. 2005, 5 pgs.

*Sophos Ltd. and Sophos Inc.* v. *Webroot Inc.,* PTAB Case No. IPR2024-00252, Exhibit 2003: Defendant Sophos Ltd.'s Preliminary Invalidity Contentions for Patens Plaintiffs Added by Amendment, 13 pgs.

*Sophos Ltd. and Sophos Inc.* v. *Webroot Inc.,* PTAB Case No. IPR2024-00252, Exhibit 2004: *Webroot, Inc. and Open Text Inc.,* v. *Sophos Ltd.,* Case No. 6:22-cv-00240-ADA-DTG, Defendant's Final Invalidity Contentions Against Counterclaim Plaintiff Sophos Ltd. (W.D. Tex., Nov. 1, 2023) (excerpted), 16 pgs.

*Sophos Ltd. and Sophos Inc.* v. *Webroot Inc.,* PTAB Case No. IPR2024-00252, Exhibit 2005: *Webroot, Inc. and Open Text Inc.,* v. *AO Kaspersky Lab et al.,* Case No. 6:22-cv-243-ADA-DTG, Claim Construction Order, Dkt. 391 (W.D. Tex. Jul. 25, 2022), 19 pgs.

*Sophos Ltd. and Sophos Inc.* v. *Webroot Inc.,* PTAB Case No. IPR2024-00252, Exhibit 2006: Email from Timothy Best (counsel for Petitioner) to trials@uspto.gov re IPR Proceedings: IPR2023-00699; IPR2024-00252; and IPR2024-00253, dated Mar. 20, 2024, 2 pgs.

*Sophos Ltd. and Sophos Inc.* v. *Webroot Inc.,* PTAB Case No. IPR2024-00252, Exhibit 2007: *Sophos Ltd. & Sophos Inc.* v. *Open Text Inc.,* Case IPR2023-00732,EX-3002: Email dated Oct. 16, 2023 from trials@uspto.gov to Timothy Best (counsel for Petitioner), 3 pgs.

*Sophos Ltd. and Sophos Inc.* v. *Webroot Inc.,* PTAB Case No. IPR2024-00252, Joint Motion to Terminate Proceeding, Mar. 22, 2024, 9 pgs.

*Sophos Ltd. and Sophos Inc.* v. *Webroot Inc.,* PTAB Case No. IPR2024-00252, Joint Request to Treat Agreements as Business Confidential Information, Mar. 29, 2024, 5 pgs.

*Sophos Ltd. and Sophos Inc.* v. *Webroot Inc.,* PTAB Case No. IPR2024-00252, Termination due to Settlement before Institution of Trial, Apr. 2, 2024, 5 pgs.

*Sophos Ltd. and Sophos Inc.* v. *Webroot Inc.,* PTAB Case No. IPR2024-00253, Notice of Filing Date Accorded to Petition and Time for Filing Patent Owner Preliminary Response, Dec. 22, 2023, 6 pgs.

*Sophos Ltd. and Sophos Inc.* v. *Webroot Inc.,* PTAB Case No. IPR2024-00253, Patent Owner Open Text Inc.'s Mandatory Notices Pursuant to 37 CFR § 42.8(b), Dec. 29, 2023, 10 pgs.

*Sophos Ltd. and Sophos Inc.* v. *Webroot Inc.,* PTAB Case No. IPR2024-00253, Patent Owner's Preliminary Response, Mar. 22, 2023, 61 pgs.

*Sophos Ltd. and Sophos Inc.* v. *Webroot Inc.,* PTAB Case No. IPR2024-00253, Exhibit 2001: Declaration of Professor Ron Schnell (Patent Owner Exhibit 2001, IPR2023-00732), Aug. 10, 2023, 41 pgs.

*Sophos Ltd. and Sophos Inc.* v. *Webroot Inc.,* PTAB Case No. IPR2024-00253, Exhibit 2002: Curriculum Vitae of Professor Ron Schnell (Patent Owner Exhibit 2002, IPR2023-00732), Feb. 2005, 5 pgs.

*Sophos Ltd. and Sophos Inc.* v. *Webroot Inc.,* PTAB Case No. IPR2024-00253, Exhibit 2003: *Webroot, Inc. and Open Text Inc.,* v. *Sophos Ltd.,* Case No. 6:22-cv-00240-ADA-DTG, Defendant's Preliminary Invalidity Contentions (W.D. Tex., Feb. 21, 2023) (excerpted), 13 pgs.

*Sophos Ltd. and Sophos Inc.* v. *Webroot Inc.,* PTAB Case No. IPR2024-00253, Exhibit 2004: *Webroot, Inc. and Open Text Inc.,* v. *Sophos Ltd.,* Case No. 6:22-cv-00240-ADA-DTG, Defendant's Final Invalidity Contentions Against Counterclaim Plaintiff Sophos Ltd. (W.D. Tex., Nov. 1, 2023) (excerpted), 16 pgs.

*Sophos Ltd. and Sophos Inc.* v. *Webroot Inc.,* PTAB Case No. IPR2024-00253, Exhibit 2005: *Webroot, Inc. and Open Text Inc.,* v. *AO Kaspersky Lab et al.,* Case No. 6:22-cv-243-ADA-DTG, Claim Construction Order, Dkt. 391 (W.D. Tex. Jul. 25, 2022), 19 pgs.

*Sophos Ltd. and Sophos Inc.* v. *Webroot Inc.,* PTAB Case No. IPR2024-00253, Exhibit 2006: Email from Timothy Best (counsel for Petitioner) to trials@uspto.gov re IPR Proceedings: IPR2023-00699; IPR2024-00252; and IPR2024-00253, dated Mar. 20, 2024.

(56) References Cited

OTHER PUBLICATIONS

*Sophos Ltd. and Sophos Inc. v. Webroot Inc.*, PTAB Case No. IPR2024-00253, Exhibit 2007: *Sophos Ltd. & Sophos Inc. v. Open Text Inc.*, Case IPR2023-00732, EX-3002: Email dated Oct. 16, 2023 from trials@uspto.gov to Timothy Best (counsel for Petitioner), 3 pgs.
*Sophos Ltd. and Sophos Inc. v. Webroot Inc.*, PTAB Case No. IPR2024-00253, Joint Motion to Terminate Proceeding, Mar. 29, 2024, 9 pgs.
*Sophos Ltd. and Sophos Inc. v. Webroot Inc.*, PTAB Case No. IPR2024-00253, Joint Request to Treat Agreements as Business Confidential Information, Mar. 29, 2024, 5 pgs.
*Sophos Ltd. and Sophos Inc. v. Webroot Inc.*, PTAB Case No. IPR2024-00253, Termination due to Settlement before Institution of Trial, Apr. 2, 2024, 5 pgs.
*AO Kaspersky Lab v. Open Text Inc.*, PTAB Case No. IPR2024-00297, Notice of Filing Date According to Petition and Time for Filing Patent Owner Preliminary Response, Dec. 22, 2023, 6 pgs.
*AO Kaspersky Lab v. Open Text Inc.*, PTAB Case No. IPR2024-00297, Patent Owner Open Text Inc.'s Mandatory Notices Pursuant to 37 CFR § 42.8(b), Dec. 29, 2023, 10 pgs.
*AO Kaspersky Lab v. Open Text Inc.*, PTAB Case No. IPR2024-00297, Patent Owner's Preliminary Response, Mar. 22, 2024, 29 pgs.
*AO Kaspersky Lab v. Open Text Inc.*, PTAB Case No. IPR2024-00297, Exhibit 2001: Declaration Of Matthew L. Boney In Support Of Patent Owner's Preliminary Response, 1 pgs.
*AO Kaspersky Lab v. Open Text Inc.*, PTAB Case No. IPR2024-00297, Exhibit 2002: Assignment of U.S. Publication No. 2007/0016951 A1 from Paul Piccard and Michael Greene to Webroot Software, Inc. executed Jul. 11, 2005 and Jul. 7, 2005, 5 pgs.
*AO Kaspersky Lab v. Open Text Inc.*, PTAB Case No. IPR2024-00297, Exhibit 2003: Paul Piccard LinkedIn, 4 pgs.
*AO Kaspersky Lab v. Open Text Inc.*, PTAB Case No. IPR2024-00297, Exhibit 2004: Michael P. Greene LinkedIn, 6 pgs.
*AO Kaspersky Lab v. Open Text Inc.*, PTAB Case No. IPR2024-00297, Exhibit 2005: Assignment of U.S. Appl. No. 13/490,294 from Matthew L. Boney to Webroot Software, Inc. executed on Jun. 7, 2006, 4 pgs.
*AO Kaspersky Lab v. Open Text Inc.*, PTAB Case No. IPR2024-00297, Exhibit 2006: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*AO Kaspersky Lab v. Open Text Inc.*, PTAB Case No. IPR2024-00297, Exhibit 2007: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*AO Kaspersky Lab v. Open Text Inc.*, PTAB Case No. IPR2024-00297, Exhibit 2008: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*AO Kaspersky Lab v. Open Text Inc.*, PTAB Case No. IPR2024-00297, Exhibit 2009: *Webroot, Inc. and Open Text Inc., v. AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.
*AO Kaspersky Lab v. Open Text Inc.*, PTAB Case No. IPR2024-00297, Exhibit 2010: Dani Kass, "Catching Up On Patent Litigation With JudgeAlbright" (Law360 Mar. 14, 2023), 3 pgs.
*AO Kaspersky Lab v. Open Text Inc.*, PTAB Case No. IPR2024-00297, Exhibit 2011: *Webroot, Inc. and Open Text Inc., v. Trend Micro, Inc et al.*, Case No. 6:22-cv-243-ADA-DTG, Seventh Amended Schedule Order, Dkt. 566 (W.D. Tex. Feb. 23, 2024), 3 pgs.
*AO Kaspersky Lab v. Open Text Inc.*, PTAB Case No. IPR2024-00297, Exhibit 2012: *Webroot, Inc. and Open Text Inc., v. AO Kaspersky Lab.*, Case No. 6:22-cv-00243-ADA-DTG, Defendants' Second Amended Invalidity Contentions (W.D. Tex., Jan. 19, 2024) (excerpted), 6 pgs.
*AO Kaspersky Lab v. Open Text Inc.*, PTAB Case No. IPR2024-00297, Exhibit 2013: *Webroot, Inc. and Open Text Inc., v. AO Kaspersky Lab et al.*, Case No. 6:22-cv-243-ADA-DTG, Claim Construction Order, Dkt. 391 (W.D. Tex. Jul. 25, 2023), 19 pgs.
*AO Kaspersky Lab v. Open Text Inc.*, PTAB Case No. IPR2024-00297, Exhibit 2014: USPTO Assignment Record for U.S. Pub. No. 2007/0016951 A1, U.S. Appl. No. 11/180,161, filed Jul. 13, 2005, published on Jan. 18, 2007, 2 pgs.
*AO Kaspersky Lab v. Open Text Inc.*, PTAB Case No. IPR2024-00297, Exhibit 2015: USPTO Assignment Record for U.S. Pat. No. 8,719,932, U.S. Pub. No. 2012/0246722 A1, U.S. Appl. No. 13/490,294, filed Jun. 26, 2012, issued May 6, 2014, 3 pgs.
*AO Kaspersky Lab v. Open Text Inc.*, PTAB Case No. IPR2024-00297, Joint Motion to Terminate Proceeding, Apr. 12, 2024, 9 pgs.
*AO Kaspersky Lab v. Open Text Inc.*, PTAB Case No. IPR2024-00297, Joint Request to Treat Agreement as Business Confidential Information, Apr. 12, 2024, 5 pgs.
*AO Kaspersky Lab v. Open Text Inc.*, PTAB Case No. IPR2024-00297, Decision, Joint Motion to Terminate and Request to Keep Confidential, Apr. 18, 2024, 4 pgs.
*AO Kaspersky Lab v. Open Text Inc.*, PTAB Case No. IPR2024-00297, Exhibit 3001: Attorney Correspondence, Apr. 9, 2024, 2 pgs.
*Crowdstrike, Inc. v. Webroot Inc.*, PTAB Case No. IPR2023-00556, Decision Granting Institution of Inter Partes Review, Jan. 25, 2024, 7 pgs.
*Crowdstrike, Inc. v. Webroot Inc.*, PTAB Case No. IPR2023-00556, Second Revised Scheduling Order, Jan. 25, 2024, 4 pgs.
*Crowdstrike, Inc. v. Webroot Inc.*, PTAB Case No. IPR2023-00556, Decision Granting Institution of Inter Partes Review, Jan. 29, 2024, 8 pgs.
*Crowdstrike, Inc. v. Webroot Inc.*, PTAB Case No. IPR2023-00556, Order, Termination as to Crowdstrike, Inc. due to Settlement, Feb. 6, 2024, 6 pgs.
*Crowdstrike, Inc. v. Webroot Inc.*, PTAB Case No. IPR2023-00556, Joint Stipulation to Modify Due Dates 1, 2 and 3, Feb. 22, 2024, 4 pgs.
*Crowdstrike, Inc. v. Webroot Inc.*, PTAB Case No. IPR2023-00556, Order, Termination as to Trend Micro, Inc. due to Settlement, Feb. 28, 2024, 5 pgs.
*Crowdstrike, Inc. v. Webroot Inc.*, PTAB Case No. IPR2023-00556, Patent Owner's Response, Mar. 29, 2024, 56 pgs.
*Crowdstrike, Inc. v. Webroot Inc.*, PTAB Case No. IPR2023-00556, Joint Motion to Terminate Proceeding, Apr. 12, 2024, 9 pgs.
*Crowdstrike, Inc. v. Webroot Inc.*, PTAB Case No. IPR2023-00556, Joint Request to Treat Agreement as Business Confidential Information, Apr. 12, 2024, 5 pgs.
*Crowdstrike, Inc. v. Webroot Inc.*, PTAB Case No. IPR2023-00556, Termination due to Settlement after Institution of Trial, Apr. 17, 2024, 5 pgs.
*Crowdstrike, Inc. v. Webroot Inc.*, PTAB Case No. IPR2023-00556, Exhibit 3001: Attorney Correspondence, Apr. 17, 24, 2 pgs.
*Sophos Ltd. and Sophos Inc. v. Webroot Inc.*, PTAB Case No. IPR2023-00699, Joint Motion to Terminate Proceedings, Mar. 29, 2024, 9 pgs.
*Sophos Ltd. and Sophos Inc. v. Webroot Inc.*, PTAB Case No. IPR2023-00699, Joint Request to Treat Agreements as Business Confidential Information, Mar. 29, 2024, 5 pgs.
*Sophos Ltd. and Sophos Inc. v. Webroot Inc.*, PTAB Case No. IPR2023-00699, Termination due to Settlement after Institution of Trial, Apr. 5, 2024, 4 pgs.
*AO Kaspersky Lab v. Webroot Inc.*, PTAB Case No. IPR2023-01334, Patent Owner's Preliminary Response, Nov. 28, 2023, 14 pgs.
*AO Kaspersky Lab v. Webroot Inc.*, PTAB Case No. IPR2023-01334, Exhibit 2001: *Webroot, Inc. and Open Text Inc. v. AO Kaspersky Lab*, Complaint for Patent Infringement, Dkt. 1 (W.D. Tex. Mar. 4, 2022), 115 pgs.

(56) References Cited

OTHER PUBLICATIONS

*AO Kaspersky Lab* v. *Webroot Inc.,* PTAB Case No. IPR2023-01334, Exhibit 2002: *Webroot, Inc. and Open Text Inc.* v. *AO Kaspersky Lab,* Waiver of Service of Summons, Dkt. 16 (W.D. Tex. May 25, 2022), 1 pg.

*AO Kaspersky Lab* v. *Webroot Inc.,* PTAB Case No. IPR2023-01334, Exhibit 2003: Email from J. Miotke to trials@uspto.gov re *Crowdstrike* v. *Open Text Inc.*—IPR2023-00126 & IPR2023-01011 (U.S. Pat. No. 10,257,224) and IPR2023-00289 & IPR2023-001334 (U.S. Pat. No. 8,418,250) / Conference Call Request, Nov. 21, 2023, 2 pgs.

*AO Kaspersky Lab* v. *Webroot Inc.,* PTAB Case No. IPR2023-01334, Supplemental Mandatory Notice Under 37 CFR § 42.8(a)(3), Dec. 11, 2023, 7 pgs.

*AO Kaspersky Lab* v. *Webroot Inc.,* PTAB Case No. IPR2023-01334, Decision granting Institution of Inter Partes Review and granting Motion for Joinder, Dec. 21, 2023, 10 pgs.

*AO Kaspersky Lab* v. *Webroot Inc.,* PTAB Case No. IPR2023-01334, Petitioner's Reply to Patent Owner's Response, Feb. 22, 2024, 32 pgs.

*AO Kaspersky Lab* v. *Webroot Inc.,* PTAB Case No. IPR2023-01334, Patent Owner's Request for Oral Argument, Mar. 12, 2024, 4 pgs.

*AO Kaspersky Lab* v. *Webroot Inc.,* PTAB Case No. IPR2023-01334, Termination due to Settlement after Institution of Trial, Apr. 17, 2024, 5 pgs.

*AO Kaspersky Lab* v. *Webroot Inc.,* PTAB Case No. IPR2023-01334, Exhibit 3002, Attorney Correspondence, Apr. 17, 2024, 3 pgs.

*Trend Micro, Inc.* v. *Open Text Inc.,* PTAB Case No. IPR2023-01459, Decision Granting Institution of Inter Partes Review and Granting Motion for Joinder, Jan. 25, 2024, 7 pgs.

*Trend Micro, Inc.* v. *Open Text Inc.,* PTAB Case No. IPR2023-01459, Joint Motion to Terminate Proceedings, Feb. 19, 2024, 9 pgs.

*Trend Micro, Inc.* v. *Open Text Inc.,* PTAB Case No. IPR2023-01459, Request to Treat as Business Confidential Information, Feb. 19, 2024, 7 pgs.

*Trend Micro, Inc.* v. *Open Text Inc.,* PTAB Case No. IPR2023-01459, Termination due to Settlement after Institution of Trial, Apr. 17, 2024, 5 pgs.

*Trend Micro, Inc.* v. *Open Text Inc.,* PTAB Case No. IPR2023-01459, Exhibit 3001: Attorney Correspondence, Apr. 17, 2024, 2 pgs.

*AO Kaspersky Lab* v. *Webroot Inc.,* PTAB Case No. IPR2024-00035, Decision Granting Institution of Inter Partes Review and Granting Motion for Joinder, Jan. 29, 2024, 8 pgs.

*AO Kaspersky Lab* v. *Webroot Inc.,* PTAB Case No. IPR2024-00035, Termination due to Settlement after Institution of Trial, Apr. 17, 2024, 5 pgs.

*AO Kaspersky Lab* v. *Webroot Inc.,* PTAB Case No. IPR2024-00035, Exhibit 3001: Attorney Correspondence, Apr. 17, 2024, 2 pgs.

*Crowdstrike, Inc.* v. *Webroot Inc.,* PTAB Case No. IPR2023-01051, Petition for Inter Partes Review of U.S. Pat. No. 8719932, Jun. 23, 2023, 75 pgs.

*Crowdstrike, Inc.* v. *Webroot Inc.,* PTAB Case No. IPR2023-01051, Exhibit 1001: U.S. Pat. No. 8,719,932, 12 pgs.

*Crowdstrike, Inc.* v. *Webroot Inc.,* PTAB Case No. IPR2023-01051, Exhiibit 1002: File History of U.S. Pat. No. 8,719,932, 120 pgs.

*Crowdstrike, Inc.* v. *Webroot Inc.,* PTAB Case No. IPR2023-01051, Exhiibit 1003: Declaration of Markus Jakobsson, Ph.D., 98 pgs.

*Crowdstrike, Inc.* v. *Webroot Inc.,* PTAB Case No. IPR2023-01051, Exhiibit 1004: U.S. Pat. No. 7,979,889, Gladstone et al., 23 pgs.

*Crowdstrike, Inc.* v. *Webroot Inc.,* PTAB Case No. IPR2023-01051, Exhiibit 1005: U.S. Pat. No. 6,775,780, Muttik, 8 pgs.

*Crowdstrike, Inc.* v. *Webroot Inc.,* PTAB Case No. IPR2023-01051, Exhiibit 1006: U.S. Pat. No. 7,093,292, Pantuso, 12 pgs.

*Crowdstrike, Inc.* v. *Webroot Inc.,* PTAB Case No. IPR2023-01051, Exhiibit 1007: U.S. Pat. No. 8,321,910, English, 10 pgs.

*Crowdstrike, Inc.* v. *Webroot Inc.,* PTAB Case No. IPR2023-01051, Exhiibit 1008: Plaintiffs' Responsive Claim Construction Brief, Dkt. 304, No. 22-cv-00241 (W.D. Texas), 70 pgs.

*Crowdstrike, Inc.* v. *Webroot Inc.,* PTAB Case No. IPR2023-01051, Exhibit 1009: Opening Claim Construction Brief, Dkt. 263, No. 22-cv-00241, (W.D. Texas), 69 pgs.

*Crowdstrike, Inc.* v. *Webroot Inc.,* PTAB Case No. IPR2023-01051, Exhiibit 1010: Richard D. Schneeman, Device Driver Development for Microsoft Windows NT: Accessing Motion Control Hardware Using a Multimedia Framework, 1996, 54 pgs.

*Crowdstrike, Inc.* v. *Webroot Inc.,* PTAB Case No. IPR2023-01051, Exhiibit 1011: U.S. Publication No. 20070174911, Kronenberg, 13 pgs.

*Crowdstrike, Inc.* v. *Webroot Inc.,* PTAB Case No. IPR2023-01051, Exhibit 1012: U.S. Publication No. 20060253584, Dixon et al., 74 pgs.

*Crowdstrike, Inc.* v. *Webroot Inc.,* PTAB Case No. IPR2023-01051, Exhiibit 1013: U.S. Pat. No. 7,434,261, Costea et al., 12 pgs.

*Crowdstrike, Inc.* v. *Webroot Inc.,* PTAB Case No. IPR2023-01051, Exhiibit 1014: U.S. Pat. No. 8,117,659, Hartrell et al., 16 pgs.

*Crowdstrike, Inc.* v. *Webroot Inc.,* PTAB Case No. IPR2023-01051, Exhiibit 1015: Sophos Petition for Inter Partes Review of U.S. Pat. No. 8,719,932, 86 pgs.

*Crowdstrike, Inc.* v. *Webroot Inc.,* PTAB Case No. IPR2023-01051, Exhibit 1016: No. 22-cv-00241, Dkt. 252, Order Granting Fifth Amended Scheduling Order, 9 pgs.

*Crowdstrike, Inc.* v. *Webroot Inc.,* PTAB Case No. IPR2023-01051, Exhibit 1017: No. 22-cv-00243, Dkt. 350, Order Resetting Markman Hearing, 1 pg.

*Crowdstrike, Inc.* v. *Webroot Inc.,* PTAB Case No. IPR2023-01051, Exhiibit 1018: File History of U.S. Pat. No. 8,201,243, 423 pgs.

*Crowdstrike, Inc.* v. *Webroot Inc.,* PTAB Case No. IPR2023-01159, Petition for Inter Partes Review of U.S. Pat. No. 8,856,505 pursuant, 35 U.S.C. §§ 311-319, 37 CFR § 42, Jun. 30, 2023, 87 pgs.

*Crowdstrike, Inc.* v. *Webroot Inc.,* PTAB Case No. IPR2023-01159, Exhibit 1001: U.S. Pat. No. 8,856,505, 11 pgs.

*Crowdstrike, Inc.* v. *Webroot Inc.,* PTAB Case No. IPR2023-01159, Exhibit 1002: Excerpts from the Prosecution History of the '505 Patent, 351 pgs.

*Crowdstrike, Inc.* v. *Webroot Inc.,* PTAB Case No. IPR2023-01159, Exhibit 1003: Declaration of Dr. Markus Jakobsson, 128 pgs.

*Crowdstrike, Inc.* v. *Webroot Inc.,* PTAB Case No. IPR2023-01159, Exhibit 1004: U.S. Publication No. 20080005797 A1, Field, 11 pgs.

*Crowdstrike, Inc.* v. *Webroot Inc.,* PTAB Case No. IPR2023-01159, Exhibit 1005: U.S. Publication No. 20080016339 A1, Shukla, 26 pgs.

*Crowdstrike, Inc.* v. *Webroot Inc.,* PTAB Case No. IPR2023-01159, Exhibit 1006: U.S. Appl. No. 60/806,143, 54 pgs.

*Crowdstrike, Inc.* v. *Webroot Inc.,* PTAB Case No. IPR2023-01159, Exhibit 1007: U.S. Pat. No. 8,239,947 B1, Glick, 25 pgs.

*Crowdstrike, Inc.* v. *Webroot Inc.,* PTAB Case No. IPR2023-01159, Exhibit 1009: U.S. Pat. No. 7,784,098 B1, Fan, 28 pgs.

*Crowdstrike, Inc.* v. *Webroot Inc.,* PTAB Case No. IPR2023-01159, Exhibit 1010: U.S. Pat. No. 7,673,341 B2, Kramer, 16 pgs.

*Crowdstrike, Inc.* v. *Webroot Inc.,* PTAB Case No. IPR2023-01159, Exhibit 1011: Silberschatz, Operating System Concepts (2004), 71 pgs.

*Crowdstrike, Inc.* v. *Webroot Inc.,* PTAB Case No. IPR2023-01159, Exhibit 1012: *Webroot, Inc.* v. *CrowdStrike, Inc.,* Case No. 6:22-cv-00243 ADA, Docket No. 252, "Order Granting Fifth Amended Scheduling Order" (WDTX Mar. 29, 2023), 9 pgs.

*Crowdstrike, Inc.* v. *Webroot Inc.,* PTAB Case No. IPR2023-01159, Exhibit 1013: *Webroot, Inc.* v. *CrowdStrike, Inc.,* Case No. 6:22-cv-00243-ADA, Docket No. 350, "Order Resetting Markman Hearing" (WDTX Jun. 8, 2023), 1 pg.

*Crowdstrike, Inc.* v. *Webroot Inc.,* PTAB Case No. IPR2023-01159, Exhibit 1014: Memorandum: Interim Procedure for Discretionary Denials in AIA Post-Grant Proceedings with Parallel District Court Litigation, Jun. 21, 2022, 9 pgs.

*Crowdstrike, Inc.* v. *Webroot Inc.,* PTAB Case No. IPR2023-01159, Exhibit 1015: U.S. District Courts-Median Time Intervals From

(56) References Cited

OTHER PUBLICATIONS

Filing, Disposition of Civil Cases Terminated, by District and Method of Disposition, During the 12-Month Period Ending Mar. 31, 2023, 95 pgs.
*AO Kaspersky Lab* v. *Webroot Inc.*, PTAB Case No. IPR2023-01160, Petition for Inter Partes Review under 35 U.S.C. § 312 and 37 CFR § 42.104, Jun. 29, 2023, 88 pgs.
*AO Kaspersky Lab* v. *Webroot Inc.*, PTAB Case No. IPR2023-01160, Exhibit 1001: U.S. Pat. No. 11,409,869 (issued Aug. 9, 2022), 16 pgs.
*AO Kaspersky Lab* v. *Webroot Inc.*, PTAB Case No. IPR2023-01160, Exhibit 1002: Declaration of V.S. Subrahmanian, Ph.D. under 37 C.F.R. §1.68, 145 pgs.
*AO Kaspersky Lab* v. *Webroot Inc.*, PTAB Case No. IPR2023-01160, Exhibit 1003: Curriculum Vitae of V.S. Subrahmanian, Ph.D., 77 pgs.
*AO Kaspersky Lab* v. *Webroot Inc.*, PTAB Case No. IPR2023-01160, Exhibit 1004: File History of U.S. Pat. No. 11,409,869, 345 pgs.
*AO Kaspersky Lab* v. *Webroot Inc.*, PTAB Case No. IPR2023-01160, Exhibit 1005: U.S. Patent Publication No. 20150213376, Ideses et al. (published Jul. 30, 2015), 19 pgs.
*AO Kaspersky Lab* v. *Webroot Inc.*, PTAB Case No. IPR2023-01160, Exhibit 1006: U.S. Patent Publication No. 20160154960, Sharma et al. (published Jun. 2, 2016), 29 pgs.
*AO Kaspersky Lab* v. *Webroot Inc.*, PTAB Case No. IPR2023-01160, Exhibit 1007: Charles Ledoux & Arun Lakhotia, Malware and Machine Learning, in Intelligent Methods Cyber Warfare 1 (2014), 42 pgs.
*AO Kaspersky Lab* v. *Webroot Inc.*, PTAB Case No. IPR2023-01160, Exhibit 1008: U.S. Patent Publication No. 20150213365, Ideses et al., 18 pgs.
*AO Kaspersky Lab* v. *Webroot Inc.*, PTAB Case No. IPR2023-01160, Exhibit 1009: Claim Construction Order, Mar. 16, 2023, Case No. 6:22-CV-00243-ADA-DTG, 20 pgs.
*AO Kaspersky Lab* v. *Webroot Inc.*, PTAB Case No. IPR2023-01160, Exhibit 1010: Joint Stipulation Reserving Appellate Rights, Apr. 12, 2023, Case No. 6:22-CV-00243-ADA-DTG, 9 pgs.
*AO Kaspersky Lab* v. *Webroot Inc.*, PTAB Case No. IPR2023-01160, Exhibit 1011: Kris Kendall, Practical Malware Analysis, in Black Hat Conf., USA (Aug. 2007), 10 pgs.
*AO Kaspersky Lab* v. *Webroot Inc.*, PTAB Case No. IPR2023-01160, Exhibit 1012: Hao Helen Zhang et al., Compactly Supported Radial Basis Function Kernels, Inst. Stat. Mimeo Series No. 2570, N. Carolina St. U. Dep't. Stat. 2 (2004), 19 pgs.
*AO Kaspersky Lab* v. *Webroot Inc.*, PTAB Case No. IPR2023-01160, Exhibit 1013: Zane Markel & Michael Bilzor, Building a Machine Learning Classifier for Malware Detection, 2014 Second Workshop Anti-Malware Testing Res. (WATeR) (2014), 4 pgs.
*AO Kaspersky Lab* v. *Webroot Inc.*, PTAB Case No. IPR2023-01160, Exhibit 1014: Naser Peiravian & Xingquan Zhu, Machine Learning for Android Malware Detection Using Permission and API Calls, IEEE 25th Int'l Conf. Tools Artificial Intelligence 300 (2013), 6 pgs.
*AO Kaspersky Lab* v. *Webroot Inc.*, PTAB Case No. IPR2023-01160, Exhibit 1015: Ekta Gandotra et al., Malware Analysis and Classification: A Survey, J. Inf. Security 5, 56-64 (2014), 9 pgs.
*AO Kaspersky Lab* v. *Webroot Inc.*, PTAB Case No. IPR2023-01160, Exhibit 1016: Rafiqul Islam et al., Classification of Malware Based on Integrated Static and Dynamic Features, 36 J. Network Computer Applications, 646 (2012), 11 pgs.
*AO Kaspersky Lab* v. *Webroot Inc.*, PTAB Case No. IPR2023-01160, Exhibit 1017: D. Michael Cai et al., Comparison of Feature Selection And Classification Algorithms In Identifying Malicious Executables, 51(6) Computational Stat. Data Analysis 3156 (2007), 17 pgs.
*AO Kaspersky Lab* v. *Webroot Inc.*, PTAB Case No. IPR2023-01160, Exhibit 1018: Guanhua Yan et al., Exploring Discriminatory Features for Automated Malware Classification, 10 Detection Intrusions Malware, Vulnerability Assessment: 10th Int'l Conf., 41 (2013), 21 pgs.
*AO Kaspersky Lab* v. *Webroot Inc.*, PTAB Case No. IPR2023-01160, Exhibit 1019: Rafiqul Islam et al., Classification of Malware Based on String and Function Feature Selection, 2010 Second Cybercrime Trustworthy Computing Workshop 9 (2010), 9 pgs.
*AO Kaspersky Lab* v. *Webroot Inc.*, PTAB Case No. IPR2023-01160, Exhibit 1020: Eitan Menahem et al., Improving Malware Detection by Applying Multi- Inducer Ensemble, Computational Stat. Data Analysis, 53(4), 1483 (2008), 12 pgs.
*AO Kaspersky Lab* v. *Webroot Inc.*, PTAB Case No. IPR2023-01160, Exhibit 1021: Ianir Ideses & Assaf Neuberger, Adware Detection and Privacy Control in Mobile Devices, in 2014 IEEE 28th Convention Electrical Electronics Engineers Israel 1 (2014), 5 pgs.
*AO Kaspersky Lab* v. *Webroot Inc.*, PTAB Case No. IPR2023-01160, Exhibit 1022: Raja Khurram Shahzad et al., Accurate Adware Detection Using Opcode Sequence Extraction, Sixth Int'l Conf. Availability, Reliability Security 189 (2011), 7 pgs.
*AO Kaspersky Lab* v. *Webroot Inc.*, PTAB Case No. IPR2023-01160, Exhibit 1023: Raymond Canzanese et al., Toward an Automatic, Online Behavioral Malware Classification System, IEEE 7th Int'l Conf. Self-Adaptive Self-Organizing Sys., 111 (2013), 10 pgs.
*AO Kaspersky Lab* v. *Webroot Inc.*, PTAB Case No. IPR2023-01160, Exhibit 1024: Yanfang Ye et al., Automatic Malware Categorization Using Cluster Ensemble, in Proc. 16th ACM SIGKDD Int'l Conf. Knowledge Discovery Data Mining 95 (2010), 10 pgs.
*AO Kaspersky Lab* v. *Webroot Inc.*, PTAB Case No. IPR2023-01160, Exhibit 1025: Asaf Shabtai et al., Detection of Malicious Code by Applying Machine Learning Classifiers on Static Features: A State-Of-The-Art Survey, Info. Security Tech. Rep. 14(1), 16 (2009), 14 pgs.
*AO Kaspersky Lab* v. *Webroot Inc.*, PTAB Case No. IPR2023-01160, Exhibit 1026: A.M. Aswini & P. Vinod, Droid Permission Miner: Mining Prominent Permissions for Android Malware Analysis, Fifth Int'l Conf. Applications Digital Inf. Web Tech. 81 (2014), 6 pgs.
*AO Kaspersky Lab* v. *Webroot Inc.*, PTAB Case No. IPR2023-01160, Exhibit 1027: Konrad Rieck et al., Learning and Classification of Malware Behavior, Detection Intrusions Malware, Vulnerability Assessment: 5th Int'l Conf., 108 (2008), 18 pgs.
*AO Kaspersky Lab* v. *Webroot Inc.*, PTAB Case No. IPR2023-01160, Exhibit 1028: Veelasha Moonsamy et al., Feature Reduction, Speed Up Malware Classification, Inf. Security Tech. Applications: 16th Nordic Conf. Secure It Sys., Tallinn, Est., Oct. 26, 28/2011, Rev. Selected Papers 16, 176 (2012), 13 pgs.
*AO Kaspersky Lab* v. *Webroot Inc.*, PTAB Case No. IPR2023-01160, Exhibit 1029: John P. Dickerson et al., Using Sentiment, Detect Bots on Twitter: Are Humans More Opinionated Than Bots?, IEEE/ACM Int'l Conf. Advances Social Networks Analysis Mining 620 (2014), 8 pgs.
*AO Kaspersky Lab* v. *Webroot Inc.*, PTAB Case No. IPR2023-01160, Exhibit 1030: Wei Yu et al., Towards Neural Network Based Malware Detection on Android Mobile Devices, Cybersecurity Sys. Human Cognition Augmentation 99 (2014), 19 pgs.
*AO Kaspersky Lab* v. *Webroot Inc.*, PTAB Case No. IPR2023-01160, Exhibit 1031: Guanhua Yan et al., 2013. Exploring Discriminatory Features for Automated Malware Classification, Detection Intrusions Malware, Vulnerability Assessment: 10th Int'l Conf., Dimva 2013, Berlin, Ger., Jul. 18-19, 2013 Proc. 10, 41 (2013), 21 pgs.
*AO Kaspersky Lab* v. *Webroot Inc.*, PTAB Case No. IPR2023-01160, Exhibit 1032: Julia Yu-Cheng et al., An Information Retrieval Approach for Malware Classification Based on Windows API Calls, Int'l Conf. Machine Learning Cybernetics 1678 (2013), 6 pgs.
*AO Kaspersky Lab* v. *Webroot Inc.*, PTAB Case No. IPR2023-01160, Exhibit 1033: Zi Chu et al., Detecting Automation of Twitter Accounts: Are You a Human, Bot, or Cyborg?, 9 IEEE Transactions Dependable Secure Computing 6, 811 (Nov./Dec. 2012), 14 pgs.
*AO Kaspersky Lab* v. *Webroot Inc.*, PTAB Case No. IPR2023-01160, Exhibit 1034: Axelle Apvrille, Android Reverse Engineering

(56) References Cited

OTHER PUBLICATIONS

Tools From an Anti-Virus Analyst's Perspective, Fortinet, slides 11-15 (Mar. 2012), http://wikisec.free.fr/papers/insomnidroid.pdf, 69 pgs.
*AO Kaspersky Lab* v. *Webroot Inc.,* PTAB Case No. IPR2023-01160, Exhibit 1035: Li Sun et al., Pattern Recognition Techniques for the Classification of Malware Packers, 15 Proc. Inf. Security Priv.: 15th Australasian Conf., Acisp 2010, Sydney, Austl., Jul. 5-7, 2010, 370, 21 pgs.
*AO Kaspersky Lab* v. *Webroot Inc.,* PTAB Case No. IPR2023-01160, Exhibit 1036: Munkhbayar Bat-Erdene et al., Dynamic Classification of Packing Algorithms for Inspecting Executables Using Entropy Analysis, 8th Int'l Conf. Malicious Unwanted Software: "Americas" (MALWARE) 19, 2013, 8 pgs.
*AO Kaspersky Lab* v. *Webroot Inc.,* PTAB Case No. IPR2023-01160, Exhibit 1037: M. Zubair et al., PE-Probe: Leveraging Packer Detection and Structural Information, Detect Malicious Portable Executables, 8 Proc. Virus Bull. Conf. (2009), 10 pgs.
*Crowdstrike, Inc.* v. *Webroot Inc.,* PTAB Case No. IPR2023-01053, Petition for Inter Partes Review of U.S. Pat. No. 11409869, Jul. 3, 2023, 84 pgs.
*Crowdstrike, Inc.* v. *Webroot Inc.,* PTAB Case No. IPR2023-01053, Exhibit 1001: U.S. Pat. No. 11,409,869, 16 pgs.
*Crowdstrike, Inc.* v. *Webroot Inc.,* PTAB Case No. IPR2023-01053, Exhibit 1002: File History of U.S. Pat. No. 11,409,869, 347 pgs.
*Crowdstrike, Inc.* v. *Webroot Inc.,* PTAB Case No. IPR2023-01053, Exhibit 1003: Declaration of Markus Jakobsson, Ph.D., 122 pgs.
*Crowdstrike, Inc.* v. *Webroot Inc.,* PTAB Case No. IPR2023-01053, Exhibit 1004: U.S. Pat. No. 20120317644, Kumar et al., 16 pgs.
*Crowdstrike, Inc.* v. *Webroot Inc.,* PTAB Case No. IPR2023-01053, Exhibit 1005: Mal-ID: Automatic Malware Detection Using Common Segment Analysis and Meta-Features by Gil Tahan et al., 31 pgs.
*Crowdstrike, Inc.* v. *Webroot Inc.,* PTAB Case No. IPR2023-01053, Exhibit 1006: File History of U.S. Pat. No. 10,599,844, 458 pgs.
*Crowdstrike, Inc.* v. *Webroot Inc.,* PTAB Case No. IPR2023-01053, Exhibit 1007: No. 22-cv-00243, Dkt. 304, Plaintiffs' Responsive Claim Construction Brief, 70 pgs.
*Crowdstrike, Inc.* v. *Webroot Inc.,* PTAB Case No. IPR2023-01053, Exhibit 1008: Declaration of June Ann Munford, 50 pgs.
*Crowdstrike, Inc.* v. *Webroot Inc.,* PTAB Case No. IPR2023-01053, Exhibit 1009: Plaintiffs' Responsive Claim Construction Brief, Dkt. 98, No. 22-cv-00243, (W.D. Texas), 86 pgs.
*Crowdstrike, Inc.* v. *Webroot Inc.,* PTAB Case No. IPR2023-01053, Exhibit 1010: Claim Construction Order, Dkt. 236, No. 22-cv-00243, (W.D. Texas), 20 pgs.
*Crowdstrike, Inc.* v. *Webroot Inc.,* PTAB Case No. IPR2023-01053, Exhibit 1011: *Sophos Inc.* v. *Open Text Inc.,* PGR2023-00031, Paper 1, 119 pgs.
*Crowdstrike, Inc.* v. *Webroot Inc.,* PTAB Case No. IPR2023-01053, Exhibit 1012: *AO Kaspersky Lab* v. *Webroot, Inc.,* IPR2023-01160, Paper 1, 88 pgs.
*Crowdstrike, Inc.* v. *Webroot Inc.,* PTAB Case No. IPR2023-01053, Exhibit 1013: Order Granting Fifth Amended Scheduling Order, Dkt. 252, No. 22-cv-00243, (W.D., Texas), 9 pgs.
*Crowdstrike, Inc.* v. *Webroot Inc.,* PTAB Case No. IPR2023-01053, Exhibit 1014: Order Resetting Markman Hearing, Dkt. 350, No. 22-cv-00243, (W.D. Texas), 1 pg.
*Crowdstrike, Inc.* v. *Webroot Inc.,* PTAB Case No. IPR2023-01053, Exhibit 1015: Declaration of Dr. Ingrid Hsieg Yee, 98 pgs.
*Crowdstrike, Inc.* v. *Webroot Inc.,* PTAB Case No. IPR2023-01053, Exhibit 1016: U.S. Patent Publication No. 20130326625, Anderson et al., 82 pgs.
*Crowdstrike, Inc.* v. *Webroot Inc.,* PTAB Case No. IPR2023-01053, Exhibit 1017: U.S. Pat. No. 8,266,698, Seshardi et al., 16 pgs.
*Crowdstrike, Inc.* v. *Webroot Inc.,* PTAB Case No. IPR2023-01053, Exhibit 1018: U.S. Pat. No. 9,489,514, Mankin et al., 12 pgs.
*Crowdstrike, Inc.* v. *Webroot Inc.,* PTAB Case No. IPR2023-01053, Exhibit 1019: Songlun Zhao et al., Intrusion Detection Using The Support Vector Machine Enhanced With A Feature—Weight Kernel, University of Regina, Sep. 2007, 88 pgs.
*Crowdstrike, Inc.* v. *Webroot Inc.,* PTAB Case No. IPR2023-01053, Exhibit 1020: Srinivas Mukkamala et al., Intrusion Detection Using Neural Networks and Support Vector Machines, IEEE, 2002, 6 pgs.
*Crowdstrike, Inc.* v. *Webroot Inc.,* PTAB Case No. IPR2023-01053, Exhibit 1021: Nhauo Davuth et al., Classification of Malicious Domain Names using Support Vector Machine and Bi-gram Method, International Journal of Security and Its Application, vol. 7, No. 1, Jan. 2013, 8 pgs.
*Crowdstrike, Inc.* v. *Webroot Inc.,* PTAB Case No. IPR2023-01053, Exhibit 1022: Ping Wang et al., Malware behavioral detection and vaccine development by using a support vector model classifier, Journal of Computer and System Sciences, 81, 2015, pp. 1012-1026.
*Crowdstrike, Inc.* v. *Webroot Inc.,* PTAB Case No. IPR2023-01053, Exhibit 1023: M. Zubair Rafique, FIRMA: Malware Clustering and Network Signature Generation with Mixed Network Behaviors, RAID 2013, LNCS 8145, pp. 144-163.
*Crowdstrike, Inc.* v. *Webroot Inc.,* PTAB Case No. IPR2023-01053, Exhibit 1024: U.S. Patent Publication No. 2008/0319932, Wen-tau Yih et al., 26 pgs.
*Crowdstrike, Inc.* v. *Webroot Inc.,* PTAB Case No. IPR2023-01053, Exhibit 1025: Proceso L. Fernandez Jr. et al., Comparative Analysis of Combinations of Dimension Reduction and Data Mining Techniques for Malware Detection, Ateneo de Manila University, 2010, 9 pgs.
*Crowdstrike, Inc.* v. *Webroot Inc.,* PTAB Case No. IPR2023-01053, Exhibit 1026: U.S. Pat. No. 8,418,249, Nucci et al., 30 pgs.
*Crowdstrike, Inc.* v. *Webroot Inc.,* PTAB Case No. IPR2023-01053, Exhibit 1027: U.S. Pat. No. 8,161,548, Wan, 28 pgs.
*Crowdstrike, Inc.* v. *Webroot Inc.,* PTAB Case No. IPR2023-01053, Exhibit 1028: U.S. Pat. No. 8,875,289 B2, Mahaffey et al., 53 pgs.
*Crowdstrike, Inc.* v. *Webroot Inc.,* PTAB Case No. IPR2023-01053, Exhibit 1029: U.S. Pat. No. 9,349,103, Eberhardt, III et al., 24 pgs.
*Crowdstrike, Inc.* v. *Webroot Inc.,* PTAB Case No. IPR2023-01053, Exhibit 1030: U.S. Pat. No. 9,043,894, Dennison et al., 48 pgs.
*Crowdstrike, Inc.* v. *Webroot Inc.,* PTAB Case No. IPR2023-01053, Exhibit 1031: U.S. Pat. No. 9,306,971, Altman et al., 9 pgs.
*Crowdstrike, Inc.* v. *Webroot Inc.,* PTAB Case No. IPR2023-01053, Exhibit 1032: U.S. Patent Publication No. 20070245420, Yong et al., 13 pgs.
*Crowdstrike, Inc.* v. *Webroot Inc.,* PTAB Case No. IPR2023-01053, Exhibit 1033: U.S. Pat. No. 9,721,212, Gupta et al., 39 pgs.
*Crowdstrike, Inc.* v. *Webroot Inc.,* PTAB Case No. IPR2023-01053, Exhibit 1034: U.S. Pat. No. 9,324,034, Gupta et al., 33 pgs.
*Crowdstrike, Inc.* v. *Webroot Inc.,* PTAB Case No. IPR2023-01053, Exhibit 1035: U.S. Pat. No. 10,783,254, Sharma et al., 29 pgs.
*Crowdstrike, Inc.* v. *Webroot Inc.,* PTAB Case No. IPR2023-01053, Exhibit 1036: Xing An, "Ensemble Methods for Malware Diagnosis Based on One-class SVMs" Louisiana State University, 2012, 43 pgs.
*Crowdstrike, Inc.* v. *Webroot Inc.,* PTAB Case No. IPR2023-01053, Exhibit 1037: U.S. Pat. No. 9,306,966, Eskin et al., 35 pgs.
Intrusion Prevention, Astaro Internet Security, Astaro GmbH & Co. KG, a Sophos company, The Wayback Machine at https://web.archive.org/web/2012 040 6123658/http:/www.astaro.com/solutions/network-security/intrusion-prevention, 2012, 2 pgs.
Astaro Security Gateway, Astaro AG, The Wayback Machine at https://web.archive.org/web/20100 208163039/ http:/www.astaro.com/, 2010, 2 pgs.
Blue Coat Proxy AV Appliances Overview, 2010, 2 pgs.
Blue Coat WebFilter, Products and Overview, EdgeBlue.com, 2010, 9 pgs.
Blue Coat ProxyAV 210/510/810 Product Sheet, Blue Coat Systems, Inc., www.bluecoat.com, Sunnyvale, CA, 2009, 2 pgs.
Blue Coat WebFilter, Blue Coat Systems, Inc., www.bluecoat.com, Sunnyvale, CA, 2 pgs.
Check Point Anti-Malware & Program Control Software Blade, Benefits, Check Point Software Technologies Ltd. at https://web.archive.org/web/20131231065958/http:/www.checkpoint.com/products/anti-malware-program-control/index.html, 2013, 3 pgs.

(56) References Cited

OTHER PUBLICATIONS

Software Blades, Release Notes, R75.20, Check Point Software Technologies Ltd., Oct. 6, 2013, 29 pgs.
Software Blades, SmartEvent R75.40 Administration Guide, Check Point Software Technologies Ltd., Sep. 2, 2013, 78 pgs.
Software Blades, SmartView Monitor R75.40VS Administration Guide, Check Point Software Technologies Ltd., Apr. 16, 2012, 52 pgs.
Software Blades SmartEvent R75 Administration Guide, Check Point Software Technologies Ltd., Dec. 15, 2010, 35 pgs.
Check Point Anti-Spam & Email Security Software Blade Overview, The Wayback Machine at https://web.archive.org/web/20150316022003/http://www.checkpoint.com:80//products/anti-spam-email-security-software-blade/index.html/, Check Point Software Technologies Ltd., 2015, 5 pgs.
Check Point Anti-Bot Software Blade Data Sheet, Check Point Software Technologies Ltd., Apr. 16, 2012, 2 pgs.
Check Point Secure Web Gateway Appliance Benefits, The Wayback Machine at https://web.archive.org/web/20131219213701/http://www.checkpoint.com:80/products/secure-web-gateway/ind . . . , Check Point Software Technologies Ltd., 2013, 5 pgs.
Check Point Threat Prevention Appliance Features, The Wayback Machine—https://web.archive.org/web/20140109004125/http://www.checkpoint.com:80/products/threat-prevention-appliances/index . . . , Check Point Software Technologies Ltd., 2013, 3 pgs.
Check Point R70.30 Installation and Upgrade Guide, Check Point Software Ltd., Jun. 22, 2010, 27 pgs.
Check Point SmartEvent Software Blade, Benefits, Check Point Software Technologies Ltd., The Wayback Machine at https://web.archive.org/web/20130225182620/http://www.checkpoint .com/products/smartevent-software-blade/index.html?sp_link=1, Feb. 25, 2013, 3 pgs.
Check Point SmartEvent Software Blade, Check Point Software Technologies, Ltd., Apr. 28, 2013, 3 pgs.
CounterTack Announces Sentinel—Expanding the Deep System Inspection Product Portfolio with Production System Monitoring, CounterTack, InkHouse LLC, Feb. 25, 2013, 1 pg.
CounterTack Announces Sentinel—Expanding the Deep System Inspection Product Portfolio with Production System Monitoring, CounterTack, at https://www.globenewswire.com/news-release/2013/02/25/1034553/0/en/CounterTack-Announces-Sentinel.html, Feb. 2025, 2013, 3 pgs.
Cyberoam-Securing You, Cyberoam, a division of Elitecore Technologies Pvt. Ltd., The Wayback Machine, at https://web.archive.org/web/20120425093828/http://www.cyberoam .com, Apr. 25, 2012, 2 pgs.
Cyberoam Central Console, Cyberoam, a division of Elitecore Technologies Pvt. Ltd., The Wayback Machine at https://web.archive.org/web/20120421122028/http://www.cyberoam.com/ccc.html, Apr. 21, 2012, 2 pgs.
Cyberoam Endpoint Data Protection, Cyberoam, a division of Elitecore Technologies Pvt. Ltd., The Wayback Machine at https://web.archive.org/web/20120428070944/http: //www.cyberoam.com/endpointdataprotection.html, Apr. 28, 2012, 2 pgs.
DeepNines Delivers Solution to Thwart Extortion Demands from Cyber Criminals, Business Wire, The Wayback Machine at https://web.archive.org/web/20031203045510/http://www.deepnines.com/press_releases/pr112003.html, Nov. 20, 2003, 2 pgs.
ArcSight ESM Enterprise Security Manager, ArcSight, Inc., Cupertino, CA, The Wayback Machine at https://web.archive.org/web/20100422041236/http://www.arcsight. com:80/products/products-esm/, Apr. 22, 2010, 2 pgs.
HP Arcsight Express: Powered by the CORR-Engine, HP Enterprise Product Brief, Hewlett-Packard Development Co., LP, The Wayback Machine at https://www.hp.com/hpinfo/newsroom/press_kits/2011/risk2011/HP_ArcSightExpress_Product_Brief.pdf, Aug. 2011, 3 pgs.
Cisco IronPort S-Series Web Security Appliance Security Target, Version 1.0, Cisco IronPort Systems, San Bruno, CA, Oct. 12, 2009, 51 pgs.
Duffy, Jim, Cisco IronPort unveils e-mail security appliances, Channel Strategy, Oct. 9, 2008, 1 pg.
Evers, Joris, IronPort to Rate Web Links in Spam Fight, CNET News.com, Jan. 24, 2006, 11 pgs.
The SenderBase Network Overview, IronPort Systems, Inc., San Bruno, CA, 2006, 3 pgs.
Cisco IronPort Email Security Appliances, Data Sheet, Cisco Systems, Inc., San Jose, CA, #C78-694035-03, copyright 2011-2012, 5 pgs.
McAfee Advanced Threat Defense, Advanced detection for stealthy, zero-day malware, Data Sheet, McAfee, Santa Clara, CA, 2013, 2 pgs.
McAfee Advanced Threat Defense, Next Steps, McAfee, Santa Clara, CA, at https://web.archive.org/web/20150317123246/http://www.mcafee.com:80/products/advanced-threat-defense.aspx, 2015, 2 pgs.
McAfee Advanced Threat Defense, Appliance Hardware Components, Data Sheet, McAfee, Santa Clara, CA, at https://web.archive.org/web/20150317123246/http://www.mcafee.com:80/ products/advanced-threat-defense.aspx, 2015, 2 pgs.
McAfee Content Security Suite, comprehensive email, web, and data security, Data Sheet, McAfee, Santa Clara, CA, 2012, 2 pgs.
Security Target: McAfee Enterprise Security Manager with Event Receiver, Enterprise Log Manager, Advanced Correlation Engine, Application Data Monitor and Database Event Monitor 9.1, Document Version 1.1, McAfee, Santa Clara, CA, Mar. 25, 2013, 36 pgs.
McAfee Enterprise Security Manager Data Sheet, McAfee, Santa Clara, CA, [47101ds_esm_0612_fnl_ETMG], copyright 2012, 2 pgs.
McAfee Global Threat Intelligence for Enterprise Security Manager Data Sheet, McAfee, Santa Clara, CA, [46502ds_gti-esm_0612_ETMG], copyright 2012, 2 pgs.
McAfee SiteAdvisor Plus 2009, DataSheet, McAfee, Santa Clara, CA, copyright 2008, 2 pgs.
Singel, Ryan, McAfee SiteAdvisory Plus Review, Wired Security, Wired.com, Nov. 6, 2006, 9 pgs.
McAfee Web Protection Data Sheet, Web Security your way—SaaS, on premises, or a hybrid combination, McAfee, Santa Clara, CA, [61120ds_web-protection_0514B_ETMG], copyright 2014, 3 pgs.
Enterprise Security and Network Management Software, Product Overview, OpenService, Inc., The Wayback Machine at https://web.archive.org/web/20061115024535/ http://www.openservice.com:80/products/, Nov. 15, 2006, 2 pgs.
Security Management Center, OpenService, Inc., The Wayback Machine at https://web.archive.org/web/20061016130049/http://www.openservice.com/products/smc.php, Oct. 16, 2006, 2 pgs.
NerveCenter Overview, OpenService, Inc., The Wayback Machine at https://web.archive.org/web/20061016124321/http://www.openservice.com/products/nervecenter.php, Oct. 16, 2006, 1 pg.
Prevx1 Product Tour: What is Prevx1?, Prevx, The Wayback Machine at http://web.archive.org/ web/20060510191309/http:/info.prevx.com/onetutorial.asp?st=1, May 4, 2006, 1 pgs.
Prevx1 Product Tour: How Does Prevx1 Work?, The Wayback Machine at http://web.archive.org/web/ 20060510191054/http:/info.prevx.com/onetutorial.asp?st=2, May 10, 2006, 1 pg.
Prevx1 Product Tour: Installation and Setup, The Wayback Machine at http://web.archive.org/web/2006 0510191303/http:/info.prevx.com/onetutorial.asp?st=3, May 4, 2006, 2 pgs.
Prevx1 Product Tour: Community Information, The Wayback Machine at http://web.archive.org/web/ 20061109165542/http:/info.prevx.com/onetutorial.asp?st=11, Nov. 9, 2006, 1 pg.
Prevx1 Product Tour: Prevx1 Console: The Wayback Machine at http://web.archive.org/web/ 20060510191339/http:/info.prevx.com/onetutorial.asp?st=6, May 10, 2006, 1 pg.
Prevx1 Product Tour: Prevx1 Console: The Wayback Machine at http://web.archive.org/web/20060510191327/http:/info.prevx.com/onetutorial.asp?st=5, May 10, 2006, 1 pg.
Prevx1 Product Tour: Prevx1 Console: The Wayback Machine at http://web.archive.org/web/20060510191345/http:/info.prevx.com/onetutorial.asp?st=7, May 10, 2006, 1 pg.

(56) References Cited

OTHER PUBLICATIONS

Prevx1 ABC, FAQ, Prevx, The Wayback Machine at http://web.archive.org/web/20060110161540/http:/individual.prevx.com:80/faq.asp, Jan. 10, 2006, 11 pgs.
Prevx Company Overview, Prevx ltd, copyright 2003, 1 pg.
Jacobson, Emily, Using Dyninst for Program Binary Analysis and Instrumentation, Paradyn/Dyninst Week, Madison, WI, at https://www.paradyn.org/petascale2013/tutorial/Dyninst.pptx, 2013, 35 pgs.
Roundy, Kevin A. and Miller, Barton P., Hybrid Analysis and Control of Malware, University of Wisconsin, Computer Sciences Department, at https://www.paradyn.org/papers/Roundy10Malware.pdf, 2010, 23 pgs.
OpenText EnCase Endpoint Security Product Overview, OpenText, copyright 2021, 4 pgs.
Splunk 5.0.2 Installation Manual, The Wayback Machine at https://web.archive.org/web/20130306111105/http://docs.splunk.com:80/Documentation/Splunk/latest/Installation/Whatsinthismanual . . ., Mar. 6, 2013, 135 pgs.
Splunk Memory Use Patterns, Splunk Blog Tips & Tricks, The Wayback Machine at https://www.splunk.com/en_us/blog/tips-and-tricks/splunk-memory-use-patterns.html, Feb. 3, 2010, 4 pgs.
Splunk Fact Sheet: Splunk App for Enterprise Security, Splunk, San Francisco, CA, [Item # FS-Splunk-AppEntSec-101], copyright 2012, 2 pgs.
Splunk Enterprise Product Data Sheet: The Platform for Machine Data, Splunk, San Francisco, CA, [Item # DS-Splunk-115], copyright 2012, 2 pgs.
Event Correlation: Move from Search to Operational Intelligence, Splunk Tech Brief, Splunk, San Francisco, CA, copyright 2009, 1 pg.
Splunk for Cisco Security Suite, Fact Sheet, Splunk, San Francisco, CA, [Item # FS-Splunk-Cisco-101], copyright 2012, 2 pgs.
Splunk for Cyber Threat Analysis—A Big Data Approach to Enterprise Security, Solutions Guide, Splunk, San Francisco, CA, [Item # SG-Splunk-Security-106], copyright 2012, 2 pgs.
Splunk for Security, Solutions Guide, Splunk, San Francisco, CA, [Item # SG-Splunk-Security-106], copyright 2012, 2 pgs.
Splunk for Windows—End-to-End Real-time Visibility of Your Windows Environment, Solutions Guide, Splunk, San Francisco, CA, [Item # SG-Splunk-Windows-102], copyright 2012, 2 pgs.
Splunk Forwarders: the Benefits of Deploying Splunk, Tech Brief, Splunk, San Francisco, CA, [ItemTB-Splunk-Forwarder Deployment-101], copyright 2012, 2 pgs.
The Splunk Guide to Operational Intelligence—Turn Machine-generated Data into Real-time Visibility and Insight, Solutions Guide, Splunk, San Francisco, CA, [Item # SG-Splunk-OpIntell-113], copyright 2012, 13 pgs.
Symantec Email Security.cloud, DataSheet: Messaging Security, Symantec, Mountain View, CA, #21290485-2, Jul. 2014, 4 pgs.
Symantec Endpoint Protection 12.1, Data Sheet: Endpoint Security, Symantec, Mountain View, CA, #21194634, Jun. 2011, 5 pgs.
Symantec Endpoint Protection. Cloud, FAQ: Symantec.cloud, Symantec, Mountain View, CA, #125480, Aug. 2012, 4 pgs.
Symantec Endpoint Protection, Data Sheet: Endpoint Security, Symantec, Mountain View, CA, #12516465, May 2007, 4 pgs.
Symantec Security Information Manager, Data Sheet: Compliance and Security Management, Symantec, Mountain View, CA, #12415412-1, May 2008, 8 pgs.
Worry-Free Business Security Services 3.5 Review's Guide, Volume Technical Product Marketing, Trend Micro, Inc., Cupertino, CA, 2010, 110 pgs.
Client Server Security 3 for Small and Medium Business, Administrator's Guide, Trend Micro, Inc., Cupertino, CA, Document Part No. CSEM32492/51028, Nov. 2005, 223 pgs.
Client Server Messaging Security for Small and Medium Business 3, Desktop/Server/Email-SMB, Trend Micro, Inc., Cupertino, CA, #DS05CSMSM03051024US, 2005, 2 pgs.
Client Server Messaging Security 3 for Small and Medium Business, Getting Started Guide, Trend Micro, Inc., Cupertino, CA, Document Part No. CSEM32493/51028, Nov. 2005, 115 pgs.
Client/Server Messaging Suite for Small and Medium Businesses, Administrator's Guide, Trend Micro, Inc., Cupertino, CA, Document Part No. NAEM21620/31003, Nov. 2003, 339 pgs.
Worry-Free Business Security Services for Small Business Security, User's Guide, Trend Micro, Inc., Cupertino, CA, Document Version: 0.3, Sep. 2010, 150 pgs.
Worry-Free Business Security 7 Services Standard and Advanced Editions, Installation Guide, Trend Micro, Inc., Cupertino, CA, Document Part No. WBEM74599/100819, Nov. 2011, 204 pgs.
Worry-Free Business Security Advanced and Standard, Products, Datasheet, Trend Micro Inc., [DS04_WFBS6_10021US], copyright 2010, 2 pgs.
Client Server Security 3 for Small and Medium Business, Administrator's Guide, Trend Micro, Inc., Cupertino, CA, Document Part No. CSEM32494/51028, Nov. 2005, 276 pgs.
Client/Server Suite, Getting Started Guide, Trend Micro, Inc., Cupertino, CA, Document Part No. NJEM01254/20926, Oct. 2002, 61 pgs.
Client/Server Suite for Small and Medium Businesses (SMB), Trend Micro, Inc., [DS01CS_NT20_03112IDE], copyright 2003-2004, 2 pgs.
Enterprise Security for Communication and Collaboration, Datasheet, Trend Micro, Inc., Cupertino, Ca, [DS01_ESCC_121109US], 2012, 3 pgs.
How to Test Outbreak Commander, Testing Guide, Trend Micro, Inc., Cupertino, CA, Aug. 2002, 13 pgs.
Control Manager 3, Installation Guide, Trend Micro Incorporated, Cupertino, CA, Document Part No. CMEM32569/51128, Mar. 2006, 233 pgs.
Control Manager 3, Getting Start Guide, Trend Micro Incorporated, Cupertino, CA, Document Part No. TMEM31864/40414, Apr. 2004, 237 pgs.
Control Manager 2, Getting Start Guide, Trend Micro Incorporated, Cupertino, CA, Item Code CMEM21397/30306, Mar. 2003, 151 pgs.
Control Manager 5, Administrator's Guide, Trend Micro Incorporated, Cupertino, CA, Document Part No. TMEM53360/70921, Feb. 2008, 476 pgs.
Control Manager 5, Installation Guide, Trend Micro Incorporated, Cupertino, CA, Document Part No. CMEM54524/100720, Mar. 2012, 146 pgs.
Control Manager 6.0, Installation Guide, Trend Micro Incorporated, Cupertino, CA, Document Part No. CMEM65332/120203, Feb. 2013, 136 pgs.
Control Manager 3, Administrator's Guide, Trend Micro Incorporated, Cupertino, CA, Document Part No. CMEM32570/51128, Mar. 2006, 497 pgs.
Oliver, Jon, Is Big Data Enough for Machine Learning in Cybersecurity?, Trend Micro Incorporated, available at https://www.trendmicro.com/vinfo/us/security/news/security-technology/is-big-data-big-enough-for-machine-learning-in-cybersecurity, Jul. 19, 2018, 3 pgs.
Deep Discovery Analyzer 5.8, Syslog Content Mapping Guide, Trend Micro, Incorporated, Cupertino, CA, Document No. APEM57742/170315, Mar. 2017, 56 pgs.
Deep Discovery Analyzer 6.1, Administrator's Guide, Trend Micro, Incorporated, Cupertino, CA, Document No. APEM68234/180418, Jul. 2018, 276 pgs.
Deep Discovery Analyzer 7.0, Syslog Content Mapping Guide, Trend Micro, Incorporated, Cupertino, CA, Document No. APEM79199_210115, Apr. 2021, 69 pgs.
Deep Discovery Analyzer 7.1, Readme file, Trend Micro, Incorporated, Cupertino, CA, copyright 2021, 5 pgs.
Deep Discovery Analyzer 7.2, Syslog Content Mapping Guide, Trend Micro, Incorporated, Cupertino, CA, Document No. APEM79450_211122, Jun. 2022, 74 pgs.
Deep Discovery Analyzer 1200 Quick Start Card, Trend Micro, Incorporated, Cupertino, CA, Item Code APEQ79153/201119, 2021, 1 pg.
Deep Discovery Analyzer 5.5 SP1, Readme file, Trend Micro, Incorporated, Cupertino, CA, Jun. 2016, 11 pgs.
Deep Discovery Inspector 3.7, User's Guide, Trend Micro, Incorporated, Cupertino, CA, Document No. APEM36464/140618, Jul. 2014, 126 pgs.

(56) References Cited

OTHER PUBLICATIONS

Deep Discovery Inspector 3.8, Service Pack 3, Administrator's Guide, Trend Micro, Incorporated, Cupertino, CA, Document No. APEM37418/160627, Jul. 2016, 403 pgs.
Deep Discovery Inspector 4000, Quick Start Card, Trend Micro, Incorporated, Cupertino, CA, Item Code APEQ36484/140710, copyright 2014, 1 pg.
Deep Edge 2.5, Service Pack 2, Administrator's Guide, Trend Micro, Incorporated, Cupertino, CA, Document No. CTEM26692_140930, Nov. 2014, 371 pgs.
Deep Security 7.5, Installation Guide, Trend Micro, Incorporated, Cupertino, CA, Document No. APEM74679/100927, Oct. 2010, 47 pgs.
Deep Security 7.5, Security Target (EAL4+) Revision 1.18, Trend Micro, Inc., Ottawa, Canada, Aug. 2, 2011, 48 pgs.
Deep Security 9, Data Sheet, Trend Micro, Incorporated, Cupertino, CA, [DS01_DeepSecurity9_120812US], copyright 2012, 4 pgs.
Deep Security 9.0, SP1 Administrator's Guide, Trend Micro, Incorporated, Cupertino, CA, Document No. APEM95863/130213, Apr. 2013, 574 pgs.
Deep Security 9.0, SP1 Installation Guide, Trend Micro, Incorporated, Cupertino, CA, Document No. APEM95862/130213, May 2013, 160 pgs.
Deep Security 7.5, Data Sheet, Trend Micro, Incorporated, Cupertino, CA, DS04DeepSecurity7.5_101116US], copyright 2010, 2 pgs.
Deep Security 8.0, Getting Started and Installation Guide, Trend Micro, Incorporated, Cupertino, CA, Document No. APEM85311_120105, Jan. 2012, 156 pgs.
Enterprise Security Suites, Trend Micro Incorporated, The Wayback Machine at https://web.archive .org/web/20130322054951/http://www.trendmicro.com/us/enterprise/security-suite-solutions/index.html, Mar. 22, 2013, 2 pgs.
Enterprise Security for Endpoints, Datasheet, Trend Micro, Inc., Cupertino, Ca, [DS02_ESE_100803US], copyright 2010, 2 pgs.
Enterprise Security Suite, Datasheet, Trend Micro, Inc., Cupertino, Ca, [DS02_ESS_100830US], copyright 2010, 2 pgs.
Enterprise Security Suite, Datasheet, Trend Micro, Inc., Cupertino, Ca, [DS01_ESS_121108US], copyright 2012, 4 pgs.
Solution Brief—Combating New Spam and Social Engineering Attack Methods, Trend Micro Incorporated, Cupertino, CA, copyright 2015, 5 pgs.
Hosted Email Security Datasheet, Trend Micro Inc., Cupertino, Ca, [DS02_TMHES_130912US], copyright 2013, 2 pgs.
IM Security for Microsoft Skype for Business 1.6.5, Administrator's Guide, Trend Micro, Inc., Cupertino, CA, Document Part No. TIEM16346/140311, May 2014, 259 pgs.
Trend Micro Earns Patent for Active Content Security Technology, Help Net Security, at https://www.helpnetsecurity.com/2002/04/08/trend-micro-earns-patent-for-active-content-security-technology/, Apr. 8, 2002, 5 pgs.
InterScan Messaging Security Suite 7.5, Administrator's Guide, Trend Micro, Inc., Cupertino, CA, Document Part No. MSEM76206_131030, Feb. 2014, 419 pgs.
InterScan Messaging Security Suite 7.5, Installation Guide for Windows, Trend Micro, Inc., Cupertino, CA, Document Part No. MSEM76207_131030, Feb. 2014, 171 pgs.
InterScan Messaging Security Virtual Appliance 9.0, Installation Guide for Hybrid SaaS Email Security, Trend Micro, Inc., Cupertino, CA, Document Part No. MSEM96477/140707, Oct. 2014, 197 pgs.
InterScan VirusWall 3 for Unix, Administrator's Guide, Trend Micro, Inc., Cupertino, CA, Document Part No. IVEM30728/20916, Sep. 2002, 249 pgs.
InterScan VirusWall 6 for Linux, Reference Manual, Trend Micro, Inc., Cupertino, CA, Document Part No. IVEM62664/60224, Jul. 2006, 102 pgs.
InterScan VirusWall 7 for Small and Medium Businesses for Windows, Administrator's Guide, Trend Micro, Inc., Cupertino, CA, Document Part No. IVEM74091/90513, Jul. 2009, 499 pgs.
InterScan VirusWall 7 for Small and Medium Businesses for Windows, Quick Start Guide, Trend Micro, Inc., Cupertino, CA, Document Part No. IVEM74092/90513, Jul. 2009, 95 pgs.
Interscan Web Security, Overview, Trend Micro, Inc., Cupertino, CA, [OV01_IWS_Overview_140411US], copyright 2014, 3 pgs.
NeatSuite Standard 1 for Medium Business, Getting Started Guide, Trend Micro, Inc., Cupertino, CA, Document Part No. NSEM13111/70302, Jul. 2007, 60 pgs.
NeatSuite for SMB, Datasheet, Trend Micro, Inc., Cupertino, CA, [DS05NSSMB_080407US] copyright 2008, 2 pgs.
NeatSuite Advanced, Datasheet, Trend Micro, Inc., Cupertino, CA, [DS12NSAdv_080305US] copyright 2008, 2 pgs.
NeatSuite Standard, Datasheet, Trend Micro, Inc., Cupertino, CA, [DS09NSStd_070627US], copyright 2007, 2 pgs.
NeatSuite Advanced, Datasheet, Trend Micro, Inc., Europe, [DS11NSAdv_070629GB], copyright 2007, 2 pgs.
NeatSuite Advanced, Datasheet, Trend Micro, Inc., Cupertino, CA, [DS14NSAdv_090513US], copyright 2009, 2 pgs.
NeaTSuite for Microsoft Windows NT and Lotus Notes, Datasheet, Trend Micro, Inc., Cupertino, CA, copyright 2002, 2 pgs.
NeatSuite for SMB 3.5, Datasheet, Trend Micro, Inc., Cupertino, CA, [DS02_NS35_070118US], copyright 2007, 2 pgs.
Security 2.0 for MAC, Administrator's Guide, Trend Micro, Inc., Cupertino, CA, Document Part No. TSEM25920/130401, Jun. 2013, 144 pgs.
Security 1 for MAC, Administrator's Guide, Trend Micro, Inc., Cupertino, CA, Document Part No. TSEM14893/110621, Aug. 2012, 111 pgs.
Security 1 for Enterprise and Medium Business, MAC, Administrator's Guide, Trend Micro, Inc., Cupertino, CA, Document Part No. TSEM14307/90916, Sep. 2009, 116 pgs.
ServerProtect for Microsoft Windows and Novell Netware, Datasheet, Trend Micro, Inc., Cupertino, CA, [DS02_SP_MSNT090922US], copyright 2009, 2 pgs.
ServerProtect for EMC Celerra Filers, Getting Started Guide, Trend Micro, Inc., Cupertino, CA, Document Part No. SPEM51694/31205, Dec. 2003, 19 pgs.
ServerProtect 5.3 for Network Appliance Filers, Evaluation Guide, Trend Micro, Inc., Cupertino, CA, Aug. 2001, 20 pgs.
Whitepaper: Ensuring Data Integrity with Trend Micro ServerProtect for Network Appliance filers, Trend Micro, Inc., Cupertino, CA, Aug. 2001, 12 pgs.
ServerProtect 5 for Windows NT/NetWare, Getting Started Guide, Trend Micro, Inc., Cupertino, CA, Document Part No. SPEM51426/30407, Apr. 2003, 149 pgs.
ServerProtect 2 for Linux, Getting Started Guide, Trend Micro, Inc., Cupertino, CA, Document Part No. SPEM22345/50715, Apr. 2006, 176 pgs.
ServerProtect 5.8 for Microsoft Windows and Novell Netware, Getting Started Guide (Patch 3), Trend Micro, Inc., Cupertino, CA, Document Part No. SPEM56439/140521, Feb. 2022, 180 pgs.
ServerProtect 5 for NetApp, Getting Started Guide (Patch 3), Trend Micro, Inc., Cupertino, CA, Document Part No. SPEM54352/91119, Mar. 2011, 172 pgs.
ServerProtect 5 for Microsoft Windows Server/Novell Netware, Getting Started Guide, Trend Micro, Inc., Cupertino, CA, Document Part No. SPEM51426/30407, Jul. 2009, 170 pgs.
ServerProtect for Network Appliance Filers, Datasheet, Trend Micro, Inc., Buckinghamshire, England, [DS01SPNA561040420GB], copyright 2002-2004, 2 pgs.
InterScan Messaging Security Datasheet, Trend Micro, Inc., Cupertino, CA, [DS01_IMS_C&C_130619US], copyright 2013, 4 pgs.
Smart Protection Server 2.5, Administrator's Guide, Trend Micro Inc., Cupertino, CA, Document Part No. APEM84993/110727, Jul. 2011, 86 pgs.
Rashid, Fahmida Y., Trend Micro Enhances Cloud-security Infrastructure with Big Data Analytics, SecurityWeek, at https://www.securityweek.com/trend-micro-enhances-cloud-security-infrastructure-big-data-analyticsm, Aug. 7, 2012, 6 pgs.
Hoffman, Stefanie, Trend Micro Releases New 'Smart Protection Network', CRN Magazine, at https://www.crn.com/news/security/208700393/ trend-micro-releases-new-smart-protection-network.htm, Jun. 18, 2008, 3 pgs.

(56) References Cited

OTHER PUBLICATIONS

Smart Protection Server 2.6, Administrator's Guide, Trend Micro Inc., Cupertino, CA, Document Part No. APEM26465/120620, Apr. 2013, 86 pgs.
Smart Protection Server 3.0, Administrator's Guide, Trend Micro Inc., Cupertino, CA, Document Part No. APEM36294/140116, Mar. 2014, 98 pgs.
Threat Management System, What it Does, Trend Micro, Inc., The Wayback Machine at https://web.archive.org/web/20120129041740/http://www.trendmicro.com:80/us/enterprise/security-management/threat-management-services/index.html, 2012, 2 pgs.
White Paper: Kolodgy, Charles J., Network Security Overwatch Layer: Smarter Protection for the Enterprise, IDC, Framingham, MA, Nov. 2009, 8 pgs.
Smart Protection Network Datasheet, Trend Micro, Inc., Cupertino, CA, copyright 2010, 2 pgs.
Security Threat Assessment, Datasheet, Trend Micro, Inc., Cupertino, CA, [DS02_TMS_Assessment091007US], copyright 2009, 4 pgs.
Threat Management System, Datasheet, Trend Micro, Inc., Cupertino, CA, [DS01_TMS_110523US], copyright 2011, 2 pgs.
White Paper: Trend Micro Smart Protection Network—Security Made Smarter, Trend Micro, Inc., Cupertino, CA, at https://web.archive.org/web/20120129041740/ http://www.trendmicro.com:80/us/enterprise/security-management/threat-management-services/index.html, Jun. 2010, 15 pgs.
Worry-Free Business Security 7, Standard and Advanced Editions, Installation Guide, Trend Micro Inc., Cupertino, CA, Document Part No. WBEM74599/100819, Oct. 2010, 192 pgs.
Worry-Free Business Security 9, Standard and Advanced Editions, Service Pack 1, Administrator's Guide, Trend Micro Inc., Cupertino, CA, Document Part No. WFEM96626/140825, Sep. 2014, 400 pgs.
BrightCloud, End Point Security Application Integration, The Wayback Machine at http://web.archive.org/web/20070505030946/http://www.brightcloud.com:80/endpointsecurity.asp, May 5, 2007, 2 pgs.
BrightCloud Master URL Database Overview, The Wayback Machine at http://web.archive.org/web/20070508223909/http://www.brightcloud.com:80/endpointsecurity.asp, May 8, 2007, 2 pgs.
Webroot BrightCloud Overview, The Wayback Machine at https://web.archive.org/web/20130423211117/http://brightcloud.com/resourcecenter/technology.php, Apr. 23, 2013, 1 pg.
BrightCloud Streaming Malware Detection, Datasheet, OpenText, DS_073120, copyright 2020, 2 pgs.
BrightCloud File Reputation Service, Datasheet, Webroot Inc., Broomfield, CO, Feb. 2014, 2 pgs.
BrightCloud File Reputation Service, Datasheet, Open Text, DS_070620, copyright 2020, 2 pgs.
BrightCloud IP Reputation Service, Datasheet, Webroot Inc., Broomfield, CO, Feb. 2014, 2 pgs.
BrightCloud Real-Time Anti-Phishing Service, Datasheet, Webroot Inc., Broomfield, CO, Feb. 2014, 2 pgs.
Whitepaper: BrightCloud Real-Time Anti-Phishing Service, Webroot Inc., Broomfield, CO, Feb. 2014, 4 pgs.
BrightCloud Web Classification Service, Datasheet, Webroot Inc., Broomfield, CO, Feb. 2014, 2 pgs.
BrightCloud Web Reputation Service, Datasheet, Webroot Inc., Broomfield, CO, Feb. 2014, 2 pgs.
SecureAnywhere Business—Endpoint Protection: Reduced Endpoint Scan Times, Webroot Inc., The Wayback Machine at https://web.archive.org/web/20121104163529/http://www.webroot.com:80/En_US/business/secureanywhereendpoint/performance-productivity/scans, Nov. 2012, 3 pgs.
Webroot Intelligence Network, Webroot Inc., The Wayback Machine at https://web.archive.org/web/20130228175825/http://www.webroot.com/En_US/business/resources/WSAEP_DS_Win.html, Feb. 2013, 3 pgs.
Webroot Security Intelligence for Networks Suite, The Wayback Machine at https://web.archive.org/web/20130316085428/http://www.webroot.com/En_US/business/security-solutions/security-intelligence-network-suite, Mar. 2013, 3 pgs.
Webroot Intelligence Network, The Wayback Machine at https://web.archive.org/web/20130424014346/http://brightcloud.com/toc/index.php, Apr. 2013, 1 pg.
SecureAnywhere—Endpoint Protection, The Wayback Machine at https://web.archive.org/web/20120410105149/http://www.webroot.com/En_US/business-products-secureanywhere-endpoint.html, 2012, 2 pgs.
Kovalev, Timur and Niller, Darren, Mobile App Reputation, a Webroot Security Intelligence Service, Webroot Inc., Broomfield, CO, Apr. 2013, 9 pgs.
Webroot SecureAnywhere BusinessEndpoint Protection, Datasheet, Webroot Inc., Broomfield, CO, DS_051917_US, copyright 2017, 4 pgs.
Webroot SecureAnywhere, User Guide for the Complete Edition, Version 8.0.1, Webroot Inc., Broomfield, CO, May 2012, 144 pgs.
*Trend Micro, Inc. v. Webroot Inc.*, PTAB Case No. IPR2023-01389, Petition for Inter Partes Review of U.S. Pat. No. 8,856,505, Sep. 7, 2023, 63 pgs.
*Trend Micro, Inc. v. Webroot Inc.*, PTAB Case No. IPR2023-01389, Exhibit 1001: U.S. Pat. No. 8,856,505 to Schneider, 11 pgs.
*Trend Micro, Inc. v. Webroot Inc.*, PTAB Case No. IPR2023-01389, Exhibit 1002: Prosecution History of U.S. Pat. No. 8,856,505, 351 pgs.
*Trend Micro, Inc. v. Webroot Inc.*, PTAB Case No. IPR2023-01389, Exhibit 1003: Expert Declaration of Dr. Seth Nielson, 89 pgs.
*Trend Micro, Inc. v. Webroot Inc.*, PTAB Case No. IPR2023-01389, Exhibit 1004: Curriculum Vitae of Dr. Seth Nielson, 15 pgs.
*Trend Micro, Inc. v. Webroot Inc.*, PTAB Case No. IPR2023-01389, Exhibit 1005: *Webroot, Inc. and Open Text, Inc. v. Trend Micro Inc.*, Case No. 6:22-cv-00243-ADA-DTG, Claim Construction Order, Dkt. 391 (W.D. Tex.) Jul. 25, 2023, 19 pgs.
*Trend Micro, Inc. v. Webroot Inc.*, PTAB Case No. IPR2023-01389, Exhibit 1006: Tal Garfinkel, A Virtual Machine Introspection Based Architecture for Intrusion Detection, Computer Science Department, Stanford University, 2003, 16 pgs.
*Trend Micro, Inc. v. Webroot Inc.*, PTAB Case No. IPR2023-01389, Exhibit 1007: Greg Hoglund, Subverting the Windows Kernel: Rootkits, Addison-Wesley Professional, Jul. 22, 2005, 363 pgs.
*Trend Micro, Inc. v. Webroot Inc.*, PTAB Case No. IPR2023-01389, Exhibit 1008: Andreas Bunten, UNIX and Linux based Rootkits Techniques and Countermeasures, DFN-CERT Services GmbH, Apr. 30, 2004, 17 pgs.
*Trend Micro, Inc. v. Webroot Inc.*, PTAB Case No. IPR2023-01389, Exhibit 1009: Catherine Dodge, A Study of Initialization in Linux and OpenBSD, ACM SIGOPS Operating Systems Review 39(2), pp. 79-93, Apr. 2005, 16 pgs.
*Trend Micro, Inc. v. Webroot Inc.*, PTAB Case No. IPR2023-01389, Exhibit 1010: Phrack Staff, Linux on-the-fly kernel patching without LKM (58), Linux on-the-fly kernel patching without LKM, at http://phrack.org/issues/58/7.html, Dec. 28, 2001, 71 pgs.
*Trend Micro, Inc. v. Webroot Inc.*, PTAB Case No. IPR2023-01389, Exhibit 1011: Red Hat Linux 6.2, The Official Red Hat Linuz Reference Guide, 2000, 375 pgs.
*Trend Micro, Inc. v. Webroot Inc.*, PTAB Case No. IPR2023-01389, Exhibit 1012: Kathy Ivens, Walkin' Through the Boot Process, Aug. 30, 2004, 9 pgs.
*Trend Micro, Inc. v. Webroot Inc.*, PTAB Case No. IPR2023-01389, Exhibit 1013: Henrique de Moraes Holschuh, System Init Scripts and the Debian O.S., 3rd Debian Conference, Jun. 2002, 20 pgs.
*Trend Micro, Inc. v. Webroot Inc.*, PTAB Case No. IPR2023-01389, Exhibit 1014: Frank Apap, Detecting Malicious Software by Monitoring Anomalous Windows Registry Accesses, LNCS (2516), Oct. 2002, 19 pgs.
*Trend Micro, Inc. v. Webroot Inc.*, PTAB Case No. IPR2023-01389, Exhibit 1015: Declaration of Ingrid Hsieh-Yee, Ph.D., 26 pgs.
*Trend Micro, Inc. v. Webroot Inc.*, PTAB Case No. IPR2023-01390, Petition for Inter Partes Review of U.S. Pat. No. 8,201,243, 79 pgs.
*Trend Micro, Inc. v. Webroot Inc.*, PTAB Case No. IPR2023-01390, Exhibit 1001: U.S. Pat. No. 8,201,243, Boney, 13 pgs.

(56) References Cited

OTHER PUBLICATIONS

*Trend Micro, Inc. v. Webroot Inc.*, PTAB Case No. IPR2023-01390, Exhibit 1002: Prosecution History of U.S. Pat. No. 8,201,243, 423 pgs.
*Trend Micro, Inc. v. Webroot Inc.*, PTAB Case No. IPR2023-01390, Exhibit 1003: Expert Declaration of Dr. Seth Nielson, 135 pgs.
*Trend Micro, Inc. v. Webroot Inc.*, PTAB Case No. IPR2023-01390, Exhibit 1004: Curriculum Vitae of A.L. Seth Nielson, Ph.D., 15 pgs.
*Trend Micro, Inc. v. Webroot Inc.*, PTAB Case No. IPR2023-01390, Exhibit 1005: *Webroot, Inc. and Open Text, Inc. v. Trend Micro Inc.*, Case No. 6:22-cv-00243-ADA-DTG, Claim Construction Order, Dkt. 391 (W.D. Tex., Jul. 25, 2023), 19 pgs.
*Trend Micro, Inc. v. Webroot Inc.*, PTAB Case No. IPR2023-01390, Exhibit 1006: Cristina Abad, Log Correlation for Intrusion Detection: A Proof of Concept, 19th Annual Computer Security Applications Conference (2003), 10 pgs.
*Trend Micro, Inc. v. Webroot Inc.*, PTAB Case No. IPR2023-01390, Exhibit 1007: U.S. Publication No. 20070006310, Piccard, 7 pgs.
*Trend Micro, Inc. v. Webroot Inc.*, PTAB Case No. IPR2023-01390, Exhibit 1008: U.S. Pat. No. 6,735,703, Kilpatrick, 11 pgs.
*Trend Micro, Inc. v. Webroot Inc.*, PTAB Case No. IPR2023-01390, Exhibit 1009: Ed Skoudis, Malware: Fighting Malicious Code, Pearson, Nov. 2003, 30 pgs.
*Trend Micro, Inc. v. Webroot Inc.*, PTAB Case No. IPR2023-01390, Exhibit 1010: Robert Rinnan, Benefits of Centralized Log File Correlation, Gjøvik University College, 2005, 68 pgs.
*Trend Micro, Inc. v. Webroot Inc.*, PTAB Case No. IPR2023-01390, Exhibit 1011: Platform SDK: Windows Management Instrumentation, Win32_Process, Win32_Process class [WMI] (archive.org), Jul. 17, 2004, 9 pgs.
*Trend Micro, Inc. v. Webroot Inc.*, PTAB Case No. IPR2023-01390, Exhibit 1012: Matthew M. Lavy, Windows Management Instrumentation (WMI), Sams Oct. 2001, 24 pgs.
*Trend Micro, Inc. v. Webroot Inc.*, PTAB Case No. IPR2023-01390, Exhibit 1013: Yariv Kapla API Spying Techniques for Windows 9x, NT and 2000 (archive.org) Feb. 10, 2003, 7 pgs.
*Trend Micro, Inc. v. Webroot Inc.*, PTAB Case No. IPR2023-01390, Exhibit 1014: Stephanie Forrest, Computer Immunolgy, Communications of the ACM 40(1), Oct. 1997, 9 pgs.
*Trend Micro, Inc. v. Webroot Inc.*, PTAB Case No. IPR2023-01390, Exhibit 1015: Declaration of Ingrid Hsieh-Yee, Ph.D., 24 pgs.
*Trend Micro, Inc. v. Webroot Inc.*, PTAB Case No. IPR2023-01390, Notice of Filing Date Accorded to Petition and Time for Filing Patent Owner Preliminary Response, Sep. 18, 2023, 6 pgs.
*Trend Micro, Inc. v. Webroot Inc.*, PTAB Case No. IPR2023-01391, Petition for Inter Partes Review of U.S. Pat. No. 8,719,932, Sep. 7, 2023, 79 pgs.
*Trend Micro, Inc. v. Webroot Inc.*, PTAB Case No. IPR2023-01391, Exhibit 1001: U.S. Pat. No. 8,719,932, Boney, 12 pgs.
*Trend Micro, Inc. v. Webroot Inc.*, PTAB Case No. IPR2023-01391, Exhibit 1002: Prosecution History of U.S. Pat. No. 8,719,932, 120 pgs.
*Trend Micro, Inc. v. Webroot Inc.*, PTAB Case No. IPR2023-01391, Exhibit 1003: Expert Declaration of Dr. Seth Nielson, 138 pgs.
*Trend Micro, Inc. v. Webroot Inc.*, PTAB Case No. IPR2023-01391, Exhibit 1004: Curriculum Vitae of Dr. Seth Nielson, 15 pgs.
*Trend Micro, Inc. v. Webroot Inc.*, PTAB Case No. IPR2023-01391, Exhibit 1005: *Webroot, Inc. and Open Text, Inc. v. Trend Micro Inc.*, Case No. 6:22-cv-00243-ADA-DTG, Claim Construction Order, Dkt. 391 (W.D. Tex.), Jul. 25, 2023, 19 pgs.
*Trend Micro, Inc. v. Webroot Inc.*, PTAB Case No. IPR2023-01391, Exhibit 1006: Cristina Abad, Log Correlation for Intrusion Detection: A Proof of Concept, 19th Annual Computer Security Applications Conference, 2003, 10 pgs.
*Trend Micro, Inc. v. Webroot Inc.*, PTAB Case No. IPR2023-01391, Exhibit 1007: U.S. Publication No. 20070006310, Piccard, 7 pgs.
*Trend Micro, Inc. v. Webroot Inc.*, PTAB Case No. IPR2023-01391, Exhibit 1008: U.S. Pat. No. 6,735,703, Kilpatrick, 11 pgs.
*Trend Micro, Inc. v. Webroot Inc.*, PTAB Case No. IPR2023-01391, Exhibit 1009: Ed Skoudis, Malware: Fighting Malicious Code, Pearson, Nov. 2003, 30 pgs.
*Trend Micro, Inc. v. Webroot Inc.*, PTAB Case No. IPR2023-01391, Exhibit 1010: Robert Rinnan, Benefits of Centralized Log File Correlation, Gjøvik University College, 2005, 68 pgs.
*Trend Micro, Inc. v. Webroot Inc.*, PTAB Case No. IPR2023-01391, Exhibit 1011: Platform SDK: Windows Management Instrumentation, Win32_Process, Win32_Process class [WMI] (archive.org) Jul. 17, 2004, 9 pgs.
*Trend Micro, Inc. v. Webroot Inc.*, PTAB Case No. IPR2023-01391, Exhibit 1012: Matthew M. Lavy, Windows Management Instrumentation (WMI), Sams, Oct. 2001, 24 pgs.
*Trend Micro, Inc. v. Webroot Inc.*, PTAB Case No. IPR2023-01391, Exhibit 1013: Yariv Kaplan, API Spying Techniques for Windows 9x, NT and 2000, API Spying Techniques for Windows 9x, NT and 2000 (archive.org), Feb. 10, 2003, 7 pgs.
*Trend Micro, Inc. v. Webroot Inc.*, PTAB Case No. IPR2023-01391, Exhibit 1014: Stephanie Forrest, Computer Immunology, Communications of the ACM 40(1), Oct. 1997, 9 pgs.
*Trend Micro, Inc. v. Webroot Inc.*, PTAB Case No. IPR2023-01391, Exhibit 1015: Declaration of Ingrid Hsieh-Yee, Ph.D., 24 pgs.
*Trend Micro, Inc. v. Webroot Inc.*, PTAB Case No. IPR2023-01391, Notice of Filing Date Accorded to Petition and Time for Filing Patent Owner Preliminary Response, Sep. 18, 2023, 6 pgs.
*Trend Micro, Inc. v. Webroot Inc.*, PTAB Case No. IPR2023-01392, Petition for Inter Partes Review of U.S. Pat. No. 8,181,244, Sep. 7, 2023, 88 pgs.
*Trend Micro, Inc. v. Webroot Inc.*, PTAB Case No. IPR2023-01392, Exhibit 1001: U.S. Pat. No. 8,181,244, Boney, 13 pgs.
*Trend Micro, Inc. v. Webroot Inc.*, PTAB Case No. IPR2023-01392, Exhibit 1002: Prosecution History of U.S. Pat. No. 8,181,244, 389 pgs.
*Trend Micro, Inc. v. Webroot Inc.*, PTAB Case No. IPR2023-01392, Exhibit 1003: Expert Declaration of Dr. Seth Nielson, 142 pgs.
*Trend Micro, Inc. v. Webroot Inc.*, PTAB Case No. IPR2023-01392, Exhibit 1004: Curriculum Vitae of Dr. Seth Nielson, 15 pgs.
*Trend Micro, Inc. v. Webroot Inc.*, PTAB Case No. IPR2023-01392, Exhibit 1005: *Webroot, Inc. and Open Text, Inc. v. Trend Micro Inc.*, Case No. 6:22-cv-00243-ADA-DTG, Claim Construction Order, Dkt. 391 (W.D. Tex.), Jul. 25, 2023, 19 pgs.
*Trend Micro, Inc. v. Webroot Inc.*, PTAB Case No. IPR2023-01392, Exhibit 1006: Kevin Chen, ECF—Event Correlation for Forensics, Australian Computer, Network & Information Forensics Conference, 2003, 10 pgs.
*Trend Micro, Inc. v. Webroot Inc.*, PTAB Case No. IPR2023-01392, Exhibit 1007: U.S. Patent Publication No. 20070006310, Piccard, 7 pgs.
*Trend Micro, Inc. v. Webroot Inc.*, PTAB Case No. IPR2023-01392, Exhibit 1008: Zhenmin Li, UCLog: A Unified, Correlated Logging Architecture for Intrusion Detection, Int'l Conf. on Telecomm. Sys. Modelling & Analysis, 2004, 15 pgs.
*Trend Micro, Inc. v. Webroot Inc.*, PTAB Case No. IPR2023-01392, Exhibit 1009: Declaration of Ingrid Hsieh-Yee, Ph.D., 29 pgs.
*Trend Micro, Inc. v. Webroot Inc.*, PTAB Case No. IPR2023-01392, Exhibit 1010: Peter G. Viscarola, Windows NT Device Driver Development, ORS Open Systems Resources, Inc., 1999, 686 pgs.
*Trend Micro, Inc. v. Webroot Inc.*, PTAB Case No. IPR2023-01392, Exhibit 1011: Nicholas Weaver, Worms vs. Perimeters: The Case or Hard-LANS, 12th Annual IEEE Symposium, Aug. 2004, 8 pgs.
*Trend Micro, Inc. v. Webroot Inc.*, PTAB Case No. IPR2023-01392, Exhibit 1012: Weidong Cui, Design and Implementation of an Extrusion-based Break-In Detector for Personal Computers, 2006, 11 pgs.
*Trend Micro, Inc. v. Webroot Inc.*, PTAB Case No. IPR2023-01392, Exhibit 1013: Cristina Abad, Log Correlation for Intrusion Detection: A Proof of Concept, 19th Annual Computer Security Applications Conference, 2003, 10 pgs.
*Trend Micro, Inc. v. Webroot Inc.*, PTAB Case No. IPR2023-01392, Exhibit 1014: Robert Rinnan, Benefits of Centralized Log File Correlation, Gjøvik University College, 2005, 68 pgs.

(56) References Cited

OTHER PUBLICATIONS

*Trend Micro, Inc.* v. *Webroot Inc.,* PTAB Case No. IPR2023-01392, Exhibit 1015: Ed Skoudis, Malware: Fighting Malicious Code, Pearson, Nov. 2003, 30 pgs.
*Trend Micro, Inc.* v. *Webroot Inc.,* PTAB Case No. IPR2023-01392, Exhibit 1016: Platform SDK: Windows Management Instrumentation, Win32_Process, Win32_Process class [WMI] (archive.org), Jul. 17, 2004, 9 pgs.
*Trend Micro, Inc.* v. *Webroot Inc.,* PTAB Case No. IPR2023-01392, Exhibit 1017: Matthew M. Lavy, Windows Management Instrumentation (WMI), Sams, Oct. 2001, 24 pgs.
*Trend Micro, Inc.* v. *Webroot Inc.,* PTAB Case No. IPR2023-01392, Exhibit 1018: Yariv Kaplan, API Spying Techniques for Windows 9x, NT and 2000, API Spying Techniques for Windows 9x, NT and 2000 (archive.org) Feb. 10, 2003, 7 pgs.
*Trend Micro, Inc.* v. *Webroot Inc.,* PTAB Case No. IPR2023-01392, Exhibit 1019: Stephanie Forrest, Computer Immunology, Communications of the ACM 40(1), Oct. 1997, 9 pgs.
*Trend Micro, Inc.* v. *Webroot Inc.,* PTAB Case No. IPR2023-01392, Corrected Exhibit List, Sep. 19, 2023, 4 pgs.
*AO Kaspersky Lab* v. *Webroot Inc.,* PTAB Case No. IPR2023-01334, Petition for Inter Partes Review of U.S. Pat. No. 8,418,250, 78 pgs.
*AO Kaspersky Lab* v. *Webroot Inc.,* PTAB Case No. IPR2023-01334, Exhibit 1001: U.S. Pat. No. 8,418,250, Morris, 17 pgs.
*AO Kaspersky Lab* v. *Webroot Inc.,* PTAB Case No. IPR2023-01334, Exhibit 1002: File History of U.S. Pat. No. 8,418,250, 888 pgs.
*AO Kaspersky Lab* v. *Webroot Inc.,* PTAB Case No. IPR2023-01334, Exhibit 1003: Declaration of Dr. Wenke Lee, 171 pgs.
*AO Kaspersky Lab* v. *Webroot Inc.,* PTAB Case No. IPR2023-01334, Exhibit 1004: U.S. Patent Publication No. 20050210035, Kester, 42 pgs.
*AO Kaspersky Lab* v. *Webroot Inc.,* PTAB Case No. IPR2023-01334, Exhibit 1005: U.S. Pat. No. 7,225,343, Honig, 22 pgs.
*AO Kaspersky Lab* v. *Webroot Inc.,* PTAB Case No. IPR2023-01334, Exhibit 1006: U.S. Pat. No. 7,594,272, Kennedy, 10 pgs.
*AO Kaspersky Lab* v. *Webroot Inc.,* PTAB Case No. IPR2023-01334, Exhibit 1007: Plaintiff's Opposition Markman Brief, No. 6:22-cv-00243, USDC, WDTX, Nov. 18, 2022, 86 pgs.
*AO Kaspersky Lab* v. *Webroot Inc.,* PTAB Case No. IPR2023-01334, Exhibit 1010: Defendants' Opening Markman Brief, 22-cv-00243 WDTX, Oct. 28, 22, 84 pgs.
*AO Kaspersky Lab* v. *Webroot Inc.,* PTAB Case No. IPR2023-01334, Exhibit 1011: Intrusion Detection with Unlabeled Data Using Clustering by Leonid Portnoy, et al., 25 pgs.
*AO Kaspersky Lab* v. *Webroot Inc.,* PTAB Case No. IPR2023-01334, Exhibit 1012: U.S. Pat. No. 6,944,772, Dozortsev, 10 pgs.
*AO Kaspersky Lab* v. *Webroot Inc.,* PTAB Case No. IPR2023-01334, Exhibit 1013: U.S. Pat. No. 6,772,363, Chess, 14 pgs.
*AO Kaspersky Lab* v. *Webroot Inc.,* PTAB Case No. IPR2023-01334, Exhibit 1014: WO 2002033525, Shyne-Song Chuang, 18 pgs.
*AO Kaspersky Lab* v. *Webroot Inc.,* PTAB Case No. IPR2023-01334, Exhibit 1015: EP 1549012, Kristof De Spiegeleer, 19 pgs.
*AO Kaspersky Lab* v. *Webroot Inc.,* PTAB Case No. IPR2023-01334, Exhibit 1016: EP 1280040, Alexander James Hinchliffe, et al., 17 pgs.
*AO Kaspersky Lab* v. *Webroot Inc.,* PTAB Case No. IPR2023-01334, Exhibit 1017: U.S. Patent Publication No. 20040153644, McCorkendale, 15 pgs.
*AO Kaspersky Lab* v. *Webroot Inc.,* PTAB Case No. IPR2023-01334, Exhibit 1018: U.S. Pat. No. 7,516,476, Kraemer, 13 pgs.
*AO Kaspersky Lab* v. *Webroot Inc.,* PTAB Case No. IPR2023-01334, Exhibit 1019: Harold S. Javitz et al., The NIDES Statistical Component: Description and Justification, 52 pgs.
*AO Kaspersky Lab* v. *Webroot Inc.,* PTAB Case No. IPR2023-01334, Exhibit 1020: U.S. Pat. No. 7,448,084, Apap, 17 pgs.
*AO Kaspersky Lab* v. *Webroot Inc.,* PTAB Case No. IPR2023-01334, Exhibit 1021: Order Granting Third Amended Scheduling Order, 22-cv-00243, WDTX, No. 142, Dec. 27, 2022, 9 pgs.
*AO Kaspersky Lab* v. *Webroot Inc.,* PTAB Case No. IPR2023-01334, Exhibit 1022: Declaration of V.S. Subrahmanian, Ph.D., 86 pgs.
*AO Kaspersky Lab* v. *Webroot Inc.,* PTAB Case No. IPR2023-01334, Exhibit 1023: Order Granting Fifth Amended Scheduling Order, ECF No. 252, Mar. 29, 2023, 9 pgs.
*AO Kaspersky Lab* v. *Webroot Inc.,* PTAB Case No. IPR2023-01334, Notice of Filing Date Accorded to Petition and Time for Filing Patent Owner Preliminary Response, Aug. 28, 2023, 6 pgs.
*AO Kaspersky Lab* v. *Webroot Inc.,* PTAB Case No. IPR2023-01334, Patent Owner Open Text Inc.'s Mandatory Notices Pursuant to 37 CFR § 42.8(b), Sep. 8, 2023, 11 pgs.
*Trend Micro, Inc.* v. *Webroot Inc.,* PTAB Case No. IPR2023-01380, Petition for Inter Partes Review of U.S. Pat. No. 11,409,869, Sep. 5, 2023, 91 pgs.
*Trend Micro, Inc.* v. *Webroot Inc.,* PTAB Case No. IPR2023-01380, Exhibit 1001: U.S. Pat. No. 11,409,869, Schmidtler, 16 pgs.
*Trend Micro, Inc.* v. *Webroot Inc.,* PTAB Case No. IPR2023-01380, Exhibit 1002: Prosecution History of U.S. Pat. No. 11,409,869, 347 pgs.
*Trend Micro, Inc.* v. *Webroot Inc.,* PTAB Case No. IPR2023-01380, Exhibit 1003: Expert Declaration of Dr. Seth Nielson, 174 pgs.
*Trend Micro, Inc.* v. *Webroot Inc.,* PTAB Case No. IPR2023-01380, Exhibit 1004: Curriculum Vitae of A.L. Seth Nielson, Ph.D., 15 pgs.
*Trend Micro, Inc.* v. *Webroot Inc.,* PTAB Case No. IPR2023-01380, Exhibit 1005: Gil Tahan, Mal-ID: Automatic Malware Detection Using Common Segment Analysis and Meta-Features, Journal of Machine Learning 13, 949-979, Apr. 13, 2012, 31 pgs.
*Trend Micro, Inc.* v. *Webroot Inc.,* PTAB Case No. IPR2023-01380, Exhibit 1006: Eitan Menahem, Improving Malware Detection by Applying Multi-Inducer Ensemble, Computational Statistics & Data Analysis 53, 2009, 12 pgs.
*Trend Micro, Inc.* v. *Webroot Inc.,* PTAB Case No. IPR2023-01380, Exhibit 1007: U.S. Patent Publication No. 20090254992, Schultz et al., 20 pgs.
*Trend Micro, Inc.* v. *Webroot Inc.,* PTAB Case No. IPR2023-01380, Exhibit 1008: Stuart Russell, Artificial Intelligence: A Modern Approach; The Intelligent Agent Book, Prentice Hall 2, 2003 pp. 749-751.
*Trend Micro, Inc.* v. *Webroot Inc.,* PTAB Case No. IPR2023-01380, Exhibit 1009: Lars Buitinck, API design for machine learning software: Experiences from the scikit-learn project, Sep. 2013, 16 pgs.
*Trend Micro, Inc.* v. *Webroot Inc.,* PTAB Case No. IPR2023-01380, Exhibit 1010: Declaration of Ingrid Hsieh-Yee, Ph.D., 30 pgs.
*Trend Micro, Inc.* v. *Webroot Inc.,* PTAB Case No. IPR2023-01380, Exhibit 1011: Dr. Solomon's Anti-Virus Toolkit Reference Guide, Apr. 1999, 8 pgs.
*Trend Micro, Inc.* v. *Webroot Inc.,* PTAB Case No. IPR2023-01380, Exhibit 1012: George Karypis, Chameleon: A Hierarchical Clustering Algorithm Using Dynamic Modeling, IEEE 32 (8), Aug. 1999, 22 pgs.
*Trend Micro, Inc.* v. *Webroot Inc.,* PTAB Case No. IPR2023-01380, Exhibit 1013: Yingjie Tian, Recent Advances on Support Vector Machine Research, Technological and Economic Development of Economy 18(1), Apr. 2012, 32 pgs.
*Trend Micro, Inc.* v. *Webroot Inc.,* PTAB Case No. IPR2023-01380, Exhibit 1014: Ian H. Witten, Data Mining, Practical Machine Learning Tools and Techniques 2, Jul. 2005, 10 pgs.
*Trend Micro, Inc.* v. *Webroot Inc.,* PTAB Case No. IPR2023-01380, Exhibit 1015: Craig Szydlowski, Multithreaded Technology & Multicore Processors, Dr. Dobb's Journal, May 2005, 19 pgs.
*Trend Micro, Inc.* v. *Webroot Inc.,* PTAB Case No. IPR2023-01380, Exhibit 1016: *Webroot, Inc. and Open Text, Inc.* v. *Trend Micro Inc.,* Case No. 6:22-cv-00243-ADA-DTG, Claim Construction Order, Dkt. 391 (W.D. Tex.) Jul. 25, 2023, 15 pgs.
*Trend Micro, Inc.* v. *Webroot Inc.,* PTAB Case No. IPR2023-01380, Exhibit 1017: U.S. Pat. No. 7,657,838, Daniell et al., 15 pgs.
*Trend Micro, Inc.* v. *Webroot Inc.,* PTAB Case No. IPR2023-01380, Exhibit 1018: U.S. Pat. No. 8,885,928, Forman, 11 pgs.

(56) References Cited

OTHER PUBLICATIONS

*Trend Micro, Inc.* v. *Webroot Inc.*, PTAB Case No. IPR2023-01380, Exhibit 1019: U.S. Publication 20100082642, Forman, 14 pgs.
*Crowdstrike, Inc.* v. *Webroot Inc.*, PTAB Case No. IPR2022-01522, Patent Owner's Response to Petition, Jul. 18, 2023, 83 pgs.
*Crowdstrike, Inc.* v. *Webroot Inc.*, PTAB Case No. IPR2022-01522, Exhibit 2024: Declaration of Professor Nenad Medvidovic, Ph.D in Support of Patent Owner's Response to Petition, 131 pgs.
*Crowdstrike, Inc.* v. *Webroot Inc.*, PTAB Case No. IPR2022-01522, Exhibit 2025: Erickson, J., Hacking: The Art of Exploitation, 2nd Ed. (2008), 492 pgs.
*Crowdstrike, Inc.* v. *Webroot Inc.*, PTAB Case No. IPR2022-01522, Exhibit 2026: Kleymenov, A. and Thabet, A., Mastering Malware Analysis, Packt Pub. (2019), 547 pgs.
*Crowdstrike, Inc.* v. *Webroot Inc.*, PTAB Case No. IPR2022-01522, Exhibit 2027: Deposition Transcript of Dr. Wenke Lee, Ph.D., Jun. 30, 2023, 212 pgs.
*Crowdstrike, Inc.* v. *Webroot Inc.*, PTAB Case No. IPR2022-01522, Exhibit 2028: U.S. Pat. No. 9,251,373, AlHarbi, 14 pgs.
*Crowdstrike, Inc.* v. *Webroot Inc.*, PTAB Case No. IPR2022-01522, Exhibit 2029: U.S. Pat. No. 8,291,381, Lai, 26 pgs.
*Crowdstrike, Inc.* v. *Webroot Inc.*, PTAB Case No. IPR2022-01522, Exhibit 2030: GeeksforGeeks, Stack Unwinding in C++, Nov. 25, 2021, 7 pgs.
*Crowdstrike, Inc.* v. *Webroot Inc.*, PTAB Case No. IPR2022-01522, Exhibit 2031: IBM Documentation, Stack unwinding (C++ only) IBM Documentation, Mar. 22, 2021, 3 pgs.
*Crowdstrike, Inc.* v. *Webroot Inc.*, PTAB Case No. IPR2022-01522, Exhibit 2032: Microsoft Learn, Exceptions and Stack Unwinding in C++, Nov. 13, 2022, 4 pgs.
*Crowdstrike, Inc.* v. *Webroot Inc.*, PTAB Case No. IPR2022-01522, Decision denying Patent Owner's Request for Rehearing of Decision Granting Institution of Inter Partes Review, Aug. 21, 23, 12 pgs.
*Trend Micro, Inc.* v. *Webroot Inc.*, PTAB Case No. IPR2023-00692, Patent Owner's Preliminary Response to Petition, Aug. 11, 2023, 81 pgs.
*Trend Micro, Inc.* v. *Webroot Inc.*, PTAB Case No. IPR2023-00692, Exhibit 2001: Declaration of Professor Nenad Medvidovic, Ph.D in Support of Patent Owner's Preliminary Response To Petition, 58 pgs.
*Trend Micro, Inc.* v. *Webroot Inc.*, PTAB Case No. IPR2023-00692, Exhibit 2002: Curriculum Vitae of Professor Nenad Medvidovic, Ph.D., 71 pgs.
*Trend Micro, Inc.* v. *Webroot Inc.*, PTAB Case No. IPR2023-00692, Exhibit 2003: *Webroot, Inc. and Open Text Inc.*, v. *Trend Micro Inc.*, Case No. 6:22-cv-00239, Complaint for Patent Infringement, Dkt. 1 (W.D. Tex., Mar. 4, 2022), 117 pgs.
*Trend Micro, Inc.* v. *Webroot Inc.*, PTAB Case No. IPR2023-00692, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Trend Micro, Inc.* v. *Webroot Inc.*, PTAB Case No. IPR2023-00692, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Trend Micro, Inc.* v. *Webroot Inc.*, PTAB Case No. IPR2023-00692, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00692, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.

*Trend Micro, Inc.* v. *Webroot Inc.*, PTAB Case No. IPR2023-00692, Exhibit 2008: Dani Kass, "Catching Up On Patent Litigation With Judge Al-bright" (Law360 Mar. 14, 2023); https://www.law360.com/pulse/articles/1582438/print?section=pulse/courts, 3 pgs.
*Trend Micro, Inc.* v. *Webroot Inc.*, PTAB Case No. IPR2023-00692, Exhibit 2009: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Trend Micro, Inc.* v. *Webroot Inc.*, PTAB Case No. IPR2023-00692, Exhibit 2010: U.S. District Courts-Federal Court Management Statistics-Profiles-During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, 95 pgs.
*Trend Micro, Inc.* v. *Webroot Inc.*, PTAB Case No. IPR2023-00692, Exhibit 2011: *Webroot, Inc. and Open Text Inc.*, v. *Trend Micro, Inc.*, Case No. 6:22-cv-00239-ADA-DTG, Defendant's Preliminary Invalidity Contentions (W.D. Tex., Sep. 13, 2022), 125 pgs.
*Trend Micro, Inc.* v. *Webroot Inc.*, PTAB Case No. IPR2023-00692, Exhibit 2012: *Webroot, Inc. and Open Text Inc.*, v. *Sophos Ltd.*, Case No. 6:22-cv-240-ADA-DTG, Defendant's Preliminary Invalidity Contentions (W.D. Tex., Sep. 13, 2022), 127 pgs.
*Trend Micro, Inc.* v. *Webroot Inc.*, PTAB Case No. IPR2023-00692, Exhibit 2013: *Webroot, Inc. and Open Text Inc.*, v. *CrowdStrike, Inc. and CrowdStrike Holdings, Inc.*, Case No. 6:22-cv-00241-ADA-DTG, Second Supplemental Preliminary Invalidity Contentions (W.D. Tex., Jul. 14, 2023), 85 pgs.
*Trend Micro, Inc.* v. *Webroot Inc.*, PTAB Case No. IPR2023-00692, Exhibit 2014: U.S. Publication No. 20090049550, Shevchenko, Feb. 19, 2009, 17 pgs.
*Trend Micro, Inc.* v. *Webroot Inc.*, PTAB Case No. IPR2023-00692, Exhibit 2015: U.S. Publication No. 20050108562, Khazan et al., May 19, 2005, 30 pgs.
*Trend Micro, Inc.* v. *Webroot Inc.*, PTAB Case No. IPR2023-00692, Exhibit 2016: U.S. Pat. No. 8,510,596, Gupta, Aug. 13, 2013, 47 pgs.
*Trend Micro, Inc.* v. *Webroot Inc.*, PTAB Case No. IPR2023-00692, Exhibit 2017: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00692, Exhibit 2018: Erickson, J., Hacking: The Art of Exploitation, 2nd Ed. (2008), 486 pgs.
*Trend Micro, Inc.* v. *Webroot Inc.*, PTAB Case No. IPR2023-00692, Exhibit 2019: Kleymenov, A. and Thabet, A., Mastering Malware Analysis, Packt Pub. (2019), 547 pgs.
*Trend Micro, Inc.* v. *Webroot Inc.*, PTAB Case No. IPR2023-00692, Exhibit 2020: LWN.net, An Introduction to Last Branch Records (Mar. 23, 2016) (available at https://web.archive.org/web/20160413055733/https://lwn.net/Articles/680985/), 5 pgs.
*Trend Micro, Inc.* v. *Webroot Inc.*, PTAB Case No. IPR2023-00692, Exhibit 2021: U.S. Pat. No. 9,251,373, AlHarbi, Feb. 2, 2016, 14 pgs.
*Trend Micro, Inc.* v. *Webroot Inc.*, PTAB Case No. IPR2023-00692, Exhibit 2022: U.S. Pat. No. 8,291,381, Lai, Oct. 16, 2012, 26 pgs.
*Trend Micro, Inc.* v. *Webroot Inc.*, PTAB Case No. IPR2023-00692, Exhibit 2023: GeeksforGeeks, Stack Unwinding in C++, Nov. 25, 2021, 7 pgs.
*Trend Micro, Inc.* v. *Webroot Inc.*, PTAB Case No. IPR2023-00692, Exhibit 2024: IBM Documentation, Stack unwinding (C++ only), Mar. 22, 2021, 3 pgs.
*Trend Micro, Inc.* v. *Webroot Inc.*, PTAB Case No. IPR2023-00692, Exhibit 2025: Microsoft Learn, Exceptions and Stack Unwinding in C++, Nov. 13, 2022, 4 pgs.
*Trend Micro, Inc.* v. *Webroot Inc.*, PTAB Case No. IPR2023-00692, Sotera Stipulation, Sep. 28, 2023, 3 pgs.
*Trend Micro, Inc.* v. *Webroot Inc.*, PTAB Case No. IPR2023-00692, Order, Conduct of Proceeding, Sep. 28, 2023, 6 pgs.
*Trend Micro, Inc.* v. *Webroot Inc.*, PTAB Case No. IPR2023-00692, Exhibit 3001: email re: Sotera Stipulation, Sep. 28, 2023, 2 pgs.

(56) References Cited

OTHER PUBLICATIONS

*Trend Micro, Inc.* v. *Webroot Inc.*, PTAB Case No. IPR2023-00692, Decision denying institution of Inter Parties Review, Nov. 6, 2023, 32 pgs.
*AO Kaspersky Lab* v. *Webroot Inc.*, PTAB Case No. IPR2023-00895, Corrected Label Exhibit 1001: U.S. Pat. No. 10,284,591, Giuliani, May 7, 2019, 14 pgs.
*AO Kaspersky Lab* v. *Webroot Inc.*, PTAB Case No. IPR2023-00895, Corrected Label Exhibit 1002: Declaration of V.S. Subrahmanian, Ph.D. under 37 C.F.R. §1.68, 110 pgs.
*AO Kaspersky Lab* v. *Webroot Inc.*, PTAB Case No. IPR2023-00895, Corrected Label Exhibit 1003: Curriculum Vitae of V.S. Subrahmanian, Ph.D., 77 pgs.
*AO Kaspersky Lab* v. *Webroot Inc.*, PTAB Case No. IPR2023-00895, Corrected Label Exhibit 1004: Motion for Order Authorizing Alternative Service, 13 pgs.
*AO Kaspersky Lab* v. *Webroot Inc.*, PTAB Case No. IPR2023-00895, Corrected Label Exhibit 1005: Waiver of Service of Summons, 1 pgs.
*AO Kaspersky Lab* v. *Webroot Inc.*, PTAB Case No. IPR2023-00895, Corrected Label Exhibit 1006: File History of U.S. Pat. No. 10,284,591, 238 pgs.
*AO Kaspersky Lab* v. *Webroot Inc.*, PTAB Case No. IPR2023-00895, Corrected Label Exhibit 1007: Ivan Fratric, Runtime Prevention of Return-Oriented Programming Attacks, at https://github.com/ivanfratric/ropguard/blob/master/doc/ropguard.pdf, 11 pgs.
*AO Kaspersky Lab* v. *Webroot Inc.*, PTAB Case No. IPR2023-00895, Corrected Label Exhibit 1008: U.S. Publication No. 20120255018, Sallam, Oct. 4, 2012, 53 pg.
*AO Kaspersky Lab* v. *Webroot Inc.*, PTAB Case No. IPR2023-00895, Corrected Label Exhibit 1009: Hello World, Github Docs, at https://docs.github.com/en/get-started/quickstart/hello-world (last visited Apr. 26, 2023), 8 pgs.
*AO Kaspersky Lab* v. *Webroot Inc.*, PTAB Case No. IPR2023-00895, Corrected Label Exhibit 1010: Committing and Reviewing Changes to your Project, Github Docs, at https://docs.github.com/en/desktop/contributing-and-collaborating-using-github-desktop/making-changes-in-a-branch/committing-and-reviewing-changes-to-your-project (last visited Apr. 26, 2023), 11 pgs.
*AO Kaspersky Lab* v. *Webroot Inc.*, PTAB Case No. IPR2023-00895, Corrected Label Exhibit 1011: Setting Repository Visibility, Github Docs, at https://docs.github.com/en/repositories/managing-your-repositorys-settings-and-features/managing-repository-settings/setting-repository-visibility (last visited Apr. 26, 2023), 3 pgs.
*AO Kaspersky Lab* v. *Webroot Inc.*, PTAB Case No. IPR2023-00895, Corrected Label Exhibit 1012: GitHub Glossary, Github Docs, at https://docs.github.com/en/get-started/quickstart/github-glossary#public-repository (last visited Apr. 26, 2023), 37 pgs.
*AO Kaspersky Lab* v. *Webroot Inc.*, PTAB Case No. IPR2023-00895, Corrected Label Exhibit 1013: Scott Chacon, GitHub Code Search, The Github Blog, at https://github.blog/2008-11-03-github-code-search/, Nov. 3, 2008, 7 pgs.
*AO Kaspersky Lab* v. *Webroot Inc.*, PTAB Case No. IPR2023-00895, Corrected Label Exhibit 1014: About Searching on GitHub, Github Docs, at https://docs.github.com/en/search-github/getting-started-with-searching-on-github/about-searching-on-github (last visited Apr. 26, 2023), 3 pgs.
*AO Kaspersky Lab* v. *Webroot Inc.*, PTAB Case No. IPR2023-00895, Corrected Label Exhibit 1015: Finding Ways to Contribute to Open Source on GitHub, Github Docs, at https://docs.github.com/en/get-started/exploring-projects-on-github/finding-ways-to-contribute-to-open-source-on-github (last visited Apr. 26, 2023), 3 pgs.
*AO Kaspersky Lab* v. *Webroot Inc.*, PTAB Case No. IPR2023-00895, Corrected Label Exhibit 1016: Claim Construction Order, *Webroot, Inc. and Open Text, Inc.* v. *AO Kaspersky Lab*, Case No. 6:22-CV-00243-ADA-DTG, (Mar. 16, 2023), 5 pgs.
*AO Kaspersky Lab* v. *Webroot Inc.*, PTAB Case No. IPR2023-00895, Corrected Label Exhibit 1017: Michael Huttermann, Devops For Developers (Apress, 2012), 183 pgs.
*AO Kaspersky Lab* v. *Webroot Inc.*, PTAB Case No. IPR2023-00895, Corrected Label Exhibit 1018: Nicolas Despres, Automatic performance monitoring tool, Laboratoire De Recherche Et Developpement De L'epita Tech Report No. 0601, 915 (2006), 21 pgs.
*AO Kaspersky Lab* v. *Webroot Inc.*, PTAB Case No. IPR2023-00895, Corrected Label Exhibit 1019: Bryan D. Payne, Martin D.P. de A. Carbone, Wenke Lee, Dec. 2007. Secure and Flexible Monitoring of Virtual Machines, $23^{rd}$ Ann. Comp. Sec. Applications Conf., 385, 385-397 (2007), 13 pgs.
*AO Kaspersky Lab* v. *Webroot Inc.*, PTAB Case No. IPR2023-00895, Corrected Label Exhibit 1020: Margaret Rouse, Dynamic Library, Techopedia (Mar. 2, 2012), 7 pgs.
*AO Kaspersky Lab* v. *Webroot Inc.*, PTAB Case No. IPR2023-00895, Corrected Label Exhibit 1021: Krishnan, S. and Srihari, K., A Knowledge-Based Object Oriented DFM Advisor for Surface Mount PCB Assembly. 10 Li Int'l. J. Advanced Mfg. Tech, 317, 317-329 (1995), 13 pgs.
*AO Kaspersky Lab* v. *Webroot Inc.*, PTAB Case No. IPR2023-00895, Corrected Label Exhibit 1022: Henry Hanping Feng, Jonathon T. Giffin, Yong Huang, Somesh Jha, Wenkee Lee, and Barton P. Miller, Formalizing Sensitivity in Static Analysis for Intrusion Detection, IEEE Symp. Sec. Priv., 194, 194-208, 15 pgs.
*AO Kaspersky Lab* v. *Webroot Inc.*, PTAB Case No. IPR2023-00895, Corrected Label Exhibit 1023: Wei Li, Lap-chung Lam, and Tzi-cker Chiueh, How to Automatically and Accurately Sandbox Microsoft IIS, 22nd Ann. Comp. Sec. Applications Conf., 213, 213-222 (2006), 10 pgs.
*AO Kaspersky Lab* v. *Webroot Inc.*, PTAB Case No. IPR2023-00895, Corrected Label Exhibit 1024: Kevin A. Roundy and Barton P. Miller, Hybrid Analysis and Control of Malware, Recent Advances In Intrusion Detection: 13th Int'l Symp., 317, 317-338 (2010), 23 pgs.
*AO Kaspersky Lab* v. *Webroot Inc.*, PTAB Case No. IPR2023-00895, Corrected Label Exhibit 1025: Toshiyuki Maeda, 2002, Safe Execution of User Programs in Kernel Mode Using Typed Assembly Language, (Master's Thesis, University of Tokyo, 2002), 44 pgs.
*AO Kaspersky Lab* v. *Webroot Inc.*, PTAB Case No. IPR2023-00895, Corrected Label Exhibit 1026: Alex Skaletsky, Tevi Devor, Nadav Chachmon, Robert Cohn, Kim Hazelwood, Vladimirov, Moshe Bach, Dynamic Program Analysis of Microsoft Windows Applications, IEEE Int'l Symp. Performance Analysis Sys. Software, 2, 2-12 (2010), 11 pgs.
*AO Kaspersky Lab* v. *Webroot Inc.*, PTAB Case No. IPR2023-00895, Corrected Label Exhibit 1027: Tarjei Mandt, T., Locking Down the Windows Kernel: Mitigating Null Pointer Exploitation, Norman Threat Research, 13 pgs.
*AO Kaspersky Lab* v. *Webroot Inc.*, PTAB Case No. IPR2023-00895, Corrected Label Exhibit 1028: Xiangyu Dong, Cong Xu, Yuan Xie, Norman P. Jouppi, N.P., NVSim: A Circuit-Level Performance, Energy, and Area Model for Emerging Nonvolatile Memory, 31 IEEE Transactions Computer-Aided Design Of Integrated Circuits Sys., 994, 994-1007 (2012), 14 pgs.
*AO Kaspersky Lab* v. *Webroot Inc.*, PTAB Case No. IPR2023-00895, Corrected Label Exhibit 1029: Father, H., Hooking Windows API-Technics of hooking API functions on Windows, 2 Assembly Programming J., 2, 2-30 (2004), 30 pgs.
*AO Kaspersky Lab* v. *Webroot Inc.*, PTAB Case No. IPR2023-00895, Corrected Label Exhibit 1030: J. Berdajs and Z. Bosnić, Extending Applications Using an Advanced Approach to DLL Injection and API Hooking, 40 Software: Practice Experience, 567, 567-584 (2010), 18 pgs.
*AO Kaspersky Lab* v. *Webroot Inc.*, PTAB Case No. IPR2023-00895, Corrected Label Exhibit 1031: Ulrich Bayer, Christopher Kruegel, and Engin Kirda, TTAnalyze: A Tool for Analyzing Malware, Ikarus Software Tech. Univ. Vienna, 180, 180-192 (2006), 12 pgs.
*AO Kaspersky Lab* v. *Webroot Inc.*, PTAB Case No. IPR2023-00895, Patent Owner's Preliminary Response to Petition, Sep. 11, 2023, 48 pgs.
*AO Kaspersky Lab* v. *Webroot Inc.*, PTAB Case No. IPR2023-00895, Exhibit 2001: Declaration of Professor Nenad Medvidovic, Ph.D in Support of Patent Owner's Preliminary Response To Petition, 15 pgs.

(56) References Cited

OTHER PUBLICATIONS

*AO Kaspersky Lab* v. *Webroot Inc.*, PTAB Case No. IPR2023-00895, Exhibit 2002: Curriculum Vitae of Professor Nenad Medvidovic, Ph.D., 71 pgs.
*AO Kaspersky Lab* v. *Webroot Inc.*, PTAB Case No. IPR2023-00895, Exhibit 2003: *Webroot, Inc. and Open Text Inc.*, v. *AO Kaspersky.*, Case No. 6:22-cv-00243, Complaint for Patent Infringement, Dkt. 1 (W.D. Tex., Mar. 4, 2022), 115 pgs.
*AO Kaspersky Lab* v. *Webroot Inc.*, PTAB Case No. IPR2023-00895, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*AO Kaspersky Lab* v. *Webroot Inc.*, PTAB Case No. IPR2023-00895, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*AO Kaspersky Lab* v. *Webroot Inc.*, PTAB Case No. IPR2023-00895, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*AO Kaspersky Lab* v. *Webroot Inc.*, PTAB Case No. IPR2023-00895, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 2 pgs.
*AO Kaspersky Lab* v. *Webroot Inc.*, PTAB Case No. IPR2023-00895, Exhibit 2008: Dani Kass, "Catching Up On Patent Litigation With Judge Albright" (Law360 Mar. 14, 2023); at https://www.law360.com/pulse/articles/1582438/print?section=pulse/courts, 3 pgs.
*AO Kaspersky Lab* v. *Webroot Inc.*, PTAB Case No. IPR2023-00895, Exhibit 2009: *Webroot, Inc. and Open Text Inc.*, v. *AO Kaspersky Lab et al.*, Case No. 6:22-cv-243-ADA-DTG, Order Granting Fifth Amended Scheduling Order, Dkt. 252 (W.D. Tex. Mar. 29, 2023), 7 pgs.
*AO Kaspersky Lab* v. *Webroot Inc.*, PTAB Case No. IPR2023-00895, Exhibit 2010: U.S. District Courts—Federal Court Management Statistics—Profiles—During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, 95 pgs.
*AO Kaspersky Lab* v. *Webroot Inc.*, PTAB Case No. IPR2023-00895, Exhibit 2011: *Webroot, Inc. and Open Text Inc.*, v. *AO Kaspersky Lab et al.*, Case No. 6:22-cv-243-ADA-DTG, Defendant's Preliminary Invalidity Contentions, Appx. B (W.D. Tex., Sep. 14, 2022), 125 pgs.
*AO Kaspersky Lab* v. *Webroot Inc.*, PTAB Case No. IPR2023-00895, Exhibit 2012: *Webroot, Inc. and Open Text Inc.*, v. *Sophos Ltd.*, Case No. 6:22-cv-240-ADA-DTG, Defendant's Preliminary Invalidity Contentions (W.D. Tex., Sep. 13, 2022), 127 pgs.
*AO Kaspersky Lab* v. *Webroot Inc.*, PTAB Case No. IPR2023-00895, Exhibit 2013: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*AO Kaspersky Lab* v. *Webroot Inc.*, PTAB Case No. IPR2023-00895, Exhibit 2014: Setting Repository Visibility, Github Docs, https://docs.github.com/en/repositories/managing-your-repositorys-settings-and-features/managing-repository-settings/setting-repository-visibility (last visited Sep. 11, 2023), 3 pgs.
*AO Kaspersky Lab* v. *Webroot Inc.*, PTAB Case No. IPR2023-00895, Exhibit 2015: Calendar of archives for https://github.com/ivanfratric/ropguard, Internet Archive Wayback Machine, at https://web.archive.org/web/20180401000000*/https://github.com/ivanfratric/ropguard (last visited Sep. 11, 2023), 2 pgs.
*AO Kaspersky Lab* v. *Webroot Inc.*, PTAB Case No. IPR2023-00895, Exhibit 2016: Reviewing Your Security Log, Github Docs, at https://docs.github.com/en/authentication/keeping-your-account-and-data-secure/reviewing-your-security-log (last visited Sep. 11, 2023), 6 pgs.
*Crowdstrike, Inc.* v. *Webroot Inc.*, PTAB Case No. IPR2023-00124, Decision Granting Institution of Inter Partes Review, Jun. 15, 2023, 48 pgs.
*Crowdstrike, Inc.* v. *Webroot Inc.*, PTAB Case No. IPR2023-00124, Scheduling Order, Jun. 15, 2023, 12 pgs.
*Crowdstrike, Inc.* v. *Webroot Inc.*, PTAB Case No. IPR2023-00124, Patent Owner's Request for Rehearing, Jun. 29, 2023, 19 pgs.
*Crowdstrike, Inc.* v. *Webroot Inc.*, PTAB Case No. IPR2023-00124, Patent Owner's Updated Exhibit List, Jun. 29, 2023, 6 pgs.
*Crowdstrike, Inc.* v. *Webroot Inc.*, PTAB Case No. IPR2023-00124, Exhibit 2024: *Webroot, Inc. and Open Text Inc.* v. *AO Kaspersky Lab et al.*, Case No. 6:22-cv-243-ADA-DTG, Claim Construction Order, Dkt. 236 (W.D. Tex. Mar. 16, 2023), 20 pgs.
*Crowdstrike, Inc.* v. *Webroot Inc.*, PTAB Case No. IPR2023-00124, Patent Owner's Objections to Evidence submitted by Petitioner, Jun. 30, 2023, 6 pgs.
*Crowdstrike, Inc.* v. *Webroot Inc.*, PTAB Case No. IPR2023-00124, Patent Owner's Response to Petition, Sep. 7, 2023, 81 pgs.
*Crowdstrike, Inc.* v. *Webroot Inc.*, PTAB Case No. IPR2023-00124, Exhibit 2025: *Crowdstrike, Inc.* v. *Open Text Inc.*, IPR2023-00126, Deposition Transcript of Wenke Lee, Ph.D., dated Jul. 17, 2023, 269 pgs.
*Crowdstrike, Inc.* v. *Webroot Inc.*, PTAB Case No. IPR2023-00124, Exhibit 2026: Second Declaration of Professor Nenad Medvidovic, Ph.D., 83 pgs.
*Crowdstrike, Inc.* v. *Webroot Inc.*, PTAB Case No. IPR2023-00124, Exhibit 2027: Email chain from Brian Eutermoser to Hunter Horton regarding *Crowdstrike, Inc.* v. *Open Text Inc.* | IPR2023-00124-r. Lee deposition, 2 pgs.
*Trend Micro, Inc.* v. *Webroot Inc.*, PTAB Case No. IPR2023-00677, Replacement Exhibit 1002: Expert Declaration of Dr. Seth Nielson, Jul. 17, 2023, 138 pgs.
*Trend Micro, Inc.* v. *Webroot Inc.*, PTAB Case No. IPR2023-00677, Patent Owner's Preliminary Response, Aug. 10, 2023, 80 pgs.
*Trend Micro, Inc.* v. *Webroot Inc.*, PTAB Case No. IPR2023-00677, Exhibit 2001: Declaration of Professor Nenad Medvidovic, Ph.D., 64 pgs.
*Trend Micro, Inc.* v. *Webroot Inc.*, PTAB Case No. IPR2023-00677, Exhibit 2002: Curriculum Vitae of Professor Nenad Medvidovic, Ph.D., 71 pgs.
*Trend Micro, Inc.* v. *Webroot Inc.*, PTAB Case No. IPR2023-00677, Exhibit 2003: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Trend Micro, Inc.* v. *Webroot Inc.*, PTAB Case No. IPR2023-00677, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Trend Micro, Inc.* v. *Webroot Inc.*, PTAB Case No. IPR2023-00677, Exhibit 2005: *mCom IP, LLC*, v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Trend Micro, Inc.* v. *Webroot Inc.*, PTAB Case No. IPR2023-00677, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00677, Exhibit 2007: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.

(56) References Cited

OTHER PUBLICATIONS

*Trend Micro, Inc.* v. *Webroot Inc.*, PTAB Case No. IPR2023-00677, Exhibit 2008: Dani Kass, "Catching Up On Patent Litigation With Judge Albright" (Law360 Mar. 14, 2023); at https://www.law360.com/pulse/articles/1582438/print?section=pulse/courts, 3 pgs.
*Trend Micro, Inc.* v. *Webroot Inc.*, PTAB Case No. IPR2023-00677, Exhibit 2009: U.S. District Courts—Federal Court Management Statistics—Profiles—During the 12-month Periods Ending Mar. 31, 2018 Through 2023, "Table N/A—U.S. District Courts—Combined Civil and Criminal Federal Court Management Statistics (Mar. 31, 2023)," available at https://www.uscourts.gov/sites/default/files/data_tables/fcms_na_distprofile0331.2023.pdf, 95 pgs.
*Trend Micro, Inc.* v. *Webroot Inc.*, PTAB Case No. IPR2023-00677, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00677, Exhibit 2011: *Webroot, Inc. and Open Text Inc.*, v. *Trend Micro Inc*, Case No. 6:22-cv-00239-ADA-DTG, Defendant Trend Micro's Preliminary Invalidity Contentions (W.D. Tex., Sep. 13, 2022), 125 pgs.
*Trend Micro, Inc.* v. *Webroot Inc.*, PTAB Case No. IPR2023-00677, Exhibit 2012: *Webroot, Inc. and Open Text Inc.*, v. *Trend Micro Inc.*, Case No. 6:22-cv-00239-ADA-DTG, Plaintiff's Preliminary Infringement Contentions (W.D. Tex., Jul. 13, 2022), 10 pgs.
*Trend Micro, Inc.* v. *Webroot Inc.*, PTAB Case No. IPR2023-00677, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022), 16 pgs.
*Trend Micro, Inc.* v. *Webroot Inc.*, PTAB Case No. IPR2023-00677, Exhibit 2014: *Webroot, Inc. and Open Text Inc.*, v. *Trend Micro Inc.*, Case No. 6:22-cv-00239-ADA, Complaint for Patent Infringement, Dkt. 1 (W.D. Tex., Mar. 4, 2022), 117 pgs.
*Trend Micro, Inc.* v. *Webroot Inc.*, PTAB Case No. IPR2023-00677, Exhibit 2015: *Webroot, Inc. and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.
*Trend Micro, Inc.* v. *Webroot Inc.*, PTAB Case No. IPR2023-00677, Exhibit 2016: *Open Text Inc et al.*, v. *AO Kaspersky Lab*, Case No. 6:22-cv-00243-ADA-DTG, First Amended Complaint for Patent Infringement, Dkt. 80 (W.D. Tex., Oct. 27, 2022), 148 pgs.
*Trend Micro, Inc.* v. *Webroot Inc.*, PTAB Case No. IPR2023-00677, Exhibit 2017: *Webroot, Inc. and Open Text Inc.*, v. *Trend Micro Inc.*, Case No. 6:22-cv-00239-ADA-DTG, First Amended Complaint for Patent Infringement, Dkt. 53 (W.D. Tex., Sept. 7, 2022), 235 pgs.
*Trend Micro, Inc.* v. *Webroot Inc.*, PTAB Case No. IPR2023-00677, Exhibit 2018: *Webroot, Inc. and Open Text Inc.*, v. *Sophos, Ltd.*, Case No. 6:22-cv-00240-ADA-DTG, Second Amended Complaint for Patent Infringement, Dkt. 76 (W.D. Tex., Oct. 24, 2022), 184 pgs.
*Trend Micro, Inc.* v. *Webroot Inc.*, PTAB Case No. IPR2023-00677, Exhibit 2019: *Webroot, Inc. and Open Text Inc.*, v. *CrowdStrike, Inc. and CrowdStrike Holdings, Inc.*, Case No. 6:22-cv-002410ADA-DTG, Defendant's Preliminary Invalidity Contentions (W.D. Tex., Sep. 13, 2022), 62 pgs.
*Trend Micro, Inc.* v. *Webroot Inc.*, PTAB Case No. IPR2023-00677, Sotera Stipulation, Sep. 28, 2023, 3 pgs.
*Trend Micro, Inc.* v. *Webroot Inc.*, PTAB Case No. IPR2023-00677, Order Conduct of Proceeding, Sep. 28, 2023, 6 pgs.
*Trend Micro, Inc.* v. *Webroot Inc.*, PTAB Case No. IPR2023-00677, Exhibit 3001: email re: Sotera stipulation, Sep. 28, 2023, 2 pgs.
*Trend Micro, Inc.* v. *Webroot Inc.*, PTAB Case No. IPR2023-00677, Decision denying institution of Inter Parties Review, Nov. 6, 2023, 24 pgs.
*AO Kaspersky Lab* v. *Webroot Inc.*, PTAB Case No. IPR2023-01199, Patent Owner Open Text Inc.'s Mandatory Notices Pursuant to 37 CFR § 42.8(b), Aug. 4, 2023, 10 pgs.

*AO Kaspersky Lab* v. *Webroot Inc.*, PTAB Case No. IPR2023-01199, Notice of Filing Date Accorded to Petition and Time for Filing Patent Owner Preliminary Response, Sep. 19, 2023, 6 pgs.
*Trend Micro, Inc.* v. *Webroot Inc.*, PTAB Case No. IPR2023-00657, Patent Owner's Preliminary Response, Jul. 17, 2023, 73 pgs.
*Trend Micro, Inc.* v. *Webroot Inc.*, PTAB Case No. IPR2023-00657, Exhibit 2001: Declaration of Professor Nenad Medvidovic, Ph.D., 59 pgs.
*Trend Micro, Inc.* v. *Webroot Inc.*, PTAB Case No. IPR2023-00657, Exhibit 2002: Curriculum Vitae of Professor Nenad Medvidovic, Ph.D., 71 pgs.
*Trend Micro, Inc.* v. *Webroot Inc.*, PTAB Case No. IPR2023-00657, Exhibit 2003: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Trend Micro, Inc.* v. *Webroot Inc.*, PTAB Case No. IPR2023-00657, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Trend Micro, Inc.* v. *Webroot Inc.*, PTAB Case No. IPR2023-00657, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Trend Micro, Inc.* v. *Webroot Inc.*, PTAB Case No. IPR2023-00657, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00657, Exhibit 2007:. *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Trend Micro, Inc.* v. *Webroot Inc.*, PTAB Case No. IPR2023-00657, Exhibit 2008: Dani Kass, "Catching Up On Patent Litigation With Judge Albright" (Law360 Mar. 14, 2023); at https://www.law360.com/pulse/articles/1582438/print?section= pulse/courts, 3 pgs.
*Trend Micro, Inc.* v. *Webroot Inc.*, PTAB Case No. IPR2023-00657, Exhibit 2009: U.S. District Courts-Federal Court Management Statistics—Pro-files—During the 12-month Periods Ending Mar. 31, 2018 through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, 95 pgs.
*Trend Micro, Inc.* v. *Webroot Inc.*, PTAB Case No. IPR2023-00657, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00657, Exhibit 2011: *Webroot, Inc. and Open Text Inc.*, v. *Trend Micro Inc*, Case No. 6:22-cv-00239-ADA-DTG, Defendant Trend Micro's Preliminary Invalidity Contentions (W.D. Tex., Sep. 13, 2022), 125 pgs.
*Trend Micro, Inc.* v. *Webroot Inc.*, PTAB Case No. IPR2023-00657, Exhibit 2012: *Webroot, Inc. and Open Text Inc.*, v. *Trend Micro Inc.*, Case No. 6:22-cv-00239-ADA-DTG, Plaintiff's Preliminary Infringement Contentions (W.D. Tex., Jul. 13, 2022), 10 pgs.
*Trend Micro, Inc.* v. *Webroot Inc.*, PTAB Case No. IPR2023-00657, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022), 16 pgs.
*Trend Micro, Inc.* v. *Webroot Inc.*, PTAB Case No. IPR2023-00657, Exhibit 2014: *Webroot, Inc. and Open Text Inc.*, v. *Trend Micro Inc.*, Case No. 6:22-cv-00239-ADA, Complaint for Patent Infringement, Dkt. 1 (W.D. Tex., Mar. 4, 2022), 117 pgs.
*Trend Micro, Inc.* v. *Webroot Inc.*, PTAB Case No. IPR2023-00657, Exhibit 2015: *Webroot, Inc. and Open Text Inc.*, v. *CrowdStrike, Inc. and CrowdStrike Holdings, Inc.*, Case No. 6:22-cv-00241-ADA-

(56) References Cited

OTHER PUBLICATIONS

DTG, First Amended Complaint for Patent Infringement, Dkt. 60 (W.D. Tex., Sept. 8, 2022) (excerpted), 37 pgs.
*Trend Micro, Inc.* v. *Webroot Inc.*, PTAB Case No. IPR2023-00657, Exhibit 2016: *Open Text Inc et al.*, v. *AO Kaspersky Lab*, Case No. 6:22-cv-00243-ADA-DTG, First Amended Complaint for Patent Infringement, Dkt. 80 (W.D. Tex., Oct. 27, 2022), 148 pgs.
*Trend Micro, Inc.* v. *Webroot Inc.*, PTAB Case No. IPR2023-00657, Exhibit 2017: *Webroot, Inc. and Open Text Inc.,* v. *Trend Micro Inc.*, Case No. 6:22-cv-00239-ADA-DTG, First Amended Complaint for Patent Infringement, Dkt. 53 (W.D. Tex., Sept. 7, 2022), 235 pgs.
*Trend Micro, Inc.* v. *Webroot Inc.*, PTAB Case No. IPR2023-00657, Exhibit 2018: *Webroot, Inc. and Open Text Inc.,* v. *Sophos, Ltd.*, Case No. 6:22-cv-00240-ADA-DTG, Second Amended Complaint for Patent Infringement, Dkt. 76 (W.D. Tex., Oct. 24, 2022), 184 pgs.
*Trend Micro, Inc.* v. *Webroot Inc.*, PTAB Case No. IPR2023-00657, Exhibit 2019: *Webroot, Inc. and Open Text Inc.,* v. *CrowdStrike, Inc. and Crowdstrike Holdings, Inc.*, Case No. 6:22-cv-002410ADA-DTG, Defendant's Preliminary Invalidity Contentions (W.D. Tex., Sep. 13, 2022), 62 pgs.
*Trend Micro, Inc.* v. *Webroot Inc.*, PTAB Case No. IPR2023-00657, Exhibit 1017: Sotera Stipulation, Sep. 28, 2023, 3 pgs.
*Trend Micro, Inc.* v. *Webroot Inc.*, PTAB Case No. IPR2023-00657, Order Conduct of Proceeding, Sep. 28, 2023, 6 pgs.
*Trend Micro, Inc.* v. *Webroot Inc.*, PTAB Case No. IPR2023-00657, Exhibit 3001: email, Sep. 28, 2023, 2 pgs.
*Trend Micro, Inc.* v. *Webroot Inc.*, PTAB Case No. IPR2023-00657, Decision denying institution of Inter Parties Review, Oct. 13, 2023, 23 pgs.
*AO Kaspersky Lab* v. *Webroot Inc.*, PTAB Case No. IPR2023-01011, Patent Owner Open Text Inc.'s Mandatory Notices Pursuant to 37 CFR § 42.8(b), Jun. 23, 2023, 9 pgs.
*AO Kaspersky Lab* v. *Webroot Inc.*, PTAB Case No. IPR2023-01011, Patent Owner's Preliminary Response, Sep. 11, 2023, 6 pgs.
*AO Kaspersky Lab* v. *Webroot Inc.*, PTAB Case No. IPR2023-01011, Exhibit 2001: *CrowdStrike, Inc.* v. *Open Text Inc.*, IPR2023-00126, Paper 11 (PTAB May 19, 2023), 19 pgs.
*AO Kaspersky Lab* v. *Webroot Inc.*, PTAB Case No. IPR2023-01011, Exhibit 2002: *Webroot, Inc. and Open Text Inc.* v. *AO Kaspersky Lab*, Case No. 6:22-cv-00243-ADA-DTG, Wavier of Summons AO Kaspersky Labs, Dkt. 16 (E.D. Tex May 24, 2022), 1 pg.
*Sophos Ltd. and Sophos Inc.* v. *Webroot Inc.*, PTAB Case No. IPR2023-00731, Patent Owner's Preliminary Response, Aug. 10, 2023, 75 pgs.
*Sophos Ltd. and Sophos Inc.* v. *Webroot Inc.*, PTAB Case No. IPR2023-00731, Exhibit 2001: Declaration of Professor Ron Schnell, 42 pgs.
*Sophos Ltd. and Sophos Inc.* v. *Webroot Inc.*, PTAB Case No. IPR2023-00731, Exhibit 2002: Curriculum Vitae of Professor Ron Schnell, 5 pgs.
*Sophos Ltd. and Sophos Inc.* v. *Webroot Inc.*, PTAB Case No. IPR2023-00731, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Sophos Ltd. and Sophos Inc.* v. *Webroot Inc.*, PTAB Case No. IPR2023-00731, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Sophos Ltd. and Sophos Inc.* v. *Webroot Inc.*, PTAB Case No. IPR2023-00731, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Sophos Ltd. and Sophos Inc.* v. *Webroot Inc.*, PTAB Case No. IPR2023-00731, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Sophos Ltd. and Sophos Inc.* v. *Webroot Inc.*, PTAB Case No. IPR2023-00731, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.
*Sophos Ltd. and Sophos Inc.* v. *Webroot Inc.*, PTAB Case No. IPR2023-00731, Exhibit 2008: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Sophos Ltd. and Sophos Inc.* v. *Webroot Inc.*, PTAB Case No. IPR2023-00731, Exhibit 2009: U.S. District Courts—Federal Court Management Statistics—Profiles—During the 12-Month Periods Ending Mar. 31, 2018 through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, 95 pgs.
*Sophos Ltd. and Sophos Inc.* v. *Webroot Inc.*, PTAB Case No. IPR2023-00731, Exhibit 2010: *Webroot, Inc. and Open Text Inc.*, v. *AO Kaspersky Lab et al.*, Case No. 6:22-cv-243-ADA-DTG, Jul. 25, 2023 Claim Construction Order, Dkt. 391 (W.D. Tex. Jul. 25, 2022), 19 pgs.
*Sophos Ltd. and Sophos Inc.* v. *Webroot Inc.*, PTAB Case No. IPR2023-00731, Exhibit 2011: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Feb. 21, 2023) (excerpted), 17 pgs.
*Sophos Ltd. and Sophos Inc.* v. *Webroot Inc.*, PTAB Case No. IPR2023-00731, Exhibit 2012: *Webroot, Inc. and Open Text Inc.*, v. *Trend Micro, Inc.*, Case No. 6:22-cv-00239-ADA-DTG, Defendant's Preliminary Invalidity Contentions (W.D. Tex., Feb. 21, 2023) (excerpted), 15 pgs.
*Sophos Ltd. and Sophos Inc.* v. *Webroot Inc.*, PTAB Case No. IPR2023-00731, Exhibit 2013: *Webroot, Inc. and Open Text Inc.*, v. *AO Kaspersky Lab*, Case No. 6:22-cv-00243-ADA-DTG, Defendant's Preliminary Invalidity Contentions Appendix C (W.D. Tex., Feb. 21, 2023) (excerpted), 4 pgs.
*Sophos Ltd. and Sophos Inc.* v. *Webroot Inc.*, PTAB Case No. IPR2023-00731, Exhibit 2014: Website: About ResearchGate, https://www.researchgate.net/about, 7 pgs.
*Sophos Ltd. and Sophos Inc.* v. *Webroot Inc.*, PTAB Case No. IPR2023-00731, Exhibit 2015: Website: "Google Announces Beta Release of Google Scholar," Univ. of Calif. (Nov. 17, 2004); available at https://osc.universityofcalifornia.edu/2004/11/google-announces-beta-release-of-google-scholar/, 2 pgs.
*Sophos Ltd. and Sophos Inc.* v. *Webroot Inc.*, PTAB Case No. IPR2023-00731, Revised Mandatory Notices, Aug. 30, 2023, 5 pgs.
*Sophos Ltd. and Sophos Inc.* v. *Webroot Inc.*, PTAB Case No. IPR2023-00731, Board Exhibit 3001, Sep. 18, 2023, 3 pgs.
*Sophos Ltd. and Sophos Inc.* v. *Webroot Inc.*, PTAB Case No. IPR2023-00731, Panel Change Order, Sep. 18, 2023, 3 pgs.
*Crowdstrike, Inc.* v. *Open Text Inc.*, PTAB Case No. IPR2023-01052, Notice of Filing Date Accorded to Petition and Time for Filing Patent Owner Preliminary Response, Aug. 23, 2023, 6 pgs.
*Sophos Ltd. and Sophos Inc.* v. *Webroot Inc.*, PTAB Case No. IPR2023-00732, Patent Owner's Preliminary Response, Aug. 10, 2023, 75 pgs.
*Sophos Ltd. and Sophos Inc.* v. *Webroot Inc.*, PTAB Case No. IPR2023-00732, Exhibit 2001: Declaration of Professor Ron Schnell, 41 pgs.
*Sophos Ltd. and Sophos Inc.* v. *Webroot Inc.*, PTAB Case No. IPR2023-00732, Exhibit 2002: Curriculum Vitae of Professor Ron Schnell, 5 pgs.
*Sophos Ltd. and Sophos Inc.* v. *Webroot Inc.*, PTAB Case No. IPR2023-00732, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s

(56) References Cited

OTHER PUBLICATIONS

Opposed Motion to Stay Pending Resolution of Inter Partes Review, Dkt. 94 (W.D. Tex., Oct. 18, 2022), 7 pgs.

*Sophos Ltd. and Sophos Inc.* v. *Webroot Inc.*, PTAB Case No. IPR2023-00732, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Sophos Ltd. and Sophos Inc.* v. *Webroot Inc.*, PTAB Case No. IPR2023-00732, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Sophos Ltd. and Sophos Inc.* v. *Webroot Inc.*, PTAB Case No. IPR2023-00732, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.

*Sophos Ltd. and Sophos Inc.* v. *Webroot Inc.*, PTAB Case No. IPR2023-00732, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.

*Sophos Ltd. and Sophos Inc.* v. *Webroot Inc.*, PTAB Case No. IPR2023-00732, Exhibit 2008: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.

*Sophos Ltd. and Sophos Inc.* v. *Webroot Inc.*, PTAB Case No. IPR2023-00732, Exhibit 2009: U.S. District Courts—Federal Court Management Statistics—Profiles—During the 12-Month Periods Ending Mar. 31, 2018 through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, 95 pgs.

*Sophos Ltd. and Sophos Inc.* v. *Webroot Inc.*, PTAB Case No. IPR2023-00732, Exhibit 2010: *Webroot, Inc. and Open Text Inc.*, v. *AO Kaspersky Lab et al.*, Case No. 6:22-cv-243-ADA-DTG, Jul. 25, 2023 Claim Construction Order, Dkt. 391 (W.D. Tex. Jul. 25, 2022), 19 pgs.

*Sophos Ltd. and Sophos Inc.* v. *Webroot Inc.*, PTAB Case No. IPR2023-00732, Exhibit 2011: *Webroot, Inc. and Open Text Inc.*, v. *CrowdStrike, Inc. and CrowdStrike Holdings, Inc.*, Case No. 6:22-cv-00241-ADA-DTG, Defendant's Preliminary Invalidity Contentions (W.D. Tex., Feb. 21, 2023) (excerpted), 17 pgs.

*Sophos Ltd. and Sophos Inc.* v. *Webroot Inc.*, PTAB Case No. IPR2023-00732, Exhibit 2012: *Webroot, Inc. and Open Text Inc.*, v. *Trend Micro, Inc.*, Case No. 6:22-cv-00239-ADA-DTG, Defendant's Preliminary Invalidity Contentions (W.D. Tex., Feb. 21, 2023) (excerpted), 15 pgs.

*Sophos Ltd. and Sophos Inc.* v. *Webroot Inc.*, PTAB Case No. IPR2023-00732, Exhibit 2013: *Webroot, Inc. and Open Text Inc.*, v. *AO Kaspersky Lab*, Case No. 6:22-cv-00243-ADA-DTG, Defendant's Preliminary Invalidity Contentions Appendix C (W.D. Tex., Feb. 21, 2023) (excerpted), 4 pgs.

*Sophos Ltd. and Sophos Inc.* v. *Webroot Inc.*, PTAB Case No. IPR2023-00732, Exhibit 2014: Website: About ResearchGate, https://www.researchgate.net/about, 7 pgs.

*Sophos Ltd. and Sophos Inc.* v. *Webroot Inc.*, PTAB Case No. IPR2023-00732, Exhibit 2015: Website: "Google Announces Beta Release of Google Scholar," Univ. of Calif. (Nov. 17, 2004); available at https://osc.universityofcalifornia.edu/2004/11/google-announces-beta-release-of-google-scholar/, 2 pgs.

*Sophos Ltd. and Sophos Inc.* v. *Webroot Inc.*, PTAB Case No. IPR2023-00732, Exhibit 2016: U.S. Pat. No. 8,201,243 File History (Sophos Ex. 1002 IPR2023-00731), 423 pgs.

*Sophos Ltd. and Sophos Inc.* v. *Webroot Inc.*, PTAB Case No. IPR2023-00732, Revised Mandatory Notices, Aug. 30, 2023, 5 pgs.

*Sophos Ltd. and Sophos Inc.* v. *Webroot Inc.*, PTAB Case No. IPR2023-00732, Panel Change Order, Sep. 12, 2023, 3 pgs.

*Sophos Ltd. and Sophos Inc.* v. *Webroot Inc.*, PTAB Case No. IPR2023-00732, Board Exhibit 3001, Sep. 15, 2023, 3 pgs.

*Sophos Ltd. and Sophos Inc.* v. *Webroot Inc.*, PTAB Case No. IPR2023-00732, Order Conduct of the Proceeding, Oct. 2, 2023, 3 pgs.

*Sophos Ltd. and Sophos Inc.* v. *Webroot Inc.*, PTAB Case No. IPR2023-00732, Motion to Dismiss Petition for Inter Partes Review, Oct. 10, 2023, 10 pgs.

*Sophos Ltd. and Sophos Inc.* v. *Webroot Inc.*, PTAB Case No. IPR2023-00732, Patent Owner's Updated Exhibit List, Oct. 13, 2023, 6 pgs.

*Sophos Ltd. and Sophos Inc.* v. *Webroot Inc.*, PTAB Case No. IPR2023-00732, Exhibit 2017: email from Best to Eutermoser, Oct. 13, 2023, 3 pgs.

*Sophos Ltd. and Sophos Inc.* v. *Webroot Inc.*, PTAB Case No. IPR2023-00732, Patent Owner's Opposition to Petitioners' Motion to Dismiss Petition, Oct. 13, 2023, 9 pgs.

*Sophos Ltd. and Sophos Inc.* v. *Webroot Inc.*, PTAB Case No. IPR2023-00732, Exhibit 3002, Oct. 16, 2023, 3 pgs.

*Sophos Ltd. and Sophos Inc.* v. *Webroot Inc.*, PTAB Case No. IPR2023-00732, Order denying Motion to Dismiss, Nov. 1, 2023, 6 pgs.

*Sophos Ltd. and Sophos Inc.* v. *Webroot Inc.*, PTAB Case No. IPR2023-00732, Decision denying Institution of Inter Partes Review, Nov. 2, 2023, 20 pgs.

*Crowdstrike, Inc.* v. *Open Text Inc.*, PTAB Case No. IPR2023-01051, Patent Owner Open Text Inc.'s Mandatory Notices Pursuant to 37 CFR § 42.8(b), Jul. 14, 2023, 6 pgs.

*Crowdstrike, Inc.* v. *Open Text Inc.*, PTAB Case No. IPR2023-01051, Notice of Filing Date Accorded to Petition and Time for Filing Patent Owner Preliminary Response, Aug. 23, 2023, 6 pgs.

*Crowdstrike, Inc.* v. *Webroot Inc.*, PTAB Case No. IPR2023-01158, Notice of Filing Date Accorded to Petition and Time for Filing Patent Owner Preliminary Response, Aug. 23, 2023, 6 pgs.

*Crowdstrike, Inc.* v. *Webroot Inc.*, PTAB Case No. IPR2023-01159, Patent Owner Open Text Inc.'s Mandatory Notices Pursuant to 37 CFR § 42.8(b), Jul. 21, 2023, 9 pgs.

*Crowdstrike, Inc.* v. *Webroot Inc.*, PTAB Case No. IPR2023-01159, Notice of Filing Date Accorded to Petition and Time for Filing Patent Owner Preliminary Response, Aug. 23, 2023, 6 pgs.

*Forcepoint LLC* v. *Open Text, Inc.*, PTAB Case No. IPR2023-00786, Patent Owner's Preliminary Response to Petition for Inter Partes Review U.S. Pat. No. 10,025,928; Aug. 17, 2023, 59 pgs.

*Forcepoint LLC* v. *Open Text, Inc.*, PTAB Case No. IPR2023-00786, Exhibit 2001: Declaration of Professor Alessandro Orso, Ph.D., 46 pgs.

*Forcepoint LLC* v. *Open Text, Inc.*, PTAB Case No. IPR2023-00786, Exhibit 2002: Curriculum Vitae of Alessandro Orso, Ph.D., 52 pgs.

*Forcepoint LLC* v. *Open Text, Inc.*, PTAB Case No. IPR2023-00786, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Forcepoint LLC* v. *Open Text, Inc.*, PTAB Case No. IPR2023-00786, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Forcepoint LLC* v. *Open Text, Inc.*, PTAB Case No. IPR2023-00786, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Forcepoint LLC* v. *Open Text, Inc.*, PTAB Case No. IPR2023-00786, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.

(56) References Cited

OTHER PUBLICATIONS

*Forcepoint LLC* v. *Open Text, Inc.*, PTAB Case No. IPR2023-00786, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.
*Forcepoint LLC* v. *Open Text, Inc.*, PTAB Case No. IPR2023-00786, Exhibit 2008: U.S. District Courts—Federal Court Management Statistics—Profiles—During the 12-Month Periods Ending Mar. 31, 2018 Through 2023, "Table N/A—U.S. District Courts-Combined Civil and Criminal Federal Court Management Statistics (Mar. 31, 2023)", available at https://www.uscourts.gov/sites/default/files/data_tables/fcms_na_distprofile0331.2023.pdf, 95 pgs.
*Forcepoint LLC* v. *Open Text, Inc.*, PTAB Case No. IPR2023-00786, Exhibit 2009: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Forcepoint LLC* v. *Open Text, Inc.*, PTAB Case No. IPR2023-00786, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Forcepoint LLC* v. *Open Text, Inc.*, PTAB Case No. IPR2023-00786, Exhibit 2011: *Webroot, Inc et al.* v. *AO Kaspersky Lab et al.*, No. 6-22-cv-00243, Dkt. 121, Second Amended Complaint For Patent Infringement (Forcepoint LLC, Case No. 22-cv-00342-ADA-DTG) (W.D. Tex. Dec. 9, 2022), 338 pgs.
*Forcepoint LLC* v. *Open Text, Inc.*, PTAB Case No. IPR2023-00786, Exhibit 2012: *Webroot, Inc. and Open Text Inc.*, v. *Forcepoint LLC*, Case No. 6:22-cv-342-ADA-DTG, Defendant Forcepoint LLC's Preliminary Invalidity Contentions (W.D. Tex. Sep. 13, 2022) (excerpted), 9 pgs.
*Forcepoint LLC* v. *Open Text, Inc.*, Case No. IPR2023-00784, Patent Owner's Preliminary Response to Petition for Inter Partes Review for U.S. Pat. No. 8,438,386; Aug. 17, 2023, 62 pgs.
*Forcepoint LLC* v. *Open Text, Inc.*, Case No. IPR2023-00784, Exhibit 2001: Declaration of Professor Alessandro Orso, Ph. D., 49 pgs.
*Forcepoint LLC* v. *Open Text, Inc.*, Case No. IPR2023-00784, Exhibit 2002: Curriculum Vitae of Professor Alessandro Orso, Ph. D., 52 pgs.
*Forcepoint LLC* v. *Open Text, Inc.*, Case No. IPR2023-00784, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Forcepoint LLC* v. *Open Text, Inc.*, Case No. IPR2023-00784, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Forcepoint LLC* v. *Open Text, Inc.*, Case No. IPR2023-00784, Exhibit 2005: Intellectual *Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Forcepoint LLC* v. *Open Text, Inc.*, Case No. IPR2023-00784, Exhibit 2006: *Webroot, Inc. and Open Text Inc.*, v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Forcepoint LLC* v. *Open Text, Inc.*, Case No. IPR2023-00784, Exhibit 2007: Dani Kass, "Catching Up On Patent Litigation With Judge Albright" (Law360 Mar. 14, 2023); https://www.law360.com/pulse/articles/1582438/print?section=pul se/courts, 3 pgs.
*Forcepoint LLC* v. *Open Text, Inc.*, Case No. IPR2023-00784, Exhibit 2008: U.S. District Courts—Federal Court Management Statistics—Profiles—During the 12-Month Periods Ending Mar. 31, 2018 Through 2023, "Table N/A—U.S. District Courts-Combined Civil and Criminal Federal Court Management Statistics (Mar. 31, 2023)", available at https://www.uscourts.gov/sites/default/files/data_tables/fcms_na_distprofile0331.2023.pdf, 95 pgs.
*Forcepoint LLC* v. *Open Text, Inc.*, Case No. IPR2023-00784, Exhibit 2009: *Webroot, Inc. and Open Text Inc.*, v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Forcepoint LLC* v. *Open Text, Inc.*, Case No. IPR2023-00784, Exhibit 2010: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Forcepoint LLC* v. *Open Text, Inc.*, Case No. IPR2023-00784, Exhibit 2011: *Webroot, Inc. and Open Text Inc.*, v. *Forcepoint LLC*, Case No. 6:22-cv-342-ADA-DTG, Defendant Forcepoint LLC's Preliminary Invalidity Contentions (W.D. Tex. Sep. 13, 2022) (excerpted), 9 pgs.
*Forcepoint LLC* v. *Open Text, Inc.*, Case No. IPR2023-00784, Exhibit 2012: *Webroot, Inc et al.* v. *AO Kaspersky Lab et al.*, No. 6-22-cv-00243, Dkt. 121, Second Amended Complaint For Patent Infringement (Forcepoint LLC, Case No. 22-cv-00342-ADA-DTG) (W.D. Tex. Dec. 9, 2022), 338 pgs.
*Sophos Ltd. and Sophos Inc.* v. *Webroot Inc.*, PTAB Case No. IPR2023-00528, Decision denying institution of Inter Parties Review, Aug. 14, 2023, 23 pgs.
*Sophos Ltd. and Sophos Inc.* v. *Webroot Inc.*, PTAB Case No. IPR2023-00528, Board Exhibit 3001: Email Request for Leave to File Reply to Patent Owner's Preliminary Response, 2 pgs., Jul. 13, 2023.
*Sophos Ltd. and Sophos Inc.* v. *Webroot Inc.*, PTAB Case No. IPR2023-00528, Petitioner's Revised Mandatory Notices, 4 pgs., Aug. 30, 2023.
*Sophos Ltd. and Sophos Inc.* v. *Webroot Inc.*, PTAB Case No. IPR2023-00662, Patent Owner's Preliminary Response, Jul. 17, 2023, 72 pgs.
*Trend Micro, Inc.* v. *Webroot Inc.*, PTAB Case No. IPR2023-00662, Exhibit 2001: Declaration Of Sam Malek, Ph.D., 45 pgs.
*Trend Micro, Inc.* v. *Webroot Inc.*, PTAB Case No. IPR2023-00662, Exhibit 2002: Curriculum Vitae of Sam Malek, Ph.D., 36 pgs.
*Trend Micro, Inc.* v. *Webroot Inc.*, PTAB Case No. IPR2023-00662, Exhibit 2003: *Webroot, Inc., Open Text Inc.*, v. *AO Kaspersky Lab et al.*, Case No. 6:22-cv-00243- ADA-DTG, Order Granting Third Amended Scheduling Order, Dkt. 142 (W.D. Tex., Dec. 27, 2022, 9 pgs.
*Trend Micro, Inc.* v. *Webroot Inc.*, PTAB Case No. IPR2023-00662, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022, 7 pgs.
*Trend Micro, Inc.* v. *Webroot Inc.*, PTAB Case No. IPR2023-00662, Exhibit 2005: *mCom IP, LLC*, v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022, 7 pgs.
*Trend Micro, Inc.* v. *Webroot Inc.*, PTAB Case No. IPR2023-00662, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00662, Exhibit 2007: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00662, Exhibit 2008: Dani Kass, "Catching Up On Patent Litigation With Judge Albright" (Law360 Mar. 14, 2023); https://www.law360.com/pulse/articles/1582438/print?section=pulse/courts, 3 pgs.
*Trend Micro, Inc.* v. *Webroot Inc.*, PTAB Case No. IPR2023-00662, Exhibit 2009: *Webroot, Inc., Open Text Inc.*, v. *AO Kaspersky Lab*

(56) References Cited

OTHER PUBLICATIONS et al., Case No. 6:22-cv-00243-ADA-DTG, Order Granting Third Amended Scheduling Order, Dkt. 142 (W.D. Tex., Dec. 27, 2022, 9 pgs.
Trend Micro, Inc. v. Webroot Inc., PTAB Case No. IPR2023-00662, Exhibit 2010: United States Courts, Statistics & Reports, Federal Court Management Statistics—Comparison Within Circuit-During the 12-Month Period Ending Jun. 30, 2022, "Comparison of Districts Within the First Circuit—12-Month Period Ending Jun. 30, 2022," available at https://www.uscourts.gov/sites/default/files/fcms_na_distcomparison0630.2022_0.pdf, 11 pgs.
Trend Micro, Inc. v. Webroot Inc., PTAB Case No. IPR2023-00662, Exhibit 2011: Webroot, Inc. and Open Text Inc., v. Sophos Ltd., Case No. 6:22-cv-00240-ADA, Complaint for Patent Infringement, Dkt. 1 (W.D. Tex., Mar. 4, 2022), 144 pgs.
Trend Micro, Inc. v. Webroot Inc., PTAB Case No. IPR2023-00662, Exhibit 2012: Webroot, Inc. and Open Text Inc., v. ForcePoint LLC, Case No. 6:22-cv-00342-ADA-DTG, Defendant ForcePoint LLC's Preliminary Invalidity Contentions (W.D. Tex., Sep. 13, 2022), 149 pgs.
Trend Micro, Inc. v. Webroot Inc., PTAB Case No. IPR2023-00662, Exhibit 2013: Webroot, Inc. and Open Text Inc., v. Sophos Ltd., Case No. 6:22-cv-00240-ADA-DTG, Defendant Sophos Ltd.'s Preliminary Invalidity Contentions (W.D. Tex., Sep. 13, 2022), 127 pgs.
Trend Micro, Inc. v. Webroot Inc., PTAB Case No. IPR2023-00662, Exhibit 2014: Webroot, Inc. and Open Text Inc., v. Trend Micro Inc., Case No. 6:22-cv-00239-ADA-DTG, Defendant's Preliminary Invalidity Contentions (W.D. Tex., Sep. 13, 2022), 125 pgs.
Trend Micro, Inc. v. Webroot Inc., PTAB Case No. IPR2023-00662, Exhibit 2015: Webroot, Inc. and Open Text Inc., v. Ao Kaspersky Lab, Case No. 6:22-cv-00243-ADA-DTG, Defendant's Preliminary Invalidity Contentions Appendix A (W.D. Tex., Sep. 14, 2022), 8 pgs.
Trend Micro, Inc. v. Webroot Inc., PTAB Case No. IPR2023-00662, Exhibit 2016: Webroot, Inc. and Open Text Inc., v. CrowdStrike, Inc. and CrowdStrike Holdings, Inc., Case No. 6:22-cv-00241-ADA-DTG, Defendant's Preliminary Invalidity Contentions (W.D. Tex., Sep. 13, 2022), 62 pgs.
Trend Micro, Inc. v. Webroot Inc., PTAB Case No. IPR2023-00662, Exhibit 2017: Dec. 9, 2022 excerpt from discovery hearing transcript, 2 pgs.
Trend Micro, Inc. v. Webroot Inc., PTAB Case No. IPR2023-00662, Exhibit 1020: Sotera Stipulation, Sep. 28, 2023, 3 pgs.
Trend Micro, Inc. v. Webroot Inc., PTAB Case No. IPR2023-00662, Order Conduct of the Proceeding, Sep. 28, 2023, 6 pgs.
Trend Micro, Inc. v. Webroot Inc., PTAB Case No. IPR2023-00662, Exhibit 3001: Email re: Sotera stipulation, Sep. 28, 2023, 2 pgs.
Trend Micro, Inc. v. Webroot Inc., PTAB Case No. IPR2023-00662, Decision denying institution of Inter Parties Review, Oct. 13, 2023, 20 pgs.
Sophos Ltd. and Sophos Inc. v. Webroot Inc., PTAB Case No. PGR2023-00031, Patent Owner's Preliminary Response, Sep. 6, 2023, 75 pgs.
Sophos Ltd. and Sophos Inc. v. Webroot Inc., PTAB Case No. PGR2023-00031, Exhibit 2001: Declaration Of Sam Malek, Ph.D., 52 pgs.
Sophos Ltd. and Sophos Inc. v. Webroot Inc., PTAB Case No. PGR2023-00031, Exhibit 2002: Curriculum Vitae of Sam Malek, Ph.D., 36 pgs.
Sophos Ltd. and Sophos Inc. v. Webroot Inc., PTAB Case No. PGR2023-00031, Exhibit 2003: Webroot, Inc., Open Text Inc., v. AO Kaspersky Lab et al., Case No. 6:22-cv-00243-ADA-DTG, Claim Construction Order, Dkt. 391 (W.D. Tex Jul. 25, 2023), 19 pgs.
Sophos Ltd. and Sophos Inc. v. Webroot Inc., PTAB Case No. PGR2023-00031, Exhibit 2004: Sonrai Memory Ltd. v. Kingston Tech. Co. and Kingston Tech. Corp., Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

Sophos Ltd. and Sophos Inc. v. Webroot Inc., PTAB Case No. PGR2023-00031, Exhibit 2005: mCom IP, LLC v. Cisco Systems, Inc., Case No. 6:22-cv-0026-ADA, Order Denying Defendant's Motion to Stay Pending Inter Partes Review, Dkt. 42 (W.D. Tex., Oct. 20, 2022), 7 pgs.
Sophos Ltd. and Sophos Inc. v. Webroot Inc., PTAB Case No. PGR2023-00031, Exhibit 2006: Intellectual Ventures I LLC et al. v. Hewlett Packard Enterprise Co., No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
Sophos Ltd. and Sophos Inc. v. Webroot Inc., PTAB Case No. PGR2023-00031, Exhibit 2007: Webroot, Inc. and Open Text Inc., v. AO Kaspersky Lab et al., Case No. 6:22-cv-243-ADA-DTG, Dec. 9, 2022 Transcript of Motions Hearing, Dkt. 133 (W.D. Tex. Dec. 15, 2022) (excerpted), 7 pgs.
Sophos Ltd. and Sophos Inc. v. Webroot Inc., PTAB Case No. PGR2023-00031, Exhibit 2008: Dani Kass, "Catching Up On Patent Litigation With Judge Albright" (Law360 Mar. 14, 2023); https://www.law360.com/pulse/articles/1582438/print?section=pulse/courts, 3 pgs.
Sophos Ltd. and Sophos Inc. v. Webroot Inc., PTAB Case No. PGR2023-00031, Exhibit 2009: U.S. District Courts—Federal Court Management Statistics—Profiles—During the 12-Month Periods Ending Mar. 31, 2018 Through 2023, "Table N/A—U.S. District Courts-Combined Civil and Criminal Federal Court Management Statistics (Mar. 31, 2023)", available at https://www.uscourts.gov/sites/default/files/data_tables/fcms_na_distprofile0331.2023.pdf, 95 pgs.
Sophos Ltd. and Sophos Inc. v. Webroot Inc., PTAB Case No. PGR2023-00031, Exhibit 2010: Webroot, Inc., Open Text Inc., v. AO Kaspersky Lab et al., Case No. 6:22-cv-00243-ADA-DTG, Order Granting Fifth Amended Scheduling Order, Dkt. 252 (W.D. Tex., Mar. 29, 2023), 9 pgs.
Sophos Ltd. and Sophos Inc. v. Webroot Inc., PTAB Case No. PGR2023-00031, Exhibit 2011: Webroot, Inc. and Open Text Inc., v. Sophos Ltd., Case No. 6:22-cv-00240-ADA, Second Amended Complaint for Patent Infringement, Dkt. 76 (W.D. Tex., Oct. 24, 2022), 184 pgs.
Sophos Ltd. and Sophos Inc. v. Webroot Inc., PTAB Case No. PGR2023-00031, Exhibit 2012: Webroot, Inc. and Open Text Inc., v. Sophos Ltd., Case No. 6:22-cv-00240-ADA-DTG, Defendant Sophos Ltd.'s Preliminary Invalidity Contentions For Patents Plaintiffs Added by Amendment (W.D. Tex., Feb. 21, 2023) (excerpted), 7 pgs.
Sophos Ltd. and Sophos Inc. v. Webroot Inc., PTAB Case No. PGR2023-00031, Exhibit 2013: Webroot, Inc. and Open Text Inc., v. CrowdStrike, Inc. and CrowdStrike Holdings, Inc., Case No. 6:22-cv-00241-ADA-DTG, Crowdstrike's Preliminary Invalidity Contentions (Patents Asserted by Amendment) (W.D. Tex., Feb. 21, 2023) (excerpted), 8 pgs.
Sophos Ltd. and Sophos Inc. v. Webroot Inc., PTAB Case No. PGR2023-00031, Exhibit 2014: Webroot, Inc. and Open Text Inc., v. Trend Micro Inc., Case No. 6:22-cv-00239-ADA-DTG, Defendant's Preliminary Invalidity Contentions (W.D. Tex., Feb. 21, 2023) (excerpted), 9 pgs.
Sophos Ltd. and Sophos Inc. v. Webroot Inc., PTAB Case No. PGR2023-00031, Exhibit 2015: Webroot, Inc. and Open Text Inc., v. AO Kaspersky Lab, Case No. 6:22-cv-00243-ADA-DTG, Defendant's AO Kaspersky Lab's Pre-liminary Invalidity Contentions (W.D. Tex., Feb. 21, 2023) (excerpted), 4 pgs.
Sophos Ltd. and Sophos Inc. v. Webroot Inc., PTAB Case No. PGR2023-00031, Exhibit 2016: Webroot, Inc. and Open Text Inc., v. AO Kaspersky Lab, Case No. 6:22-cv-00243-ADA-DTG, Opening Claim Construction Brief From: [Defendants], Dkt. 86 (W.D. Tex., Oct. 28, 2022), 84 pgs.
Sophos Ltd. and Sophos Inc. v. Webroot Inc., PTAB Case No. PGR2023-00031, Exhibit 2017: Microsoft Computer Dictionary, (Fifth Ed. Microsoft 2012), p. 36, 4 p. .
Sophos Ltd. and Sophos Inc. v. Webroot Inc., PTAB Case No. PGR2023-00031, Exhibit 2018: Decimal-Binary-Octal-Hex—ASCII Conversion Chart, available at https://www.eecis.udel.edu/~amer/CISC651/ASCII-Conversion-Chart.pdf., 1 pg.

(56) References Cited

OTHER PUBLICATIONS

*Sophos Ltd. and Sophos Inc.* v. *Webroot Inc.*, PTAB Case No. PGR2023-00031, Exhibit 2019: Microsoft, String to numberic value functions, available at https://learn.microsoft.com/en-us/cpp/c-runtime-library/string-to-numeric-value-functions?view=msvc-140, 3 pgs.
*AO Kaspersky Lab* v. *Webroot Inc.*, PTAB Case No. IPR2023-01160, Patent Owner Open Text Inc.'s Mandatory Notices Pursuant to 37 CFR § 42.8(b), Jul. 21, 2023, 10 pgs.
*AO Kaspersky Lab* v. *Webroot Inc.*, PTAB Case No. IPR2023-01160, Notice of Filing Date Accorded to Petition and Time for Filing Patent Owner Preliminary Response, Aug. 23, 2023, 6 pgs.
*AO Kaspersky Lab* v. *Webroot Inc.*, PTAB Case No. IPR2023-01160, Corrected Exhibit 1001: U.S. Pat. No. 11,409,869, Aug. 9, 2022, 16 pgs.
*AO Kaspersky Lab* v. *Webroot Inc.*, PTAB Case No. IPR2023-01160, Corrected Exhibit 1002: Declaration of V.S. Subrahmanian, Ph.D. under 37 C.F.R. §1.68, 145 pgs.
*AO Kaspersky Lab* v. *Webroot Inc.*, PTAB Case No. IPR2023-01160, Corrected Exhibit 1003: Curriculum Vitae of V.S. Subrahmanian, Ph.D., 77 pgs.
*AO Kaspersky Lab* v. *Webroot Inc.*, PTAB Case No. IPR2023-01160, Corrected Exhibit 1004: File History of U.S. Pat. No. 11,409,869, 345 pgs.
*AO Kaspersky Lab* v. *Webroot Inc.*, PTAB Case No. IPR2023-01160, Corrected Exhibit 1005: U.S. Patent Publication No. 20150213376, Ideses, published Jul. 30, 2015, 19 pgs.
*AO Kaspersky Lab* v. *Webroot Inc.*, PTAB Case No. IPR2023-01160, Corrected Exhibit 1006: U.S. Patent Publication No. 20160154960, Sharma, published Jun. 2, 2016, 29 pgs.
*AO Kaspersky Lab* v. *Webroot Inc.*, PTAB Case No. IPR2023-01160, Corrected Exhibit 1007: Charles Ledoux & Arun Lakhotia, Malware and Machine Learning, in Intelligent Methods Cyber Warfare 1 (2014), 42 pgs.
*AO Kaspersky Lab* v. *Webroot Inc.*, PTAB Case No. IPR2023-01160, Corrected Exhibit 1008: U.S. Patent Publication No. 20150213365, Ideses et al., 18 pgs.
*AO Kaspersky Lab* v. *Webroot Inc.*, PTAB Case No. IPR2023-01160, Corrected Exhibit 1009: Claim Construction Order, Mar. 16, 2023, Case No. 6:22-CV-00243-ADA-DTG, 20 pgs.
*AO Kaspersky Lab* v. *Webroot Inc.*, PTAB Case No. IPR2023-01160, Corrected Exhibit 1010: Joint Stipulation Reserving Appellate Rights, Apr. 12, 2023, Case No. 6:22-CV-00243-ADA-DTG, 9 pgs.
*AO Kaspersky Lab* v. *Webroot Inc.,*, PTAB Case No. IPR2023-01160, Corrected Exhibit 1011: Kris Kendall, Practical Malware Analysis, in Black Hat Conf., USA (Aug. 2007), 10 pgs.
*AO Kaspersky Lab* v. *Webroot Inc.*, PTAB Case No. IPR2023-01160, Corrected Exhibit 1012: Hao Helen Zhang et al., Compactly Supported Radial Basis Function Kernels, Inst. Stat. Mimeo Series No. 2570, N. Carolina St. U. Dep't. Stat. 2 (2004), 19 pgs.
*AO Kaspersky Lab* v. *Webroot Inc.,*, PTAB Case No. IPR2023-01160, Corrected Exhibit 1013: Zane Markel & Michael Bilzor, Building a Machine Learning Classifier for Malware Detection, 2014 Second Workshop Anti-Malware Testing Res. (WATeR) (2014), 4 pgs.
*AO Kaspersky Lab* v. *Webroot Inc.*, PTAB Case No. IPR2023-01160, Corrected Exhibit 1014: Naser Peiravian & Xingquan Zhu, Machine Learning for Android Malware Detection Using Permission and API Calls, IEEE 25th Int'l Conf. Tools Artificial Intelligence 300 (2013), 6 pgs.
*AO Kaspersky Lab* v. *Webroot Inc.*, PTAB Case No. IPR2023-01160, Corrected Exhibit 1015: Ekta Gandotra et al., Malware Analysis and Classification: A Survey, J. Inf. Security 5, 56-64 (2014), 9 pgs.
*AO Kaspersky Lab* v. *Webroot Inc.*, PTAB Case No. IPR2023-01160, Corrected Exhibit 1016: Rafiqul Islam et al., Classification of Malware Based on Integrated Static and Dynamic Features, 36 J. Network Computer Applications, 646 (2012), 11 pgs.

*AO Kaspersky Lab* v. *Webroot Inc.*, PTAB Case No. IPR2023-01160, Corrected Exhibit 1017: D. Michael Cai et al., Comparison of Feature Selection And Classification Algorithms In Identifying Malicious Executables, 51(6) Computational Stat. Data Analysis 3156 (2007), 17 pgs.
*AO Kaspersky Lab* v. *Webroot Inc.*, PTAB Case No. IPR2023-01160, Corrected Exhibit 1018: Guanhua Yan et al., Exploring Discriminatory Features for Automated Malware Classification, 10 Detection Intrusions Malware, Vulnerability Assessment: 10th Int'l Conf., 41 (2013), 21 pgs.
*AO Kaspersky Lab* v. *Webroot Inc.*, PTAB Case No. IPR2023-01160, Corrected Exhibit 1019: Rafiqul Islam et al., Classification of Malware Based on String and Function Feature Selection, 2010 Second Cybercrime Trustworthy Computing Workshop 9 (2010), 9 pgs.
*AO Kaspersky Lab* v. *Webroot Inc.*, PTAB Case No. IPR2023-01160, Corrected Exhibit 1020: Eitan Menahem et al., Improving Malware Detection by Applying Multi-Inducer Ensemble, Computational Stat. Data Analysis, 53(4), 1483 (2008), 12 pgs.
*AO Kaspersky Lab* v. *Webroot Inc.*, PTAB Case No. IPR2023-01160, Corrected Exhibit 1021: Ianir Ideses & Assaf Neuberger, Adware Detection and Privacy Control in Mobile Devices, in 2014 IEEE 28th Convention Electrical Electronics Engineers Israel 1 (2014), 5 pgs.
*AO Kaspersky Lab* v. *Webroot Inc.*, PTAB Case No. IPR2023-01160, Corrected Exhibit 1022: Raja Khurram Shahzad et al., Accurate Adware Detection Using Opcode Sequence Extraction, Sixth Int'l Conf. Availability, Reliability Security 189 (2011), 7 pgs.
*AO Kaspersky Lab* v. *Webroot Inc.*, PTAB Case No. IPR2023-01160, Corrected Exhibit 1023: Raymond Canzanese et al., Toward an Automatic, Online Behavioral Malware Classification System, IEEE 7th Int'l Conf. Self-Adaptive Self-Organizing Sys., 111 (2013), 10 pgs.
*AO Kaspersky Lab* v. *Webroot Inc.*, PTAB Case No. IPR2023-01160, Corrected Exhibit 1024: Yanfang Ye et al., Automatic Malware Categorization Using Cluster Ensemble, in Proc. 16th Acm Sigkdd Int'l Conf. Knowledge Discovery Data Mining 95 (2010), 10 pgs.
*AO Kaspersky Lab* v. *Webroot Inc.*, PTAB Case No. IPR2023-01160, Corrected Exhibit 1025: Asaf Shabtai et al., Detection of Malicious Code by Applying Machine Learning Classifiers on Static Features: A State-Of-The-Art Survey, Info. Security Tech. Rep. 14(1), 16 (2009), 14 pgs.
*AO Kaspersky Lab* v. *Webroot Inc.*, PTAB Case No. IPR2023-01160, Corrected Exhibit 1026: A.M. Aswini & P. Vinod, Droid Permission Miner: Mining Prominent Permissions for Android Malware Analysis, Fifth Int'l Conf. Applications Digital Inf. Web Tech. 81 (2014), 6 pgs.
*AO Kaspersky Lab* v. *Webroot Inc.*, PTAB Case No. IPR2023-01160, Corrected Exhibit 1027: Konrad Rieck et al., Learning and Classification of Malware Behavior, Detection Intrusions Malware, Vulnerability Assessment: 5th Int'l Conf., 108 (2008), 18 pgs.
*AO Kaspersky Lab* v. *Webroot Inc.*, PTAB Case No. IPR2023-01160, Corrected Exhibit 1028: Veelasha Moonsamy et al., Feature Reduction, Speed Up Malware Classification, Inf. Security Tech. Applications: 16th Nordic Conf. Secure It Sys., Tallinn, Est., Oct. 26-28, 2011, Rev. Selected Papers 16, 176 (2012), 13 pgs.
*AO Kaspersky Lab* v. *Webroot Inc.*, PTAB Case No. IPR2023-01160, Corrected Exhibit 1029: John P. Dickerson et al., Using Sentiment, Detect Bots on Twitter: Are Humans More Opinionated Than Bots?, IEEE/ACM Int'l Conf. Advances Social Networks Analysis Mining 620 (2014), 8 pgs.
*AO Kaspersky Lab* v. *Webroot Inc.*, PTAB Case No. IPR2023-01160, Corrected Exhibit 1030: Wei Yu et al., Towards Neural Network Based Malware Detection on Android Mobile Devices, Cybersecurity Sys. Human Cognition Augmentation 99 (2014), 19 pgs.
*AO Kaspersky Lab* v. *Webroot Inc.*, PTAB Case No. IPR2023-01160, Corrected Exhibit 1031: Guanhua Yan et al., 2013. Exploring Discriminatory Features for Automated Malware Classification, Detection Intrusions Malware, Vulnerability Assessment: 10th Int'l Conf., Dimva 2013, Berlin, Ger., Jul. 18-19, 2013 Proc. 10, 41 (2013), 21 pgs.

(56) References Cited

OTHER PUBLICATIONS

*AO Kaspersky Lab* v. *Webroot Inc.*, PTAB Case No. IPR2023-01160, Corrected Exhibit 1032: Julia Yu-Cheng et al., An Information Retrieval Approach for Malware Classification Based on Windows API Calls, Int'l Conf. Machine Learning Cybernetics 1678 (2013), 6 pgs.
*AO Kaspersky Lab* v. *Webroot Inc.*, PTAB Case No. IPR2023-01160, Corrected Exhibit 1033: Zi Chu et al., Detecting Automation of Twitter Accounts: Are You a Human, Bot, or Cyborg?, 9 IEEE Transactions Dependable Secure Computing 6, 811 (Nov./Dec. 2012), 14 pgs.
*AO Kaspersky Lab* v. *Webroot Inc.*, PTAB Case No. IPR2023-01160, Corrected Exhibit 1034: Axelle Apvrille, Android Reverse Engineering Tools From an Anti-Virus Analyst's Perspective, Fortinet, slides 11-15 (Mar. 2012), http://wikisec.free.fr/papers/insomnidroid.pdf, 69 pgs.
*AO Kaspersky Lab* v. *Webroot Inc.*, PTAB Case No. IPR2023-01160, Corrected Exhibit 1035: Li Sun et al., Pattern Recognition Techniques for the Classification of Malware Packers, 15 Proc. Inf. Security Priv.: 15th Australasian Conf., Acisp 2010, Sydney, Austl., Jul. 5-7, 2010, 370, 21 pgs.
*AO Kaspersky Lab* v. *Webroot Inc.*, PTAB Case No. IPR2023-01160, Corrected Exhibit 1036: Munkhbayar Bat-Erdene et al., Dynamic Classification of Packing Algorithms for Inspecting Executables Using Entropy Analysis, 8th Int'l Conf. Malicious Unwanted Software: "Americas" (MALWARE) 19, 2013, 8 pgs.
*AO Kaspersky Lab* v. *Webroot Inc.*, PTAB Case No. IPR2023-01160, Corrected Exhibit 1037: M. Zubair et al., PE-Probe: Leveraging Packer Detection and Structural Information, Detect Malicious Portable Executables, 8 Proc. Virus Bull. Conf. (2009), 10 pgs.
*AO Kaspersky Lab* v. *Webroot Inc.*, PTAB Case No. IPR2023-01160, Notice of Accepting Corrected Petition, Sep. 13, 2023, 2 pgs.
*AO Kaspersky Lab* v. *Webroot Inc.*, PTAB Case No. IPR2023-01053, Patent Owner Open Text Inc.'s Mandatory Notices Pursuant to 37 CFR § 42.8(b), Jul. 24, 2023, 9 pgs.
*AO Kaspersky Lab* v. *Webroot Inc.*, PTAB Case No. IPR2023-01053, Notice of Filing Date Accorded to Petition and Time for Filing Patent Owner Preliminary Response, Aug. 23, 2023, 6 pgs.
*Crowdstrike, Inc.* v. *Webroot Inc.*, PTAB Case No. IPR2023-00289, Decision Granting Institution of Inter Partes Review, Jul. 21, 2023, 44 pgs.
*Crowdstrike, Inc.* v. *Webroot Inc.*, PTAB Case No. IPR2023-00289, Scheduling Order, Jul. 21, 2023, 12 pgs.
*Crowdstrike, Inc.* v. *Webroot Inc.*, PTAB Case No. IPR2023-00289, Patent Owner's Request for Rehearing, Aug. 4, 2023, 20 pgs.
*Crowdstrike, Inc.* v. *Webroot Inc.*, PTAB Case No. IPR2023-00289, Patent Owner's Objections to Evidence Submitted by Petitioner, Aug. 4, 2023, 4 pgs.
*Crowdstrike, Inc.* v. *Webroot Inc.*, PTAB Case No. IPR2023-00289, Decision denying Patent Owner's Request for Rehearing of Decision Granting Institution of Inter Partes Review, Sep. 7, 2023, 11 pgs.
*Crowdstrike, Inc.* v. *Webroot Inc.*, PTAB Case No. IPR2023-00289, Joint Stipulation to Modify Due Dates, Oct. 7, 2023, 4 pgs.
*Trend Micro, Inc.* v. *Webroot Inc.*, PTAB Case No. IPR2023-00655, Patent Owner's Preliminary Response, Jul. 17, 2023, 76 pgs.
*Trend Micro, Inc.* v. *Webroot Inc.*, PTAB Case No. IPR2023-00655, Exhibit 2001: Declaration of Professor Nenad Medvidovic, Ph.D, 70 pgs.
*Trend Micro, Inc.* v. *Webroot Inc.*, PTAB Case No. IPR2023-00655, Exhibit 2002: Curriculum Vitae of Professor Nenad Medvidovic, Ph.D., 71 pgs.
*Trend Micro, Inc.* v. *Webroot Inc.*, PTAB Case No. IPR2023-00655, Exhibit 2003: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Trend Micro, Inc.* v. *Webroot Inc.*, PTAB Case No. IPR2023-00655, Exhibit 2004: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Trend Micro, Inc.* v. *Webroot Inc.*, PTAB Case No. IPR2023-00655, Exhibit 2005: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Trend Micro, Inc.* v. *Webroot Inc.*, PTAB Case No. IPR2023-00655, Corrected Exhibit 2006: Dani Kass, "Catching Up On Patent Litigation With Judge Albright" (Law360 Mar. 14, 2023); https://www.law360.com/pulse/articles/1582438/print?section=pulse/courts, 4 pgs.
*Trend Micro, Inc.* v. *Webroot Inc.*, PTAB Case No. IPR2023-00655, Corrected Exhibit 2006: Dani Kass, "Catching Up On Patent Litigation With Judge Albright" (Law360 Mar. 14, 2023); https://www.law360.com/pulse/articles/1582438/print?section=pulse/courts, 3 pgs.
*Trend Micro, Inc.* v. *Webroot Inc.*, PTAB Case No. IPR2023-00655, Exhibit 2007: U.S. District Courts—Federal Court Management Statistics—Profiles—During the 12-Month Periods Ending Mar. 31, 2018 Through 2023, "Table N/A—U.S. District Courts-Combined Civil and Criminal Federal Court Management Statistics (Mar. 31, 2023)", available at https://www.uscourts.gov/sites/default/files/data_tables/fcms_na_distpro file0331.2023.pdf, 95 pgs.
*Trend Micro, Inc.* v. *Webroot Inc.*, PTAB Case No. IPR2023-00655, Exhibit 2008: *Webroot, Inc., Open Text Inc.,* v. *AO Kaspersky Lab et al.*,Case No. 6:22-cv-00243-ADA-DTG, Order Granting Third Amended Scheduling(W.D. Tex., Dec. 27, 2022), 9 pgs.
*Trend Micro, Inc.* v. *Webroot Inc.*, PTAB Case No. IPR2023-00655, Exhibit 2009: *Webroot, Inc. and Open Text Inc.,* v. *AO Kaspersky Lab et al.*, Case No. 6:22-cv-243-ADA-DTG, Claim Construction Order, Dkt. 236 (W.D. Tex. Mar. 16, 2023), 20 pgs.
*Trend Micro, Inc.* v. *Webroot Inc.*, PTAB Case No. IPR2023-00655, Exhibit 2010: *Webroot, Inc. and Open Text Inc.,* v. *Trend Micro, Inc..*, Case No. 6:22-cv-239-ADA-DTG, First Amended Complaint For Patent Infringement, Dkt. 42 (W.D. Tex. Jun. 23, 2023), 235 pgs.
*Trend Micro, Inc.* v. *Webroot Inc.*, PTAB Case No. IPR2023-00655, Exhibit 2011: *Webroot, Inc. and Open Text Inc.,* v. *AO Kaspersky Lab et al.*, Case No. 6:22-cv-243-ADA-DTG, Scheduling Order, Dkt. 53 (W.D. Tex. Sept. 7, 2022), 7 pgs.
*Trend Micro, Inc.* v. *Webroot Inc.*, PTAB Case No. IPR2023-00655, Exhibit 2012: *Webroot, Inc. and Open Text Inc.,* v. *Trend Micro, Inc.,* Case No. 6:22-cv-00239-ADA-DTG, Defendant's Preliminary Invalidity Contentions (W.D. Tex., Sep. 13, 2022) (excerpted), 9 pgs.
*Trend Micro, Inc.* v. *Webroot Inc.*, PTAB Case No. IPR2023-00655, Exhibit 2013: *Webroot, Inc. and Open Text Inc.,* v. *CrowdStrike, Inc. and CrowdStrike Holdings, Inc.,* Case No. 6:22-cv-00241-ADA-DTG, Defendant's Preliminary Invalidity Contentions (W.D. Tex., Sep. 13, 2022) (excerpted), 10 pgs.
*Trend Micro, Inc.* v. *Webroot Inc.*, PTAB Case No. IPR2023-00655, Exhibit 2014: *Webroot, Inc. and Open Text Inc.,* v. *AO Kaspersky Lab*, Case No. 6:22-cv-00243-ADA-DTG, Defendant's Preliminary Invalidity Contentions Appendix A (W.D. Tex., Sep. 14, 2022) (excerpted), 8 pgs.
*Trend Micro, Inc.* v. *Webroot Inc.*, PTAB Case No. IPR2023-00655, Decision Denying Institution of Inter Partes Request, Oct. 11, 2023, 19 pgs.
*Sophos Ltd. and Sophos Inc.* v. *Webroot Inc.*, PTAB Case No. IPR2023-00699, Patent Owner's Preliminary Response, Jul. 14, 2023, 75 pgs.
*Sophos Ltd. and Sophos Inc.* v. *Webroot Inc.*, PTAB Case No. IPR2023-00699, Exhibit 2001: Declaration of Professor Nenad Medvidovic, Ph.D, 63 pgs.
*Sophos Ltd. and Sophos Inc.* v. *Webroot Inc.*, PTAB Case No. IPR2023-00699, Exhibit 2002: Curriculum Vitae of Professor Nenad Medvidovic, Ph.D., 71 pgs.
*Sophos Ltd. and Sophos Inc.* v. *Webroot Inc.*, PTAB Case No. IPR2023-00699, Exhibit 2003: *Sonrai Memory Ltd.* v. *Kingston*

(56) References Cited

OTHER PUBLICATIONS

*Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Sophos Ltd. and Sophos Inc. v. Webroot Inc.*, PTAB Case No. IPR2023-00699, Exhibit 2004: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Sophos Ltd. and Sophos Inc. v. Webroot Inc.*, PTAB Case No. IPR2023-00699, Exhibit 2005: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Sophos Ltd. and Sophos Inc. v. Webroot Inc.*, PTAB Case No. IPR2023-00699, Exhibit 2006: Dani Kass, "Catching Up On Patent Litigation With Judge Albright" (Law360 Mar. 14, 2023); https://www.law360.com/pulse/articles/1582438/print?section=pulse/courts, 3 pgs.

*Sophos Ltd. and Sophos Inc. v. Webroot Inc.*, PTAB Case No. IPR2023-00699, Exhibit 2007: U.S. District Courts—Federal Court Management Statistics—Profiles-During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, 95 pgs.

*Sophos Ltd. and Sophos Inc. v. Webroot Inc.*, PTAB Case No. IPR2023-00699, Exhibit 2008: *Webroot, Inc., Open Text Inc., v. AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.

*Sophos Ltd. and Sophos Inc. v. Webroot Inc.*, PTAB Case No. IPR2023-00699, Exhibit 2009: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), 20 pgs.

*Sophos Ltd. and Sophos Inc. v. Webroot Inc.*, PTAB Case No. IPR2023-00699, Exhibit 2010: *Webroot, Inc. and Open Text Inc., v. Sophos Ltd.*, Case No. 6:22-cv-240-ADA-DTG, First Amended Complaint For Patent Infringement, Dkt. 42 (W.D. Tex. Jun. 23, 2023), 158 pgs.

*Sophos Ltd. and Sophos Inc. v. Webroot Inc.*, PTAB Case No. IPR2023-00699, Exhibit 2011: *Webroot, Inc. and Open Text Inc., v. AO Kaspersky Lab et al.*, Case No. 6:22-cv-243-ADA-DTG, Scheduling Order, Dkt. 39 (W.D. Tex. Aug. 17, 2022), 7 pgs.

*Sophos Ltd. and Sophos Inc. v. Webroot Inc.*, PTAB Case No. IPR2023-00699, Exhibit 2012: *Webroot, Inc. and Open Text Inc., v. Trend Micro, Inc.*, Case No. 6:22-cv-00239-ADA-DTG, Defendant's Preliminary Invalidity Contentions (W.D. Tex., Sep. 13, 2022) (excerpted), 47 pgs.

*Sophos Ltd. and Sophos Inc. v. Webroot Inc.*, PTAB Case No. IPR2023-00699, Exhibit 2013: *Webroot, Inc. and Open Text Inc., v. CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022) (excerpted), 10 pgs.

*Sophos Ltd. and Sophos Inc. v. Webroot Inc.*, PTAB Case No. IPR2023-00699, Exhibit 2014: *Webroot, Inc. and Open Text Inc., v. AO Kaspersky Lab*, Case No. 6:22-cv-00243-ADA-DTG, Defendant's Preliminary Invalidity Contentions Appendix A (W.D. Tex., Sep. 14, 2022) (excerpted), 8 pgs.

*Sophos Ltd. and Sophos Inc. v. Webroot Inc.*, PTAB Case No. IPR2023-00699, Panel Change Order, Aug. 15, 2023, 3 pgs.

*Sophos Ltd. and Sophos Inc. v. Webroot Inc.*, PTAB Case No. IPR2023-00699, Revised Mandatory Notices, Aug. 30, 2023, 4 pgs.

*Sophos Ltd. and Sophos Inc. v. Webroot Inc.*, PTAB Case No. IPR2023-00699, Decision Granting Institution of Inter Partes Review, Oct. 11, 2023, 38 pgs.

*Sophos Ltd. and Sophos Inc. v. Webroot Inc.*, PTAB Case No. IPR2023-00699, Scheduling Order, Oct. 16, 2023, 12 pgs.

*Crowdstrike, Inc. v. Webroot Inc.*, PTAB Case No. IPR2023-00556, Patent Owner's Preliminary Response, Jun. 16, 23, 81 pgs.

*Crowdstrike, Inc. v. Webroot Inc.*, PTAB Case No. IPR2023-00556, Exhibit 2001: Declaration of Professor Nenad Medvidovic, Ph.D., 63 pgs.

*Crowdstrike, Inc. v. Webroot Inc.*, PTAB Case No. IPR2023-00556, Exhibit 2002: Curriculum Vitae of Professor Nenad Medvidovic, Ph.D., 71 pgs.

*Crowdstrike, Inc. v. Webroot Inc.*, PTAB Case No. IPR2023-00556, Exhibit 2003: *Webroot, Inc., Open Text Inc., v. AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.

*Crowdstrike, Inc. v. Webroot Inc.*, PTAB Case No. IPR2023-00556, Exhibit 2004: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Crowdstrike, Inc. v. Webroot Inc.*, PTAB Case No. IPR2023-00556, Exhibit 2005: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Crowdstrike, Inc. v. Webroot Inc.*, PTAB Case No. IPR2023-00556, Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Crowdstrike, Inc. v. Webroot Inc.*, PTAB Case No. IPR2023-00556, Exhibit 2007: *Webroot, Inc. and Open Text Inc., v. AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.

*Crowdstrike, Inc. v. Webroot Inc.*, PTAB Case No. IPR2023-00556, Exhibit 2008: Dani Kass, "Catching Up On Patent Litigation With Judge Albright" (Law360 Mar. 14, 2023); https://www.law360.com/pulse/articles/1582438/print?section=pulse/courts, 3 pgs.

*Crowdstrike, Inc. v. Webroot Inc.*, PTAB Case No. IPR2023-00556, Exhibit 2009: U.S. District Courts—Federal Court Management Statistics—Profiles—During the 12-Month Periods Ending Mar. 31, 2018 Through 2023, "Table N/A—U.S. District Courts—Combined Civil and Criminal Federal Court Management Statistics (Mar. 31, 2023)", available at https://www.uscourts.gov/sites/default/files/data_tables/fcms_na_distprofile0331.2023.pdf, 95 pgs.

*Crowdstrike, Inc. v. Webroot Inc.*, PTAB Case No. IPR2023-00556, Exhibit 2010: *Webroot, Inc. and Open Text Inc., v. AO Kaspersky Lab et al.*, Case No. 6:22-cv-00243-ADA-DTG, Claim Construction Order, Dkt. 236 (W.D. Tex. Mar. 16, 2023), 20 pgs.

*Crowdstrike, Inc. v. Webroot Inc.*, PTAB Case No. IPR2023-00556, Exhibit 2011: *Webroot, Inc. and Open Text Inc., v. CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sep. 8, 2022) (excerpted), 37 pgs.

*Crowdstrike, Inc. v. Webroot Inc.*, PTAB Case No. IPR2023-00556, Exhibit 2012: *Webroot, Inc. and Open Text Inc., v. AO Kaspersky Lab et al.*, Case No. 6:22-cv-00243-ADA-DTG, Scheduling Order, Dkt. 39 (W.D. Tex. Aug. 17, 2022), 7 pgs.

*Crowdstrike, Inc. v. Webroot Inc.*, PTAB Case No. IPR2023-00556, Exhibit 2013: *Webroot, Inc. and Open Text Inc., v. ForcePoint LLC*, Case No. 6:22-cv-00342-ADA-DTG, Defendant ForcePoint LLC's Preliminary Invalidity Contentions (W.D. Tex., Sep. 13, 2022) (excerpted), 149 pgs.

*Crowdstrike, Inc. v. Webroot Inc.*, PTAB Case No. IPR2023-00556, Exhibit 2014: *Webroot, Inc. and Open Text Inc., v. Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 127 pgs.

*Crowdstrike, Inc. v. Webroot Inc.*, PTAB Case No. IPR2023-00556, Exhibit 2015: *Webroot, Inc. and Open Text Inc., v. Trend Micro, Inc.*,

(56) References Cited

OTHER PUBLICATIONS

Case No. 6:22-cv-00239-ADA-DTG, Defendant's Preliminary Invalidity Contentions (W.D. Tex., Sep. 13, 2022) (excerpted), 125 pgs.
*Crowdstrike, Inc. v. Webroot Inc.*, PTAB Case No. IPR2023-00556, Exhibit 2016: *Webroot, Inc. and Open Text Inc., v. AO Kaspersky Lab*, Case No. 6:22-cv-00243-ADA-DTG, Defendant's Preliminary Invalidity Contentions Appendix A (W.D. Tex., Sep. 14, 2022) (excerpted), 8 pgs.
*Crowdstrike, Inc. v. Webroot Inc.*, PTAB Case No. IPR2023-00556, Exhibit 2017: *Webroot, Inc. and Open Text Inc., v. CrowdStrike, Inc. and CrowdStrike Holdings, Inc.*, Case No. 6:22-cv-00241-ADA-DTG, Defendant's Preliminary Invalidity Contentions (W.D. Tex., Sep. 13, 2022) (excerpted), 62 pgs.
*Crowdstrike, Inc. v. Webroot Inc.*, PTAB Case No. IPR2023-00556, Exhibit 2018: Ex Parte James M. Brennan, et al., Appeal 2021-003606, U.S. Appl. No. 15/285,875, Decision On Appeal Statement of the Case (PTAB Jul. 26, 2022), 10 pgs.
*Crowdstrike, Inc. v. Webroot Inc.*, PTAB Case No. IPR2023-00556, Exhibit 2019: File History of U.S. Pat. No. 8,418,250, 1187 pgs.
*Crowdstrike, Inc. v. Webroot Inc.*, PTAB Case No. IPR2023-00556, Patent Owner's Updated Mandatory Notices Pursuant to 37 CFR §42.8(b), Jun. 23, 2023, 9 pgs.
*Crowdstrike, Inc. v. Webroot Inc.*, PTAB Case No. IPR2023-00556, Notice of Petitioner Stipulation, Jul. 17, 2023, 3 pgs.
*Crowdstrike, Inc. v. Webroot Inc.*, PTAB Case No. IPR2023-00556, Decision Granting Institution of Inter Partes Review, Sep. 12, 2023, 25 pgs.
*Crowdstrike, Inc. v. Webroot Inc.*, PTAB Case No. IPR2023-00556, Sep. 12, 2023, Scheduling Order, Sep. 12, 2023, 12 pgs.
*Crowdstrike, Inc. v. Webroot Inc.*, PTAB Case No. IPR2023-00556, Patent Owner's Objections to Evidence submitted by Petitioner, Sep. 26, 2023, 5 pgs.
*Sophos Ltd. and Sophos Inc. v. Webroot Inc.*, PTAB Case No. IPR2023-00633, Patent Owner's Preliminary Response, Jun. 16, 2023, 81 pgs.
*Sophos Ltd. and Sophos Inc. v. Webroot Inc.*, PTAB Case No. IPR2023-00633, Exhibit 2001: Declaration of Professor Nenad Medvidovic, Ph.D., 70 pgs.
*Sophos Ltd. and Sophos Inc. v. Webroot Inc.*, PTAB Case No. IPR2023-00633, Exhibit 2002: Curriculum Vitae of Nenad Medvidovic, Ph.D., 71 pgs.
*Sophos Ltd. and Sophos Inc. v. Webroot Inc.*, PTAB Case No. IPR2023-00633, Exhibit 2003: *Webroot, Inc. and Open Text Inc., v. Sophos LTD*, Case No. 6:22-cv-240-ADA-DTG, Complaint (W.D. Tex Mar. 4, 2022), 144 pgs.
*Sophos Ltd. and Sophos Inc. v. Webroot Inc.*, PTAB Case No. IPR2023-00633, Exhibit 2004: *Sonrai Memory Ltd. v. Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Sophos Ltd. and Sophos Inc. v. Webroot Inc.*, PTAB Case No. IPR2023-00633, Exhibit 2005: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Sophos Ltd. and Sophos Inc. v. Webroot Inc.*, PTAB Case No. IPR2023-00633, Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Sophos Ltd. and Sophos Inc. v. Webroot Inc.*, PTAB Case No. IPR2023-00633, Exhibit 2007: Dani Kass, "Catching Up On Patent Litigation With Judge Albright" (Law360 Mar. 14, 2023); https://www.law360.com/pulse/articles/1582438/print?section=pulse/courts, 3 pgs.
*Sophos Ltd. and Sophos Inc. v. Webroot Inc.*, PTAB Case No. IPR2023-00633, Exhibit 2008: U.S. District Courts—Combined Civil and Criminal Federal Court Management Statistics (Mar. 31, 2023), available at https://www.uscourts.gov/statistics/table/na/federal-court-management-statistics/2023/03/31-1, 95 pgs.
*Sophos Ltd. and Sophos Inc. v. Webroot Inc.*, PTAB Case No. IPR2023-00633, Exhibit 2009: *Webroot, Inc. and Open Text Inc., v. AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Sophos Ltd. and Sophos Inc. v. Webroot Inc.*, PTAB Case No. IPR2023-00633, Exhibit 2010: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), 20 pgs.
*Sophos Ltd. and Sophos Inc. v. Webroot Inc.*, PTAB Case No. IPR2023-00633, Exhibit 2011: U.S. Patent Application Publication No. 2002/0194490, Halperin, 25 pgs.
*Sophos Ltd. and Sophos Inc. v. Webroot Inc.*, PTAB Case No. IPR2023-00633, Exhibit 2012: *Webroot, Inc. and Open Text Inc., v. Sophos LTD*, Case No. 6:22-cv-240-ADA-DTG, Scheduling Order, Dkt. 54 (W.D. Tex. Aug. 8, 2022), 4 pgs.
*Sophos Ltd. and Sophos Inc. v. Webroot Inc.*, PTAB Case No. IPR2023-00633, Exhibit 2013: *Webroot, Inc. and Open Text Inc., v. Forcepoint LLC*, Case No. 6:22-cv-00342-ADA-DTG, Defendant's Preliminary Invalidity Contentions (W.D. Tex., Sep. 13, 2022) (excerpted), 21 pgs.
*Sophos Ltd. and Sophos Inc. v. Webroot Inc.*, PTAB Case No. IPR2023-00633, Exhibit 2014: *Webroot, Inc. and Open Text Inc., v. Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 36 pgs.
*Sophos Ltd. and Sophos Inc. v. Webroot Inc.*, PTAB Case No. IPR2023-00633, Exhibit 2015: *Webroot, Inc. and Open Text Inc., v. Trend Micro, Inc..*, Case No. 6:22-cv-00239-ADA-DTG, Defendant's Preliminary Invalidity Contentions (W.D. Tex., Sep. 13, 2022) (excerpted), 47 pgs.
*Sophos Ltd. and Sophos Inc. v. Webroot Inc.*, PTAB Case No. IPR2023-00633, Exhibit 2016: *Webroot, Inc. and Open Text Inc., v. AO Kaspersky Lab et al.*, Case No. 6:22-cv-243-ADA-DTG, Defendant's Preliminary Invalidity Contentions Appendix A (W.D. Tex., Sep. 14, 2022), 8 pgs.
*Sophos Ltd. and Sophos Inc. v. Webroot Inc.*, PTAB Case No. IPR2023-00633, Exhibit 2017: *Webroot, Inc. and Open Text Inc., v. CrowdStrike, Inc. and CrowdStrike Holdings, Inc..*, Case No. 6:22-cv-00241-ADA, Defendant's Preliminary Invalidity Contentions (W.D. Tex., Sep. 13, 2022) (excerpted), 10 pgs.
*Sophos Ltd. and Sophos Inc. v. Webroot Inc.*, PTAB Case No. IPR2023-00633, Exhibit 2018: U.S. Pat. No. 8,726,389 Certified File History, 324 pgs.
*Sophos Ltd. and Sophos Inc. v. Webroot Inc.*, PTAB Case No. IPR2023-00633, Exhibit 2019: Jul. 13, 2022 Email from Jennifer Inghram of King & Spalding, 2 pgs.
*Sophos Ltd. and Sophos Inc. v. Webroot Inc.*, PTAB Case No. IPR2023-00633, Exhibit 2020: *Webroot, Inc. and Open Text Inc., v. AO Kaspersky Lab et al.*, Case No. 6:22-cv-243-ADA-DTG, Joint Defendants' Opening Claim Construction Brief, Dkt. 86 (W.D. Tex., Oct. 28, 2022), 84 pgs.
*Sophos Ltd. and Sophos Inc. v. Webroot Inc.*, PTAB Case No. IPR2023-00633, Patent Owner Open Text Inc.'s Updated Mandatory Notices Pursuant to 37 CFR § 42.8(b), Jun. 23, 2023, 9 pgs.
*Sophos Ltd. and Sophos Inc. v. Webroot Inc.*, PTAB Case No. IPR2023-00633, Petitioner's Reply to Patent Owner's Preliminary Response, Aug. 18, 2023, 5 pgs.
*Sophos Ltd. and Sophos Inc. v. Webroot Inc.*, PTAB Case No. IPR2023-00633, Exhibit 1014: email granting Request for Leave to File Reply to Patent Owner's Preliminary Response, 2 pgs.
*Sophos Ltd. and Sophos Inc. v. Webroot Inc.*, PTAB Case No. IPR2023-00633, Panel Change Order, Aug. 21, 2023, 3 pgs.
*Sophos Ltd. and Sophos Inc. v. Webroot Inc.*, PTAB Case No. IPR2023-00633, Patent Owner's Preliminary Sur-Reply, Aug. 25, 2023, 10 pgs.
*Sophos Ltd. and Sophos Inc. v. Webroot Inc.*, PTAB Case No. IPR2023-00633, Exhibit 2021: U.S. Patent and Trademark Office, General USPTO Customer Information, at https://www.uspto.gov/ebc/pair/pair_faq_pt_general.html,#certifiedcopy, 4 pgs.

(56) References Cited

OTHER PUBLICATIONS

*Sophos Ltd. and Sophos Inc. v. Webroot Inc.*, PTAB Case No. IPR2023-00633, Exhibit 2022: U.S. Patent and Trademark Office, Order Certified Copies, https://www.uspto.gov/patents/apply/checking-application-status/order-certified-copies, 2 pgs.
*Sophos Ltd. and Sophos Inc. v. Webroot Inc.*, PTAB Case No. IPR2023-00633, Revised Mandatory Notices, Aug. 30, 2023, 5 pgs.
*Sophos Ltd. and Sophos Inc. v. Webroot Inc.*, PTAB Case No. IPR2023- 00633, Decision denying institution of Inter Parties Review, Sep. 12, 2023, 11 pgs.
*Crowdstrike, Inc. v. Webroot Inc.*, PTAB Case No. IPR2023-01050, Patent Owner Open Text Inc.'s Mandatory Notices Pursuant to 37 CFR § 42.8(b), Aug. 2, 2023, 9 pgs.
*Crowdstrike, Inc. v. Webroot Inc.*, PTAB Case No. IPR2023-01050, Notice of Filing Date Accorded to Petition and Time for Filing Patent Owner Preliminary Response, 6 pgs.
*Sophos Ltd. and Sophos Inc. v. Webroot Inc.*, PTAB Case No. IPR2023-00491, Exhibit 3001: email denying Request for Leave to File Reply to Patent Owner's Preliminary Response, Aug. 2, 2023, 3 pgs.
*Sophos Ltd. and Sophos Inc. v. Webroot Inc.*, PTAB Case No. IPR2023-00491, Decision denying institution of Inter Parties Review, Aug. 2, 2023, 27 pgs.
*Sophos Ltd. and Sophos Inc. v. Webroot Inc.*, PTAB Case No. IPR2023-00491, Revised Mandatory Notices, Aug. 30, 2023, 4 pgs.
*Crowdstrike, Inc. v. Webroot Inc.*, PTAB Case No. IPR2022-01522, Petition for Inter Partes Review of U.S. Pat. No. 10,284,591, 77 pgs.
*Crowdstrike, Inc. v. Webroot Inc.*, PTAB Case No. IPR2022-01522, Exhibit 1001: U.S. Pat. No. 10,284,591 to Giuliani et al., 14 pgs.
*Crowdstrike, Inc. v. Webroot Inc.*, PTAB Case No. IPR2022-01522, Exhibit 1002: File History of U.S. Pat. No. 10,284,591, 236 pgs.
*Crowdstrike, Inc. v. Webroot Inc.*, PTAB Case No. IPR2022-01522, Exhibit 1003: Declaration of Dr. Wenke Lee, 144 pgs.
*Crowdstrike, Inc. v. Webroot Inc.*, PTAB Case No. IPR2022-01522, Exhibit 1004: U.S. Patent Publication No. 2008/0016339 to Shukla, 26 pgs.
*Crowdstrike, Inc. v. Webroot Inc.*, PTAB Case No. IPR2022-01522, Exhibit 1005: U.S. Patent Publication No. 2013/0047255 to Dalcher, 20 pgs.
*Crowdstrike, Inc. v. Webroot Inc.*, PTAB Case No. IPR2022-01522, Exhibit 1006: U.S. Pat. No. 9,465,936 to Tosa, 19 pgs.
*Crowdstrike, Inc. v. Webroot Inc.*, PTAB Case No. IPR2022-01522, Exhibit 1007: U.S. Pat. No. 7,971,255 to Kc et al., 12 pgs.
*Crowdstrike, Inc. v. Webroot Inc.*, PTAB Case No. IPR2022-01522, Exhibit 1008: Dawson R. Engler, M. Frans Kaashoek, and James O'Toole Jr., Exokernel: An Operating System Architecture for Application-Level Resource Management, 29 ACM SIGOPS Operating Systems Review (Dec. 3, 1995, p. 251), 16 p.
*Crowdstrike, Inc. v. Webroot Inc.*, PTAB Case No. IPR2022-01522, Exhibit 1009: Intel Architecture Software Developer's Manual vol. 3: SystemProgramming, Intel Corporation (1999), 658 pgs.
*Crowdstrike, Inc. v. Webroot Inc.*, PTAB Case No. IPR2022-01522, Exhibit 1010: Desmond Lobo, Xin-Wen Wu, Paul Watters, and Li Sun, Windows Rootkits, Attacks and Countermeasures, 2010 IEEE Second Cybercrime and Trustworthy Computing Workshop (Jul. 2010), 10 pgs.
*Crowdstrike, Inc. v. Webroot Inc.*, PTAB Case No. IPR2022-01522, Exhibit 1011: Michael Sikorski and Andrew Honig, Practical Malware Analysis, No Starch Press, Inc. (2012), 20 pgs.
*Crowdstrike, Inc. v. Webroot Inc.*, PTAB Case No. IPR2022-01522, Exhibit 1012: Manuel Egele, Theodoor Scholte, Engin Kirda, Christopher Kruegel, A Survey on Automated Dynamic Malware-Analysis Techniques and Tools, ACM Computing Surveys, vol. 44, No. 2, Article 6 (Feb. 2012), 42 pgs.
*Crowdstrike, Inc. v. Webroot Inc.*, PTAB Case No. IPR2022-01522, Exhibit 1013: Pablo Bravo and Daniel F. Garcia, Proactive Detection of Kernel-Mode Rootkits, IEEE 2011 Sixth International Conference on Availability, Reliability and Security (2011), 6 pgs.
*Crowdstrike, Inc. v. Webroot Inc.*, PTAB Case No. IPR2022-01522, Exhibit 1014: Marco Prandini and Marco Ramilli, Return-Oriented Programming, IEEE Security & Privacy, vol. 10, No. 6 (Dec. 10, 2012), 4 pgs.
*Crowdstrike, Inc. v. Webroot Inc.*, PTAB Case No. IPR2022-01522, Exhibit 1015: Yang-Seo Choi, Dong-il Seo, and Sung-Won Sohn, A New Stack Buffer Overflow Hacking Defense Technique with Memory Address Confirmation, in Information Security and Cryptology—ICISC 2001, 146-159 (K. Kim ed., 2002), 14 pgs.
*Crowdstrike, Inc. v. Webroot Inc.*, PTAB Case No. IPR2022-01522, Exhibit 1016: Kevin A. Roundy and Barton P. Miller, Hybrid Analysis and Control of Malware, in Recent Advances in Intrusion Detection, 317-338 (S. Jha, R. Sommer, and C. Kreibich eds., 2010), 23 pgs.
*Crowdstrike, Inc. v. Webroot Inc.*, PTAB Case No. IPR2022-01522, Exhibit 1017: Ulfar Erlingsson and Fred B. Schneider, IRM Enforcement of Java Stack Inspection, IEEE Security & Privacy, vol. 10, No. 6 (Dec. 10, 2012), 10 pgs.
*Crowdstrike, Inc. v. Webroot Inc.*, PTAB Case No. IPR2022-01522, Exhibit 1018: Dictionary of Computer and Internet Terms (8th ed. 2003), 10 pgs.
*Crowdstrike, Inc. v. Webroot Inc.*, PTAB Case No. IPR2022-01522, Exhibit 1019: Dan Appleman, Visual Basic Programmer's Guide to the Win32 API, Macmillan Computer Publishing USA (1999), 21 pgs.
*Crowdstrike, Inc. v. Webroot Inc.*, PTAB Case No. IPR2022-01522, Exhibit 1020: 4 objdump, https://web.archive.org/web/20130326055338/http://sourceware.org/binubinu/docs/binutils/objdump.html#objdump (Mar. 26, 2013, retrieved Sep. 9, 2022), 5 pgs.
*Crowdstrike, Inc. v. Webroot Inc.*, PTAB Case No. IPR2022-01522, Exhibit 1021: John Calcote, Autotools, No Starch Press, Inc. (2010), 14 pgs.
*Crowdstrike, Inc. v. Webroot Inc.*, PTAB Case No. IPR2022-01522, Exhibit 1022: Zi-Shun Huang, Ian G. Harris, Return-Oriented Vulnerabilities in ARM Executables, 2012 IEEE Conference on Technologies for Homeland Security (HST) (2012), 6 pgs.
*Crowdstrike, Inc. v. Webroot Inc.*, PTAB Case No. IPR2022-01522, Exhibit 1023: U.S. Patent Publication No. 2012/0255018 to Sallam, 53 pgs.
*Crowdstrike, Inc. v. Webroot Inc.*, PTAB Case No. IPR2022-01522, Exhibit 1024: U.S. Patent Publication No. 2007/0016914 to Yeap, 12 pgs.
*Crowdstrike, Inc. v. Webroot Inc.*, PTAB Case No. IPR2022-01522, Exhibit 1025: Henry Hanping Feng, Oleg M. Kolesnikov, Prahlad Fogla, Wenke Lee, and Weibo Gong, Anomaly Detection Using Call Stack Information, Proceedings of the 2003 IEEE Symposium on Security and Privacy (2003), 14 pgs.
*Crowdstrike, Inc. v. Webroot Inc.*, PTAB Case No. IPR2022-01522, Exhibit 1026: Scheduling Order (Dkt. 50), 18 pgs.
*Crowdstrike, Inc. v. Webroot Inc.*, PTAB Case No. IPR2022-01522, Patent Owner Open Text Inc.'s Mandatory Notices Pursuant to 37 CFR § 42.8(b), Oct. 21, 2022, 4 pgs.
*Crowdstrike, Inc. v. Webroot Inc.*, PTAB Case No. IPR2022-01522, Notice of Filing Date Accorded to Petition and Time for Filing Patent Owner Preliminary Response, Oct. 27, 2022, 6 pgs.
*Crowdstrike, Inc. v. Webroot Inc.*, PTAB Case No. IPR2022-01522, Patent Owner Open Text Inc.'s Updated Mandatory Notices Pursuant to 37 CFR § 42.8(b), Jan. 27, 2023, 6 pgs.
*Crowdstrike, Inc. v. Webroot Inc.*, PTAB Case No. IPR2022-01522, Patent Owner's Preliminary Response, Jan. 27, 2023, 79 pgs.
*Crowdstrike, Inc. v. Webroot Inc.*, PTAB Case No. IPR2022-01522, Exhibit 2001: Declaration of Professor Nenad Medvidovic, Ph.D, 95 pgs.
*Crowdstrike, Inc. v. Webroot Inc.*, PTAB Case No. IPR2022-01522, Exhibit 2002: Curriculum Vitae of Professor Nenad Medvidovic, Ph.D., 71 pgs.
*Crowdstrike, Inc. v. Webroot Inc.*, PTAB Case No. IPR2022-01522, Exhibit 2003: *Webroot, Inc. and Open Text Inc., v. CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.
*Crowdstrike, Inc. v. Webroot Inc.*, PTAB Case No. IPR2022-01522, Exhibit 2004: *Sonrai Memory Ltd. v. Kingston Tech. Co. and*

(56) References Cited

OTHER PUBLICATIONS

*Kingston Tech. Corp.*, Case No. 6:21-cv-1284- ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.

*Crowdstrike, Inc. v. Webroot Inc.*, PTAB Case No. IPR2022-01522, Exhibit 2005: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.

*Crowdstrike, Inc. v. Webroot Inc.*, PTAB Case No. IPR2022-01522, Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Crowdstrike, Inc. v. Webroot Inc.*, PTAB Case No. IPR2022-01522, Exhibit 2007: *Webroot, Inc., Open Text Inc., v. AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.

*Crowdstrike, Inc. v. Webroot Inc.*, PTAB Case No. IPR2022-01522, Exhibit 2008: Standing Order Governing Proceedings (OGP) 4.2—Patent Cases (W.D. Tex., Sep. 16, 2022), available at chrome-extension://efaid-bmnnnibpcajpcglclefindmkaj/https://www.txwd.uscourts.gov/wpcontent/uploads/Standing%20Orders/Waco/Albright/Stand-ing%20Order%20Governing%20Proceedings%20-%20Pa-tent%20Cases%20091622.pdf (excerpted), 5 pgs.

*Crowdstrike, Inc. v. Webroot Inc.*, PTAB Case No. IPR2022-01522, Exhibit 2009: *Webroot, Inc. and Open Text Inc., v. Trend Micro Inc.*, Case No. 6:22-cv-00239-ADA-DTG, Defendant's Preliminary Invalidity Contentions (W.D. Tex., Sep. 13, 2022) (excerpted), 9 pgs.

*Crowdstrike, Inc. v. Webroot Inc.*, PTAB Case No. IPR2022-01522, Exhibit 2010: *Webroot, Inc. and Open Text Inc., v. Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 6 pgs.

*Crowdstrike, Inc. v. Webroot Inc.*, PTAB Case No. IPR2022-01522, Exhibit 2011: *Open Text Inc et al., v. AO Kaspersky Lab*, Case No. 6:22-cv-00243-ADA-DTG, Defendant AO Kaspersky Lab's Preliminary Invalidity Contentions Exhibit 5A (W.D. Tex., Sep. 14, 2022) (excerpted), 1 pg.

*Crowdstrike, Inc. v. Webroot Inc.*, PTAB Case No. IPR2022-01522, Exhibit 2012: U.S. Pat. Appl. Pub. 2011/0289586 A1 to Gaurav S. Kc and Alfred V. Aho, filed Jun. 3, 2011 and issued Nov. 24, 2011 ("Kc Continuation"), 10 pgs.

*Crowdstrike, Inc. v. Webroot Inc.*, PTAB Case No. IPR2022-01522, Exhibit 2013: Erickson, J., Hacking: The Art of Exploitation, 2nd Ed. (2008) (excerpted), 133 pgs.

*Crowdstrike, Inc. v. Webroot Inc.*, PTAB Case No. IPR2022-01522, Exhibit 2014: Kleymenov, A. and Thabet, A., Mastering Malware Analysis, Packt Pub. (2019) (excerpted), 7 pgs.

*Crowdstrike, Inc. v. Webroot Inc.*, PTAB Case No. IPR2022-01522, Exhibit 2015: Goldberg, I et al., A Secure Environment for Untrusted Helper Applications (Confining the Wily Hacker), Computer Sci. Div., Univ. of Calif., Berkeley (Jul. 1996) ("Goldberg"), 14 pgs.

*Crowdstrike, Inc. v. Webroot Inc.*, PTAB Case No. IPR2022-01522, Exhibit 2016: *Webroot, Inc., Open Text Inc., v. AO Kaspersky Lab et al.*, Case No. 6:22-cv-00243-ADA-DTG, Plaintiffs Responsive Claim Construction Brief, Dkt. 98 (W.D. Tex., Nov. 18, 2022), 86 pgs.

*Crowdstrike, Inc. v. Webroot Inc.*, PTAB Case No. IPR2022-01522, Exhibit 2017: *Webroot, Inc. and Open Text Inc., v. AO Kaspersky Lab et al.*, Case No. 6:22-cv-00243-ADA-DTG, Defendants' Opening Claim Construction Brief, Dkt. 86 (W.D. Tex., Oct. 28, 2022) (excerpted), 23 pgs.

*Crowdstrike, Inc. v. Webroot Inc.*, PTAB Case No. IPR2022-01522, Exhibit 2018: U.S. Pat. Appl. Pub. No. 2009/0049550 A1 to S. Shevchenko, filed Jun. 6, 2008 and issued Feb. 19, 2009 ("Shevchenko"), 17 pgs.

*Crowdstrike, Inc. v. Webroot Inc.*, PTAB Case No. IPR2022-01522, Exhibit 2019: U.S. Pat. Appl. Pub. No. 2005/0108562 A1 to R. Khazan et al., filed Jun. 18, 2003 and issued May 19, 2005 ("Khazan"), 30 pgs.

*Crowdstrike, Inc. v. Webroot Inc.*, PTAB Case No. IPR2022-01522, Exhibit 2020: U.S. Pat. No. 8,510,596 B1 to S. Gupta and P. Shenoy, filed Jul. 6, 2007 and issued Aug. 13, 2013 ("Gupta"), 47 pgs.

*Crowdstrike, Inc. v. Webroot Inc.*, PTAB Case No. IPR2022-01522, Exhibit 2021: U.S. Pat. No. 10,135,861 to M. Harris et al., filed Nov. 2, 2015 and issued Nov. 20, 2018 ("Harris"), 22 pgs.

*Crowdstrike, Inc. v. Webroot Inc.*, PTAB Case No. IPR2022-01522, Exhibit 2022: U.S. Pat. No. 10,896,254 B2 to R. Mckerchar et al., filed Jun. 29, 2016 and issued Jan. 19, 2021 ("McKerchar"), 31 pgs.

*Crowdstrike, Inc. v. Webroot Inc.*, PTAB Case No. IPR2022-01522, Decision Granting Institution of Inter Partes Review, Apr. 21, 2023, 47 pgs.

*Crowdstrike, Inc. v. Webroot Inc.*, PTAB Case No. IPR2022-01522, Scheduling Order, Apr. 21, 2023, 12 pgs.

*Crowdstrike, Inc. v. Webroot Inc.*, PTAB Case No. IPR2022-01522, Patent Owner's Request for Rehearing, May 5, 2023, 20 pgs.

*Crowdstrike, Inc. v. Webroot Inc.*, PTAB Case No. IPR2022-01522, Patent Owner's Objection to Evidence Submitted by Petitioner, May 5, 2023, 5 pgs.

*Crowdstrike, Inc. v. Webroot Inc.*, PTAB Case No. IPR2022-01522, Patent Owner's Updated Exhibit List as of May 5, 2023, 5 pgs.

*Crowdstrike, Inc. v. Webroot Inc.*, PTAB Case No. IPR2022-01522, Exhibit 2023: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), 20 pgs.

*Crowdstrike, Inc. v. Webroot Inc.*, PTAB Case No. IPR2022-01522, Exhibit 3001: POP Request, May 5, 2023, 3 pgs.

*Crowdstrike, Inc. v. Webroot Inc.*, PTAB Case No. IPR2022-01522, Notification of Receipt of POP Request, May 8, 2023, 2 pgs.

*Crowdstrike, Inc. v. Webroot Inc.*, PTAB Case No. IPR2022-01522, Patent Owner Open Text Inc.'s Second Updated Mandatory Notices Pursuant to 37 CFR § 42.8(b), May 25, 2023, 8 pgs.

*Crowdstrike, Inc. v. Webroot Inc.*, PTAB Case No. IPR2022-01522, Order Denying POP, Jun. 8, 2023, 3 pgs.

*Trend Micro, Inc. v. Webroot Inc.*, PTAB Case No. IPR2023-00692, Petition for Inter Partes Review of U.S. Pat. No. 10,284,591, Mar. 7, 2023, 79 pgs.

*Trend Micro, Inc. v. Webroot Inc.*, PTAB Case No. IPR2023-00692, Exhibit 1001: U.S. Pat. No. 10,284,591 to Giuliani et al. ('591 patent), 14 pgs.

*Trend Micro, Inc. v. Webroot Inc.*, PTAB Case No. IPR2023-00692, Exhibit 1002: Expert Declaration of Dr. Seth Nielson, 177 pgs.

*Trend Micro, Inc. v. Webroot Inc.*, PTAB Case No. IPR2023-00692, Exhibit 1003: Curriculum Vitae of A.L Dr. Seth Nielson, 15 pgs.

*Trend Micro, Inc. v. Webroot Inc.*, PTAB Case No. IPR2023-00692, Exhibit 1004: U.S. Patent Publication No. 2013/0275981 to Dalcher, 11 pgs.

*Trend Micro, Inc. v. Webroot Inc.*, PTAB Case No. IPR2023-00692, Exhibit 1005: Vasilis Pappas, Transparent ROP Exploit Mitigation Using Indirect Branch Tracing, 22nd USENIX Security Symposium, (Aug. 14-16, 2013), 17 pgs.

*Trend Micro, Inc. v. Webroot Inc.*, PTAB Case No. IPR2023-00692, Exhibit 1006: Prosecution History of the '591 patent, 232 pgs.

*Trend Micro, Inc. v. Webroot Inc.*, PTAB Case No. IPR2023-00692, Exhibit 1007: Provisional patent application claimed by '591 patent for priority, 30 pgs.

*Trend Micro, Inc. v. Webroot Inc.*, PTAB Case No. IPR2023-00692, Exhibit 1008: David A. Patterson, Computer Organization & Design The Hardware/Software Interface, Morgan Kaufmann Publishers, Inc., (1994), 18 pgs.

*Trend Micro, Inc. v. Webroot Inc.*, PTAB Case No. IPR2023-00692, Exhibit 1009: ORS Open Systems Resources, Inc., Collecting Detailed Performance Data with Xperf, The NT Insider 17(1), (2010), 20 pgs.

*Trend Micro, Inc. v. Webroot Inc.*, PTAB Case No. IPR2023-00692, Exhibit 1010: Aleph One, Smashing the Stack for Fun and Profit, (1996), 25 pgs.

(56) References Cited

OTHER PUBLICATIONS

*Trend Micro, Inc.* v. *Webroot Inc.*, PTAB Case No. IPR2023-00692, Exhibit 1011: Jacob R. Lorch, The VTrace Tool: Building a System Tracer for Windows NT and Windows 2000, MSDN Magazine, (2000), 19 pgs.
*Trend Micro, Inc.* v. *Webroot Inc.*, PTAB Case No. IPR2023-00692, Exhibit 1012: Marco Pistoia, Beyond Stack Inspection: A Unified Access-Control and Information-Flow Security Model, IEE, (2007), 16 pgs.
*Trend Micro, Inc.* v. *Webroot Inc.*, PTAB Case No. IPR2023-00692, Exhibit 1013: Galen Hunt, Detours: Binary Interception of Win32 Functions, Microsoft Research, (1999), 9 pgs.
*Trend Micro, Inc.* v. *Webroot Inc.*, PTAB Case No. IPR2023-00692, Exhibit 1014: Sandra Loosemore, The GNU C Library Reference Manual, 188-193, (1999) 10 pgs.
*Trend Micro, Inc.* v. *Webroot Inc.*, PTAB Case No. IPR2023-00692, Exhibit 1015: Jonathan Corbet, Expanding the Kernel Stack, LWN. net, (2014) 1 pg.
*Trend Micro, Inc.* v. *Webroot Inc.*, PTAB Case No. IPR2023-00692, Exhibit 1016: OpenSSL documentation API listing, https://www.openssl.org/docs/man1.0.2/man3/., 39 pgs.
*Trend Micro, Inc.* v. *Webroot Inc.*, PTAB Case No. IPR2023-00692, Exhibit 1017: Declaration of Ingrid Hsieh-Yee, Ph.D., 36 pgs.
*Trend Micro, Inc.* v. *Webroot Inc.*, PTAB Case No. IPR2023-00692, Patent Owner Open Text Inc.'s Mandatory Notices Pursuant to 37 CFR § 42.8(b), Mar. 28, 2023, 7 pgs.
*Trend Micro, Inc.* v. *Webroot Inc.*, PTAB Case No. IPR2023-00692, Notice of Filing Date Accorded to Petition and Time for Filing Patent Owner Preliminary Response, May 11, 2023, 6 pgs.
*AO Kaspersky Lab* v. *Webroot Inc.*, PTAB Case No. IPR2023-00895, Petition for Inter Partes Review, U.S. Pat. No. 10,284,591, Apr. 28, 2023, 85 pgs.
*AO Kaspersky Lab* v. *Webroot Inc.*, PTAB Case No. IPR2023-00895, Exhibit 1001: U.S. Pat. No. 10,284,591 (issued May 7, 2019), 14 pgs.
*AO Kaspersky Lab* v. *Webroot Inc.*, PTAB Case No. IPR2023-00895, Exhibit 1002: Declaration of V.S. Subrahmanian, Ph.D. under 37 C.F.R. §1.68, 110 pgs.
*AO Kaspersky Lab* v. *Webroot Inc.*, PTAB Case No. IPR2023-00895, Exhibit 1003: Curriculum Vitae of V.S. Subrahmanian, Ph.D., 77 pgs.
*AO Kaspersky Lab* v. *Webroot Inc.*, PTAB Case No. IPR2023-00895, Exhibit 1004: Motion for Order Authorizing Alternative Service, 13 pgs.
*AO Kaspersky Lab* v. *Webroot Inc.*, PTAB Case No. IPR2023-00895, Exhibit 1005: Waiver of Service of Summons, 1 pgs.
*AO Kaspersky Lab* v. *Webroot Inc.*, PTAB Case No. IPR2023-00895, Exhibit 1006: File History of U.S. Pat. No. 10,284,591, 238 pgs.
*AO Kaspersky Lab* v. *Webroot Inc.*, PTAB Case No. IPR2023-00895, Exhibit 1007: Ivan Fratric, Runtime Prevention of Return-Oriented Programming Attacks to Ivan Fratric, https://github.com/ivanfratric/ropguard/blob/master/doc/ropguard.pdf ("Fratric"), 11 pgs.
*AO Kaspersky Lab* v. *Webroot Inc.*, PTAB Case No. IPR2023-00895, Exhibit 1008: U.S. Patent Publication No. 2012/0255018 (issued Oct. 4, 2012) ("Sallam"), 53 pg.
*AO Kaspersky Lab* v. *Webroot Inc.*, PTAB Case No. IPR2023-00895, Exhibit 1009: Hello World, Github Docs, https://docs.github.com/en/get-started/quickstart/hello-world (last visited Apr. 26, 2023), 8 pgs.
*AO Kaspersky Lab* v. *Webroot Inc.*, PTAB Case No. IPR2023-00895, Exhibit 1010: Committing and Reviewing Changes to your Project, Github Docs, https://docs.github.com/en/desktop/contributing-and-collaborating-using-github-desktop/making-changes-in-a-branch/committing-and-reviewing-changes-to-your-project (last visited Apr. 26, 2023), 11 pgs.
*AO Kaspersky Lab* v. *Webroot Inc.*, PTAB Case No. IPR2023-00895, Exhibit 1011: Setting Repository Visibility, Github Docs, https://docs.github.com/en/repositories/managing-your-repositorys-settings-and-features/managing-repository-settings/setting-repository- visibility (last visited Apr. 26, 2023), 3 pgs.
*AO Kaspersky Lab* v. *Webroot Inc.*, PTAB Case No. IPR2023-00895, Exhibit 1012: GitHub Glossary, Github Docs, https://docs.github.com/en/get-started/quickstart/github-glossary#public-repository (last visited Apr. 26, 2023), 37 pgs.
*AO Kaspersky Lab* v. *Webroot Inc.*, PTAB Case No. IPR2023-00895, Exhibit 1013: Scott Chacon, GitHub Code Search, The Github Blog (Nov. 3, 2008), https://github.blog/2008-11-03-github-code-search/, 7 pgs.
*AO Kaspersky Lab* v. *Webroot Inc.*, PTAB Case No. IPR2023-00895, Exhibit 1014: About Searching on GitHub, Github Docs, https://docs.github.com/en/search-github/getting-started-with-searching-on-github/about-searching-on-github (last visited Apr. 26, 2023), 3 pgs.
*AO Kaspersky Lab* v. *Webroot Inc.*, PTAB Case No. IPR2023-00895, Exhibit 1015: Finding Ways to Contribute to Open Source on GitHub, Github Docs, https://docs.github.com/en/get-started/exploring-projects-on-github/finding-ways-to-contribute-to-open-source-on-github (last visited Apr. 26, 2023), 3 pgs.
*AO Kaspersky Lab* v. *Webroot Inc.*, PTAB Case No. IPR2023-00895, Exhibit 1016: Claim Construction Order, *Webroot, Inc. and Open Text, Inc.* v. *AO Kaspersky Lab,* Case No. 6:22-CV-00243-ADA-DTG, (Mar. 16, 2023), 5 pgs.
*AO Kaspersky Lab* v. *Webroot Inc.*, PTAB Case No. IPR2023-00895, Exhibit 1017: Michael Huttermann, Devops For Developers (Apress, 2012), 183 pgs.
*AO Kaspersky Lab* v. *Webroot Inc.*, PTAB Case No. IPR2023-00895, Exhibit 1018: Nicolas Despres, Automatic performance monitoring tool, Laboratoire De Recherche Et Developpement De L'epita Tech Report No. 0601, 915 (2006), 21 pgs.
*AO Kaspersky Lab* v. *Webroot Inc.*, PTAB Case No. IPR2023-00895, Exhibit 1019: Bryan D. Payne, Martin D.P. de A. Carbone, Wenke Lee, 2007, December. Secure and Flexible Monitoring of Virtual Machines, 23rd Ann. Comp. Sec. Applications Conf., 385, 385-397 (2007), 13 pgs.
*AO Kaspersky Lab* v. *Webroot Inc.*, PTAB Case No. IPR2023-00895, Exhibit 1020: Margaret Rouse, Dynamic Library, Techopedia (Mar. 2, 2012), 7 pgs.
*AO Kaspersky Lab* v. *Webroot Inc.*, PTAB Case No. IPR2023-00895, Exhibit 1021: Krishnan, S. and Srihari, K., A Knowledge-Based Object Oriented DFM Advisor for Surface Mount PCB Assembly. 10 Li Int'l. J. Advanced Mfg. Tech, 317, 317-329 (1995), 13 pgs.
*AO Kaspersky Lab* v. *Webroot Inc.*, PTAB Case No. IPR2023-00895, Exhibit 1022: Henry Hanping Feng, Jonathon T. Giffin, Yong Huang, Somesh Jha, Wenkee Lee, and Barton P. Miller, Formalizing Sensitivity in Static Analysis for Intrusion Detection, IEEE Symp. Sec. Priv., 194, 194-208, 15 pgs.
*AO Kaspersky Lab* v. *Webroot Inc.*, PTAB Case No. IPR2023-00895, Exhibit 1023: Wei Li, Lap-chung Lam, and Tzi-cker Chiueh, How to Automatically and Accurately Sandbox Microsoft IIS, 22nd Ann. Comp. Sec. Applications Conf., 213, 213-222 (2006), 10 pgs.
*AO Kaspersky Lab* v. *Webroot Inc.*, PTAB Case No. IPR2023-00895, Exhibit 1024: Kevin A. Roundy and Barton P. Miller, Hybrid Analysis and Control of Malware, Recent Advances In Intrusion Detection: 13th Int'l Symp., 317, 317-338 (2010), 23 pgs.
*AO Kaspersky Lab* v. *Webroot Inc.*, PTAB Case No. IPR2023-00895, Exhibit 1025: Toshiyuki Maeda, 2002, Safe Execution of User Programs in Kernel Mode Using Typed Assembly Language, (Master's Thesis, University of Tokyo, 2002), 44 pgs.
*AO Kaspersky Lab* v. *Webroot Inc.*, PTAB Case No. IPR2023-00895, Exhibit 1026: Alex Skaletsky, Tevi Devor, Nadav Chachmon, Robert Cohn, Kim Hazelwood, Vladimirov, Moshe Bach, Dynamic Program Analysis of Microsoft Windows Applications, IEEE Int'l Symp. Performance Analysis Sys. Software, 2, 2-12 (2010), 11 pgs.
*AO Kaspersky Lab* v. *Webroot Inc.*, PTAB Case No. IPR2023-00895, Exhibit 1027: Tarjei Mandt, T., Locking Down the Windows Kernel: Mitigating Null Pointer Exploitation, Norman Threat Research, 13 pgs.
*AO Kaspersky Lab* v. *Webroot Inc.*, PTAB Case No. IPR2023-00895, Exhibit 1028: Xiangyu Dong, Cong Xu, Yuan Xie, Norman P. Jouppi, N.P., NVSim: A Circuit-Level Performance, Energy, and

(56) References Cited

OTHER PUBLICATIONS

Area Model for Emerging Nonvolatile Memory, 31 IEEE Transactions Computer-Aided Design Of Integrated Circuits Sys., 994, 994-1007 (2012), 14 pgs.
*AO Kaspersky Lab* v. *Webroot Inc.*, PTAB Case No. IPR2023-00895, Exhibit 1029: Father, H., Hooking Windows API-Technics of hooking API functions on Windows, 2 Assembly Programming J., 2, 2-30 (2004), 30 pgs.
*AO Kaspersky Lab* v. *Webroot Inc.*, PTAB Case No. IPR2023-00895, Exhibit 1030: J. Berdajs and Z. Bosnić, Extending Applications Using an Advanced Approach to DLL Injection and API Hooking, 40 Software: Practice Experience, 567, 567-584 (2010), 18 pgs.
*AO Kaspersky Lab* v. *Webroot Inc.*, PTAB Case No. IPR2023-00895, Exhibit 1031: Ulrich Bayer, Christopher Kruegel, and Engin Kirda, TTAnalyze: A Tool for Analyzing Malware, Ikarus Software Tech. Univ. Vienna, 180, 180-192 (2006), 12 pgs.
*AO Kaspersky Lab* v. *Webroot Inc.*, PTAB Case No. IPR2023-00895, Patent Owner Open Text Inc.'s Mandatory Notices Pursuant to 37 CFR § 42.8(b), May 19, 2023, 8 pgs.
*AO Kaspersky Lab* v. *Webroot Inc.*, PTAB Case No. IPR2023-00895, Notice of Filing Date Accorded to Petition and Time for Filing Patent Owner Preliminary Response, Jun. 9, 2023, 6 pgs.
*Crowdstrike, Inc.* v. *Webroot Inc.*, PTAB Case No. IPR2023-00124, Petition for Inter Partes Review of U.S. Pat. No. 9,578,045, 86 pgs.
*Crowdstrike, Inc.* v. *Webroot Inc.*, PTAB Case No. IPR2023-00124, Exhibit 1001: U.S. Pat. No. 9,578,045 to Jaroch et al., 30 pgs.
*Crowdstrike, Inc.* v. *Webroot Inc.*, PTAB Case No. IPR2023-00124, Exhibit 1002: File History of U.S. Pat. No. 9,578,045, 210 pgs.
*Crowdstrike, Inc.* v. *Webroot Inc.*, PTAB Case No. IPR2023-00124, Exhibit 1003: Declaration of Dr. Wenke Lee, 202 pgs.
*Crowdstrike, Inc.* v. *Webroot Inc.*, PTAB Case No. IPR2023-00124, Exhibit 1004: U.S. Publication No. 2013/0298244 to Kumar et al., 52 pgs.
*Crowdstrike, Inc.* v. *Webroot Inc.*, PTAB Case No. IPR2023-00124, Exhibit 1005: U.S. Publication No. 2007/0016953 to Morris et al., 18 pgs.
*Crowdstrike, Inc.* v. *Webroot Inc.*, PTAB Case No. IPR2023-00124, Exhibit 1006: U.S. Pat. No. 8,087,087 to Van Oorschot et al., 19 pgs.
*Crowdstrike, Inc.* v. *Webroot Inc.*, PTAB Case No. IPR2023-00124, Exhibit 1007: U.S. Patent Pub. No. 2010/0077481 to Polyakov et al., 11 pgs.
*Crowdstrike, Inc.* v. *Webroot Inc.*, PTAB Case No. IPR2023-00124, Exhibit 1008: U.S. Publication No. 2011/0321166 to Capalik et al., 29 pgs.
*Crowdstrike, Inc.* v. *Webroot Inc.*, PTAB Case No. IPR2023-00124, Exhibit 1009: U.S. Publication No. 2012/0260340, 30 pgs.
*Crowdstrike, Inc.* v. *Webroot Inc.*, PTAB Case No. IPR2023-00124, Exhibit 1010: U.S. Pat. No. 10,257,224, 31 pgs.
*Crowdstrike, Inc.* v. *Webroot Inc.*, PTAB Case No. IPR2023-00124, Exhibit 1011: Scheduling Order (Dkt. 50), Sep. 28, 2022, 18 pgs.
*Crowdstrike, Inc.* v. *Webroot Inc.*, PTAB Case No. IPR2023-00124, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1, Apr. 2009, 12 pgs.
*Crowdstrike, Inc.* v. *Webroot Inc.*, PTAB Case No. IPR2023-00124, Exhibit 1013: SANS Institute, Host- vs. Network-Based Intrusion Detection Systems (2000-2005), 11 pgs.
*Crowdstrike, Inc.* v. *Webroot Inc.*, PTAB Case No. IPR2023-00124, Exhibit 1014: Securosis LLC, Evolving Endpoint Malware Detection: Dealing with Advanced and Targeted Attacks, Version 1.3 (Jul. 12, 2012), 23 pgs.
*Crowdstrike, Inc.* v. *Webroot Inc.*, PTAB Case No. IPR2023-00124, Exhibit 1015: Yanfang Ye, Weiwei Zhuang, Tao Li, Egemen Tas, Umesh Gupta, Shenghuo Zhu, Melih Abdulhayoglu, Combining File Content and File Relations for Cloud Based Malware Detection, Aug. 2011, 9 pgs.
*Crowdstrike, Inc.* v. *Webroot Inc.*, PTAB Case No. IPR2023-00124, Exhibit 1016: U.S. Pat. No. 6,944,772 to Dozortsev, 10 pgs.
*Crowdstrike, Inc.* v. *Webroot Inc.*, PTAB Case No. IPR2023-00124, Exhibit 1017: U.S. Pat. No. 6,772,346 to Chess et al., 14 pgs.
*Crowdstrike, Inc.* v. *Webroot Inc.*, PTAB Case No. IPR2023-00124, Exhibit 1018: WO 2002/033525 to Shyne-Song Chuang, 18 pgs.
*Crowdstrike, Inc.* v. *Webroot Inc.*, PTAB Case No. IPR2023-00124, Exhibit 1019: EP 1,549,012 to Kristof De Spiegeleer, 19 pgs.
*Crowdstrike, Inc.* v. *Webroot Inc.*, PTAB Case No. IPR2023-00124, Exhibit 1020: EP 1,280,040 to Alexander James Hinchliffe et al., 17 pgs.
*Crowdstrike, Inc.* v. *Webroot Inc.*, PTAB Case No. IPR2023-00124, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.
*Crowdstrike, Inc.* v. *Webroot Inc.*, PTAB Case No. IPR2023-00124, Exhibit 1022: U.S. Patent Publication No. 2004/0143753 to Hernacki et al., 20 pgs.
*Crowdstrike, Inc.* v. *Webroot Inc.*, PTAB Case No. IPR2023-00124, Exhibit 1023: U.S. Patent Publication No. 2011/0083180 to Mashevsky et al., 16 pgs.
*Crowdstrike, Inc.* v. *Webroot Inc.*, PTAB Case No. IPR2023-00124, Exhibit 1024: U.S. Pat. No. 8,429,746 to Capalik, 11 pgs.
*Crowdstrike, Inc.* v. *Webroot Inc.*, PTAB Case No. IPR2023-00124, Exhibit 1025: Server Hardware, Software and Architecture by Abeer El Hadi El Zein El Nahas, University of Khartoum, Electrical and Electronics Engineering Dept., Feb. 2008, 152 pgs.
*Crowdstrike, Inc.* v. *Webroot Inc.*, PTAB Case No. IPR2023-00124, Exhibit 1026: Guofei Gu, Phillip Porras, Vinod Yegneswaran, Martin Fong, Wenke Lee, BotHunter: Detecting Malware Infection Through IDS-Driven Dialog Correlation, In Proceedings of The 16th USENIX Security Symposium, Aug. 2007, 16 pgs.
*Crowdstrike, Inc.* v. *Webroot Inc.*, PTAB Case No. IPR2023-00124, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference, Dec. 2011, 10 pgs.
*Crowdstrike, Inc.* v. *Webroot Inc.*, PTAB Case No. IPR2023-00124, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, Aug. 2010, 17 pgs.
*Crowdstrike, Inc.* v. *Webroot Inc.*, PTAB Case No. IPR2023-00124, Exhibit 1029: Long Lu, Vinod Yegneswaran, Phil Porras, and Wenke Lee, BLADE: An Attack-Agnostic Approach for Preventing Drive-By Malware Infections, In Proceedings of The 17th ACM Conference on Computer and Communications Security (CCS), Chicago, IL, Oct. 2010, 12 pgs.
*Crowdstrike, Inc.* v. *Webroot Inc.*, PTAB Case No. IPR2023-00124, Exhibit 1030: Plaintiffs' Markman Opposition Brief (Dkt. 98), Nov. 18, 2022, 86 pgs.
*Crowdstrike, Inc.* v. *Webroot Inc.*, PTAB Case No. IPR2023-00124, Exhibit 1031: Defendants' Markman Opening Brief (Dkt. 86), Oct. 28, 2022, 84 pgs.
*Crowdstrike, Inc.* v. *Webroot Inc.*, PTAB Case No. IPR2023-00124, Notice of Filing Date Accorded to Petition and Time for Filing Patent Owner Preliminary Response, Dec. 20, 2022, 6 pgs.
*Crowdstrike, Inc.* v. *Webroot Inc.*, PTAB Case No. IPR2023-00124, Patent Owner Open Text Inc.'s Mandatory Notices Pursuant to 37 CFR § 42.8(b), Dec. 21, 2022, 5 pgs.
*Crowdstrike, Inc.* v. *Webroot Inc.*, PTAB Case No. IPR2023-00124, Patent Owner's Preliminary Response, Mar. 20, 2023, 82 pgs.
*Crowdstrike, Inc.* v. *Webroot Inc.*, PTAB Case No. IPR2023-00124, Exhibit 2001: Declaration of Professor Nenad Medvidovic, Ph. D., 45 pgs.
*Crowdstrike, Inc.* v. *Webroot Inc.*, PTAB Case No. IPR2023-00124, Exhibit 2002: Curriculum Vitae of Professor Nenad Medvidovic, Ph. D., 71 pgs.
*Crowdstrike, Inc.* v. *Webroot Inc.*, PTAB Case No. IPR2023-00124, Exhibit 2003: *Webroot, Inc., and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.

(56) References Cited

OTHER PUBLICATIONS

*Crowdstrike, Inc.* v. *Webroot Inc.*, PTAB Case No. IPR2023-00124, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Crowdstrike, Inc.* v. *Webroot Inc.*, PTAB Case No. IPR2023-00124, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Crowdstrike, Inc.* v. *Webroot Inc.*, PTAB Case No. IPR2023-00124, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Crowdstrike, Inc.* v. *Webroot Inc.*, PTAB Case No. IPR2023-00124, Exhibit 2007: *Webroot, Inc., Open Text Inc.*, v. *AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.
*Crowdstrike, Inc.* v. *Webroot Inc.*, PTAB Case No. IPR2023-00124, Exhibit 2008: *Webroot, Inc. and Open Text Inc.*, v. *AO Kaspersky Lab et al.*, Case No. 6:22-cv-243-ADA-DTG, Claim Construction Order, Dkt. 236 (W.D. Tex. Mar. 16, 2023), 20 pgs.
*Crowdstrike, Inc.* v. *Webroot Inc.*, PTAB Case No. IPR2023-00124, Exhibit 2009: *Webroot, Inc. and Open Text Inc.*, v. *AO Kaspersky Lab et al.*, Case No. 6:22-cv-00243-ADA-DTG, Defendants' Opening Claim Construction Brief, Dkt. 86 (W.D. Tex., Oct. 28, 2022) (excerpted), 19 pgs.
*Crowdstrike, Inc.* v. *Webroot Inc.*, PTAB Case No. IPR2023-00124, Exhibit 2010: *Webroot, Inc. and Open Text Inc.*, v. *AO Kaspersky Lab et al.*, Case No. 6:22-cv-00243-ADA-DTG, Defendants' Reply Claim Construction Brief, Dkt. 110 (W.D. Tex., Dec. 6, 2022) (excerpted), 11 pgs.
*Crowdstrike, Inc.* v. *Webroot Inc.*, PTAB Case No. IPR2023-00124, Exhibit 2011: *Webroot, Inc. and Open Text Inc.*, v. *AO Kaspersky Lab et al.*, Case No. 6:22-cv-00243-ADA-DTG, Scheduling Order, Dkt. 50 (W.D. Tex., Sep. 28, 2022) (excerpted), 6 pgs.
*Crowdstrike, Inc.* v. *Webroot Inc.*, PTAB Case No. IPR2023-00124, Exhibit 2012: *Open Text Inc et al.*, v. *AO Kaspersky Lab*, Case No. 6:22-cv-00243- ADA-DTG, Defendant AO Kaspersky Lab's Preliminary Invalidity Contentions Exhibit 4A (W.D. Tex., Sep. 14, 2022) (excerpted), 1 pg.
*Crowdstrike, Inc.* v. *Webroot Inc.*, PTAB Case No. IPR2023-00124, Exhibit 2013: *Webroot, Inc. and Open Text Inc.*, v. *Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 8 pgs.
*Crowdstrike, Inc.* v. *Webroot Inc.*, PTAB Case No. IPR2023-00124, Exhibit 2014: *Webroot, Inc. and Open Text Inc.*, v. *Trend Micro Inc.*, Case No. 6:22-cv-00239-ADA-DTG, Defendant's Preliminary Invalidity Contentions (W.D. Tex., Sep. 13, 2022) (excerpted), 9 pgs.
*Crowdstrike, Inc.* v. *Webroot Inc.*, PTAB Case No. IPR2023-00124, Exhibit 2015: *Webroot, Inc. and Open Text Inc.*, v. *CrowdStrike, Inc. and CrowdStrike Holdings, Inc.*, Case No. 6:22-cv-00241-ADA, Complaint for Patent Infringement, Dkt. 1 (W.D. Tex., Mar. 4, 2022), 141 pgs.
*Crowdstrike, Inc.* v. *Webroot Inc.*, PTAB Case No. IPR2023-00124, Exhibit 2016: *Open Text Inc et al.*, v. *AO Kaspersky Lab*, Case No. 6:22-cv-00243-ADA-DTG, First Amended Complaint for Patent Infringement, Dkt. 80 (W.D. Tex., Oct. 27, 2022), 148 pgs.
*Crowdstrike, Inc.* v. *Webroot Inc.*, PTAB Case No. IPR2023-00124, Exhibit 2017: *Webroot, Inc. and Open Text Inc.*, v. *Trend Micro Inc.*, Case No. 6:22-cv- 00239-ADA-DTG, First Amended Complaint for Patent Infringement, Dkt. 53 (W.D. Tex., Sept. 7, 2022), 235 pgs.
*Crowdstrike, Inc.* v. *Webroot Inc.*, PTAB Case No. IPR2023-00124, Exhibit 2018: *Webroot, Inc. and Open Text Inc.*, v. *Sophos, Ltd.*, Case No. 6:22-cv-00240-ADA-DTG, Second Amended Complaint for Patent Infringement, Dkt. 76 (W.D. Tex., Oct. 24, 2022), 184 pgs.
*Crowdstrike, Inc.* v. *Webroot Inc.*, PTAB Case No. IPR2023-00124, Exhibit 2019: File History for Continuation Patent, U.S. Pat. No. 10,257,224, 472 pgs.
*Crowdstrike, Inc.* v. *Webroot Inc.*, PTAB Case No. IPR2023-00124, Exhibit 2020: U.S. Patent Application Publication No. 2008/0016570 to Capalik ("Capalik 570"), 14 pgs.
*Crowdstrike, Inc.* v. *Webroot Inc.*, PTAB Case No. IPR2023-00124, Exhibit 2021: *Webroot, Inc. and Open Text Inc.*, v. *AO Kaspersky Lab et al.*, Case No. 6:22-cv-243-ADA-DTG, March 9, Crowdstrike, Inc. v. Webroot Inc., PTAB Case No. IPR2023-00124, Exhibit 2022: Transcript of Motions Hearing, Dkt. 133 (W.D. Tex. Dec. 15, 2022) (excerpted), 7 pgs.
*Crowdstrike, Inc.* v. *Webroot Inc.*, PTAB Case No. IPR2023-00124, Exhibit 2022: U.S. Pat. No. 10,257,224 to Joseph Jaroch ("224 Patent"), 31 pgs.
*Crowdstrike, Inc.* v. *Webroot Inc.*, PTAB Case No. IPR2023-00124, Exhibit 2023: Joseph Jaroch LinkedIn, 1 pg.
*Crowdstrike, Inc.* v. *Webroot Inc.*, PTAB Case No. IPR2023-00124, Preliminary Reply to Patent Owner's Preliminary Response, Apr. 12, 2023, 10 pgs.
*Crowdstrike, Inc.* v. *Webroot Inc.*, PTAB Case No. IPR2023-00124, Exhibit 1032: EP File History, 233 pgs.
*Crowdstrike, Inc.* v. *Webroot Inc.*, PTAB Case No. IPR2023-00124, Patent Owner's Preliminary Sur-Reply to Petitioner's Preliminary Reply, Apr. 19, 2023, 13 pgs.
*Crowdstrike, Inc.* v. *Webroot Inc.*, PTAB Case No. IPR2023-00124, Patent Owner Open Text Inc.'s Updated Mandatory Notices Pursuant to 37 CFR § 42.8(b), May 25, 2023, 8 pgs.
*Trend Micro, Inc.* v. *Webroot Inc.*, PTAB Case No. IPR2023-00677, Petition for Inter Partes Review of U.S. Pat. No. 9,578,045, Mar. 6, 2023, 84 pgs.
*Trend Micro, Inc.* v. *Webroot Inc.*, PTAB Case No. IPR2023-00677, Exhibit 1001: U.S. Pat. No. 9,578,045 to Jaroch et al., 30 pgs.
*Trend Micro, Inc.* v. *Webroot Inc.*, PTAB Case No. IPR2023-00677, Exhibit 1002: Expert Declaration of Dr. Seth Nielson, 138 pgs.
*Trend Micro, Inc.* v. *Webroot Inc.*, PTAB Case No. IPR2023-00677, Exhibit 1003: CV of Seth Nielson, 15 pgs.
*Trend Micro, Inc.* v. *Webroot Inc.*, PTAB Case No. IPR2023-00677, Exhibit 1004: U.S. Pat. No. 7,352,280 to Rockwood, Troy, 24 pgs.
*Trend Micro, Inc.* v. *Webroot Inc.*, PTAB Case No. IPR2023-00677, Exhibit 1005: Xie, A Spatiotemporal Event Correlation Approach to Computer Security, 152 pgs.
*Trend Micro, Inc.* v. *Webroot Inc.*, PTAB Case No. IPR2023-00677, Exhibit 1006: Prosecution History of '045 Patent, 210 pgs.
*Trend Micro, Inc.* v. *Webroot Inc.*, PTAB Case No. IPR2023-00677, Exhibit 1007: Peterson, et al., "Computer networks: a systems approach," Morgan Kaufmann Publishers, Inc., 1996, 28 pgs.
*Trend Micro, Inc.* v. *Webroot Inc.*, PTAB Case No. IPR2023-00677, Exhibit 1008: Bangia, et al., "Operating Systems and Software Diagnostics" (2007), 3 pgs.
*Trend Micro, Inc.* v. *Webroot Inc.*, PTAB Case No. IPR2023-00677, Exhibit 1009: U.S. Published Patent Application No. 2013/0067576 to Niemela, 10 pgs.
*Trend Micro, Inc.* v. *Webroot Inc.*, PTAB Case No. IPR2023-00677, Exhibit 1010: Hutchins, et al., "Intelligence-Driven Computer Network Defense Informed by Analysis of Adversary Campaigns and Intrusion Kill Chains", The Proceedings of the 6th International Conference on Information Warfare and Security, Mar. 17-18, 2011, 15 pgs.
*Trend Micro, Inc.* v. *Webroot Inc.*, PTAB Case No. IPR2023-00677, Exhibit 1011: Cheswick, et al., "Firewalls and Internet Security Second Edition, Repelling the Wily Hacker", 2003, 4 pgs.
*Trend Micro, Inc.* v. *Webroot Inc.*, PTAB Case No. IPR2023-00677, Exhibit 1012: Anderson, "Network Attack and Defense", Security Engineering vol. 2, 2008, 51 pgs.
*Trend Micro, Inc.* v. *Webroot Inc.*, PTAB Case No. IPR2023-00677, Exhibit 1013: Wilding et al., Virus Bulletin, The Authoritative International Publication of Computer Virus Prevention Recognition and Removal, Jul. 1989, 16 pgs.

(56) References Cited

OTHER PUBLICATIONS

*Trend Micro, Inc. v. Webroot Inc.,* PTAB Case No. IPR2023-00677, Exhibit 1014: Lardinois, Google Acquires Online Virus Malware and URL Scanner VirusTotal, TechCrunch, Sep. 7, 2012, 6 pgs.
*Trend Micro, Inc. v. Webroot Inc.,* PTAB Case No. IPR2023-00677, Exhibit 1015: Lasser, "Special Focus Issue: Security", ;login: The Magazine of USENIX & Sage, 51-54, (Nov. 2001), 6 pgs.
*Trend Micro, Inc. v. Webroot Inc.,* PTAB Case No. IPR2023-00677, Patent Owner Open Text Inc.'s Mandatory Notices Pursuant to 37 CFR § 42.8(b), Mar. 27, 2023, 8 pgs.
*Trend Micro, Inc. v. Webroot Inc.,* PTAB Case No. IPR2023-00677, Notice of Filing Date Accorded to Petition and Time for Filing Patent Owner Preliminary Response, May 10, 2023, 6 pgs.
*Crowdstrike, Inc. v. Webroot Inc.,* PTAB Case No. IPR2023-00126, Petition for Inter Partes Review of U.S. Pat. No. 10,257,224, Oct. 31, 2022, 87 pgs.
*Crowdstrike, Inc. v. Webroot Inc.,* PTAB Case No. IPR2023-00126, Exhibit 1001: U.S. Pat. No. 10,257,224 to Jaroch et al., 31 pgs.
*Crowdstrike, Inc. v. Webroot Inc.,* PTAB Case No. IPR2023-00126, Exhibit 1002: File History of U.S. Pat. No. 10,257,224, 472 pgs.
*Crowdstrike, Inc. v. Webroot Inc.,* PTAB Case No. IPR2023-00126, Exhibit 1003: Declaration of Dr. Wenke Lee, 202 pgs.
*Crowdstrike, Inc. v. Webroot Inc.,* PTAB Case No. IPR2023-00126, Exhibit 1004: U.S. Publication No. 2013/0298244 to Kumar et al., 52 pgs.
*Crowdstrike, Inc. v. Webroot Inc.,* PTAB Case No. IPR2023-00126, Exhibit 1005: U.S. Publication No. 2007/0016953 to Morris et al. ("Morris"), 18 pgs.
*Crowdstrike, Inc. v. Webroot Inc.,* PTAB Case No. IPR2023-00126, Exhibit 1006: U.S. Pat. No. 8,087,087 to Van Oorschot et al., 19 pgs.
*Crowdstrike, Inc. v. Webroot Inc.,* PTAB Case No. IPR2023-00126, Exhibit 1007: U.S. Publication No. 2010/0077481 to Polyakov et al., 11 pgs.
*Crowdstrike, Inc. v. Webroot Inc.,* PTAB Case No. IPR2023-00126, Exhibit 1008: U.S. Publication No. 2011/0321166 to Capalik et al., 29 pgs.
*Crowdstrike, Inc. v. Webroot Inc.,* PTAB Case No. IPR2023-00126, Exhibit 1009: U.S. Publication No. 2012/0260340, 30 pgs.
*Crowdstrike, Inc. v. Webroot Inc.,* PTAB Case No. IPR2023-00126, Exhibit 1010: File History of U.S. Pat. No. 9,578,045 ("'045 Patent File History"), 210 pgs.
*Crowdstrike, Inc. v. Webroot Inc.,* PTAB Case No. IPR2023-00126, Exhibit 1011: Scheduling Order (Dkt. 50), 18 pgs.
*Crowdstrike, Inc. v. Webroot Inc.,* PTAB Case No. IPR2023-00126, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1 (Apr. 2009), 12 pgs.
*Crowdstrike, Inc. v. Webroot Inc.,* PTAB Case No. IPR2023-00126, Exhibit 1013: SANS Institute, Host- vs. Network-Based Intrusion Detection Systems (2000-2005), 11 pgs.
*Crowdstrike, Inc. v. Webroot Inc.,* PTAB Case No. IPR2023-00126, Exhibit 1014: Securosis LLC, Evolving Endpoint Malware Detection: Dealing with Advanced and Targeted Attacks, Version 1.3 (Jul. 12, 2012), 23 pgs.
*Crowdstrike, Inc. v. Webroot Inc.,* PTAB Case No. IPR2023-00126, Exhibit 1015: Yanfang Ye, Weiwei Zhuang, Tao Li, Egemen Tas, Umesh Gupta, Shenghuo Zhu, Melih Abdulhayogiu, Combining File Content and File Relations for Cloud Based Malware Detection (Aug. 2011), 9 pgs.
*Crowdstrike, Inc. v. Webroot Inc.,* PTAB Case No. IPR2023-00126, Exhibit 1016: U.S. Pat. No. 6,944,772 to Dozortsev, 10 pgs.
*Crowdstrike, Inc. v. Webroot Inc.,* PTAB Case No. IPR2023-00126, Exhibit 1017: U.S. Pat. No. 6,772,346 to Chess et al., 14 pgs.
*Crowdstrike, Inc. v. Webroot Inc.,* PTAB Case No. IPR2023-00126, Exhibit 1018: WO 2002/033525 to Shyne-Song Chuang, 18 pgs.
*Crowdstrike, Inc. v. Webroot Inc.,* PTAB Case No. IPR2023-00126, Exhibit 1019: EP 1,549,012 to Kristof De Spiegeleer, 19 pgs.

*Crowdstrike, Inc. v. Webroot Inc.,* PTAB Case No. IPR2023-00126, Exhibit 1020: EP 1,280,040 to Alexander James Hinchliffe et al., 17 pgs.
*Crowdstrike, Inc. v. Webroot Inc.,* PTAB Case No. IPR2023-00126, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.
*Crowdstrike, Inc. v. Webroot Inc.,* PTAB Case No. IPR2023-00126, Exhibit 1022: U.S. Patent Publication No. 2004/0143753 to Hernacki et al., 20 pgs.
*Crowdstrike, Inc. v. Webroot Inc.,* PTAB Case No. IPR2023-00126, Exhibit 1023: U.S. Patent Publication No. 2011/0083180 to Mashevsky et al., 16 pgs.
*Crowdstrike, Inc. v. Webroot Inc.,* PTAB Case No. IPR2023-00126, Exhibit 1024: U.S. Pat. No. 8,429,746 to Alen Capalik, 11 pgs.
*Crowdstrike, Inc. v. Webroot Inc.,* PTAB Case No. IPR2023-00126, Exhibit 1025: Server Hardware, Software and Architecture by Abeer El Hadi El Zein El Nahas, University of Khartoum, Electrical and Electronics Engineering Dept. (Feb. 2008), 152 pgs.
*Crowdstrike, Inc. v. Webroot Inc.,* PTAB Case No. IPR2023-00126, Exhibit 1026: Guofei Gu, Phillip Porras, Vinod Yegneswaran, Martin Fong, Wenke Lee, BotHunter: Detecting Malware Infection Through IDS-Driven Dialog Correlation, In Proceedings of The 16th USENIX Security Symposium (Aug. 2007), 16 pgs.
*Crowdstrike, Inc. v. Webroot Inc.,* PTAB Case No. IPR2023-00126, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference (Dec. 2011), 10 pgs.
*Crowdstrike, Inc. v. Webroot Inc.,* PTAB Case No. IPR2023-00126, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, (Aug. 2010), 17 pgs.
*Crowdstrike, Inc. v. Webroot Inc.,* PTAB Case No. IPR2023-00126, Exhibit 1029: Long Lu, Vinod Yegneswaran, Phil Porras, and Wenke Lee, BLADE: An Attack-Agnostic Approach for Preventing Drive-By Malware Infections, In Proceedings of The 17th ACM Conference on Computer and Communications Security (CCS), Chicago, IL (Oct. 2010), 12 pgs.
*Crowdstrike, Inc. v. Webroot Inc.,* PTAB Case No. IPR2023-00126, Exhibit 1030: U.S. Publication No. 2008/0016570 to Capalik, 14 pgs.
*Crowdstrike, Inc. v. Webroot Inc.,* PTAB Case No. IPR2023-00126, Notice of Filing Date Accorded to Petition and Time for Filing Patent Owner Preliminary Response, Nov. 9, 2022, 5 pgs.
*Crowdstrike, Inc. v. Webroot Inc.,* PTAB Case No. IPR2023-00126, Patent Owner Open Text Inc.'s Mandatory Notices Pursuant to 37 CFR § 42.8(b), Nov. 21, 2022, 5 pgs.
*Crowdstrike, Inc. v. Webroot Inc.,* PTAB Case No. IPR2023-00126, Patent Owner's Preliminary Response, Feb. 9, 2023, 67 pgs.
*Crowdstrike, Inc. v. Webroot Inc.,* PTAB Case No. IPR2023-00126, Exhibit 2001: Declaration of Professor Nenad Medvidovic, Ph.D, 45 pgs.
*Crowdstrike, Inc. v. Webroot Inc.,* PTAB Case No. IPR2023-00126, Exhibit 2002: Curriculum Vitae of Professor Nenad Medvidovic, Ph.D., 71 pgs.
*Crowdstrike, Inc. v. Webroot Inc.,* PTAB Case No. IPR2023-00126, Exhibit 2003: *Webroot, Inc. and Open Text Inc., v. CrowdStrike, Inc. and CrowdStrike Holdings, Inc.,* Case No. 6:22-cv-00241-ADA-DTG, First Amended Complaint for Patent Infringement, Dkt. 60 (W.D. Tex., Sept. 8, 2022) (excerpted), 37 pgs.
*Crowdstrike, Inc. v. Webroot Inc.,* PTAB Case No. IPR2023-00126, Exhibit 2004: *Sonrai Memory Ltd. v. Kingston Tech. Co. and Kingston Tech. Corp.,* Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Crowdstrike, Inc. v. Webroot Inc.,* PTAB Case No. IPR2023-00126, Exhibit 2005: *mCom IP, LLC v. Cisco Systems, Inc.,* Case No.

(56) References Cited

OTHER PUBLICATIONS

6:22-cv-00261-ADA, Order Denying Defendant's Motion to Stay Pending Inter Partes Review, Dkt. 42 (W.D. Tex., Oct. 20, 2022), 7 pgs.

*Crowdstrike, Inc. v. Webroot Inc.*, PTAB Case No. IPR2023-00126, Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.

*Crowdstrike, Inc. v. Webroot Inc.*, PTAB Case No. IPR2023-00126, Exhibit 2007: *Webroot, Inc., Open Text Inc., v. AO Kaspersky Lab et al.*, Case No. 6:22-cv-00243-ADA-DTG, Order Granting Third Amended Scheduling Order, Dkt. 142 (W.D. Tex., Dec. 27, 2022), 9 pgs.

*Crowdstrike, Inc. v. Webroot Inc.*, PTAB Case No. IPR2023-00126, Exhibit 2008: Standing Order Governing Proceedings (OGP) 4.2—Patent Cases (W.D. Tex., Sep. 16, 2022), available at chrome-extension://efaid-nbmnnnibpcajpcglclefindmkaj/https://www.txwd.uscourts.gov/wp-content/uploads/Standing%20Orders/Waco/Albright/Standing%20Order%20Governing%20Proceedings%20-%20Patent%20Cases%20091622.pdf (excerpted), 5 pgs.

*Crowdstrike, Inc. v. Webroot Inc.*, PTAB Case No. IPR2023-00126, Exhibit 2009: *Webroot, Inc. and Open Text Inc., v. AO Kaspersky Lab et al.*, Case No. 6:22-cv-00243-ADA-DTG, Defendants' Opening Claim Construction Brief, Dkt. 86 (W.D. Tex., Oct. 28, 2022) (excerpted), 19 pgs.

*Crowdstrike, Inc. v. Webroot Inc.*, PTAB Case No. IPR2023-00126, Exhibit 2010: *Webroot, Inc. and Open Text Inc., v. AO Kaspersky Lab et al.*, Case No. 6:22-cv-00243-ADA-DTG, Defendants' Reply Claim Construction Brief, Dkt. 110 (W.D. Tex., Dec. 6, 2022) (excerpted), 11 pgs.

*Crowdstrike, Inc. v. Webroot Inc.*, PTAB Case No. IPR2023-00126, Exhibit 2011: *Webroot, Inc. and Open Text Inc., v. AO Kaspersky Lab et al.*, Case No. 6:22-cv-00243-ADA-DTG, Scheduling Order, Dkt. 50 (W.D. Tex., Sep. 28, 2022) (excerpted), 6 pgs.

*Crowdstrike, Inc. v. Webroot Inc.*, PTAB Case No. IPR2023-00126, Exhibit 2012: *Open Text Inc et al., v. AO Kaspersky Lab*, Case No. 6:22-cv-00243-ADA-DTG, Defendant AO Kaspersky Lab's Preliminary Invalidity Contentions Exhibit 4A (W.D. Tex., Sep. 14, 2022) (excerpted), 1 pg.

*Crowdstrike, Inc. v. Webroot Inc.*, PTAB Case No. IPR2023-00126, Exhibit 2013: *Webroot, Inc. and Open Text Inc., v. Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 8 pgs.

*Crowdstrike, Inc. v. Webroot Inc.*, PTAB Case No. IPR2023-00126, Exhibit 2014: *Webroot, Inc. and Open Text Inc., v. Trend Micro Inc.*, Case No. 6:22-cv-00239-ADA-DTG, Defendant's Preliminary Invalidity Contentions (W.D. Tex., Sep. 13, 2022) (excerpted), 9 pgs.

*Crowdstrike, Inc. v. Webroot Inc.*, PTAB Case No. IPR2023-00126, Exhibit 2015: *Webroot, Inc. and Open Text Inc., v. CrowdStrike, Inc. and CrowdStrike Holdings, Inc..*, Case No. 6:22-cv-00241-ADA, Complaint for Patent Infringement, Dkt. 1 (W.D. Tex., Mar. 4, 2022), 141 pgs.

*Crowdstrike, Inc. v. Webroot Inc.*, PTAB Case No. IPR2023-00126, Exhibit 2016: *Open Text Inc et al., v. AO Kaspersky Lab*, Case No. 6:22-cv-00243-ADA-DTG, First Amended Complaint for Patent Infringement, Dkt. 80 (W.D. Tex., Oct. 27, 2022), 148 pgs.

*Crowdstrike, Inc. v. Webroot Inc.*, PTAB Case No. IPR2023-00126, Exhibit 2017: *Webroot, Inc. and Open Text Inc., v. Trend Micro Inc.*, Case No. 6:22-cv-00239-ADA-DTG, First Amended Complaint for Patent Infringement, Dkt. 53 (W.D. Tex., Sept. 7, 2022), 235 pgs.

*Crowdstrike, Inc. v. Webroot Inc.*, PTAB Case No. IPR2023-00126, Exhibit 2018: *Webroot, Inc. and Open Text Inc., v. Sophos, Ltd.*, Case No. 6:22-cv-00240-ADA-DTG, Second Amended Complaint for Patent Infringement, Dkt. 76 (W.D. Tex., Oct. 24, 2022), 184 pgs.

*Crowdstrike, Inc. v. Webroot Inc.*, PTAB Case No. IPR2023-00126, Preliminary Reply to Patent Owner's Preliminary Response, Mar. 9, 2023, 9 pgs.

*Crowdstrike, Inc. v. Webroot Inc.*, PTAB Case No. IPR2023-00126, Exhibit 1031: File History of EP14791882.5, 233 pgs.

*Crowdstrike, Inc. v. Webroot Inc.*, PTAB Case No. IPR2023-00126, Patent Owner's Preliminary Sur-Reply to Petitioner's Preliminary Reply, Mar. 16, 2023, 13 pgs.

*Crowdstrike, Inc. v. Webroot Inc.*, PTAB Case No. IPR2023-00126, Exhibit 2019: Excerpts from EX-1002 (File History of U.S. Pat. No. 10,257,224), 3 pgs.

*Crowdstrike, Inc. v. Webroot Inc.*, PTAB Case No. IPR2023-00126, Exhibit 2020: Joseph Jaroch LinkedIn, 1 pg.

*Crowdstrike, Inc. v. Webroot Inc.*, PTAB Case No. IPR2023-00126, Decision Granting Institution of Inter Partes Review, May 5, 2023, 43 pgs.

*Crowdstrike, Inc. v. Webroot Inc.*, PTAB Case No. IPR2023-00126, Scheduling Order, May 5, 2023, 12 pgs.

*Crowdstrike, Inc. v. Webroot Inc.*, PTAB Case No. IPR2023-00126, Patent Owner's Request for Rehearing, May 19, 2023, 19 pgs.

*Crowdstrike, Inc. v. Webroot Inc.*, PTAB Case No. IPR2023-00126, Patent Owner's Objections to Evidence Submitted by Petitioner, May 19, 2023, 6 pgs.

*Crowdstrike, Inc. v. Webroot Inc.*, PTAB Case No. IPR2023-00126, Exhibit 2021: Claim Construction Order, *Webroot, Inc., Open Text Inc. v. AO Kaspersky*, No. 6:22-cv-00243-ADA-DTG (lead case), May 19, 2023, 20 pgs.

*Crowdstrike, Inc. v. Webroot Inc.*, PTAB Case No. IPR2023-00126, Notification of Receipt of POP Request, May 24, 2023, 2 pgs.

*Crowdstrike, Inc. v. Webroot Inc.*, PTAB Case No. IPR2023-00126, Exhibit 3001: Request for POP, May 24, 2023, 20 pgs.

*Crowdstrike, Inc. v. Webroot Inc.*, PTAB Case No. IPR2023-00126, Patent Owner Open Text Inc.'s Updated Mandatory Notices Pursuant to 37 CFR § 42.8(b), May 25, 2023, 8 pgs.

*Crowdstrike, Inc. v. Webroot Inc.*, PTAB Case No. IPR2023-00126, Order denying POP, Jun. 8, 2023, 3 pgs.

*Trend Micro, Inc. v. Webroot Inc.*, PTAB Case No. IPR2023-00657, Petition for Inter Partes Review of U.S. Pat. No. 10,257,224, Mar. 3, 2023, 85 pgs.

*Trend Micro, Inc. v. Webroot Inc.*, PTAB Case No. IPR2023-00657, Exhibit 1001: U.S. Pat. No. 10,257,224 to Jaroch et al., 31 pgs.

*Trend Micro, Inc. v. Webroot Inc.*, PTAB Case No. IPR2023-00657, Exhibit 1002: Expert Declaration of Dr. Seth Nielson, 138 pgs.

*Trend Micro, Inc. v. Webroot Inc.*, PTAB Case No. IPR2023-00657, Exhibit 1003: Curriculum Vitae of Dr. Seth Nielson, 15 pgs.

*Trend Micro, Inc. v. Webroot Inc.*, PTAB Case No. IPR2023-00657, Exhibit 1004: U.S. Pat. No. 7,352,280 to Rockwood, 24 pgs.

*Trend Micro, Inc. v. Webroot Inc.*, PTAB Case No. IPR2023-00657, Exhibit 1005: Xie, A Spatiotemporal Event Correlation Approach to Computer Security, 148 pgs.

*Trend Micro, Inc. v. Webroot Inc.*, PTAB Case No. IPR2023-00657, Exhibit 1006: Prosecution History of '224 Patent, 472 pgs.

*Trend Micro, Inc. v. Webroot Inc.*, PTAB Case No. IPR2023-00657, Exhibit 1007: Declaration verifying Xie publication date, 4 pgs.

*Trend Micro, Inc. v. Webroot Inc.*, PTAB Case No. IPR2023-00657, Exhibit 1008: Peterson, et al., "Computer networks: a systems approach," Morgan Kaufmann Publishers, Inc., 1996, 28 pgs.

*Trend Micro, Inc. v. Webroot Inc.*, PTAB Case No. IPR2023-00657, Exhibit 1009: Bangia, et al., "Operating Systems and Software Diagnostics" (2007), 3 pgs.

*Trend Micro, Inc. v. Webroot Inc.*, PTAB Case No. IPR2023-00657, Exhibit 1010: U.S. Published Patent Application No. 2013/0067576 to Niemela, 10 pgs.

*Trend Micro, Inc. v. Webroot Inc.*, PTAB Case No. IPR2023-00657, Exhibit 1011: Hutchins, et al., "Intelligence-Driven Computer Network Defense Informed by Analysis of Adversary Campaigns and Intrusion Kill Chains", The Proceedings of the 6th Int'l Conf. on Information Warfare and Security, Mar. 17-18, 2011, 15 pgs.

*Trend Micro, Inc. v. Webroot Inc.*, PTAB Case No. IPR2023-00657, Exhibit 1012: Cheswick, et al., "Firewalls and Internet Security Second Edition, Repelling the Wily Hacker", 2003, 4 pgs.

(56) References Cited

OTHER PUBLICATIONS

*Trend Micro, Inc. v. Webroot Inc.*, PTAB Case No. IPR2023-00657, Exhibit 1013: Anderson, "Network Attack and Defense", Security Engineering, vol. 2, 2008, 51 pgs.
*Trend Micro, Inc. v. Webroot Inc.*, PTAB Case No. IPR2023-00657, Exhibit 1014: Wilding et al., Virus Bulletin, The Authoritative International Publication of Computer Virus Prevention Recognition and Removal, Jul. 1989, 16 pgs.
*Trend Micro, Inc. v. Webroot Inc.*, PTAB Case No. IPR2023-00657, Exhibit 1015: Lardinois, Google Acquires Online Virus Malware and URL Scanner VirusTotal, TechCrunch, Sep. 7, 2012, 6 pgs.
*Trend Micro, Inc. v. Webroot Inc.*, PTAB Case No. IPR2023-00657, Exhibit 1016: Lasser, "Special Focus Issue: Security", ;login: The Magazine of USENIX & Sage, 6 pgs.
*Trend Micro, Inc. v. Webroot Inc.*, PTAB Case No. IPR2023-00657, Patent Owner Open Text Inc.'s Mandatory Notices Pursuant to 37 CFR § 42.8(b), Mar. 24, 2023, 8 pgs.
*Trend Micro, Inc. v. Webroot Inc.*, PTAB Case No. IPR2023-00657, Notice of Filing Date Accorded to Petition and Time for Filing Patent Owner Preliminary Response, Apr. 17, 2023, 5 pgs.
*Sophos Ltd. and Sophos Inc. v. Webroot Inc.*, PTAB Case No. IPR2023-00731, Petition for Inter Partes Review of U.S. Pat. No. 8,201,243, Apr. 4, 2023, 86 pgs.
*Sophos Ltd. and Sophos Inc. v. Webroot Inc.*, PTAB Case No. IPR2023-00731, Exhibit 1001: U.S. Pat. No. 8,201,243 ("the '243 Patent"), 13 pgs.
*Sophos Ltd. and Sophos Inc. v. Webroot Inc.*, PTAB Case No. IPR2023-00731, Exhibit 1002: File History of the '243 Patent, 423 pgs.
*Sophos Ltd. and Sophos Inc. v. Webroot Inc.*, PTAB Case No. IPR2023-00731, Exhibit 1003: Declaration of Dr. Henry Houh, 113 pgs.
*Sophos Ltd. and Sophos Inc. v. Webroot Inc.*, PTAB Case No. IPR2023-00731, Exhibit 1004: Curriculum Vitae of Dr. Henry Houh, 12 pgs.
*Sophos Ltd. and Sophos Inc. v. Webroot Inc.*, PTAB Case No. IPR2023-00731, Exhibit 1005: Li, et al., UCLog: A Unified, Correlated Logging Architecture for Intrusion Detection Int'l Conf. on Telecomm. Sys.—Modelling & Analysis (2004) ("Li"), 15 pgs.
*Sophos Ltd. and Sophos Inc. v. Webroot Inc.*, PTAB Case No. IPR2023-00731, Exhibit 1006: U.S. Pat. No. 8,117,659 to Hartrell et al. ("Hartrell"), 16 pgs.
*Sophos Ltd. and Sophos Inc. v. Webroot Inc.*, PTAB Case No. IPR2023-00731, Exhibit 1007: Salvador Mandujano Vergara, A multiagent approach to outbound intrusion detection (2004) (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library) ("Mandujano"), 216 pgs.
*Sophos Ltd. and Sophos Inc. v. Webroot Inc.*, PTAB Case No. IPR2023-00731, Exhibit 1008: U.S. Pat. No. 7,174,566 to Yadav ("Yadav"), 17 pgs.
*Sophos Ltd. and Sophos Inc. v. Webroot Inc.*, PTAB Case No. IPR2023-00731, Exhibit 1009: Declaration of Dr. Sylvia D. Hall-Ellis, 30 pgs.
*Sophos Ltd. and Sophos Inc. v. Webroot Inc.*, PTAB Case No. IPR2023-00731, Exhibit 1010: Webroot Oct. 25, 2022 Infringement Contentions, 9 pgs.
*Sophos Ltd. and Sophos Inc. v. Webroot Inc.*, PTAB Case No. IPR2023-00731, Exhibit 1011: Jeff Crume, Inside Internet Security: What Hackers Don't Want You to Know (Pearson Educ. Ltd. 2000), 293 pgs.
*Sophos Ltd. and Sophos Inc. v. Webroot Inc.*, PTAB Case No. IPR2023-00731, Exhibit 1012: Information Sciences Institute, Univ. of S. Cal., Internet Protocol: DARPA Internet Program Protocol Specification (1981), 51 pgs.
*Sophos Ltd. and Sophos Inc. v. Webroot Inc.*, PTAB Case No. IPR2023-00731, Exhibit 1013: Stipulation Waiving IPR Claims in District Court Litigation, 4 pgs.
*Sophos Ltd. and Sophos Inc. v. Webroot Inc.*, PTAB Case No. IPR2023-00731, Exhibit 1014: Excerpt from Transcript of Motions Hearing in *Webroot, Inc., et al. v. AO Kaspersky Lab*, No. 6:22-cv-00243-ADA-DTG (W.D. Tex.) (Dec. 9, 2022), 7 pgs.
*Sophos Ltd. and Sophos Inc. v. Webroot Inc.*, PTAB Case No. IPR2023-00731, Exhibit 1015: Mandia, K & Prosise, C., Incident Response: Investigating Computer Crime, 23 pgs.
*Sophos Ltd. and Sophos Inc. v. Webroot Inc.*, PTAB Case No. IPR2023-00731, Patent Owner Open Text Inc.'s Mandatory Notices Pursuant to 37 CFR § 42.8(b), Apr. 25, 2023, 8 pgs.
*Sophos Ltd. and Sophos Inc. v. Webroot Inc.*, PTAB Case No. IPR2023-00731, Notice of Filing Date Accorded to Petition and Time for Filing Patent Owner Preliminary Response, May 10, 2023, 5 pgs.
*Sophos Ltd. and Sophos Inc. v. Webroot Inc.*, PTAB Case No. IPR2023-00732, Petition for Inter Partes Review of U.S. Pat. No. 8,719,932, Apr. 4, 2023, 86 pgs.
*Sophos Ltd. and Sophos Inc. v. Webroot Inc.*, PTAB Case No. IPR2023-00732, Exhibit 1001: U.S. Pat. No. 8,719,932 ("the '932 Patent"), 12 pgs.
*Sophos Ltd. and Sophos Inc. v. Webroot Inc.*, PTAB Case No. IPR2023-00732, Exhibit 1002: File History of the '932 Patent, 120 pgs.
*Sophos Ltd. and Sophos Inc. v. Webroot Inc.*, PTAB Case No. IPR2023-00732, Exhibit 1003: Declaration of Dr. Henry Houh, 111 pgs.
*Sophos Ltd. and Sophos Inc. v. Webroot Inc.*, PTAB Case No. IPR2023-00732, Exhibit 1004: Curriculum Vitae of Dr. Henry Houh, 12 pgs.
*Sophos Ltd. and Sophos Inc. v. Webroot Inc.*, PTAB Case No. IPR2023-00732, Exhibit 1005: Li, et al., UCLog: A Unified, Correlated Logging Architecture for Intrusion Detection Int'l Conf. on Telecomm. Sys.—Modelling & Analysis (2004) ("Li") 1, 15 pgs.
*Sophos Ltd. and Sophos Inc. v. Webroot Inc.*, PTAB Case No. IPR2023-00732, Exhibit 1006: U.S. Pat. No. 8,117,659 ("Hartrell"), 16 pgs.
*Sophos Ltd. and Sophos Inc. v. Webroot Inc.*, PTAB Case No. IPR2023-00732, Exhibit 1007: Salvador Mandujano Vergara, A multiagent approach to outbound intrusion detection (2004) (Ph.D. Thesis, Instituto Tecnológico y de Estudios Superires de Monterrey) (on file with Repositorio Institucional del Tecnológico de Monterrey (RITEC) in the Instituto Tecnológico y de Estudios Superiores de Monterrey Library) ("Mandujano"), 216 pgs.
*Sophos Ltd. and Sophos Inc. v. Webroot Inc.*, PTAB Case No. IPR2023-00732, Exhibit 1008: U.S. Pat. No. 7,174,566 to Yadav ("Yadav"), 17 pgs.
*Sophos Ltd. and Sophos Inc. v. Webroot Inc.*, PTAB Case No. IPR2023-00732, Exhibit 1009: Declaration of Dr. Sylvia D. Hall-Ellis, 30 pgs.
*Sophos Ltd. and Sophos Inc. v. Webroot Inc.*, PTAB Case No. IPR2023-00732, Exhibit 1010: Webroot Oct. 25, 2022 Infringement Contentions, 9 pgs.
*Sophos Ltd. and Sophos Inc. v. Webroot Inc.*, PTAB Case No. IPR2023-00732, Exhibit 1011: Jeff Crume, Inside Internet Security: What Hackers Don't Want You to Know, 293 pgs.
*Sophos Ltd. and Sophos Inc. v. Webroot Inc.*, PTAB Case No. IPR2023-00732, Exhibit 1012: DARPA, Internet Program Protocol Specification, 51 pgs.
*Sophos Ltd. and Sophos Inc. v. Webroot Inc.*, PTAB Case No. IPR2023-00732, Exhibit 1013: U.S. Pat. No. 8,201,243, 13 pgs.
*Sophos Ltd. and Sophos Inc. v. Webroot Inc.*, PTAB Case No. IPR2023-00732, Exhibit 1014: File History of U.S. Pat. No. 8,201,243, 423 pgs.
*Sophos Ltd. and Sophos Inc. v. Webroot Inc.*, PTAB Case No. IPR2023-00732, Exhibit 1015: Mandia, K & Prosise, C., Incident Response: Investigating Computer Crime, 23 pgs.
*Sophos Ltd. and Sophos Inc. v. Webroot Inc.*, PTAB Case No. IPR2023-00732, Exhibit 1016: Stipulation Waiving IPR Claims in District Court Litigation, 4 pgs.
*Sophos Ltd. and Sophos Inc. v. Webroot Inc.*, PTAB Case No. IPR2023-00732, Exhibit 1017: Excerpt from Transcript of Motions Hearing in *Webroot, Inc., et al. v. AO Kaspersky Lab*, No. 6:22-cv-00243-ADA-DTG (W.D. Tex.) (Dec. 9, 2022), 7 pgs.

(56) References Cited

OTHER PUBLICATIONS

*Sophos Ltd. and Sophos Inc.* v. *Webroot Inc.*, PTAB Case No. IPR2023-00732, Patent Owner Open Text Inc.'s Mandatory Notices Pursuant to 37 CFR § 42.8(b), Apr. 25, 2023, 8 pgs.
*Sophos Ltd. and Sophos Inc.* v. *Webroot Inc.*, PTAB Case No. IPR2023-00732, Notice of Filing Date Accorded to Petition and Time for Filing Patent Owner Preliminary Response, May 10, 2023, 5 pgs.
*AO Kaspersky Lab* v. *Webroot, Inc.*, PTAB Case No. IPR2023-01011, Petition for Inter Partes Review of U.S. Pat. No. 10,257,224, Jun. 2, 2023, 91 pgs.
*AO Kaspersky Lab* v. *Webroot, Inc.*, PTAB Case No. IPR2023-01011, Exhibit 1001: U.S. Pat. No. 10,257,224 to Jaroch et al., 31 pgs.
*AO Kaspersky Lab* v. *Webroot, Inc.*, PTAB Case No. IPR2023-01011, Exhibit 1002: File History of U.S. Pat. No. 10,257,224, 472 pgs.
*AO Kaspersky Lab* v. *Webroot, Inc.*, PTAB Case No. IPR2023-01011, Exhibit 1003: Declaration of Dr. Wenke Lee, 202 pgs.
*AO Kaspersky Lab* v. *Webroot, Inc.*, PTAB Case No. IPR2023-01011, Exhibit 1004: U.S. Publication No. 2013/0298244 to Kumar et al., 52 pgs.
*AO Kaspersky Lab* v. *Webroot, Inc.*, PTAB Case No. IPR2023-01011, Exhibit 1005: U.S. Publication No. 2007/0016953 to Morris et al. ("Morris"), 18 pgs.
*AO Kaspersky Lab* v. *Webroot, Inc.*, PTAB Case No. IPR2023-01011, Exhibit 1006: U.S. Pat. No. 8,087,087 to Van Oorschot et al. ("Van Oorschot"), 19 pgs.
*AO Kaspersky Lab* v. *Webroot, Inc.*, PTAB Case No. IPR2023-01011, Exhibit 1007: U.S. Publication No. 2010/0077481 to Polyakov et al., 11 pgs.
*AO Kaspersky Lab* v. *Webroot, Inc.*, PTAB Case No. IPR2023-01011, Exhibit 1008: U.S. Publication No. 2011/0321166 to Capalik et al. ("Capalik"), 29 pgs.
*AO Kaspersky Lab* v. *Webroot, Inc.*, PTAB Case No. IPR2023-01011, Exhibit 1009: U.S. Publication No. 2012/0260340, 30 pgs.
*AO Kaspersky Lab* v. *Webroot, Inc.*, PTAB Case No. IPR2023-01011, Exhibit 1010: File History of U.S. Pat. No. 9,578,045 ("'045 Patent File History"), 210 pgs.
*AO Kaspersky Lab* v. *Webroot, Inc.*, PTAB Case No. IPR2023-01011, Exhibit 1011: Scheduling Order (Dkt. 50), Sep. 28, 2022, 18 pgs.
*AO Kaspersky Lab* v. *Webroot, Inc.*, PTAB Case No. IPR2023-01011, Exhibit 1012: Natarajan Meghanathan, Sumanth Reddy Allam, and Loretta A. Moore, Tools and Techniques for Network Forensics, International Journal of Network Security & Its Applications (IJNSA), vol. 1., No. 1 (Apr. 2009), 12 pgs.
*AO Kaspersky Lab* v. *Webroot, Inc.*, PTAB Case No. IPR2023-01011, Exhibit 1013: SANS Institute, Host- vs. Network-Based Intrusion Detection Systems (2000-2005), 11 pgs.
*AO Kaspersky Lab* v. *Webroot, Inc.*, PTAB Case No. IPR2023-01011, Exhibit 1014: Securosis LLC, Evolving Endpoint Malware Detection: Dealing with Advanced and Targeted Attacks, Version 1.3 (Jul. 12, 2012), 23 pgs.
*AO Kaspersky Lab* v. *Webroot, Inc.*, PTAB Case No. IPR2023-01011, Exhibit 1015: Yanfang Ye, Weiwei Zhuang, Tao Li, Egemen Tas, Umesh Gupta, Shenghuo Zhu, Melih Abdulhayogiu, Combining File Content and File Relations for Cloud Based Malware Detection, Aug. 2011, 9 pgs.
*AO Kaspersky Lab* v. *Webroot, Inc.*, PTAB Case No. IPR2023-01011, Exhibit 1016: U.S. Pat. No. 6,944,772 to Dozortsev, 10 pgs.
*AO Kaspersky Lab* v. *Webroot, Inc.*, PTAB Case No. IPR2023-01011, Exhibit 1017: U.S. Pat. No. 6,772,346 to Chess et al., 14 pgs.
*AO Kaspersky Lab* v. *Webroot, Inc.*, PTAB Case No. IPR2023-01011, Exhibit 1018: WO 2002/033525 to Shyne-Song Chuang, 18 pgs.
*AO Kaspersky Lab* v. *Webroot, Inc.*, PTAB Case No. IPR2023-01011, Exhibit 1019: EP 1,549,012 to Kristof De Spiegeleer, 19 pgs.
*AO Kaspersky Lab* v. *Webroot, Inc.*, PTAB Case No. IPR2023-01011, Exhibit 1020: EP 1,280,040 to Alexander James Hinchliffe et al., 17 pgs.
*AO Kaspersky Lab* v. *Webroot, Inc.*, PTAB Case No. IPR2023-01011, Exhibit 1021: Oracle, Java Documentation, The Java Tutorials, What is a Path? (And Other File System Facts) (available at the following link https://docs.oracle.com/javase/tutorial/essential/io/path.html) (last accessed Oct. 2022), 3 pgs.
*AO Kaspersky Lab* v. *Webroot, Inc.*, PTAB Case No. IPR2023-01011, Exhibit 1022: U.S. Patent Publication No. 2004/0143753 to Hernacki et al., 20 pgs.
*AO Kaspersky Lab* v. *Webroot, Inc.*, PTAB Case No. IPR2023-01011, Exhibit 1023: U.S. Patent Publication No. 2011/0083180 to Mashevsky et al., 16 pgs.
*AO Kaspersky Lab* v. *Webroot, Inc.*, PTAB Case No. IPR2023-01011, Exhibit 1024: U.S. Pat. No. 8,429,746 to Alen Capalik, 11 pgs.
*AO Kaspersky Lab* v. *Webroot, Inc.*, PTAB Case No. IPR2023-01011, Exhibit 1025: Server Hardware, Software and Architecture by Abeer El Hadi El Zein El Nahas, University of Khartoum, Electrical and Electronics Engineering Dept., Feb. 2008, 152 pgs.
*AO Kaspersky Lab* v. *Webroot, Inc.*, PTAB Case No. IPR2023-01011, Exhibit 1026: Guofei Gu, Phillip Porras, Vinod Yegneswaran, Martin Fong, Wenke Lee, BotHunter: Detecting Malware Infection Through IDS- Driven Dialog Correlation, In Proceedings of The 16th USENIX Security Symposium, Aug. 2007, 16 pgs.
*AO Kaspersky Lab* v. *Webroot, Inc.*, PTAB Case No. IPR2023-01011, Exhibit 1027: Yacin Nadji, Manos Antonakakis, Roberto Perdisci, and Wenke Lee, Understanding the Prevalence and Use of Alternative Plans in Malware with Network Games, In Proceedings of The 27th Annual Computer Security Applications Conference, Dec. 2011, 10 pgs.
*AO Kaspersky Lab* v. *Webroot, Inc.*, PTAB Case No. IPR2023-01011, Exhibit 1028: Manos Antonakakis, Roberto Perdisci, David Dagon, Wenke Lee, and Nick Feamster, Building a Dynamic Reputation System for DNS, In Proceedings of The 19th USENIX Security Symposium, Aug. 2010, 17 pgs.
*AO Kaspersky Lab* v. *Webroot, Inc.*, PTAB Case No. IPR2023-01011, Exhibit 1029: Long Lu, Vinod Yegneswaran, Phil Porras, and Wenke Lee, BLADE: An Attack-Agnostic Approach for Preventing Drive-By Malware Infections, In Proceedings of The 17th ACM Conference on Computer and Communications Security (CCS), Chicago, IL (Oct. 2010), 12 pgs.
*AO Kaspersky Lab* v. *Webroot, Inc.*, PTAB Case No. IPR2023-01011, Exhibit 1030: U.S. Publication No. 2008/0016570 to Capalik, 14 pgs.
*AO Kaspersky Lab* v. *Webroot, Inc.*, PTAB Case No. IPR2023-01011, Exhibit 1031: Declaration of V.S. Subrahmanian, Ph.D., 88 pgs.
*AO Kaspersky Lab* v. *Webroot, Inc.*, PTAB Case No. IPR2023-01011, Exhibit 1032: Order Granting Fifth Amended Scheduling Order, ECF No. 252, Mar. 29, 2023, 9 pgs.
*AO Kaspersky Lab* v. *Webroot, Inc.*, PTAB Case No. IPR2023-01011, Petitioner's Motion for Joinder under 35 U.S.C. § 315(c), 37 C.F.R. § 42.22, and § 42.122(b), Jun. 2, 2023, 18 pgs.
*AO Kaspersky Lab* v. *Webroot, Inc.*, PTAB Case No. IPR2023-01011, Notice of Filing Date Accorded to Petition and Time for Filing Patent Owner Preliminary Response, Jun. 9, 2023, 6 pgs.
*Forcepoint LLC* v. *Webroot Inc. and Open Text, Inc.*, PTAB Case No. IPR2023-00786, Petition for Inter Partes Review of U.S. Pat. No. 10,025,928, Mar. 31, 2023, 89 pgs.
*Forcepoint LLC* v. *Webroot Inc. and Open Text, Inc.*, PTAB Case No. IPR2023-00786, Exhibit 1001: U.S. Pat. No. 10,025,928 to Jaroch et al., 12 pgs.
*Forcepoint LLC* v. *Webroot Inc. and Open Text, Inc.*, PTAB Case No. IPR2023-00786, Exhibit 1002: Declaration of Dr. Michael T. Goodrich, 130 pgs.
*Forcepoint LLC* v. *Webroot Inc. and Open Text, Inc.*, PTAB Case No. IPR2023-00786, Exhibit 1003: Patent File History of U.S. Pat. No. 10,025,928, 402 pgs.
*Forcepoint LLC* v. *Webroot Inc. and Open Text, Inc.*, PTAB Case No. IPR2023-00786, Exhibit 1004: U.S. Patent Publication No. 2013/0007870 ("Devarajan"), 25 pgs.

(56) References Cited

OTHER PUBLICATIONS

*Forcepoint LLC* v. *Webroot Inc. and Open Text, Inc.*, PTAB Case No. IPR2023-00786, Exhibit 1005: U.S. Patent Publication No. 2009/0070873 ("McAfee"), 23 pgs.
*Forcepoint LLC* v. *Webroot Inc. and Open Text, Inc.*, PTAB Case No. IPR2023-00786, Exhibit 1006: Complaint, *Webroot, Inc et al.* v. *Forcepoint LLC*, No. 6:22-cv-342 (W.D. Tex.) (Mar. 31, 2022), 98 pgs.
*Forcepoint LLC* v. *Webroot Inc. and Open Text, Inc.*, PTAB Case No. IPR2023-00786, Exhibit 1007: Excerpt from Transcript of Motions Hearing in *Webroot, Inc., et al.* v. *AO Kaspersky Lab*, No. 6:22-cv-243 (W.D. Tex.) (Dec. 9, 2022), 6 pgs.
*Forcepoint LLC* v. *Webroot Inc. and Open Text, Inc.*, PTAB Case No. IPR2023-00786, Exhibit 1008: U.S. Pat. No. 9,654,495 ("Hubbard"), 45 pgs.
*Forcepoint LLC* v. *Webroot Inc. and Open Text, Inc.*, PTAB Case No. IPR2023-00786, Exhibit 1009: Curriculum Vitae of Dr. Michael T. Goodrich, 38 pgs.
*Forcepoint LLC* v. *Webroot Inc. and Open Text, Inc.*, PTAB Case No. IPR2023-00786, Exhibit 1010: LexMachina Summary of Cases filed by Webroot, Inc. in the Western District of Texas, 2 pgs.
*Forcepoint LLC* v. *Webroot Inc. and Open Text, Inc.*, PTAB Case No. IPR2023-00786, Patent Owner Open Text Inc.'s Mandatory Notices Pursuant to 37 CFR § 42.8(b), Apr. 21, 2023, 7 pgs.
*Forcepoint LLC* v. *Webroot Inc. and Open Text, Inc.*, PTAB Case No. IPR2023- 00786, Notice of Filing Date Accorded to Petition and Time for Filing Patent Owner Preliminary Response, May 17, 2023, 5 pgs.
*Forcepoint LLC* v. *Webroot Inc. and Open Text, Inc.*, PTAB Case No. IPR2023-00784, Petition for Inter Partes Review of U.S. Pat. No. 8,438,386 under 37 CFR § 42.101, Mar. 31, 2023, 87 pgs.
*Forcepoint LLC* v. *Webroot Inc. and Open Text, Inc.*, PTAB Case No. IPR2023-00784, Exhibit 1001: U.S. Pat. No. 8,438,386 to Hegli et al., 23 pgs.
*Forcepoint LLC* v. *Webroot Inc. and Open Text, Inc.*, PTAB Case No. IPR2023-00784, Exhibit 1002: Declaration of Dr. Michael T. Goodrich, 135 pgs.
*Forcepoint LLC* v. *Webroot Inc. and Open Text, Inc.*, PTAB Case No. IPR2023-00784, Exhibit 1003: Curriculum Vitae of Dr. Michael T. Goodrich, 38 pgs.
*Forcepoint LLC* v. *Webroot Inc. and Open Text, Inc.*, PTAB Case No. IPR2023-00784, Exhibit 1004: U.S. Pat. No. 9,654,495 to Hubbard et al., 45 pgs.
*Forcepoint LLC* v. *Webroot Inc. and Open Text, Inc.*, PTAB Case No. IPR2023-00784, Exhibit 1005: U.S. Pat. No. 8,015,174 to Hubbard, 32 pgs.
*Forcepoint LLC* v. *Webroot Inc. and Open Text, Inc.*, PTAB Case No. IPR2023-00784, Exhibit 1006: U.S. Patent Publication No. 2008/0175266 to Alperovitch et al., 30 pgs.
*Forcepoint LLC* v. *Webroot Inc. and Open Text, Inc.*, PTAB Case No. IPR2023-00784, Exhibit 1007: Complaint, *Webroot, Inc et al.* v. *Forcepoint LLC*, No. 6:22- CV-342 (W.D. Tex.) (Mar. 31, 2022), 98 pgs.
*Forcepoint LLC* v. *Webroot Inc. and Open Text, Inc.*, PTAB Case No. IPR2023-00784, Exhibit 1008: Excerpt from Transcript of Motions Hearing in *Webroot, Inc., et al.* v. *AO Kaspersky Lab*, No. 6:22-cv-243 (W.D. Tex.) (Dec. 9, 2022), 6 pgs.
*Forcepoint LLC* v. *Webroot Inc. and Open Text, Inc.*, PTAB Case No. IPR2023-00784, Exhibit 1009: Patent File History of U.S. Pat. No. 8,438,386, 197 pgs.
*Forcepoint LLC* v. *Webroot Inc. and Open Text, Inc.*, PTAB Case No. IPR2023-00784, Exhibit 1010: LexMachina Summary of Cases filed by Webroot, Inc. in the Western District of Texas, 2 pgs.
*Forcepoint LLC* v. *Webroot Inc. and Open Text, Inc.*, PTAB Case No. IPR2023-00784, Exhibit 1011: Periakaruppan, Ram & Nemeth, Evi, "GTrace-A Graphical Traceroute Tool," USENIX (1999), 11 pgs.
*Forcepoint LLC* v. *Webroot Inc. and Open Text, Inc.*, PTAB Case No. IPR2023-00784, Exhibit 1012: Microsoft Computer Dictionary (5th ed., 2002), 3 pgs.

*Forcepoint LLC* v. *Webroot Inc. and Open Text, Inc.*, PTAB Case No. IPR2023-00784, Exhibit 1013: U.S. Patent Publication No. 2008/0082662 to Dandliker et al., 24 pgs.
*Forcepoint LLC* v. *Webroot Inc. and Open Text, Inc.*, PTAB Case No. IPR2023-00784, Patent Owner Open Text Inc.'s Mandatory Notices Pursuant to 37 CFR § 42.8(b), Apr. 21, 2023, 7 pgs.
*Forcepoint LLC* v. *Webroot Inc. and Open Text, Inc.*, PTAB Case No. IPR2023-00784, Notice of Filing Date Accorded to Petition and Time for Filing Patent Owner Preliminary Response, May 17, 2023, 5 pgs.
*Sophos Ltd. and Sophos Inc.* v. *Webroot Inc.*, PTAB Case No. IPR2023-00528, Petition for Inter Partes Review of U.S. Pat. No. 10,599,844, Mar. 3, 2023, 86 pgs.
*Sophos Ltd. and Sophos Inc.* v. *Webroot Inc.*, PTAB Case No. IPR2023-00528, Exhibit 1001: U.S. Pat. No. 10,599,844, 15 pgs.
*Sophos Ltd. and Sophos Inc.* v. *Webroot Inc.*, PTAB Case No. IPR2023-00528, Exhibit 1002: File History for U.S. Pat. No. 10,599,844, 458 pgs.
*Sophos Ltd. and Sophos Inc.* v. *Webroot Inc.*, PTAB Case No. IPR2023-00528, Exhibit 1003: Defendant Sophos Ltd.'s Stipulation regarding Invalidity Contents for U.S. Pat. No. 10,599,844, 4 pgs.
*Sophos Ltd. and Sophos Inc.* v. *Webroot Inc.*, PTAB Case No. IPR2023-00528, Exhibit 1004: Declaration of Dr. Gene Tsudik, 122 pgs.
*Sophos Ltd. and Sophos Inc.* v. *Webroot Inc.*, PTAB Case No. IPR2023-00528, Exhibit 1005: U.S. Patent Appl. Pub. No. 20150213376 ("Ideses"), 19 pgs.
*Sophos Ltd. and Sophos Inc.* v. *Webroot Inc.*, PTAB Case No. IPR2023-00528, Exhibit 1006: Japanese Patent Appl. Pub. No. 2012027710A ("Mori") and Certified Translation Thereof, 27 pgs.
*Sophos Ltd. and Sophos Inc.* v. *Webroot Inc.*, PTAB Case No. IPR2023-00528, Exhibit 1007: Defendants' Opening Claim Construction Brief, D.I. 86, *Webroot Inc et al.* v. *AO Kaspersky Lab et al.*, No. 6:22-cv-00243 (W.D. Tex., Jan. 22, 2023), 84 pgs.
*Sophos Ltd. and Sophos Inc.* v. *Webroot Inc.*, PTAB Case No. IPR2023-00528, Exhibit 1008: Order granting Fourth Amended Scheduling Order, D.I. 160, *Webroot Inc et al.* v. *AO Kaspersky Lab et al.*, No. 6:22-cv-00243 (W.D. Tex. Jan. 22, 2023), 7 pgs.
*Sophos Ltd. and Sophos Inc.* v. *Webroot Inc.*, PTAB Case No. IPR2023-00528, Exhibit 1009: Wang, et al., *Detecting Unknown Malicious Executables Using Portable Executable Headers*, Fifth International Joint Conference on Inc, Ims, and IDC, 2009, pp. 278-284.
*Sophos Ltd. and Sophos Inc.* v. *Webroot Inc.*, PTAB Case No. IPR2023-00528, Exhibit 1010: Michael Sikorski & Andrew Honig, *Practical Malware Analysis*, 2012, 12 pgs.
*Sophos Ltd. and Sophos Inc.* v. *Webroot Inc.*, PTAB Case No. IPR2023-00528, Exhibit 1011: Murugiah Souppaya & Karen Scarfone, *Guide to Malware Incident Prevention and Handling for Desktops and Laptops*, NIST Spec. Pub. 800-83, Rev. 1, Jul. 2013, 47 pgs.
*Sophos Ltd. and Sophos Inc.* v. *Webroot Inc.*, PTAB Case No. IPR2023-00528, Exhibit 1012: Monnappa K A, Learning Malware Analysis, 2018, 9 pgs.
*Sophos Ltd. and Sophos Inc.* v. *Webroot Inc.*, PTAB Case No. IPR2023-00528, Exhibit 1013: V. Kecman, *Support Vector Machines— An Introduction*, StudFuzz 177, 1-47, 2005, 11 pgs.
*Sophos Ltd. and Sophos Inc.* v. *Webroot Inc.*, PTAB Case No. IPR2023-00528, Exhibit 1014: *Virus Bulletin* (Nov. 1990), 24 pgs.
*Sophos Ltd. and Sophos Inc.* v. *Webroot Inc.*, PTAB Case No. IPR2023-00528, Exhibit 1015: U.S. Pat. No. 8,709,924, 17 pgs.
*Sophos Ltd. and Sophos Inc.* v. *Webroot Inc.*, PTAB Case No. IPR2023-00528, Exhibit 1016: U.S. Pat. No. 9,465,940, 14 pgs.
*Sophos Ltd. and Sophos Inc.* v. *Webroot Inc.*, PTAB Case No. IPR2023-00528, Exhibit 1017: D. Devi & S. Nandi, *Detection of Packed Malware, in Proceedings of the First Int'l Conf. on Security of Internet of Things* (SecurIT '12), Association for Computing Machinery, New York, NY, USA 22-26, 2012, 1 pg.
*Sophos Ltd. and Sophos Inc.* v. *Webroot Inc.*, PTAB Case No. IPR2023-00528, Exhibit 1018: Excerpt from Transcript of Motions Hearing, *Webroot Inc et al.* v. *AO Kaspersky Lab et al.*, No. 6:22-cv-00243 (W.D. Tex.), Dec. 9, 2022, 3 pgs.

(56) References Cited

OTHER PUBLICATIONS

*Sophos Ltd. and Sophos Inc. v. Webroot Inc.,* PTAB Case No. IPR2023-00528, Patent Owner Open Text Inc.'s Mandatory Notices Pursuant to 37 CFR § 42.8(b), Mar. 24, 2023, 7 pgs.
*Sophos Ltd. and Sophos Inc. v. Webroot Inc.,* PTAB Case No. IPR2023-00528, Notice of Filing Date Accorded to Petition and Time for Filing Patent Owner Preliminary Response, Feb. 16, 2023, 6 pgs.
Patent Owner's Preliminary Response, *Sophos Ltd. and Sophos Inc. v. Webroot Inc.,* PTAB Case No. IPR2023-00528, May 16, 2023, 64 pgs.
Exhibit 2001: Declaration Of Sam Malek, Ph.D., *Sophos Ltd. and Sophos Inc. v. Webroot Inc.,* PTAB Case No. IPR2023-00528, May 16, 2023, 45 pgs.
Exhibit 2002: Curriculum Vitae of Sam Malek, Ph.D., *Sophos Ltd. and Sophos Inc. v. Webroot Inc.,* PTAB Case No. IPR2023-00528, May 16, 2023, 36 pgs.
Exhibit 2003: *Webroot, Inc., Open Text Inc., v. AO Kaspersky Lab et al.,* Case No. 6:22-cv-00243-ADA-DTG, Order Granting Third Amended Scheduling Order, Dkt. 142 (W.D. Tex., Dec. 27, 2022), *Sophos Ltd. and Sophos Inc. v. Webroot Inc.,* PTAB Case No. IPR2023-00528, May 16, 2023, 9 pgs.
Exhibit 2004: *Sonrai Memory Ltd. v. Kingston Tech. Co. and Kingston Tech. Corp.,* Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), *Sophos Ltd. and Sophos Inc. v. Webroot Inc.,* PTAB Case No. IPR2023-00528, May 16, 2023, 7 pgs.
Exhibit 2005: *mCom IP, LLC v. Cisco Systems, Inc.,* Case No. 6:22-cv-00261-ADA, Order Denying Defendant's Motion to Stay Pending Inter Partes Review, Dkt. 42 (W.D. Tex., Oct. 20, 2022), *Sophos Ltd. and Sophos Inc. v. Webroot Inc.,* PTAB Case No. IPR2023-00528, May 16, 2023, 7 pgs.
Exhibit 2006: *Intellectual Ventures I LLC et al. v. Hewlett Packard Enterprise Co.,* No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), *Sophos Ltd. and Sophos Inc. v. Webroot Inc.,* PTAB Case No. IPR2023-00528, May 16, 2023, 8 pgs.
Exhibit 2007: *Webroot, Inc. and Open Text Inc., v. AO Kaspersky Lab et al.,* Case No. 6:22-cv-243-ADA-DTG, Claim Construction Order, Dkt. 236 (W.D. Tex. Mar. 16, 2023), *Sophos Ltd. and Sophos Inc. v. Webroot Inc.,* PTAB Case No. IPR2023-00528, May 16, 2023, 20 pgs.
Exhibit 2008: Dani Kass, "Catching Up On Patent Litigation With Judge Albright" (Law360 Mar. 14, 2023); https://www.law360.com/pulse/articles/1582438/print?section=pulse/courts, *Sophos Ltd. and Sophos Inc. v. Webroot Inc.,* PTAB Case No. IPR2023-00528, May 16, 2023, 3 pgs.
Exhibit 2009: *Webroot, Inc., Open Text Inc., v. AO Kaspersky Lab et al.,* Case No. 6:22-cv-00243-ADA-DTG, Order Granting Third Amended Scheduling Order, Dkt. 142 (W.D. Tex., Dec. 27, 2022), *Sophos Ltd. and Sophos Inc. v. Webroot Inc.,* PTAB Case No. IPR2023-00528, May 16, 2023, 9 pgs.
Exhibit 2010: United States Courts, Statistics & Reports, Federal Court Management Statistics—Comparison Within Circuit—During the 12-Month Period Ending Jun. 30, 2022, "Comparison of Districts Within the First Circuit—12-Month Period Ending Jun. 30, 2022," at https://www.uscourts.gov/sites/default/files/fcms_na_distcomparison0630.2022_0.pdf, *Sophos Ltd. and Sophos Inc. v. Webroot Inc.,* PTAB Case No. IPR2023-00528, May 16, 2023, 11 pgs.
Exhibit 2011: *Webroot, Inc. and Open Text Inc., v. Sophos Ltd.,* Case No. 6:22-cv-00240-ADA, Complaint for Patent Infringement, Dkt. 1 (W.D. Tex., Mar. 4, 2022), *Sophos Ltd. and Sophos Inc. v. Webroot Inc.,* PTAB Case No. IPR2023-00528, May 16, 2023, 144 pgs.
Exhibit 2012: *Webroot, Inc. and Open Text Inc., v. ForcePoint LLC,* Case No. 6:22-cv-00342-ADA-DTG, Defendant ForcePoint LLC's Prelimi-nary Invalidity Contentions (W.D. Tex., Sep. 13, 2022) (excerpted), *Sophos Ltd. and Sophos Inc. v. Webroot Inc.,* PTAB Case No. IPR2023-00528, May 16, 2023, 149 pgs.
Exhibit 2013: *Webroot, Inc. and Open Text Inc., v. Sophos Ltd.,* Case No. 6:22-cv-00240-ADA-DTG, Defendant Sophos Ltd.'s Preliminary Invalidity Contentions (W.D. Tex., Sep. 13, 2022) (excerpted), *Sophos Ltd. and Sophos Inc. v. Webroot Inc.,* PTAB Case No. IPR2023-00528, May 16, 2023, 127 pgs.
Exhibit 2014: *Webroot, Inc. and Open Text Inc., v. Trend Micro Inc.,* Case No. 6:22-cv-00239-ADA-DTG, Defendant's Preliminary Invalidity Contentions (W.D. Tex., Sep. 13, 2022) (excerpted), *Sophos Ltd. and Sophos Inc. v. Webroot Inc.,* PTAB Case No. IPR2023-00528, May 16, 2023, 125 pgs.
Exhibit 2015: *Webroot, Inc. and Open Text Inc., v. AO Kaspersky Lab,* Case No. 6:22-cv-00243-ADA-DTG, Defendant's Preliminary Invalidity Contentions Appendix A (W.D. Tex., Sep. 14, 2022) (excerpted), *Sophos Ltd. and Sophos Inc. v. Webroot Inc.,* PTAB Case No. IPR2023-00528, May 16, 2023, 8 pgs.
Exhibit 2016: *Webroot, Inc. and Open Text Inc., v. CrowdStrike, Inc. and CrowdStrike Holdings, Inc.,* Case No. 6:22-cv-00241-ADA-DTG, Defendant's Preliminary Invalidity Contentions (W.D. Tex., Sep. 13, 2022) (excerpted), *Sophos Ltd. and Sophos Inc. v. Webroot Inc.,* PTAB Case No. IPR2023-00528, May 16, 2023, 62 pgs.
*Trend Micro, Inc. v. Webroot Inc.,* PTAB Case No. IPR2023-00662, Petition for Inter Partes Review of U.S. Pat. No. 10,599,844, Mar. 3, 2023, 85 pgs.
*Trend Micro, Inc. v. Webroot Inc.,* PTAB Case No. IPR2023-00662, Exhibit 1001, U.S. Pat. No. 10,599,844 to Schmidtler et al., 15 pgs.
*Trend Micro, Inc. v. Webroot Inc.,* PTAB Case No. IPR2023-00662, Exhibit 1002, Expert Declaration of Dr. Seth Nielson, 152 pgs.
*Trend Micro, Inc. v. Webroot Inc.,* PTAB Case No. IPR2023-00662, Exhibit 1003, Gil Tahan, et al., *Mal-ID: Automatic Malware Detection Using Common Segment Analysis and Meta-Features,* Journal of Machine Learning 13, 949-979, Apr. 13, 2012, 31 pgs.
*Trend Micro, Inc. v. Webroot Inc.,* PTAB Case No. IPR2023-00662, Exhibit 1004, Eitan Menahem, *Improving Malware Detection by Applying Multi-Inducer Ensemble,* Computational Statistics & Data Analysis, 53, 2009, 1483-1494, 12 pgs.
*Trend Micro, Inc. v. Webroot Inc.,* PTAB Case No. IPR2023-00662, Exhibit 1005, U.S. Published Patent Application No. 2009/0254992 ("Schultz"), 20 pgs.
*Trend Micro, Inc. v. Webroot Inc.,* PTAB Case No. IPR2023-00662, Exhibit 1006, *Curriculum Vitae* of Seth James Nielson, Ph.D., 15 pgs.
*Trend Micro, Inc. v. Webroot Inc.,* PTAB Case No. IPR2023-00662, Exhibit 1007, Prosecution history of U.S. Pat. No. 10,599,844, 456 pgs.
*Trend Micro, Inc. v. Webroot Inc.,* PTAB Case No. IPR2023-00662, Exhibit 1008, J. Zico Kolter, *Learning to Detect and Classify Malicious Executables in the Wild,* Journal of Machine Learning Research, 7, 2721-2744, Dec. 2006, 24 pgs.
*Trend Micro, Inc. v. Webroot Inc.,* PTAB Case No. IPR2023-00662, Exhibit 1009, Srinivas Mukkamala, *Intrusion detection using an ensemble of intelligent paradigms,* Journal of Network and Computer Applications, 28, 167-182, 2005, 15 pgs.
*Trend Micro, Inc. v. Webroot Inc.,* PTAB Case No. IPR2023-00662, Exhibit 1010, Stuart J. Russell, et al., Artificial Intelligence, A Modern Approach, Second Edition, Kernel Machines, ch. 20.6, Pearson Education, Inc., NJ, copyright 2003, 5 pgs.
*Trend Micro, Inc. v. Webroot Inc.,* PTAB Case No. IPR2023-00662, Exhibit 1011, Lars Buitinck, Giles Louppe, Mathieu Blondel, et al., "API design for machine learning software: Experiences from the scikit-learn project", Sep. 2013, 16 pgs.
*Trend Micro, Inc. v. Webroot Inc.,* PTAB Case No. IPR2023-00662, Exhibit 1012, Y. Ye, L. Chen, D. Wang, T. Li, Q. Jiang, and M. Zhao, SBMDS: an interpretable string based malware detection system using SVM ensemble with bagging, Journal in Computer Virology, 5:283-293, 11/26/208, 12 pgs.
*Trend Micro, Inc. v. Webroot Inc.,* PTAB Case No. IPR2023-00662, Exhibit 1013, O. Henchiri and N. Japkowicz, A Feature Selection and Evaluation Scheme for Computer Virus Detection, Proceedings of the Sixth Int'l Conference on Data Mining (ICDM' 06), pp. 891-895.

(56) References Cited

OTHER PUBLICATIONS

*Trend Micro, Inc.* v. *Webroot Inc.*, PTAB Case No. IPR2023-00662, Exhibit 1014, J. Dai, R. Guha, and J. Lee, Efficient Virus Detection Using Dynamic Instruction Sequences, Journal of Computers, vol. 4, No. 5, May 2009, pp. 405-414.
*Trend Micro, Inc.* v. *Webroot Inc.*, PTAB Case No. IPR2023-00662, Exhibit 1015, J. Z. Kolter, "Learning to Detect Malicious Executables in the Wild", Proceedings of the Tenth ACM SIGKDD Int'l Conf. on Knowledge Discovery and Data Mining, 2004, 9 pgs.
*Trend Micro, Inc.* v. *Webroot Inc.*, PTAB Case No. IPR2023-00662, Exhibit 1016, T. Joachims, Advances in Kernel Methods, Making Large-Scale SVM Learning Practical, MIT Press, 1999, pp. 169-184.
*Trend Micro, Inc.* v. *Webroot Inc.*, PTAB Case No. IPR2023-00662, Exhibit 1017, Y. Ye, Hierarchical Associative Classifier (HAC) for Malware Detection from the Large and Imbalanced Gray List, Journal of Intelligent Information Systems, 35:1-20, 2010, 21 pgs.
*Trend Micro, Inc.* v. *Webroot Inc.*, PTAB Case No. IPR2023-00662, Exhibit 1018, Y. Elovici, A. Shabtai, R. Moskovitch, G. Tahan, and C. Glezer, Applying Machine Learning Techniques for Detection of Malicious Code in Network Traffic, 2007: Advances in Artificial Intelligence, pp. 44-50, 8 pgs.
*Trend Micro, Inc.* v. *Webroot Inc.*, PTAB Case No. IPR2023-00662, Exhibit 1019, Declaration of Ingrid Hsieh-Yee, Ph.D., 98 pgs.
*Trend Micro, Inc.* v. *Webroot Inc.*, PTAB Case No. IPR2023-00662, Patent Owner Open Text Inc.'s Mandatory Notices Pursuant to 37 CFR § 42.8(b), Mar. 24, 2023, 8 pgs.
*Trend Micro, Inc.* v. *Webroot Inc.*, PTAB Case No. IPR2023-00662, Notice of Filing Date Accorded to Petition and Time for Filing Patent Owner Preliminary Response, Apr. 17, 2023, 5 pgs.
*Sophos Ltd. and Sophos Inc.* v. *Webroot Inc.*, PTAB Case No. PGR2023-00031, Petition for Post-Grant Review of U.S. Pat. No. 11,409,869, May 8, 2023, 119 pgs.
*Sophos Ltd. and Sophos Inc.* v. *Webroot Inc.*, PTAB Case No. PGR2023-00031, Exhibit 1001: U.S. Pat. No. 11,409,869 ("the '869 Patent"), 16 pgs.
*Sophos Ltd. and Sophos Inc.* v. *Webroot Inc.*, PTAB Case No. PGR2023-00031, Exhibit 1002: File History for U.S. Pat. No. 11,409,869, 347 pgs.
*Sophos Ltd. and Sophos Inc.* v. *Webroot Inc.*, PTAB Case No. PGR2023-00031, Exhibit 1003: File History for U.S. Pat. No. 10,599,844, 456 pgs.
*Sophos Ltd. and Sophos Inc.* v. *Webroot Inc.*, PTAB Case No. PGR2023-00031, Exhibit 1004: Declaration of Dr. Gene Tsudik, 192 pgs.
*Sophos Ltd. and Sophos Inc.* v. *Webroot Inc.*, PTAB Case No. PGR2023-00031, Exhibit 1005: U.S. Patent Appl. Pub. No. 2015/0213376 ("Ideses"), 19 pgs.
*Sophos Ltd. and Sophos Inc.* v. *Webroot Inc.*, PTAB Case No. PGR2023-00031, Exhibit 1006: Japanese Patent Appl. Pub. No. 2012027710A ("Mori") and Certified Translation Thereof, 27 pgs.
*Sophos Ltd. and Sophos Inc.* v. *Webroot Inc.*, PTAB Case No. PGR2023-00031, Exhibit 1007: Litigation Claim Construction Order (D.I. 236), 29 pgs.
*Sophos Ltd. and Sophos Inc.* v. *Webroot Inc.*, PTAB Case No. PGR2023-00031, Exhibit 1008: Litigation Opening Claim Construction Brief (D.I. 263), 69 pgs.
*Sophos Ltd. and Sophos Inc.* v. *Webroot Inc.*, PTAB Case No. PGR2023-00031, Exhibit 1009: Litigation Responsive Claim Construction Brief (D.I. 304), 70 pgs.
*Sophos Ltd. and Sophos Inc.* v. *Webroot Inc.*, PTAB Case No. PGR2023-00031, Exhibit 1010: Litigation Joint Stipulation Reserving Appellate Rights (D.I. 260), 9 pgs.
*Sophos Ltd. and Sophos Inc.* v. *Webroot Inc.*, PTAB Case No. PGR2023-00031, Exhibit 1011: Monnappa K A, Learning Malware Analysis (2018), 9 pgs.
*Sophos Ltd. and Sophos Inc.* v. *Webroot Inc.*, PTAB Case No. PGR2023-00031, Exhibit 1012: Michael Sikorski & Andrew Honig, Practical Malware Analysis (2012), 12 pgs.
*Sophos Ltd. and Sophos Inc.* v. *Webroot Inc.*, PTAB Case No. PGR2023-00031, Exhibit 1013: John C. Platt, Probabilistic Outputs for Support Vector Machines and Comparisons to Regularized Likelihood Methods, in Advances in Large Margin Classifiers (Alexander J. Smola et al., eds. 2000), 11 pgs.
*Sophos Ltd. and Sophos Inc.* v. *Webroot Inc.*, PTAB Case No. PGR2023-00031, Exhibit 1014: Wang et al., Detecting Unknown Malicious Executables Using Portable Executable Headers, Fifth International Joint Conference on INC, IMS and IDC, 278-84 (2009), 7 pgs.
*Sophos Ltd. and Sophos Inc.* v. *Webroot Inc.*, PTAB Case No. PGR2023-00031, Exhibit 1015: Virus Bulletin (Nov. 1990), 24 pgs.
*Sophos Ltd. and Sophos Inc.* v. *Webroot Inc.*, PTAB Case No. PGR2023-00031, Exhibit 1016: U.S. Pat. No. 8,709,924, 17 pgs.
*Sophos Ltd. and Sophos Inc.* v. *Webroot Inc.*, PTAB Case No. PGR2023-00031, Exhibit 1017: U.S. Pat. No. 9,465,940, 14 pgs.
*Sophos Ltd. and Sophos Inc.* v. *Webroot Inc.*, PTAB Case No. PGR2023-00031, Exhibit 1018: D. Devi & S. Nandi, Detection of Packed Malware, in Proceedings of the First International Conference on Security of Internet of Things (SecurIT '12), Association for Computing Machinery, New York, NY, USA, 22-26 (2012), 1 pg.
*Sophos Ltd. and Sophos Inc.* v. *Webroot Inc.*, PTAB Case No. PGR2023-00031, Exhibit 1019: Excerpt from Transcript of Motions Hearing, *Webroot Inc et al.* v. *AO Kaspersky Lab et al.*, No. 6:22-cv-00243 (W.D. Tex. Dec. 9, 2022), 3 pgs.
*Sophos Ltd. and Sophos Inc.* v. *Webroot Inc.*, PTAB Case No. PGR2023-00031, Exhibit 1020: Shabtai et al., Detection of malicious code by applying machine learning classifiers on static features: A state-of-the-art survey, Information Security Technical Report, 16-29 (2009), 14 pgs.
*Sophos Ltd. and Sophos Inc.* v. *Webroot Inc.*, PTAB Case No. PGR2023-00031, Exhibit 1021: U.S. Patent Appl. Pub. No. 2010/0293273, 14 pgs.
*Sophos Ltd. and Sophos Inc.* v. *Webroot Inc.*, PTAB Case No. PGR2023-00031, Exhibit 1022: U.S. Patent Appl. Pub. No. 2010/0082642, 14 pgs.
*Sophos Ltd. and Sophos Inc.* v. *Webroot Inc.*, PTAB Case No. PGR2023-00031, Exhibit 1023: Defendant Sophos Ltd.'s Stipulation Regarding Invalidity Contentions for U.S. Pat. No. 11,409,869, 4 pgs.
Patent Owner Open Text Inc.'s Mandatory Notices Pursuant to 37 CFR § 42.8(b), *Sophos Ltd. and Sophos Inc.* v. *Webroot Inc.*, PTAB Case No. PGR2023-00031, May 30, 2023, 9 pgs.
Notice of Filing Date Accorded to Petition and Time for Filing Patent Owner Preliminary Response, *Sophos Ltd. and Sophos Inc.* v. *Webroot Inc.*, PTAB Case No. PGR2023-00031, Jun. 6, 2023, 6 pgs.
*Crowdstrike, Inc.* v. *Webroot Inc.*, PTAB Case No. IPR2023-00289, Petition for Inter Partes Review of U.S. Pat. No. 8,418,250, Dec. 29, 2022, 75 pgs.
*Crowdstrike, Inc.* v. *Webroot Inc.*, PTAB Case No. IPR2023-00289, Exhibit 1001: U.S. Pat. No. 8,418,250 to Morris et al. ("'250 Patent"), 17 pgs.
*Crowdstrike, Inc.* v. *Webroot Inc.*, PTAB Case No. IPR2023-00289, Exhibit 1002: File History of U.S. Pat. No. 8,418,250 ("'250 File History"), 888 pgs.
*Crowdstrike, Inc.* v. *Webroot Inc.*, PTAB Case No. IPR2023-00289, Exhibit 1003: Declaration of Dr. Wenke Lee ("Decl."), 171 pgs.
*Crowdstrike, Inc.* v. *Webroot Inc.*, PTAB Case No. IPR2023-00289, Exhibit 1004: U.S. Patent Application Publication No. 2005/0210035 A1 ("Kester"), 42 pgs.
*Crowdstrike, Inc.* v. *Webroot Inc.*, PTAB Case No. IPR2023-00289, Exhibit 1005: U.S. Pat. No. 7,225,343 ("Honig"), 22 pgs.
*Crowdstrike, Inc.* v. *Webroot Inc.*, PTAB Case No. IPR2023-00289, Exhibit 1006: U.S. Pat. No. 7,594,272 ("Kennedy"), 10 pgs.
*Crowdstrike, Inc.* v. *Webroot Inc.*, PTAB Case No. IPR2023-00289, Exhibit 1007: Plaintiff's Opposition Markman Brief, 22-cv-00243 WDTX,, No. 98, Nov. 18, 2022, 86 pgs.
*Crowdstrike, Inc.* v. *Webroot Inc.*, PTAB Case No. IPR2023-00289, Exhibit 1010: Defendants' Opening Markman Brief, 22-cv-00243 WDTX,, No. 86, Oct. 28, 2022, 84 pgs.

(56) References Cited

OTHER PUBLICATIONS

*Crowdstrike, Inc.* v. *Webroot Inc.*, PTAB Case No. IPR2023-00289, Exhibit 1011: Intrusion Detection with Unlabeled Data Using Clustering by Leonid Portnoy, et al. ("Portnoy"), 25 pgs.
*Crowdstrike, Inc.* v. *Webroot Inc.*, PTAB Case No. IPR2023-00289, Exhibit 1012: U.S. Pat. No. 6,944,772 ("Dozortsev"), 10 pgs.
*Crowdstrike, Inc.* v. *Webroot Inc.*, PTAB Case No. IPR2023-00289, Exhibit 1013: U.S. Pat. No. 6,772,363 ("Chess"), 14 pgs.
*Crowdstrike, Inc.* v. *Webroot Inc.*, PTAB Case No. IPR2023-00289, Exhibit 1014: WO 2002/033525 ("Shyne-Song Chuang"), 18 pgs.
*Crowdstrike, Inc.* v. *Webroot Inc.*, PTAB Case No. IPR2023-00289, Exhibit 1015: EP 1,549,012 ("Kristof De Spiegeleer"), 19 pgs.
*Crowdstrike, Inc.* v. *Webroot Inc.*, PTAB Case No. IPR2023-00289, Exhibit 1016: EP 1,280,040 ("Alexander James Hinchliffe"), 17 pgs.
*Crowdstrike, Inc.* v. *Webroot Inc.*, PTAB Case No. IPR2023-00289, Exhibit 1017: U.S. Patent Publication No. 2004/0153644 ("McCorkendale"), 15 pgs.
*Crowdstrike, Inc.* v. *Webroot Inc.*, PTAB Case No. IPR2023-00289, Exhibit 1018: U.S. Pat. No. 7,516,476 ("Kraemer"), 13 pgs.
*Crowdstrike, Inc.* v. *Webroot Inc.*, PTAB Case No. IPR2023-00289, Exhibit 1019: Harold S. Javitz et al., The NIDES Statistical Component: Description and Justification, Mar. 7, 1994, 52 pgs.
*Crowdstrike, Inc.* v. *Webroot Inc.*, PTAB Case No. IPR2023-00289, Exhibit 1020: U.S. Pat. No. 7,448,084 ("Apap"), 17 pgs.
*Crowdstrike, Inc.* v. *Webroot Inc.*, PTAB Case No. IPR2023-00289, Exhibit 1021: Order Granting Third Amended Scheduling Order, 22-cv-00243, WDTX, No. 142 ("Third Amended Scheduling Order"), Dec. 27, 2022, 9 pgs.
*Crowdstrike, Inc.* v. *Webroot Inc.*, PTAB Case No. IPR2023-00289, Patent Owner's Preliminary Response, Dec. 29, 2022, 82 pgs.
*Crowdstrike, Inc.* v. *Webroot Inc.*, PTAB Case No. IPR2023-00289, Exhibit 2001: Declaration of Professor Nenad Medvidovic, Ph.D., 76 pgs.
*Crowdstrike, Inc.* v. *Webroot Inc.*, PTAB Case No. IPR2023-00289, Exhibit 2002: Curriculum Vitae of Professor Nenad Medvidovic, Ph.D., 71 pgs.
*Crowdstrike, Inc.* v. *Webroot Inc.*, PTAB Case No. IPR2023-00289, Exhibit 2003: *Webroot, Inc. and Open Text Inc.* v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), 37 pgs.
*Crowdstrike, Inc.* v. *Webroot Inc.*, PTAB Case No. IPR2023-00289, Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to Stay Pending Resolution of Inter Partes Review, Dkt. 94 (W.D. Tex., Oct. 18, 2022), 7 pgs.
*Crowdstrike, Inc.* v. *Webroot Inc.*, PTAB Case No. IPR2023-00289, Exhibit 2005: *mCom IP, LLC* v. *Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), 7 pgs.
*Crowdstrike, Inc.* v. *Webroot Inc.*, PTAB Case No. IPR2023-00289, Exhibit 2006: *Intellectual Ventures I LLC et al.* v. *Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), 8 pgs.
*Crowdstrike, Inc.* v. *Webroot Inc.*, PTAB Case No. IPR2023-00289, Exhibit 2007: *Webroot, Inc. and Open Text Inc.* v. *AO Kaspersky Lab et al.*, Case No. 6:22-cv-243-ADA-DTG, Dec. 9, 2022 Transcript of Motions Hearing, Dkt. 133 (W.D. Tex. Dec. 15, 2022) (excerpted), 7 pgs.
*Crowdstrike, Inc.* v. *Webroot Inc.*, PTAB Case No. IPR2023-00289, Exhibit 2008: Dani Kass, "Catching Up On Patent Litigation With Judge Albright" (Law360 Mar. 14, 2023) at https://www.law360.com/pulse/articles/1582438/print?sec- tion=pulse/courts, 3 pgs.
*Crowdstrike, Inc.* v. *Webroot Inc.*, PTAB Case No. IPR2023-00289, Exhibit 2009: *Webroot, Inc. and Open Text Inc.* v. *AO Kaspersky Lab et al.*, Case No. 6:22-cv-243-ADA-DTG, Order Granting Fourth Amended Scheduling Order, Dkt. 160 (W.D. Tex. Jan. 22, 2023), 7 pgs.
*Crowdstrike, Inc.* v. *Webroot Inc.*, PTAB Case No. IPR2023-00289, Exhibit 2010: *Webroot, Inc. and Open Text Inc.* v. *Sophos Ltd.*, Case No. 6:22-cv-00240-ADA-DTG, Minute Entry for proceedings held before Judge Derek T. Gilliland, Notice of Electronic Filing, Dkt. 102, (W.D. Tex., Mar. 7, 2023), 3 pgs.
*Crowdstrike, Inc.* v. *Webroot Inc.*, PTAB Case No. IPR2023-00289, Exhibit 2011: *Webroot, Inc. and Open Text Inc.* v. *AO Kaspersky Lab et al.*, Case No. 6:22-cv-243-ADA-DTG, Scheduling Order, Dkt. 39 (W.D. Tex. Aug. 17, 2022), 7 pgs.
*Crowdstrike, Inc.* v. *Webroot Inc.*, PTAB Case No. IPR2023-00289, Exhibit 2012: *Webroot, Inc. and Open Text Inc.* v. *AO Kaspersky Lab et al.*, Case No. 6:22-cv-243-ADA-DTG, Claim Construction Order, Dkt. 236 (W.D. Tex. Mar. 16, 2023), 20 pgs.
*Crowdstrike, Inc.* v. *Webroot Inc.*, PTAB Case No. IPR2023-00289, Exhibit 2013: *Webroot, Inc. and Open Text Inc.* v. *Sophos Ltd.*, Case No. 6:22-cv-00240-ADA-DTG, Defendant Sophos Ltd.'s Preliminary Invalidity Contentions (W.D. Tex., Sep. 13, 2022) (excerpted), 9 pgs.
*Crowdstrike, Inc.* v. *Webroot Inc.*, PTAB Case No. IPR2023-00289, Exhibit 2014: *Webroot, Inc. and Open Text Inc.* v. *Trend Micro, Inc.*, Case No. 6:22-cv-00239-ADA-DTG, Defendant's Preliminary Invalidity Contentions (W.D. Tex., Sep. 13, 2022) (excerpted), 27 pgs.
*Crowdstrike, Inc.* v. *Webroot Inc.*, PTAB Case No. IPR2023-00289, Exhibit 2015: Ex Parte James M. Brennan, et al., Appeal 2021-003606, U.S. Appl. No. 15/285,875, Decision On Appeal Statement of the Case (PTAB Jul. 26, 2022), 10 pgs.
*Crowdstrike, Inc.* v. *Webroot Inc.*, PTAB Case No. IPR2023-00289, Exhibit 2016: *Webroot, Inc. and Open Text Inc.* v. *CrowdStrike, Inc. and CrowdStrike Holdings, Inc.*, Case No. 6:22-cv-00241-ADA, Complaint for Patent Infringement, Dkt. 1 (W.D. Tex., Mar. 4, 2022), 141 pgs.
*Crowdstrike, Inc.* v. *Webroot Inc.*, PTAB Case No. IPR2023-00289, Exhibit 2017: *Webroot, Inc. and Open Text Inc.* v. *AO Kaspersky Lab et al.*, Case No. 6:22-cv-243-ADA-DTG, Plaintiffs' SurReply Claim Construction Brief, Dkt. 147 (W.D. Tex. Jan. 6, 2023) (excerpted), 21 pgs.
*Crowdstrike, Inc.* v. *Webroot Inc.*, PTAB Case No. IPR2023-00289, Patent Owner Open Text Inc.'s Mandatory Notices Pursuant to 37 CFR § 42.8(b), Jan. 19, 2023, 5 pgs.
*Crowdstrike, Inc.* v. *Webroot Inc.*, PTAB Case No. IPR2023-00289, Patent Owner Open Text Inc.'s Notice of Filing Date Accorded to Petition and Time for Filing Patent Owner Preliminary Response, Jan. 26, 2023, 6 pgs.
*Trend Micro, Inc.* v. *Webroot Inc.*, PTAB Case No. IPR2023-00655, Petition for Inter Partes Review of U.S. Pat. No. 8,418,250, Mar. 2, 2023, 90 pgs.
*Trend Micro, Inc.* v. *Webroot Inc.*, PTAB Case No. IPR2023-00655, Exhibit 1001: U.S. Pat. No. 8,418,250 (Morris), 17 pgs.
*Trend Micro, Inc.* v. *Webroot Inc.*, PTAB Case No. IPR2023-00655, Exhibit 1002: Expert Declaration of Dr. Seth Nielson, 156 pgs.
*Trend Micro, Inc.* v. *Webroot Inc.*, PTAB Case No. IPR2023-00655, Exhibit 1003: U.S. Published Patent Application No. 2004/0111632 (Halperin), 22 pgs.
*Trend Micro, Inc.* v. *Webroot Inc.*, PTAB Case No. IPR2023-00655, Exhibit 1004: U.S. Pat. No. 7,900,194 (Mankins), 12 pgs.
*Trend Micro, Inc.* v. *Webroot Inc.*, PTAB Case No. IPR2023-00655, Exhibit 1005: Inoue, et al., "Anomaly Intrusion Detection in Dynamic Execution Environments", New Security Paradigms Workshop '02, Sep. 23-26, 2002, 32 pgs.
*Trend Micro, Inc.* v. *Webroot Inc.*, PTAB Case No. IPR2023-00655, Exhibit 1006: U.S. Pat. No. 7,694,150 (Kirby), 22 pgs.
*Trend Micro, Inc.* v. *Webroot Inc.*, PTAB Case No. IPR2023-00655, Exhibit 1007: Prosecution History of the '250 patent, 888 pgs.
*Trend Micro, Inc.* v. *Webroot Inc.*, PTAB Case No. IPR2023-00655, Exhibit 1008: U.S. Pat. No. 5,440,723 (Arnold), 29 pgs.
*Trend Micro, Inc.* v. *Webroot Inc.*, PTAB Case No. IPR2023-00655, Exhibit 1009: Fred Cohen, "Computer Viruses Theory and Experiments", 1984, 15 pgs.

(56) References Cited

OTHER PUBLICATIONS

*Trend Micro, Inc. v. Webroot Inc.*, PTAB Case No. IPR2023-00655, Exhibit 1010: Joseph A. Bank, "Java Security", Dec. 8, 1995, 11 pgs.
*Trend Micro, Inc. v. Webroot Inc.*, PTAB Case No. IPR2023-00655, Exhibit 1011: Curriculum Vitae of A.L. Seth Nielson, Ph.D., 15 pgs.
*Trend Micro, Inc. v. Webroot Inc.*, PTAB Case No. IPR2023-00655, Exhibit 1012: U.S. Patent Publication 2003/0177394 (Dozortsev), 11 pgs.
*Trend Micro, Inc. v. Webroot Inc.*, PTAB Case No. IPR2023-00655, Exhibit 1013: U.S. Published Patent Application No. 2004/0068652 (Carpentier et al.), 19 pgs.
*Trend Micro, Inc. v. Webroot Inc.*, PTAB Case No. IPR2023-00655, Patent Owner Open Text Inc.'s Mandatory Notices Pursuant to 37 CFR § 42.8(b), Mar. 23, 2023, 7 pgs.
*Trend Micro, Inc. v. Webroot Inc.*, PTAB Case No. IPR2023-00655, Notice of Filing Date Accorded to Petition and Time for Filing Patent Owner Preliminary Response, Apr. 17, 2023, 5 pgs.
*Sophos Ltd. and Sophos Inc. v. Webroot Inc.*, PTAB Case No. IPR2023-00699, Petition for Inter Partes Review of U.S. Pat. No. 8,418,250, Mar. 8, 2023, 83 pgs.
*Sophos Ltd. and Sophos Inc. v. Webroot Inc.*, PTAB Case No. IPR2023-00699, Exhibit 1001: U.S. Pat. No. 8,418,250, 17 pgs.
*Sophos Ltd. and Sophos Inc. v. Webroot Inc.*, PTAB Case No. IPR2023-00699, Exhibit 1002: File History for U.S. Pat. No. 8,418,250, 888 pgs.
*Sophos Ltd. and Sophos Inc. v. Webroot Inc.*, PTAB Case No. IPR2023-00699, Exhibit 1003: Complaint, *Webroot Inc et al. v. Sophos Ltd.*, No. 6:22-cv-240 (W.D. Tex.), 144 pgs.
*Sophos Ltd. and Sophos Inc. v. Webroot Inc.*, PTAB Case No. IPR2023-00699, Exhibit 1004: Declaration of Dr. Richard Newman, 85 pgs.
*Sophos Ltd. and Sophos Inc. v. Webroot Inc.*, PTAB Case No. IPR2023-00699, Exhibit 1005: Curriculum Vitae of Dr. Richard Newman, 13 pgs.
*Sophos Ltd. and Sophos Inc. v. Webroot Inc.*, PTAB Case No. IPR2023-00699, Exhibit 1006: U.S. Patent Pub. No. 2004/0111632 ("Halperin"), 22 pgs.
*Sophos Ltd. and Sophos Inc. v. Webroot Inc.*, PTAB Case No. IPR2023-00699, Exhibit 1007: U.S. Pat. No. 7,694,150 ("Kirby"), 22 pgs.
*Sophos Ltd. and Sophos Inc. v. Webroot Inc.*, PTAB Case No. IPR2023-00699, Exhibit 1008: U.S. Pat. No. 7,900,194 ("Mankins"), 12 pgs.
*Sophos Ltd. and Sophos Inc. v. Webroot Inc.*, PTAB Case No. IPR2023-00699, Exhibit 1009: Stipulation Waiving IPR Claims in District Court Litigation, 4 pgs.
*Sophos Ltd. and Sophos Inc. v. Webroot Inc.*, PTAB Case No. IPR2023-00699, Exhibit 1010: S. Forrest et al., *Computer Immunology*, Comms. Of the ACM, vol. 40, No. 10, 88-96 (1997).
*Sophos Ltd. and Sophos Inc. v. Webroot Inc.*, PTAB Case No. IPR2023-00699, Exhibit 1011: A Snoeren et al., *Single-Packet IP Traceback*, IEEE/ACM Trans. On Networking (TON), vol. 10, No. 6, 721-34 (2002).
*Sophos Ltd. and Sophos Inc. v. Webroot Inc.*, PTAB Case No. IPR2023-00699, Exhibit 1012: S. Hofmeyr, *Intrusion Detection Using Sequences of System Calls*, J. Computer Security, vol. 6, Issue 3, 151-180 (Aug. 1998).
*Sophos Ltd. and Sophos Inc. v. Webroot Inc.*, PTAB Case No. IPR2023-00699, Exhibit 1013: S. Forrest et al., *A Sense of Self for Unix Processes*, Proc. 1996, IEEE Symp. on Security and Privacy, 120-28 (1996).
*Sophos Ltd. and Sophos Inc. v. Webroot Inc.*, PTAB Case No. IPR2023-00699, Exhibit 1014: Order Granting Fourth Amended Scheduling Order, Dkt. 160, *Webroot, Inc et al. v. AO Kaspersky Lab*, No. 6:22-cv-00243-ADA-DTG (W.D. Tex.), Jan. 22, 2023, 7 pgs.
*Sophos Ltd. and Sophos Inc. v. Webroot Inc.*, PTAB Case No. IPR2023-00699, Exhibit 1015: Excerpt from Transcript of Motions Hearing in *Webroot, Inc et al. v. AO Kaspersky Lab*, No. 6:22-cv-00243-ADA-DTG (W.D. Tex.), Dec. 9, 2022, 7 pgs.
*Sophos Ltd. and Sophos Inc. v. Webroot Inc.*, PTAB Case No. IPR2023-00699, Exhibit 1016: Threat Graphs examples: Malware detection, Sophos Ltd., KB-000036359, https://support.sophos.com/support/s/article/KB-000036359?language=en_US (Feb. 23, 2023), 15 pgs.
*Sophos Ltd. and Sophos Inc. v. Webroot Inc.*, PTAB Case No. IPR2023-00699, Patent Owner Open Text Inc.'s Mandatory Notices Pursuant to 37 CFR § 42.8(b), Mar. 29, 2023, 8 pgs.
*Sophos Ltd. and Sophos Inc. v. Webroot Inc.*, PTAB Case No. IPR2023-00699, Notice of Filing Date Accorded to Petition and Time for Filing Patent Owner Preliminary Response, Apr. 14, 2023, 6 pgs.
*Crowdstrike, Inc. v. Webroot Inc.*, PTAB Case No. IPR2023-00556, Petition for Inter Partes Review of U.S. Pat. No. 8,726,389, Feb. 17, 2023, 74 pgs.
*Crowdstrike, Inc. v. Webroot Inc.*, PTAB Case No. IPR2023-00556, Exhibit 1001: U.S. Pat. No. 8,726,389 (Morris) ("'389 Patent"), 17 pgs.
*Crowdstrike, Inc. v. Webroot Inc.*, PTAB Case No. IPR2023-00556, Exhibit 1002: File History of U.S. Pat. No. 8,726,389 ("'389 File History") 276 pgs.
*Crowdstrike, Inc. v. Webroot Inc.*, PTAB Case No. IPR2023-00556, Exhibit 1003: Declaration of Dr. Wenke Lee ("Decl."), 164 pgs.
*Crowdstrike, Inc. v. Webroot Inc.*, PTAB Case No. IPR2023-00556, Exhibit 1004: U.S. Patent Application Publication No. 2005/0210035 A1 Kester, 42 pgs.
*Crowdstrike, Inc. v. Webroot Inc.*, PTAB Case No. IPR2023-00556, Exhibit 1005: U.S. Pat. No. 7,594,272 Kennedy, 10 pgs.
*Crowdstrike, Inc. v. Webroot Inc.*, PTAB Case No. IPR2023-00556, Exhibit 1006: U.S. Pat. No. 7,225,343 Honig, 22 pgs.
*Crowdstrike, Inc. v. Webroot Inc.*, PTAB Case No. IPR2023-00556, Exhibit 1007: PO Opposition Markman Brief, 22-cv-00243 WDTX, No. 98, Nov. 18, 2022, 86 pgs.
*Crowdstrike, Inc. v. Webroot Inc.*, PTAB Case No. IPR2023-00556, Exhibit 1008: Defendants' Opening Markman Brief, 22-cv-00243 WDTX, No. 86, Oct. 28, 2022, 84 pgs.
*Crowdstrike, Inc. v. Webroot Inc.*, PTAB Case No. IPR2023-00556, Exhibit 1009: Order Granting Fourth Amended Scheduling Order, 22-cv-00243, WDTX, No. 160 ("Fourth Amended Scheduling Order"), Jan. 22, 2023, 7 pgs.
*Crowdstrike, Inc. v. Webroot Inc.*, PTAB Case No. IPR2023-00556, Exhibit 1010: SANS Institute (2000-2005) Host- vs. Network-Based Intrusion Detection Systems, 11 pgs.
*Crowdstrike, Inc. v. Webroot Inc.*, PTAB Case No. IPR2023-00556, Exhibit 1011: Intrusion Detection with Unlabeled Data Using Clustering by Leonid Portnoy, et al. ("Portnoy"), 25 pgs.
*Crowdstrike, Inc. v. Webroot Inc.*, PTAB Case No. IPR2023-00556, Exhibit 1012: U.S. Pat. No. 6,944,772 ("Dozortsev"), 10 pgs.
*Crowdstrike, Inc. v. Webroot Inc.*, PTAB Case No. IPR2023-00556, Exhibit 1013: U.S. Pat. No. 6,772,346 ("Chess"), 14 pgs.
*Crowdstrike, Inc. v. Webroot Inc.*, PTAB Case No. IPR2023-00556, Exhibit 1014: WO 2002/033525 ("Chuang"), 18 pgs.
*Crowdstrike, Inc. v. Webroot Inc.*, PTAB Case No. IPR2023-00556, Exhibit 1015: EP 1,549,012 ("De Spiegeleer"), 19 pgs.
*Crowdstrike, Inc. v. Webroot Inc.*, PTAB Case No. IPR2023-00556, Exhibit 1016: EP 1,280,040 ("Hinchliffe"), 17 pgs.
*Crowdstrike, Inc. v. Webroot Inc.*, PTAB Case No. IPR2023-00556, Exhibit 1017: U.S. Pat. No. 7,089,428 ("Farley"), 35 pgs.
*Crowdstrike, Inc. v. Webroot Inc.*, PTAB Case No. IPR2023-00556, Exhibit 1018: U.S. Patent Publication No. 2004/0153644 ("McCorkendale"), 15 pgs.
*Crowdstrike, Inc. v. Webroot Inc.*, PTAB Case No. IPR2023-00556, Exhibit 1019: The NIDES Statistical Component: Description and Justification by Harold S. Javitz et al., Mar. 7, 1994, 52 pgs.
*Crowdstrike, Inc. v. Webroot Inc.*, PTAB Case No. IPR2023-00556, Exhibit 1020: U.S. Pat. No. 7,516476 ("Kraemer"), 13 pgs.
*Crowdstrike, Inc. v. Webroot Inc.*, PTAB Case No. IPR2023-00556, Exhibit 1021: U.S. Pat. No. 8,418,250 (Morris) ("'250 Patent"), 17 pgs.

(56) References Cited

OTHER PUBLICATIONS

*Crowdstrike, Inc.* v. *Webroot Inc.*, PTAB Case No. IPR2023-00556, Exhibit 1022: U.S. Pat. No. 10,284,591 (Giuliani) ('591 Patent), 14 pgs.
*Crowdstrike, Inc.* v. *Webroot Inc.*, PTAB Case No. IPR2023-00556, Patent Owner Open Text Inc.'s Mandatory Notices Pursuant to 37 CFR § 42.8(b), Mar. 10, 2023, 8 pgs.
*Crowdstrike, Inc.* v. *Webroot Inc.*, PTAB Case No. IPR2023-00556, Notice of Filing Date Accorded to Petition and Time for Filing Patent Owner Preliminary Response, Mar. 16, 2023, 5 pgs.
*Sophos Ltd. and Sophos Inc.* v. *Webroot Inc.*, PTAB Case No. IPR2023-00633, Petition for Inter Partes Review of U.S. Pat. No. 8,726,389, Mar. 3, 2023, 85 pgs.
*Sophos Ltd. and Sophos Inc.* v. *Webroot Inc.*, PTAB Case No. IPR2023-00633, Exhibit 1001: U.S. Pat. No. 8,726,389, 17 pgs.
*Sophos Ltd. and Sophos Inc.* v. *Webroot Inc.*, PTAB Case No. IPR2023-00633, Exhibit 1002: File History for U.S. Pat. No. 8,726,389, 275 pgs.
*Sophos Ltd. and Sophos Inc.* v. *Webroot Inc.*, PTAB Case No. IPR2023-00633, Exhibit 1003: Complaint, *Webroot Inc et al.* v. *Sophos Ltd.*, No. 6:22-cv-240 (W.D. Tex), 144 pgs.
*Sophos Ltd. and Sophos Inc.* v. *Webroot Inc.*, PTAB Case No. IPR2023-00633, Exhibit 1004: Declaration of Dr. Richard Newman, 91 pgs.
*Sophos Ltd. and Sophos Inc.* v. *Webroot Inc.*, PTAB Case No. IPR2023-00633, Exhibit 1005: Curriculum Vitae of Dr. Richard Newman, 13 pgs.
*Sophos Ltd. and Sophos Inc.* v. *Webroot Inc.*, PTAB Case No. IPR2023-00633, Exhibit 1006: U.S. Patent Pub. No. 2004/0111632 ("Halperin"), 22 pgs.
*Sophos Ltd. and Sophos Inc.* v. *Webroot Inc.*, PTAB Case No. IPR2023-00633, Exhibit 1007: U.S. Pat. No. 7,694,150 ("Kirby"), 22 pgs.
*Sophos Ltd. and Sophos Inc.* v. *Webroot Inc.*, PTAB Case No. IPR2023-00633, Exhibit 1008: U.S. Pat No. 7,900,194 ("Mankins"), 12 pgs.
*Sophos Ltd. and Sophos Inc.* v. *Webroot Inc.*, PTAB Case No. IPR2023-00633, Exhibit 1009: Stipulation Waiving IPR claims in District Court Litigation, 4 pgs.
*Sophos Ltd. and Sophos Inc.* v. *Webroot Inc.*, PTAB Case No. IPR2023-00633, Exhibit 1010: Sophos Central Admin, Threat Graph Analysis, Sophos Ltd., at https://docs.sophos.com/centra/customer/help/en-us/ManageYourProducts/ThreatAnalysisCenter/ThreatGraphs/index.html (last visited Feb. 15, 2023), 1 pg.
*Sophos Ltd. and Sophos Inc.* v. *Webroot Inc.*, PTAB Case No. IPR2023-00633, Exhibit 1011: Sophos Central Admin, Threat Graph Analysis, Sophos Ltd., at https://docs.sophos.com/centra/customer/help/en-us/ManageYourProducts/ThreatAnalysisCenter/ThreatGraphs/ThreatAnalysisDetails/index.html (last visited Feb. 15, 2023), 5 pgs.
*Sophos Ltd. and Sophos Inc.* v. *Webroot Inc.*, PTAB Case No. IPR2023-00633, Exhibit 1012: Excerpt from Transcript of Motions Hearing in *Webroot, Inc et al.* v. *AO Kaspersky Lab*, No. 6:22-cv-00243-ADA-DTG (W.D. Tex.), Dec. 9, 2022, 7 pgs.
*Sophos Ltd. and Sophos Inc.* v. *Webroot Inc.*, PTAB Case No. IPR2023-00633, Exhibit 1013: Order Granting Fourth Amended Scheduling Order, Dkt. 160, *Webroot, Inc et al.* v. *AO Kaspersky Lab*, No. 6:22-cv-00243-ADA-DTG (W.D. Tex.), Jan. 22, 2023, 7 pgs.
*Sophos Ltd. and Sophos Inc.* v. *Webroot Inc.*, PTAB Case No. IPR2023-00633, Patent Owner Open Text Inc.'s Mandatory Notices Pursuant to 37 CFR § 42.8(b), Mar. 24, 2023, 8 pgs.
*Sophos Ltd. and Sophos Inc.* v. *Webroot Inc.*, PTAB Case No. IPR2023-00633, Notice of Filing Date Accorded to Petition and Time for Filing Patent Owner Preliminary Response, Mar. 16, 2023, 5 pgs.
*Sophos Ltd. and Sophos Inc.* v. *Webroot Inc.*, PTAB Case No. IPR2023-00491, Petition for Inter Partes Review of U.S. Pat. No. 9,413,721, Jan. 20, 2023, 81 pgs.
*Sophos Ltd. and Sophos Inc.* v. *Webroot Inc.*, PTAB Case No. IPR2023-00491, Exhibit 1001: U.S. Pat. No. 9,413,721 ('721 Patent), 30 pgs.
*Sophos Ltd. and Sophos Inc.* v. *Webroot Inc.*, PTAB Case No. IPR2023-00491, Exhibit 1002: File History of the '721 Patent, 683 pgs.
*Sophos Ltd. and Sophos Inc.* v. *Webroot Inc.*, PTAB Case No. IPR2023-00491, Exhibit 1003: Declaration of Dr. Richard Newman, 82 pgs.
*Sophos Ltd. and Sophos Inc.* v. *Webroot Inc.*, PTAB Case No. IPR2023-00491, Exhibit 1004: Curriculum Vitae of Dr. Richard Newman, 13 pgs.
*Sophos Ltd. and Sophos Inc.* v. *Webroot Inc.*, PTAB Case No. IPR2023-00491, Exhibit 1005: U.S. Patent Pub. No. 2006/0075504 ("Liu"), 19 pgs.
*Sophos Ltd. and Sophos Inc.* v. *Webroot Inc.*, PTAB Case No. IPR2023-00491, Exhibit 1006: U.S. Patent Pub. No. 2008/0086773 ("Tuvell"), 21 pgs.
*Sophos Ltd. and Sophos Inc.* v. *Webroot Inc.*, PTAB Case No. IPR2023-00491, Exhibit 1007: U.S. Patent Pub. No. 2005/0223001 ("Kester"), 27 pgs.
*Sophos Ltd. and Sophos Inc.* v. *Webroot Inc.*, PTAB Case No. IPR2023-00491, Exhibit 1008: U.S. Pat. No. 7,392,543 ("Szor"), 18 pgs.
*Sophos Ltd. and Sophos Inc.* v. *Webroot Inc.*, PTAB Case No. IPR2023-00491, Exhibit 1009: U.S. Patent Pub. No. 2007/0016953 ("Morris") ("'953 Publication"), 18 pgs.
*Sophos Ltd. and Sophos Inc.* v. *Webroot Inc.*, PTAB Case No. IPR2023-00491, Exhibit 1010: U.S. Pat. No. 7,966,650 ("Manring"), 21 pgs.
*Sophos Ltd. and Sophos Inc.* v. *Webroot Inc.*, PTAB Case No. IPR2023-00491, Exhibit 1011: Stipulation Waiving IPR Claims in District Court Litigation, 4 pgs.
*Sophos Ltd. and Sophos Inc.* v. *Webroot Inc.*, PTAB Case No. IPR2023-00491, Exhibit 1012: Excerpt from Transcript of Motions Hearing in *Webroot, Inc et al.* v. *AO Kaspersky Lab*, No. 6:22-cv-00243-ADA-DTG (W.D. Tex.), Dec. 9, 2022, 7 pgs.
*Sophos Ltd. and Sophos Inc.* v. *Webroot Inc.*, PTAB Case No. IPR2023-00491, Exhibit 1013: Excerpt from Henry F. Korth and Abraham Silberschatz, Database System Concepts, McGraw-Hill, New York, 2006, 72 pgs.
*Sophos Ltd. and Sophos Inc.* v. *Webroot Inc.*, PTAB Case No. IPR2023-00491, Exhibit 1014: K.J. Biba, "Integrity Considerations for Secure Computer Systems," MTR-3153, The MITRE Corporation, Apr. 1977, 68 pgs.
*Sophos Ltd. and Sophos Inc.* v. *Webroot Inc.*, PTAB Case No. IPR2023-00491, Exhibit 1015: David E. Bell and Leonard J. LaPadula, "Secure Computer Systems: Mathematical Foundations," MTR-2547, The MITRE Corporation, Nov. 1996, 33 pgs.
*Sophos Ltd. and Sophos Inc.* v. *Webroot Inc.*, PTAB Case No. IPR2023-00491, Patent Owner Open Text Inc.'s Mandatory Notices Pursuant to 37 CFR § 42.8(b), Feb. 10, 2023, 6 pgs.
*Sophos Ltd. and Sophos Inc.* v. *Webroot Inc.*, PTAB Case No. IPR2023-00491, Notice of Filing Date Accorded to Petition and Time for Filing Patent Owner Preliminary Response, Feb. 16, 2023, 6 pgs.
Patent Owner's Preliminary Response to Petition for Inter Partes Review, *Sophos Ltd. and Sophos Inc.* v. *Webroot Inc.*, PTAB Case No. IPR2023-00491, May 16, 2023, 73 pgs.
Exhibit 2001: Declaration of Professor Alessandro Orso, Ph. D., *Sophos Ltd. and Sophos Inc.* v. *Webroot Inc.*, PTAB Case No. IPR2023-00491, 56 pgs.
Exhibit 2002: Curriculum Vitae of Professor Alessandro Orso, Ph. D., *Sophos Ltd. and Sophos Inc.* v. *Webroot Inc.*, PTAB Case No. IPR2023-00491, 52 pgs.
Exhibit 2003: *Webroot, Inc., and Open Text Inc.*, v. *CrowdStrike, Inc. and CrowdStrike Holdings, Inc.*, Case No. 6:22-cv-00241-ADA-DTG, First Amended Complaint for Patent Infringement, Dkt. 60 (W.D. Tex., Sept. 8, 2022) (excerpted), *Sophos Ltd. and Sophos Inc.* v. *Webroot Inc.*, PTAB Case No. IPR2023-00491, 37 pgs.
Exhibit 2004: *Sonrai Memory Ltd.* v. *Kingston Tech. Co. and Kingston Tech. Corp.*, Case No. 6:21-cv-1284-ADA, Order Denying Kingston Tech. Co. and Kingston Tech. Corp.'s Opposed Motion to

(56) References Cited

OTHER PUBLICATIONS

Stay Pending Resolution of Inter Partes Review, Dkt. 94 (W.D. Tex., Oct. 18, 2022), *Sophos Ltd. and Sophos Inc. v. Webroot Inc.*, PTAB Case No. IPR2023-00491, 7 pgs.

Exhibit 2005: *mCom IP, LLC v. Cisco Systems, Inc.*, Case No. 6:22-cv-00261-ADA, Order Denying Defendant's Motion to Stay Pending Inter Partes Review, Dkt. 42 (W.D. Tex., Oct. 20, 2022), *Sophos Ltd. and Sophos Inc. v. Webroot Inc.*, PTAB Case No. IPR2023-00491, 7 pgs.

Exhibit 2006: *Intellectual Ventures I LLC et al. v. Hewlett Packard Enterprise Co.*, No. 6:21-cv-00596-ADA, Order Denying Hewlett Packard Enterprise Company's Opposed Motion to Stay Pending Resolution of Inter Partes Review, Dkt. 104 (W.D. Tex., Dec. 22, 2022), *Sophos Ltd. and Sophos Inc. v. Webroot Inc.*, PTAB Case No. IPR2023-00491, 8 pgs.

Exhibit 2007: *Webroot, Inc. and Open Text Inc., v. AO Kaspersky Lab et al.*, Case No. 6:22-cv-243-ADA-DTG, Claim Construction Order, Dkt. 236 (W.D. Tex. Mar. 16, 2023), *Sophos Ltd. and Sophos Inc. v. Webroot Inc.*, PTAB Case No. IPR2023-00491, 20 pgs.

Exhibit 2008: *Webroot, Inc. and Open Text Inc., v. AO Kaspersky Lab et al.*, Case No. 6:22-cv-00243-ADA-DTG, Scheduling Order, Dkt. 50 (W.D. Tex., Sep. 28, 2022), *Sophos Ltd. and Sophos Inc. v. Webroot Inc.*, PTAB Case No. IPR2023-00491, 18 pgs.

Exhibit 2009: *Open Text Inc et al., v. AO Kaspersky Lab*, Case No. 6:22-cv-00243-ADA-DTG, First Amended Complaint for Patent Infringement, Dkt. 80 (W.D. Tex., Oct. 27, 2022), *Sophos Ltd. and Sophos Inc. v. Webroot Inc.*, PTAB Case No. IPR2023-00491, 148 pgs.

Exhibit 2010: *Webroot, Inc. and Open Text Inc., v. Sophos, Ltd.*, Case No. 6:22-cv-00240-ADA-DTG, Second Amended Complaint for Patent Infringement, Dkt. 76 (W.D. Tex., Oct. 24, 2022), *Sophos Ltd. and Sophos Inc. v. Webroot Inc.*, PTAB Case No. IPR2023-00491, 184 pgs.

Exhibit 2011: Law360, "Catching Up on Patent Litigation with Judge Albright", *Sophos Ltd. and Sophos Inc. v. Webroot Inc.*, PTAB Case No. IPR2023-00491, 3 pgs.

Exhibit 2012: Jun. 30, 2022 U.S. Courts Statistics & Reports Comparison Report, *Sophos Ltd. and Sophos Inc. v. Webroot Inc.*, PTAB Case No. IPR2023-00491, 11 pgs.

Exhibit 2013: Webroot, Inc. and Open Text Inc., v. ForcePoint LLC, Case No. 6:22-cv-00342-ADA-DTG, Defendant ForcePoint LLC's Preliminary Invalidity Contentions (W.D. Tex., Sep. 13, 2022), *Sophos Ltd. and Sophos Inc. v. Webroot Inc.*, PTAB Case No. IPR2023-00491, 149 pgs.

Exhibit 2014: U.S. Appl. No. 15/285,875, Appeal No. 2021-003606, Decision on Appeal at 7-8 (PTAB Jul. 26, 2022), *Sophos Ltd. and Sophos Inc. v. Webroot Inc.*, PTAB Case No. IPR2023-00491, 10 pgs.

Check Point URL Filtering Software Blade Overview, The Wayback Machine—https://web.archive.org/web/20150317044930/http://www.checkpoint.com:80/products/url-filtering-software-blade/index.html/, 2015, 7 pgs.

Prevx Computer Security Investigator—Enterprise, Prevx, https://slideplayer.com/slide/7232158/, 2008, 12 pgs.

Stackwalker Source Code at https://github.com/dyninst/dyninst/tree/c4ad1fbc37535b84f83343c9296c2717704264ab/stackwalk, 2013, 2 pgs.

What is Splunk Enterprise? The Platform for Machine Data, The Wayback Machine at https://web.archive.org/web/20130424224158/http://www.splunk.com/view/splunk/S . . . , 2013, 6 pgs.

Symantec Endpoint Encryption Policy Administrator Guide Version 11.3.1, Symantec, Mountain View, CA, 2020, 197 pgs.

Symantec Endpoint Protection User Manual, Symantec, Mountain View, CA, 2006. 7 pgs.

Webroot SecureAnywhere—Endpoint Protection, Administrator Guide, Downloading and Forcing Updates, at https://docs.webroot.com/us/en/business/wsab_endpointprotection_adminguide/Content/ManagingEndpoints/DownloadingAndForcingUpdates.htm, Aug. 11, 2022, 4 pgs.

* cited by examiner

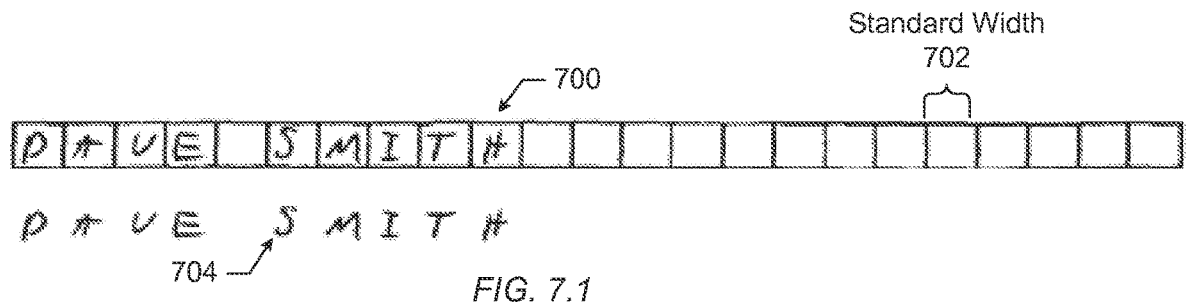
FIG. 7.1
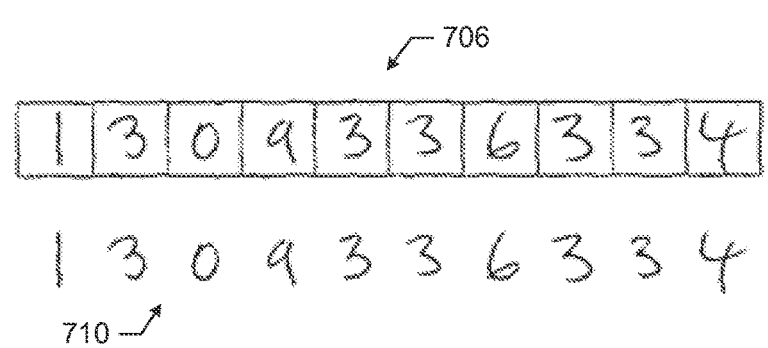
FIG. 7.2
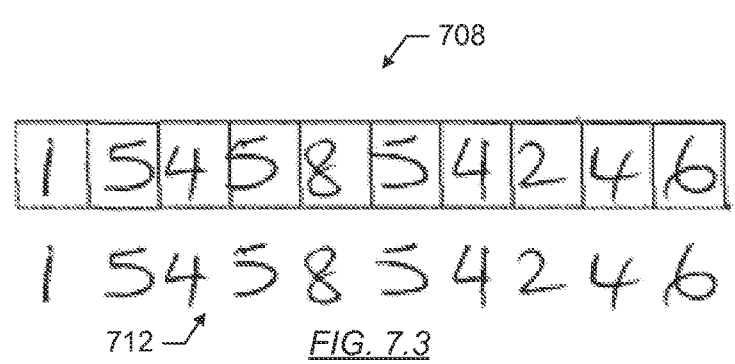
FIG. 7.3
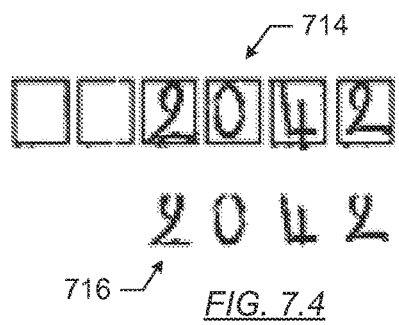
FIG. 7.4

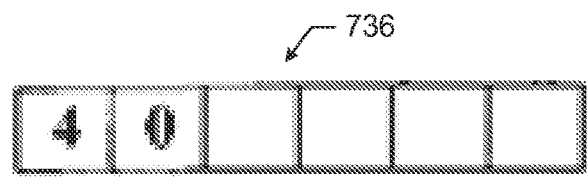
FIG. 7.9
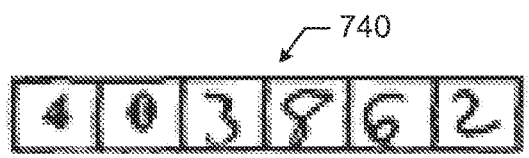
FIG. 7.10
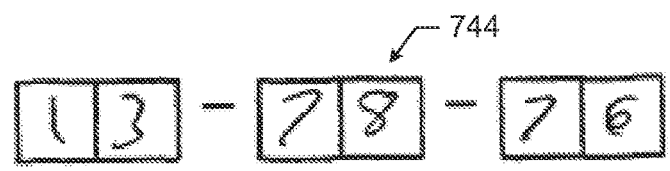
FIG. 7.11
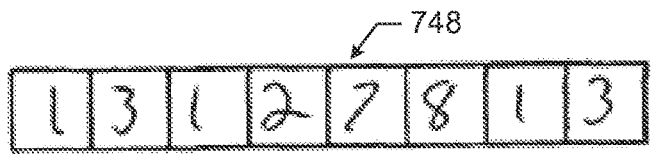
FIG. 7.12

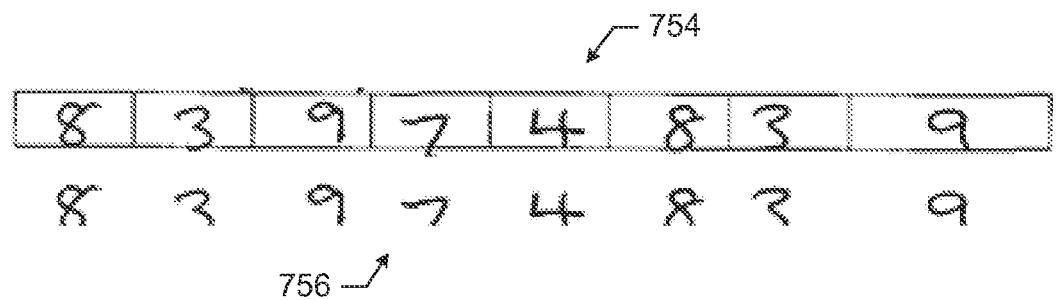
FIG. 7.13
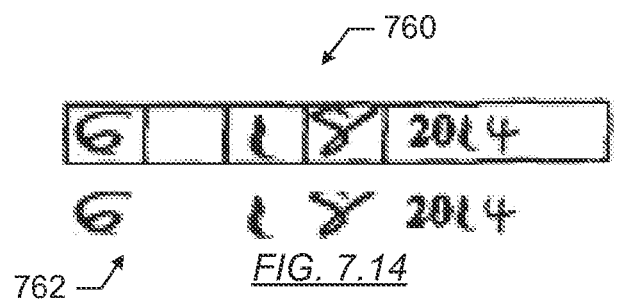
FIG. 7.14
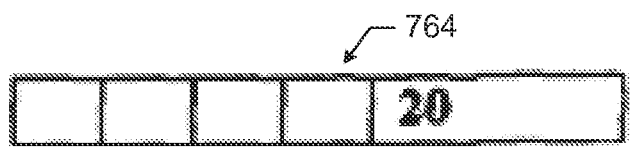
FIG. 7.15
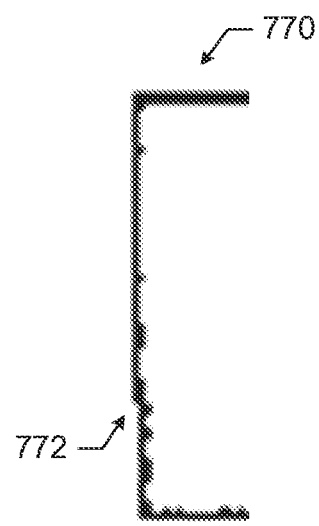
FIG. 7.16

IMAGE BOX FILTERING FOR OPTICAL CHARACTER RECOGNITION

CROSS-REFERENCE TO RELATED APPLICATIONS

This application is a continuation of, and claims a benefit of priority under 35 U.S.C. 120 from U.S. patent application Ser. No. 16/857,993, filed Apr. 24, 2020, entitled "Image Box Filtering for Optical Character Recognition," issued as U.S. Pat. No. 11,443,504, which is a continuation of, and claims a benefit of priority under 35 U.S.C. 120 from U.S. patent application Ser. No. 16/525,354 filed Jul. 29, 2019, entitled "Image Box Filtering for Optical Character Recognition," issued as U.S. Pat. No. 10,679,091, which is a continuation of, and claims a benefit of priority under 35 U.S.C. 120 from U.S. patent application Ser. No. 14/788,170 filed Jun. 30, 2015, entitled "Image Box Filtering for Optical Character Recognition," issued as U.S. Pat. No. 10,395,133, which claims a benefit of priority under 35 U.S.C. § 119(e) from U.S. Provisional Patent Application No. 62/158,775 filed May 8, 2015, entitled "Image Box Filtering for Optical Character Recognition," all of which are hereby fully incorporated herein by reference for all purposes.

BACKGROUND

Optical character recognition (OCR) is the process of identifying text characters from an image. OCR may be performed where the incoming images are scanned images having computer text and/or handwritten text on the images. For example, an individual may handwrite information into a paper form and transmit the paper form to a company for processing. The company may want to extract handwritten information from the form in order to perform additional steps, such as creating an account for the individual, performing application processing, or other action. Many forms have boxes. The boxes may assist the user in entering data in the form by indicating the number of characters to enter and providing a defined spacing between characters.

BRIEF DESCRIPTION OF DRAWINGS

FIGS. 7.1, 7.2, 7.3, 7.4, 7.5, 7.6, 7.7, 7.8, 7.9, 7.10, 7.11, 7.12, 7.13, 7.14, 7.15, and 7.16 show examples in accordance with one or more embodiments of the technology.

DETAILED DESCRIPTION

Figure 1:
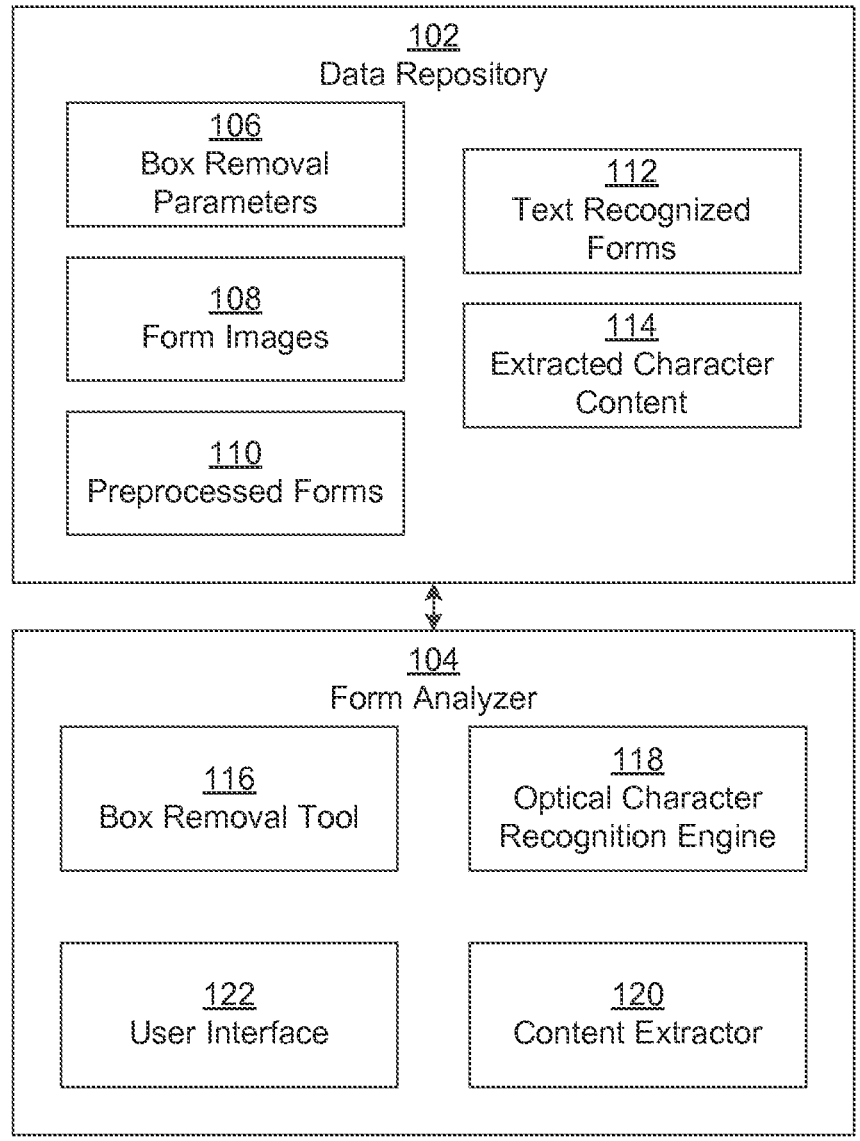
FIGS. 1, 2, and 3 show a schematic diagram of a system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to removing boxes from forms. In particular, pre-printed boxes are used on forms and other documents to guide the end user or customer to write. These boxes may cause errors when an optical character recognition (OCR) engine recognizes handwritten and preprinted characters from the boxes. One or more embodiments perform an image pre-filtering in order to remove the boxes before performing an OCR extraction.

In general, a form is a document that has fields for a user to submit data. For example, a form may be a new account form of a particular version, an invoice, an application form, W-2 2015 version, or any other type of form. A form may have one or more instances or copies. The instances of the form may be transmitted to users for submitting data. An instance of a form in which a user has entered data may be referred to as a filled form. An empty form is a form that has not been filled by the user. In one or more embodiments of the technology, the form may include collinear sets of boxes. Each set of boxes may correspond to a discrete item of data to be extracted. For example, a set of boxes may correspond to first name, a second set of boxes may correspond to a last name, a third set of boxes may correspond to an account number, and so forth.

FIG. 1 shows a schematic diagram of a system in accordance with one or more embodiments of the technology. As shown in FIG. 1, a data repository (102) is connected to a form analyzer (104). The connection may be direct, indirect, via a network, via one or more application programming interfaces, other connection, or a combination thereof. In one or more embodiments of the technology, the data repository (102) is any type of storage unit and/or device (e.g., a file system, database, collection of tables, or any other storage mechanism) for storing data. Further, the data repository (102) may include multiple different storage units and/or devices. The multiple different storage units and/or devices may or may not be of the same type or located at the same physical site. The data repository (102) includes functionality to store box removal parameters (106), form images (108), preprocessed forms (110), text recognized forms (112), and extracted character content (114).

In one or more embodiments of the technology, box removal parameters (106) are parameters with corresponding values. The values define one or more guidelines to remove one or more boxes on one or more types of forms. For example, the box removal parameters (106) may include a region parameter, a margin parameter, a sliding window parameter, a box type parameter, and a width variation parameter.

With respect to the region parameters, a region parameter includes a region identifier of a region of boxes. The region includes multiple boxes and may include white space around the boxes. In some embodiments, the region may also include some text and other markings around the white space. In other words, rather than specifying each individual box, one or more embodiments allow for specifying the general area around the set of boxes including whitespace around the set of boxes. Further, a margin of error may exist that allows the user to include in the region markings that are not part of the set of boxes. Such markings may be minimal such as to not interfere with the box filtering or extraction. The white space may be white space in an empty form and have markings in a filled form, or may be the form background. The region identifier may be an identifier relative to one or more positions on the form. For example, the region identifier may be with respect to one or more corners or sides of the form. By way of another example, the region identifier may be defined with respect to one or more anchor points (e.g., words or other markers that have set positions) in the form.

The margin parameter specifies the margins within each box within which markings are extracted. In other words, the margin specifies a region within the detected boundaries of a box that are excluded from extraction. In other words, the interior of the box that is not within the margins of the boxes are extracted. By having margins which are not extracted, one or more embodiments may ensure that the boundaries of the boxes are not extracted. Top, bottom, left, and right margins may be individually or together defined in one or more groups as part of the margin parameters. Further, the margin parameters may be defined individually for each region, a set of regions, or for the entire form. An example of the box with margins is discussed below in reference to FIG. 3 in accordance with one or more embodiments of the technology.

Continuing with the box removal parameters in FIG. 1, the sliding window parameter specifies a size of sliding window in accordance with one or more embodiments of the technology. A sliding window defines a degree of deviation from a straight line in a boundary of a box. In particular, in an image, the vertical bar demarcating the boundary of the box may not be completely straight. An example of a deviation is shown in FIG. 7.16. Similarly, a horizontal bar in the image may not be straight. The sliding window provides a mechanism to identify boundaries of a box when the boundaries are not straight. An example of a region with a sliding window is discussed below with reference to FIG. 2 in accordance with one or more embodiments of the technology.

Continuing with the box removal parameters in FIG. 1, in one or more embodiments of the technology, a box type parameter may be used to specify a type of box in the region. By way of an example, a box may be a complete box type, a comb box type, or other box. In the example, a complete box is a box that has boundaries on all sides. A comb shaped box is a box that does not have a top horizontal bar, and may have smaller side bars.

The box removal parameters may include parameters for defining when a box is detected. For example, a width variation parameter defines an amount of variation permissible in widths of boxes for a same number of characters. In the example, the widths for single character boxes may be assumed to be the same width. However, if a scanned image, photograph, or other such image is used, variation may exist in the widths between the single character boxes. The width variation parameter may define how much variation is allowed to distinguish between box boundaries and filled content in a box. By way of another example, an absolute threshold or a percentage threshold of maximal value may be defined in the box removal parameters. The threshold may be used for detecting peaks in the vertical or horizontal boundaries of a box.

In some embodiments, only the aforementioned parameters are defined. In some embodiments, fewer than the aforementioned parameters are defined. In some embodiments, additional or alternative parameters are defined. A default set of box removal parameters may be defined. The default set of box removal parameters may be used when the user has not specified certain parameters, and/or to present to the user as a basis for modification.

The box removal parameters may be stored as a form template using any technique known in the art. In particular, any mechanism may be used to store the box removal parameters. By way of an example, the box removal parameters may be stored as an extensible mark-up language (XML) file with or without the form.

Form images (108) are images of filled forms that have at least some characters as image data. In other words, at least a portion of a form image has boxes that are images and information populated into fields that are images, rather than computer encoded text (e.g., ASCII characters, Unicode, or other encoding). In some embodiments, the entire form image (108) is an image. For example, the form images may be computer generated images from computer forms, pictures of forms, scanned forms, or other forms.

In one or more embodiments of the technology, preprocessed forms (110) are form instances with image content extracted. In other words, preprocessed forms (110) are instances of one or more forms in which the image contents of the boxes are without the boxes. More specifically, the boxes are no longer present in the preprocessed forms. In other embodiments, the boxes may be present in preprocessed forms (110), but have an encoding added so as to be identifiable by later processing. Additional preprocessing, such as image sharpening, changing of image type, or other preprocessing may have been performed on the preprocessed forms (110)

In one or more embodiments of the technology, text recognized forms (112) are filled forms in which optical character recognition (OCR) has been performed on the filled forms. Thus, the image data for at least some of the characters is replaced or supplemented in the text recognized forms (112) with computer encoded text.

In one or more embodiments of the technology, extracted character content (114) is content extracted from the text recognized forms. In one or more embodiments of the technology, the extracted character content may include the grouping of characters as a string. For example, if the set of boxes is for a first name, the extracted character content is the string of characters having the first name. More particularly, when the set of boxes is removed in the preprocessed forms, images of each letter in the first name are individually in the same position on the preprocessed form in accordance with one or more embodiments of the technology. After OCR, each letter is identified as being in the same position, but the letter may be related to or otherwise encoded with the letter's corresponding ASCII value or other text encoding. Further, the letter may be individual and not as a group of letters. The extracted character content may be a grouping of letters that correspond to a set of boxes into a string. The extracted character content may further be stored separate from the form by the grouping, such as in a database record for the user.

Continuing with FIG. 1, the form analyzer (104) is hardware, software, firmware, or any combination thereof. The form analyzer (104) may include a box removal tool (116), an OCR engine (118), a content extractor (120), and a user interface (122). The box removal tool (116) is configured to remove boxes. In particular, the box removal tool (116) includes functionality to transform form images (108) into preprocessed forms (110). The OCR engine (118) is configured to recognize characters. In other words, the OCR engine (118) is configured to transform preprocessed forms (110) into text recognized forms (112). The content extractor (120) is configured to extract and store content from a text recognized form (112). In other words, the content extractor includes functionality to obtain the character content in the text recognized form (112) and store the extracted character content. The storage may be temporary, such as for transmission, and/or semi-permanent, such as in a database record. The form analyzer may also include a user interface (122) for interfacing with a user to specify the box removal parameters (106) and provide information during processing and preprocessing of filled forms as discussed below.

While FIG. 1 shows a configuration of components, other configurations may be used without departing from the scope of the technology. For example, various components may be combined to create a single component. As another example, the functionality performed by a single component may be performed by two or more components. By way of another example, the form image, preprocessed form, and text recognized form, or a subset thereof, for a form instance may be a single document file during different stages of processing. In other words, rather than storing multiple files, where each file is the form instance during a particular stage of processing, the data repository may store a single file and the state of the content in the file is dependent on the stage of processing.

In one or more embodiments of the technology, a user may create a form template for each type of form. The form template may include the box removal parameters for each set of boxes defined for the type of form. Thus, the form template may be used to extract content for multiple forms of the same type. For example, consider the scenario in which a financial institution has a new account form that individuals print and send via postal mail. In the example, a representative of the financial institution may create a document template for the new account form. Thus, when new account forms are received via the physical postal mail, the new account forms may be scanned, and the form template may be used to remove the boxes and extract the content. The extracted content may then be stored by the content extractor in a new account for the financial institution's customers.

Figure 2:
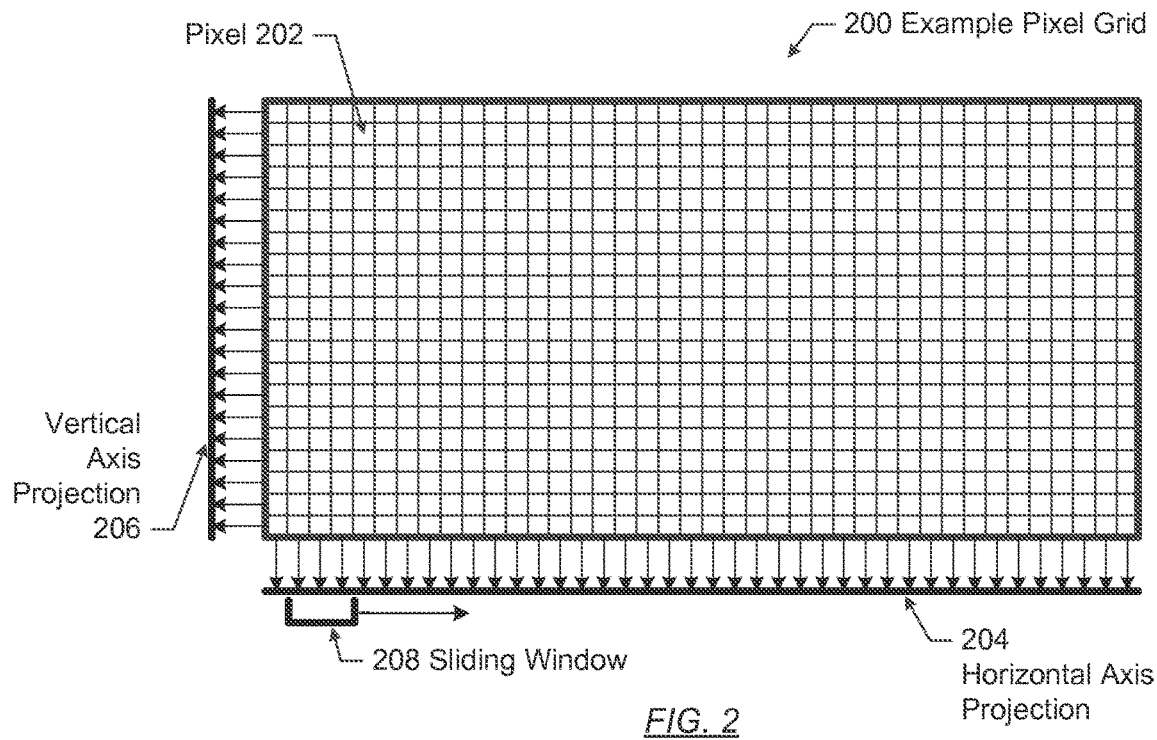

FIG. 2 shows a diagram of an image region defined as a pixel grid (200) in accordance with one or more embodiments of the technology. As shown in FIG. 2, the image region may be separated into pixels (e.g., pixel (202)). Pixels correspond to discrete points that may be a color, such as black, white, blue, red, or other color or combination. The shape, size, and number of pixels of the region may be different than shown in FIG. 2.

One or more embodiments may create a horizontal axis projection (204) in accordance with one or more embodiments of the technology. In one or more embodiments of the technology, a horizontal axis projection (204) is an ordered set of values that include a single combined value for a column of pixels in the region. The set of values may include additional values such as a minimum, color value, or other value for one or more columns. Each combined value in the horizontal axis projection is the number of pixels in a column that are a pre-defined color, such as black, of the boxes. Alternatively or additionally, each combined value in the horizontal axis projection may be the total number of pixels that are not a background color, such as white, yellow or other background color.

Similar to the horizontal axis projection (204), the vertical axis projection (206) includes an ordered set of combined values, where each combined value is the number of pixels in a row that are the pre-defined color. Alternatively or additionally, each combined value in the vertical axis projection may be the total number of pixels that are not a background color, such as white, yellow or other background color.

The horizontal axis projection and/or vertical axis projection may include one or more peaks in combined values. A peak is a local maximal value in a particular position of the horizontal axis projection. In other words, a peak value is greater than neighboring values. Peaks may be values that are greater than a threshold. A peak in the horizontal axis project (204) or in the vertical axis projection (206) may correspond to boundaries of the boxes, such as a vertical or horizontal line. In other words, peaks in the vertical axis projection (206) may be used to denote the top, if a top exists, and the bottom of boxes. Peaks in the horizontal axis projection (204) may correspond to sides of boxes. Peaks may also exist that correspond to characters, such as the numbers (e.g., "1", "4", "9"), letters (e.g., "L", "t", "U") and other characters, within a box.

In one or more embodiments of the technology, because scanned images of forms may be used, the boundaries of boxes may not be straight lines. In such a scenario, a sliding window (e.g., sliding window (208)) may be applied to the horizontal axis projection (204) and vertical axis projection (206) (not shown) to allow for some deviation. In such embodiments, the combined value may be a summation of the number of pixels in the sliding window complying with the color requirement.

By way of an example, consider the scenario in which the sliding window is size three, and columns A, B, C, D, and E are, in order, in the projection pixel grid, the predefined color for the sides of boxes is black, and the form background is white. In the example, column A has 6 black pixels, column B has 13 black pixels, column C has 9 black pixels, column D has 4 black pixels and column E has 3 black pixels. For the purposes of the example, assume that A and E each have a neighbor having 0 black pixels. Without the sliding window, the horizontal axis projection may have combined values 6, 13, 9, 4, and 3 for columns A, B, C, D, and E, respectively. Using the sliding window, column A is assigned a value of 19 pixels (i.e., 0+6+13), column B is assigned a value of 28 pixels (i.e., 6+13+9), column C is assigned a value of 26 pixels (i.e., 13+9+4), column D is assigned a value of 16 pixels (i.e., 9+4+3), and column E is assigned a value of 7 pixels (i.e., 3+4+0). The size of the sliding window may be more or less than 3 without departing from the scope of the technology. Further, other aggregation functions may be used to combine values in a sliding window without departing from the scope of the technology.

Figure 3:
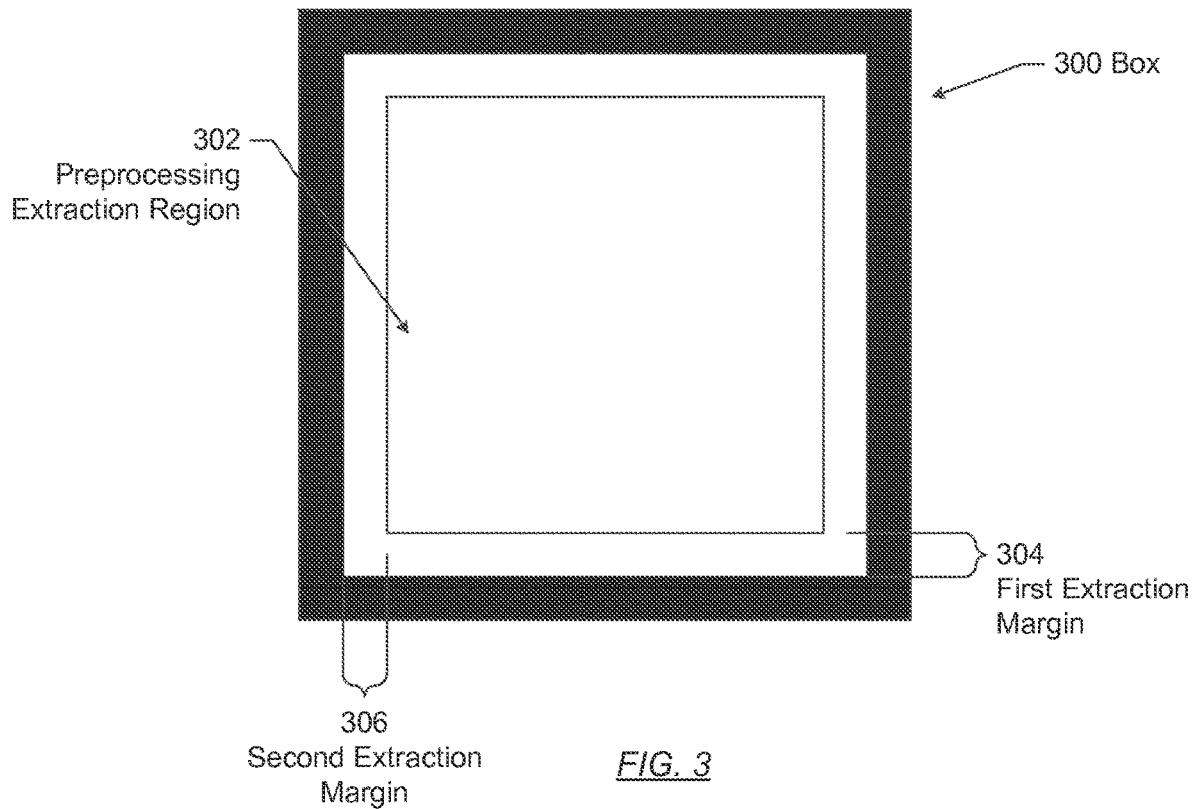

FIG. 3 shows an example schematic diagram of a box (300) in accordance with one or more embodiments of the technology. The preprocessing extraction region (302) is the portion of the image kept when the box is removed. In some embodiments, the preprocessing extraction region (302) is to the inside edge of the boundaries of the box. In other embodiments, such as shown in FIG. 3, margins (e.g., first extraction margin (304), second extraction margin (306)) may exist to ensure that the edge of the box is removed. The margins may be of various sizes and may be the same or heterogeneous with respect to top, bottom, left, and right margins.

Figure 4:
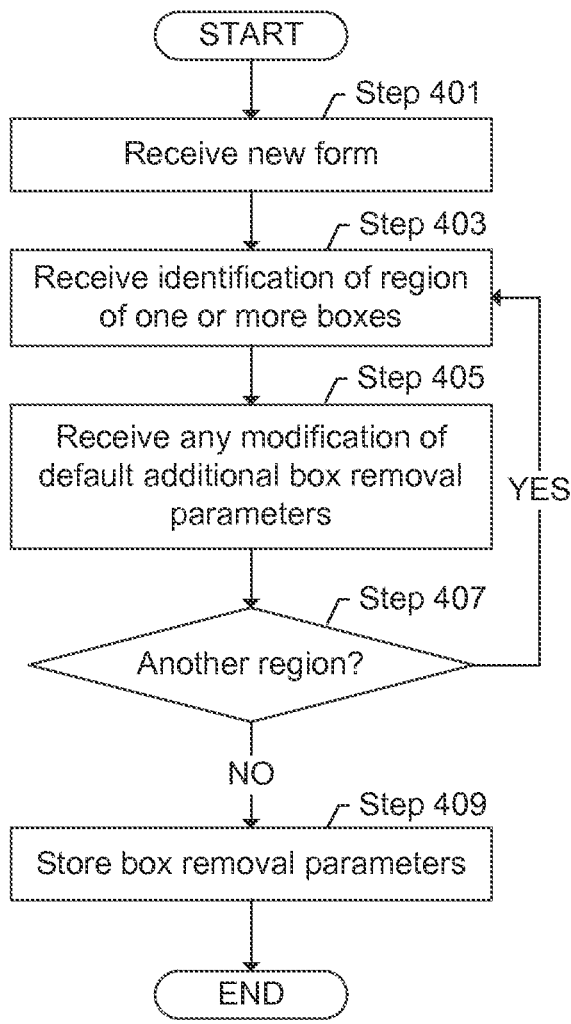
FIGS. 4, 5, and 6 show flowcharts in accordance with one or more embodiments of the technology.
Figure 5:
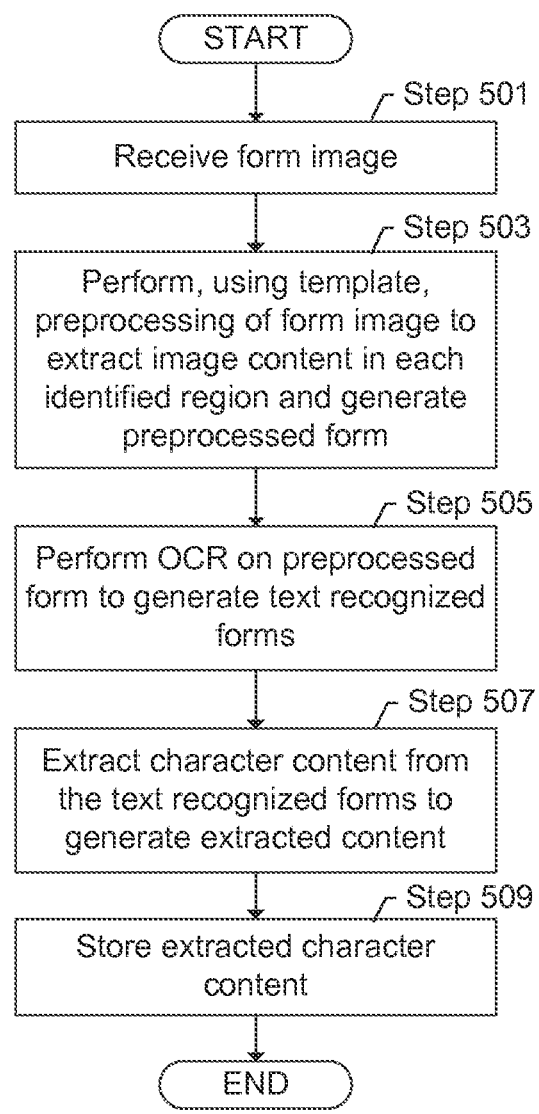
Figure 6:
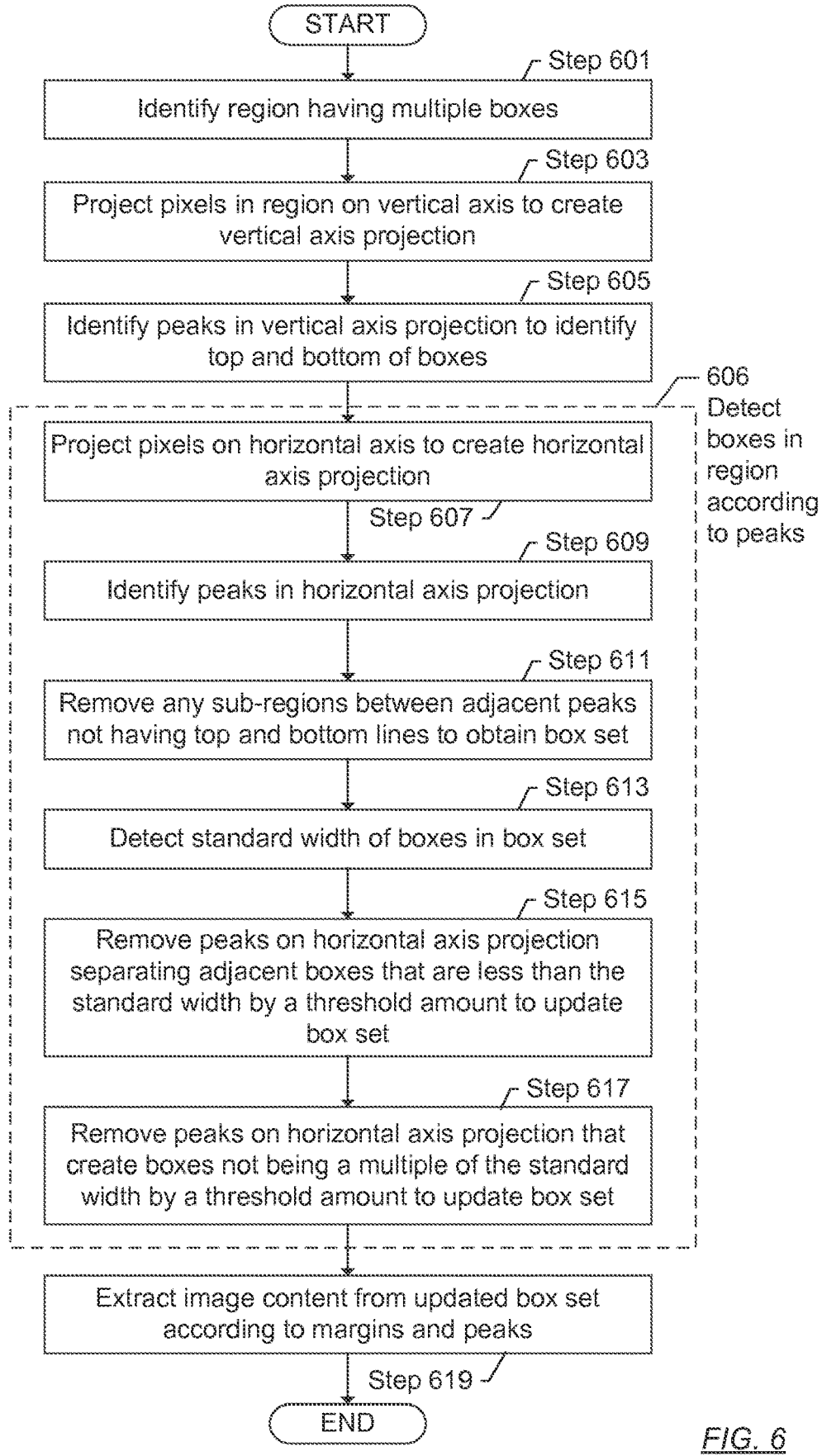

FIGS. 4-6 show flowcharts in accordance with one or more embodiments of the technology. The flowcharts shown in FIGS. 4-6 may be performed by the form analyzer discussed above with reference to FIG. 1. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 4 shows a flowchart for defining box removal parameters for a form in accordance with one or more embodiments of the technology. In Step 401, a new form is received in accordance with one or more embodiments of the technology. The new form is a version of a form that does not yet have box removal parameters defined. The form may be a filled form, an empty form, an original of a computer-generated form (as opposed to a form image), a form image, or any other form.

In Step 403, identification of a region of one or more boxes is received in accordance with one or more embodiments of the technology. The region may include one or more boxes. In one or more embodiments of the technology, the user may specify the dimensions of the region without specifying the dimensions of individual boxes. Thus, if multiple boxes are in a region, the user does not need to specify the multiple boxes individually. In one or more embodiments, the user, using the user interface, may select the region. For example, the user may drag a cursor from one corner of the region to another corner of the region. As discussed above, the selection may not need to be exact as the region may include white space and some level of markings outside of the white space. By way of another example, the user may submit numerical region identifiers, such as distance from a corner or defined location in the form.

In Step 405, one or more additional box removal parameters are received for the identified region in accordance with one or more embodiments of the technology. For example, once selecting the region, the user may select to modify the default box removal parameters, generate new box removal parameters, or use a previous user defined box removal parameter. If the user selects to perform the modification, the user interface may display an options box that allows the user to submit the remaining box removal parameters. For example, the user interface may display a modal window by which the user may enter values into defined fields, select radio buttons, or perform other such processing. The user may submit values to adjust the box removal parameters.

In Step 407, a determination is made whether another region exists in accordance with one or more embodiments of the technology. If another region exists, the flow may proceed to Step 403. For example, the user may iterate through selecting regions and provide box removal individually and/or together for selected regions. If no other regions exist or if a different order of processing is performed, the flow may proceed to Step 409.

In Step 409, the box removal parameters are stored in accordance with one or more embodiments of the technology. For example, the box removal parameters may be stored in an XML file, in a document for the form, or using another technique. Rather than storing each set of box removal parameters, only the modified box removal parameters are stored. In other words, if default values are used, the default values are not stored for each particular form.

FIG. 5 shows a flowchart for extracting content from a form image in accordance with one or more embodiments of the technology. In Step 501, a form image is received in accordance with one or more embodiments of the technology. For example, a customer of the user may transmit the filled form to the user, via postal mail and/or via a computer network. If via postal mail, the user may scan the filled form using a scanner to create a form image. If via a computer network, the customer may take a picture of a tangible copy of the filled form, scan the filled form, transmit the filled form via fax machine, or perform another technique to obtain a form image. In some embodiments, the user may receive multiple filled forms. For example, if the form is a product registration form, the user may receive several thousand filled forms, from all of the user's customers, that the user batch processes. In such a scenario, the Steps of FIG. 5 may be performed for each form.

In Step 503, using the form template with the box removal parameters, preprocessing of the form image is performed to extract image content in each identified region and generate a preprocessed form in accordance with one or more embodiments of the technology. Extracting image contents may include copying the image contents into a new document with or without other contents that are not in a region identified by any box removal parameters. In some embodiments, extracting image contents may include changing the image color of the detected boxes to match the background, removing the detected boxes, adding an encoding to the boxes that is recognizable by a computer, or performing another action to filter out the boxes. Preprocessing of the form is discussed below and in FIG. 6.

Returning to FIG. 5, in Step 505, OCR recognition processing is performed on the preprocessed form to generate a text recognized form in accordance with one or more embodiments of the technology. The OCR recognition performed may include optical character recognition, optical word recognition, intelligent character recognition, intelligent word recognition, or any combination thereof. Any suitable algorithm may be used to perform the OCR recognition.

In Step 507, character content, or machine encoded text, is extracted from the text recognized form to generate extracted content. Any suitable algorithm may be used to perform the extraction. For example, the extraction may be based on the amount of space between characters, anchor points in the text recognized forms, region identifiers, and other information.

In Step 509, the extracted character content is stored in accordance with one or more embodiments of the technology. For example, a record for the customer may be created or updated with the extracted character content. Other techniques for storing the extracted character content may be used without departing from the scope of the technology.

FIG. 6 shows a flowchart for preprocessing of a form for image content extraction in accordance with one or more embodiments of the technology. In one or more embodiments, the Steps of FIG. 6 are described with respect to a single region. The Steps of FIG. 6 may be performed sequentially or in parallel for each region specified in the form template.

In Step 601, a region having multiple boxes is identified in accordance with one or more embodiments of the technology. In particular, a form template may be used to identify a region.

Once the region is determined vertical and horizontal lines in the region are identified. At least some of the vertical lines correspond to the sides of boxes. Some of the vertical lines may correspond to data entered into the boxes. Horizontal lines may correspond to the top and bottom of the boxes. The following discussion regarding FIG. 6 is directed to detecting vertical and horizontal lines using peaks in a projection. Although FIG. 6 shows using peaks to detect lines, other techniques may be used to detect the vertical and horizontal lines without departing from the scope of the technology. For example, a Hough transform may be used.

Continuing with FIG. 6, in Step 603, pixels in the region are projected on the vertical axis to create a vertical axis projection in accordance with one or more embodiments of the technology. In other words, for each row a determination is made as to the number of pixels that are in the row, and the number is added to the projection. If a sliding window is used, the aggregation for a row is performed across the rows in the sliding window. The sliding window is then moved to the next row and a new aggregation is performed. The use of the sliding window may allow for tops and bottoms of boxes that are not completely straight to be detected. In other words, if a bottom of a box has a first portion in a first row and a second portion in the neighboring row, the sliding window treats both rows as a single row for the purposes of aggregation. Thus, the bottom of the box is detectable even when spanning multiple rows.

In Step 605, peaks in the vertical axis projection are identified in accordance with one or more embodiments of the technology. Various techniques may be performed to detect peaks. For example, peaks may be detected based on a threshold. If the threshold is a percentage-based threshold of the maximum value in the horizontal axis projection, then the maximum value in the horizontal axis projection is calculated. The threshold percentage of the calculated maximum value is computed to obtain an absolute value threshold. Values in the horizontal axis projection that are greater than the absolute value threshold may be detected as being a peak.

In one or more embodiments of the technology, the identification of peaks in the vertical axis projection may be used to identify the top and bottom of boxes. If a box is defined to be a comb type box, then only the bottom peak is identified in the vertical axis projection. If a box is defined to be a complete box type, then the top and bottom of the boxes are identified. In one or more embodiments of the technology, because the peaks denote the greatest number of pixels in a row being the particular color of the box, and the horizontal line for the bottom of a box generally has the most number of pixels colored, the peak corresponds to the bottom of the box. Similarly, for boxes that have a top, a same attribute may exist. In other embodiments, if the region is for a single row of boxes, the bottom and the top of the box may be identified as the bottom most and topmost peak, respectively, in the vertical axis projection.

Using the peaks in the vertical axis projection, boxes are detected in the region (606) in accordance with one or more embodiments of the technology. FIG. 6 shows a set of steps for detecting boxes in the region using the peaks in the horizontal axis projection in accordance with one or more embodiments of the technology. Other techniques may be used without departing from the scope of the technology.

In Step 607 of box 606, pixels are projected on the horizontal axis to create a horizontal axis projection in accordance with one or more embodiments of the technology. Projecting pixels on the horizontal axis may be performed in a same or similar manner to projecting pixels on the vertical axis discussed above with reference to Step 603.

In Step 609, peaks in the horizontal axis projection are identified in accordance with one or more embodiments of the technology. Identifying peaks in the horizontal axis projection may be performed in a same or similar manner to identifying peaks in the vertical axis projection as discussed above with reference to Step 605.

In Step 611, any sub-regions between adjacent peaks in the vertical axis projection not having a top and bottom lines are removed to obtain a box set in accordance with one or more embodiments of the technology. In one or more embodiments, a box set is the set of sub-regions that are identified as being possible boxes. For each pair of adjacent peaks, a separate vertical axis projection may be performed on the sub-regions between the adjacent peaks to determine whether the sub-region has a top and a bottom that corresponds to the top and bottom identified in Step 605. In other words, a determination is made whether a top peak is in the same location in the sub-region's vertical axis projection as the location of the top peak in the region's vertical axis projection. A similar analysis may be performed for the bottom. If the sub-region does not have a top, the sub-region may be for a comb type box. If the sub-region does not have a top or a bottom, then the sub-region may be a space in between boxes, which may or may not include a hyphen or other such character. In such a scenario in which the sub-region is determined to be a space between boxes, the sub-region is not included in the box set. The processing of Step 611 discussed above, may be repeated for each pair of adjacent peaks to discard sub-regions that correspond to spaces between boxes. Adjacent peaks that are not discarded are in the box set.

In Step 613, the standard width of the boxes in the box set is detected in accordance with one or more embodiments of the technology. In one or more embodiments of the technology, the standard width of boxes may be performed by detecting the average of the boxes in the box set. Boxes that are less than the standard width may be determined to not be a box, but two boxes that include a value having a substantially vertical component (e.g., 1, 4). In such a scenario, the peak that separates the two boxes may be ignored (i.e., removed). In one or more embodiments of the technology, some boxes may be larger than the standard width. In such a scenario, larger boxes may be detected based on being a multiple of the standard width. Thresholds may be applied to allow for some deviation in the standard width. In other words, boxes that are not the standard width, but are within a threshold degree of variability as defined by the width variation parameter may be kept in the box set. By performing image processing to detect the standard width of the boxes, one or more embodiments allow for deviation in the size of the form when scanning. In other words, although the form may be defined as a standard sheet, when printed and rescanned or photographed and transformed into a form image, various image contents on the form may be smaller than the original width. However, detecting the standard width of boxes may be useful to allow for variation in the size of a same set of boxes on different instances of a form.

In Step 615, peaks on the horizontal axis projection separating adjacent boxes that are less than the standard width are removed in accordance with one or more embodiments of the technology. By removing the peaks, the resulting box set has the adjacent boxes combined.

In Step 617, peaks on the horizontal axis projection that create boxes which are not a multiple of the standard width by a threshold amount are removed in accordance with one or more embodiments of the technology. In other words, boxes that are designed for multiple characters may be a multiple of the standard width box for a single character. In order to distinguish the multiple character boundaries box from the image contents in the box, a determination is made whether a box is or is not a multiple of the standard width. If the box is not a multiple of the standard width at least by a threshold amount of variability, then the peaks separating adjacent boxes are removed to create a box that is the multiple of the standard width.

In Step 619, image content is extracted from the boxes based on the margins and the remaining peaks. In other words, the remaining peaks in the horizontal axis projection and denoted in the box set are determined to be boundaries of a box. Similarly, top boundaries and bottom boundaries of the boxes are identified by the vertical axis projection. Thus, the boundaries of the box are removed. In one or more embodiments, the margins may be used to identify the preprocessing extraction region for extracting the image contents of the boxes. In other words, once the boundaries of the box are detected, the columns that are within the margins are identified and also not extracted. Image content that is within the box, but not in the identified margin is extracted.

In extracting image content, portions of the images of characters may be deleted even though not part of the box. For example, an "8" that intersects the boundary of the box may have the lower loop cut off. In such a scenario, corrective actions may be performed. In particular, if pixels intersect the detected boundaries of the box and an open loop is detected based on the intersection, the open loop may be closed by the form analyzer. Similarly, top bars, such as on the number "5" may be added when intersecting a box boundary based on the intersection and the trajectory. Thus, various techniques may be performed to apply the corrective actions.

FIGS. 7.1, 7.2, 7.3, 7.4, 7.5, 7.6, 7.7, 7.8, 7.9, 7.10, 7.11, 7.12, 7.13, 7.14, 7.15, and 7.16 show examples of images of regions with boxes and the regions with the boxes filtered out that have just extracted character images in accordance with one or more embodiments of the technology. The processing of the example set of boxes to generate the shown image contents may be performed using the Steps of FIG. 6 and by the box removal tool in FIG. 1. The following examples are for explanatory purposes only and not intended to limit the scope of the technology.

FIG. 7.1 shows an example of a standard set of boxes (700) of a filled form. As shown in FIG. 7.1, the scanned version of the filled form may not have completely straight lines for the boundaries. Further, letters such as E, I, and T in the filled form may have a similar size peak to the boundaries of the boxes in the horizontal axis projection. However, determining the standard width (702) of the box may be used to distinguish between characters entered by a customer and the boundaries of the box. Thus, as shown in FIG. 7.1, the words, Dave Smith (704) may be extracted.

FIGS. 7.2 and 7.3 show examples of sets of boxes (706, 708) having thin edges. Boxes with thin edges may have high peaks as compared to surrounding values in the horizontal axis projection. Similar to FIG. 7.1, once the peaks are identified, the standard width of the boxes may be identified from the peaks and used to extract image contents (710, 712).

FIG. 7.4 shows an example of sets of boxes (714) having space between the boxes. As shown in FIG. 7.4, each pair of adjacent boxes has a space between the adjacent boxes. The top and the bottom of the boxes may be identified by the vertical axis projection for the region. Using a horizontal axis projection, the peaks denoting the boundaries of the boxes may be identified. Because contents of the box are within the box, sub-regions between adjacent peaks either have or do not have a matching top and bottom to the boundary as reflected in the sub-region's vertical axis projection. The sub-region that does not have matching top and bottom peaks are not part of the box set. The remaining sub-regions are a part of the box set. After extraction of the image contents (716) or as part of the extraction in FIG. 7.4, additional processing may be performed to close the loop on the twos and extend the line for the four.

Continuing with the examples, FIGS. 7.5 and 7.6 show sets of boxes (720, 722) having irregular spacing between boxes. In one or more embodiments, by removing the sub-regions from the box set that do not have top and bottom boundaries prior to determining the standard width of the boxes, the irregular spacing may be irrelevant. Thus, the image contents (724, 726) may be extracted. FIGS. 7.7 and 7.8 show examples of sets of boxes (728, 732) having characters overflowing the boundaries of the boxes. The preprocessing may be performed to remove the boxes regardless of the overflowing characters. Thus, image contents (730, 734) may be extracted. Similar to FIG. 7.4 additional corrective action may be performed on the extracted image contents.

FIG. 7.9 shows an example of a set of boxes (736) having empty and non-empty parts. As shown, whether the boxes are empty may be irrelevant when extracting the image contents (738). FIG. 7.10 shows an example set of boxes (740) and corresponding extracted content (742) with both machine written and handwritten characters. FIG. 7.11 shows an example set of boxes (744) with an artifact between groups of boxes in the set. Because one or more embodiments disregard sub-regions that do not have a top and a bottom, the artifacts are disregarded and not present in the image contents (746). Thus, artifacts may be used to guide a user to correctly enter information without unduly affecting the extracted contents.

FIG. 7.12 shows an example of boxes (748) skewed such as during the scanning (e.g., with a scanner or a camera). In other words, as shown in FIG. 7.12, the top horizontal line is not straight. However, using a sliding window on the vertical axis projection may be performed to allow for the amount of deviation of the top boundary. Thus, the image contents (750) may be extracted.

FIG. 7.13 shows an example set of boxes (754) having boxes with irregular sizes. As shown in FIG. 7.13, the box with the 9 is larger than the remaining boxes. However, the combination of allowing the box to be a multiple of the standard size and by a threshold degree of width variation, image contents (756) may be extracted.

FIG. 7.14 shows an example of a set of boxes (760) having boxes with irregular size and empty, non-empty, and machine and handwritten boxes as well as the corresponding extracted image contents (762) in accordance with one or more embodiments of the technology. FIG. 7.15 shows an example of a set of boxes (764) having boxes with irregular size and empty and non-empty boxes as well as the corresponding extracted image contents (766) in accordance with one or more embodiments of the technology. FIG. 7.16 shows an example boundary (770) of a box in which the boundary deviates by a pixel (772). In FIG. 7.16, without a sliding window of two pixels, the boundary may not be detected. By adding a sliding window of two pixels and summing the number of boxes in both columns that are of the pre-defined color, the boundary is detected in accordance with one or more embodiments of the technology.

Figure 8:
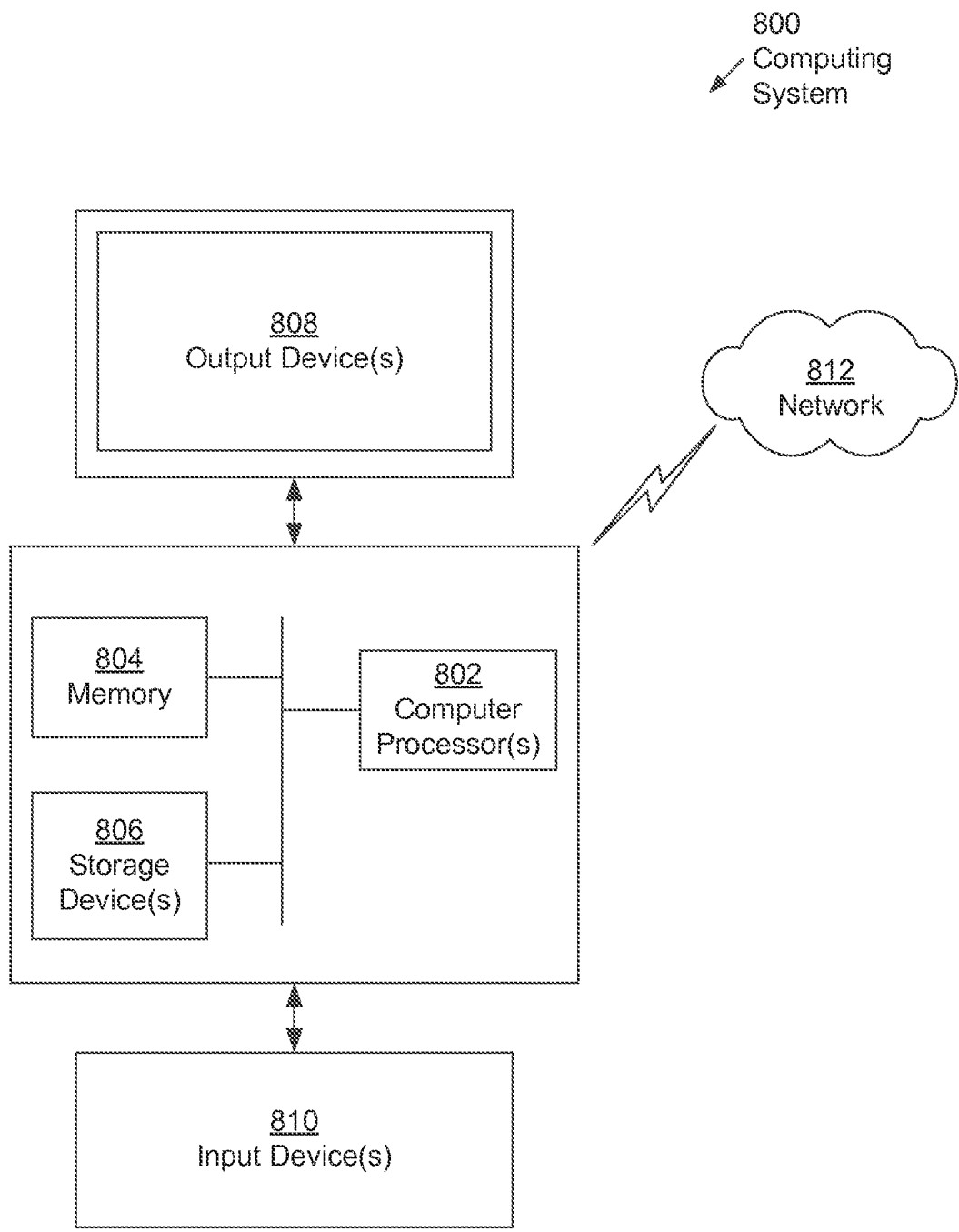
FIG. 8 shows a computing system in accordance with one or more embodiments of the technology.

Embodiments of the technology, such as the form analyzer shown in FIG. 1, may be implemented on a computing system. Any combination of mobile, desktop, server, embedded, or other types of hardware may be used. For example, FIG. 8 shows a computing system. The computing system may include functionality to execute one or more components of the system shown in FIG. 1. As shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (800) may be located at a remote location and connected to the other elements over a network (812). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A computer program product comprising a non-transitory computer readable medium storing therein a set of computer-readable instructions, the set of computer-readable instructions comprising instructions for:
   receiving a form template input, the form template input comprising a definition of a first region of a form and specifying a first set of box removal parameters for the first region;
   storing a form template for the form, the form template identifying the first region and including the first set of box removal parameters for the first region;
   obtaining a form image that is an image of an instance of the form containing written information;
   preprocessing the form image using the form template to generate a preprocessed form, the instructions for preprocessing the form further comprising instructions for:
   detecting a first box in the first region of the form image according to the first set of box removal parameters; and
   extracting first image contents, wherein extracting the first image contents comprises:
   determining a standard width for the first box;
   determining that the width of an adjacent box is less than the standard width;
   in response to determining that the width of the adjacent box is less than the standard width, combining the adjacent box with the first box to form a combined box; and
   performing optical character recognition on the preprocessed form to generate a text recognized form containing first character content determined from the first image contents for the combined box.

2. The computer program product of claim 1, wherein the set of computer-readable instructions further comprise instructions for:
   extracting the first character content from the text recognized form; and
   storing the first character content in a record.

3. The computer program product of claim 1, wherein the instructions for detecting the first box in the first region of the form image according to the first set of box removal parameters further comprise instructions for:
   projecting a set of pixels in the first region onto a horizontal axis to determine a horizontal axis projection, the horizontal axis projection comprising a set of combined values, each combined value in the set of combined values representing a number of corresponding pixels in at least one column that meet a criteria;
   identifying a set of peaks in the horizontal axis projection;
   identifying one or more pairs of adjacent peaks from the set of peaks in the horizontal axis projection;
   identifying a set of sub-regions of the first region, each sub-region in the set of sub-regions falling between a corresponding pair of adjacent peaks from the one or more pairs of adjacent peaks; and removing any sub-regions not having a top line and a bottom line from the set of sub-regions to determine a box set of possible boxes.

4. The computer program product of claim 3, wherein the instructions for detecting the first box in the first region of the form image according to the first set of box removal parameters further comprise instructions for:
determining a standard box width of boxes in the box set;
based on a determination that first adjacent boxes in the box set are less than the standard box width, removing a peak separating the first adjacent boxes from the horizontal axis projection to combine the first adjacent boxes in the box set; and
based on identifying a box in the box set that is not a multiple of the standard box width within a threshold degree of variability, removing a peak separating the identified box from an adjacent box to create a new box in the box set that is the multiple of the standard box width,
wherein the box set includes the first box.

5. The computer program product of claim 1, wherein the first set of box removal parameters define a sliding window and wherein each combined value in the set of combined values represents a summation of pixels in the sliding window that meet a criteria.

6. The computer program product of claim 1, wherein the form template identifies a second region and a second set of box removal parameters for the second region and wherein the instructions for preprocessing the form image using the form template to generate the preprocessed form comprise instructions for:
detecting a second box in the second region of the form image according to the second set of box removal parameters; and
extracting second image contents from the second box, wherein extracting the second image contents comprises filtering out the second box.

7. The computer program product of claim 1, wherein filtering out the first box comprises removing the first box.

8. The computer program product of claim 1, wherein filtering out the first box comprises at least one of changing an image color of the first box to match a background color in the preprocessed form or adding a computer recognizable encoding to identify the first box in the preprocessed form.

9. A method for processing electronic forms comprising:
receiving, by a processor, a form template input, the form template input comprising a definition of a first region of a form and specifying a first set of box removal parameters for the first region;
storing a form template for the form in a computer memory, the form template identifying the first region and including the first set of box removal parameters for the first region;
obtaining, by the processor, a form image that is an image of an instance of the form containing written information;
preprocessing, by the processor, the form image using the form template to generate a preprocessed form, preprocessing the form image further comprising:
detecting a first box in the first region of the form image according to the first set of box removal parameters; and
extracting first image contents, wherein extracting the first image contents comprises:
determining a standard width for the first box;
determining that the width of an adjacent box is less than the standard width;
in response to determining that the width of the adjacent box is less than the standard width, combining the adjacent box with the first box to form a combined box; and
performing, by the processor, optical character recognition on the preprocessed form to generate a text recognized form containing first character content determined from the first image contents for the combined box.

10. The method of claim 9, further comprising the processor:
extracting the first character content from the text recognized form; and
storing the first character content in a record.

11. The method of claim 9, wherein detecting the first box in the first region of the form image according to the first set of box removal parameters further comprises:
projecting a set of pixels in the first region onto a vertical axis to determine a first vertical axis projection, the first vertical axis projection comprising a first set of combined values, each combined value in the first set of combined values representing a number of pixels in at least one row that meet a criteria;
identifying a first peak in the first vertical axis projection;
identifying a second peak in the first vertical axis projection; and
detecting a first bottom based on the first peak and a first top based on the second peak.

12. The method of claim 11, wherein detecting the first box in the first region of the form image according to the first set of box removal parameters further comprises:
projecting the set of pixels in the first region onto a horizontal axis to determine a horizontal axis projection, the horizontal axis projection comprising a second set of combined values, each combined value in the second set of combined values representing a number of corresponding pixels in at least one column that meet the criteria;
identifying a set of peaks in the horizontal axis projection;
identifying one or more pairs of adjacent peaks from the set of peaks in the horizontal axis projection;
identifying a set of sub-regions of the first region, each sub-region in the set of sub-regions falling between a corresponding pair of adjacent peaks from the one or more pairs of adjacent peaks; and
removing any sub-regions not having a top line and a bottom line from the set of sub-regions to determine a box set of possible boxes.

13. The method of claim 12, wherein removing any sub-regions not having the top line and the bottom line from the set of sub-regions further comprises:
selecting a sub-region from the set of sub-regions, the selected sub-region containing a first subset of pixels from the set of pixels;
projecting the first subset of pixels onto the vertical axis to create a second vertical axis projection;
determining if the second vertical axis projection has a bottom peak that occurs at a same location on the vertical axis as the first peak and a top peak that occurs at a same location on the vertical axis as the second peak; and
based on a determination that the second vertical axis projection does not have the bottom peak that occurs at the same location on the vertical axis as the first peak and that the second vertical axis projection does not have the top peak that occurs at the same location on the vertical axis as the second peak, removing the selected sub-region from the set of sub-regions.

14. The method of claim 12, wherein detecting the first box in the first region of the form image according to the first set of box removal parameters further comprises:

determining a standard box width of boxes in the box set;

based on a determination that first adjacent boxes in the box set are less than the standard box width, removing a peak separating the first adjacent boxes from the horizontal axis projection to combine the first adjacent boxes in the box set; and based on identifying a box in the box set that is not a multiple of the standard box width within a threshold degree of variability, removing a peak separating the identified box from an adjacent box to create a new box in the box set that is the multiple of the standard box width, wherein the box set includes the first box.

15. The method of claim 12, wherein the first set of box removal parameters define a sliding window and wherein each combined value in the second set of combined values represents a summation of pixels in the sliding window that meet the criteria.

16. The method of claim 11, wherein the form template identifies a second region and defining a second set of box removal parameters for the second region, and wherein preprocessing the form image using the form template to generate the preprocessed form, further comprises:

detecting a second box in the second region of the form image according to the second set of box removal parameters; and extracting second image contents of the second box, wherein extracting the second image contents comprises filtering out the second box.

17. The method of claim 9, wherein filtering out the first box comprises removing the first box.

18. The method of claim 11, wherein filtering out the first box comprises at least one of changing an image color of the first box to match a background color in the preprocessed form or adding a computer recognizable encoding to identify the first box in the preprocessed form.

* * * * *